United States Patent
Matsushita et al.

(10) Patent No.: US 9,020,432 B2
(45) Date of Patent: Apr. 28, 2015

(54) MOBILE COMMUNICATION DEVICE, COMMUNICATION METHOD, INTEGRATED CIRCUIT, AND PROGRAM

(75) Inventors: Yosuke Matsushita, Osaka (JP); Masaru Yamaoka, Osaka (JP); Shohji Ohtsubo, Osaka (JP); Tsutomu Mukai, Osaka (JP); Hironori Nakae, Osaka (JP); Mitsuaki Oshima, Kyoto (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 734 days.

(21) Appl. No.: 13/203,772

(22) PCT Filed: Nov. 26, 2010

(86) PCT No.: PCT/JP2010/006901
§ 371 (c)(1),
(2), (4) Date: Aug. 29, 2011

(87) PCT Pub. No.: WO2011/065007
PCT Pub. Date: Jun. 3, 2011

(65) Prior Publication Data
US 2011/0312278 A1    Dec. 22, 2011

(30) Foreign Application Priority Data

Nov. 30, 2009  (JP) ................. 2009-272792
Jul. 14, 2010  (JP) ................. 2010-160112

(51) Int. Cl.
H04B 5/00    (2006.01)
H04L 12/40   (2006.01)
(Continued)

(52) U.S. Cl.
CPC ......... *H04L 12/40013* (2013.01); *H04W 4/008* (2013.01); *G08C 17/02* (2013.01);
(Continued)

(58) Field of Classification Search
CPC ........................................ H04W 4/008
USPC ..................... 455/41.1, 41.2, 41.3
See application file for complete search history.

(56) References Cited

U.S. PATENT DOCUMENTS 5,648,813 A    7/1997 Tanigawa et al.
5,941,930 A    8/1999 Morimoto et al.
(Continued)

FOREIGN PATENT DOCUMENTS

JP    07-135689    5/1995
JP    08-094378    4/1996
(Continued)

OTHER PUBLICATIONS

International Search Report issued Mar. 1, 2011 in corresponding International Application No. PCT/JP2010/006901.
(Continued)

*Primary Examiner* — Wen Huang
(74) *Attorney, Agent, or Firm* — Wenderoth, Lind & Ponack, L.L.P.

(57) ABSTRACT

A mobile communication device (98*b*) includes: an appliance information obtainment unit (98*n*) that obtains appliance information (98*n*1) by proximity wireless communication (98*c*1) with an appliance (98*a*) installed in a home (99), the appliance information specifying the appliance (98*a*); a position information obtainment unit (98*j*) that obtains position information (98*j*1) of the mobile communication device when the proximity wireless communication (98*c*1) is performed; and a transmission unit (98*o*) that transmits transmission information (98*o*1) to a server (98*c*) in the case where the proximity wireless communication (98*c*1) is performed, the transmission information including the appliance information (98*n*1) and the position information (98*j*1).

17 Claims, 183 Drawing Sheets

(51) Int. Cl.
*H04W 4/00* (2009.01)
*G08C 17/02* (2006.01)
*H04W 64/00* (2009.01)

(52) U.S. Cl.
CPC ........ *H04W 64/003* (2013.01); *G08C 2201/20* (2013.01); *G08C 2201/32* (2013.01); *G08C 2201/91* (2013.01); *G08C 2201/93* (2013.01); *H04B 5/0062* (2013.01)

(56) References Cited

U.S. PATENT DOCUMENTS

| | | | |
|---|---|---|---|
| 6,118,442 | A | 9/2000 | Tanigawa |
| 6,348,956 | B1 | 2/2002 | Tanigawa et al. |
| 7,028,410 | B2 | 4/2006 | Sato et al. |
| 7,139,562 | B2 | 11/2006 | Matsui |
| 7,593,739 | B2 | 9/2009 | Oguri et al. |
| 8,400,530 | B2 | 3/2013 | Ikeda et al. |
| 8,504,008 | B1 | 8/2013 | Gossweiler, III et al. |
| 8,515,413 | B1 | 8/2013 | Schilit et al. |
| 8,560,012 | B2 | 10/2013 | Ohnishi et al. |
| 8,627,075 | B2 | 1/2014 | Ikeda et al. |
| 8,692,905 | B2 | 4/2014 | Ikeda et al. |
| 8,831,514 | B2 | 9/2014 | Tysowski |
| 8,943,605 | B1 | 1/2015 | Martin et al. |
| 2002/0047945 | A1 | 4/2002 | Tanigawa et al. |
| 2003/0187922 | A1 | 10/2003 | Ohara |
| 2004/0121725 | A1 | 6/2004 | Matsui |
| 2005/0143148 | A1 | 6/2005 | Sato et al. |
| 2006/0004743 | A1* | 1/2006 | Murao et al. ............ 707/4 |
| 2006/0149459 | A1 | 7/2006 | Matsuura et al. |
| 2006/0247890 | A1 | 11/2006 | Oguri et al. |
| 2007/0197236 | A1* | 8/2007 | Ahn et al. ............ 455/466 |
| 2008/0238653 | A1* | 10/2008 | Unger ............ 340/531 |
| 2008/0309464 | A1* | 12/2008 | Chihara ............ 340/10.42 |
| 2009/0081950 | A1 | 3/2009 | Matsubara et al. |
| 2010/0081375 | A1* | 4/2010 | Rosenblatt et al. ......... 455/41.1 |
| 2010/0283586 | A1 | 11/2010 | Ikeda et al. |
| 2011/0007901 | A1 | 1/2011 | Ikeda et al. |
| 2011/0312278 | A1 | 12/2011 | Matsushita et al. |
| 2012/0019674 | A1 | 1/2012 | Ohnishi et al. |
| 2012/0094596 | A1 | 4/2012 | Tysowski |
| 2013/0038634 | A1 | 2/2013 | Yamada et al. |
| 2013/0052946 | A1 | 2/2013 | Chatterjee et al. |
| 2013/0196591 | A1 | 8/2013 | Ikeda et al. |
| 2013/0198056 | A1 | 8/2013 | Aldrey et al. |
| 2013/0218451 | A1 | 8/2013 | Yamada |
| 2013/0247117 | A1 | 9/2013 | Yamada et al. |
| 2013/0331027 | A1 | 12/2013 | Rose et al. |
| 2014/0009268 | A1 | 1/2014 | Oshima et al. |
| 2014/0105397 | A1 | 4/2014 | Ikeda et al. |
| 2014/0152856 | A1 | 6/2014 | Ikeda et al. |
| 2014/0206381 | A1 | 7/2014 | Yamada et al. |
| 2014/0213290 | A1 | 7/2014 | Yamada |

FOREIGN PATENT DOCUMENTS

| | | |
|---|---|---|
| JP | 09-116985 | 5/1997 |
| JP | 10-215244 | 8/1998 |
| JP | 10-300493 | 11/1998 |
| JP | 11-295409 | 10/1999 |
| JP | 2001-249899 | 9/2001 |
| JP | 2001-349742 | 12/2001 |
| JP | 2002-87536 | 3/2002 |
| JP | 2003-234840 | 8/2003 |
| JP | 2003-279354 | 10/2003 |
| JP | 2003-296273 | 10/2003 |
| JP | 2004-48132 | 2/2004 |
| JP | 2004-166193 | 6/2004 |
| JP | 2004-201031 | 7/2004 |
| JP | 2004-258766 | 9/2004 |
| JP | 2004-297334 | 10/2004 |
| JP | 2005-315650 | 11/2005 |
| JP | 2005-354543 | 12/2005 |
| JP | 2006-99540 | 4/2006 |
| JP | 2006-146753 | 6/2006 |
| JP | 2006-266945 | 10/2006 |
| JP | 2006-279424 | 10/2006 |
| JP | 2006-308472 | 11/2006 |
| JP | 2006-309500 | 11/2006 |
| JP | 2007-43316 | 2/2007 |
| JP | 2007-304787 | 11/2007 |
| JP | 2007-334901 | 12/2007 |
| JP | 2008-170309 | 7/2008 |
| JP | 2008-210368 | 9/2008 |
| JP | 2008-287596 | 11/2008 |
| JP | 2008-306667 | 12/2008 |
| JP | 2009-80593 | 4/2009 |
| JP | 2009-193433 | 8/2009 |
| JP | 2009-224841 | 10/2009 |
| JP | 2009-229295 | 10/2009 |
| JP | 2010-145228 | 7/2010 |
| JP | 2010-263506 | 11/2010 |
| JP | 5419895 | 11/2013 |
| KR | 2007-0112104 | 11/2007 |
| WO | 2006/123413 | 11/2006 |
| WO | 2007/069323 | 6/2007 |
| WO | 2009/063628 | 5/2009 |
| WO | 2009/084243 | 7/2009 |

OTHER PUBLICATIONS

Informal Comments filed Apr. 27, 2011 in corresponding International Application No. PCT/JP2010/006901 (with English translation).
International Search Report issued Mar. 13, 2012 in corresponding International Application No. PCT/JP2011/006583.
International Search Report issued Feb. 21, 2012 in corresponding International Application No. PCT/JP2011/006585.
Extended European Search Report issued Jan. 30, 2014 in corresponding European Application No. 10832856.8.
Office Action issued Jan. 8, 2015 in U.S. Appl. No. 13/820,861
Notice of Allowance issued Feb. 5, 2015 in U.S. Appl. No. 13/989,252.

* cited by examiner

FIG. 25

```
array picArray;
                                    6006
Main(void){
        Bool cn = ConnectServer(URL);
        if(cn!=false){           6007
                SetDownloaded(DLcomplete);
                picArray = DownloadedData(cn);
        }
        return;                          6008
}           6009
                   6010
void DLcomplete(void){
        StartSlideShow(picArray);
        return
}
```

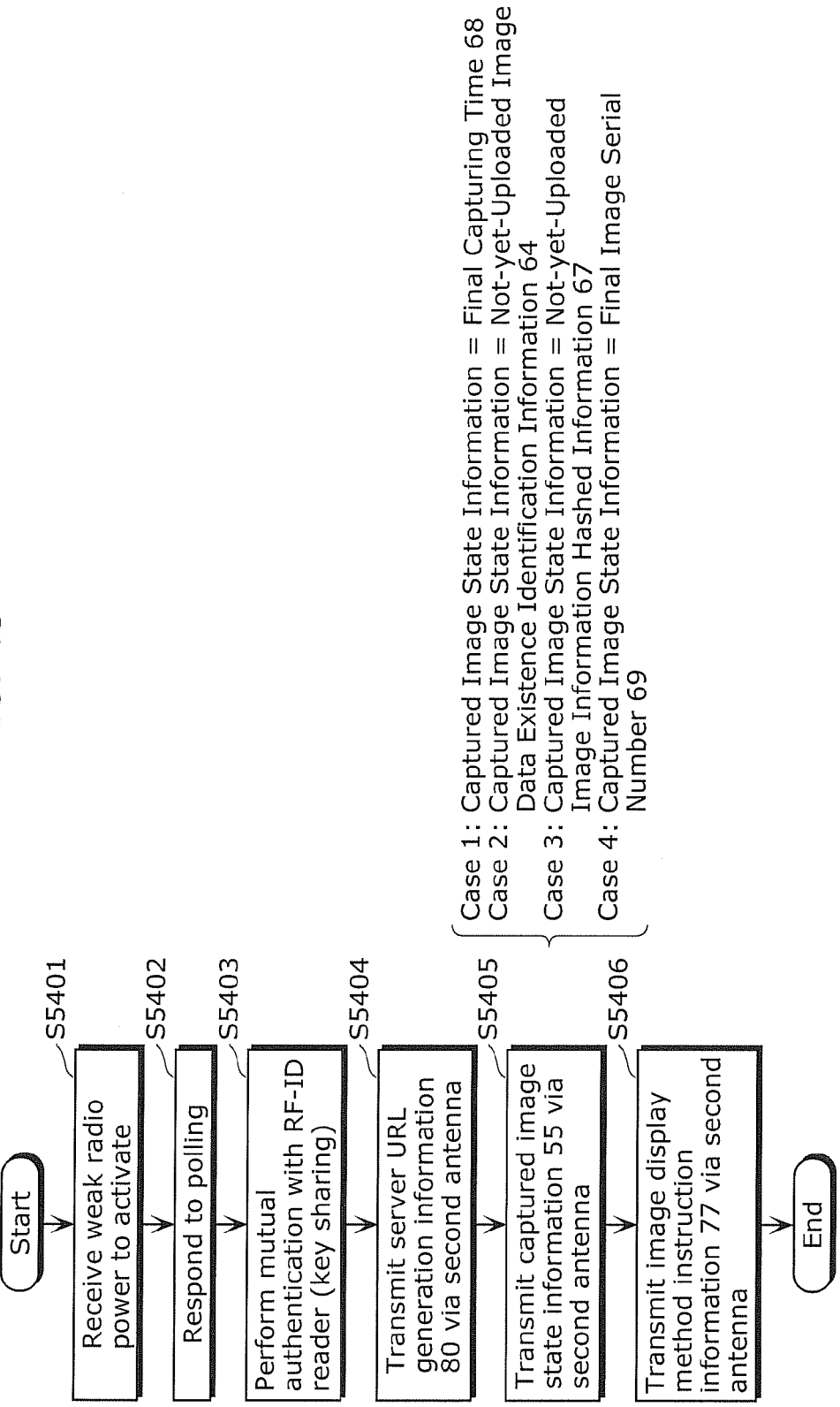

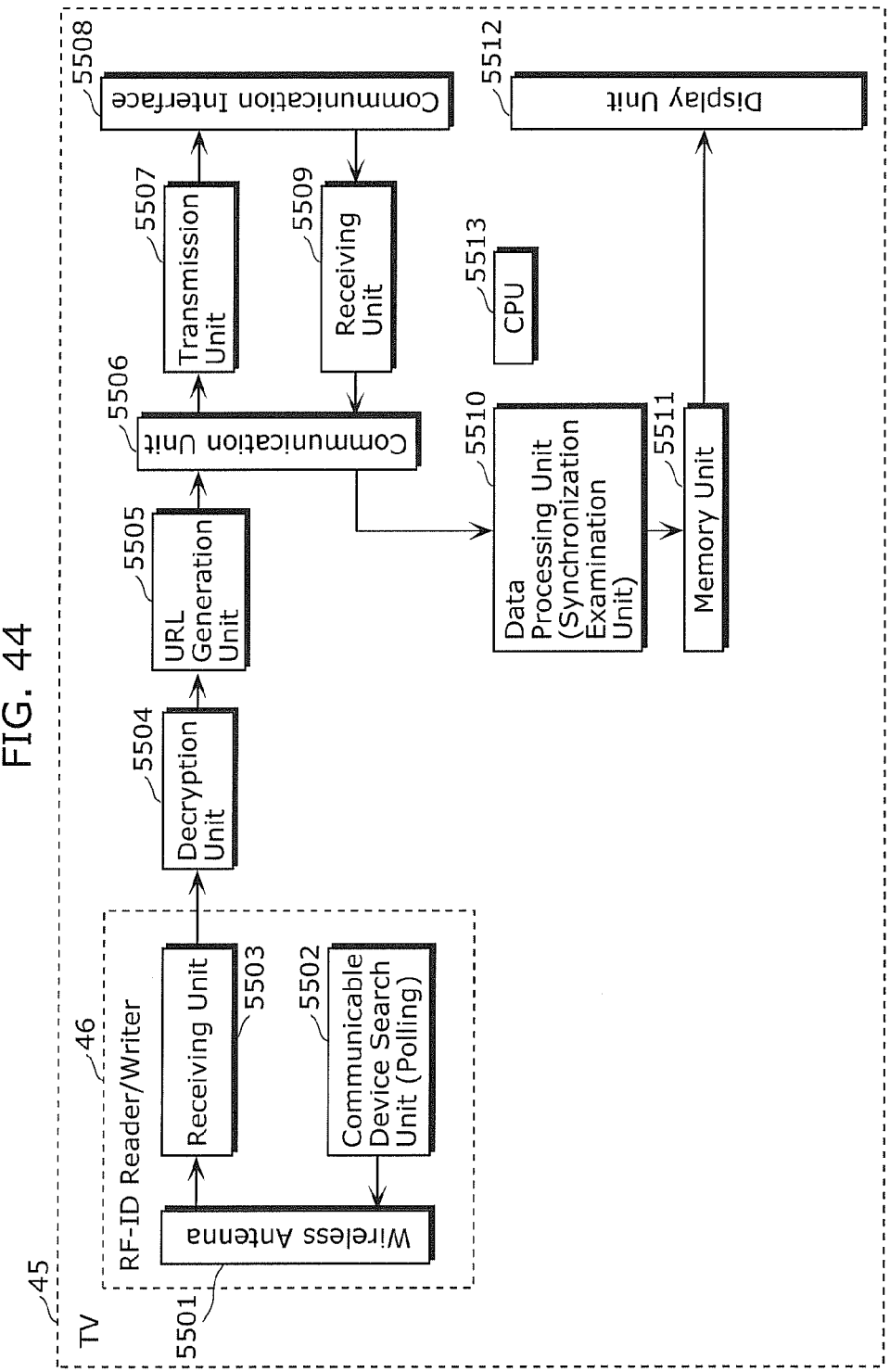

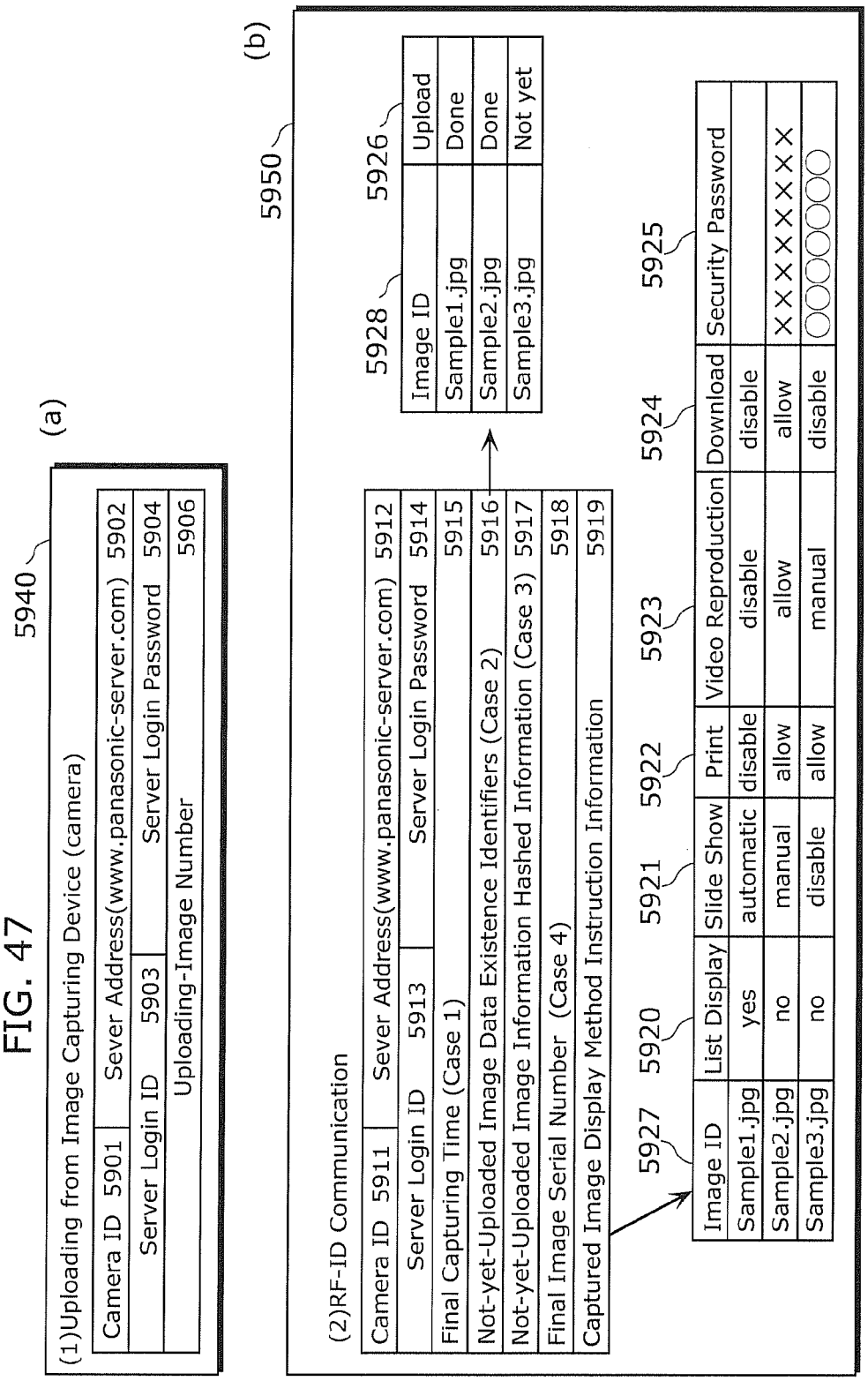

FIG. 57

Customer Attribute Database — 508

| ID | Gender | Age | Product/Service Genre | Price Range |
|---|---|---|---|---|
| 01 | Female | 20's to 30's | Reasonable Trip | ¥150,000 to ¥250,000 |
| 02 | Female | 30's to 40's | Childhood Products, Gourmet | less than ¥100,000 |
| 03 | Female | 50's to 60's | Fashion, Family Trip | ¥300,000 or more |
| 04 | Male | 20's to 30's | Reasonable Trip | ¥100,000 to ¥200,000 |
| 05 | Male | 30's to 40's | Childhood Products, Home Products | less than ¥50,000 |
| 06 | Male | 50's to 60's | Hobby, Family Trip | ¥400,000 or more |

FIG. 58

Electronic Catalog Database — 507

| ID | Product/Service Genre | Price | Product/Service Data |
|----|----------------------|-------|----------------------|
| 01 | Reasonable Trip | ¥50,000 | Korea, 3 days and 2 nights with Gourmet |
| 02 | Reasonable Trip | ¥150,000 | Hawaii, 5 days with various optional activities |
| 03 | Reasonable Trip | ¥300,000 | 3 European countries, 8 days and 7 nights, A-level hotel |
| 04 | Fashion | ¥10,000 | Apparel on Bargain Sale, limited time only |
| 05 | Fashion | ¥30,000 | Direct imported bag from Italy |
| 06 | Fashion | ¥100,000 | Jewelry selected by buyer this year |

FIG. 80

| UID | Target Apparatus Information | Setting Information |
|---|---|---|
| UID0001 | REC-0001 | Recorder Setting Information A |
| UID0001 | TV-0005 | TV Setting Information A |
| UID0001 | NPC-0002 | Laptop Setting Information A |
| UID0002 | DSC-0125 | DSC Setting Information A |
| UID0003 | REC-0001 | Recorder Setting Information B |
| UID0003 | TV-0083 | TV Setting Information A |
| UID0005 | DSC-0008 | DSC Setting Information B |
| UID0010 | DPC-0001 | Desktop Setting Information A |

FIG. 84

Memory

| UID | Medium Identification Information |
|---|---|
| UID0002 | Card |

Apparatus Operation Information

| Index | Operation Apparatus Identification Information | Target Apparatus Information | Operation Instruction Information ||| Communication Information |
|---|---|---|---|---|---|---|
| | | | Instruction Detail Information | Instruction Target Information | Communication Execution Information | |
| 1 | Recorder | All apparatuses | Setting Information Change (Timer Recording) | TV Program ID, Recording Mode | Communication is not executed. | None |
| 2 | Recorder | All apparatuses | Setting Information Change (Timer Recording) | TV Program Code, Recording Mode | Communication is executed. | URL, Login ID, Password |

FIG. 85

Memory

| UID | Medium Identification Information |
|---|---|
| UID0003 | Card |

Apparatus Operation Information

| Index | Operation Apparatus Identification Information | Target Apparatus Information | Operation Instruction Information ||| Communication Information |
|---|---|---|---|---|---|---|
| | | | Instruction Detail Information | Instruction Target Information | Communication Execution Information | |
| 1 | Vehicle Navigation Device | All apparatuses | Setting Information Change (Highlighted Display) | Landmark Information A (Map No. A, coordinates: xxx, yyy) | Communication is not executed. | None |
| 2 | Vehicle Navigation Device | All apparatuses | Setting Information Change (Highlighted Display) | Landmark Information B (Map No. B, coordinates: zzz, www) | Communication is not executed. | None |

FIG. 108

| UHF device ID | HF existence identification information | Apparatus product serial number, actual article number | Date | Manufacturer | Model number, lot number, product name | Status | Management server specific information (URL) |
|---|---|---|---|---|---|---|---|
| M010 | M011 | M012 | M013 | M014 | M015 | M016 | M017 |

FIG. 113
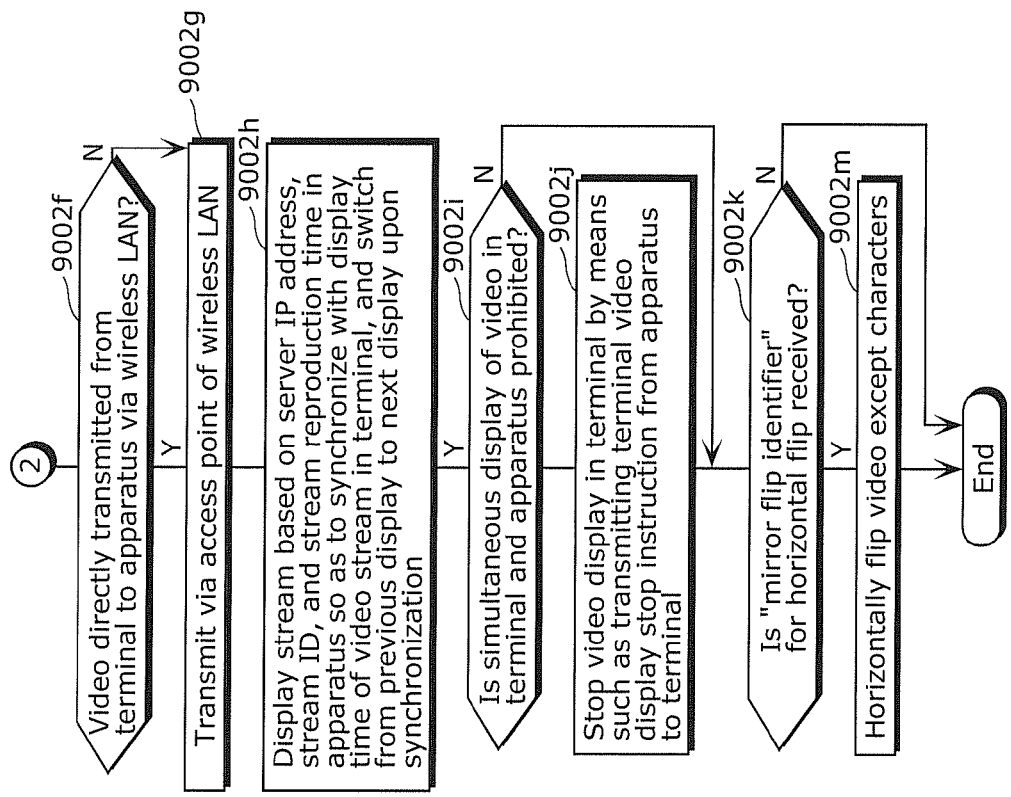
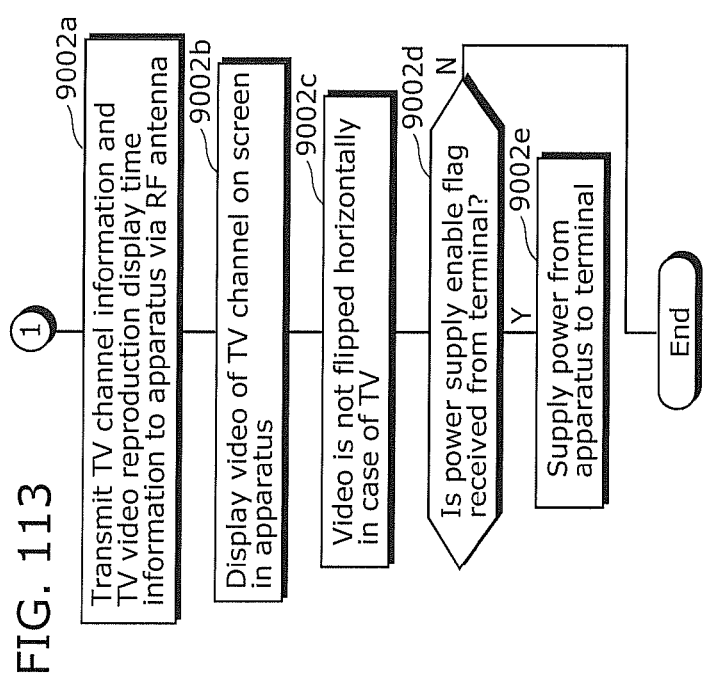

FIG. 138

| Part Number | UID | Position Information (Latitude, Longitude, Altitude) |
|---|---|---|
| Model Number of TV N10A | Product Serial Number of TV N10A | Latitude 139° 46.aa<br>Longitude 35° 41.bb<br>Altitude 1.cc [m] |

(a)

| Part Number | UID | Position Information (Latitude, Longitude, Altitude) |
|---|---|---|
| Model Number of TV N10A | Product Serial Number of TV N10A | Latitude 139° 46.aa<br>Longitude 35° 41.bb<br>Altitude 1.cc [m] |
| Model Number of BD Recorder N10B | Product Serial Number of BD Recorder N10B | Latitude 139° 46.dd<br>Longitude 35° 41.ee<br>Altitude 1.ff [m] |
| Model Number of Air Conditioner N10C | Product Serial Number of Air Conditioner N10C | Latitude 139° 46.gg<br>Longitude 35° 41.hh<br>Altitude 1.hh [m] |
| ⋮ | ⋮ | ⋮ |
| Model Number of Air Conditioner N10J | Product Serial Number of Air Conditioner N10J | Latitude 139° 46.kk<br>Longitude 35° 41.ll<br>Altitude 1.mm [m] |
| Model Number of FF Heater N10K | Product Serial Number of FF Heater N10K | Latitude 139° 46.nn<br>Longitude 35° 41.oo<br>Altitude 1.pp [m] |

(1) Positional Information

| Position Information |
| Second Server Login ID |
| Second Server Login Password |

(a)

(2) First Product Control Information

| Part Number ID (Part Number, Color Information of Air Conditioner N10J) |
| UID (Product Serial Number of Air Conditioner N10J) |
| Product Control Command (Power ON) |

(b)

(3) Second Product Control Information

| Part Number ID (Part Number, Color Information of TV N10A) |
| UID (Product Serial Number of TV N10A) |
| Product Control Command (Power OFF) |

(c)

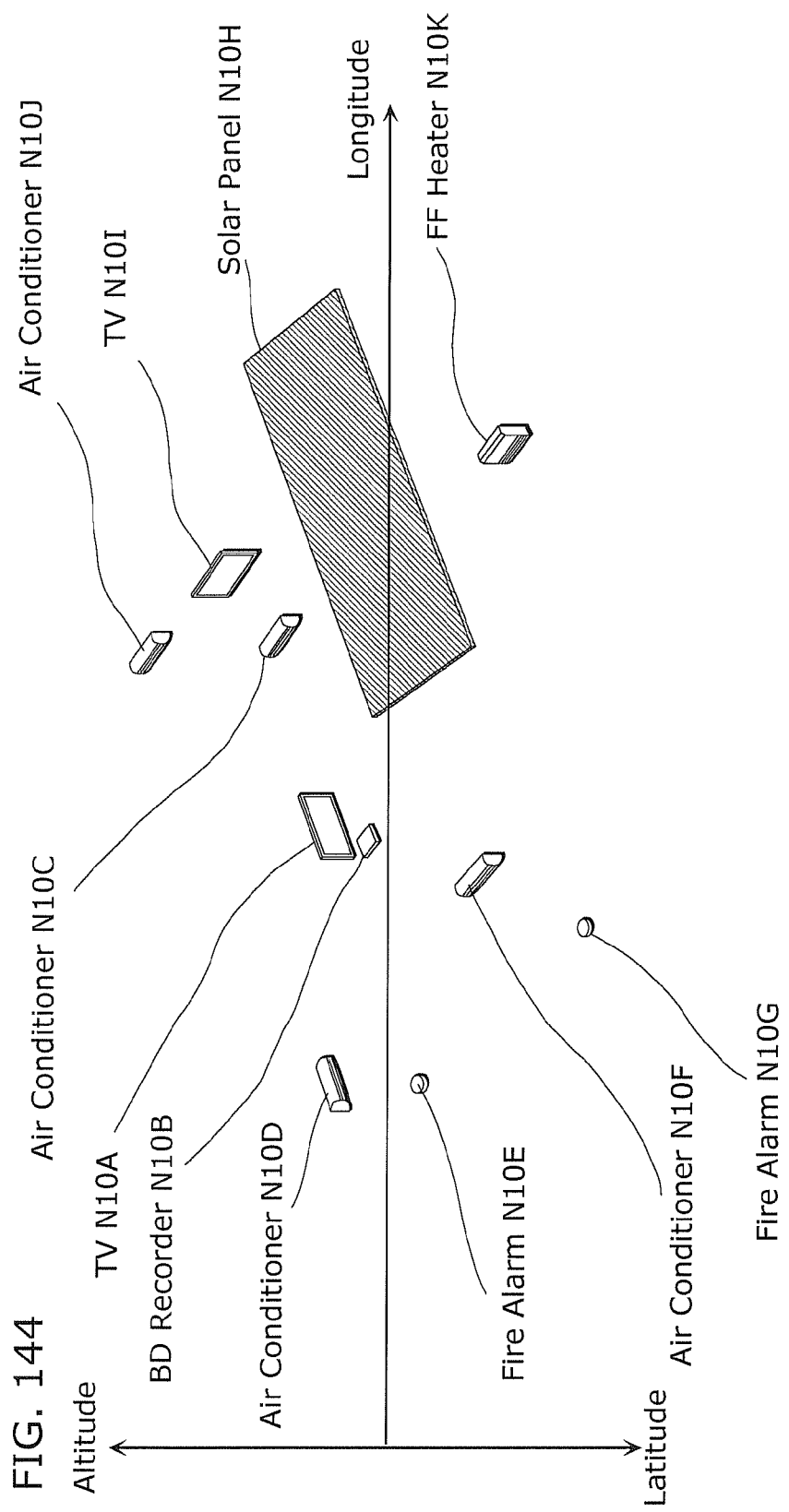

FIG. 145

| Part Number ID | UID | Position Information (X-coordinate, Y-coordinate, Z-coordinate) |
|---|---|---|
| Model Number of TV N10A | Product Serial Number of TV N10A | X-coordinate 0[m]<br>Y-coordinate 0[m]<br>Z-coordinate 0[m] |
| Model Number of BD Recorder N10B | Product Serial Number of BD Recorder N10B | X-coordinate a[m]<br>Y-coordinate b[m]<br>Z-coordinate c[m] |
| Model Number of Air Conditioner N10C | Product Serial Number of Air Conditioner N10C | X-coordinate d[m]<br>Y-coordinate e[m]<br>Z-coordinate f[m] |
| ... | ... | ... |
| Model Number of Air Conditioner N10J | Product Serial Number of Air Conditioner N10J | X-coordinate g[m]<br>Y-coordinate h[m]<br>Z-coordinate i[m] |
| Model Number of FF Heater N10K | Product Serial Number of FF Heater N10K | X-coordinate j[m]<br>Y-coordinate k[m]<br>Z-coordinate l[m] |

FIG. 147

| Accuracy Identifier | Part Number ID | Processing to be performed when position information in re-received server registration information is different from registered position information |
|---|---|---|
| High | Air Conditioner<br>Solar Panel<br>Fire Alarm | Update position information of mobile device N20 |
| Low | TV<br>BD Recorder<br>FF Heater | Update registered position information |

FIG. 154

| Product | Accuracy Identifier O54 | Processing performed by Determination Unit O83 |
|---|---|---|
| Air Conditioner<br>Solar Panel<br>Fire Alarm<br>Built-in Dishwasher<br>Air Conditioner in Bath Room<br>. . . | High | Determine that a position of mobile device O60 is to be corrected. |
| TV<br>BD Recorder<br>. . . | Low | Determine that a position of mobile device O60 is not to be corrected. |

FIG. 156 (A), ①

S431
Pattern matching between (a) building coordinate information and (b1) coordinate information generated by the mobile phone or (b2) trajectory information indicating a travel of the coordinate information can calculate errors in the coordinate information. Thereby, the position information correction unit and the direction information correction unit can calibrate the absolute coordinate information of the mobile device.

S432
The mobile device reads, from a RF-ID tag, coordinate accuracy identification information indicating an accuracy of coordinate information registered in the RF-ID tag or the first server. The determination unit determines that accuracy is high if the coordinate accuracy identification information indicates level 4 or higher among 5-stage levels. If accuracy is high, the coordinate information generated by the mobile phone is calibrated by using the coordinate information registered in the first server.

S433
The mobile device is brought to touch the first device such as a TV in order to determine the first coordinate position of the TV. The mobile phone stores the first coordinate position into the position information storage unit. Then, the mobile device is brought to touch a RF-ID unit of the second device such as an air conditioner to obtain second coordinate information. Thereby, the relative position calculation unit can obtain coordinate information of relative positions of the first and second devices. In this case, the determination unit examines accuracy indicated by the coordinate accuracy identification information of one of the first and second devices. If it is determined that absolute accuracy of the information is high, it is possible to determine, with high accuracy, absolute coordinate information of the other device by using the coordinate information of the former device.

S434
The mobile device is brought to touch the first device in order to read a MAC address and an authentication key and also brought to touch the second device in order to read a MAC address and an authentication key, in order to perform authentication. Thereby, connection authentication between the first and second devices can be performed on a network. In this case, relative positions of the two devices can be determined. Since a physical position relationship between the plural devices connected via the network are known, the distance calculation unit calculates a distance between the devices. Thereby, devices on the physically shortest path between the devices are powered ON to perform communication such as wireless communication between the devices. As a result, a communication speed can be increased and power consumption can be reduced.

FIG. 171

MOBILE COMMUNICATION DEVICE, COMMUNICATION METHOD, INTEGRATED CIRCUIT, AND PROGRAM

TECHNICAL FIELD

The present invention relates to a mobile communication device that includes a reader/writer of proximity wireless communication and a general-purpose communication means.

The present invention also relates to a mobile communication device that includes a reader/writer of proximity wireless communication and a general-purpose communication means and facilitates setting in a home network.

BACKGROUND ART

High expectations are placed on a Home Energy Management System (HEMS) that networks and automatically controls energy consuming appliances in a home, such as home appliances and water heaters. Moreover, as studies for home appliance traceability, daily life watching services, and the like have started, a home network including white goods is expected to come into widespread use. However, it is extremely difficult to perform initial setting of a network on white goods having no display device and input device. This difficulty in performing setting necessary for various services hampers the widespread use of the home network.

Meanwhile, proximity wireless communication is widely employed in devices such as mobile phones, and technological development for facilitating mail address forwarding and the like is underway.

PTL 1 discloses a method of facilitating input for setting access to a content server, through the use of the proximity wireless communication technology. The method disclosed in PTL 1 is a method (system) that saves the user from having to input a URL of a content server to be accessed by a mobile phone, by transferring a unique number of a terminal and a URL of a redirect server to the mobile phone by proximity wireless communication.

PTL 2 discloses a method whereby information of a cargo is received from a proximity wireless device attached to the cargo and at the same time geographical position information is received from Global Positioning System (GPS), to automatically communicate the geographical position information of the cargo to a server. This method (system) saves the user from having to input these information.

CITATION LIST

Patent Literature

[PTL 1]
Japanese Unexamined Patent Application Publication No. 2008-210368
[PTL 2]
Japanese Unexamined Patent Application Publication No. 2007-334901.

SUMMARY OF INVENTION

Technical Problem

For automation of home network setting, proximity wireless communication may be effectively used to facilitate setting.

However, it is insufficient to simply transfer information of an appliance to a server by proximity wireless communication. This is because network setting on a home-by-home basis cannot be made when the user simply transfers only information of a terminal to the server.

Moreover, to realize advanced services of the HEMS, it is essential to set relative positions of home appliances in each home. The conventional techniques, however, have a problem of being unable to precisely recognize positions of all home appliances in each home.

Though setting in a home network is likely to become easier if position information of each home appliance can be obtained, adding a position information obtainment function such as GPS to an ordinary home appliance is very costly. Thus, it is likely to be difficult to provide the position information obtainment function to an appliance (apparatus, device) other than a device, such as a mobile phone or a digital camera, whose application requires the position information obtainment function.

The user, on the other hand, demands a communication device capable of completing setting necessary for a home network without a complex operation.

The present invention has an object of providing a mobile communication device that can facilitate setting in a home network.

The present invention also has an object of providing a device that enables, by a simple operation, transmission of predetermined transmission information to a predetermined server when an appliance such as a home appliance is installed in a home (see a home 99 in FIG. 165).

The present invention also has an object of providing a device that can, as a result of the above simple operation, simplify an operation when a wireless LAN access point (see an access point 99c in FIG. 165) or the like performs suitable wireless communication corresponding to an installation position, from among first wireless communication in a first mode (e.g. wireless communication with relatively low power) and second wireless communication in a second mode (wireless communication with relatively high power).

Solution to Problem

To solve the problems stated above, the present invention is a mobile communication device including: an appliance information obtainment unit that obtains, from an appliance installed at a predetermined position (e.g. inside a home), appliance information by proximity wireless communication between the installed appliance and the mobile communication device, the appliance information specifying the appliance from among a plurality of appliances; a position information obtainment unit that obtains position information indicating a position of the mobile communication device when the proximity wireless communication is performed between the installed appliance and the mobile communication device; and a transmission unit that transmits transmission information to a predetermined server in the case where the proximity wireless communication is performed, the transmission information including the appliance information obtained by the proximity wireless communication and the obtained position information.

For example, "when the proximity wireless communication is performed" means that the proximity wireless communication is performed where the installation position of the appliance (apparatus, device) is the same position as the position of the mobile communication device.

Here, "the same position" includes an instance where the installation position of the appliance can be regarded as the same position as the position of the mobile communication device.

Note that the proximity wireless communication mentioned above is, for example, communication according to Near Field Communication (NFC) when a touching operation of a card for electronic money is performed upon electronic money payment and the like.

For instance, NFC is performed within a distance of several centimeters (e.g. within 2 centimeters or 3 centimeters) upon a touching operation.

Hence, "the same position" mentioned above means, for example, that the installation position of the appliance is within several centimeters from the position of the mobile communication device.

A communication device according to the present invention is, for example, a mobile communication device that reads terminal device information from a terminal device (apparatus, appliance) by proximity wireless communication, and transmits the terminal device information to a server via a general-purpose network, the mobile communication device including: a terminal device information obtainment unit that obtains the terminal device information from the terminal device by the proximity wireless communication, the terminal device information including at least terminal device identification information for identifying manufacturing information of the terminal device; a communication device information storage unit that stores communication device information including at least communication device identification information for identifying manufacturing information of the communication device; an information adding unit that adds the stored communication device information to the obtained terminal device information, to generate transmission information to be transmitted to the server; and a communication unit that transmits the generated transmission information to the server via the general-purpose network, wherein the communication unit specifies the server based on the terminal device information obtained from the terminal device, and communicates with the specified server.

Moreover, the mobile communication device may include: a proximity wireless communication device; and a wired/wireless communication device constituting a home network, wherein a home ID for uniquely identifying a home is added to the terminal device information received by the proximity wireless communication device, and the terminal device information to which the home ID is added is transmitted to the server using the home network communication device. Furthermore, given that two home appliances are adjacent to each other during the proximity wireless communication, position information immediately after the proximity wireless communication is performed with a device, such as a mobile phone, provided with a GPS device or an acceleration sensor may be transmitted to the server as position information of a corresponding home appliance.

Advantageous Effects of Invention

The mobile communication device according to the present invention enables the user to complete setting necessary for a home network, without a complex operation.

The transmission information can be transmitted by a simple operation such as merely touching the mobile communication device to the installed appliance.

The device used here is a mobile communication device such as a mobile phone, with there being no need to add a new structure for proximity wireless communication. This contributes to a lower cost.

In addition, the device used here is a mobile communication device, with there being no need to add a new structure for obtainment of position information. This contributes to a sufficiently lower cost. That is, an extent of cost reduction can be increased.

For instance, there is no need to add a GPS device (new structure) to the installed appliance.

A very complex operation required to perform suitable wireless communication, such as an operation of wireless communication power setting, becomes unnecessary, as a simple operation such as a touching operation is sufficient. Thus, a significantly simplified operation can be realized.

BRIEF DESCRIPTION OF DRAWINGS

FIG. 25 presents an example of description of the operation program for downloading image and executing slide show.

FIG. 43 is a flowchart of operation steps of a RF-ID unit in the camera according to Embodiment A2.

FIG. 44 is a block diagram of a TV according to Embodiment A2.

FIG. 47 presents a data format of the RF-ID communication between the camera and the TV.

FIG. 57 is a table of a data structure of a customer attribute database.

FIG. 58 is a table of a data structure of an electronic catalog database.

FIG. 80 is a diagram illustrating a structure of pieces of setting information registered in the server.

FIG. 84 is a diagram illustrating a structure of apparatus operation information registered in the RF-ID card used in the recorder.

FIG. 85 is a diagram illustrating a structure of apparatus operation information registered in the RF-ID card used in a vehicle navigation device.

FIG. 108 is a schematic diagram illustrating a recording format of a memory accessible from a UHF-RFID tag M005.

FIG. 113 is a flowchart (second half) of the procedure of moving video to the display of the mirror.

FIG. 114 is a diagram of a network environment in home ID registration.

FIG. 115 is a hardware diagram of the communication device in the home ID registration.

FIG. 116 is a functional block diagram of the communication device in the home ID registration.

FIG. 117 is a flowchart of the home ID registration.

FIG. 118 is a flowchart of home ID obtainment.

FIG. 119 is a sequence diagram of the home ID registration.

FIG. 120 is a functional block diagram of communication devices in home ID sharing.

FIG. 121 is a flowchart of processing performed by a receiving communication device in the home ID sharing (using proximity wireless communication).

FIG. 122 is a flowchart of processing performed by a transmitting communication device in the home ID sharing (using proximity wireless communication).

FIG. 123 is a sequence diagram of the home ID sharing (using proximity wireless communication).

FIG. 124 is a flowchart of processing performed by the receiving communication device in the home ID sharing (using a home network device).

FIG. 125 is a flowchart of processing performed by the transmitting communication device in the home ID sharing (using the home network device).

Figure 126:
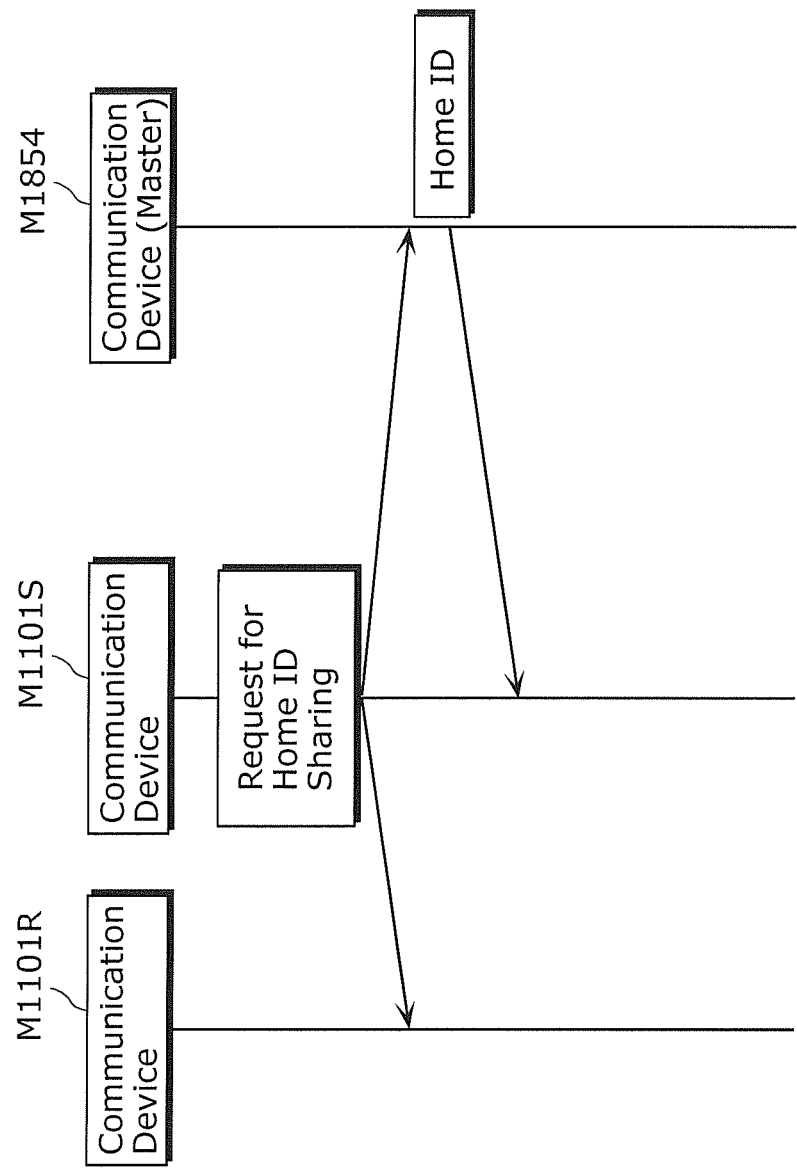

FIG. 126 is a sequence diagram of the home ID sharing (using the home network device).

Figure 127:
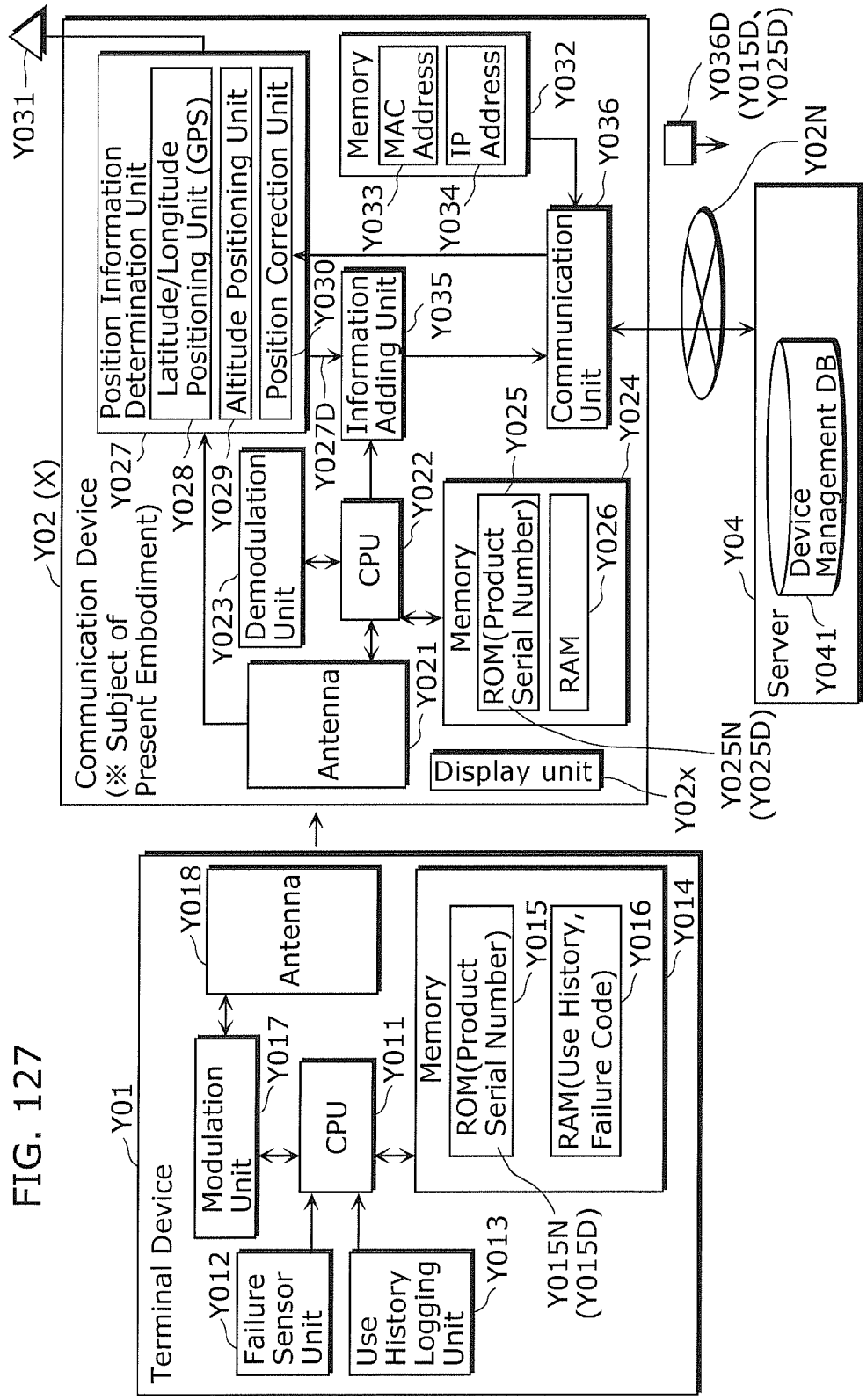

FIG. 127 is a block diagram of a device management system according to Embodiment B3.

Figure 128:
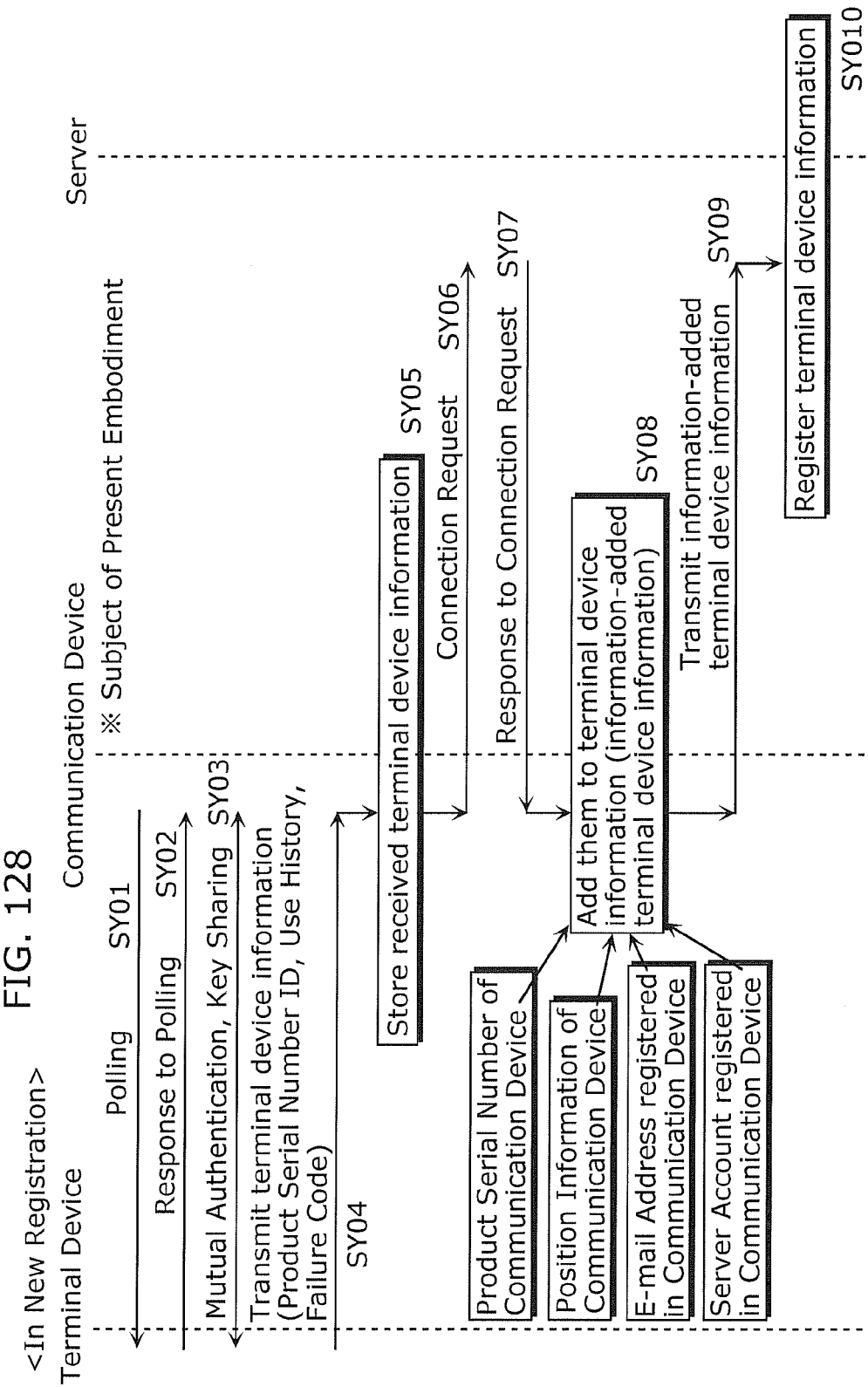

FIG. 128 is a sequence diagram of the device management system according to Embodiment B3.

Figure 129:
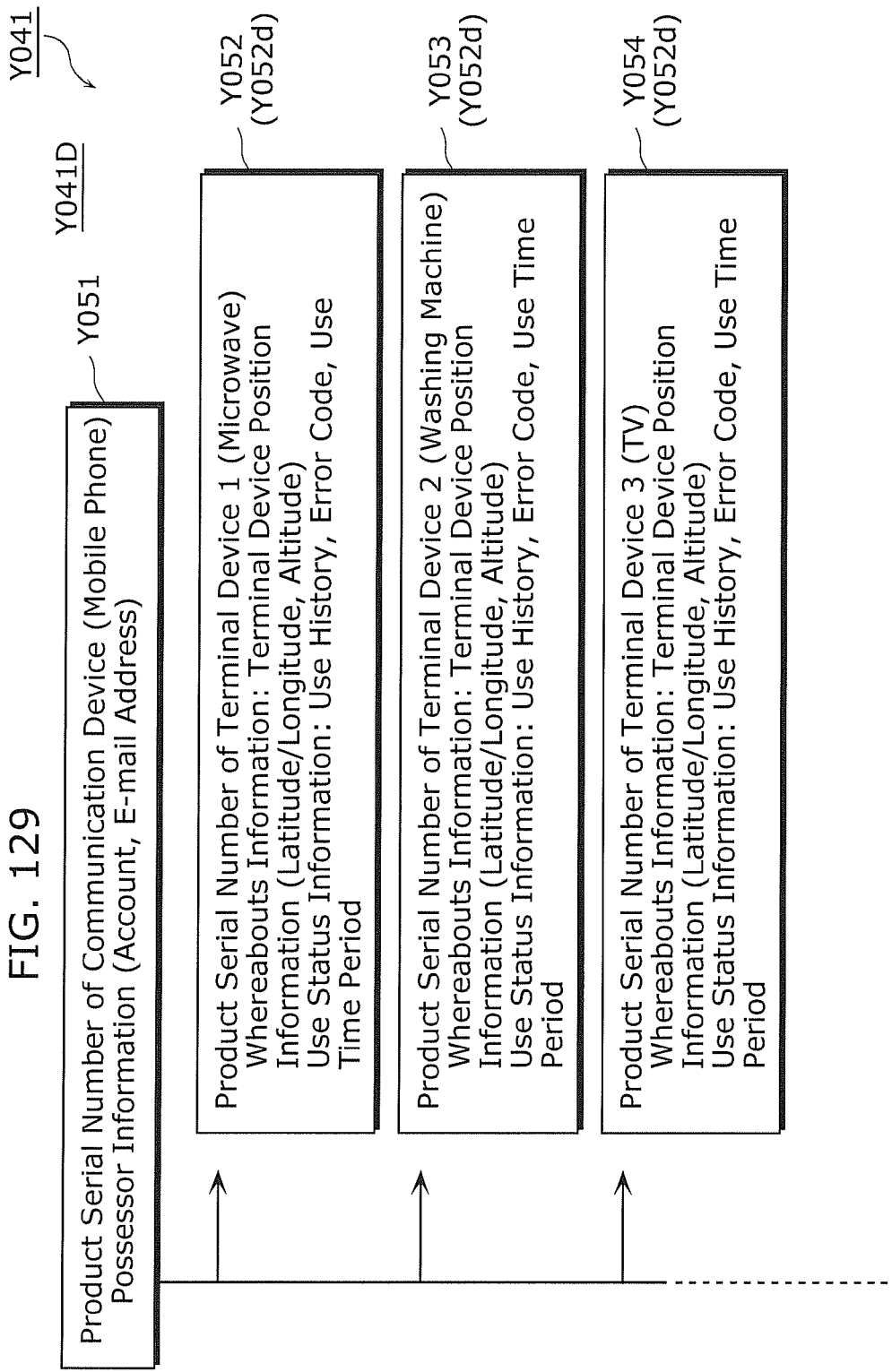

FIG. 129 is a schematic diagram of a structure of a device management database according to Embodiment B3.

Figure 130:
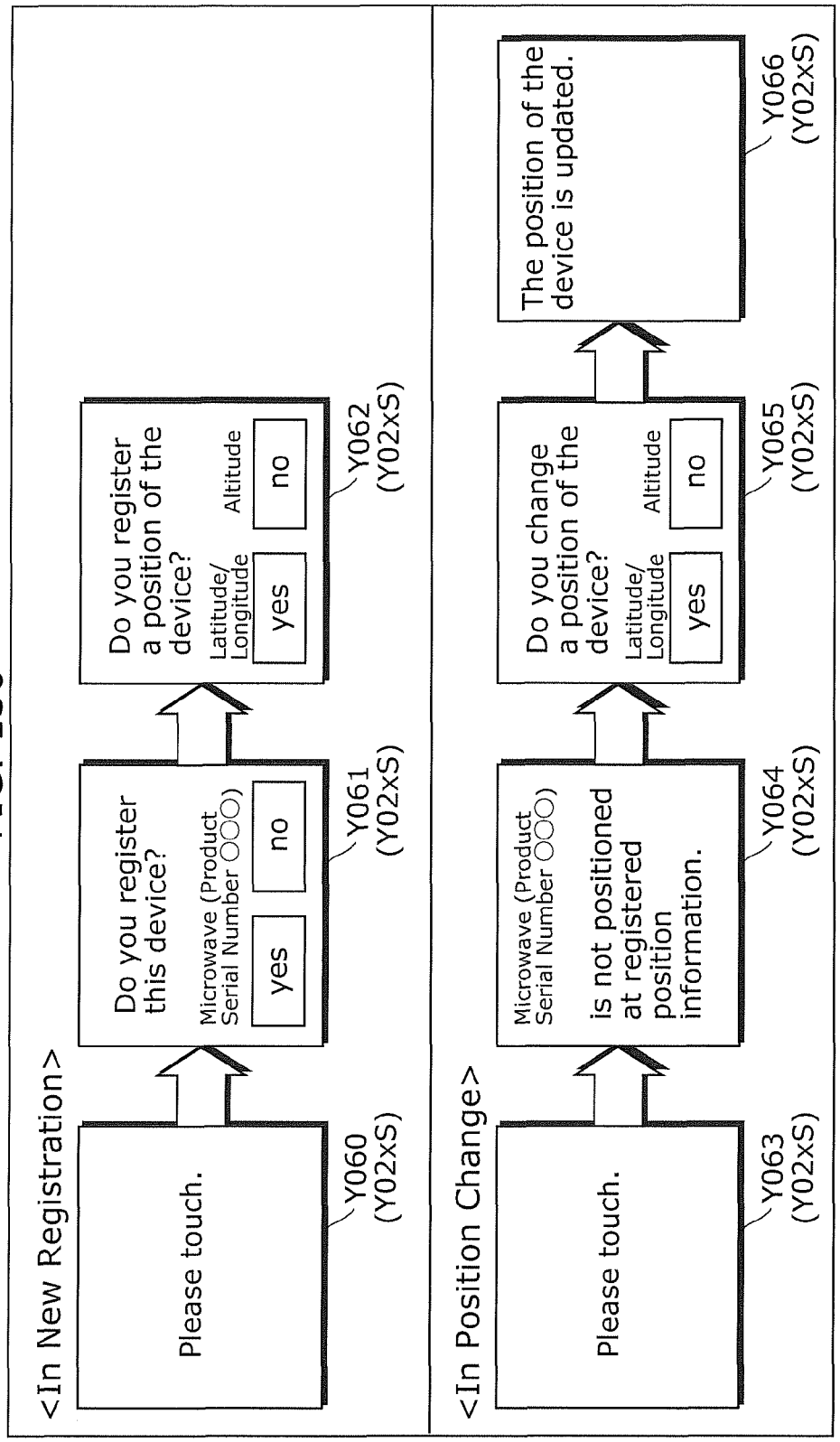

FIG. 130 is a schematic diagram of display of the device management system according to Embodiment B3.

Figure 131:
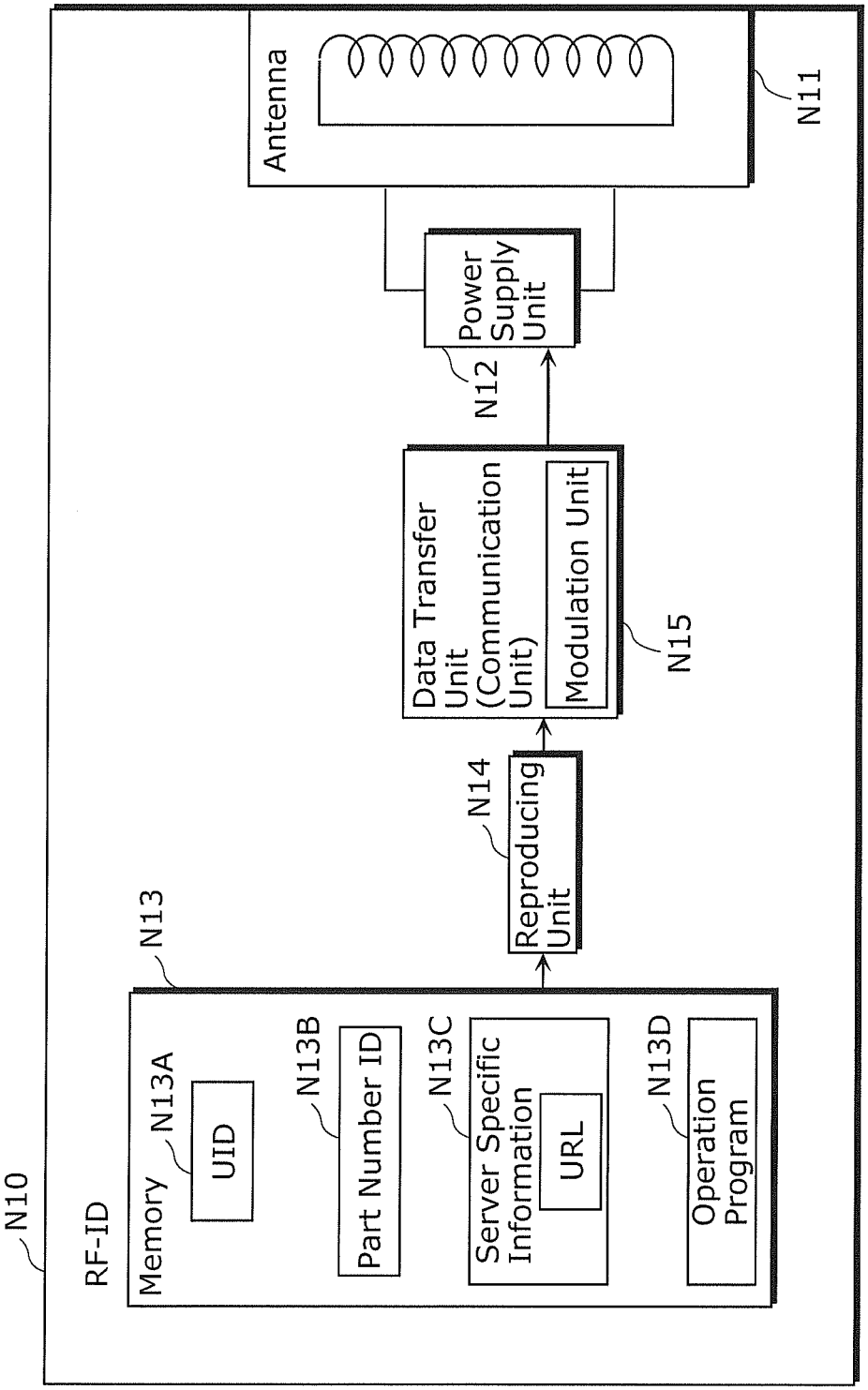

FIG. 131 is a functional block diagram of a RF-ID unit N10 according to Embodiment B4.

Figure 132:
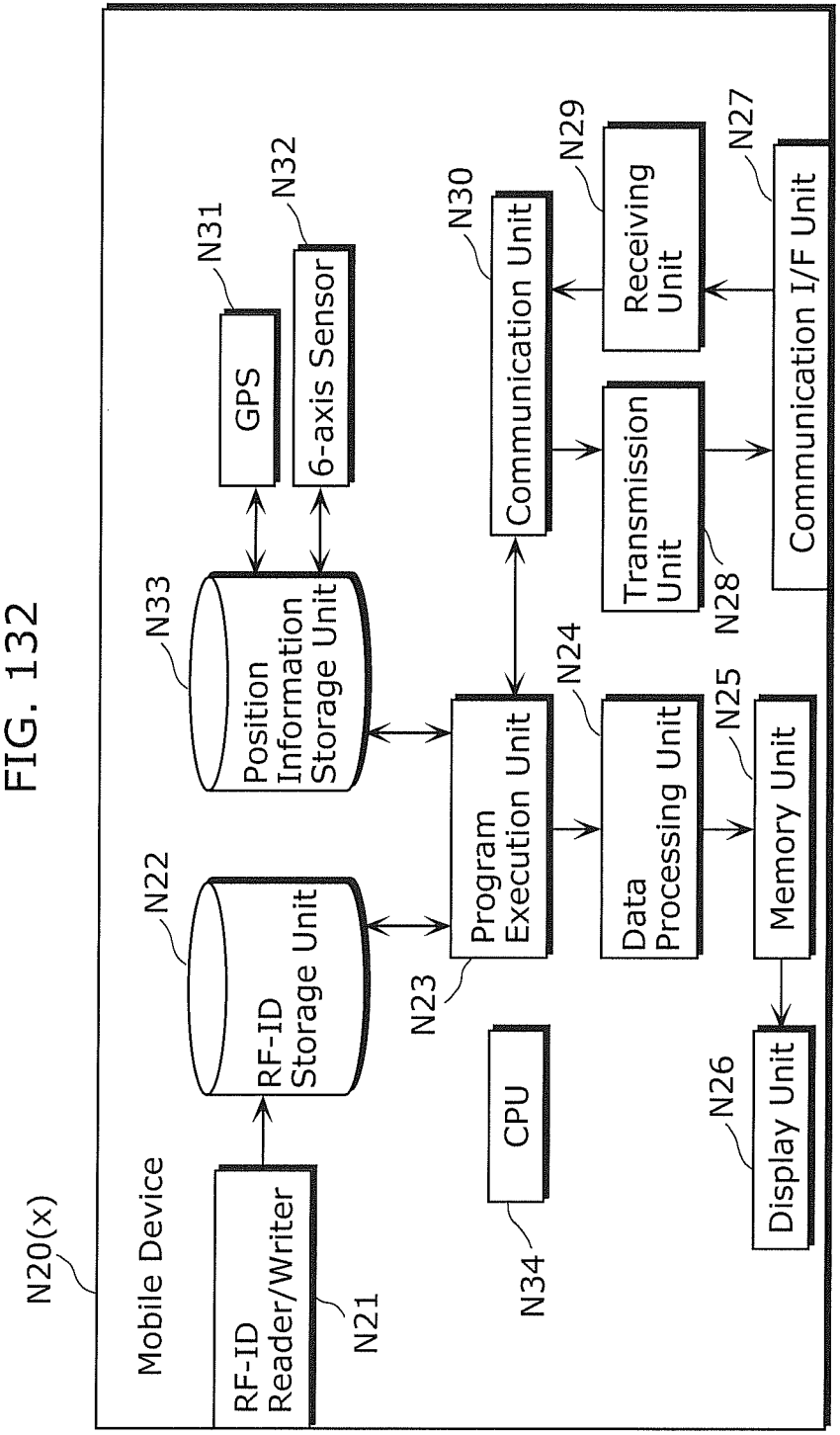

FIG. 132 is a functional block diagram of a mobile device N20 according to Embodiment B4.

Figure 133:
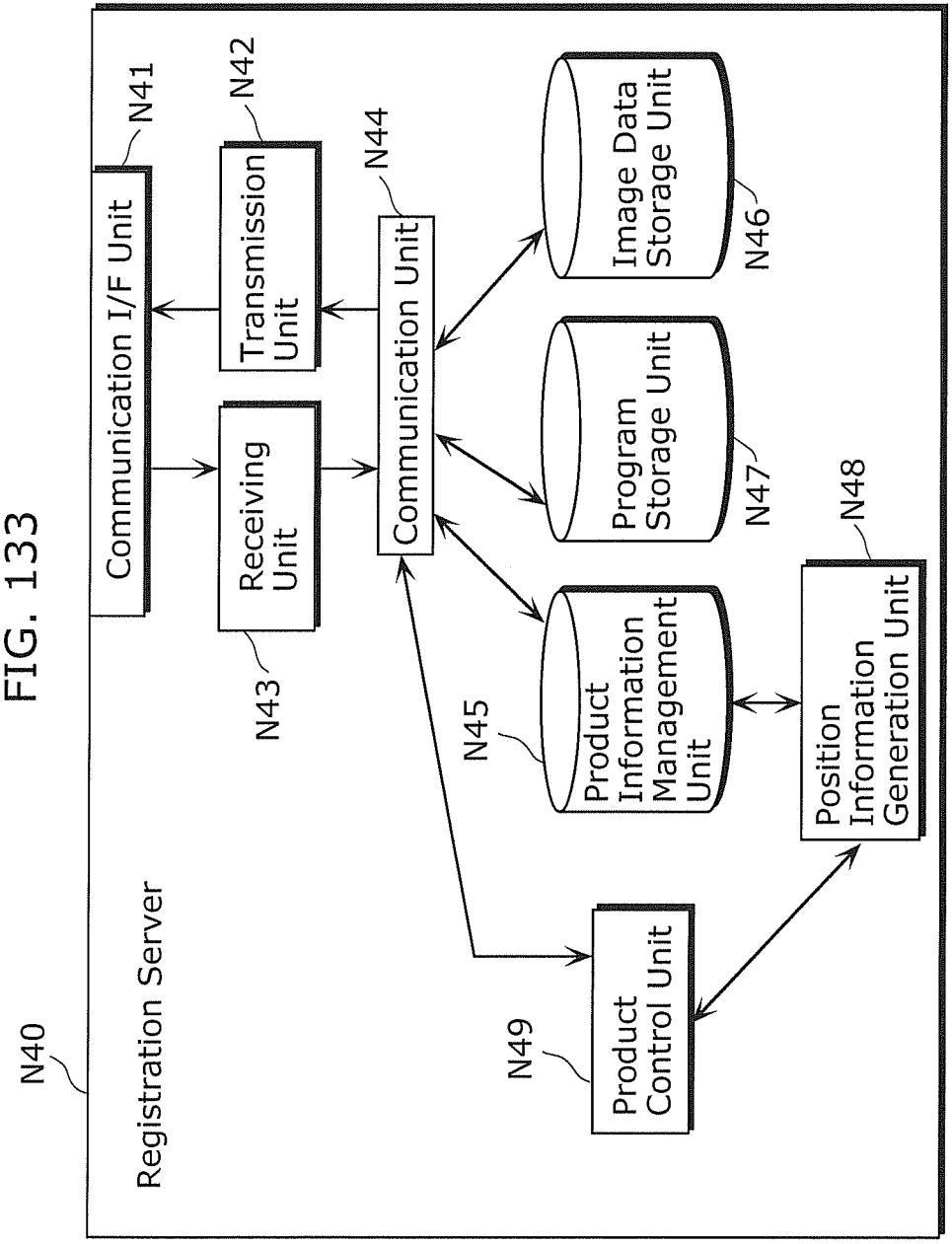

FIG. 133 is a functional block diagram of a registration server N40 according to Embodiment B4.

Figure 134:
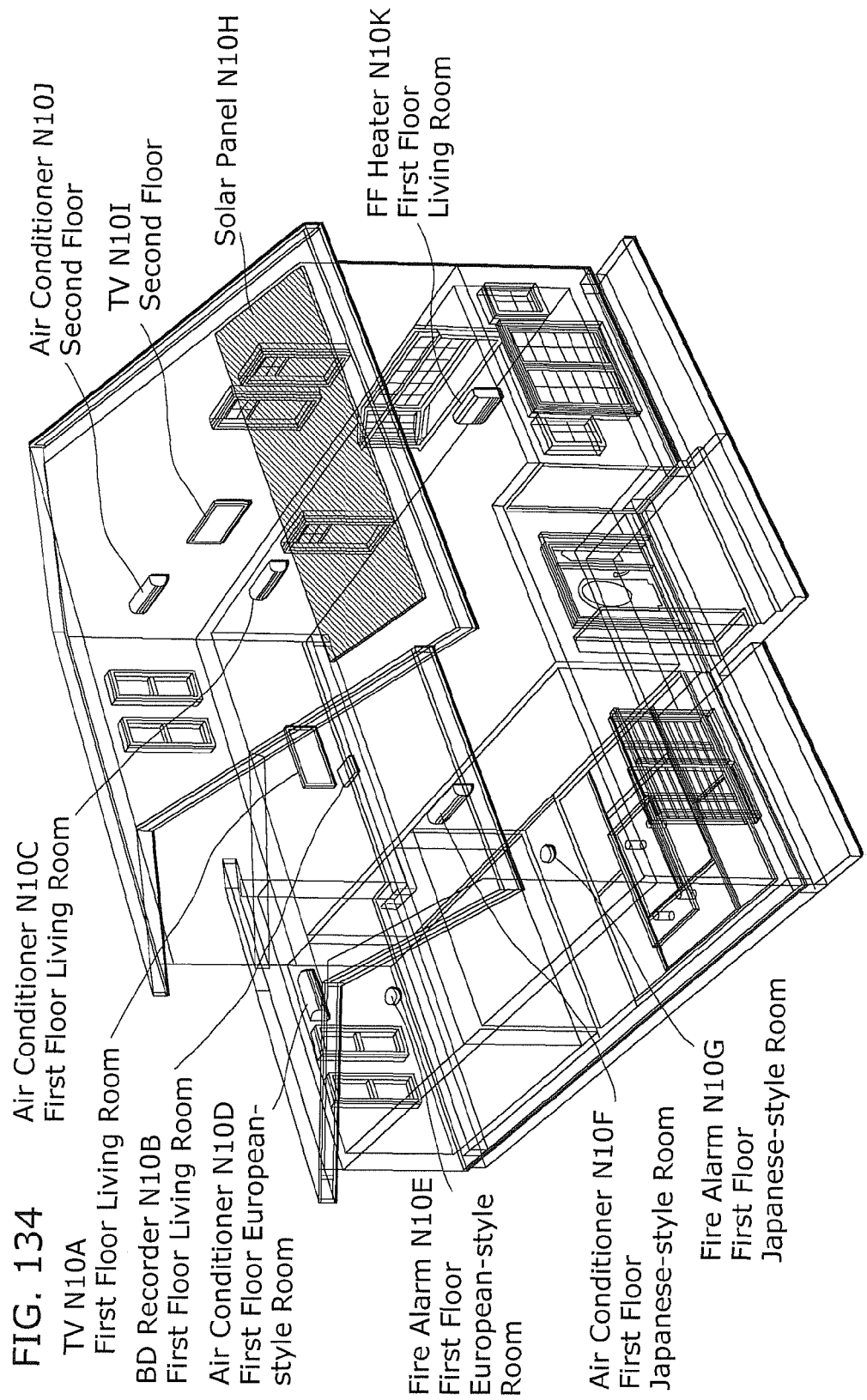

FIG. 134 is a diagram illustrating an example of an arrangement of networked products according to Embodiment B4.

Figure 135:
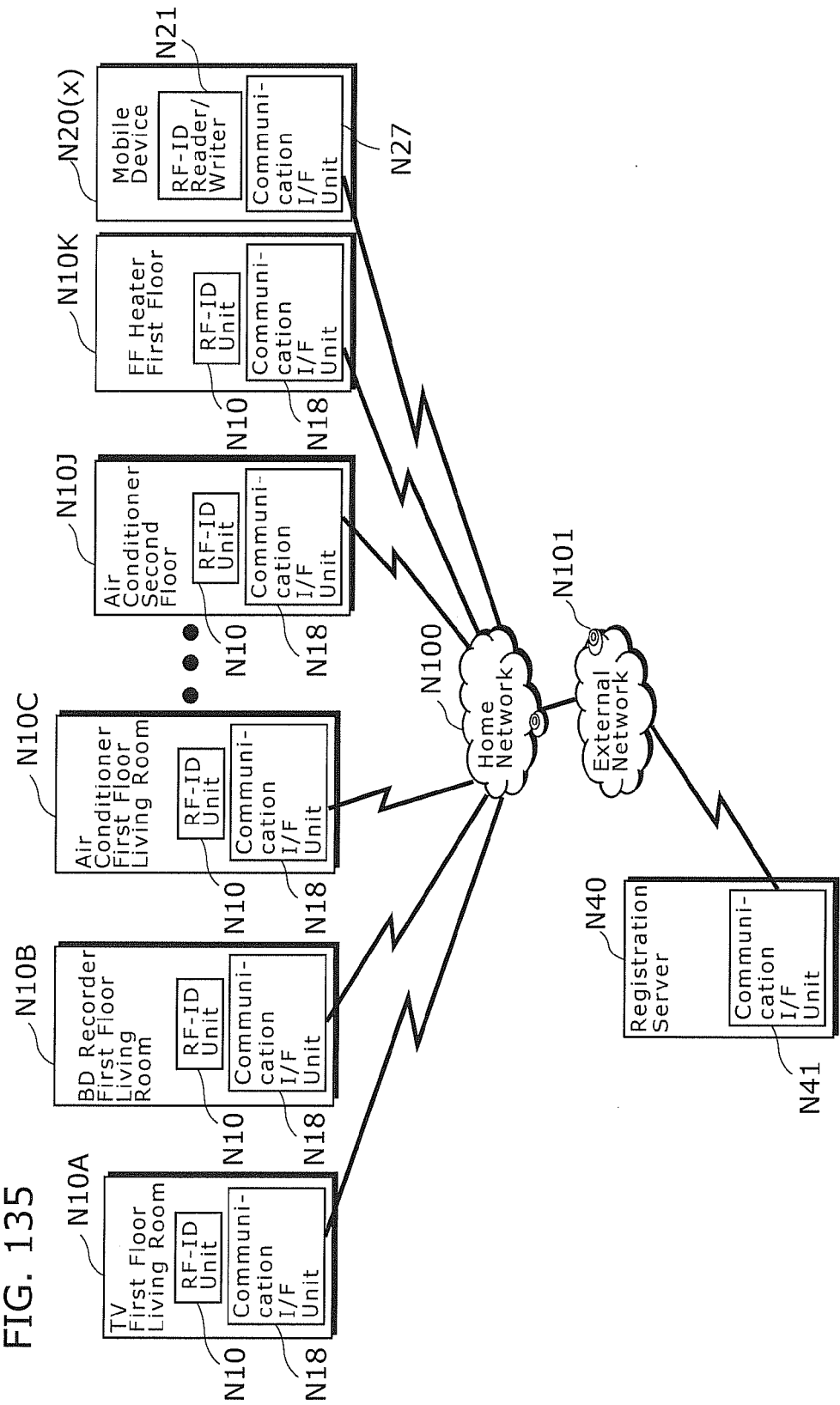

FIG. 135 is a diagram illustrating an example of a system according to Embodiment B4.

Figure 136:
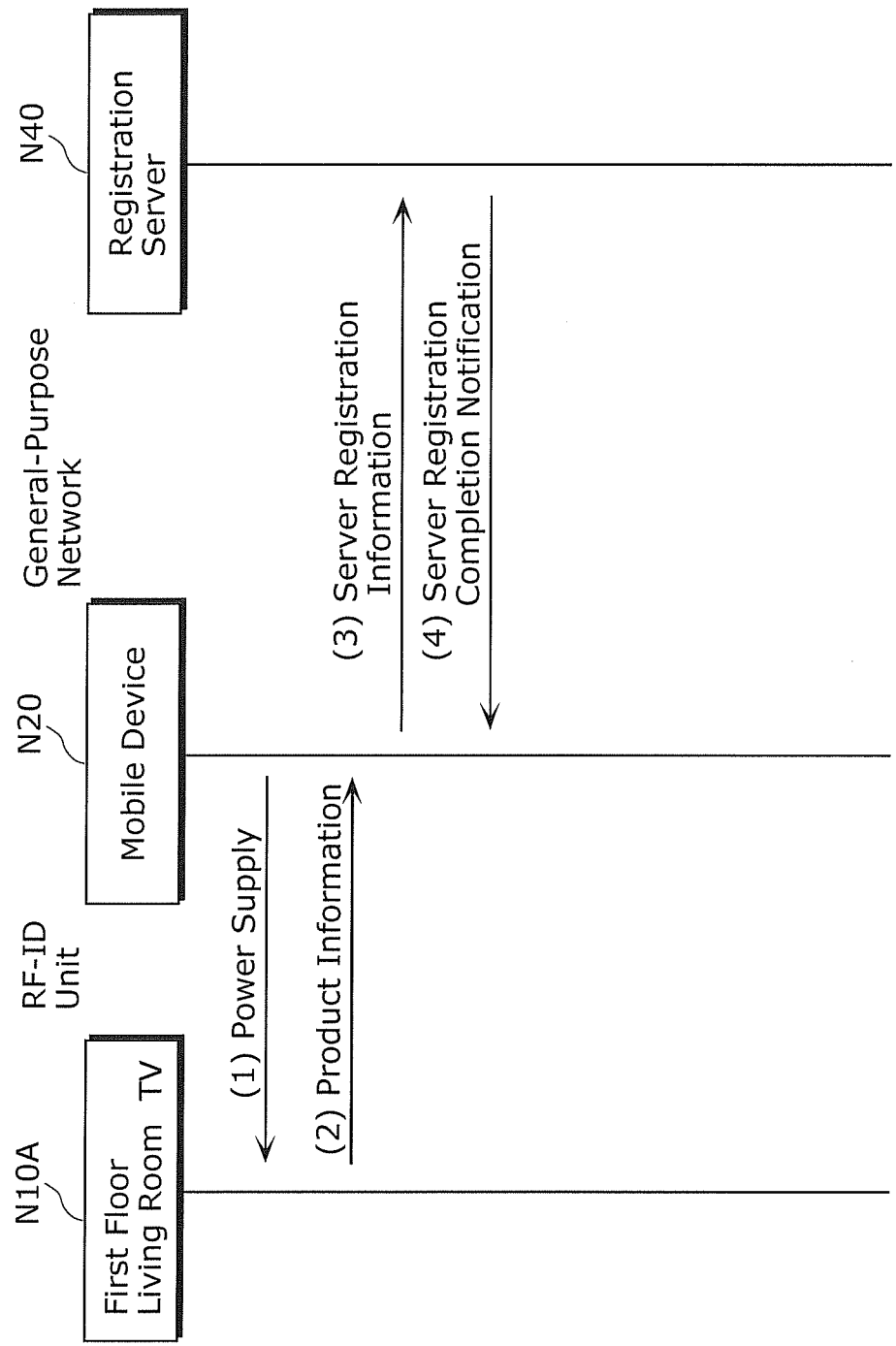

FIG. 136 is a sequence diagram for registering information of a TV N10A into a registration server N40, according to Embodiment B4.

Figure 137:
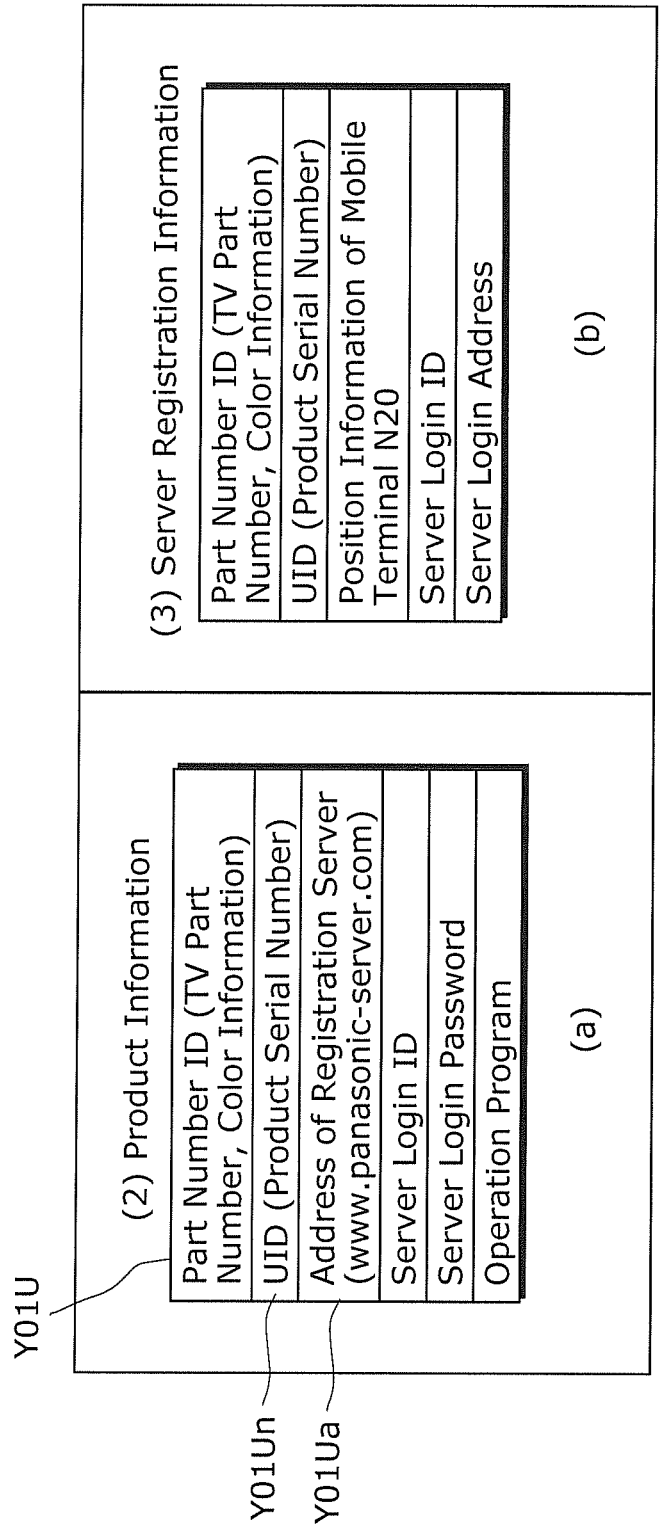

FIG. 137 is a table illustrating an example of a structure of product information and server registration information according to Embodiment B4.

FIG. 138 is a table illustrating an example of a structure of product information stored in a product information management unit N45 according to Embodiment B4.

Figure 139:
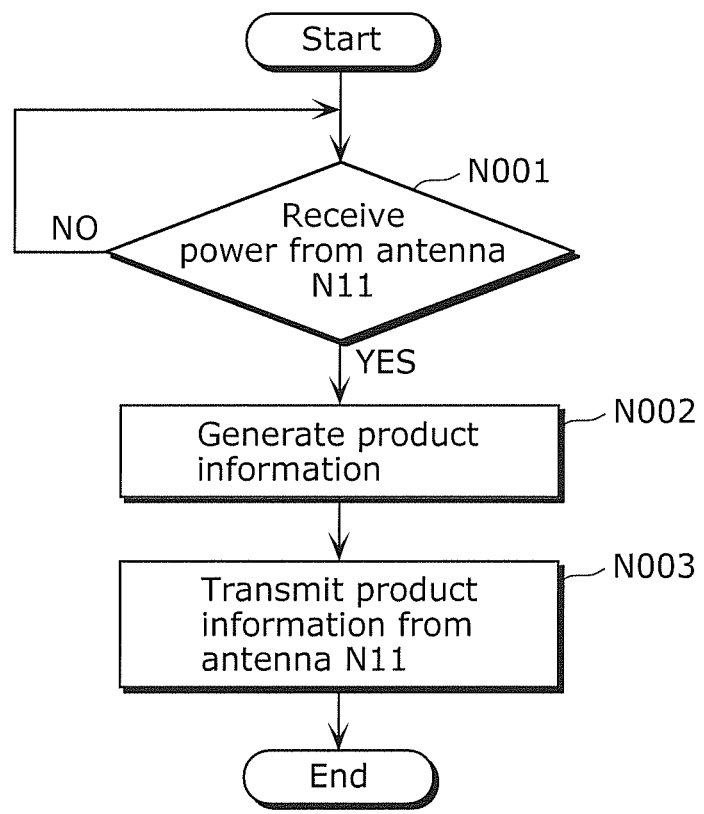

FIG. 139 is a flowchart illustrating an example of processing performed by a RF-ID unit N10 to perform product registration according to Embodiment B4.

Figure 140:
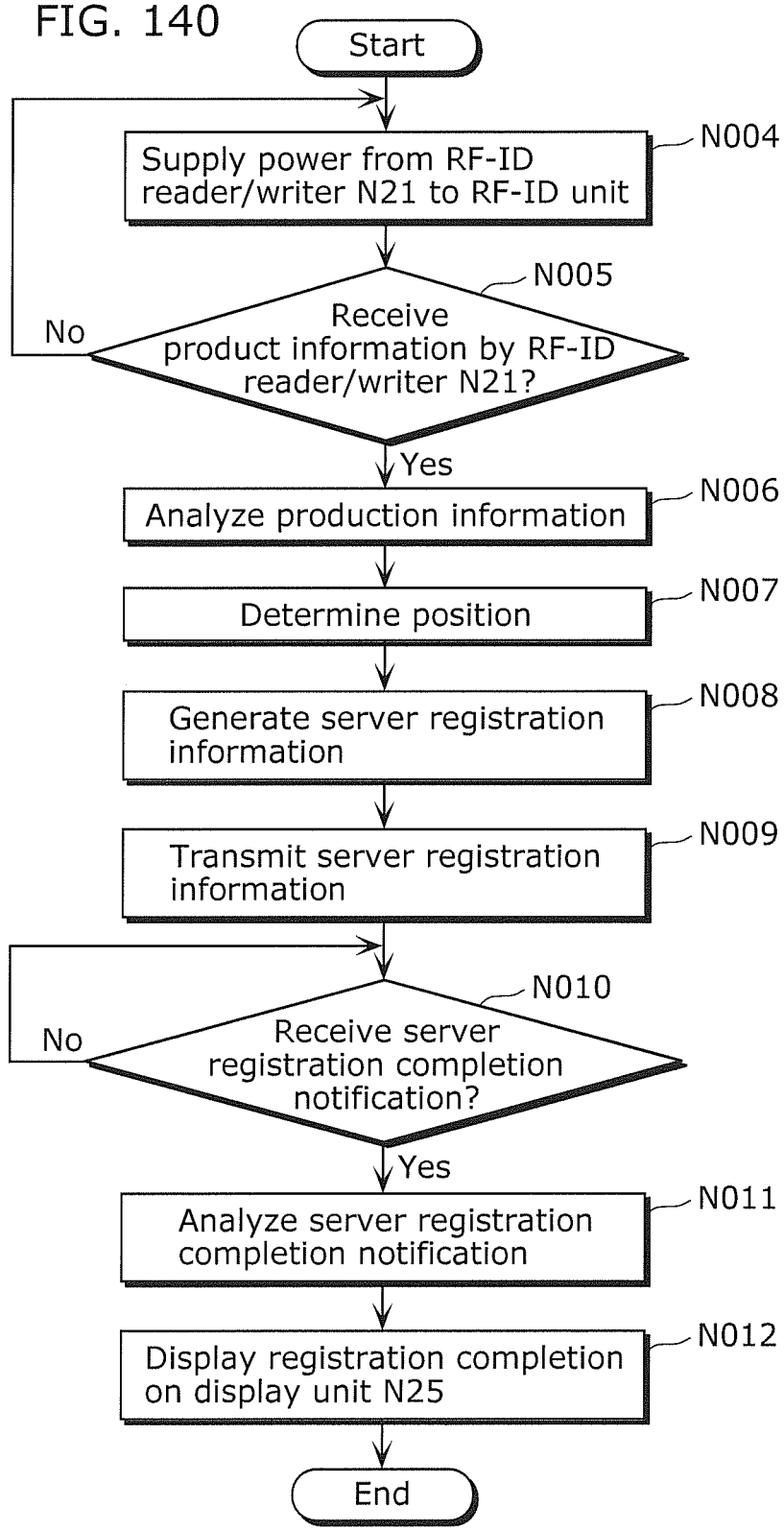

FIG. 140 is a flowchart illustrating an example of processing performed by a mobile device N20 to perform product registration according to Embodiment B4.

Figure 141:
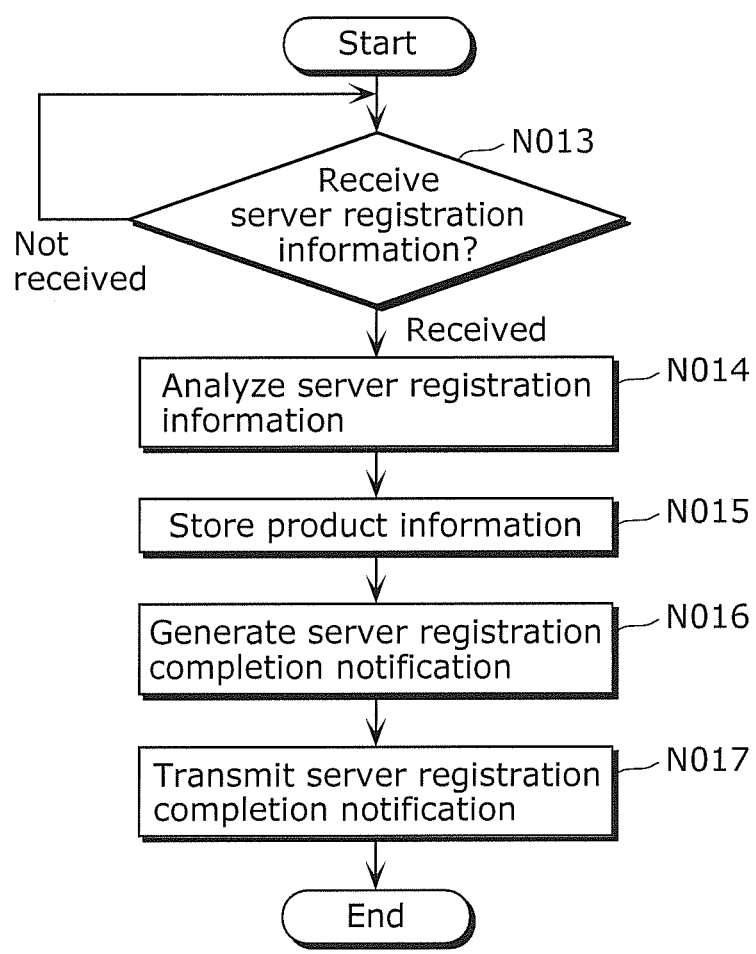

FIG. 141 is a flowchart illustrating an example of processing performed by a registration server N40 to perform product registration according to Embodiment B4.

Figure 142:
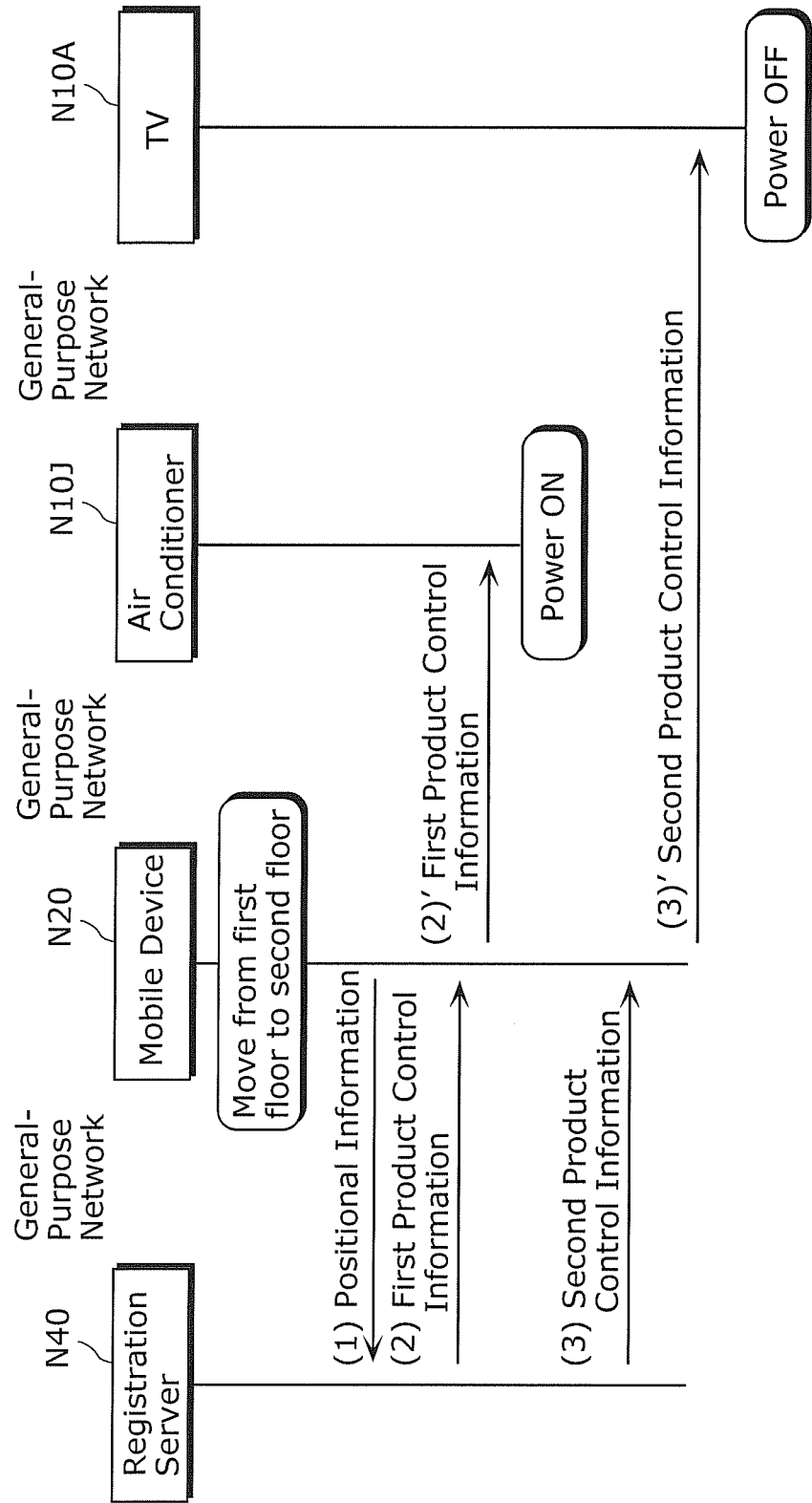

FIG. 142 is a sequence diagram illustrating an example of controlling power for an air conditioner N10J and a TV N10A according to Embodiment B4.

FIG. 143 is a table illustrating an example of a structure of positional information and product control information according to Embodiment B4.

FIG. 144 is a diagram illustrating a product map generated by a position information generation unit N48 according to Embodiment B4.

FIG. 145 is a table illustrating an example of a structure of product information stored in the product information management unit N45 according to Embodiment B4.

Figure 146:
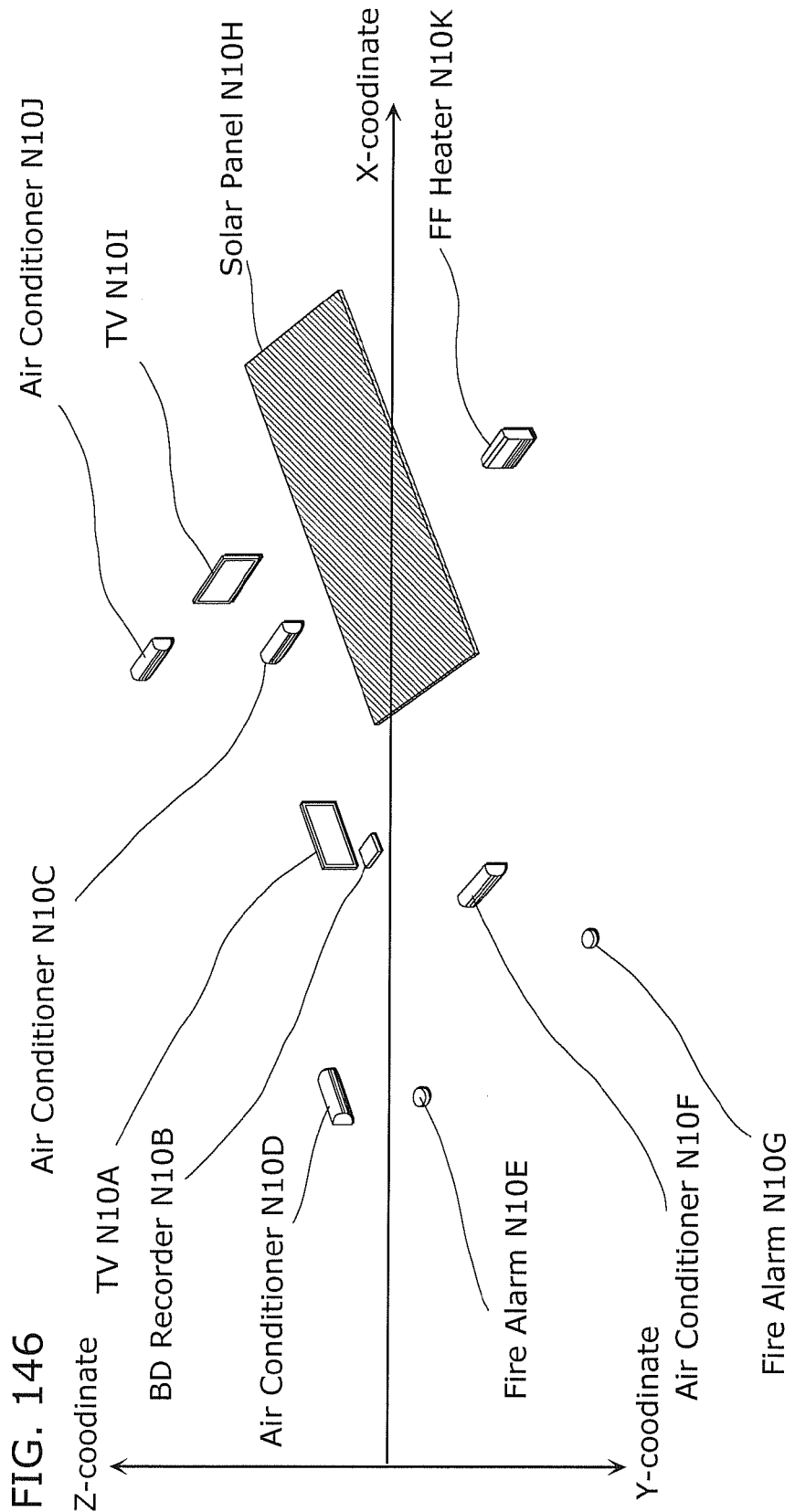

FIG. 146 is a diagram illustrating a product map generated by the position information generation unit N48 according to Embodiment B4.

FIG. 147 is a table illustrating examples of an accuracy identifier according to Embodiment B4.

Figure 148:
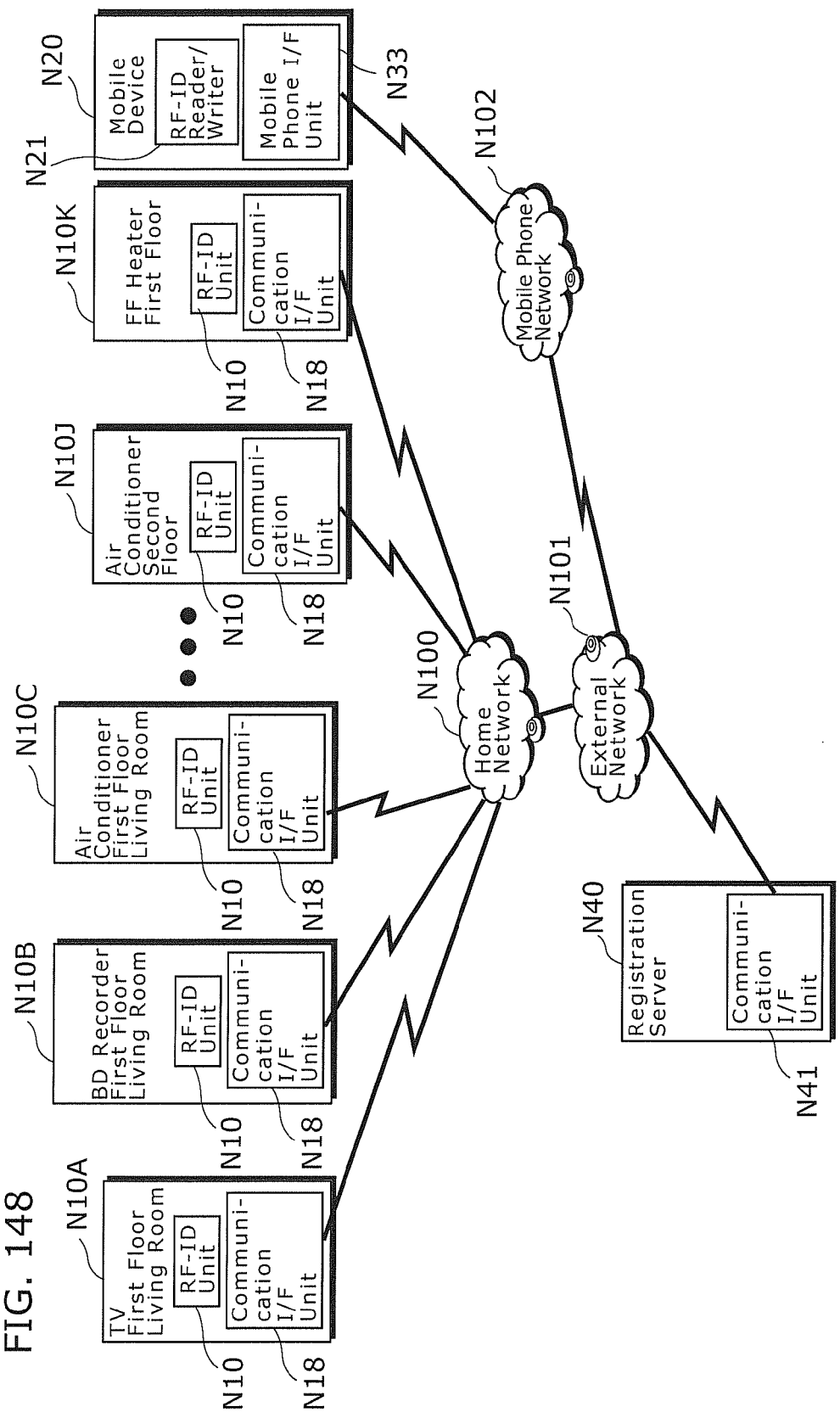

FIG. 148 is a diagram illustrating an example of a system according to Embodiment B4.

Figure 149:
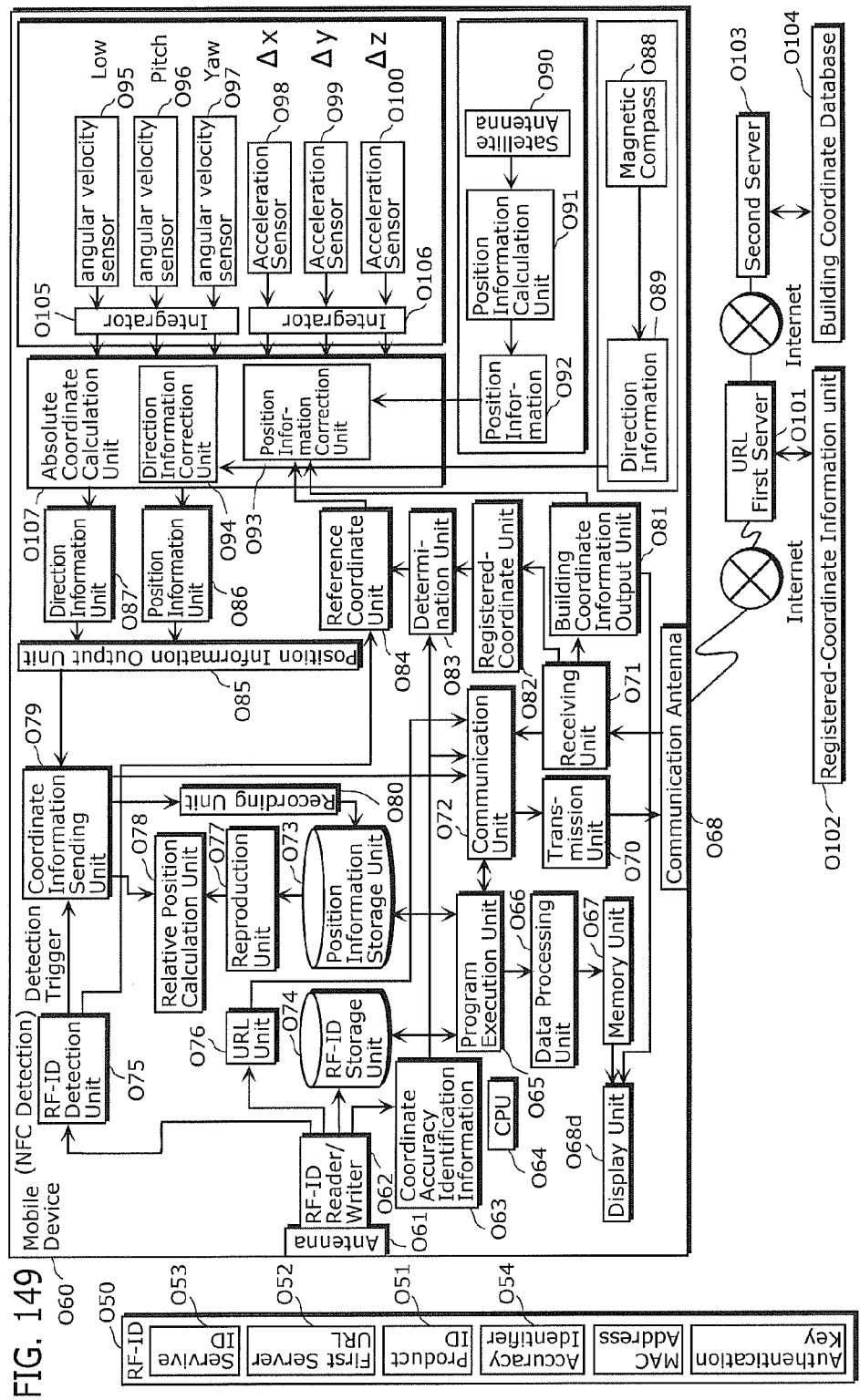

FIG. 149 is a diagram illustrating an example of an entire system according to Embodiment B5.

Figure 150:
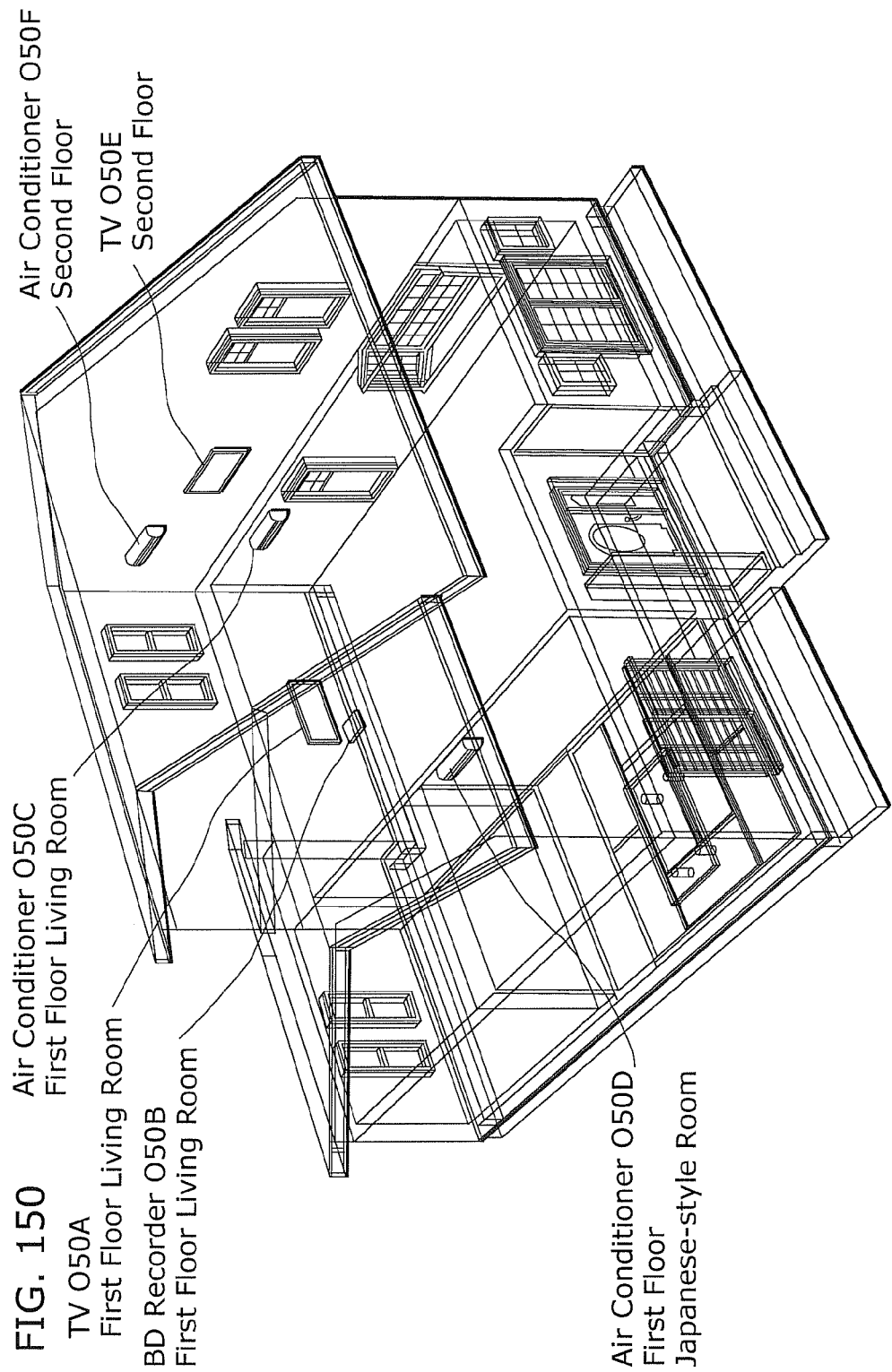

FIG. 150 is a diagram illustrating an example of an arrangement of products embedded with RF-ID units O50 according to Embodiment B5.

Figure 151:
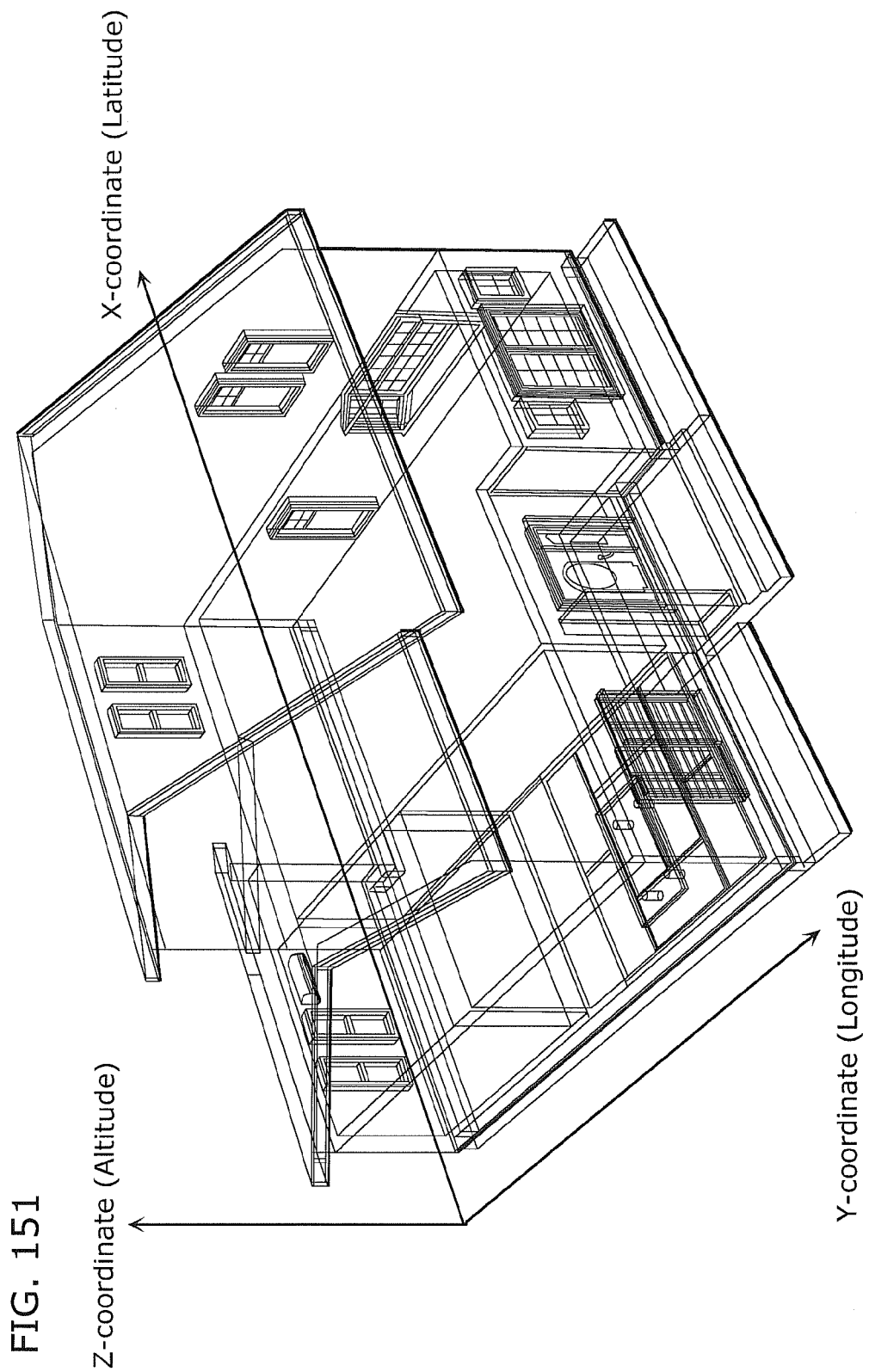

FIG. 151 is a diagram illustrating an example of a three-dimensional (3D) map of a building, which is building coordinate information extracted from a building coordinate database O104 according to Embodiment B5.

Figure 152:
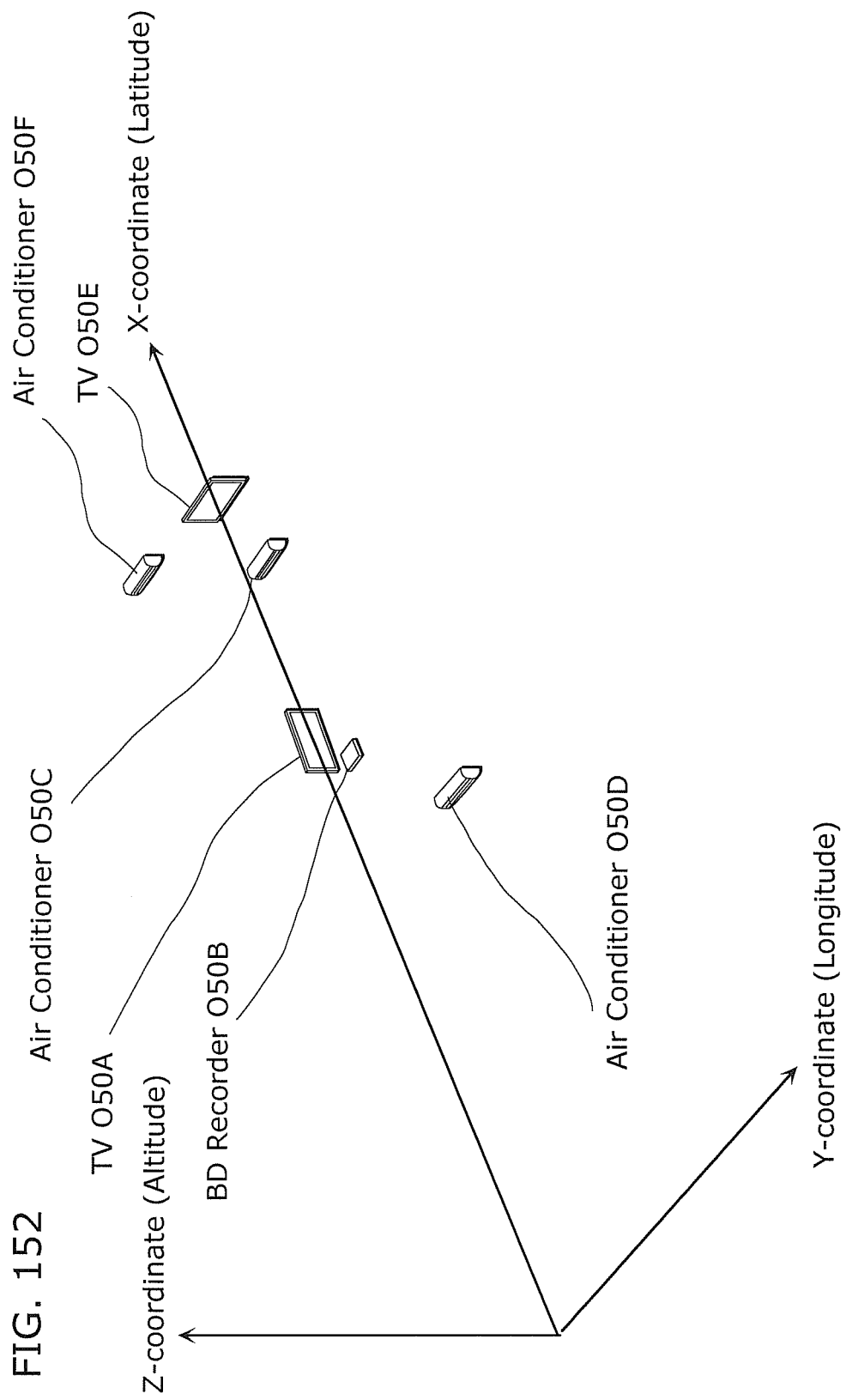

FIG. 152 is a diagram illustrating an example of image data of a 3D map of products which is generated by a program execution unit O65 according to Embodiment B5.

Figure 153:
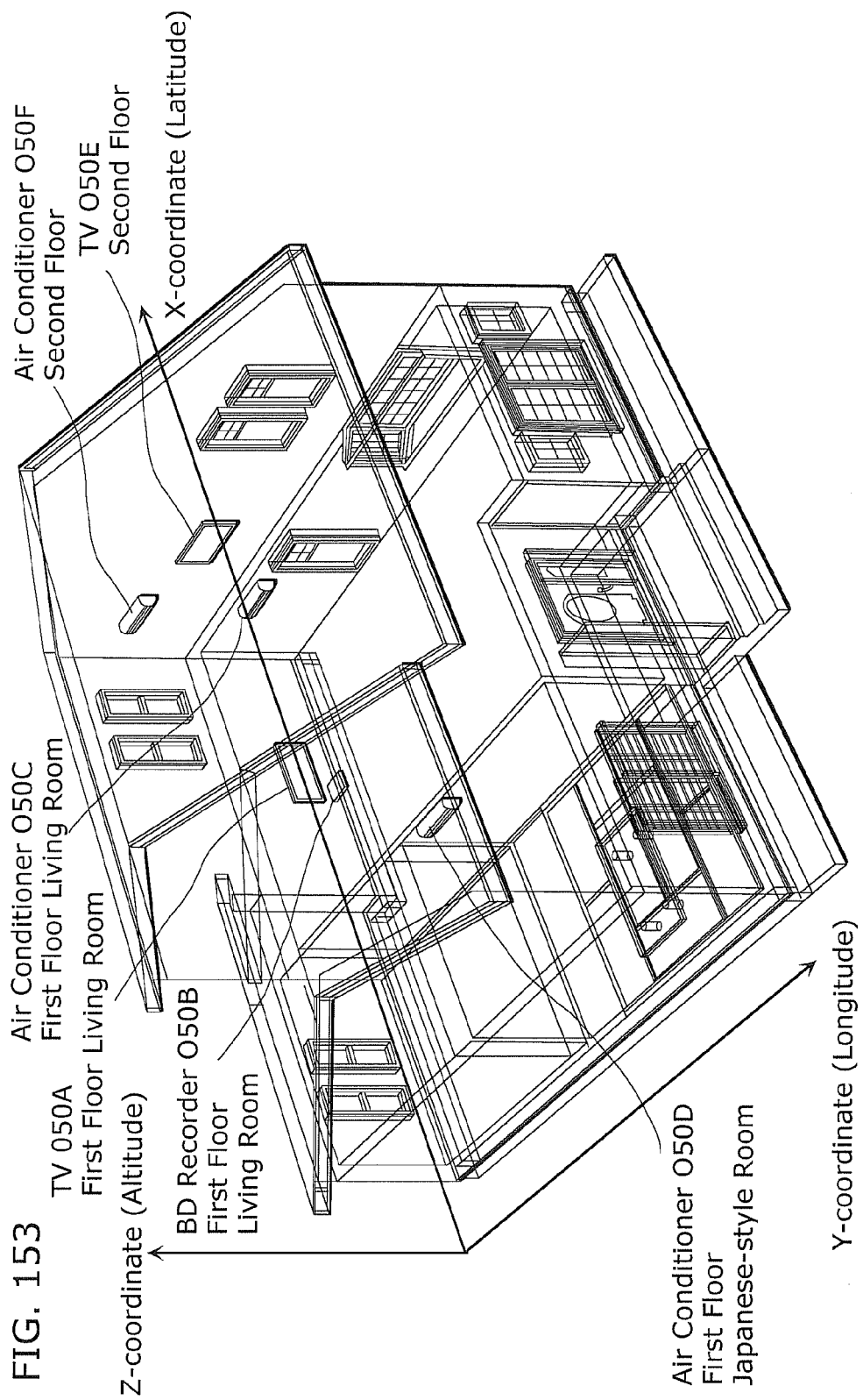

FIG. 153 is a diagram illustrating an example of a 3D product map in which image data of FIG. 151 is combined with the already-displayed image data of FIG. 152 by a display unit O68d according to Embodiment B5.

FIG. 154 is a table illustrating examples of an accuracy identifier according to Embodiment B5.

Figure 155:
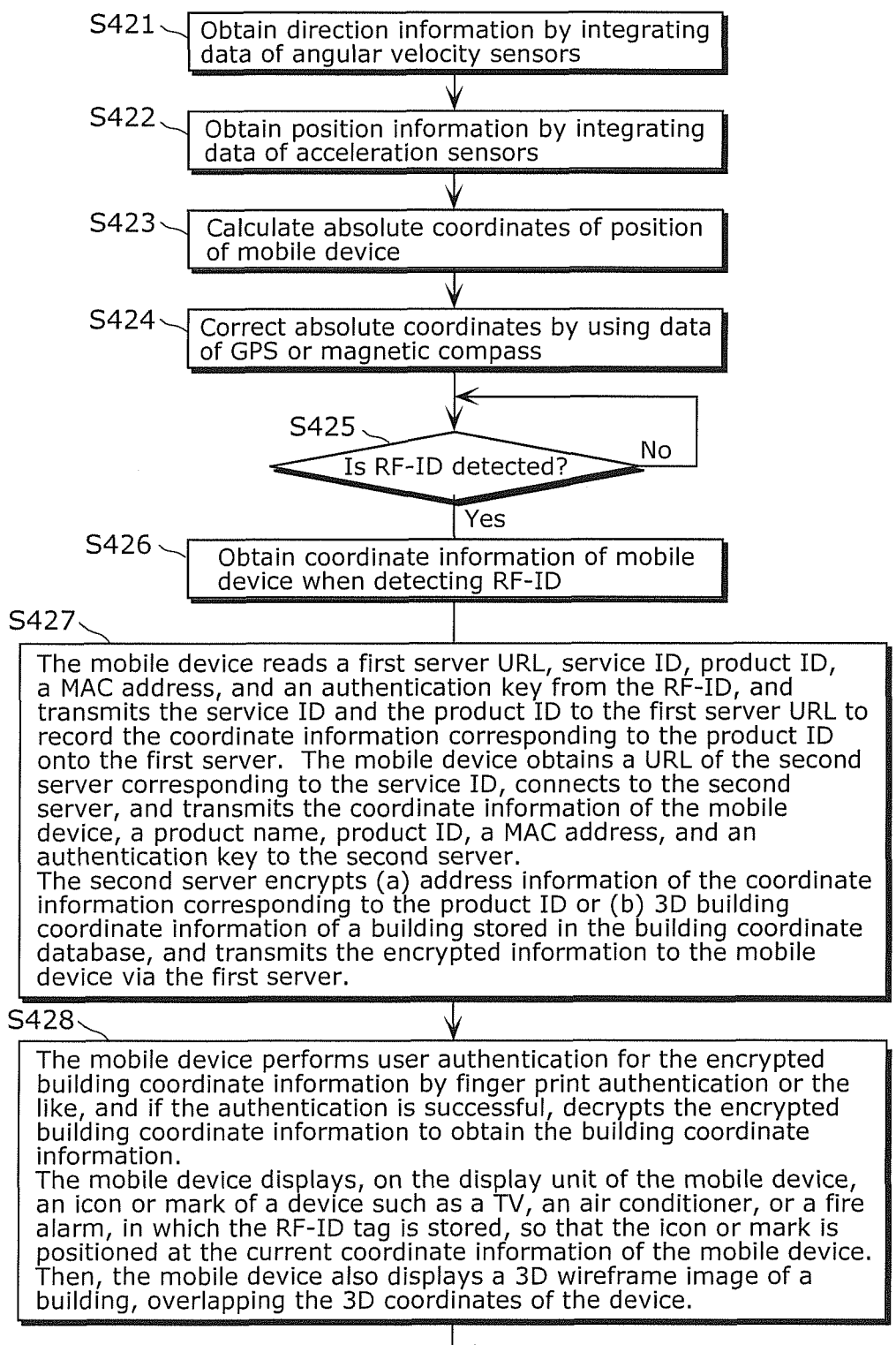

FIG. 155 is a flowchart illustrating an example of processing for the 3D map according to Embodiment B5.

FIG. 156 is a flowchart illustrating an example of processing for the 3D map according to Embodiment B5.

Figure 157:
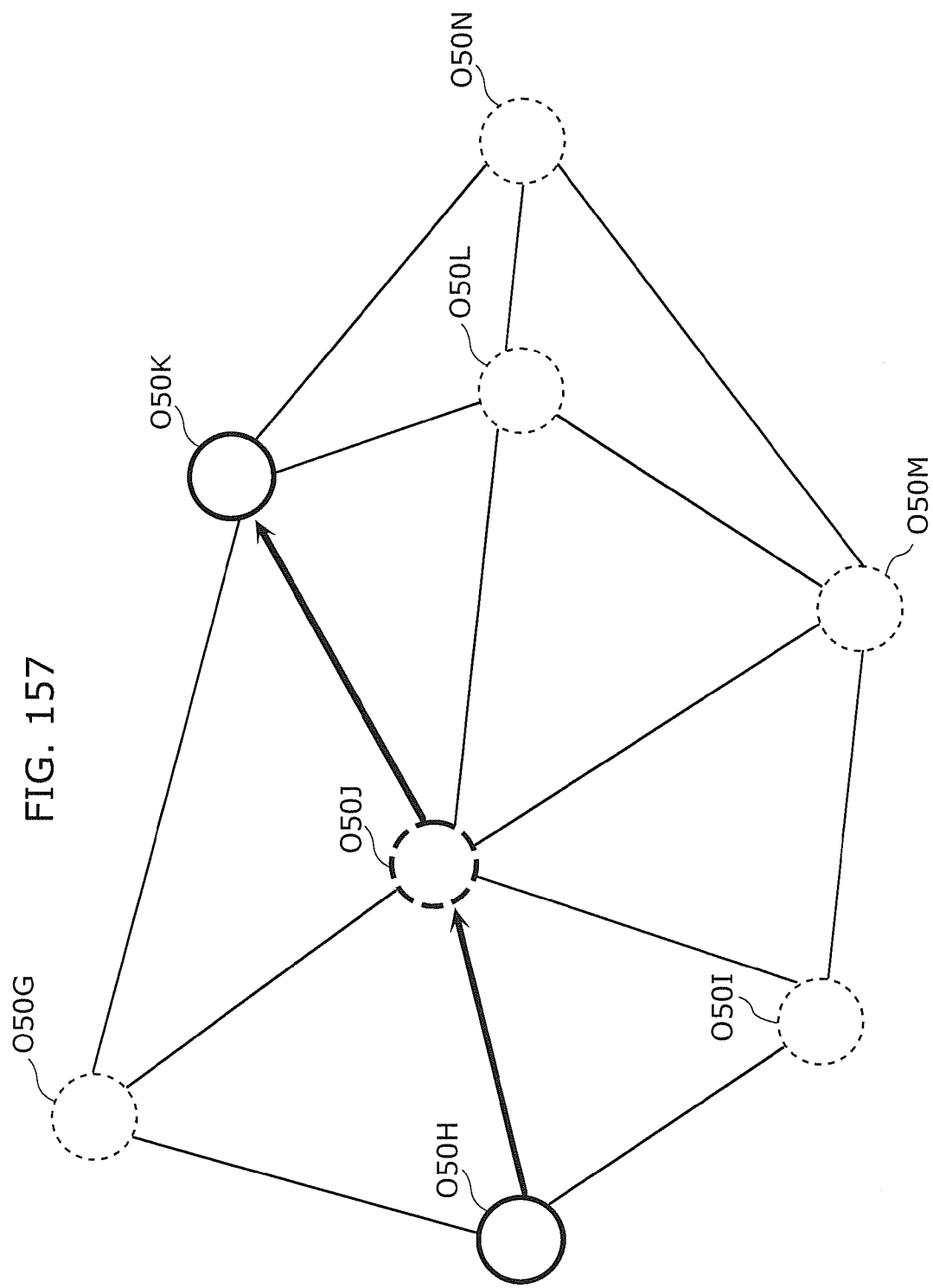

FIG. 157 is a diagram illustrating an example of a specific small power wireless communication system using the 3D map according to Embodiment B5.

Figure 158:
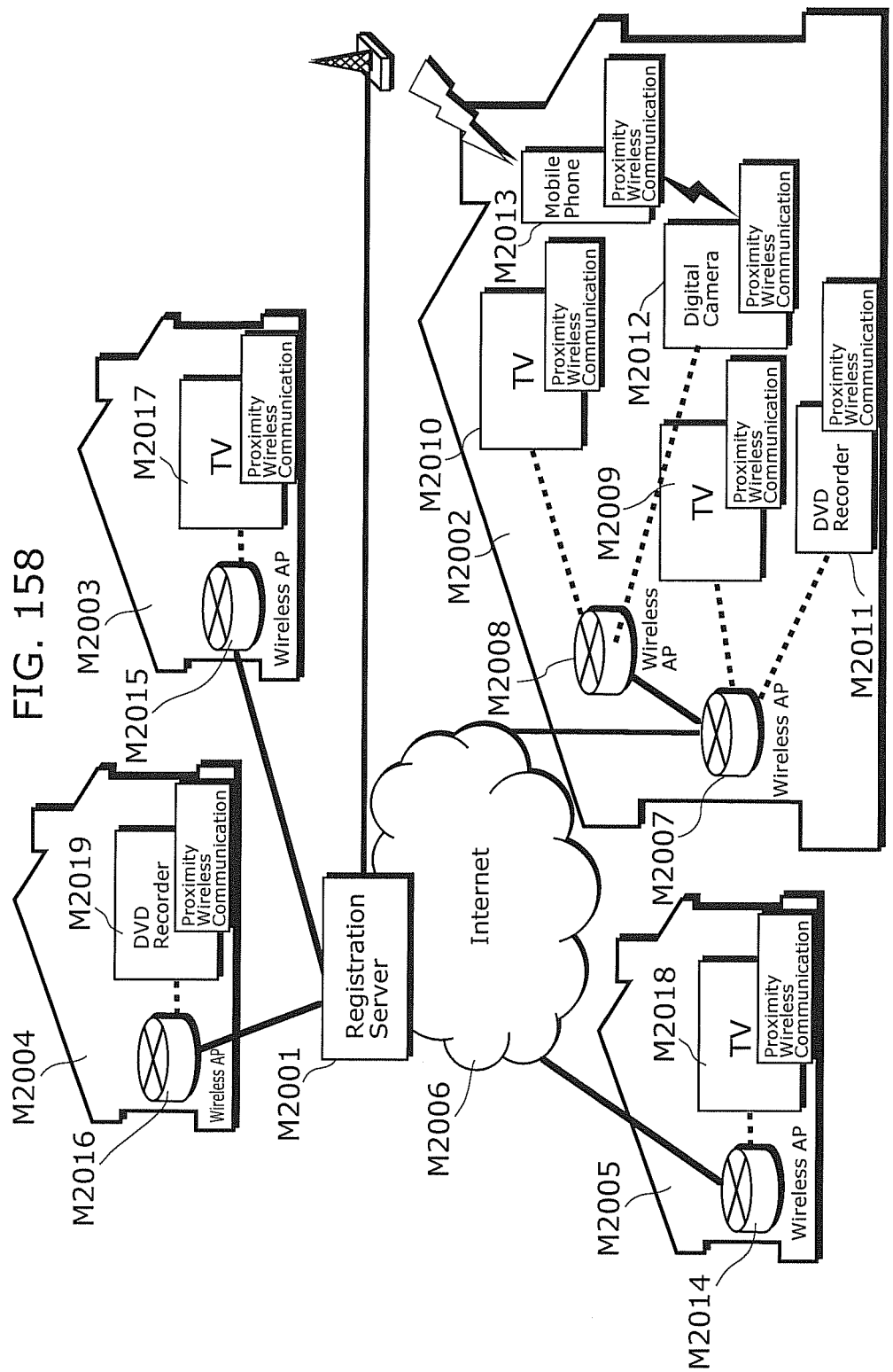

FIG. 158 is a diagram of a network environment for a wireless connection request according to Embodiment B6.

Figure 159:
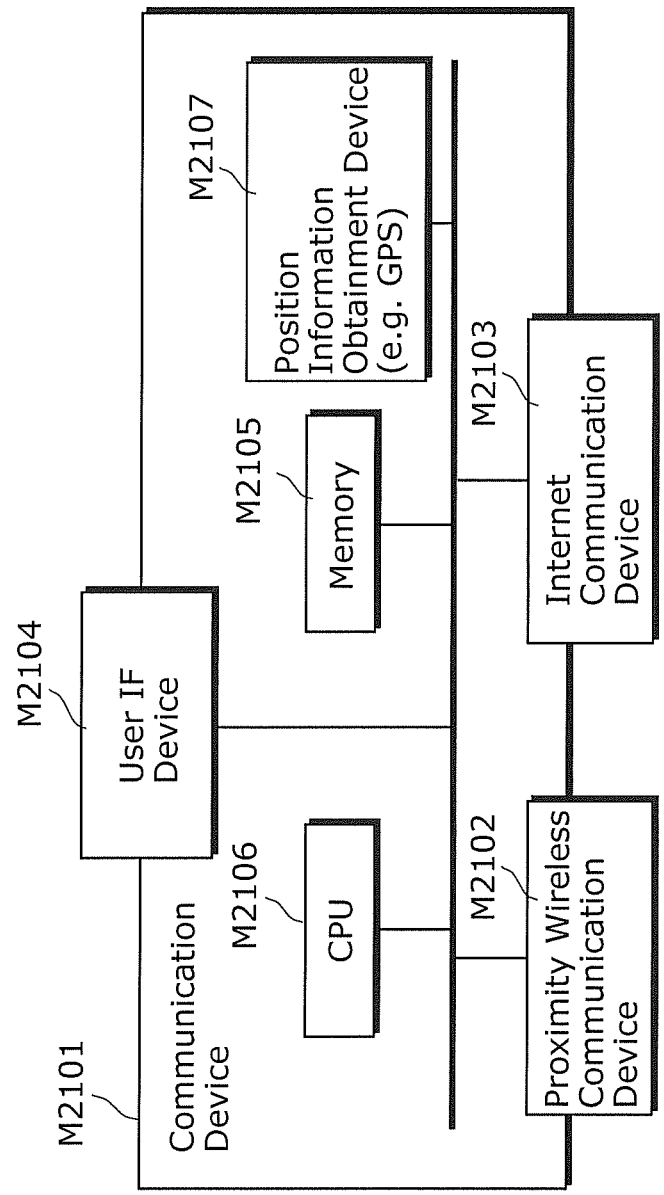

FIG. 159 is a hardware diagram of a communication device for the wireless connection request according to Embodiment B6.

Figure 160:
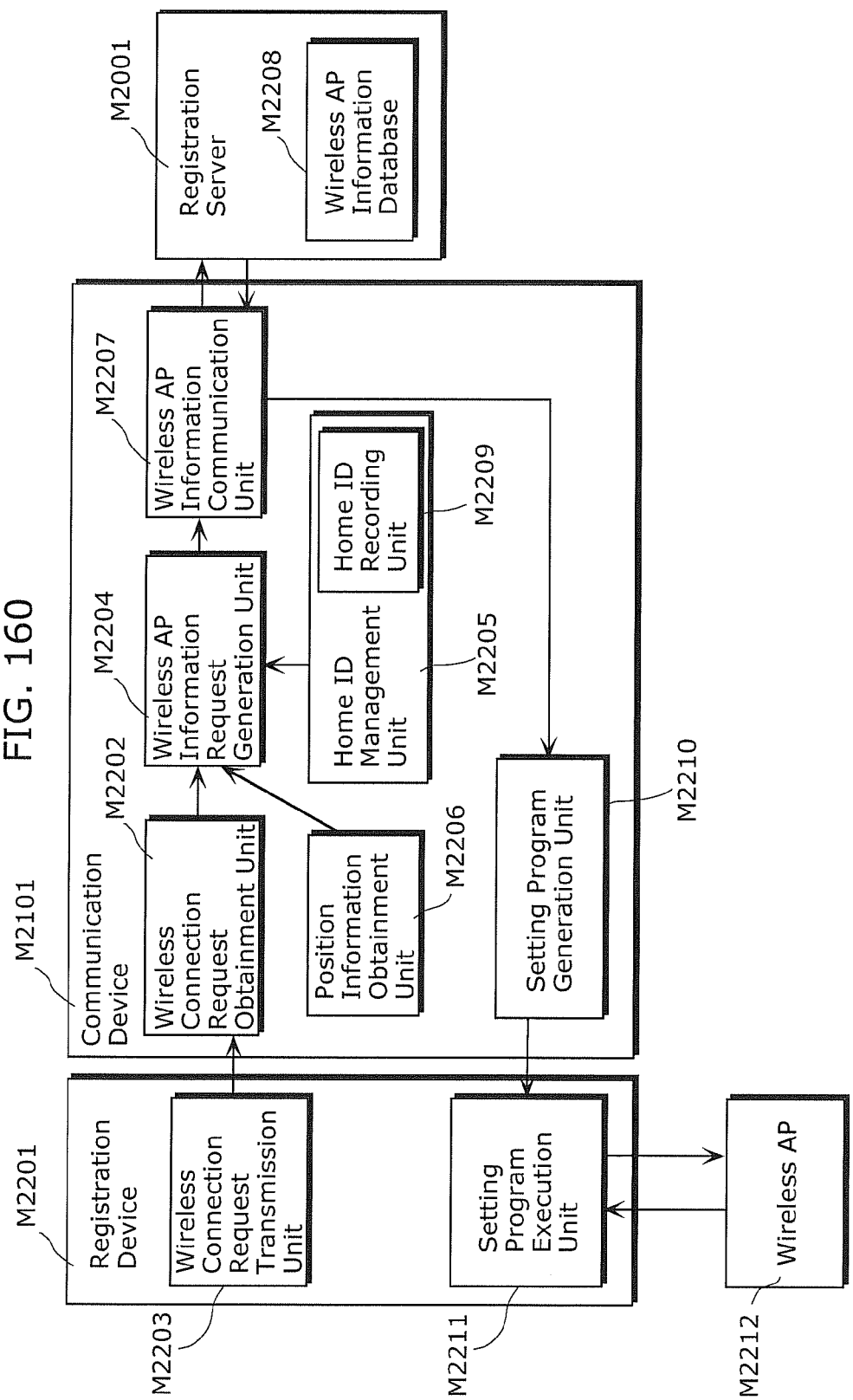

FIG. 160 is a functional block diagram of the communication device for the wireless connection request according to Embodiment B6.

Figure 161:
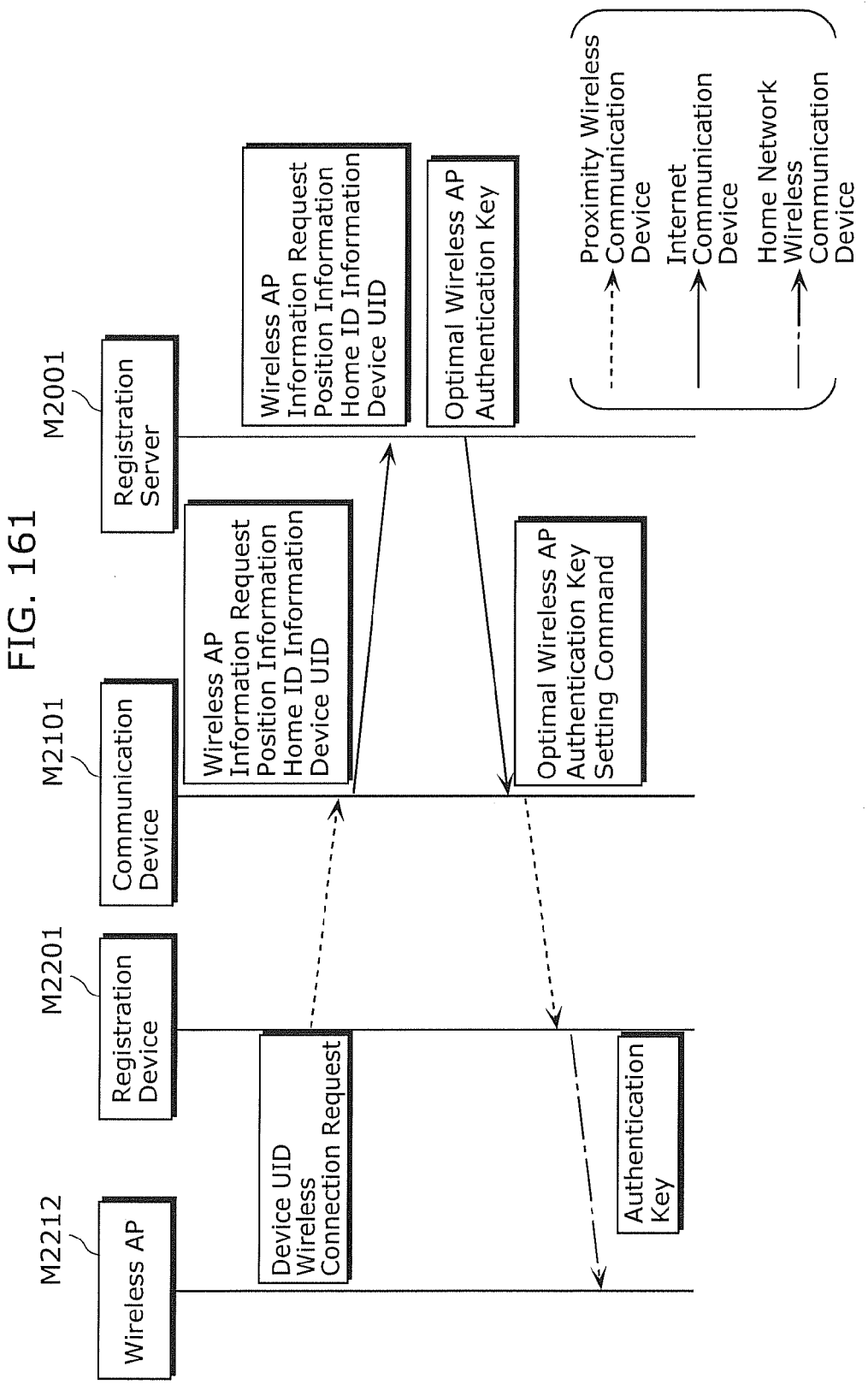

FIG. 161 is a sequence diagram of the wireless connection request according to Embodiment B6.

Figure 162:
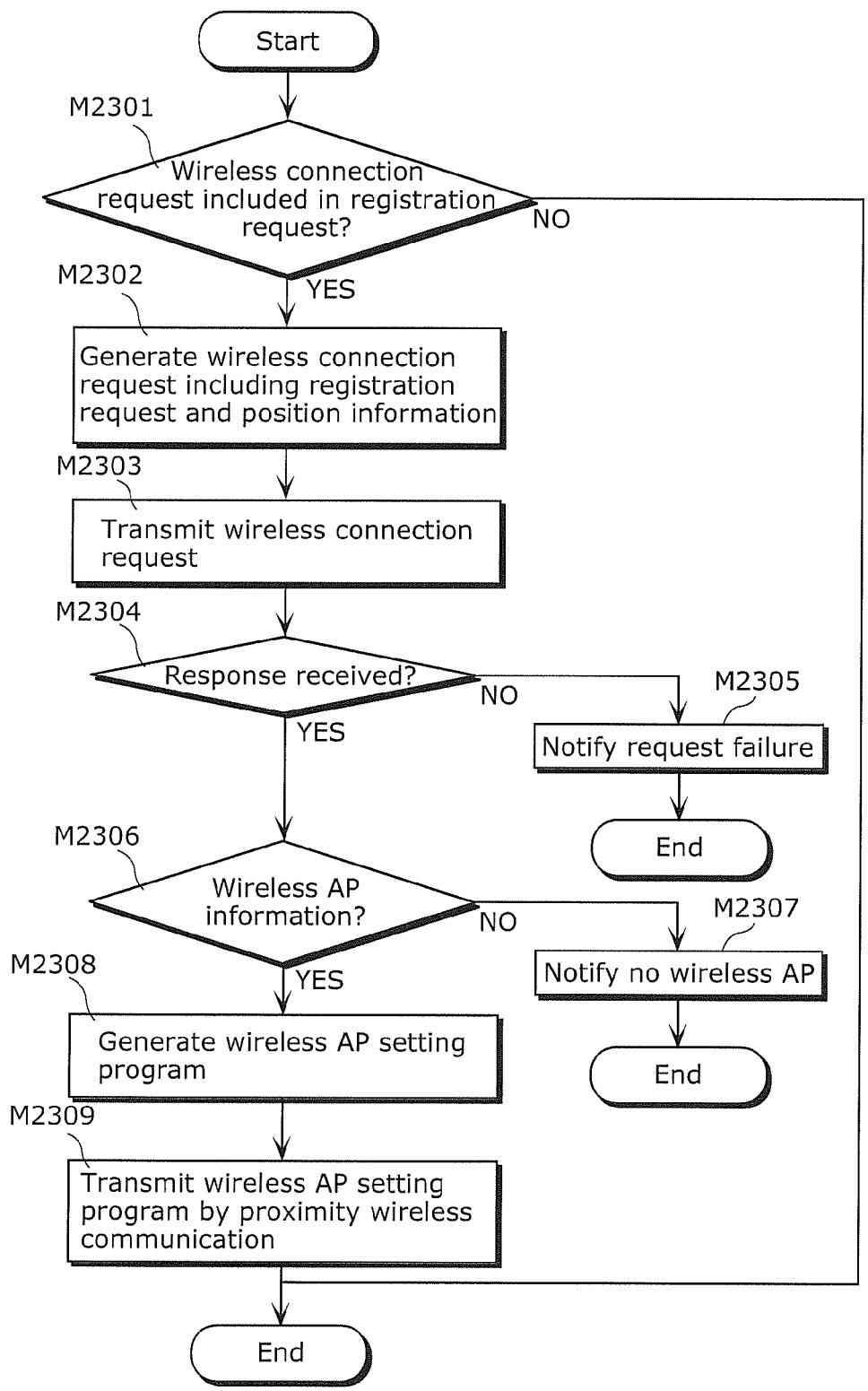

FIG. 162 is a flowchart of the wireless connection request according to Embodiment B6.

Figure 163:
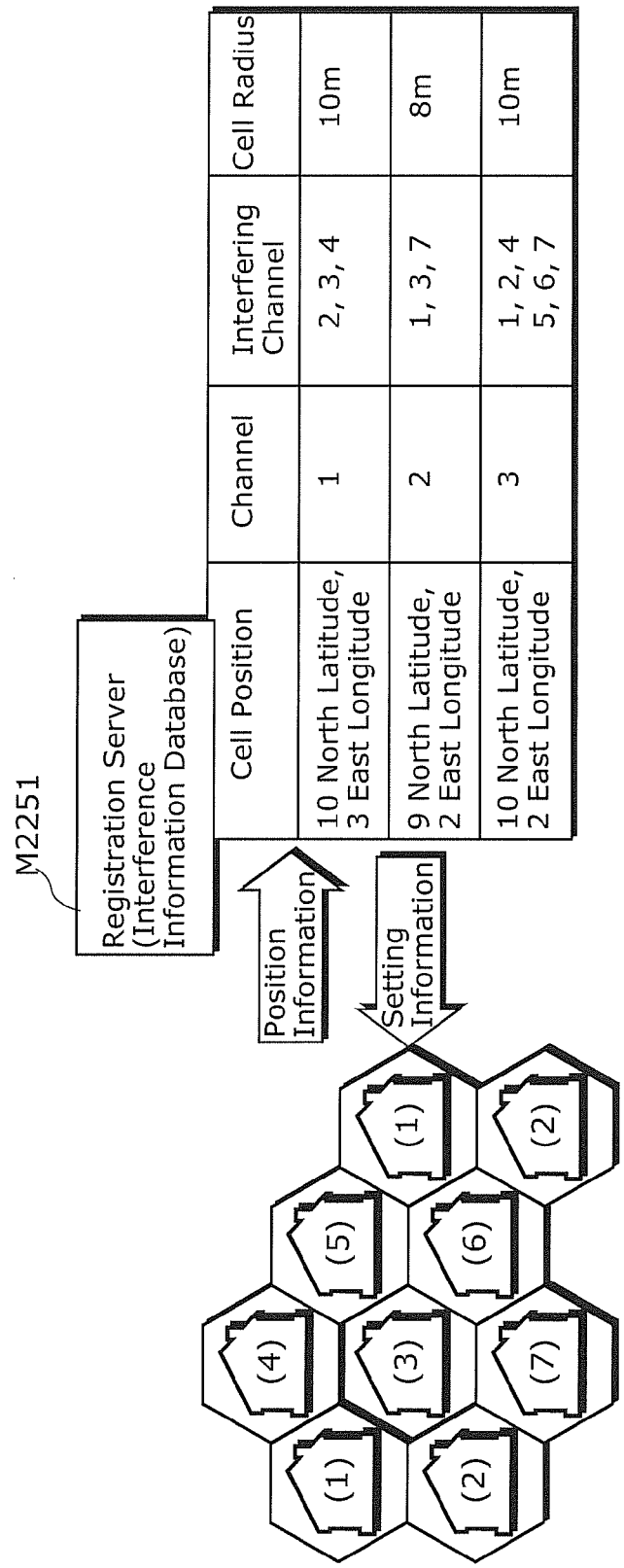

FIG. 163 is a diagram of a network environment for a channel setting request according to Embodiment B7.

Figure 164:
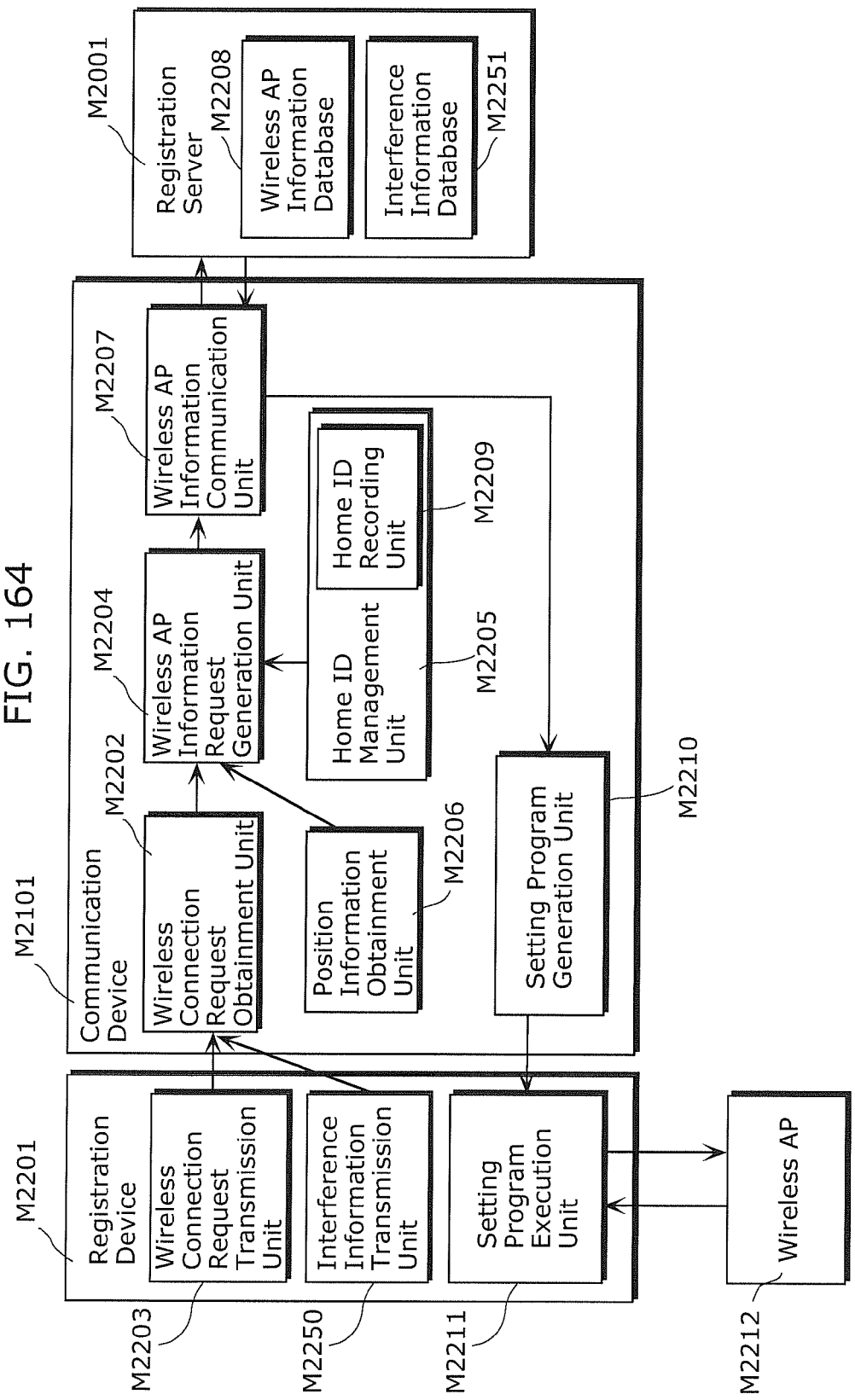

FIG. 164 is a functional block diagram of a communication device for the channel setting request according to Embodiment B7.

Figure 165:
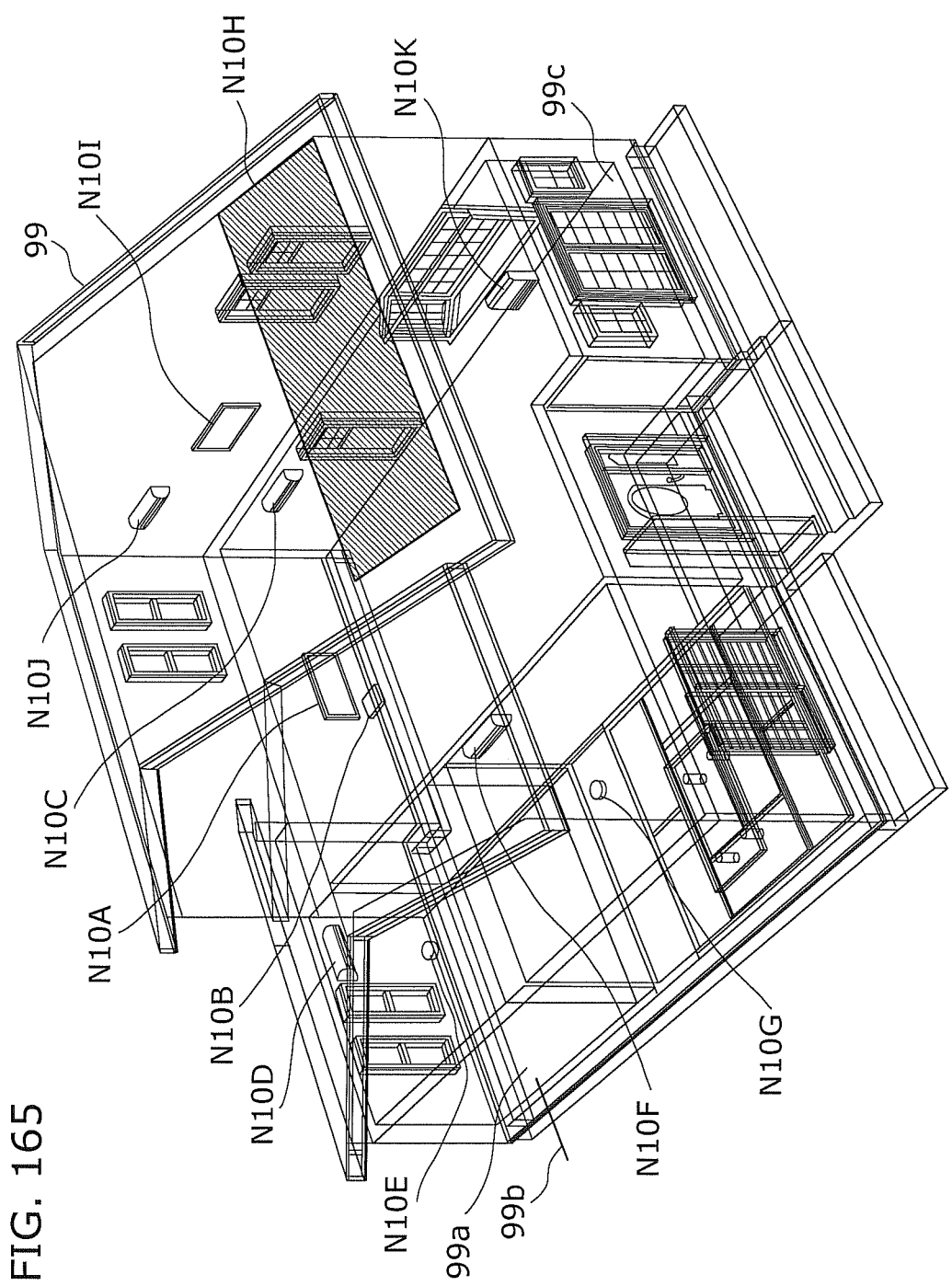

FIG. 165 is a diagram illustrating a home.

Figure 166:
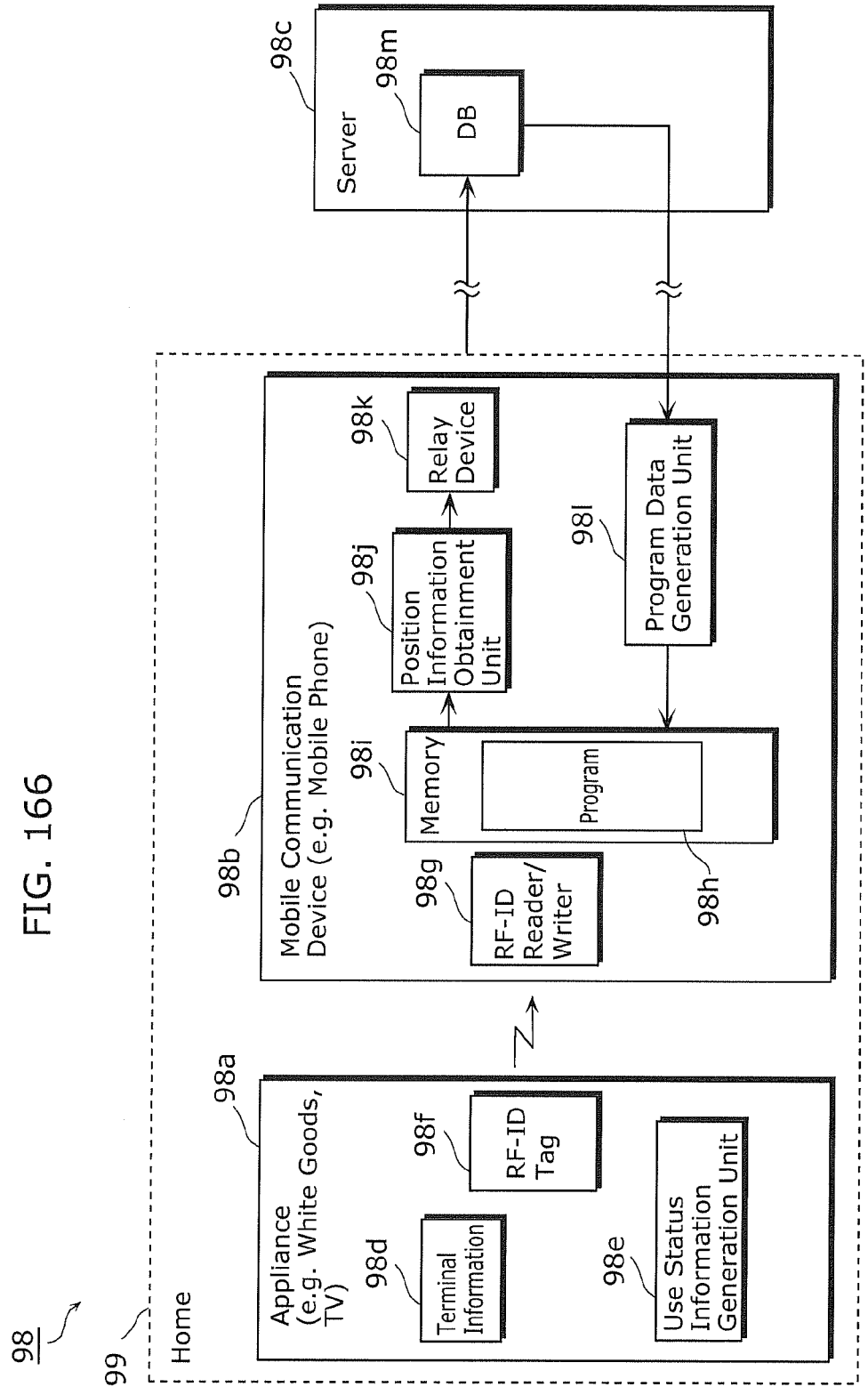

FIG. 166 is a diagram illustrating a system.

Figure 167:
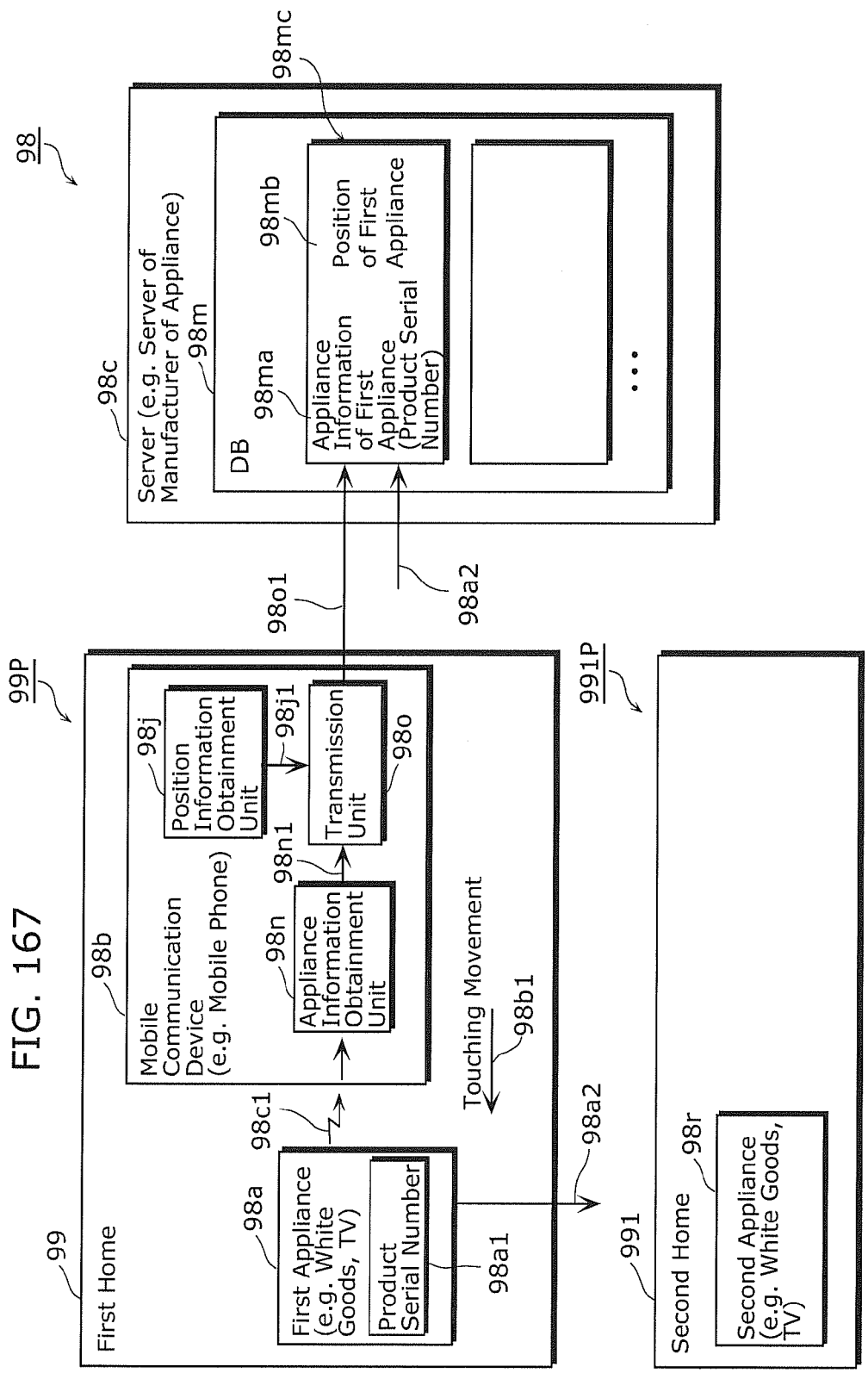

FIG. 167 is a diagram illustrating a system.

Figure 168:
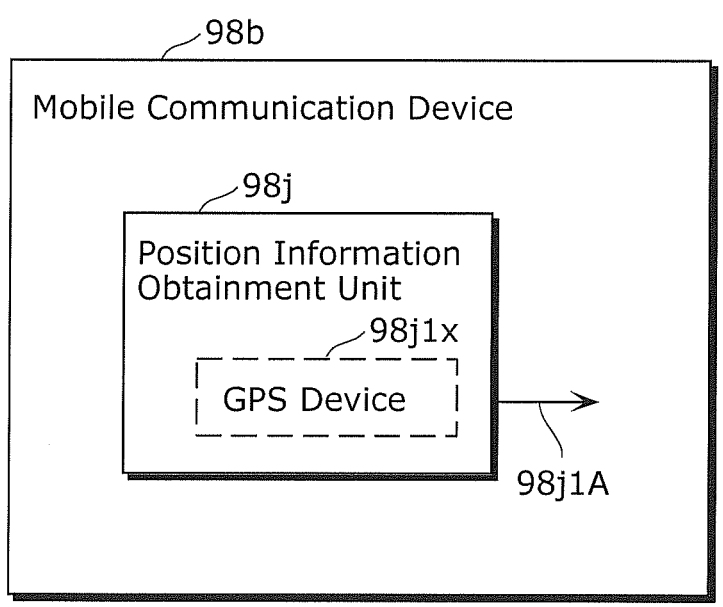

FIG. 168 is a diagram illustrating a mobile communication device.

Figure 169:
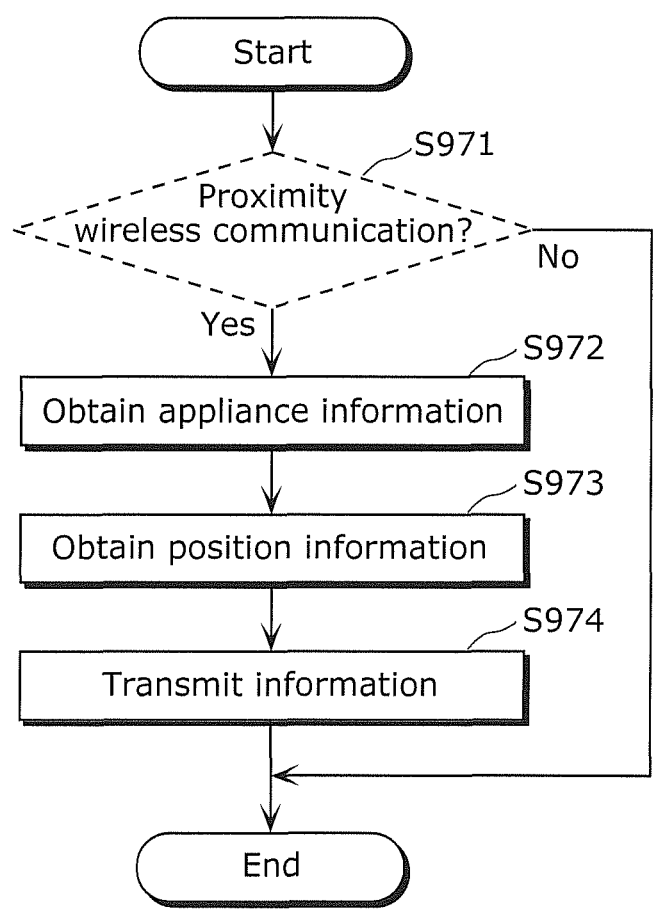

FIG. 169 is a flowchart of the mobile communication device.

Figure 170:
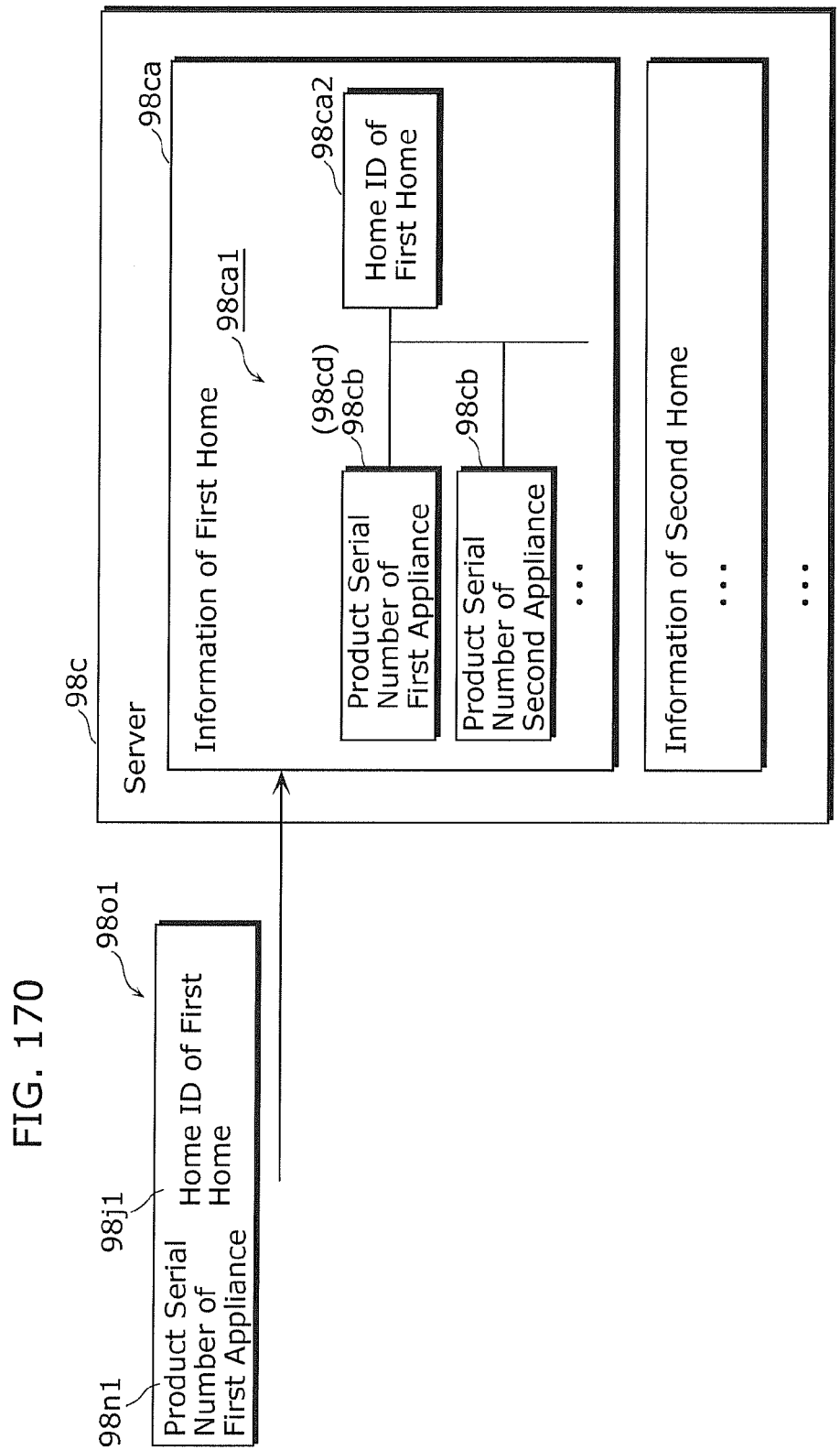

FIG. 170 is a diagram illustrating a server and the like.

Figure 171:
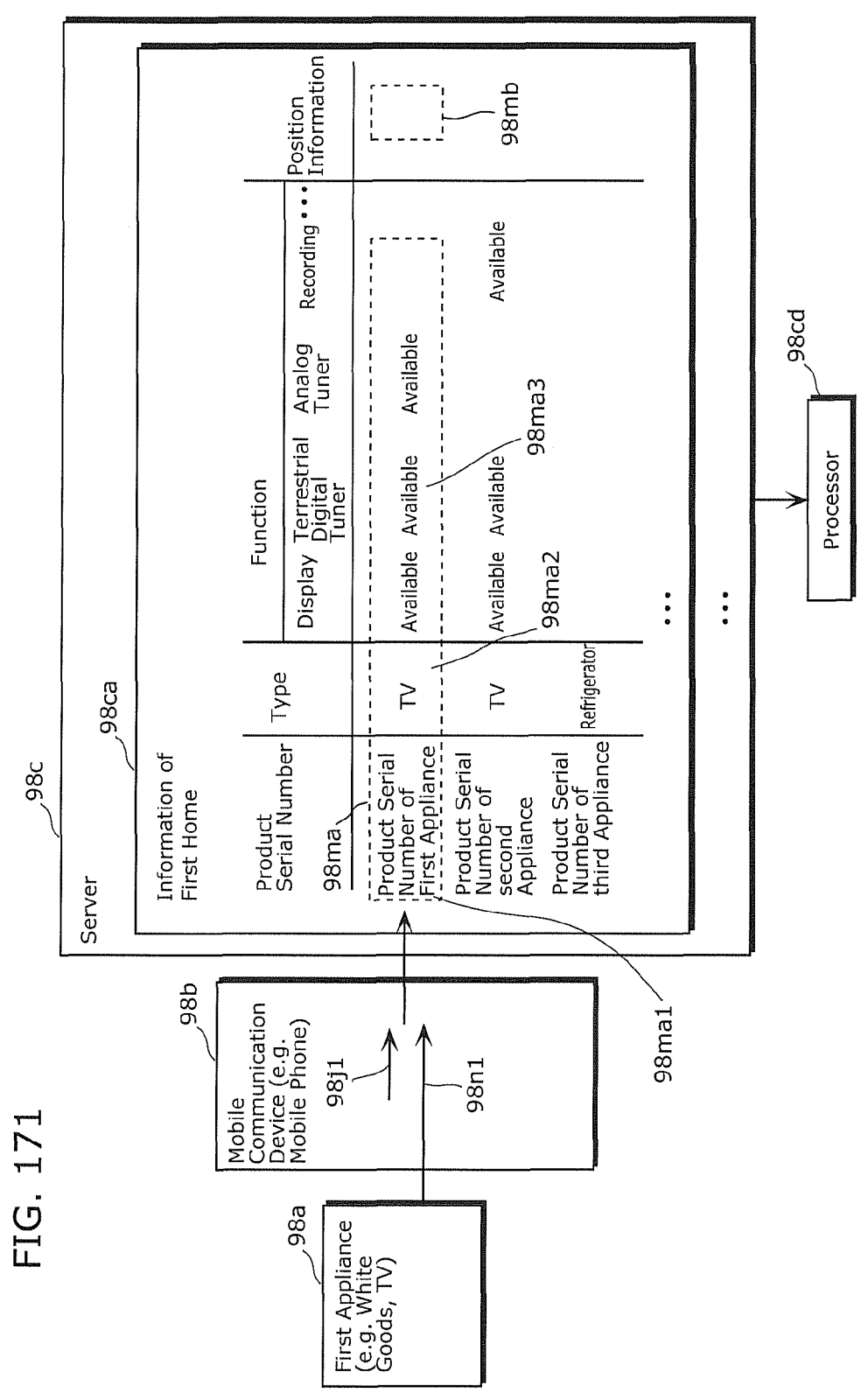

FIG. 171 is a diagram illustrating appliance information, type information, function information, and the like.

Figure 172:
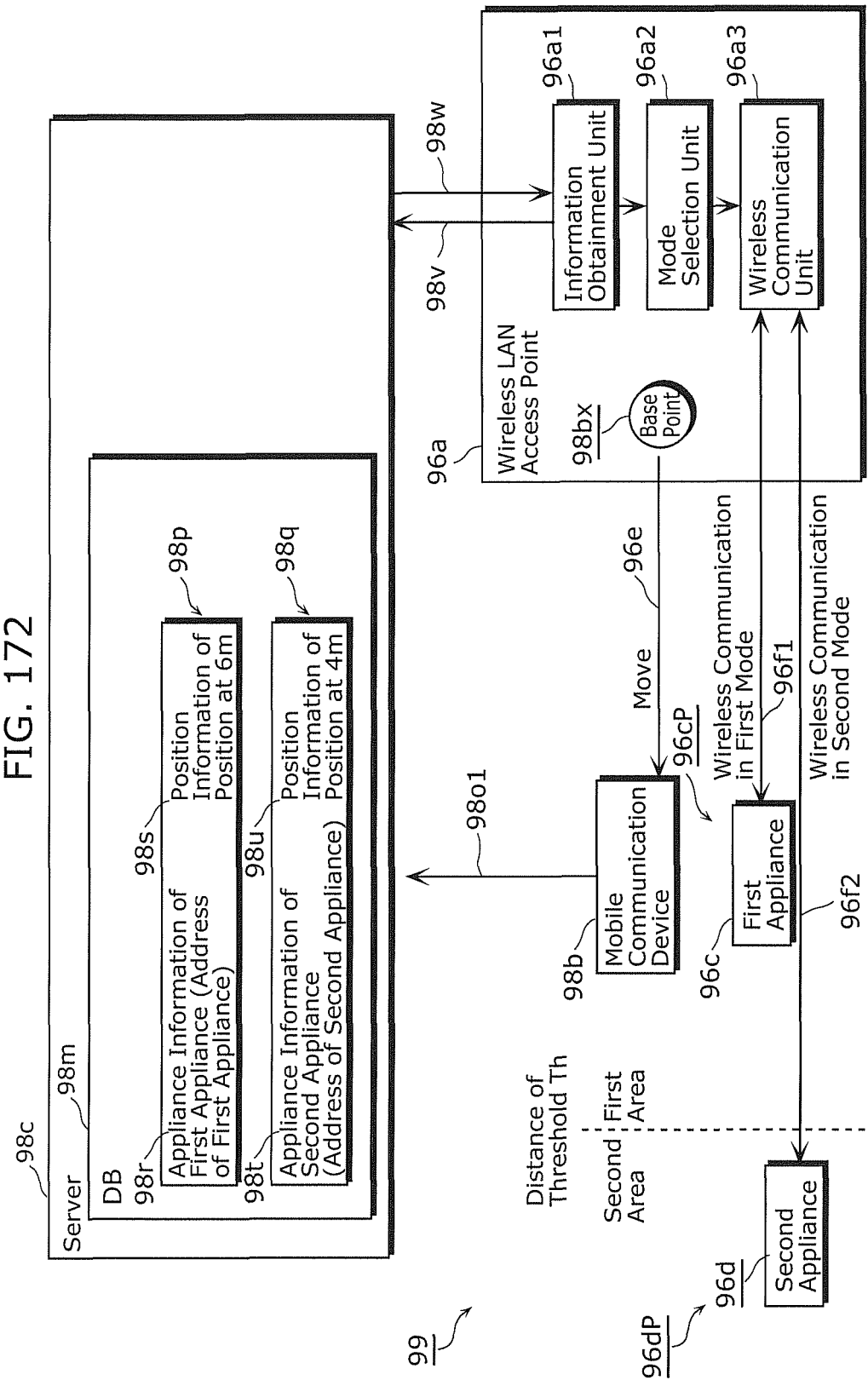

FIG. 172 is a diagram illustrating a wireless LAN access point and the like.

Figure 173:
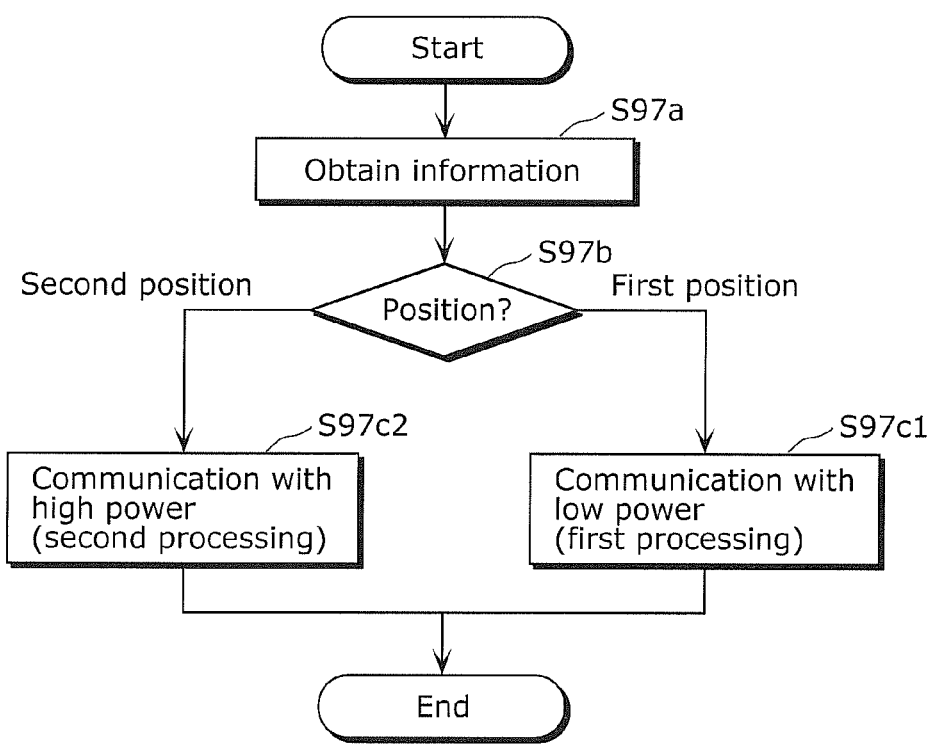

FIG. 173 is a flowchart of processing of wireless communication.

Figure 174:
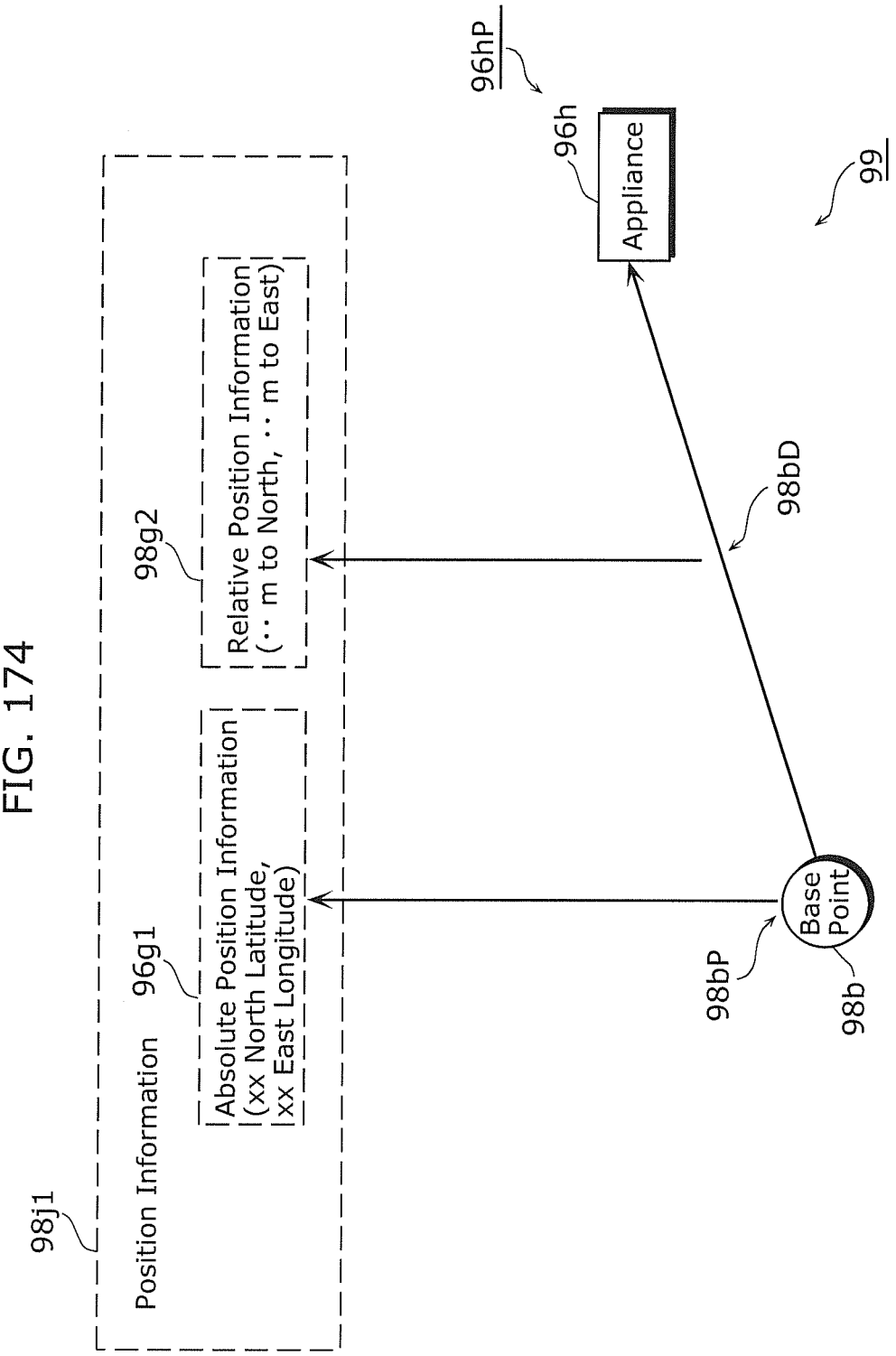

FIG. 174 is a diagram illustrating position information and the like.

Figure 175:
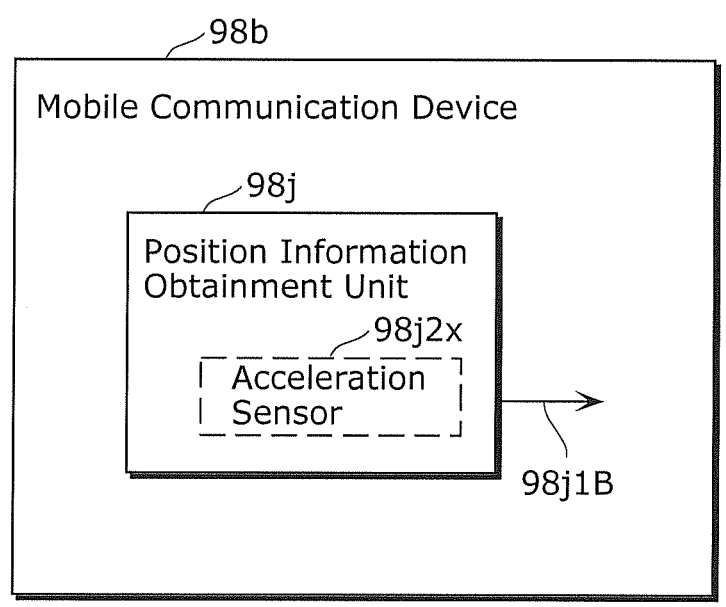

FIG. 175 is a diagram illustrating a mobile communication device.

Figure 176:
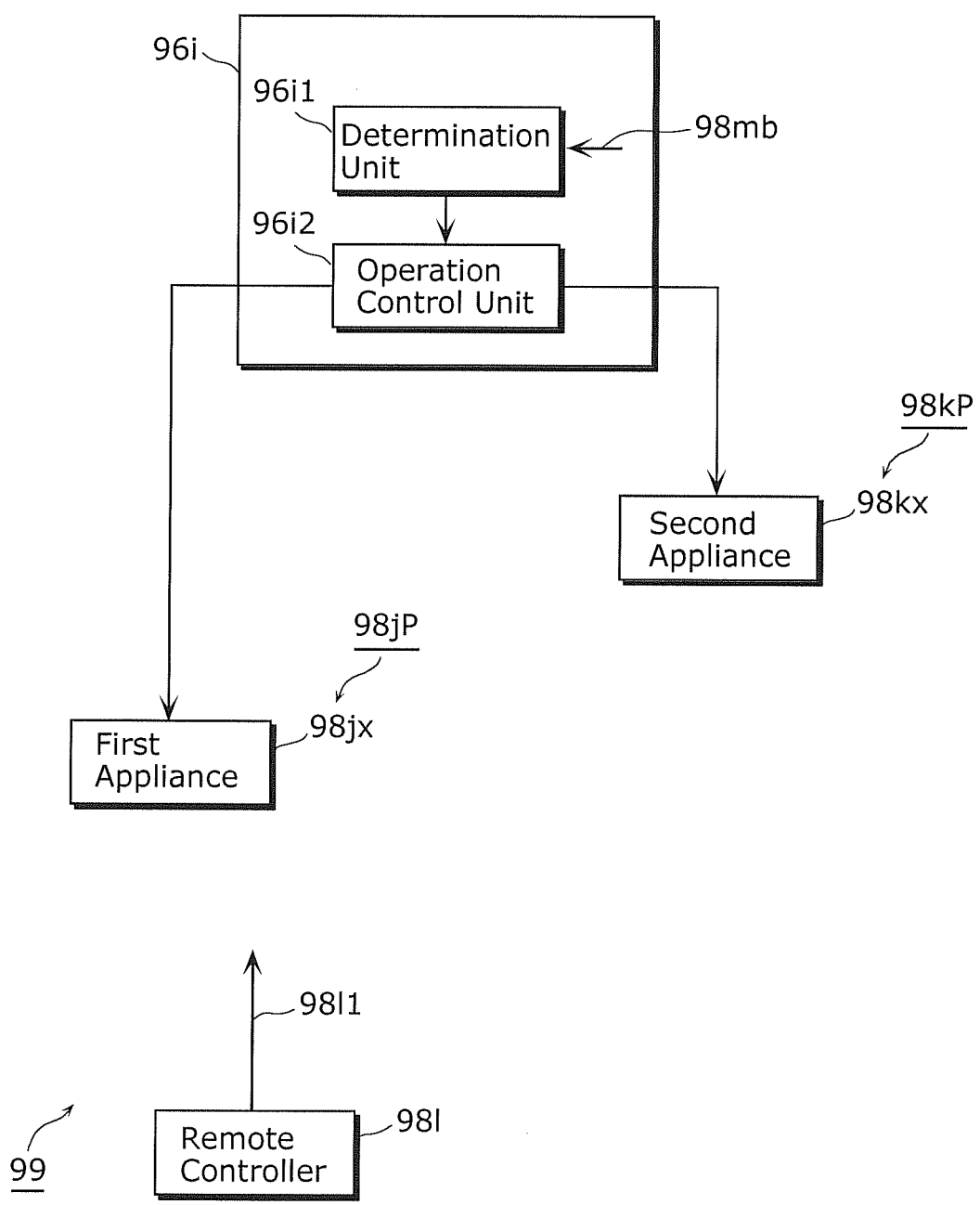

FIG. 176 is a diagram illustrating a remote controller and the like.

Figure 177:
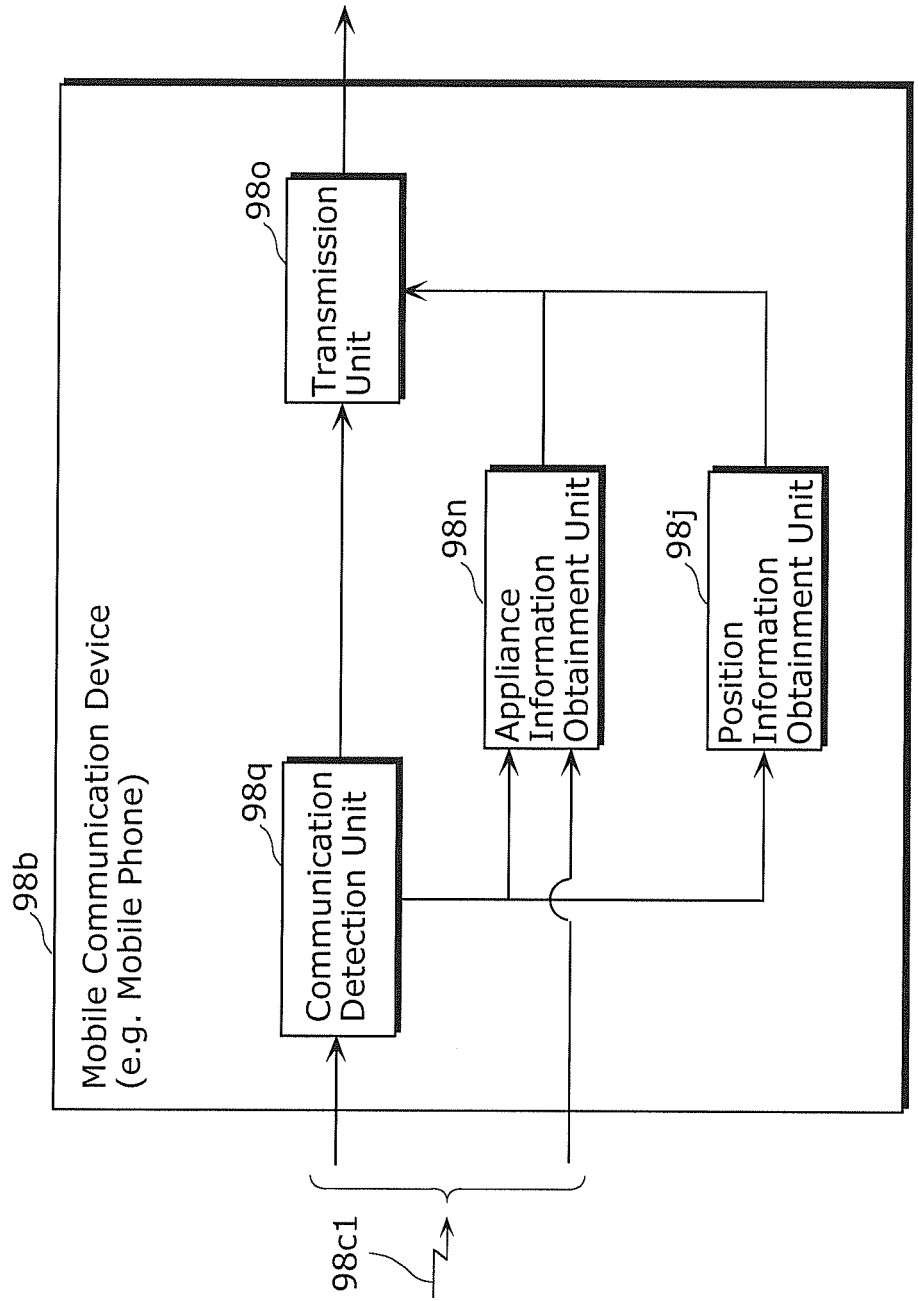

FIG. 177 is a diagram illustrating a mobile communication device.

DESCRIPTION OF EMBODIMENTS

The following describes a communication device according to embodiments of the present invention in detail, with reference to drawings.

The following describes Embodiments A (A1 to A13) and B (B1 to B7).

Various aspects of a communication device according to the present invention are described in the following embodiments (Embodiments A and B). Of these embodiments, Embodiment B (B1 to B7) is directly (comparatively closely) related to the claims at the time of filing (the matter of comparative significance at the time of filing). In Embodiment B (B1 to B7), for example, Embodiment B4 is most closely related to the claims at the time of filing.

Hence, for example, Embodiment B4 may be understood first.

Moreover, Embodiment B (B1 to B7) may be understood prior to Embodiment A (A1 to A13).

Drawings closely related to Embodiment B4 are, for example, FIGS. 131 to 148 (and FIGS. 165 to 177). Hence, FIGS. 131 to 148 (and FIGS. 165 to 177) may be understood first.

Figure 114:
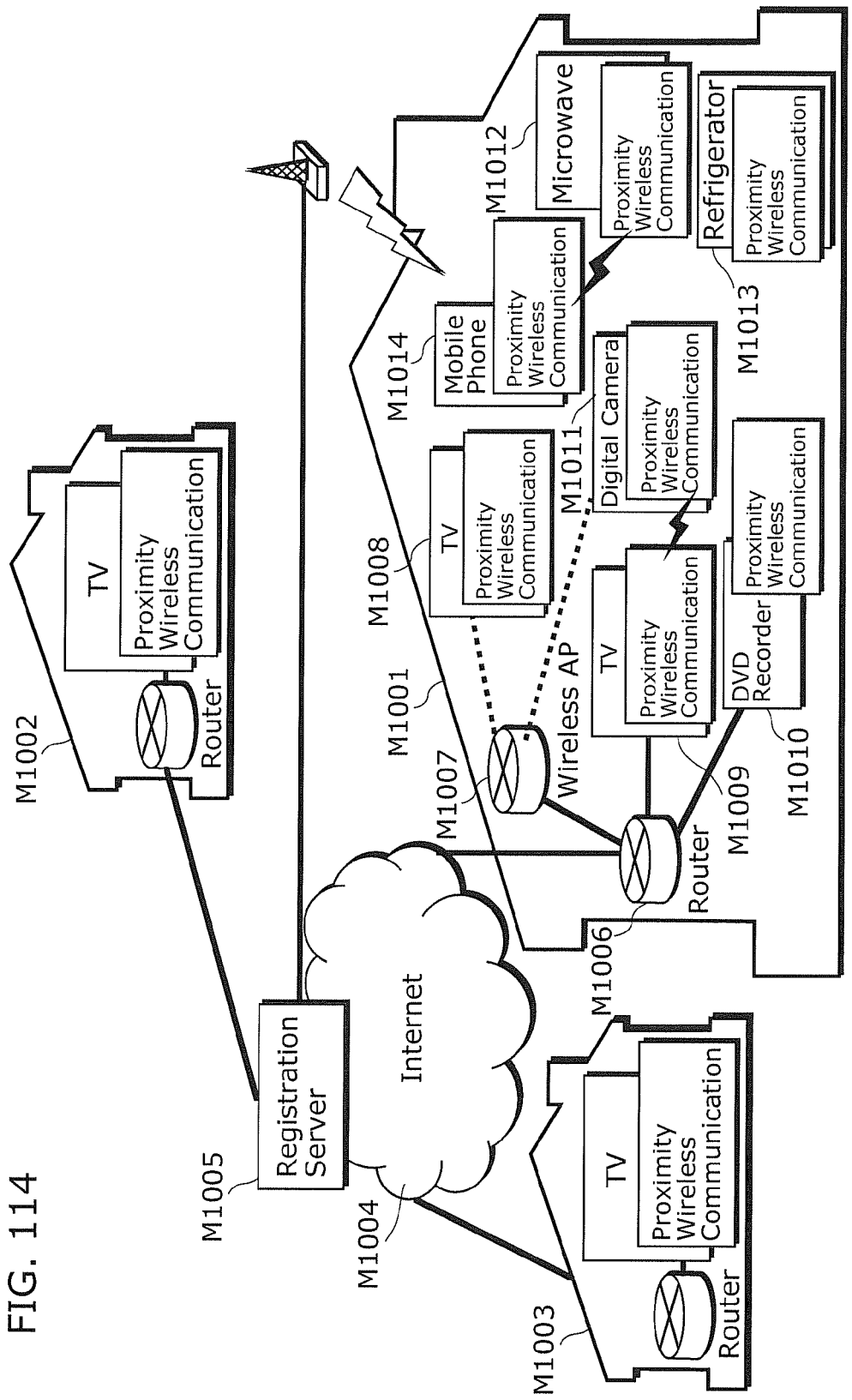

Drawings closely related to Embodiment B (B1 to B7) are, for example, FIGS. 114 to 177. Hence, FIGS. 114 to 177 may be understood prior to FIGS. 1 to 113.

Of FIGS. 114 to 177 relating to Embodiment B noted above, it is also preferable to understand, for example, FIGS. 165 to 177 prior to other drawings.

In other words, see FIGS. 165 to 177 for understanding of the above-mentioned matter of significance at the time of filing.

That is, for example, the following mobile communication device is disclosed.

The mobile communication device may include: an appliance information obtainment unit (an appliance information obtainment unit 98*n*) that obtains, from an appliance (e.g. an appliance 98*a* in FIG. 167 (such as a TV N10A in FIG. 165)) installed at a predetermined position (e.g. the home 99 (inside the home 99) in FIG. 165), appliance information (appliance information 98*n*1) by proximity wireless communication (proximity wireless communication 98*c*1, communication according to NFC) between the installed appliance and the mobile communication device (e.g. a mobile communication device 98*b*), the appliance information specifying the appliance (the first appliance 98*a*) from among a plurality of appliances (e.g. the first appliance 98*a* and a second appliance 98*r* in FIG. 167); a position information obtainment unit (a position information obtainment unit 98*j*) that obtains position information (position information 98*j*1) indicating a position (a position of the appliance 98*a*, a position of the TV N10A) of the mobile communication device when the proximity wireless communication is performed between the installed appliance and the mobile communication device (as a result of, for example, a movement 98*b*1 of the mobile communication device 98*b* to touch the appliance 98*a*) (i.e. the proximity wireless communication is performed where the position of the installed appliance (the appliance 98*a* (the TV N10A)) is the same position as the position of the mobile communication device); and a transmission unit (a transmission unit 98*o*) that transmits transmission information (transmission information 98*o*1) to a predetermined server (a server 98*c*, e.g. a server of a manufacturer of the appliance 98*a* situated outside the home 99 and connected to a communication line 99*b* in FIG. 165) in the case where the proximity wireless communication is performed, the transmission information including the appliance information (the appliance information 98*n*1) obtained by the proximity wireless communication and the obtained position information (the position information 98*j*1) (at the same position (the position of the TV N10A)).

Moreover, the mobile communication device may further include a detection unit (a communication detection unit 98*q* in FIG. 177) that detects that the proximity wireless communication (the proximity wireless communication 98*c*1) is performed between the installed appliance and the mobile communication device (upon a touching operation or the like), the proximity wireless communication being performed in the case where the appliance (the appliance 98*a*) is installed at the predetermined position (the home 99), wherein the transmission unit transmits the transmission information (the transmission information 98*o*1) to the predetermined server in the case where the detection unit detects that the proximity wireless communication is performed, the transmission information being required to be transmitted to (e.g. registered in) the server in the case where the appliance is installed at the predetermined position, the transmitted transmission information includes the appliance information (the appliance information 98*n*1) specifying the installed appliance from among the plurality of appliances, the appliance information obtainment unit obtains the appliance information from the appliance by the proximity wireless communication, the transmitted transmission information includes position information (the position information 98*j*1) indicating the position at which the appliance is installed, and the position information obtainment unit obtains, as the position information indicating the position of the appliance, the position information (the position information 98*j*1) indicating the position of the mobile communication device (the mobile communication device 98*b*) when the proximity wireless communication is performed between the installed appliance and the mobile communication device.

According to this structure, the transmission information 98*o*1 including the appliance information 98*n*1 and the position information 98*j*1, which needs to be transmitted to the server 98*c* (e.g. the server of the manufacturer of the appliance 98*a*) in the case where the appliance 98*a* is installed in the home 99, can be transmitted by a simple operation such as a touching operation to initiate the proximity wireless communication 98*c*1.

Besides, the device that performs the proximity wireless communication 98*c*1 is the mobile communication device 98*b* such as a mobile phone, with there being no need to add a new structure to perform the proximity wireless communication 98*c*1. This contributes to a lower cost.

In addition, the device is the mobile communication device 98*b*, with there being no need to add a new structure to obtain the position information. This contributes to a sufficiently lower cost. That is, an extent of cost reduction can be increased.

In detail, there is no need to add a new structure such as a GPS device to the installed appliance 98*a*.

Hence, a simple operation, a lower cost, and an increased extent of cost reduction can all be achieved.

Note that, for instance, the appliance (the appliance 98*a*) is a home appliance (e.g. the TV N10A or a FF heater N10K in FIG. 165) in the home (the home 99), and the mobile communication device is a mobile phone of a resident of the home in which the appliance is installed, a smartphone of the resident with a mobile phone function, or the like.

Moreover, the obtained position information (the position information 98*j*1) may specify a movement (a movement 96*e* in FIG. 172) of the mobile communication device from a base point (a base point 98*bx* in FIG. 172, the access point 99*c* in FIG. 165) to the position at which the appliance (e.g. a first appliance 96*c*, a second appliance 96*d* (the FF heater N10K, the TV N10A in FIG. 165)) is installed, to indicate a first position (a first position 96*c*P in FIG. 172, the position of the FF heater N10K in FIG. 165) in the case where the specified movement (the movement 96*e*) is a first movement to the first position, and a second position (a second position 96*d*P, the position of the TV N10A) in the case where the specified movement is a second movement to the second position (the second position 96*d*P), wherein the server (the server 98*c* in FIG. 172 (e.g. a server (home server) 99*a* in FIG. 165)) to which the transmission information is transmitted performs control so that wireless communication in a first mode (low-power wireless communication 96*f*1) is performed between a predetermined wireless communication device (a processor 96*a*, the access point 99*c* in FIG. 165) and the installed appliance in the case where the movement (the movement 96*e*) specified by the position information in the transmission information is the first movement, and wireless communication in a second mode (high-power wireless communication 96*f*2) is performed between the predetermined wireless communication device and the installed appliance in the case where the specified movement is the second movement.

Thus, wireless communication in a suitable mode (the wireless communication 96*f*1, 96*f*2) corresponding to the position (the first position 96*c*P, the second position 96*d*P) at which the appliance 98*a* is installed in the home 99 may be performed by transmitting the transmission information 98*o*1 as described above.

According to this structure, a very complex operation required to perform suitable wireless communication, such as an operation of wireless communication power setting, becomes unnecessary, as a simple operation such as a touching operation of the mobile communication device 98*b* is sufficient. Thus, a significantly simplified operation can be realized.

Moreover, the position information obtainment unit may include an acceleration sensor (an acceleration sensor 98*j*2*x* in FIG. 175) that detects an acceleration when the mobile communication device moves (the movement 96*e* in FIG. 172) to the position at which the appliance is installed (from the base point (the base point 98*bx* in FIG. 172, the access point 99*c* in FIG. 165)), wherein the obtained position information (the position information 98*j*1) specifies the movement (the movement 96*e*) according to the detected acceleration, to indicate the position (the position of the appliance 98*a* (e.g. the first appliance 96*c* in FIG. 172)) of the mobile communication device after the specified movement (the movement 96*e*), as the position at which the appliance is installed.

According to this structure, for example even in the case where a GPS field intensity is not adequate to obtain position information of sufficiently high accuracy, appropriate position information can be obtained merely by using the acceleration sensor. This ensures appropriate processing.

Moreover, the predetermined position at which the appliance is installed is inside a home, wherein the proximity wireless communication (the proximity wireless communication 98*c*1 in FIG. 167) is communication according to Near Field Communication (NFC) performed when, in the case where the appliance is installed in the home, a user of the mobile communication device in the home in which the appliance is installed performs an operation (98*b*1 in FIG. 167) of touching the mobile communication device to the installed appliance.

The mobile communication device may also be implemented, for example, as described in "Other Variations" or in Embodiments A and B. The description of "Other Variations" appears at the end of this section, i.e., "Description of Embodiments", and should be referenced when necessary.

The technical field of Embodiments A (A1 to A13) and B (B1 to B7) described below is a relatively new field with various possibilities, where it is relatively difficult to predict what kinds of technologies will be widely available in the future.

In view of this, the following describes a relatively wide variety of technologies (e.g. Embodiments A1 to A13, B1 to B7).

Here, the drawings should be referenced as follows.

Figure 1:
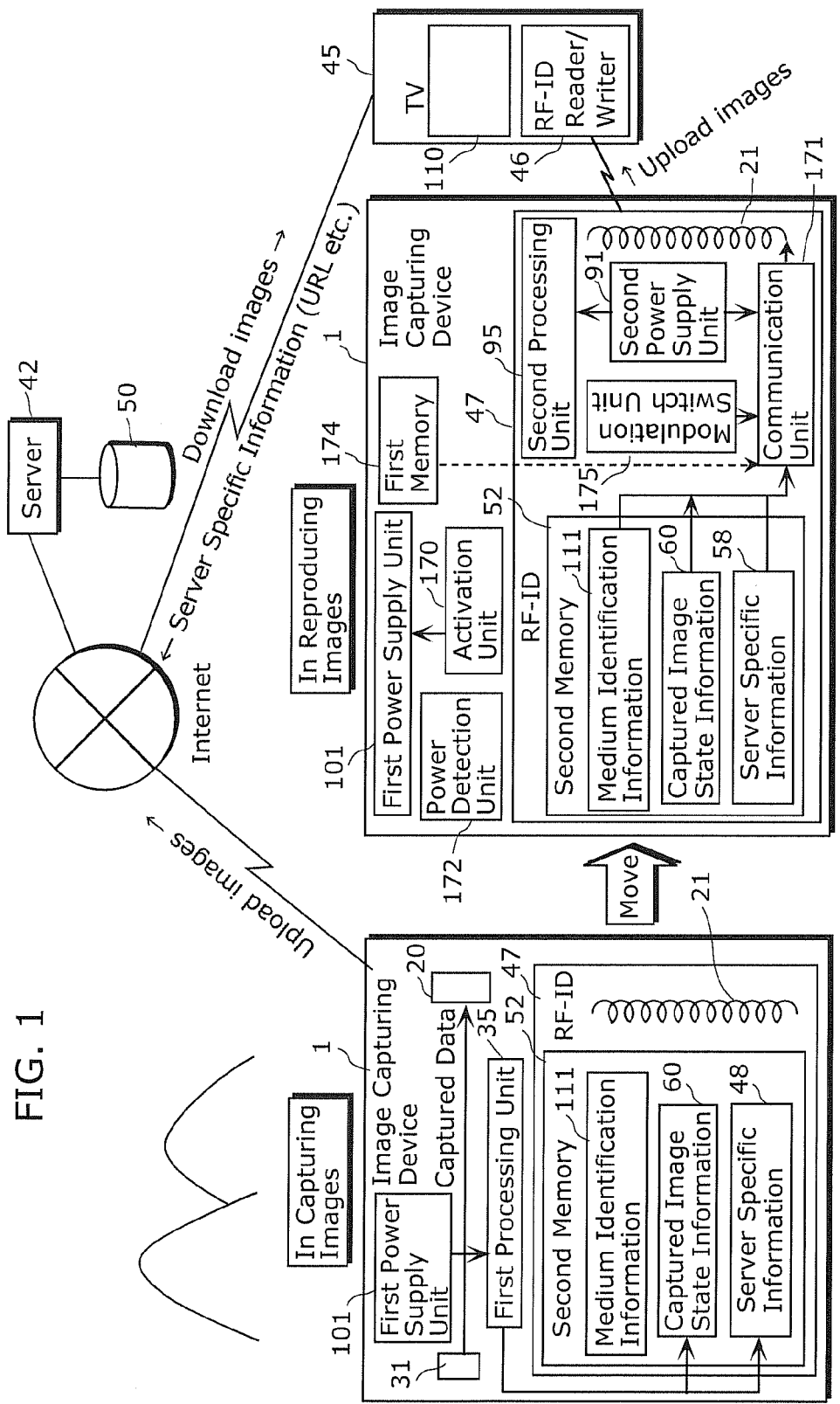
FIG. 1 illustrates an entire system of an image capturing device according to Embodiment A1.

See, for example, FIGS. 1 to 113 for understanding of Embodiment A.

See, for example, FIGS. 114 to 177 (FIGS. 114 to 164 and 165 to 177) for understanding of Embodiment B.

Figure 102:
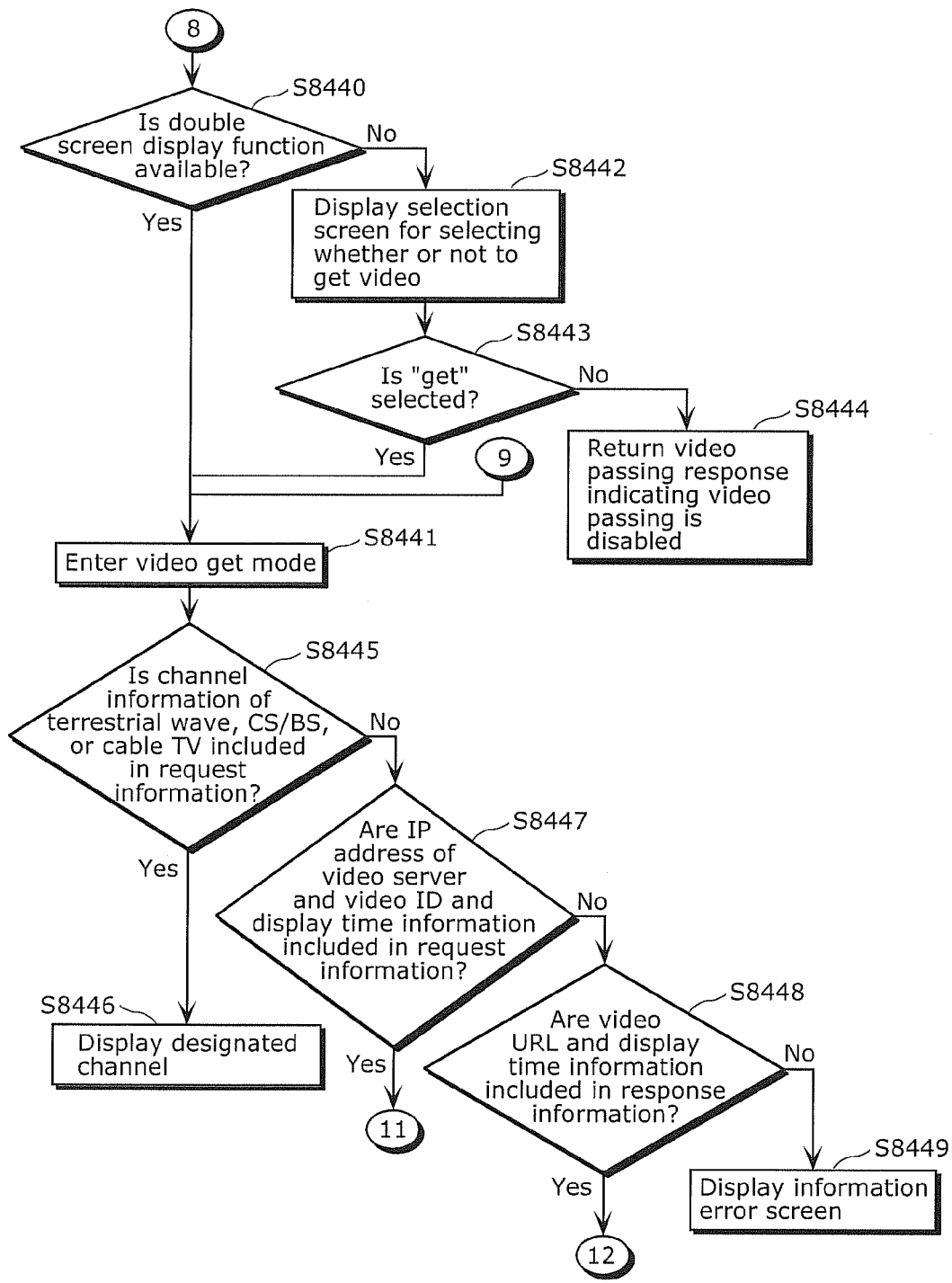
FIG. 102 is a flowchart of a get mode of the TV.
Figure 103:
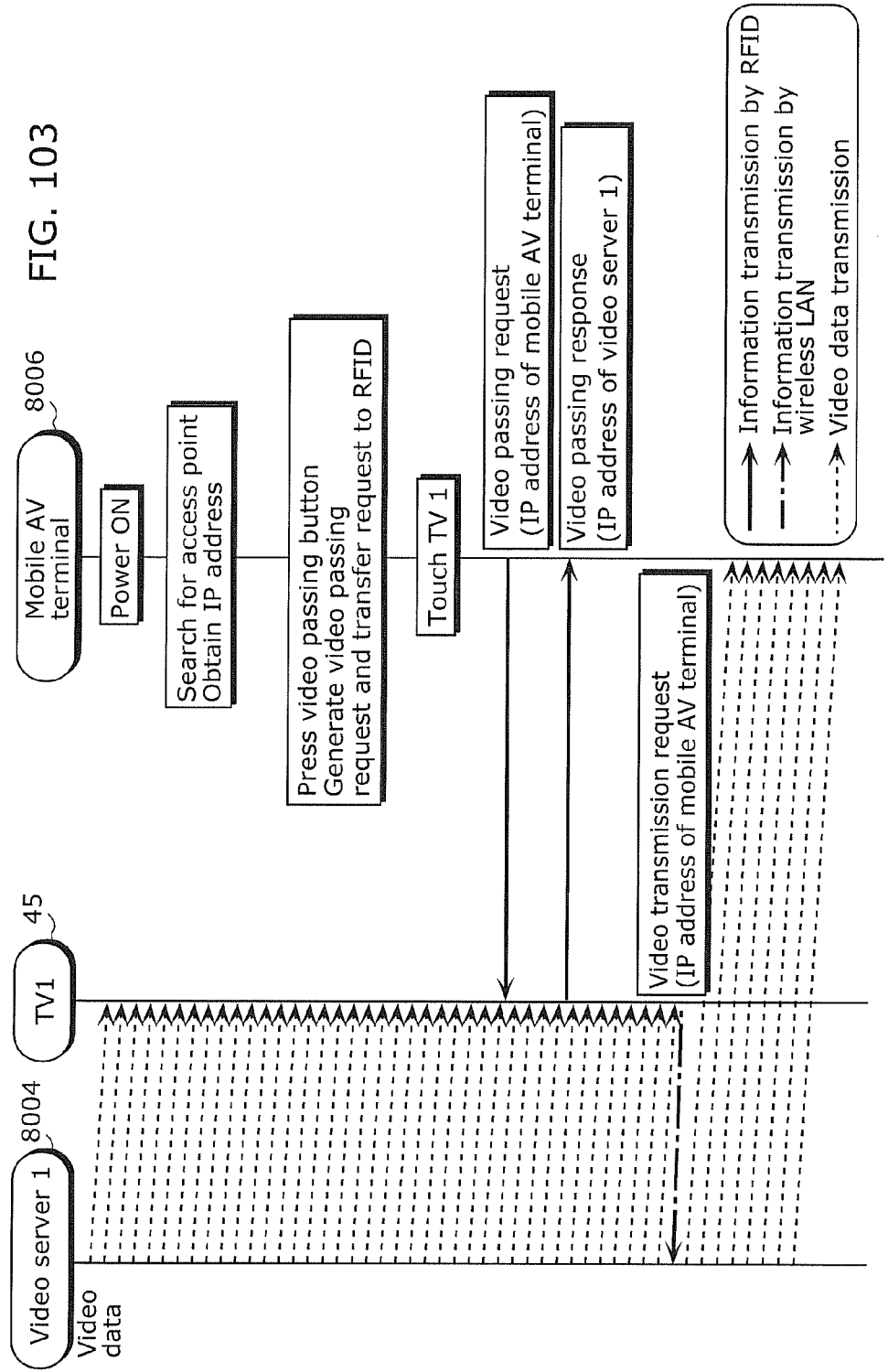
FIG. 103 is a sequence diagram in the case where the mobile AV terminal gets video (first half, control performed by give side).
Figure 104:
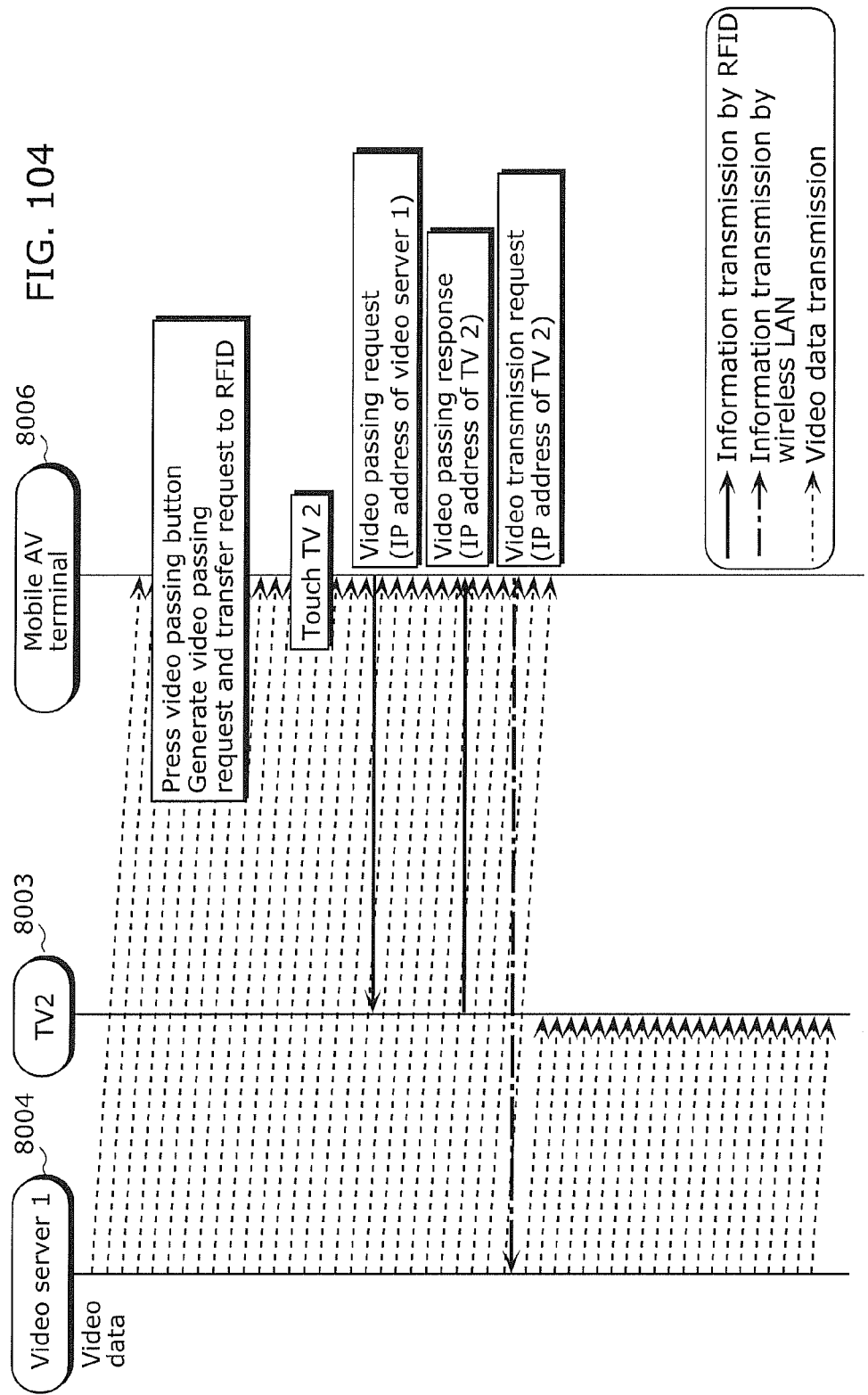
FIG. 104 is a sequence diagram in the case where the mobile AV terminal gives video (second half, control performed by give side).
Figure 105:
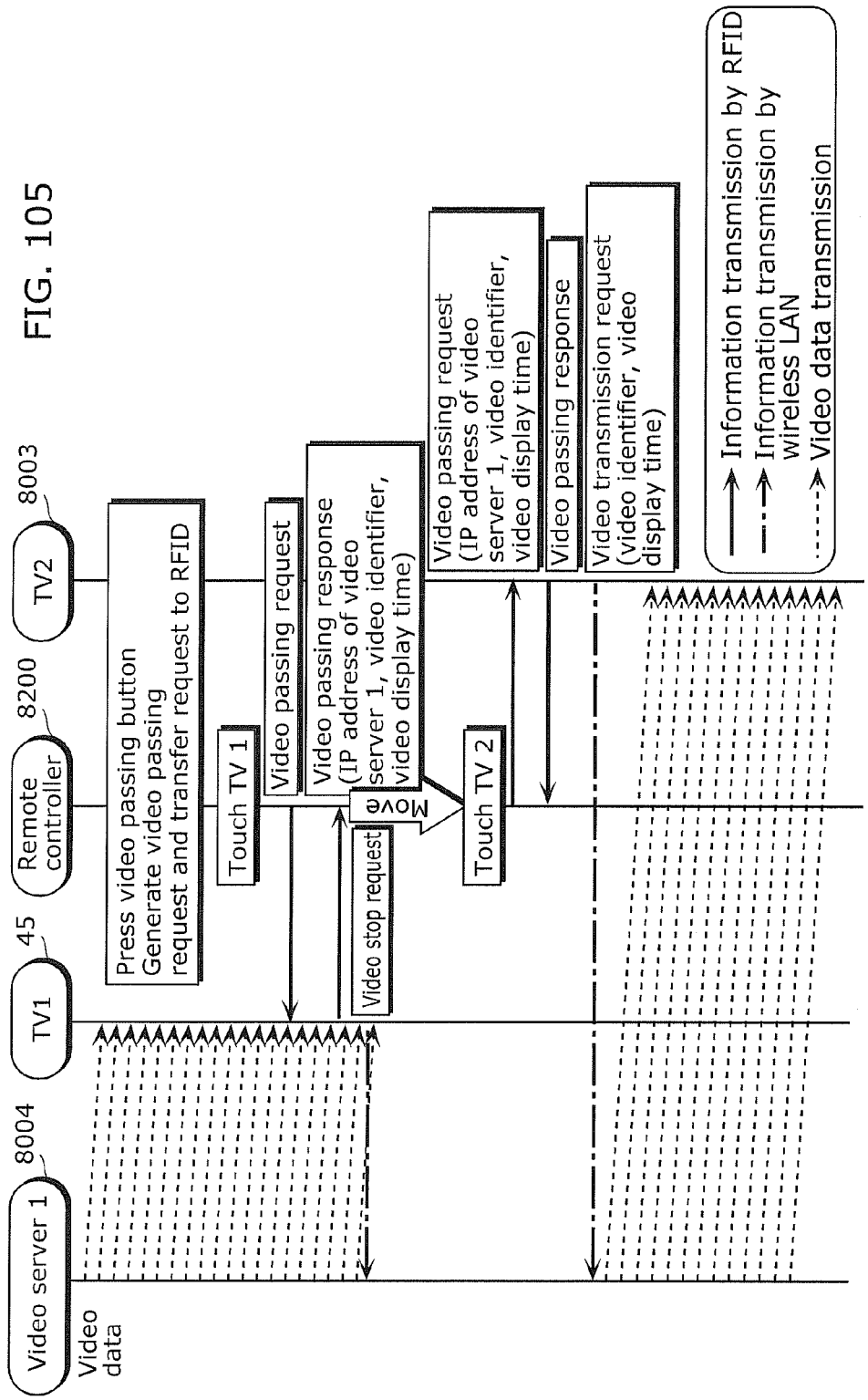
FIG. 105 is a sequence diagram in the case where passing is performed by a remote controller.
Figure 106:
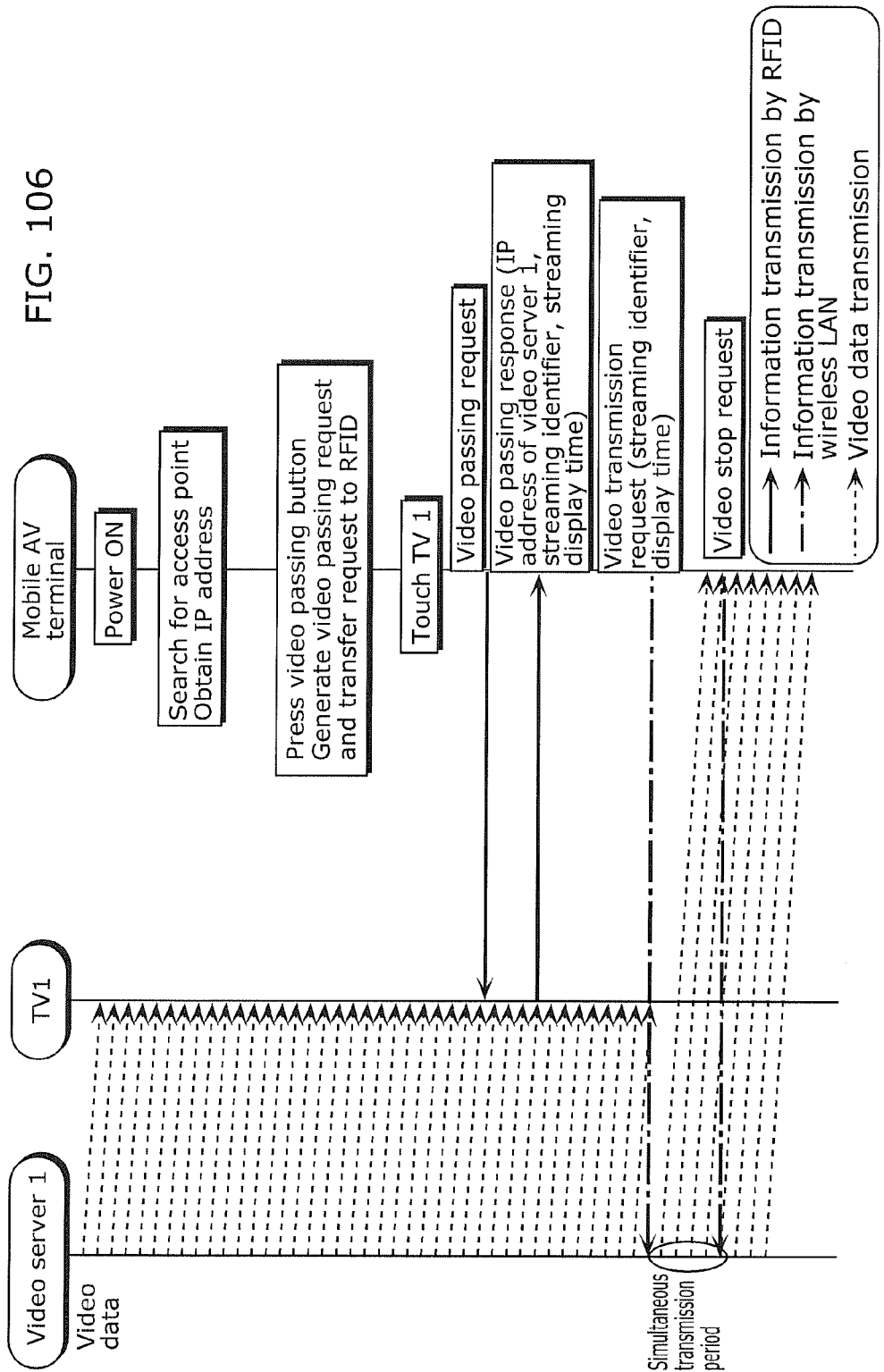
FIG. 106 is a sequence diagram in the case where a video server performs synchronous transmission.
Figure 110:
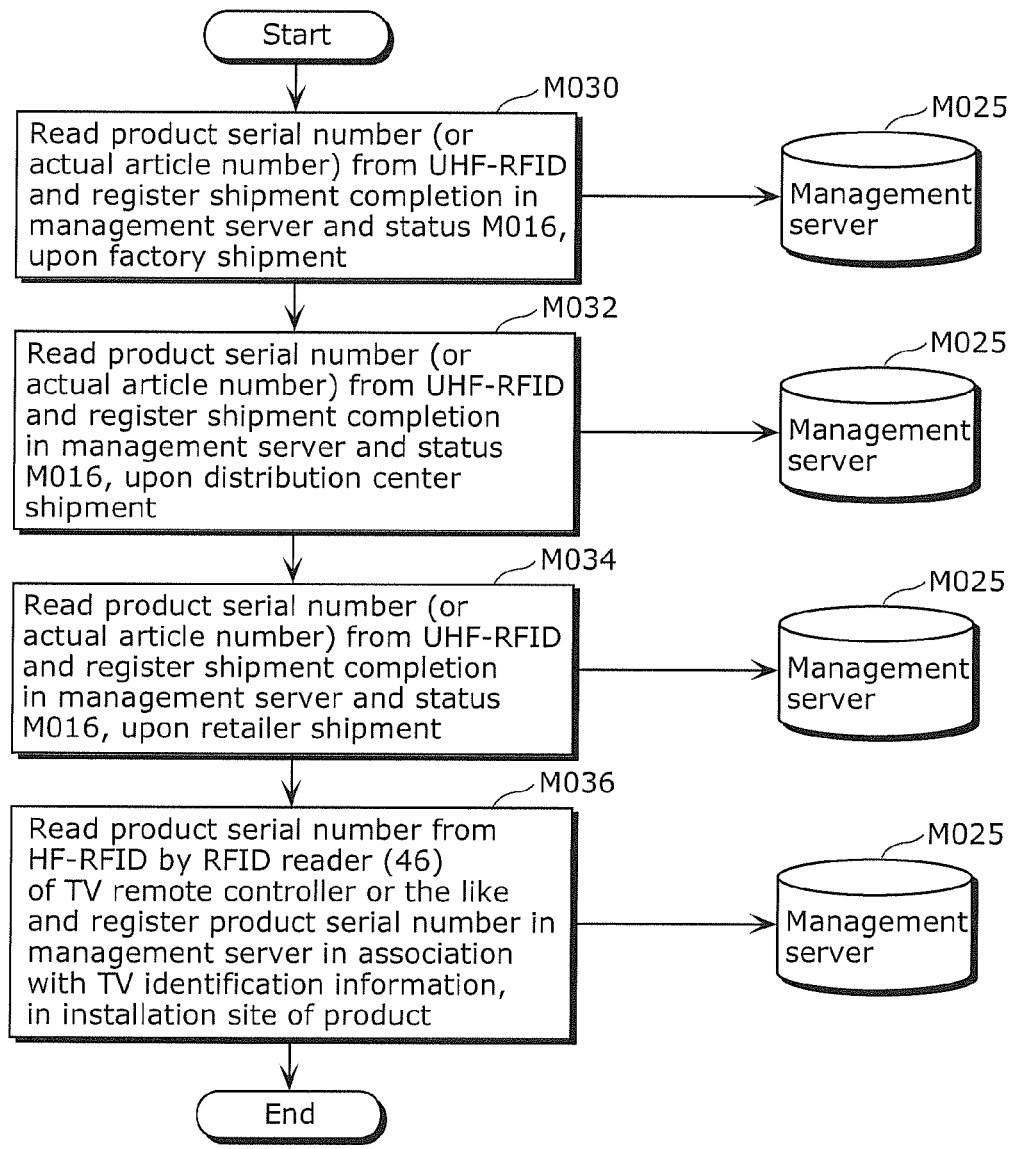
FIG. 110 is a flowchart of a flow of processing in a distribution process of the apparatus M003.
Figure 111:
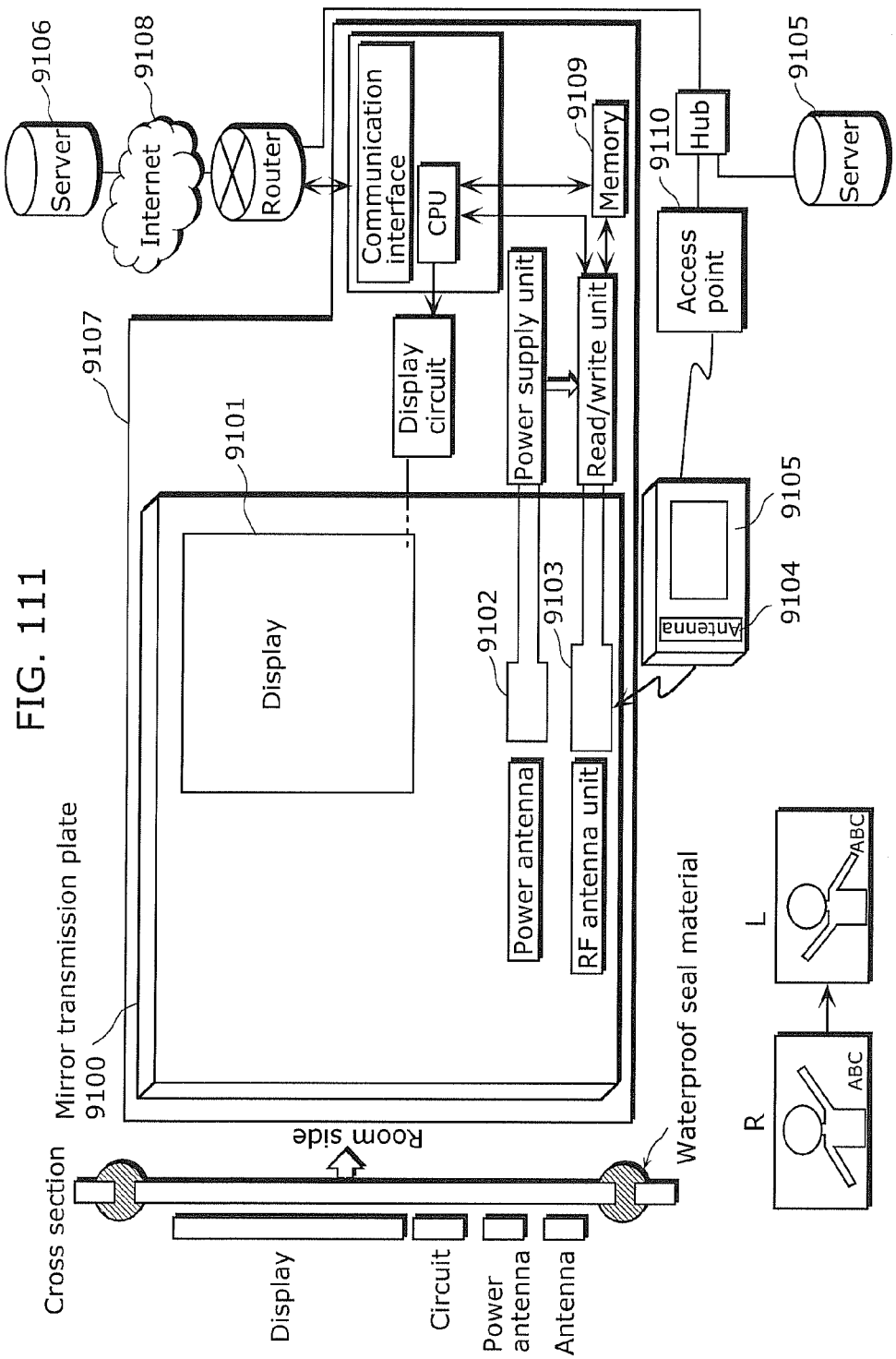
FIG. 111 is a block diagram illustrating a structure of an entire system.
Figure 112:
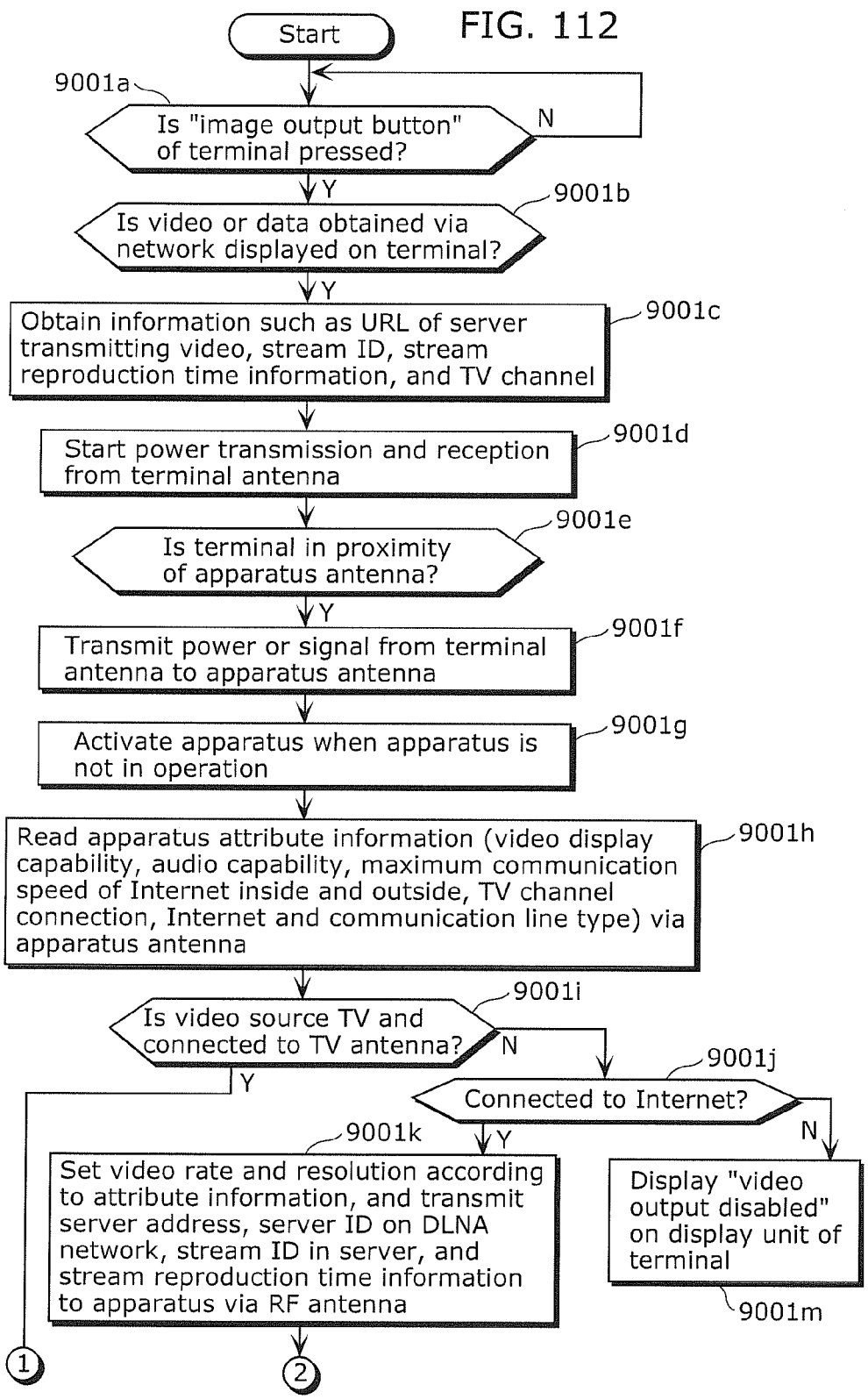
FIG. 112 is a flowchart (first half) of a procedure of moving video to a display of a mirror.

See, for example, FIGS. 1 to 39 for Embodiment A1, FIGS. 40 to 47 for Embodiment A2, FIGS. 48 to 58 for Embodiment A3, FIGS. 59 to 62 for Embodiment A4, FIGS. 63 to 70 for Embodiment A5, FIGS. 71 to 76 for Embodiment A6, FIGS. 77 to 87 for Embodiment A7, FIGS. 88 to 102 for Embodiment A8, FIGS. 103 to 104 for Embodiment A9, FIG. 105 for Embodiment A10, FIG. 106 for Embodiment A11, FIGS. 107 to 111 for Embodiment A12, and FIGS. 112 to 113 for Embodiment A13.

See, for example, FIGS. 114 to 119 for Embodiment B1, FIGS. 120 to 126 for Embodiment B2, FIGS. 127 to 130 for Embodiment B3, FIGS. 131 to 148 for Embodiment B4, FIGS. 149 to 157 for Embodiment B5, FIGS. 158 to 162 for Embodiment B6, and FIGS. 163 to 164 for Embodiment B7.

Figure 40A:
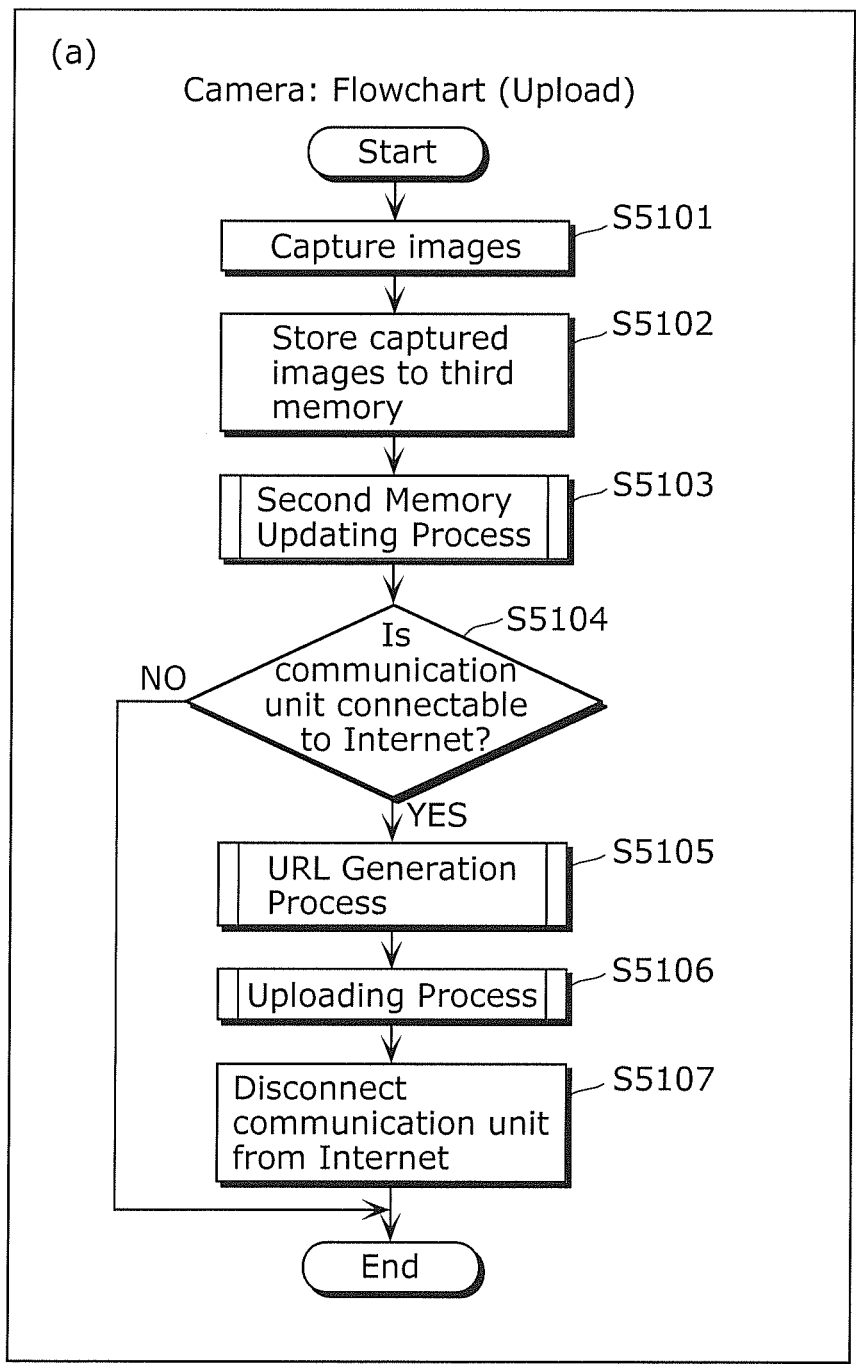
FIG. 40A is a flowchart of uploading steps in a camera according to Embodiment A2.
Figure 40B:
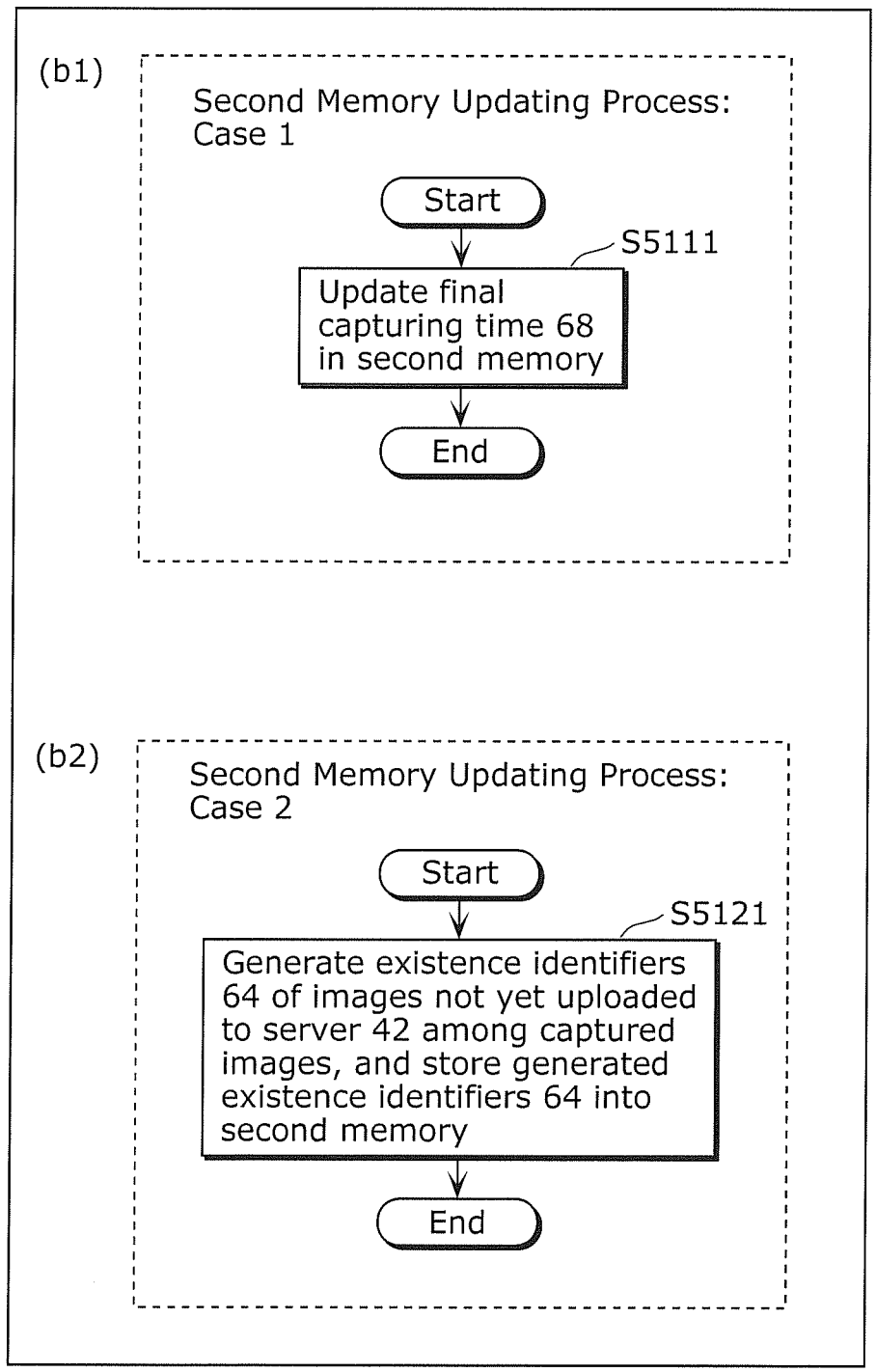
FIG. 40B is a flowchart of uploading steps in the camera according to Embodiment A2.
Figure 40C:
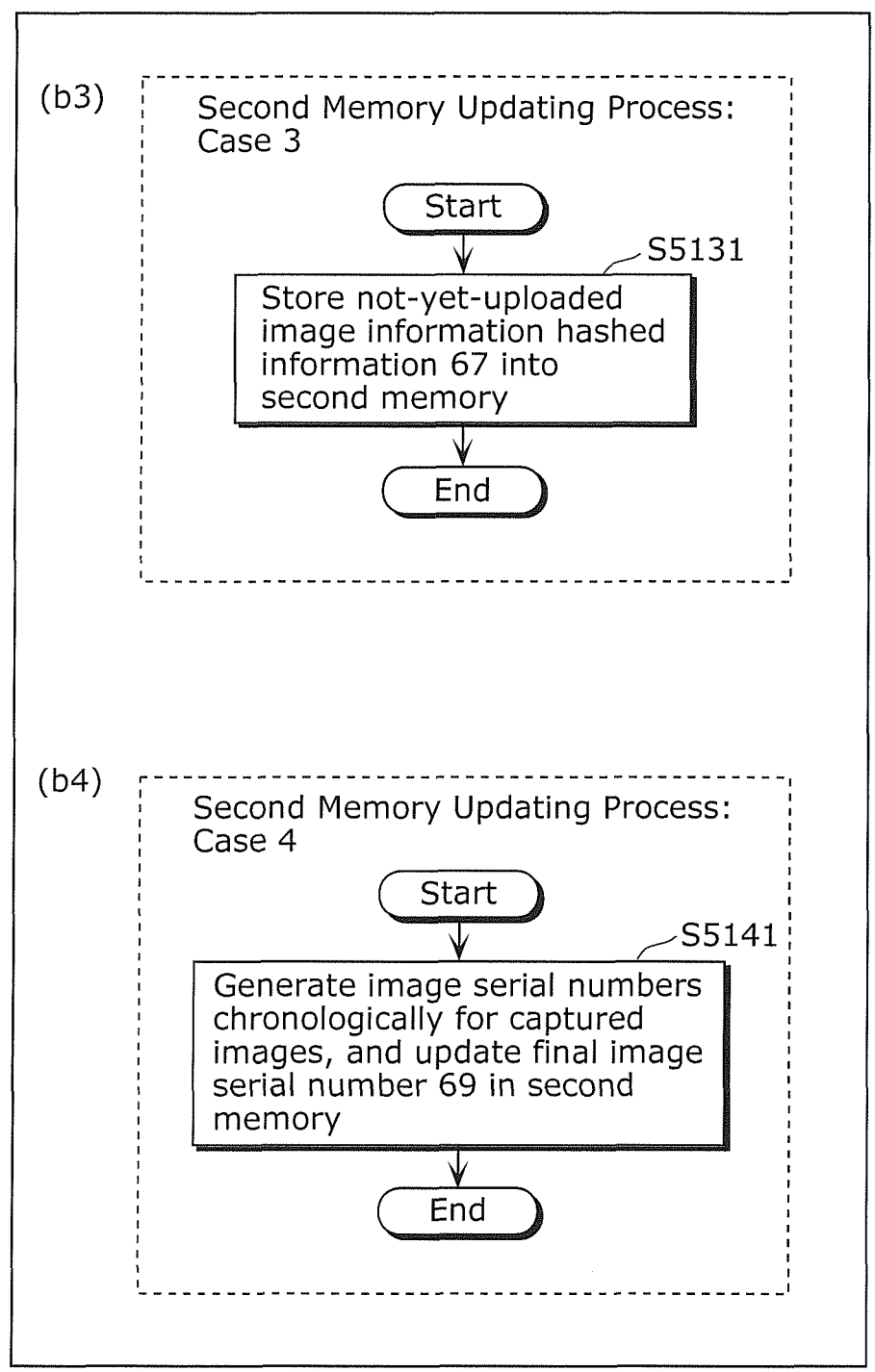
FIG. 40C is a flowchart of uploading steps in the camera according to Embodiment A2.

Here, the whole drawing including FIGS. 40A, 40B, and 40C (e.g. each of FIGS. 40A, 40B, and 40C) is referred to as "FIG. 40" when necessary. The same applies to FIGS. 42A to 42D and the like.

For example, each apparatus (device) (Embodiments A (A1 to A13) and B (B1 to B7), other variations) may be implemented as follows. The components of the apparatus may typically be realized by Large Scale Integration (LSI) as an integrated circuit. The components may each be implemented individually as one chip, or may be partly or wholly implemented on one chip. The integrated circuit may be referred to as any of IC, system LSI, super LSI, ultra LSI, or the like, depending on the degree of integration. The integrated circuit according to the embodiments may be referred to as any of these terms. Moreover, the integrated circuit method is not limited to LSI, and may be realized by a dedicated circuit or a general-purpose processor. A Field Programmable Gate Array (FPGA) or a reconfigurable processor capable of reconfiguring connections and settings of circuit cells in an LSI circuit may also be used.

Furthermore, if an integrated circuit technology that replaces the current semiconductor technology emerges from advancement of semiconductor technologies or other derivative technologies, such a technology can be used for the functional block integration. For instance, biotechnology may be adapted in this way.

Embodiment A

A communication device according to Embodiment A (Embodiments A1 to A13) may be a subordinate conception of the following communication device X (e.g. FIGS. 132, 135, 115, 116, 127).

The communication device X is a communication device (e.g. a mobile device N20 in FIGS. 135 and 132, a communication device Y02 in FIG. 127, a communication device M1101 in FIGS. 115 and 116, a communication device M1101S or M1101R in FIG. 120) that reads terminal device information from a terminal device (e.g. the TV N10A in FIGS. 134 and 135, a terminal device Y01 in FIG. 127) by proximity wireless communication (RF tag communication), and transmits the read terminal device information to a server apparatus (a registration server N40 in FIGS. 135 and 133, a server Y04 in FIG. 127) via a general-purpose network (a home network N100 or an external network N101 in FIG. 135). In detail, the communication device X includes: a terminal device information obtainment unit (a RF-ID reader/writer N21 in FIGS. 135 and 132, a device UID obtainment unit M1202 in FIG. 116) that obtains the terminal device information (information in a memory N13 in FIG. 131, product information in (a) in FIG. 137, information in a ROM Y015 in FIG. 127) from the terminal device (e.g. the TV N10A in FIG. 134) by the proximity wireless communication, the terminal device information including at least terminal device identification information for identifying manufacturing information of the terminal device; a communication device information storage unit (e.g. a memory unit N25 in FIG. 132, a ROM Y025 in FIG. 127) that stores communication device information including at least communication device identification information (information in the memory unit N25 in FIG. 132, a product serial number stored in the ROM Y025 in FIG. 127) for identifying manufacturing information of the communication device; an information adding unit (a CPU N34 in FIG. 132, a registration information generation unit M1204 in FIG. 116, an information adding unit Y035 in FIG. 127) that adds the stored communication device information to the obtained terminal device information, to generate transmission information (e.g. server registration information in (b) in FIG. 137) to be transmitted to the server apparatus, the transmission information (information including both the terminal device information and the communication device information) being obtained by adding the communication device information to the terminal device information; and a communication unit (a communication unit N30 in FIG. 132, a registration information transmitting/receiving unit M1207 in FIG. 116, a communication unit Y036 in FIG. 127) that transmits the transmission information generated by the information adding unit to the server apparatus via the general-purpose network. The communication unit specifies, as the server to which the transmission information is to be transmitted, the server (e.g. the registration server N40 in FIG. 135) indicated by the terminal device information based on the terminal device information (e.g. "address, of registration server" in the product information in (a) in FIG. 137) obtained from the terminal device (the TV N10A in FIG. 134), and communicates with the specified server.

Here, the communication device X may further include a position information obtainment unit (a GPS N31 or a 6-axis sensor N32 in FIG. 132, a position information obtainment unit M1206 in FIG. 116, a position information determination unit Y027 in FIG. 127) that obtains position information of the communication device. The position information obtainment unit may obtain the position information of the communication device at a timing when the proximity wireless communication between the terminal device (e.g. the TV N10A in FIG. 134) and the communication device is established in the terminal device information obtainment unit, wherein the communication device information includes the position information of the communication device obtained by the position information obtainment unit.

Moreover, the communication device information may include identification information (home ID) of a home (the home in FIG. 134) or a person (the user of the communication device).

The communication device X may have the following structure.

The communication device X is a mobile terminal that is included in a HEMS (a system in FIGS. 134 and 135) and carried by the user, thus having the same position as the user.

Of the case where a distance between the terminal device (e.g. the TV N10A in FIG. 134) and the communication device is a proximate distance less than a threshold and the case where the distance is a far distance not less than the threshold, the terminal device information obtainment unit performs the proximity wireless communication with the terminal device only in the case of the proximate distance.

The communication unit causes the server apparatus to perform processing (e.g. control of the terminal device) for the terminal device (the TV N10A in FIG. 134) with which the proximity wireless communication is performed, from among a plurality of terminal devices (e.g. a plurality of terminal devices in FIG. 134, or a plurality of terminal devices including a terminal device in a home other than the home in FIG. 134).

According to this structure, from among the terminal device (e.g. the TV N10A in FIG. 134) into proximity of which the communication device is moved and other terminal devices (e.g. a terminal device in another home), control or the like is easily performed only for the terminal device in the proximate distance, and not for the other terminal devices. Thus, control or the like is performed only for an appropriate terminal device. This ensures that processing is performed only for an appropriate terminal device.

Such control or the like only for an appropriate terminal device can be achieved simply by moving the communication device into proximity of the terminal device, without requiring a complex operation. Hence, it is possible to easily perform appropriate processing, i.e., processing only for an appropriate terminal device.

The terminal device information obtainment unit also obtains, from the terminal device (e.g. the TV N10A in FIG. 134), the terminal device information for specifying the server apparatus from among a plurality of server apparatuses, by the proximity wireless communication.

The communication unit then causes the server apparatus specified by the terminal device information obtained by the terminal device information obtainment unit, to perform the above-mentioned processing such as control.

This ensures that processing by an appropriate server apparatus is performed regardless of any factor outside the terminal device (the TV N10A).

The communication device further includes a home ID transmission unit (a home ID management unit M1205 in FIG. 116) that specifies the home (the home in FIG. 134) in which the communication device is used from among a plurality of homes, and transmits, to the server apparatus, a home ID for specifying each appliance (appliances in FIG. 134) installed in the home (the home in FIG. 134) specified by the home ID from among a plurality of appliances (the appliances in the home in FIG. 134, appliances in another home), to cause the server apparatus to specify that the terminal device (the TV N10A) with which the proximity wireless communication is performed is included in the appliances installed in the home.

Figure 116:
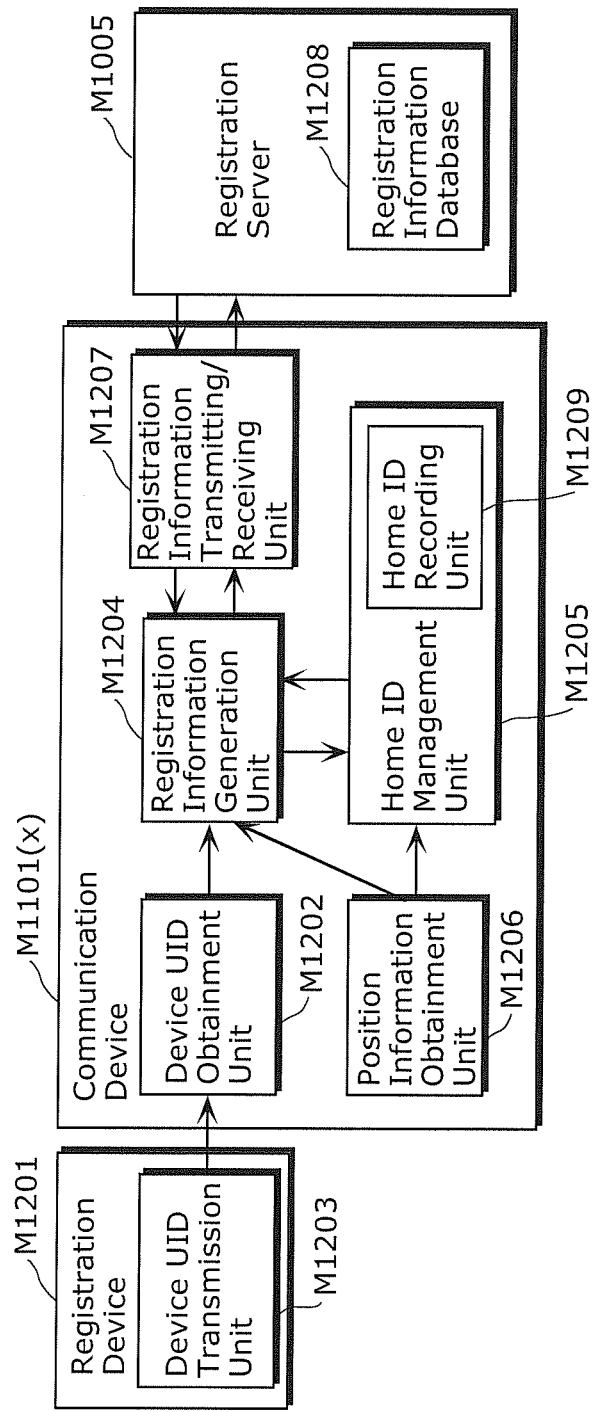

For example, the home ID may be transmitted to the server apparatus via a predetermined communication unit (e.g. the registration information transmitting/receiving unit M1207 in FIG. 116) that transmits the home ID.

The home ID transmission unit may cause the server apparatus to specify that the terminal device (the TV N10A) is included in the appliances installed in the home, to thereby cause the server apparatus to specify a map (a product map in FIG. 144) in which the terminal device (the TV N10A) is included in products whose positions are indicated to the user, as a product map (the product map in FIG. 144).

The home ID transmission unit may also cause the server apparatus to specify that the terminal device (the TV N10A) is included in the appliances (the appliances in FIG. 134), to thereby cause the server apparatus to perform, on the terminal device (the TV N10A), processing (e.g. processing of powering ON an appliance nearest the user) to be performed for each of the appliances.

The communication device further includes the position information obtainment unit (mentioned above) that obtains a position of the terminal device (the TV N10A) with which the proximity wireless communication is performed, and causes the server apparatus to specify the obtained position as the position of the terminal device, where the position of the terminal device is the same position as the communication device.

According to this structure, merely by moving the communication device to an appropriate position (the position of the TV N10A), it is possible to easily cause the server apparatus to perform processing in accordance with the position of the terminal device (the TV N10A).

The communication device Y02 in FIG. 127 may be a subordinate conception (a specific example) of the communication device X.

Embodiment A1

Embodiment A1 is described below.

FIG. 1 is a schematic diagram of Embodiment A1.

Here, a communication system including an image capturing device (camera) 1 (a communication device 9A1), a TV 45, and a server (image server) 42 is illustrated. In FIG. 1, the image capturing device 1 capturing images is illustrated on a left-hand side, while the image capturing device 1 reproducing the captured images is illustrated on a right-hand side.

The image capturing device 1 is an example of the communication device according to the aspect of the present invention. Here, the image capturing device 1 is implemented as a digital camera.

For units used in capturing images (see the left-hand side in FIG. 1), the image capturing device 1 includes a first power supply unit 101, a video processing unit 31, a first antenna 20, a first processing unit 35, a second memory 52, and a RF-ID second antenna 21. The second memory 52 holds medium identification information 111, captured image state information 60, and server specific information 48. The RF-ID antenna 21 is used for a RF-ID unit.

For units used in reproducing images (see the right-hand side in FIG. 1), the image capturing device 1 includes the first power supply unit 101, a first memory 174, a power detection unit 172, an activation unit 170, the second memory 52, a second processing unit 95, a modulation switch unit 175, a communication unit 171, a second power supply unit 91, and the RF-ID antenna 21. The second memory 52 holds medium identification information 111, captured image state information 60, and the server specific information 58.

The TV 45 is an example of an apparatus (device) connected with a reader via a communication path. In more detail, the TV 45 is a television receiving apparatus used to display image data captured by the image capturing device 1. The TV 45 includes a display unit 110 and a RF-ID reader/writer 46.

The server 42 is a computer that holds image data uploaded from the image capturing device 1 to the server 42 and that downloads the image data to the TV 45. The server 42 has a storage device in which data (image data) 50 is stored.

When images of objects such as scenery are captured by the image capturing device 1, the images are converted to captured data (image data) by the video processing unit 31. Then, in communicable conditions, the image data is wirelessly transmitted to an access point using the first antenna 20 for a wireless Local Area Network (LAN) or Worldwide Interoperability for Microwave Access (WiMAX), and eventually recorded as the data 50 via, for example, the Internet to the predetermined server 42.

Here, the first processing unit 35 records the captured image state information 60 regarding the captured image data onto the second memory 52 in a RF-ID unit 47 in the image capturing device 1. The captured image state information 60 recorded by the first processing unit 35 or the like indicates at least one of (a) date and time of capturing each of the images, (b) the number of the captured images, (c) date and time of finally transmitting (uploading) an image, (d) the number of transmitted (uploaded) images, and (e) date and time of finally capturing an image. In addition, the captured image state information 60 includes (f) serial numbers of images that have already been uploaded or images that have not yet been uploaded; (g) a serial number of a finally captured image; and the like.

In addition, the first processing unit 35 generates a Uniform Resource Locator (URL) of the data 50 that is uploaded to the server 42. The first processing unit 35 records the server specific information 48 (URL) onto the second memory 52. The server specific information 48 is used to access the image data (the data 50 in FIG. 1). The medium identification information 111 is also recorded on the second memory 52. The medium identification information 111 is used to determine whether the device embedded with the RF-ID (RF-ID unit 47) is a camera, a card, or a post card.

When a main power (the first power supply unit 101 such as a battery) of the camera (the image capturing device 1) is ON, the second memory 52 receives power from the main power. Even if the main power of the camera is OFF, the external RF-ID reader/writer located outside supplies power to the RF-ID antenna 21 of the RF-ID unit 47. This enables the passive second power supply unit 91 without any power like a battery to adjust a voltage to provide power to respective units in a RF-ID circuit unit including the second memory 52. Thereby, it is possible to supply power to the second memory 52 so that the data in the second memory 52 is recorded/reproduced and transmitted/received by the image capturing device 1.

Here, the second power supply unit 91 is a circuit generating power from radio waves received by the second antenna 21. The second power supply unit 91 includes a rectifier circuit and the like. Whenever the main power is ON or OFF, the data in the second memory 52 is read and written by the second processing unit 95. When the main power is ON, the data in the second memory 52 can be read and written also by the first processing unit 35. In other words, the second memory 52 is implemented as a nonvolatile memory, and both the first processing unit 35 and the second processing unit 95 can read and write data from and to the second memory 52.

When the image capturing device 1 completes capturing images of a trip or the like and then the captured images are to be reproduced, the following processing is performed as illustrated on the right side of FIG. 1 as being the situation of reproducing images. The image capturing device 1 is moved into proximity of the RF-ID reader/writer 46 of the TV 45, by the user of the image capturing device 1 or the like. Then, the RF-ID reader/writer 46 supplies power to the RF-ID unit 47 via the antenna 21. Based on the supplied power, the second power supply unit 91 provides power to the units in the RF-ID unit 47, even if the main power (the first power supply unit 101) of the image capturing device 1 is OFF.

The captured image state information 60 and the server specific information 58 are read by the second processing unit 95 from the second memory 52, and transmitted to the TV 45 via the antenna 21 by the second processing unit 95 or the like.

The TV 45 generates a URL based on the server specific information 58, then downloads the image data of the data 50 from the server 42 specified by the URL, and eventually displays, on the display unit 110, thumbnails or the like of images in the image data.

If it is determined based on the captured image state information 60 that there is any captured image not yet uploaded to the server 42, the determination result is displayed on the display unit 110. If necessary, the image capturing device 1 is activated to upload, to the server 42, image data of the captured image not yet uploaded.

Figure 2:
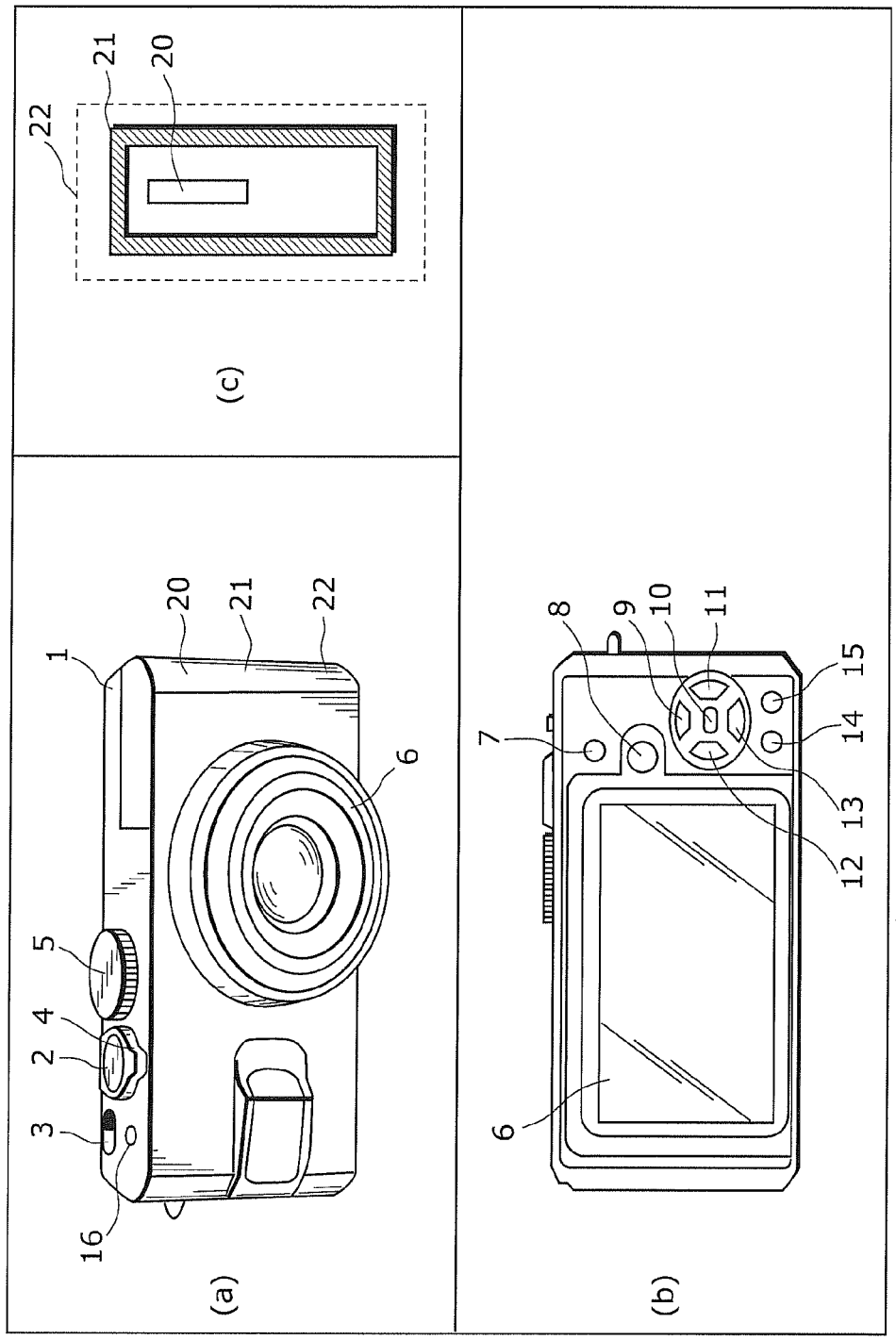
FIG. 2 is an external view of the image capturing device according to Embodiment A1.

FIG. 2 is an external view of the image capturing device 1.

(a), (b), and (c) in FIG. 2 are an external front view, an external back view, and an external right side view, respectively, of the image capturing device 1 according to the present invention.

As illustrated in (c) in FIG. 2, the antenna 20 used for a wireless LAN and the antenna 21 used for the RF-ID unit are embedded in a right side of the image capturing device 1. The antennas are covered with an antenna cover 22 made of a material not shielding radio waves.

The RF-ID unit operates at a frequency of 13.5 MHz, while the wireless LAN operates at a frequency of 2.5 GHz. The significant difference in frequency prevents interference between them.

Therefore, the two antennas 20 and 21 are seen overlapping with each other from the outside, as illustrated in (c) in FIG. 2. The structure decreases an installation area of the antennas, eventually reducing a size of the image capturing device 1.

The structure also enables the single antenna cover 22 to cover both of the two antennas as illustrated in (c) in FIG. 2, so that the part made of the material not shielding radio waves is minimized. The material not shielding radio waves, such as plastic, has a strength lower than that of a metal. Therefore, the minimization of the material can reduce a decrease in a strength of a body of the image capturing device 1. The image capturing device 1 further includes a lens 6 and a power switch 3. The units assigned with reference signs 2 to 16 will be described later.

Figure 3:
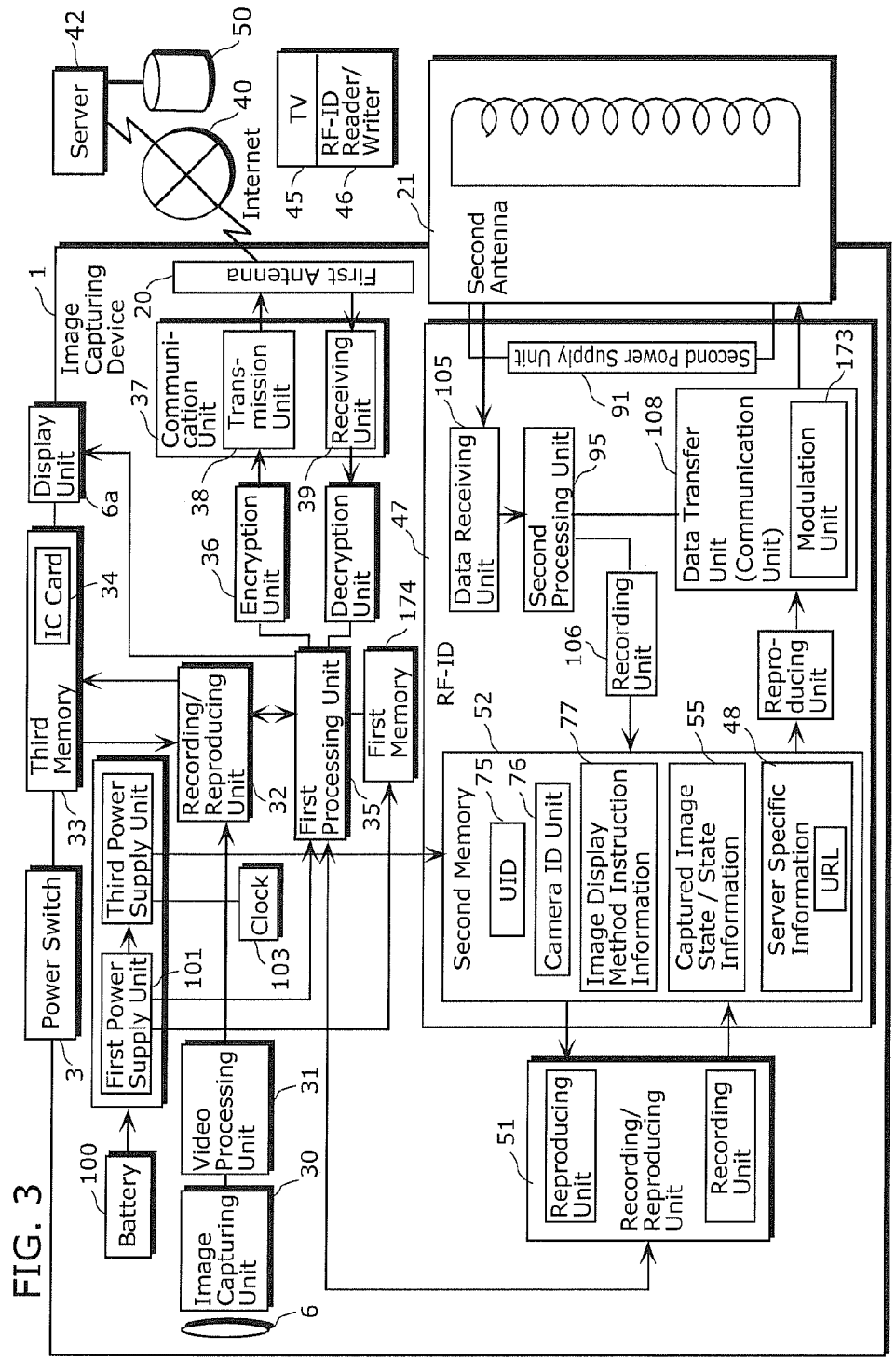
FIG. 3 is a block diagram of the image capturing device according to Embodiment A1.

FIG. 3 is a detailed block diagram of the image capturing device 1.

Image data captured by an image capturing unit 30 is provided to a recording/reproducing unit 32 via the video processing unit 31 and then recorded onto a third memory 33. The image data is eventually recorded onto an Integrated Circuit (IC) card 34 that is removable from the image capturing device 1.

The above processing is instructed by the first processing unit 35 that is, for example, a Central Processing Unit (CPU). The image data, such as captured photographs or video, is provided to an encryption unit 36, a transmission unit 38 in a communication unit 37, and then the first antenna 20, in order to be transmitted to an access point or the like by radio via a wireless LAN, WiMAX, or the like. From the access point or the like, the image data is transmitted to the server 42 via the Internet 40. In the above manner, the image data such as photographs is uploaded.

There is a situation where a part of the image data fails to be uploaded because, for example, the communication state is not good or there is no nearby access point or base station. In the situation, some images have already been uploaded to the server 42, and the other images have not yet been uploaded.

Therefore, the image data in the server 42 is different from the image data captured by the image capturing device 1.

In Embodiment A1 of the present invention, the RF-ID reader/writer 46 of the TV 45 or the like reads the server specific information 48 and the like from the second memory 52 in the RF-ID unit 47 of the image capturing device 1. Then, based on the readout information, a URL or the like of the server 42 is generated. According to the URL, the TV 45 accesses the server 42 to access the data 50 such as a file, folder, or the like uploaded by the image capturing device 1. Then, the TV 45 downloads the uploaded images from among the images captured by the image capturing device 1, and displays the downloaded images. The above method will be described in more detail later.

If a part or all of the captured images is not uploaded as image data of the data 50 in the server 42, a problem would occur that a user downloading the images to the TV 45 cannot watch a part of the images on the TV 45.

In order to solve the problem, in Embodiment A1 of the present invention, the first processing unit 35 causes a recording/reproducing unit 51 to indicate information regarding a state of captured images, such as information of uploading state, to the captured image state information 55 in the second memory 52.

Figure 4:
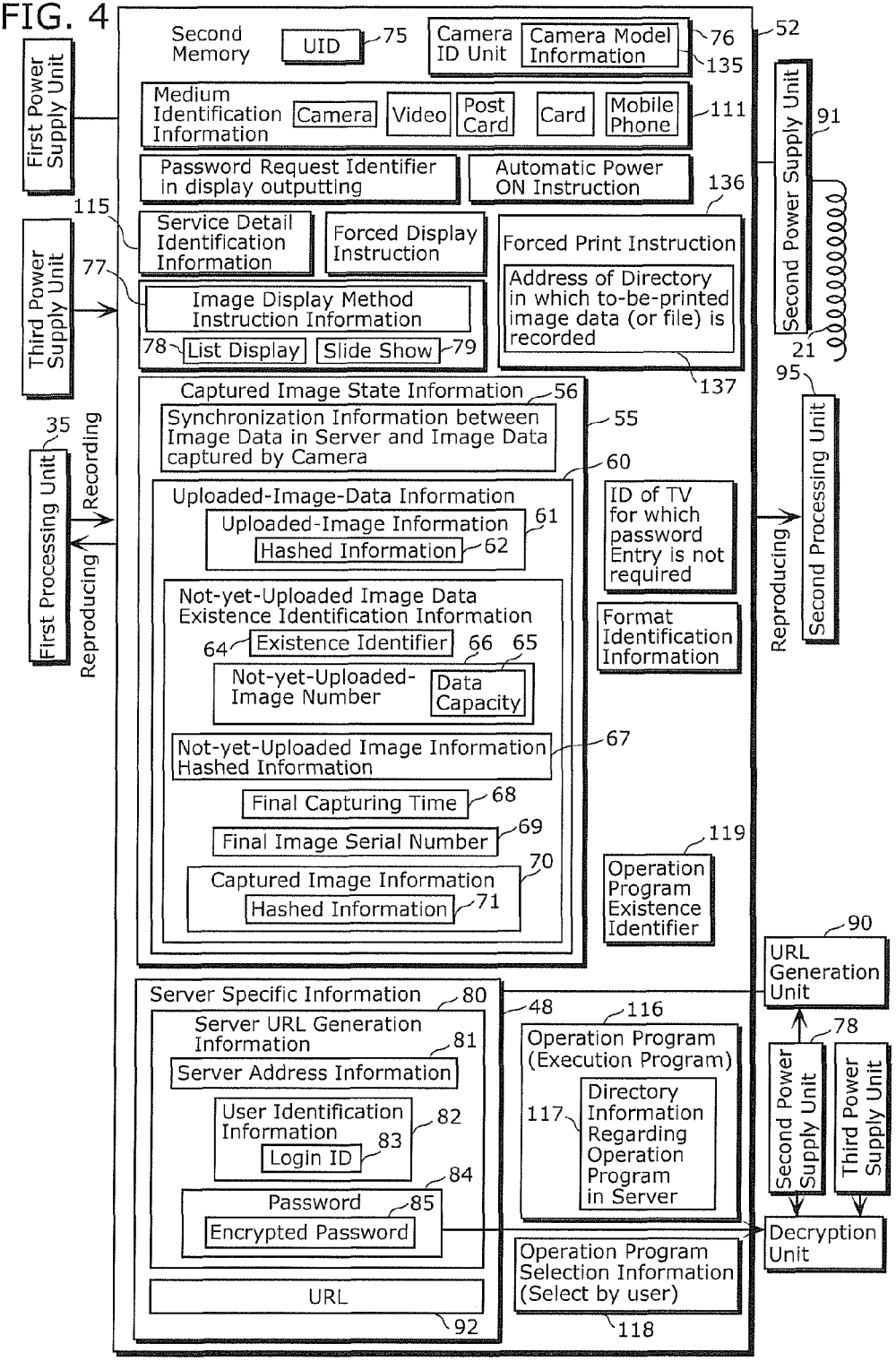
FIG. 4 is a block diagram of a second memory in the image capturing device according to Embodiment A1.

FIG. 4 is a block diagram of the second memory 52.

The above is described in more detail with reference to FIG. 4.

In the second memory 52, synchronization information 56 (FIG. 4) is recorded. The synchronization information 56 indicates whether or not image data in the server 42 matches image data captured by the camera, in other words, whether or not the image data in the server 42 is in synchronization with the image data captured by the camera.

In Embodiment A1 of the present invention, the TV 45 reads the captured image state information 55 from the second memory 52 via the second antenna 21.

The captured image state information 55 makes it possible to instantly determine whether or not the data 50 in the server lacks any image.

If the determination is made that there is any image that has not yet been uploaded, then the determination result is displayed on the display unit of the TV 45. Here, the TV 45 also displays a message of "Please upload images" to a viewer. Or, the TV 45 issues an instruction to the camera via the RF-ID antenna 21 to transmit an activation signal to the activation unit 170, thereby supplying power to the first power supply unit 101 of the image capturing device 1. Thereby, the TV 45 causes the image capturing device 1 to upload, to the server 42, the images in the first memory 174 or the like of the image capturing device 1, which have not yet been uploaded, via a wireless LAN, a wired LAN, the RF-ID antenna 21, or the like.

Since transmission via the RF-ID antenna 21 has a small transfer amount, transmission of the image data as originally captured takes a considerable time to upload and display the image data. This causes a user to feel unpleasant.

In order to avoid this, according to Embodiment A1 of the present invention, when the image data is transmitted via the RF-ID antenna 21, thumbnails of the images not yet uploaded are transmitted instead.

The thumbnails can shorten apparent upload time and display time, suppressing unpleasant feeling of the user.

Most of current RF-ID of a HF band has a transfer amount of several hundreds kbps. However, development of RF-ID having a quad-speed has been examined. The quad-speed RF-ID has a possibility of achieving a transfer amount of several Mbps. If thumbnails of images not yet uploaded are transmitted, it is possible to transmit several dozens of thumbnails in one second. If thumbnails are displayed in a list, thumbnails of all images including images not yet uploaded can be displayed on the TV within a time period a general user can tolerate. The above is one of practical solutions.

If the image capturing device is forced to be activated to upload images not yet uploaded as described above, the most speedy and stable path is selected from a wireless LAN, the RF-ID antenna 21, and a wired LAN, to be used for uploading and displaying on the TV.

In the situation where the image capturing device 1 receives power from the outside via the second antenna 21, the communication unit 171 transmitting signals to the second antenna 21 performs communication with the outside by a low-speed modulation method. On the other hand, in the situation where the image capturing device 1 can receive power from the first power supply unit 101 or the like, the communication unit 171 switches the modulation method to a modulation method having a large signal point, such as Quadrature Phase Shift Keying (QPSK), 16-Quadrature Amplitude Modulation (QAN), or 64-QAN, as needed, in order to achieve high-speed transfer to upload the image data not yet uploaded in a short time.

Furthermore, when the power detection unit 172 detects, for example, that the first power supply unit 101 or the like does not have enough power or that the image capturing device 1 is not connected to an external power, the first power supply unit 101 stops supplying power and the modulation switch unit 175 switches the modulation method employed by the communication unit 171 to a modulation method having a smaller signal point or less transfer rate. As a result, it is possible to prevent that the capacity of the first power supply unit 101 is reduced to be equal to or less than a set value.

There is another solution for power. When power is not enough, the second processing unit 95, the communication unit 171, or the like sends a power increase request signal to the RF-ID reader/writer 46 of the TV 45 via the second antenna 21, to request for power support. In response to the request, the RF-ID reader/writer 46 increases providing power to have a value greater than the set value for the power used in reading data from the RF-ID unit. Since the RF-ID unit receives more power via the antenna 21, the RF-ID unit can provide power to the communication unit 171 or the first processing unit 35. Thereby, a power amount of a battery 100 for the first power supply unit 101 is not reduced. Or, without the battery 100, the image capturing device 1 can practically and unlimitedly continue transmission.

As still another method, uploaded-image-data information 60 in FIG. 3 can be used. In uploaded-image-data information 60, uploaded-image information 61 such as serial numbers of photographs, is recorded. It is also possible to use hashed information 62 generated by hashing the information 61. As a result, a data amount is reduced.

The TV 45 can read the above information to be compared to information of images captured by the camera, thereby obtaining information of images not yet uploaded.

As still another method, not-yet-uploaded image data existence identification information 63 can be used. The not-yet-uploaded image data existence identification information 63 includes an existence identifier 64 indicating whether or not there is any image not yet uploaded. Since existence of images not yet uploaded is notified, data in the second memory 52 can be significantly reduced.

It is also possible to use not-yet-uploaded-image number 65 indicating the number of images not yet uploaded. Since the image capturing device 1 allows the TV 45 to read the information, a viewer can be informed of the number of images to be uploaded. In this case, a data capacity in addition to the number is recorded as the captured image state information 55. Thereby, the image capturing device 1 enables the TV 45 to display a more exact prediction time required to upload images not yet uploaded.

It is also possible to use not-yet-uploaded image information hashed information 67 that is generated by hashing information regarding images not yet uploaded.

In addition, it is also possible to record a final capturing time (final capturing date/time) 68 in the second memory 52. Later, the TV 45 reads the final capturing time 68. The TV 45 is connected to the server 42 to compare the final capturing time 68 to a capturing date of an image that has been finally uploaded to the server 42. Thereby, it is possible to easily determine whether or not there is any image not yet uploaded.

If images are captured and assigned with serial numbers sequentially from an older image, it is possible to record only a final image serial number 69. The final image serial number 69 is compared to a serial number of an image that has been finally uploaded to the server 42. Thereby, it is possible to determine whether or not there is any image not yet uploaded.

It is also possible to record, onto the second memory 52, captured image information 70 (e.g. serial numbers of all captured images). Thereby, the TV 45 later accesses the server 42 to match the serial numbers to images uploaded to the server 42. As a result, it is possible to determine whether or not there is any image not yet uploaded. When the captured image information 70 is used, use of hashed information 71 generated by hashing the captured image information 70 can compress the captured image information 70.

Figure 22:
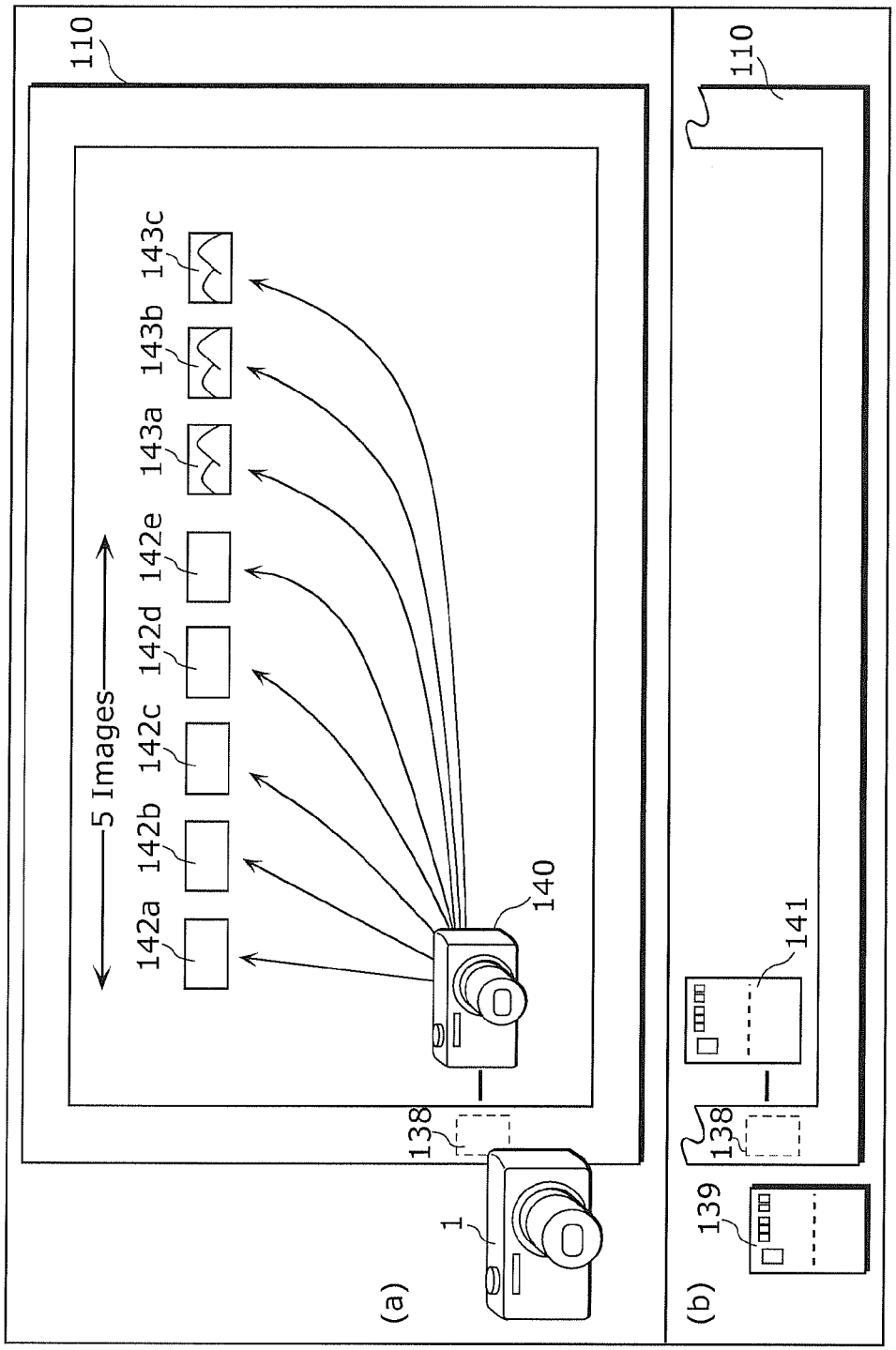
FIG. 22 is a diagram presenting a display method of the image capturing device and the TV, according to Embodiment A1.

The second memory 52 further stores Unique IDentification (UID) 75 of the RF-ID unit, camera ID 76, and the medium identification information 111. Even if the main power of the camera (except a sub-power for backup etc. of a clock) is OFF, these pieces of information can be read by the TV 45 via the second antenna 21 to be used for identifying the camera or the user or authenticating a device (apparatus). When the user comes back from an overseas trip or the like, the camera is likely to have a small charge amount of the battery. However, according to Embodiment A1 of the present invention, the camera can be operated to transmit information without battery, which is highly convenient for the user. The medium identification information 111 includes an identifier or the like indicating whether the medium or device embedded with the RF-ID unit is a camera, a camcorder, a post card, a card, or a mobile phone. The identifier enables the TV 45 to identify the medium or device. Thereby, the TV 45 can display a mark or icon of the camera or postcard on a screen as illustrated in FIG. 22, as will be described. The TV 45 can also change processing depending on the identifier.

Figure 5:
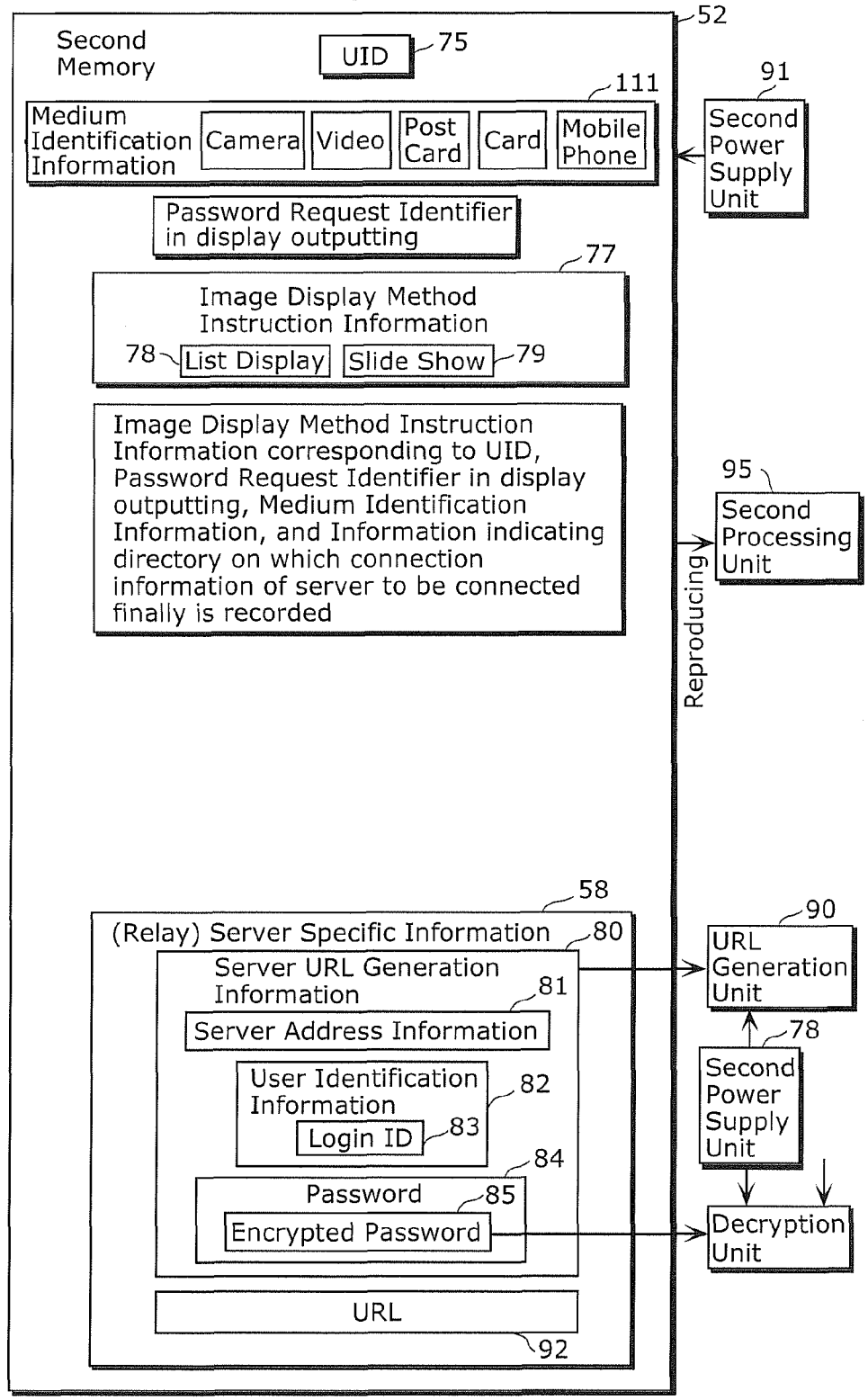
FIG. 5 is a block diagram of the second memory in the image capturing device according to Embodiment A1.

FIG. 5 is a block diagram of the second memory in the image capturing device according to Embodiment A1.

The second memory 52 also stores image display method instruction information 77. For example, in the situation where a list display 78 (information of whether or not to perform list display) in FIG. 5 is selected, when the second antenna 21 is moved into proximity of the RF-ID reader/writer 46 of the TV 45, the image capturing device 1 (camera) causes the TV 45 to display a list of thumbnails of images, such as photographs.

In the situation where slide show 79 is selected, the image capturing device 1 causes the TV 45 to sequentially display images from a newer one or an older one.

In a lower part of the second memory 52 in FIG. 5, there is a region for recording the server specific information 48.

The server specific information 48 allows a camera operator to display images on the TV screen by a preferred method.

The server specific information 48 includes server URL generation information 80 that is source information from which a server URL is generated.

An example of the server URL generation information 80 is login ID 83. The server specific information 48 has a region in which server address information 81 and user identification information 82 are recorded. In practical, login ID 83 and the like are recorded. In addition, there is a region for storing a password 84. An encrypted password 85 may be stored in the region. The above pieces of information are used to generate an URL by a URL generation unit 90 that is provided in the image capturing device 1, the RF-ID unit 47, the camera function used for capturing images in the image capturing device 1, or the TV 45. The URL is used for accessing a group of images corresponding to the image capturing device 1 or the user in the server 42. If the URL generation unit 90 (FIG. 5) is provided in the RF-ID unit 47, the URL generation unit 90 receives power from the second power supply unit 91.

It is also possible to generate URL 92 without using the above pieces of information and store the generated URL 92 directly to the second memory 52.

It is characterized in that the above-described pieces of information stored in the second memory 52 can be read by both the second processing unit 95 in the RF-ID unit and the first processing unit 35 in the camera function.

The above structure allows the TV 45 reading the RF-ID unit 47 in the camera to instantly obtain the pieces of information regarding uploading state, the sever address information, the login ID, the password, and the like. Thereby, the TV 45 can download image data corresponding to the camera from the server 42, and display the image data at a high speed.

In the above situation, even if the main power of the image capturing device 1 is OFF, the RF-ID reader/writer supplies power to the second power supply unit 91 to activate (operate) the image capturing device 1. Therefore, power of the battery 100 in the image capturing device 1 is not reduced.

Referring back to FIG. 3, the first power supply unit 101 receives power from the battery 100 to provide power to the units in the camera. In a quiescent state, however, a third power supply unit 102 provides weak power to the clock 103 and the like. In some cases, the third power supply unit 102 supplies backup power to a part of the second memory 52.

The RF-ID unit 47 receives power from the second antenna to provide power to the second power supply unit 91, thereby operating the second processing unit 95, or operating a data receiving unit 105, a recording unit 106, a reproducing unit 107, a data transfer unit 108 (the communication unit 171), and the second memory 52.

Therefore, in a quiescent state of the camera, no power is consumed. As a result, it is possible to keep the battery 100 of the camera longer.

The following describes processing in FIGS. 7 to 17.

Figure 7:
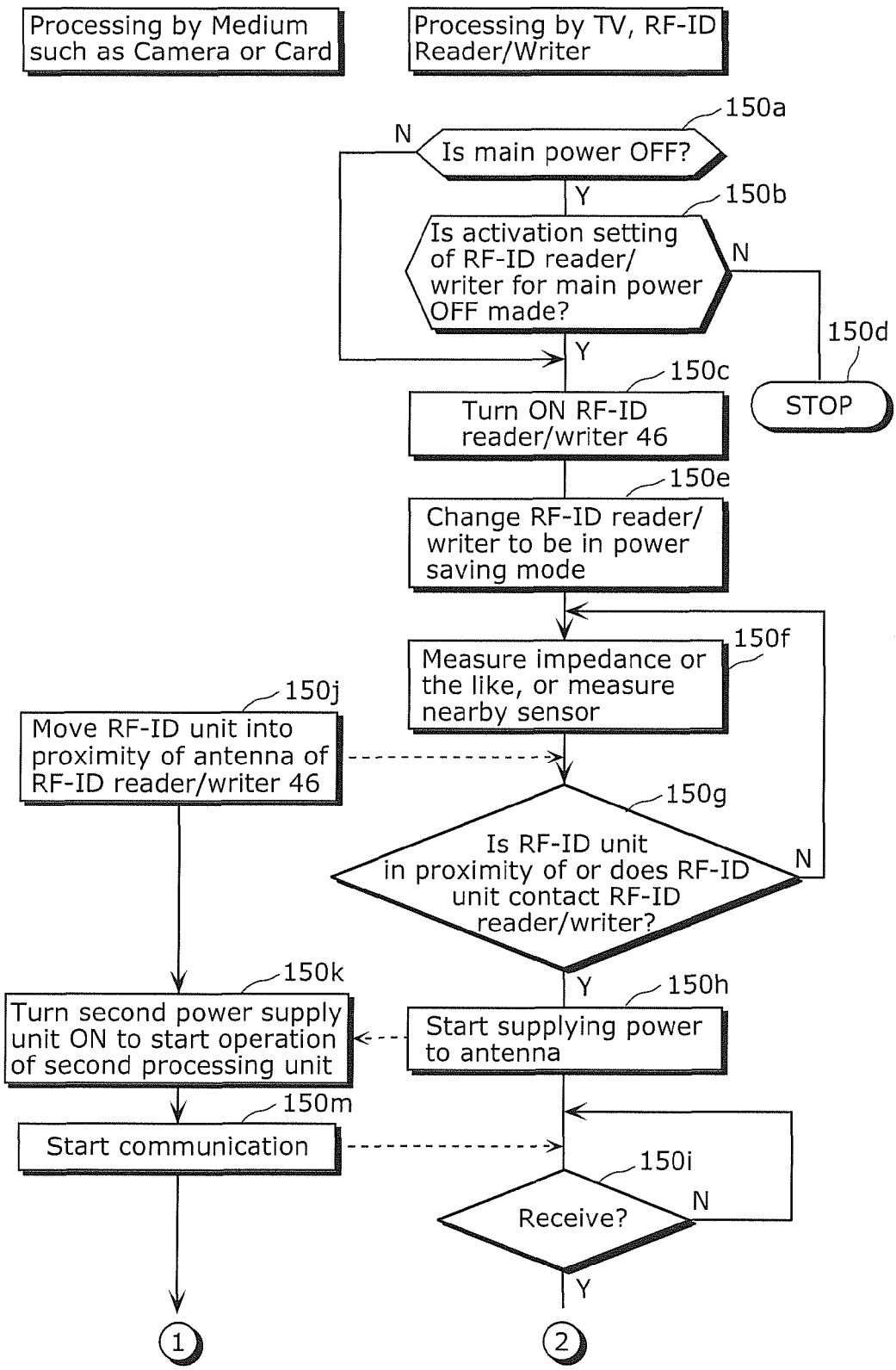
FIG. 7 is a flowchart of processing performed by the image capturing device and a TV, according to Embodiment A1.

FIG. 7 is a flowchart of processing performed by the camera or card and processing performed by the TV and the RF-ID reader/writer.

The processing performed by the image capturing device 1 (referred to also as a "medium" such as a camera or card) and the processing performed by the TV and the RF-ID reader/writer are explained with reference to a flowchart of FIG. 7.

If the main power is OFF at Step 150a in FIG. 7, it is determined at Step 150b whether or not activation setting of the RF-ID reader/writer for the main power OFF is made. If the activation setting is made, then the RF-ID reader/writer 46 is turned ON at Step 150c and changed to be in a power saving mode at Step 150e.

At Step 150f, impedance or the like of an antenna unit is measured, or a nearby sensor is measured. When the RF-ID unit is moved into proximity of an antenna of the RF-ID reader/writer 46 at Step 150g, it is detected at Step 150g whether or not the RF-ID unit is in proximity of or contacts the antenna. If it is detected that the RF-ID unit is in proximity of or contacts the antenna, then the RF-ID reader/writer 46 starts supplying power to the antenna of the medium at Step 150h. At Step 150k, in the medium, the second power supply unit is turned ON and thereby the second processing unit starts operating. At Step 150m, communication between the medium (camera or card) and the RF-ID reader/writer 46 starts.

Figure 8:
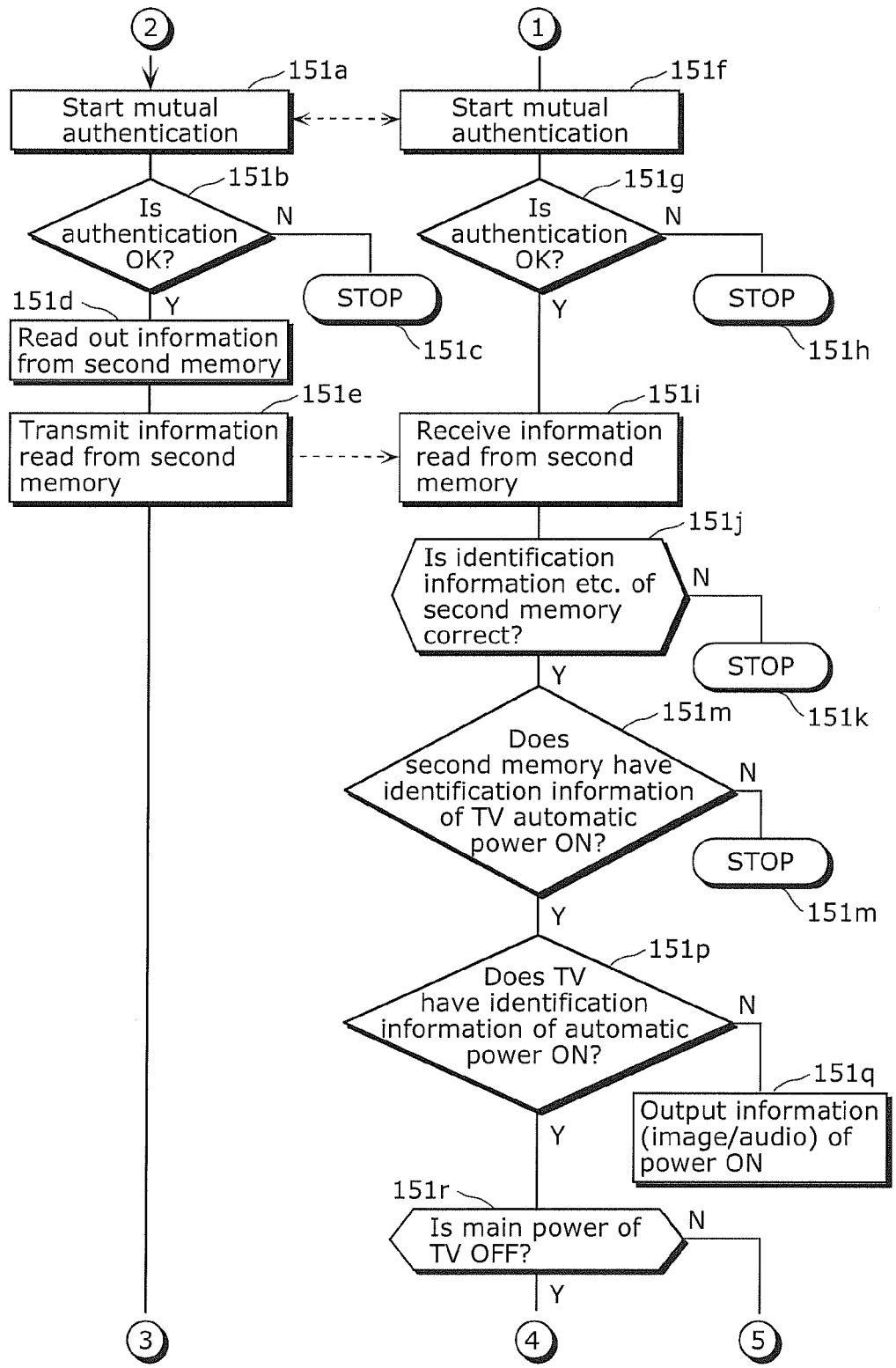
FIG. 8 is a flowchart of the processing performed by the image capturing device and the TV, according to Embodiment A1.

FIG. 8 is a flowchart of processing that follows the processing in FIG. 7.

When at Step 150, the TV determines whether or not the RF-ID reader/writer 46 receives communication from the medium. If the RF-ID reader/writer 46 receives communication, then mutual authentication starts at Steps 151a and 151f in FIG. 8. If it is determined at Steps 151b and 151g that the mutual authentication is successful, information is read out from the second memory at Step 151d. At Step 151e, the readout information is transmitted to the RF-ID reader/writer 46. At Step 151i, the RF-ID reader/writer 46 receives the information. At Step 151j, the TV 45 side makes a determination as to whether or not the identification information or the like of the second memory is correct. If the identification information or the like is correct, then it is determined at Step 151m whether or not the TV 45 has identification information indicating automatic power ON. If the TV 45 has identification information, then it is determined at Step 151r whether or not a main power of the TV is OFF.

Figure 9:
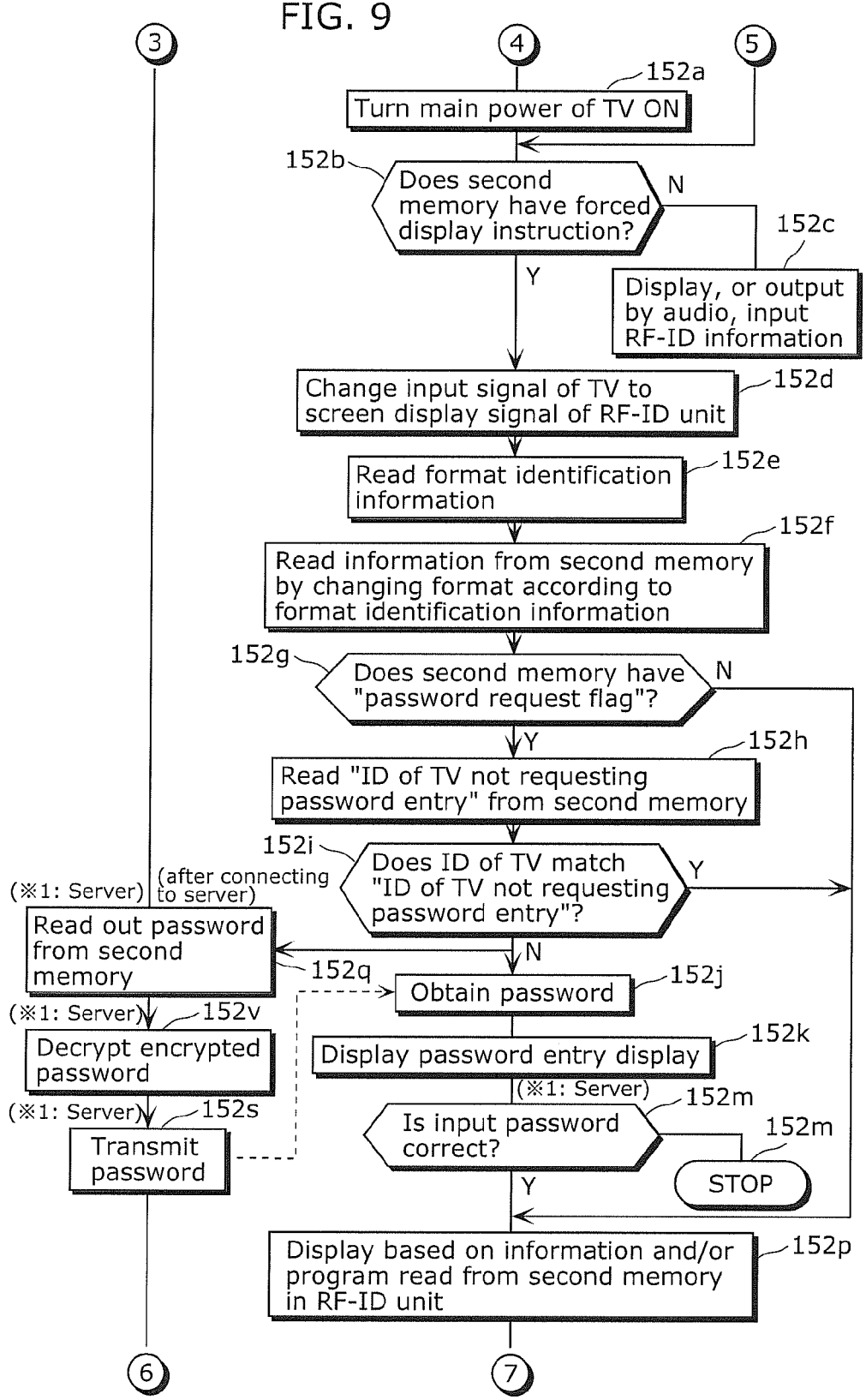
FIG. 9 is a flowchart of the processing performed by the image capturing device and the TV, according to Embodiment A1.

FIG. 9 is a flowchart of the processing performed by the image capturing device and the TV, according to Embodiment A1.

If the main power of the TV is OFF, the main power of the TV is turned ON at Step 152a of FIG. 9. At Step 152b, the TV 45 side makes a determination as to whether or not the second memory 52 has forced display instruction. If the second memory 52 has the forced display instruction, then the TV 45 side changes an input signal of the TV to a screen display signal for displaying the RF-ID at Step 152d. At Step 152e, the RF-ID reader/writer 46 reads format identification information. At Step 152f, the RF-ID reader/writer 46 reads information from the second memory by changing a format of the information to a format according to the format identification information. At Step 152g, the TV 45 side makes a determination as to whether or not the second memory has a "password request flag". If the second memory has the "password request flag", then the RF-ID reader/writer 46 reads an "ID of TV not requesting password entry" from the second memory at Step 152h. At Step 152i, the TV 45 side makes a determination as to whether or not ID of the TV 45 matches the "ID of TV not requesting password entry". If the ID of the TV 45 does not match the "ID of TV not requesting password entry", then the medium reads out a password from the second memory at Step 152q. At Step 152v, the medium decrypts the password that has been encrypted. At Step 152s, the medium transmits the decrypted password to the TV 45 side. Here, at Steps 152q, 152r, and 152s, it is also possible to store the password in a storage device in the server 42 as the data 50 in the server 42.

At Step 152j, the RF-ID reader/writer 46 receives the password. At Step 152k, the TV 45 displays a password entry screen. At Step 152m, the TV 45 determines whether or not the input password is correct. The determination may be made by the server 42. If the determination is made that the input password is correct, then the TV 45 performs display based on the information and program read from the second memory in the RF-ID unit at Step 152p.

Figure 10:
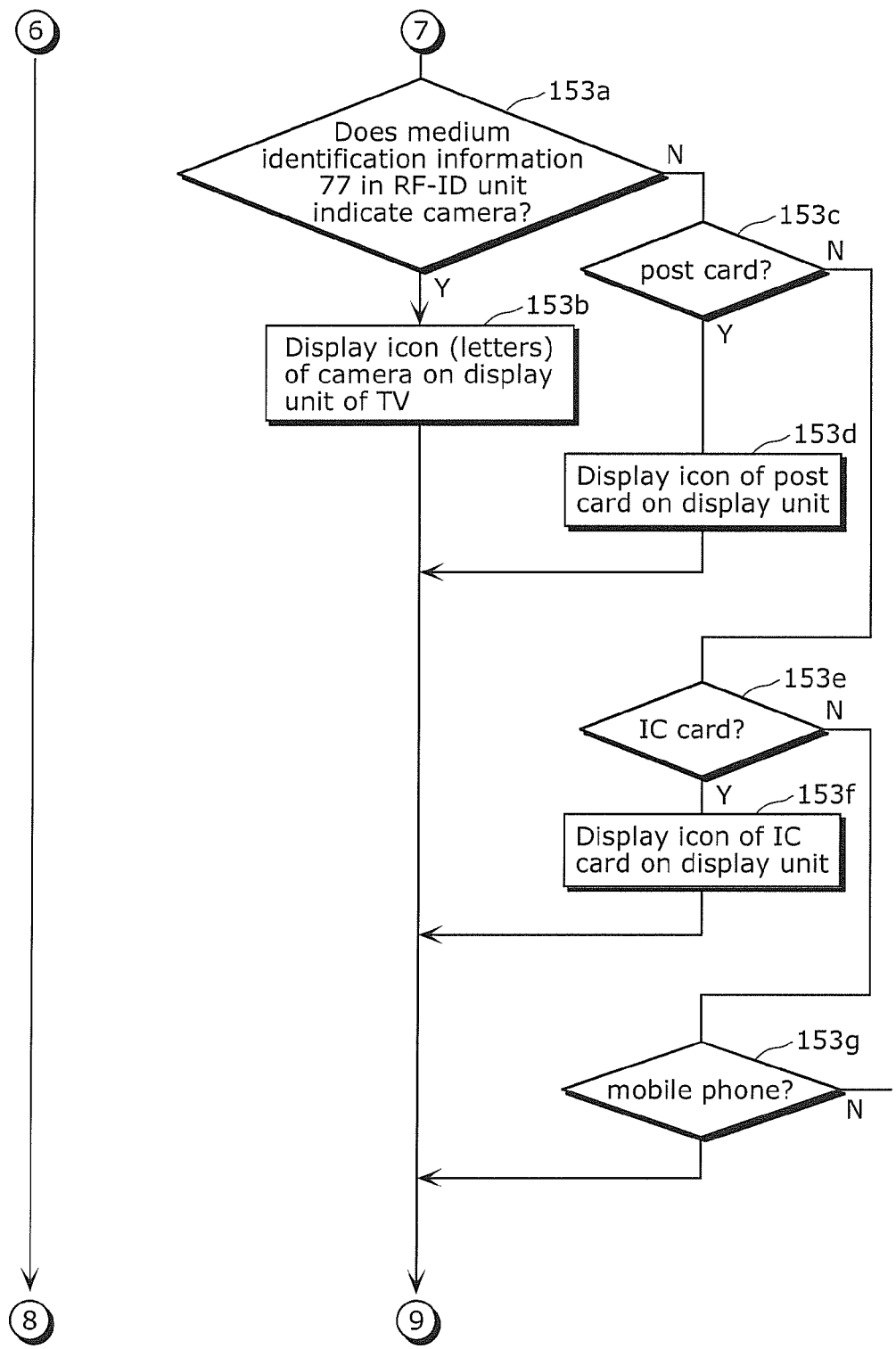
FIG. 10 is a flowchart of the processing performed by the image capturing device and the TV, according to Embodiment A1.

FIG. 10 is a flowchart of the processing performed by the image capturing device and the TV, according to Embodiment A1.

At Step 153a of FIG. 10, the TV 45 side determines whether or not the medium identification information 111 in the RF-ID unit in the second memory indicates that the medium is a camera. If the medium identification information 111 indicates a camera, then the TV 45 displays an icon (characters) of a camera (camera icon) on the display unit at Step 153b. On the other hand, if the medium identification information 111 does not indicate a camera, then it is determined at Step 153c whether or not the medium identification information 111 indicates a post card. If the medium identification information 111 indicates a post card, then the TV 45 displays an icon of a post card (post-card icon) at Step 153d. On the other hand, if the medium identification information 111 does not indicate a post card, the TV 45 further determines at Step 153e whether or not the medium identification information 111 indicates an IC card. If the medium identification information 111 indicates an IC card, then the TV 45 displays an icon of an IC card at Step 153f. On the other hand, if the medium identification information 111 does not indicate an IC card, the TV 45 still further determines at Step 153g whether or not the medium identification information 111 indicates a mobile phone. If the medium identification information 111 indicates a mobile phone, then the TV 45 displays an icon of a mobile phone on a corner of the TV screen.

Figure 11:
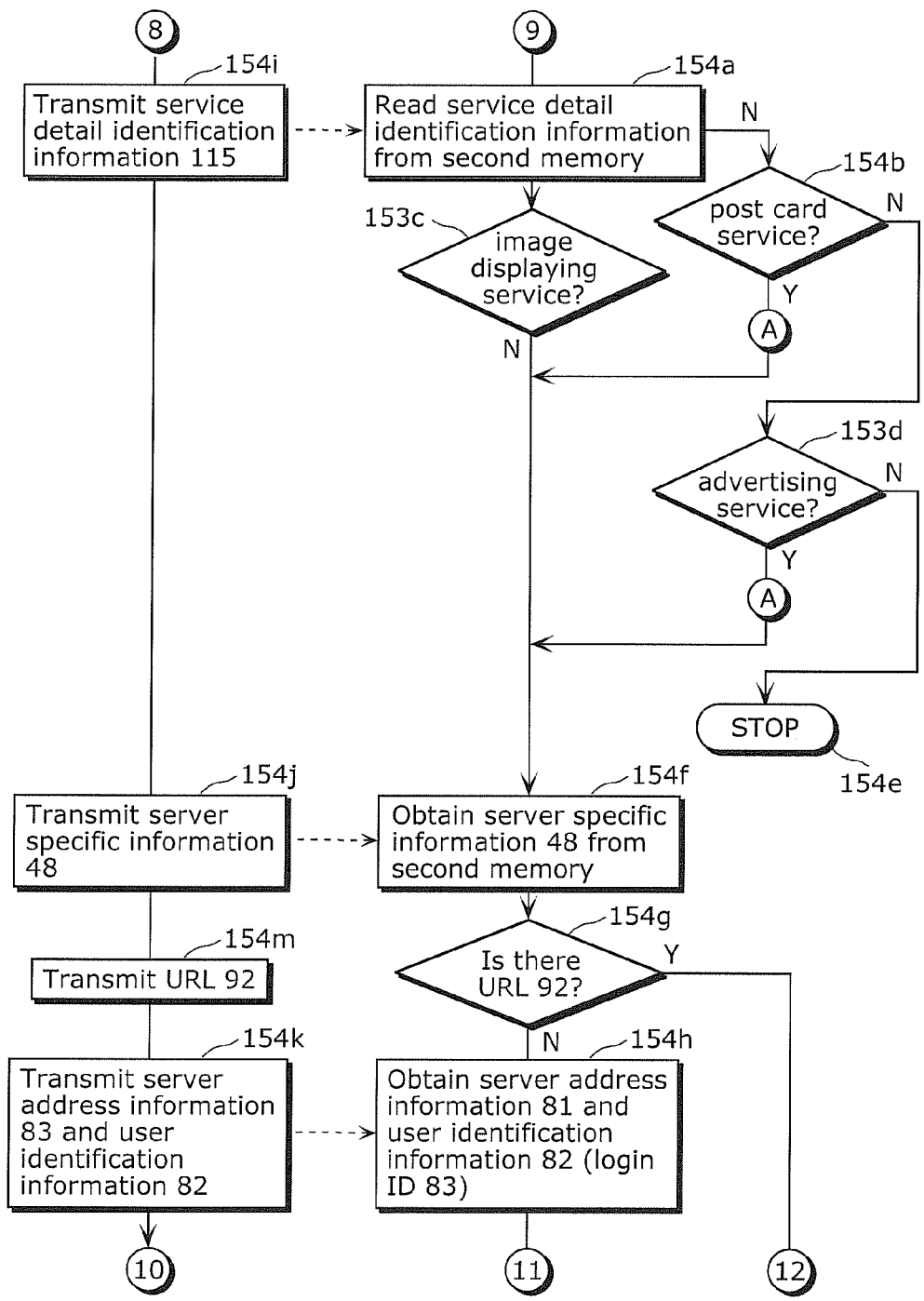
FIG. 11 is a flowchart of the processing performed by the image capturing device and the TV, according to Embodiment A1.

FIG. 11 is a flowchart of the processing performed by the image capturing device and the TV, according to Embodiment A1.

Figure 12:
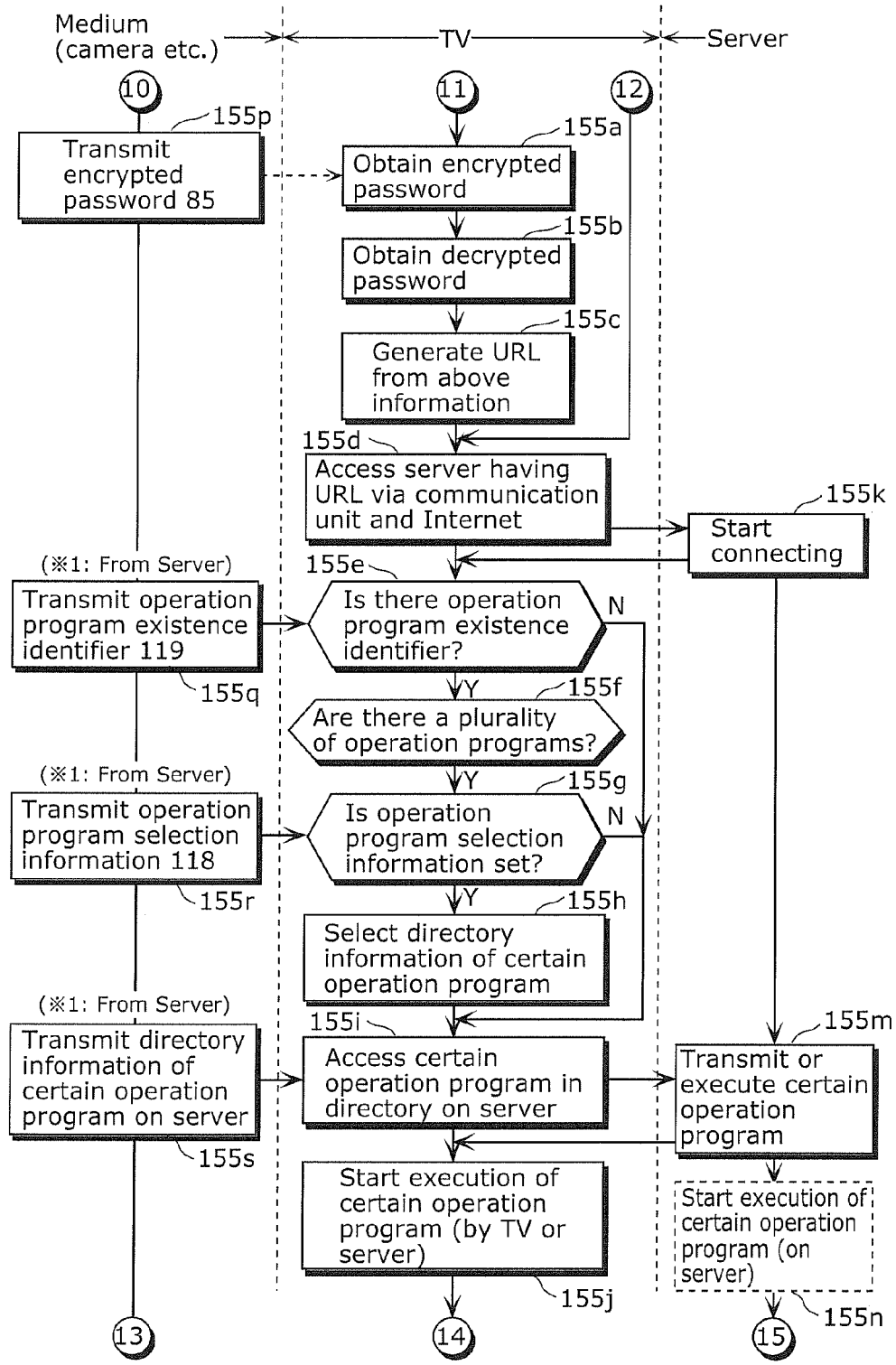
FIG. 12 is a flowchart of the processing performed by the image capturing device and the TV, according to Embodiment A1.

FIG. 12 is a flowchart of the processing performed by the image capturing device and the TV, according to Embodiment A1.

Figure 13:
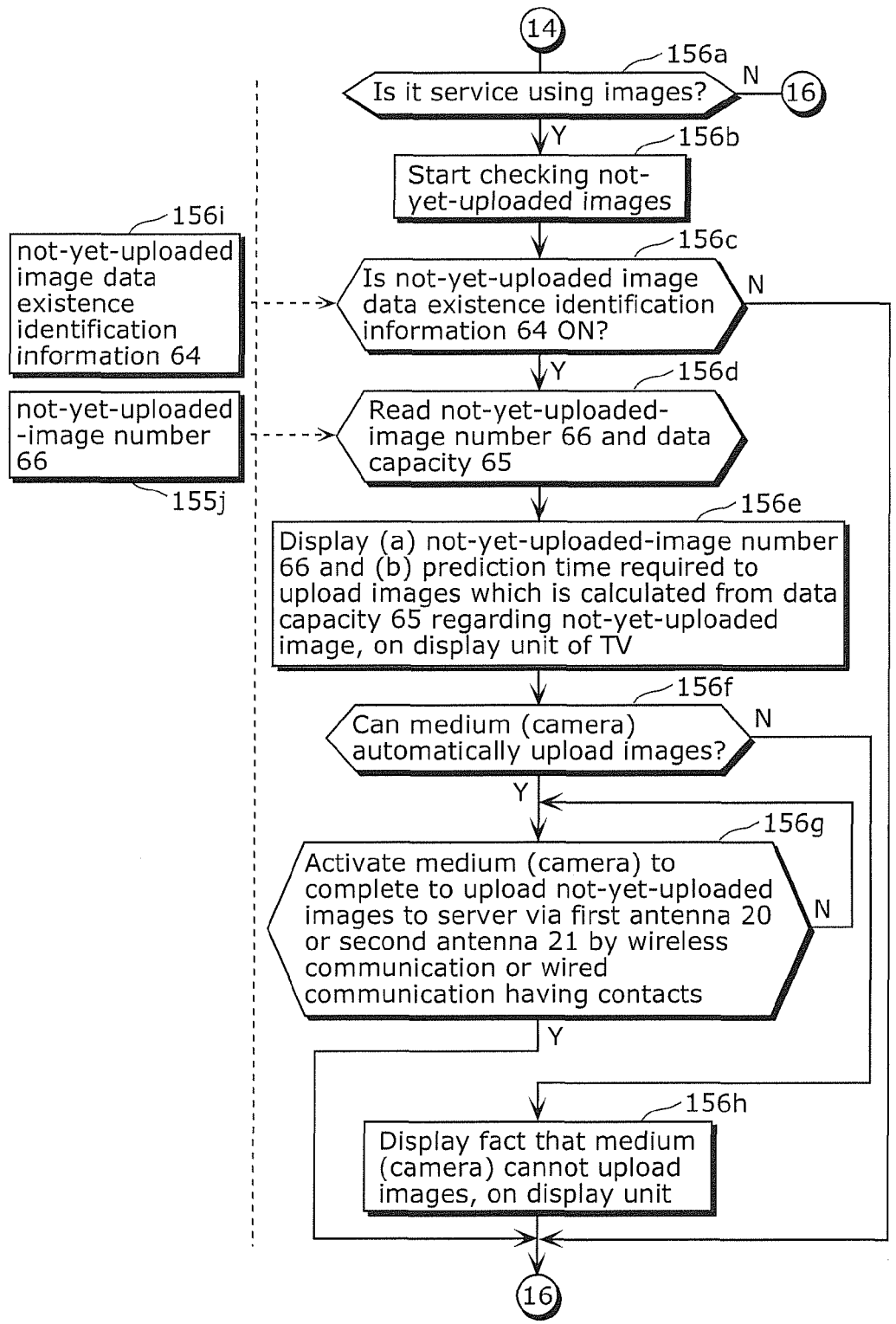
FIG. 13 is a flowchart of the processing performed by the image capturing device and the TV, according to Embodiment A1.

FIG. 13 is a flowchart of the processing performed by the image capturing device and the TV, according to Embodiment A1.

At Steps 154a and 154i of FIG. 11, the RF-ID reader/writer 46 reads service detail identification information from the server or the second memory. At Step 154c, the TV 45 side determines whether or not the service detail identification information indicates image display service. At Step 154b, the TV 45 side determines whether or not the service detail identification information indicates a post card service such as direct mail. At Step 154d, the TV 45 side determines whether or not the service detail identification information indicates advertising service.

At Steps 154f and 154j, the RF-ID reader/writer 46 obtains the server specific information 48 from the second memory of the medium. At Step 154g, the TV 45 side determines whether or not the second memory stores the URL 92. If the second memory does not store the URL 92, then the processing proceeds to Steps 154h and 154k at which the TV 45 obtains the server address information 81 and the user identification information 82 from the second memory.

At Steps 155a and 155p of FIG. 12, the TV obtains an encrypted password from the second memory. At Steps 155b, the TV decrypts the encrypted password. At Step 155c, the TV generates URL from the above pieces of information.

At Step 155d, even if the second memory stores the URL 92, the TV accesses the server having the URL via the communication unit and the Internet. At Step 155k, the TV starts being connected to the server 42. At Step 155q, the medium reads out operation program existence identifier 119 from the second memory. At Step 155e, the TV determines whether or not the TV has any operation program existence identifier. If the TV has any operation program existence identifier, it is further determined at Step 155f whether or not there are plurality of operation programs. If there are a plurality of operation programs, then the TV reads operation program selection information 118 from the second memory at Step 155r. At Step 155g, the TV determines whether or not the operation program selection information 118 is set. If the operation program selection information 118 is set, the TV selects directory information of a specific operation program at Step 155h. At Step 155s, the medium reads out directory information 117 of the specific operation program on the server from the second memory and provides the directory information 117 to the TV. At Step 155i, the TV accesses the specific operation program in the directory on the server. At Step 155m, the server provides the specific operation program to the TV or executes the specific operation program on the server at Step 155n. At Step 155j, the TV (or the server) starts execution of the specific operation program. At Step 156a of FIG. 13, the TV determines whether or not the specific operation program is service using images. If the specific operation program is service using images, then the TV starts checking images not yet uploaded at Step 156b.

Figure 6:
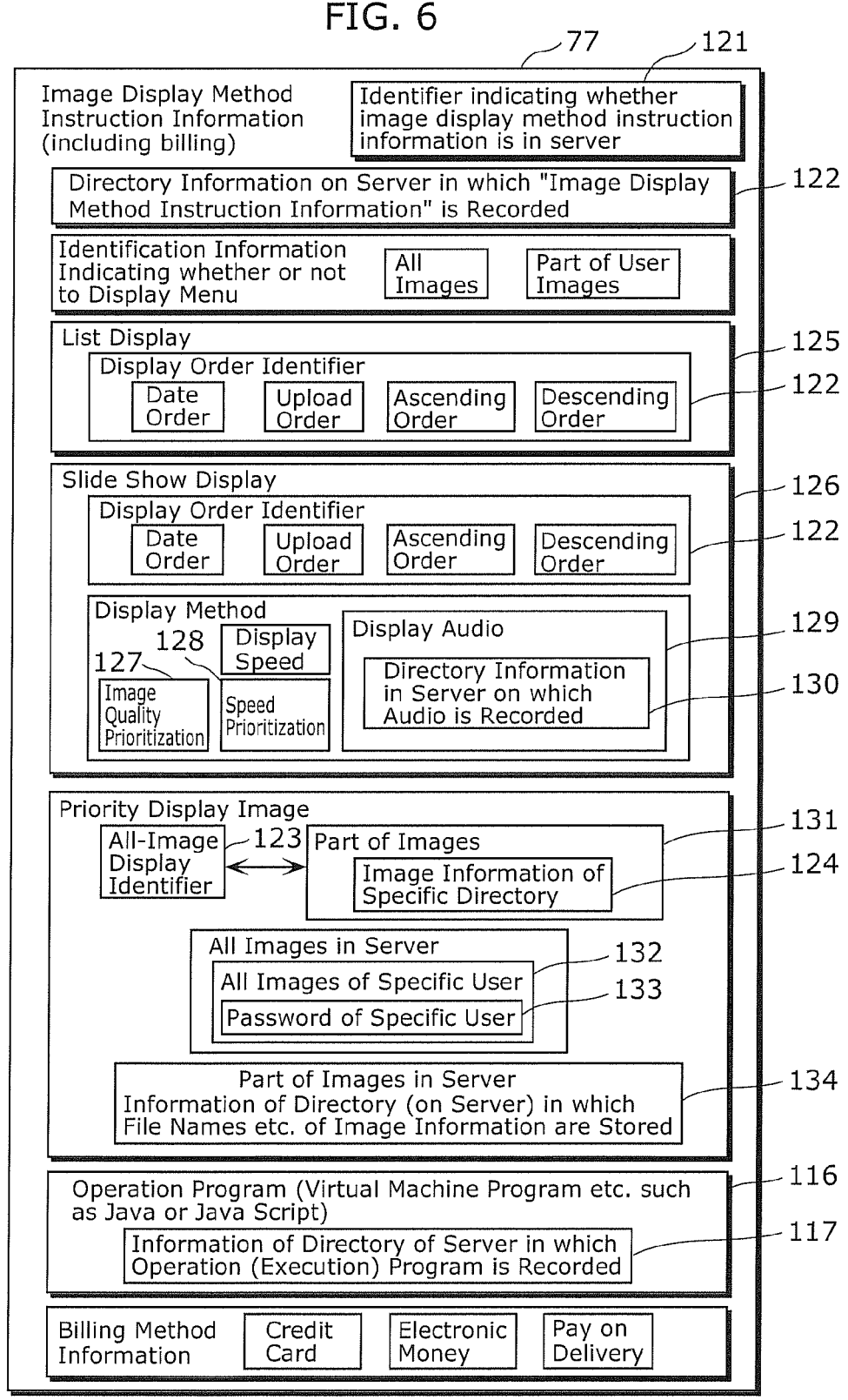
FIG. 6 is a block diagram of image display method instruction information of the image capturing device according to Embodiment A1.

FIG. 6 is a block diagram of image display method instruction information of the image capturing device according to Embodiment A1.

Figure 14:
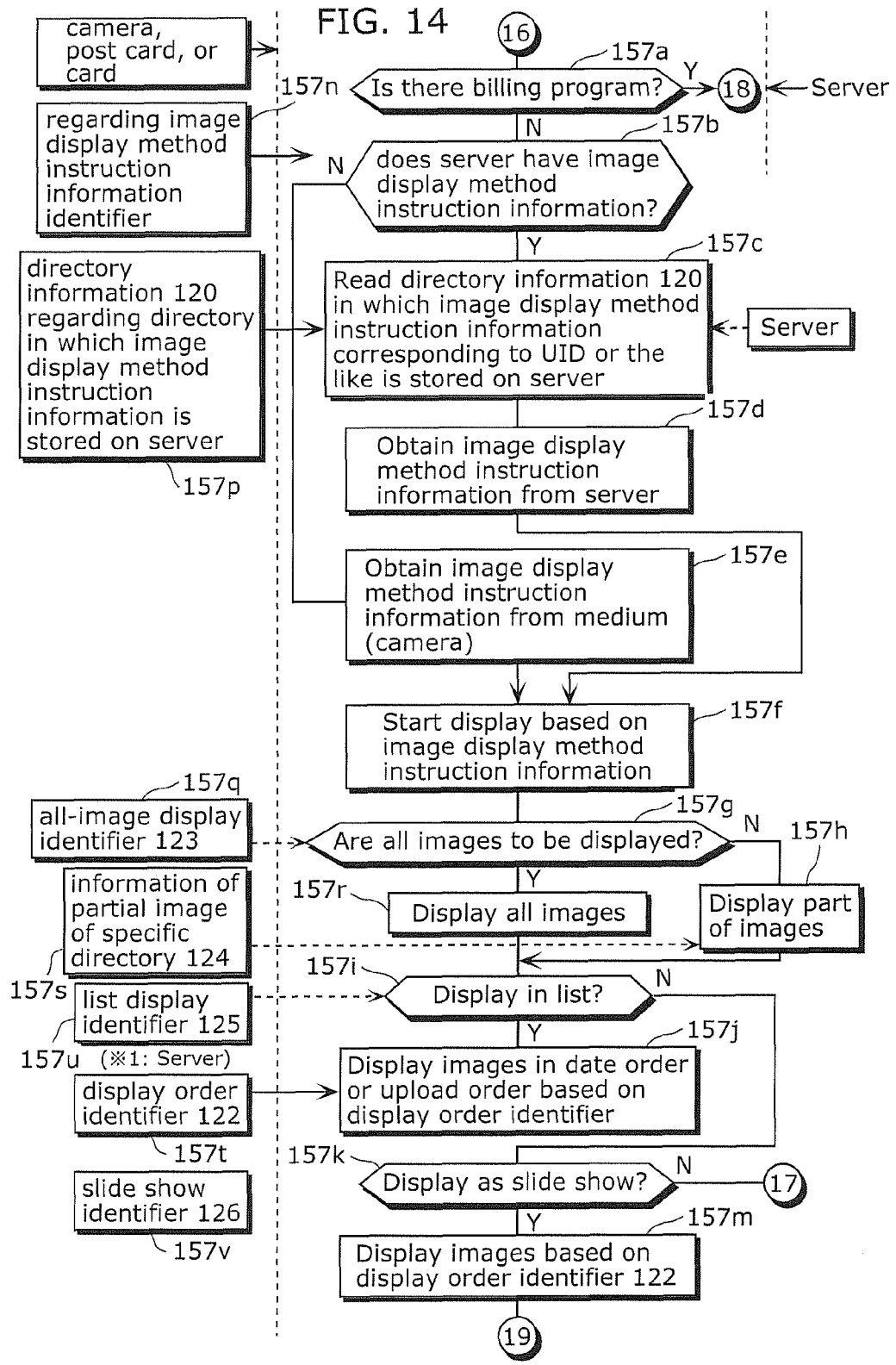
FIG. 14 is a flowchart of the processing performed by the image capturing device and the TV, according to Embodiment A1.

FIG. 14 is a flowchart of the processing performed by the image capturing device and the TV, according to Embodiment A1.

At Step 156i, the TV reads the not-yet-uploaded image data existence identification information 64 from the medium. At Step 156c, the TV determines whether or not the not-yet-uploaded image data existence identification information 64 indicates that there is any image not yet uploaded. If there is any image not yet uploaded, the TV reads the not-yet-uploaded-image number 66 and the data capacity 65 from the medium at Step 156d. At Step 156e, the TV displays (a) the not-yet-uploaded-image number 66 and (b) a prediction time required to upload images which is calculated from the data capacity 65 regarding image not yet uploaded. At Step 156f, the TV determines whether or not the medium (camera) is in a state where the medium can automatically upload images. If the medium can automatically upload images, then at Step 156g, the TV activates the medium (camera) to upload images not yet uploaded to the server via the first antenna 20 or the second antenna 21 by wireless communication or wired communication having contacts. When Step 156g is completed, the processing proceeds to Step 157a of FIG. 14. At Step 157a, the TV determines whether or not there is a billing program. If there is no billing program, then at Step 157n, the TV reads identifier 121 regarding the image display method instruction information which is shown in FIG. 6. At Step 157b, the TV determines whether or not the server has the image display method instruction information. If the server has image display method instruction information, then at Step 157p, the TV reads, from the medium, directory information 120 regarding a directory in which image display method instruction information is stored on the server. At Step 157c, the TV reads, from the medium, the directory information 120 in which the image display method instruction information corresponding to UID or the like is stored. At step 157d, the TV obtains the image display method instruction information from the server. Then, the processing proceeds to Step 157f.

On the other hand, if the determination is made at Step 157b that the server does not have the image display method instruction information, then the processing proceeds to Step 157e. At Step 157e, the TV obtains the image display method instruction information from the medium (such as a camera). Then, the processing proceeds to Step 157f.

Figure 15:
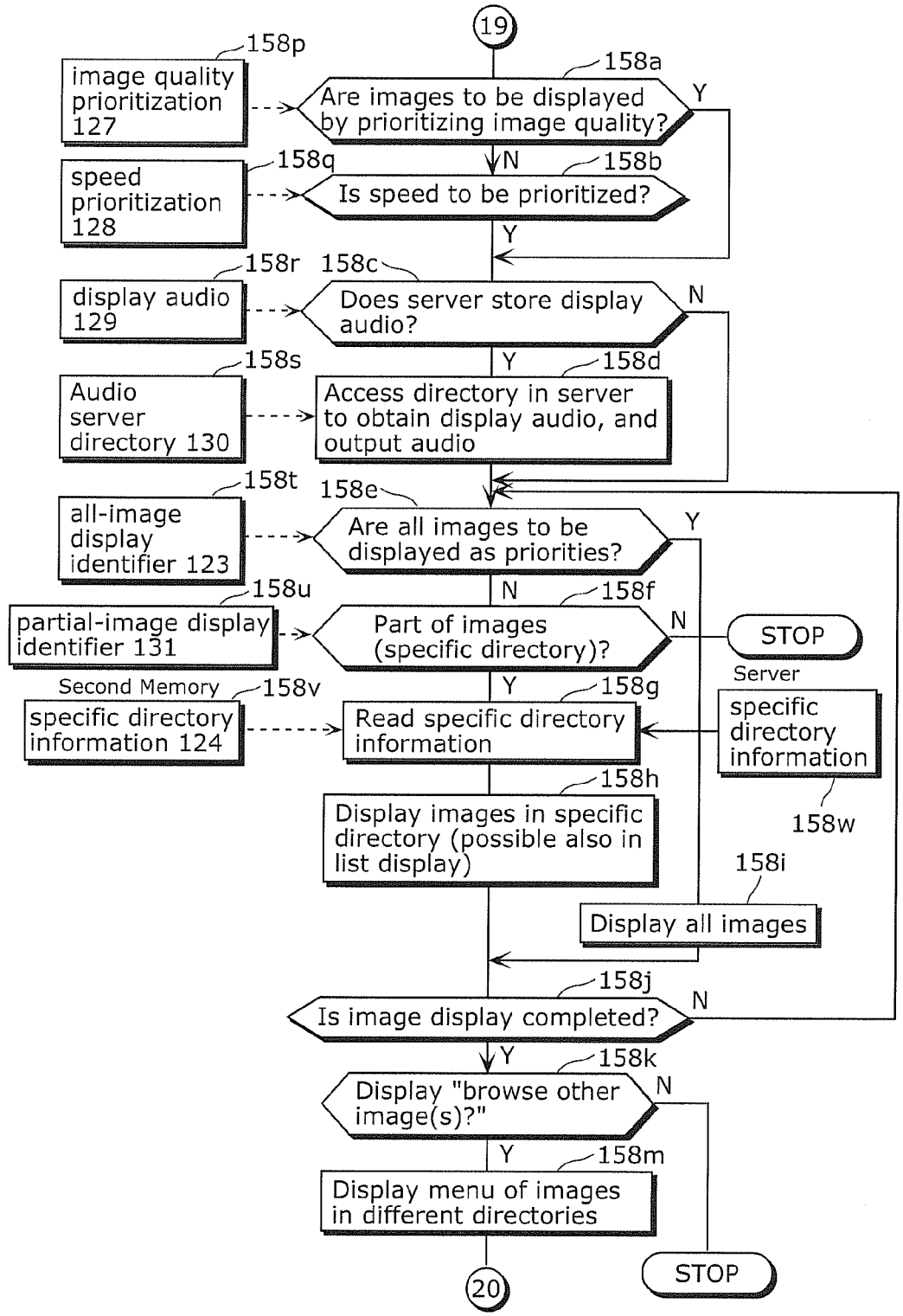
FIG. 15 is a flowchart of the processing performed by the image capturing device and the TV, according to Embodiment A1.

FIG. 15 is a flowchart of the processing performed by the image capturing device and the TV, according to Embodiment A1.

At Step 157f, the TV starts display of images based on the image display method instruction information. At Step 157g, the TV reads an all-image display identifier 123 from the medium. At Step 157g, the TV determines whether or not the all-image display identifier 123 indicates that all images are to be displayed. If all images are to be displayed, the TV displays all images at Step 157r. On the other hand, if all images are not to be displayed, then at Step 157h, the TV displays a part of images in a specific directory identified by the directory information 124 that is read at Step 157s from the medium. At Step 157i, the TV determines whether or not a list display identifier 125 indicates that images are to be displayed in a list. If the images are to be displayed in a list, then the TV reads a display order identifier 122 at Step 157t. At Step 157j, the TV displays the images in a list in a date order or an upload order based on the display order identifier. At Step 157v, the TV reads a slide show identifier 126 from the medium. At Step 157k, the TV determines whether or not the slide show identifier 126 indicates that images are to be displayed as slide show. If the images are to be displayed as a slide show, then at Step 157*m*, the TV displays the images as slide show based on the display order identifier 122. Then, the TV reads image quality prioritization 127 from the second memory of the medium. At Step 158*a* of FIG. 15, the TV determines whether or not the image quality prioritization 127 indicates that the images are to be displayed by prioritizing image quality. If the images are not to be displayed by prioritizing image quality, the TV reads speed prioritization 128 from the medium at Step 158*q* and further determines at Step 158*b* whether or not the speed prioritization 128 indicates that the images are to be displayed by prioritizing a speed. If a speed is to be prioritized, then the TV determines at Step 158*c* whether or not the server stores display audio. At Step 158*s*, the TV reads and checks display audio server directory 130 from the medium. At Step 158*a*, the TV accesses the directory in the server to obtain the display audio and outputs the audio.

At Step 158*e*, the TV determines whether or not all images are to be displayed as priorities. If all images are not to be displayed as priorities, then at Step 158*f*, the TV selects a part of the images. At Steps 158*g*, the TV reads specific directory information 124 from the medium at Step 158*v*, and receives images in the specific directory from the server at Step 158*w*. At Step 158*h*, the TV displays the images in the specific directory. On the other hand, if it is determined at Step 158*e* that all images are to be displayed as priorities, then the TV may display all images at Step 158*i*. At Step 158*j*, the TV determines whether or not the image display is completed. If the image display is completed, then the TV displays a message "view other image(s)?" at Step 158*k*. If the user agrees, then the TV displays a menu of images in different directories at Step 158*m*.

Figure 16:
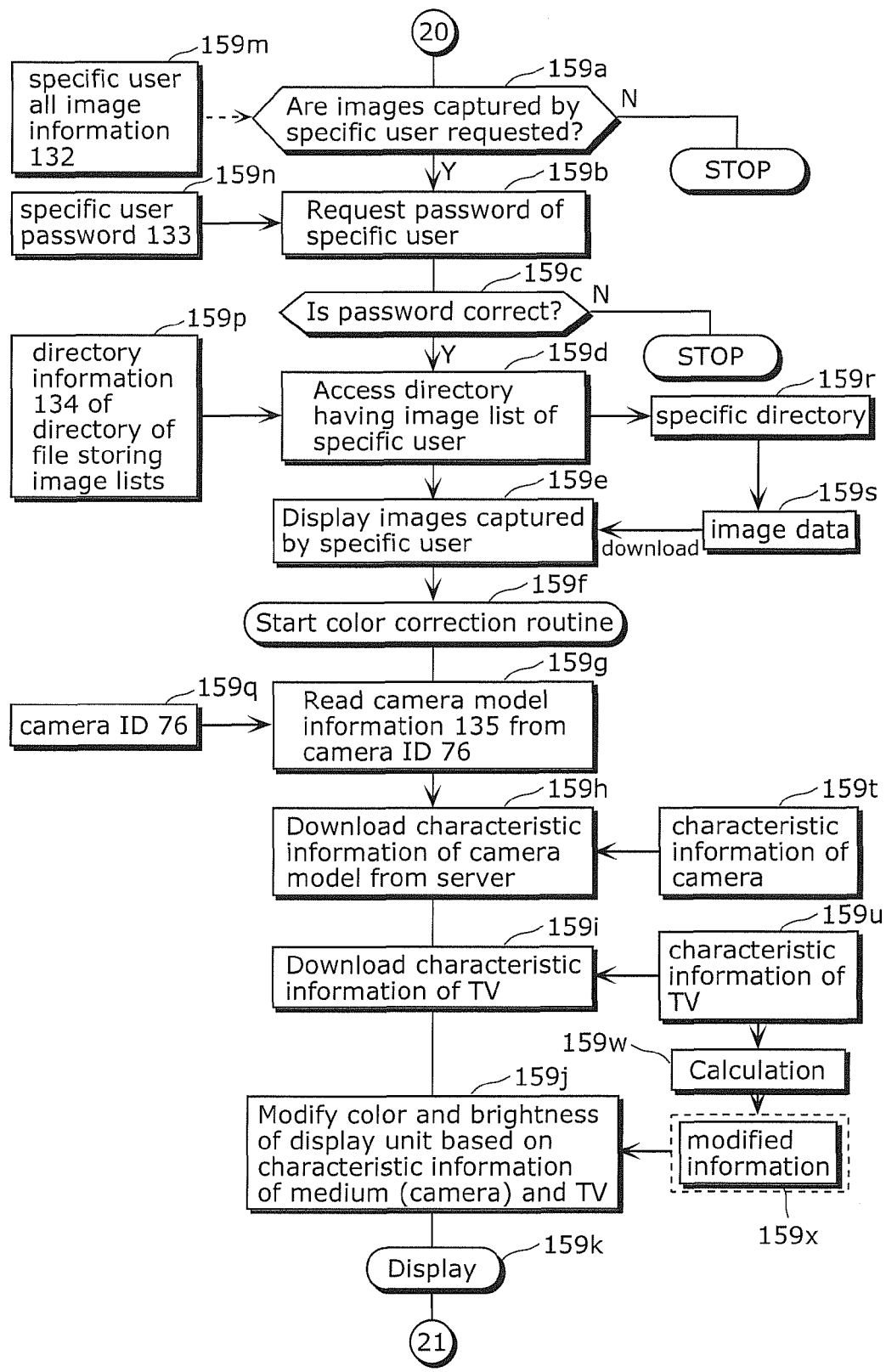
FIG. 16 is a flowchart of the processing performed by the image capturing device and the TV, according to Embodiment A1.

FIG. 16 is a flowchart of the processing performed by the image capturing device and the TV, according to Embodiment A1.

At Step 159*a* of FIG. 16, the TV determines whether or not images captured by a specific user are requested. If images captured by a specific user are requested, then at Step 159*b*, the TV requests the medium to provide (a) specific user all image information 132 at Step 159*m* and (b) a specific user password 133 that is a password of the specific user. At Step 159*c*, the TV determines whether or not the password is correct. If the password is correct, then at Step 159*p*, the TV reads directory information 134 of a directory of a file storing an image list from the medium. At Step 159*d*, the TV accesses the server to access a directory having an image list of the specific user. At Step 159*r*, the TV downloads image data in the directory from the server. At Step 159*e*, the TV displays the images captured by the specific user.

At Step 159*f*, the TV starts color correction routine. At Step 159*g*, the TV reads camera model information from the camera ID 76. At Steps 159*h* and 159*t*, the TV downloads characteristic information of the camera model from the server. Then, at Steps 159*i* and 159*u*, the TV downloads characteristic information of the TV from the server. At Step 159*w*, the server calculates the characteristic information to generate modified information. At Step 159*j*, the TV modifies color and brightness of the display unit based on the pieces of characteristic information of the medium (camera) and the TV. At Step 159*k*, the TV displays the images with the modified color and brightness.

Figure 17:
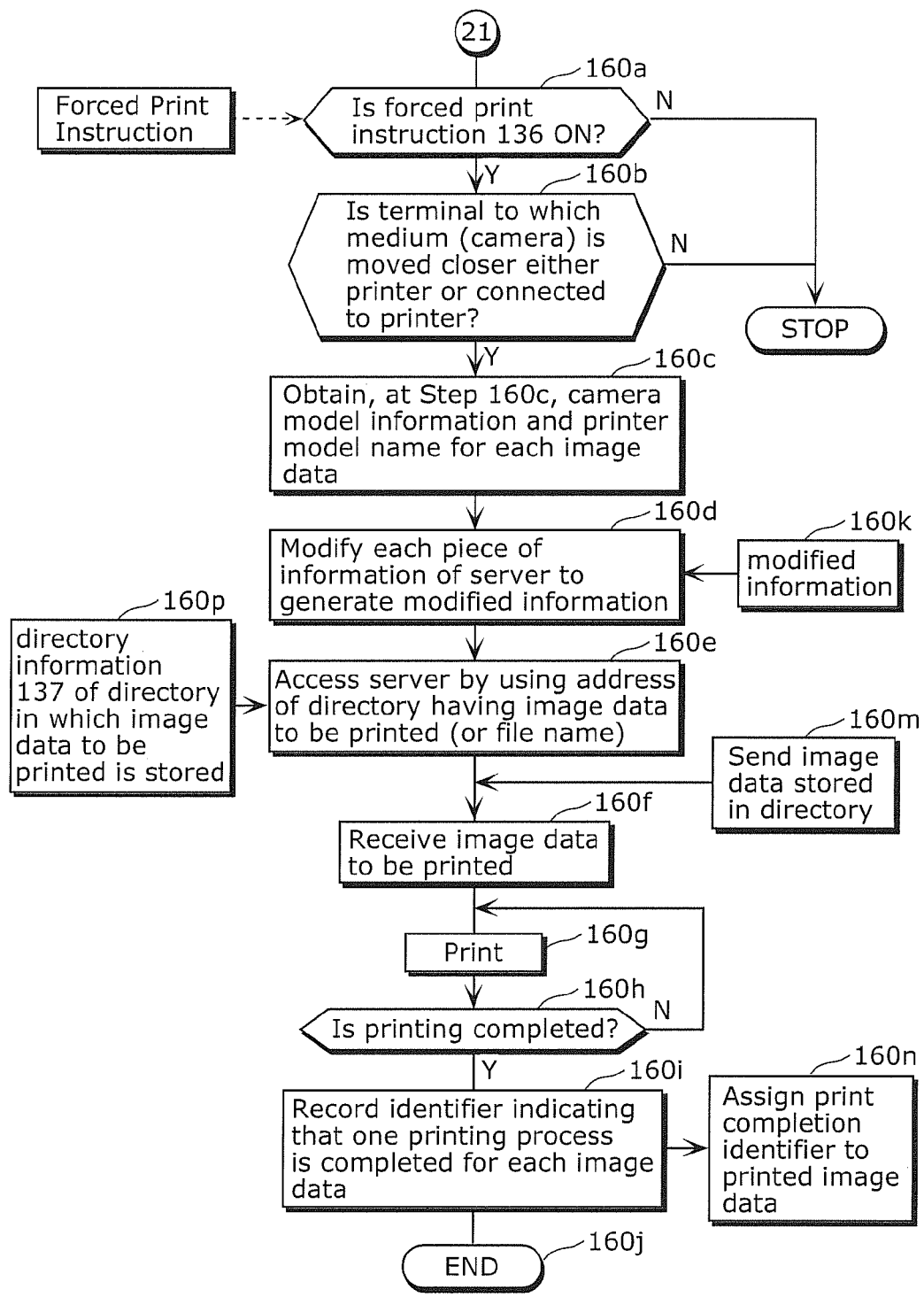
FIG. 17 is a flowchart of the processing performed by the image capturing device and the TV, according to Embodiment A1.

FIG. 17 is a flowchart of the processing performed by the image capturing device and the TV, according to Embodiment A1.

At Step 160*a* of FIG. 17, the TV determines whether or not forced print instruction is selected. Here, if forced print instruction is selected, it is determined at Step 160*b* whether or not the terminal (the TV in the above example) to which the medium (camera) is moved closer is a printer or a terminal connected to the printer. If the terminal is a printer or a terminal connected to the printer, then the terminal obtains, at Step 160*c*, camera model information of the medium (camera) and a model name of the printer for each image data. At Step 160*d*, the terminal modifies each piece of information of the server to generate modified information. At Step 160*p*, the terminal receives directory information 137 of a directory in which the image data to be printed is stored. At Step 160*e*, the terminal accesses the server by using an address of the directory having the image data to be printed (or file name). At Step 160*m*, the server sends the image data stored in the directory to the terminal. At Step 160*f*, the TV receives the image data to be printed. At Step 160*g*, the terminal prints the image data. At Step 160*h*, the printing is completed. At Step 160*i*, for each image data, the terminal records, onto the server, an identifier indicating that one printing process is completed. At Step 160*n*, the server assigns a print completion identifier to the image data that is stored in the server and has been printed.

Next, the following describes the situation where the medium such as a camera or a post card does not have a memory for storing data.

Figure 18:
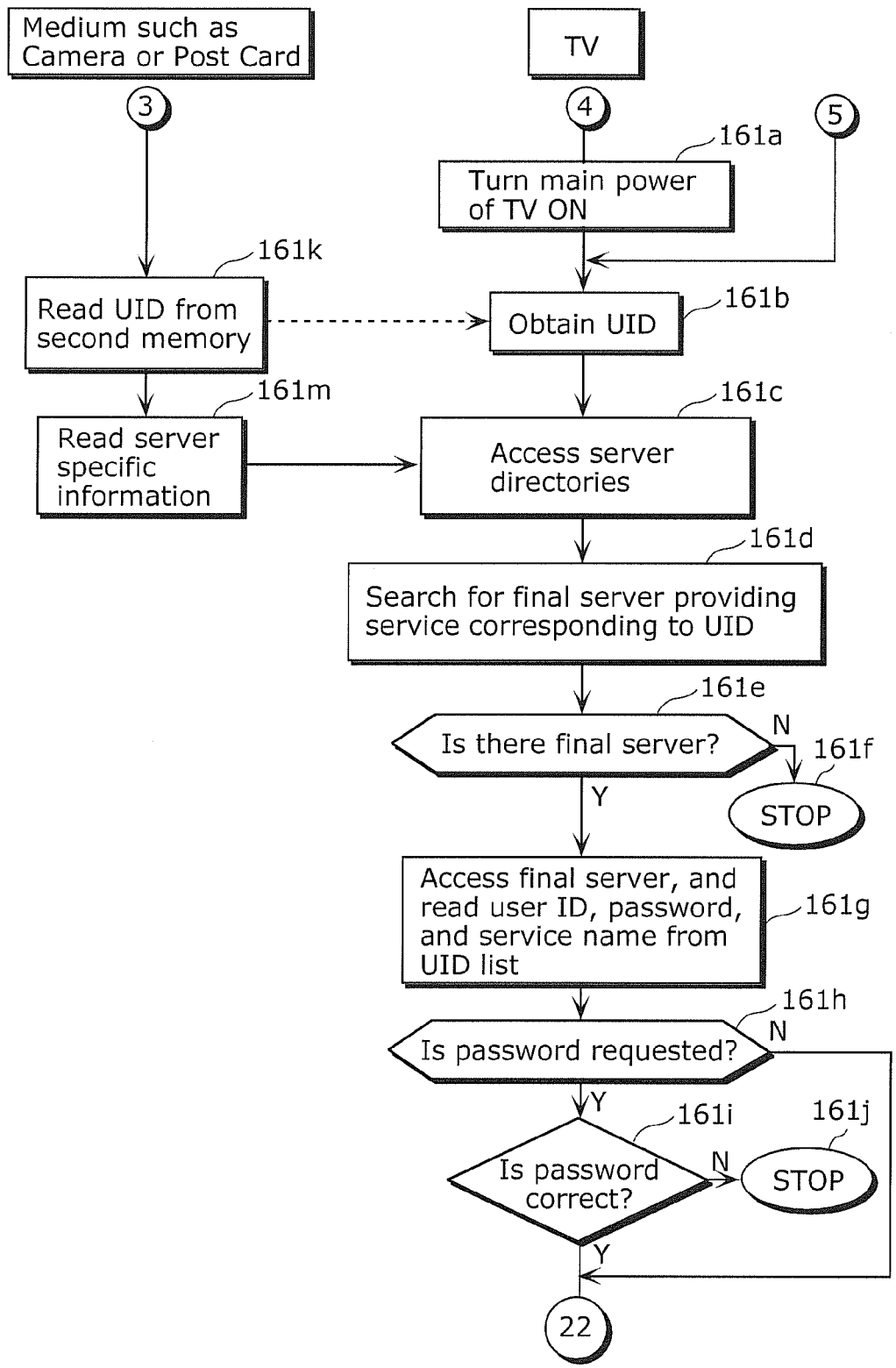
FIG. 18 is a flowchart of the processing performed by the image capturing device and the TV, according to Embodiment A1.

FIG. 18 is a flowchart of the processing performed by the image capturing device and the TV, according to Embodiment A1.

Figure 19:
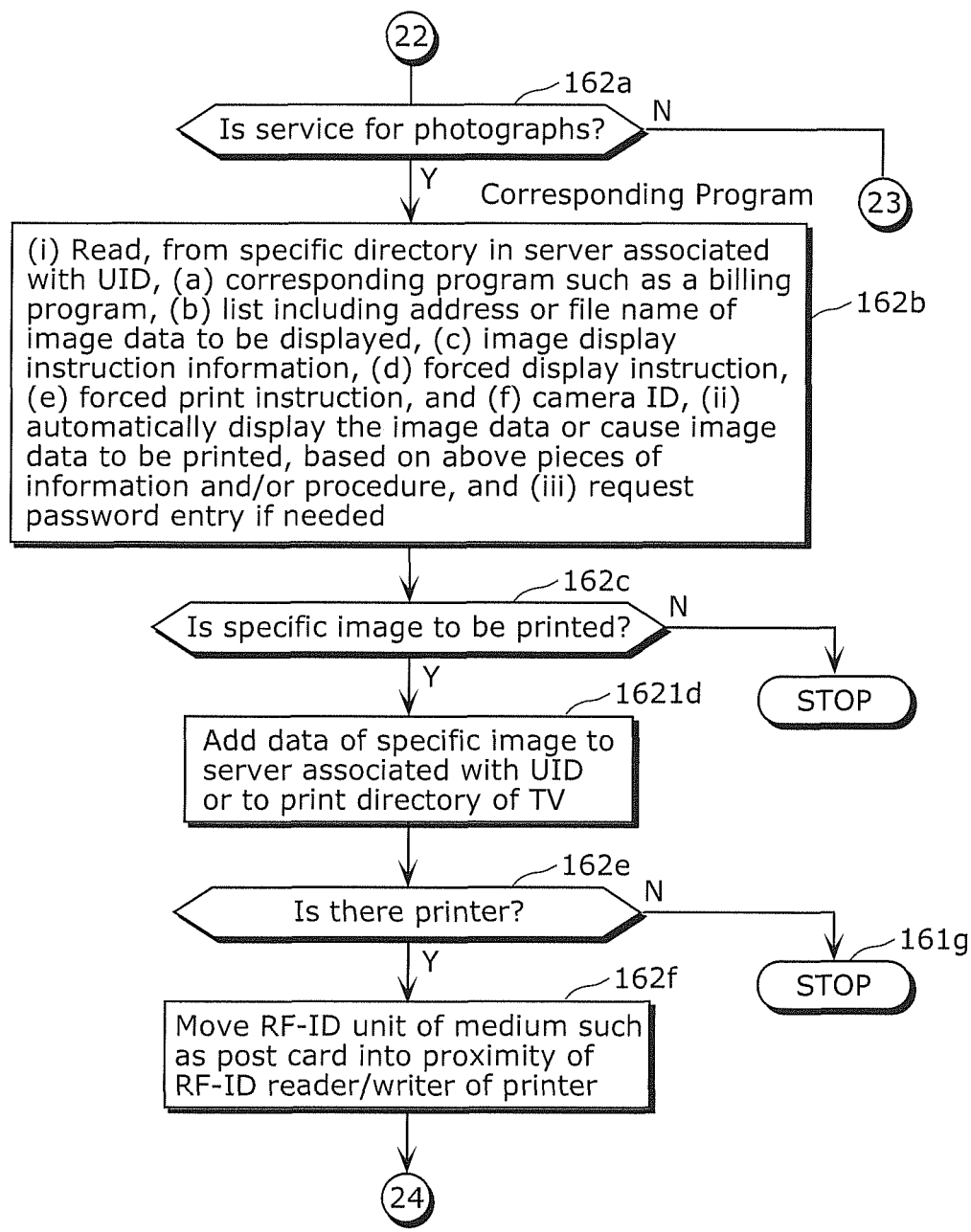
FIG. 19 is a flowchart of the processing performed by the image capturing device and the TV, according to Embodiment A1.

FIG. 19 is a flowchart of the processing performed by the image capturing device and the TV, according to Embodiment A1.

Steps of FIG. 18 follow the numbers 3, 4, and 5 in circles in FIG. 8.

At Step 161*a* of FIG. 18, a main power of the TV is turned ON. At Step 161*k*, the TV reads UID of the RF-ID unit from the second memory. At Step 161*b*, the TV obtains the UID. At Step 161*m*, the TV reads the server specific information 48 from the second memory. At Step 161*c*, the TV accesses a server directory. At Step 161*d*, the TV searches the server directories for a final server providing service corresponding to the UID.

At Step 161*e*, the TV determines whether or not such a final server exists. If there is such a final server, then at Step 161*g*, the TV accesses the final server and reads a user ID, a password, and a service name from a UID list. At Step 161*h*, the TV determines whether or not a password is requested. If the password is requested, then the TV determines at Step 161*i* whether or not the readout password is correct. At Step 162*a* of FIG. 19, the TV determines whether or not the service is regarding photographs or video. If the service is regarding photographs or video, then at Step 162*b*, the TV (i) reads, from a specific directory in the server associated with the UID, (a) a corresponding program such as a billing program, (b) a list including an address or a file name of image data to be displayed, (c) image display instruction information, (d) forced display instruction, (e) forced print instruction, and (f) camera ID, and (ii) automatically displays the image data or causes the image data to be printed, based on the above pieces of information and procedure.

Figure 20:
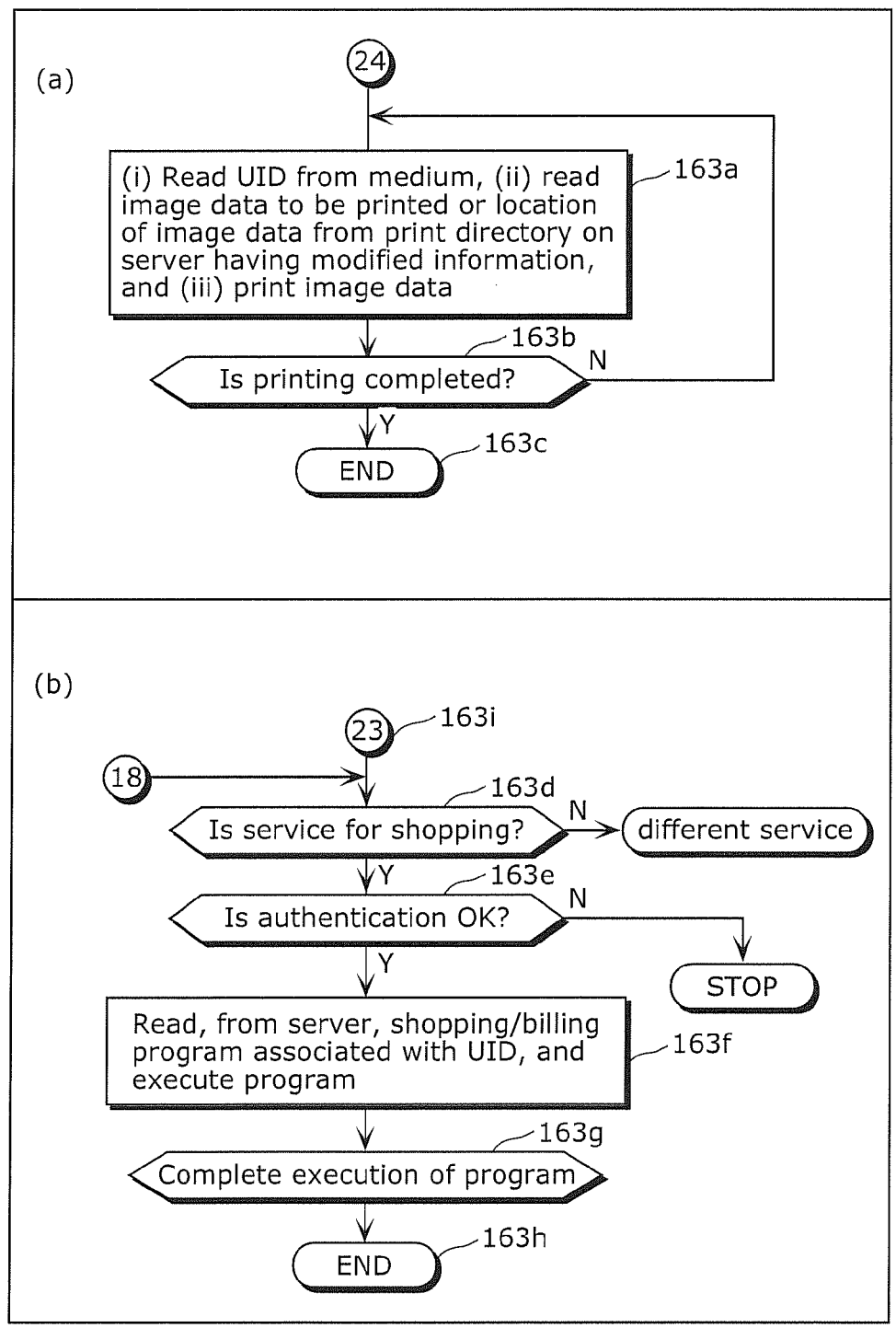
FIG. 20 is a flowchart of the processing performed by the image capturing device and the TV, according to Embodiment A1.

FIG. 20 is a flowchart of the processing performed by the image capturing device and the TV, according to Embodiment A1.

If needed, password entry is requested at Step 162*b*. At Step 162*c*, the TV determines whether or not the user desires to print a specific image. If the user desires to print a specific image, then at Step 162*d*, the TV adds data of the specific image to the server associated with the UID or to a print directory of the TV. At Step 162*e*, the TV determines whether or not the TV is connected to a printer and there is an independent printer. If so, then, at Step 162f, the RF-ID unit of the medium such as a post card is moved into proximity of a RF-ID reader/writer of the printer. At Step 163a of FIG. 20, the printer (i) reads UID of the RF-ID from the medium, (ii) thereby reads image data to be printed or a location of the image data from the print directory on the server having the modified information, and (iii) prints the image data. At Step 163b, the printing is completed. Thereby, the above processing is completed.

Step 163i is the number 23 (circle 23) in FIG. 19. At Step 163b, the TV determines whether or not the service is for shopping. If the service is for shopping, then the TV determines at Step 163e whether or not authentication is successful. If the authentication is successful, then at Step 163f, the TV reads, from the server, a shopping/billing program associated with the UID, and executes the program. At Step 163g, the execution of the program is completed. Thereby, the above processing is completed.

Next, the following describes a method of reading information from a RF-ID unit embedded in a post card without a RF-ID reader.

Figure 21:
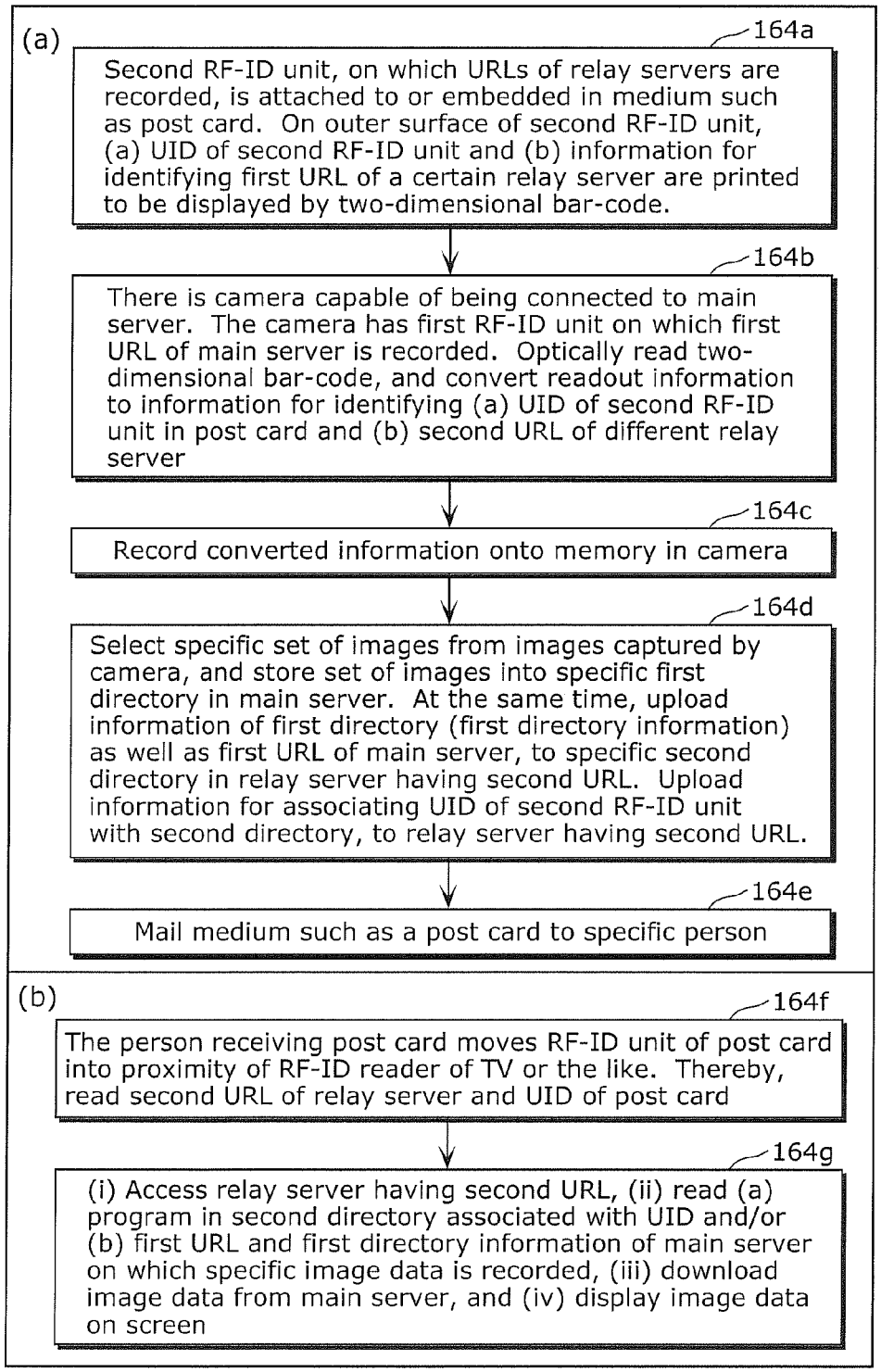
FIG. 21 is a flowchart of the processing performed by the image capturing device and the TV, according to Embodiment A1.

FIG. 21 is a flowchart of the processing performed by the image capturing device and the TV, according to Embodiment A1.

At Step 164a of FIG. 21, the following processing is performed. A second RF-ID unit, on which URLs of relay servers are recorded, is attached to or embedded in the medium such as a post card. On the outer surface of the second RF-ID unit, (a) UID of the second RF-ID unit and (b) information for identifying a first URL of a certain relay server are printed to be displayed by a two-dimensional bar-code.

At Step 164b, there is a camera capable of being connected to a main server. The camera has a first RF-ID unit on which a first URL of the main server is recorded. An image capturing unit in the camera optically reads the two-dimensional bar-code, and converts the readout information to information for identifying (a) the UID of a second RF-ID unit in the post card and (b) a second URL of a relay server.

At Step 164c, the converted information is recorded onto a memory in the camera.

At Step 164d, the camera selects a specific set of images from images captured by the camera, and stores the set of images into a specific first directory in the main server. At the same time, the camera uploads information of first directory (first directory information) as well as the first URL of the main server, to a specific second directory in the relay server having the second URL. The camera uploads information for associating the UID of the second RF-ID unit with the second directory, to the relay server having the second URL. At Step 164e, the medium such as a post card is mailed to a specific person.

At Step 164f, the person receiving the post card moves the RF-ID unit of the post card into proximity of a RF-ID reader of a TV or the like. Thereby, the TV reads, from the RF-ID unit, the second URL of the relay server and the UID of the post card.

At Step 164g, the TV accesses the relay server having the second URL. Then, the TV reads, from the relay server, (a) a program in the second directory associated with the UID and/or (b) the first URL and the first directory information of the main server on which specific image data is recorded. The TV downloads the image data from the main server. The TV displays the image data on a screen. In the above case, the image capturing unit in the image capturing device according to Embodiment A1 of the present invention reads information from the two-dimensional bar-code that is generally printed in a product or post card to record server information. Then, the image capturing device records the information read from the two-dimensional bar-code, as digital information, onto the second memory of the RF-ID unit. Thereby, the image capturing device allows a RF-ID reader of a TV to read the information. As a result, even a TV without an optical sensor for two-dimensional bar-codes can indirectly read information of two-dimensional bar-codes and automatically access a server or the like.

FIG. 22 is a diagram presenting a display method of the image capturing device and the TV, according to Embodiment A1.

(a) in FIG. 22 illustrates the situation where display is presented when the image capturing device 1 is moved into proximity of a RF-ID antenna 138 of the TV 45.

When the image capturing device 1 is moved into proximity of the antenna 138, the TV 45 displays a camera icon 140 for notifying that the medium is a camera in the manner described previously.

Next, since the number (for example, five) of images not yet uploaded is detected, the TV 45 displays five blank images 142a, 142b, 142c, 142d, and 142e as if these images were taken out from the camera icon 140.

Thereby, the TV 45 displays "tangible" information of images by changing "materials to information". As a result, the user can perceive the information of images by more natural sense.

Regarding images that have been already uploaded to the server, actual images 143a, 143b, and 143c are displayed as tangible data in the same manner as described above.

(b) in FIG. 22 illustrates the situation where RF-ID is embedded in a post card 139. Since the RF-ID reader/writer 46 of the TV 45 reads attribute information of the post card from the RF-ID. Thereby, the TV 45 displays a post-card icon 141 at a bottom left corner of the display unit of the TV 45 as illustrated in FIG. 22B. The TV 45 also displays images stored in the server or a menu screen as tangible data in the same manner as described with reference to (a) in FIG. 22.

Next, the following processing is described in detail. By the processing, an operation program 116 illustrated in FIG. 4 is transmitted to the TV 45 illustrated in FIG. 3 that is an apparatus (device) communicating with the RF-ID unit 47 of the image capturing device 1. The communicating device (TV 45) executes the transmitted program.

Figure 23:
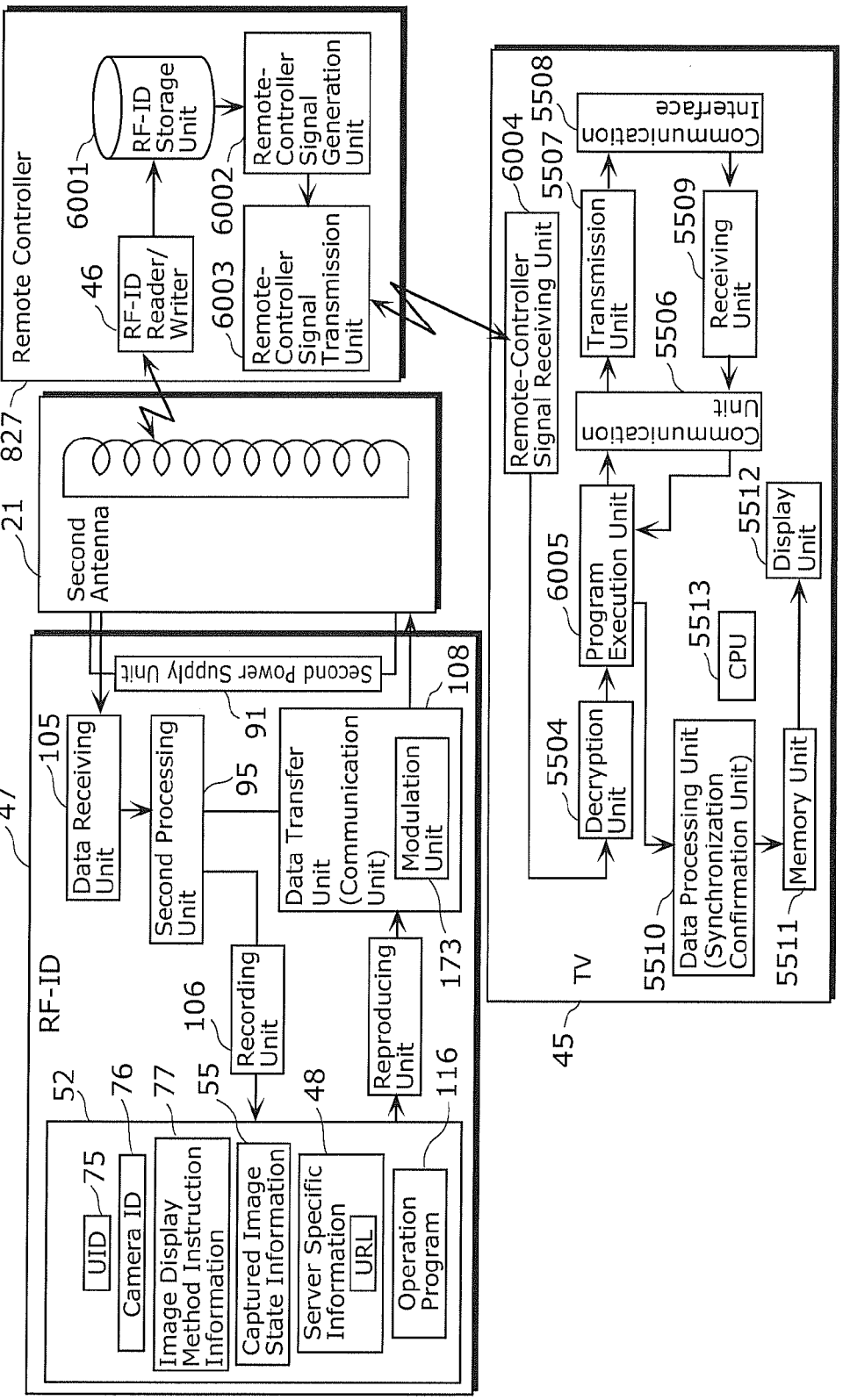
FIG. 23 is a block diagram of a RF-ID unit in the image capturing device for storing an operation program, a remote controller of the TV, and the TV.

FIG. 23 is a block diagram of a configuration in which the apparatus communicating with the RF-ID unit 47 in the image capturing device 1 executes the transmitted program.

FIG. 23 illustrates a communication system including a part of the image capturing device 1 (the RF-ID 47 and the second antenna 21), the TV 45, and a remote controller 827 of the TV 45.

Here, the image capturing device 1 is implemented as a camera which has the RF-ID unit 47 to perform proximity wireless communication with the RF-ID reader/writer 46. The RF-ID reader/writer 46 is connected to the TV 45 by an infrared communication path. The camera includes the antenna 21, a data receiving unit 105, the second memory 52, and the data transfer unit 108. The antenna 21 is used for the proximity wireless communication. The data receiving unit 105 receives, via the antenna 21, an input signal provided from the RF-ID reader/writer 46. The second memory 52 is a nonvolatile memory holding at least (a) the UID unit 75 that is identification information for identifying the image capturing device 1, and (b) the operation program 116 that is to be executed by the TV 45 with reference to the UID unit 75. The data transfer unit 108 transmits the UID unit 75 and the operation program 116 stored in the second memory 52 to the RF-ID reader/writer 46 via the antenna 21, according to the input signal received by the data receiving unit 105. The UID unit 75 and the operation program 116 transmitted from the data transfer unit 108 are transmitted to the TV 45 via the data transfer unit 108, the antenna 21, the RF-ID reader/writer 46, and then the infrared communication path. The following explains the above units in more detail.

The RF-ID unit 47 in the image capturing device 1 has the second memory 52. The second memory 52 holds the operation program 116. The operation program 116 can be executed by the TV 45 communicating with the RF-ID unit. In more detail, the operation program 116 is an example of the program executed by the TV 45 with reference to the identification information of the image capturing device 1. The operation program 116 is, for example, an execution program such as Java™ program, a virtual-machine script program such as Javascript™ program, or the like.

The reproducing unit in the RF-ID unit 47 reads necessary information and the operation program 116 from the second memory 52. The necessary information is required to execute the operation program 116. The necessary information includes the UID unique to the image capturing device 1, the server specific information including the URL of the server, and the like. The necessary information and the operation program 116 are transmitted to the RF-ID reader/writer 46 in the remote controller 827 via the data transfer unit 108 and the second antenna 21. The remote controller 827 remotely controls the TV 45.

The RF-ID reader/writer 46 of the remote controller 827 receives the necessary information and the operation program from the RF-ID unit 47 of the image capturing device 1 and stores them into a RF-ID storage unit 6001.

A remote-controller signal generation unit 6002 in the remote controller 827 converts the necessary information and the operation program, which are transmitted from the RF-ID unit 47 of the image capturing device 1 and stored in the RF-ID storage unit 6001, to remote-controller signals. The remote-controller signals, such as infrared signals, are widely used in communication for present remote controllers.

To the TV 45, a remote-controller signal transmission unit 6003 transmits the remote-controller signals including the operation program which are generated by the remote-controller signal generation unit 6002.

A remote-controller signal receiving unit 6004 in the TV 45 receives the remote-controller signals from the remote controller 827. A program execution unit 6005, such as a Java™ virtual machine, retrieves the necessary information and the operation program in the RF-ID unit 47 of the image capturing device 1, from the remote-controller signals by using a decryption unit 5504. Thereby, the program execution unit 6005 executes the operation program.

Figure 24:
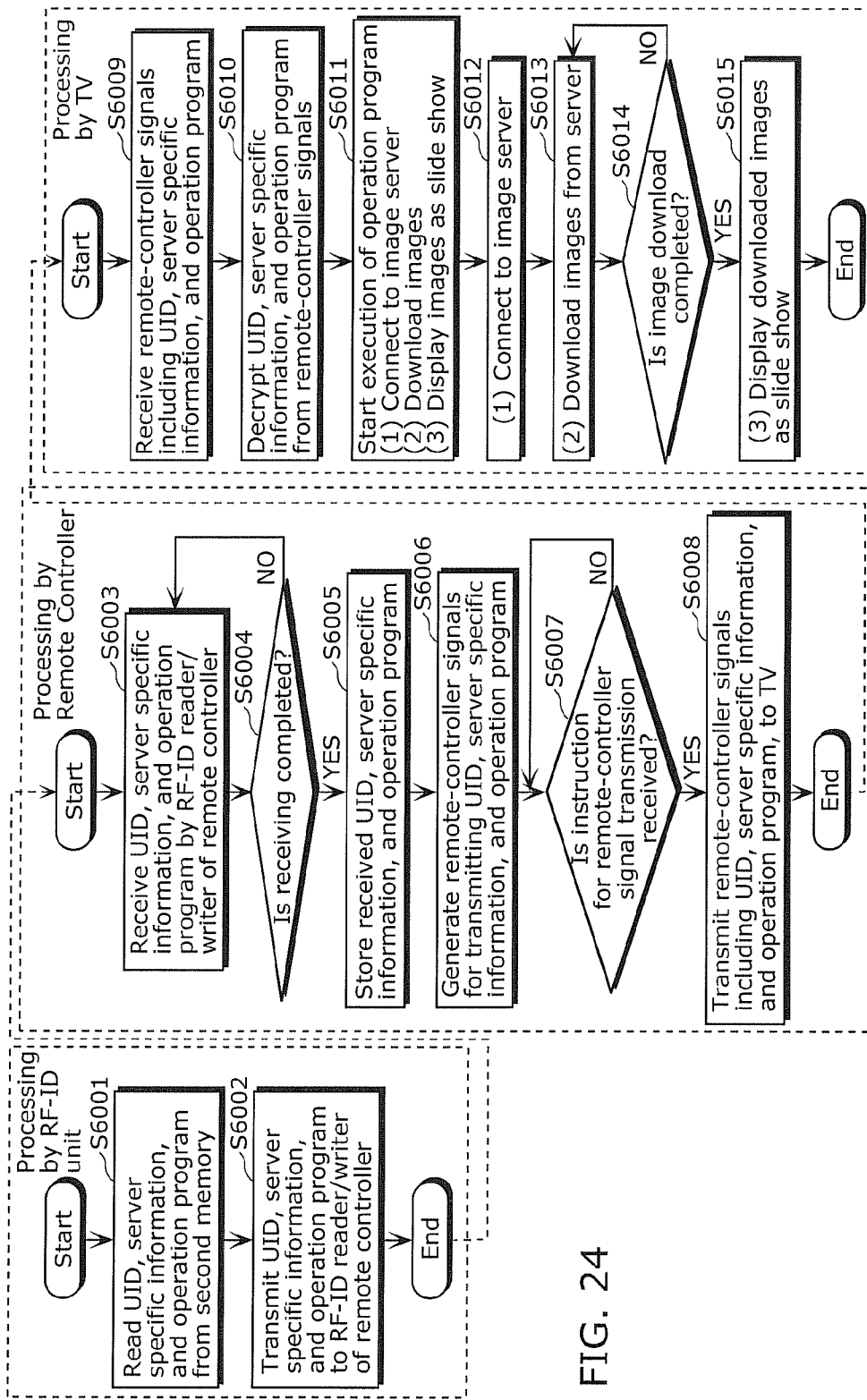
FIG. 24 is a flowchart of processing for transferring and executing the operation program stored in the RF-ID unit.

FIG. 24 is a flowchart of processing for transferring and executing the operation program stored in the RF-ID unit.

FIG. 24 is a flowchart of execution of the operation program for "downloading data of images from an image server with reference to identification information (UID in this example) of the image capturing device 1, and displaying the images as a slide show".

FIG. 25 presents an example of description of the operation program for downloading image and executing slide show.

When the remote controller is moved into proximity of the image capturing device 1, the RF-ID reader/writer 46 of the remote controller provides power to the RF-ID unit 47 in the image capturing device 1 via RF-ID communication. Thereby, the UID 75 unique to the image capturing device 1, the URL 48 of the image server (image server URL), and the operation program 116 are read from the second memory 52 (S6001). The readout UID, image server URL, and operation program are transmitted to the remote controller 827 via the data transfer unit 108 and the second antenna 21 (S6002). Here, as presented in FIG. 25, the operation program includes server connection instruction 6006, download instruction 6008, slide show display instruction 6010, download-completion-time processing set instruction 6007, and download-completion-time instruction 6009.

The remote controller 827 receives the UID, the image server URL, and the operation program from the image capturing device 1 via the RF-ID reader/writer 46 (S6003). A determination is made as to whether or not receiving is completed (S6004). If receiving is completed, then the UID, the image server URL, and the operation program are stored in the RF-ID storage unit 6001 (S6005). Then, the UID, the image server URL, and the operation program are converted to remote-controller signals transmittable by infrared ray (S6006). A determination is made as to whether or not the user performs a predetermined input operation by the remote controller 827 to instruct to transmit the remote-controller signals to the TV 45 (S6007). If the instruction is received by from user, then the remote-controller signal transmission unit 6003 transmits the remote-controller signals including the UID, the image server URL and the operation program to the TV 45 (S6008). In other words, serving as a common remote controller, the remote controller 827 serves also as a relay device that transfers the UID, the image server URL, and the operation program from the image capturing device 1 to the TV 45 by using the embedded RF-ID reader/writer 46.

Next, the TV 45 receives the remote-controller signals from the remote controller 827 (S6009). The decryption unit 5504 in the TV 45 retrieves (decrypts) the UID, the image server URL, and the operation program from the remote-controller signals (S6010). Then, the program execution unit 6005 executes the operation program with reference to the UID and the image server URL (S6011 to S6015). More specifically, by the operation program, connection between the TV 45 and the image server 42 on a communication network is established with reference to the image server URL (S6012, and 6006 in FIG. 25). Then, with reference to the UID unique to a corresponding image capturing unit, image data captured by a specific image capturing unit is selected from the image data 50 stored in the storage device of the image server 42, and the selected image data is downloaded to the TV 45 (S6013, and 6008 in FIG. 25). In other words, the UID is used to select image data associated with the image capturing device 1 indicated by the UID, from among pieces of image data stored in the image server 42. A determination is made as to whether or not the image download is completed (S6014). If the image download is completed, the downloaded images are sequentially displayed as a slide show (S6015, and 6007, 6009, and 6010 in FIG. 25). The download-completion-time processing set instruction 6007 in FIG. 25 is instruction for setting processing to be performed when image downloading is completed. In the example of FIG. 25, the download-completion-time processing set instruction 6007 instructs the instruction 6009 as the processing to be performed when image downloading is completed. Moreover, the processing 6009 calls the processing 6010 for performing a slide show of the images.

It should be noted that, referring to FIGS. 23 and 24, it has been described that the operation program and the necessary information for the operation program are transferred from the image capturing device 1 to the TV 45 via the remote controller 827. However, the RF-ID reader/writer 46 of the remote controller 827 may be provided to the TV 45. In other words, the RF-ID reader/writer 46 may be embedded in the TV 45. Furthermore, the communication path connecting the reader (RF-ID reader/writer 46) to the apparatus may be a wireless communication path such as infrared communication path, or a wired signal cable.

It should also be noted that, in the above-described execution example, the UID is used to select image data associated with the image capturing device 1 from among pieces of image data stored in the image server 42. However, it is also possible to use the UID to identify the image server storing the image data. Here, it is assumed that, in a communication system including a plurality of image servers, UID is associated with an image server storing image data captured by an image capturing device identified by the UID. Under the assumption, if the operation program is created so that a URL of the image server can be identified with reference to the UID, the TV 45 executing the operation program can identify, by using the UID, the image server associated with the UID from the plurality of image servers and thereby download the image data from the identified image server.

It should also be noted that the identification information for identifying the image capturing device 1 is not limited to UID. The identification information maybe any other information regarding the image capturing device 1, such as a serial number, a product serial number, a Media Access Control (MAC) address, or information equivalent to the MAC address, for example, an Internet Protocol (IP) address. Moreover, if the image capturing device 1 serves as an access point on a wireless LAN, the identification information maybe a Service Set Identifier (SSID) or any information equivalent to SSID. It should also be noted that, in the above-described second memory 52, the identification information (UID unit 75) for identifying the image capturing device 1 has been described to be stored separately from the operation program 116. However, the identification information may be stored (described) in the operation program 116.

It should also be noted that the remote-controller signals (in other words, the communication path connecting the reader to the apparatus) are described to employ infrared ray. However, the remote-controller signals are not limited to the above, but may employ a wireless communication method such as Bluetooth. The use of wireless communication that is generally speedier than infrared communication can shorten a time required to transfer an operation program and/or the like.

It should be noted that the operation program is not limited to the program in the format presented in FIG. 25. The operation program may be described in any other programming language. For example, the operation program described in Java™ can be easily executed by various apparatuses (devices), because the program execution circumstances called JavaVM™ have broad versatility. The operation program may be described in a compact programming language in a script format represented by Javascript™ so as to be stored in a small storage capacity. The operation program in such a compact programming language can be stored in the RF-ID unit 47 in the second memory 52 even if the RF-ID unit 47 has a small storage capacity. Moreover, the operation program may be in an executable format applied with processing such as compiling, rather than a source code presented in FIG. 25. The program can reduce a processing load on apparatuses having program execution environments like TV.

Figure 26:
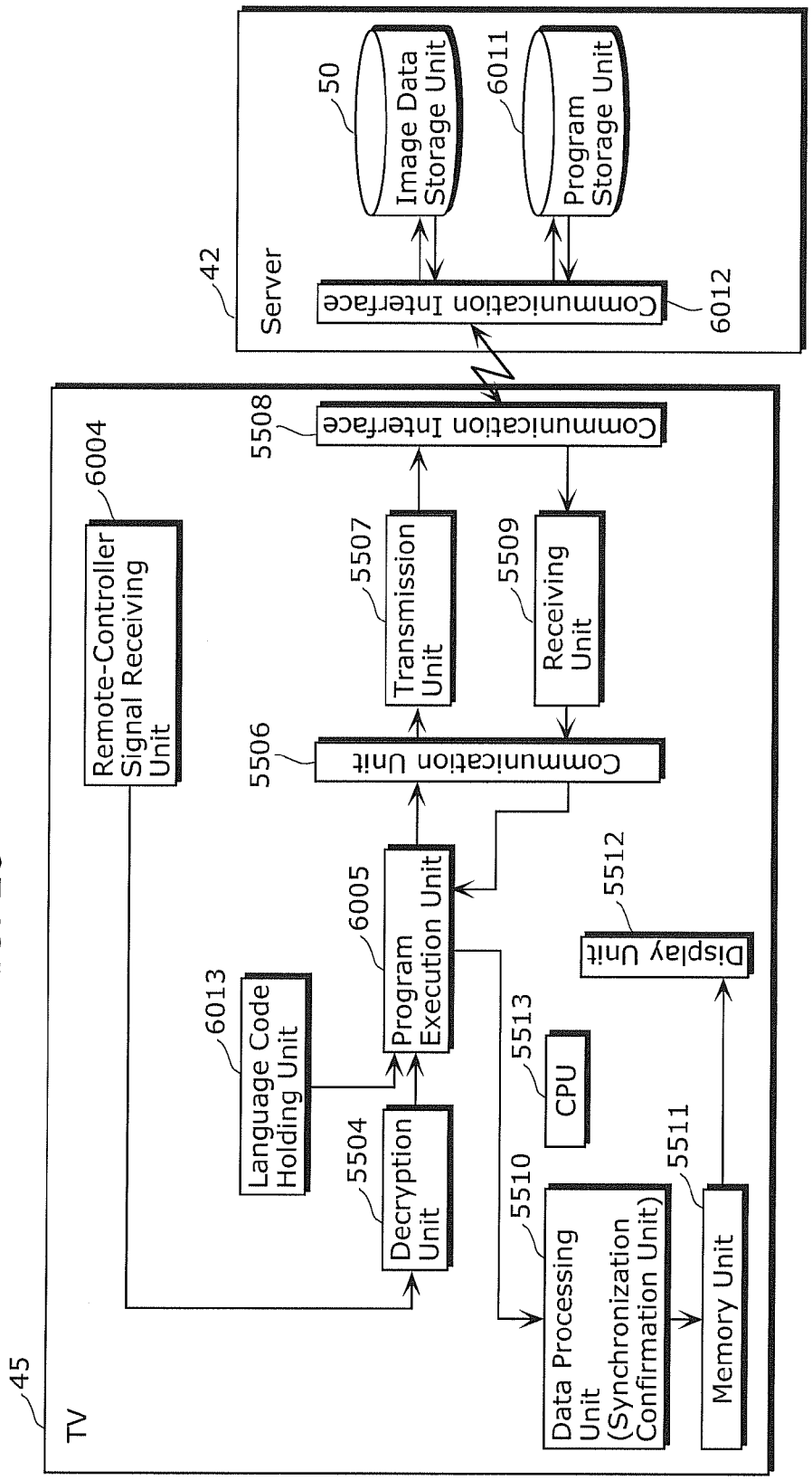
FIG. 26 is a block diagram of (a) the TV changing processing of the operation program according to a language code, and (b) a server storing the program.

FIG. 26 is a block diagram of (a) the TV changing processing of the operation program according to a language code, and (b) a server storing the program.

Figure 27:
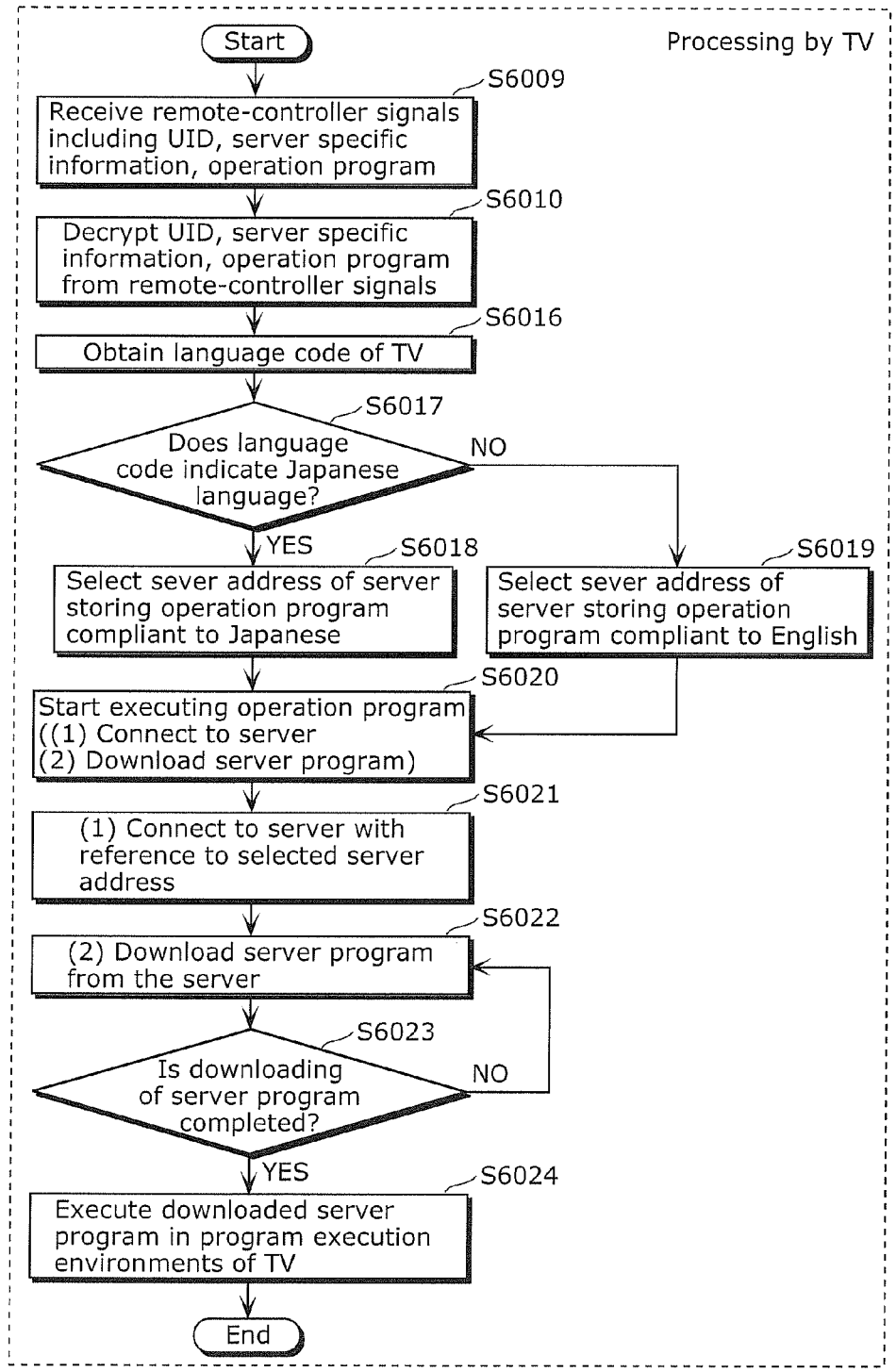
FIG. 27 is a flowchart of processing for changing processing of the operation program according to a language code.

FIG. 27 is a flowchart of processing for changing processing of the operation program according to a language code.

The following describes, in detail, the processing of changing execution of a program depending on information unique to a display device (such as the TV 45) having a RF-ID reader, with reference to FIGS. 26 and 27.

The TV 45 illustrated in FIG. 26 further includes a language code holding unit 6013. When the operation program received as remote-controller signals is executed to connect the TV 45 to the server 42, the program execution unit 6005 reads a language code from the language code holding unit 6013 to connect the TV 45 to the server 42 compliant to the language code. Then, the operation program is executed to download a server program from the server 42, and executes the downloaded server program. For example, if the language code indicates Japanese language, the TV 45 is connected to the server 42 having a program storage unit 6011 in which a server program compliant to Japanese language is stored, and then the server program is obtained from the program storage unit 6011 to be executed in the TV 45. More specifically, the operation program stored in the RF-ID unit 47 of the image capturing device 1 as illustrated in FIG. 23 executes only connection to the server 42, while other processing such as image display is executed by the server program downloaded from the server 42.

The steps in the above processing are described with reference to FIG. 27. The processing by which the TV 45 receives the operation program and the necessary information for the operation program from the RF-ID unit 47 of the image capturing device 1 is the same as the processing described previously with reference to FIG. 24. In FIG. 27, it is assumed that the server specific information which the TV 45 receives as remote-controller signals includes two different server addresses which are (a) a sever address of a server 42 compliant to English and (a) a server address of a different server 42 compliant to Japanese. It is also assumed that the operation program which the TV 45 receives as remote-controller signals includes instruction for connecting the TV 45 to a server indicated by the server connection instruction 6006 in FIG. 25.

In the execution environments, the TV 45 obtains a language code of the TV 45 (S6016). The TV 45 determines whether or not the language code indicates Japanese language (S6017). If the language code indicates Japanese language, then the TV 45 selects, from the server specific information, a sever address of a server having a program storage unit 6011 storing an operation program for processing compliant to Japanese (S6018). On the other hand, if the language code does not indicate Japanese language, then the TV 45 selects, from the server specific information, a server address of a server having a program storage unit 6011 storing an operation program for processing compliant to English (S6019). Next, the TV 45 is connected to the server 42 with reference to the selected server address (S6021). The TV 45 downloads a server program from the server 42 (S6022, S6023). The TV 45 executes the downloaded server program in the program execution environments (for example, a virtual machine) of the TV 45 (S6024).

It should be noted that the use of the language code has been described in FIGS. 26 and 27, but the language code may be replaced by other information. Examples are a product serial number, a serial number of the display device (TV 45), and the like each of which indicates a country where the display device is on the market or equipped.

Figure 28:
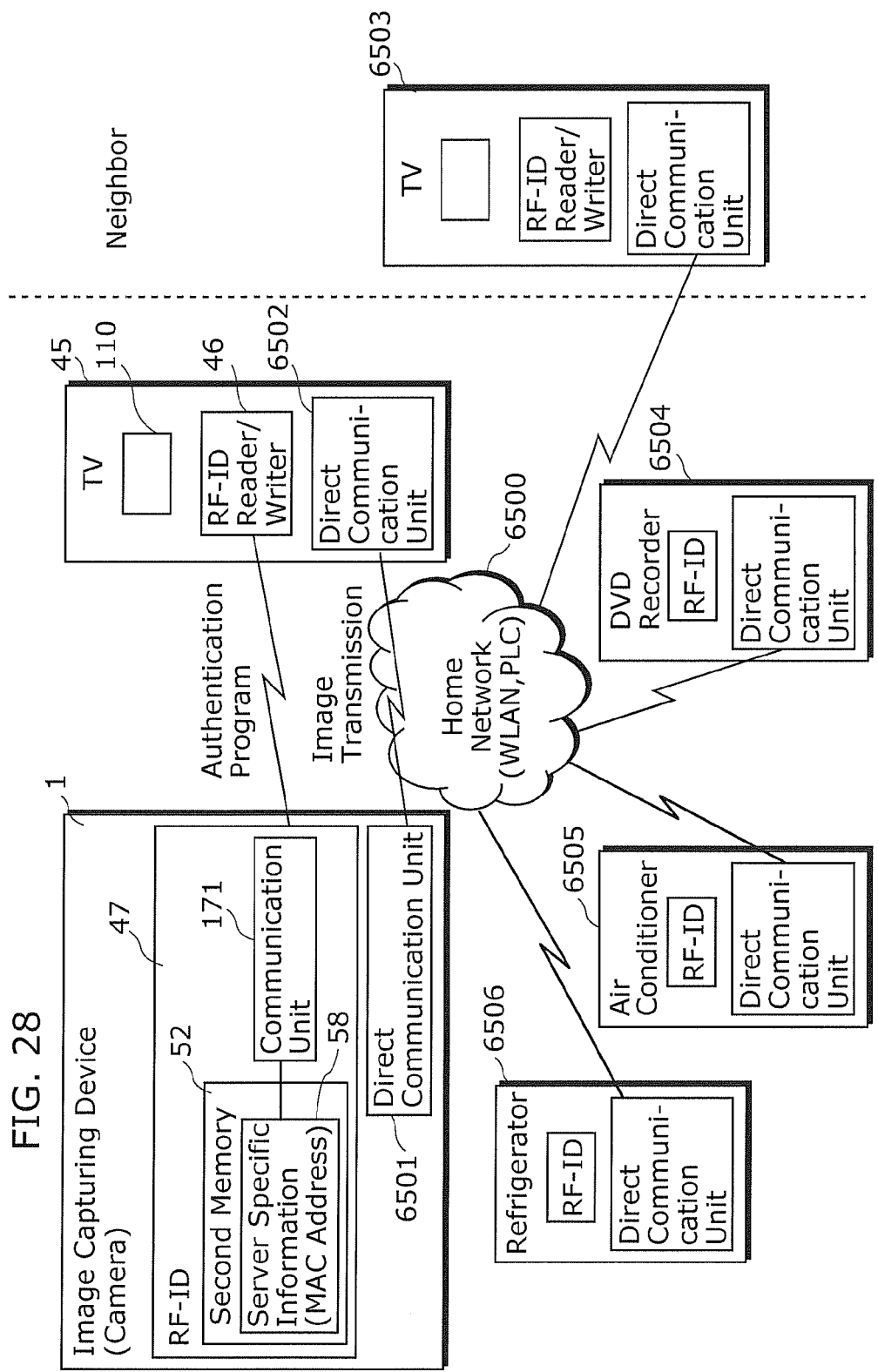
FIG. 28 is a block diagram of a home network 6500 connecting the image capturing device to the TV by a wireless LAN.

FIG. 28 is a block diagram of a home network 6500 connecting the image capturing device to the TV by a wireless LAN.

FIG. 28 illustrates a configuration of a home network 6500 in which the image capturing device 1 and the TV 45 are connected to each other via a wireless LAN or Power Line Communication (PLC). When the image capturing device 1 has a direct communication unit 6501 and the TV 45 has a direct communication unit 6502 so that the image capturing device 1 and the TV 45 can communicate directly with each other via the wireless LAN, the image capturing device 1 can transmit images to the TV 45 without using the server on the Internet. In other words, the image capturing device 1 serves also as a server. In this case, however, some communication mediums such as the wireless LAN used in the home network 6500 are easily intercepted by others. Therefore, safe data communication requires mutual authentication and exchange of encrypted data. For example, for existing wireless-LAN terminals (devices), access points serve as authentication terminals. If such an existing terminal is to authenticate its communication party, the terminal displays all connectable access points on its screen. The user selects one of the displayed access points from the screen. Then, the user presses a Wired Equivalent Privacy (WEP) key to perform encrypted communication. However, the above processing bothers general users. In addition, if a wireless LAN is embedded in home appliances such as a TV, there are so many terminals with which the existing terminal can communicate with authentication. If the user lives in an apartment house, the user can communicate even with terminals in neighbors. As a result, it is difficult for the user to select a terminal to be authenticated. For instance, if a neighbor has a TV 6503 that is the same model as the user's TV 45, the user has difficulty in distinguishing the TV 45 in the user's house from the TV 6503 based on the information displayed on the screen of the existing device.

Embodiment A1 of the present invention can solve the above problem. In Embodiment A1 of the present invention, RF-ID is used to perform authentication. In more detail, an authentication program including a MAC address 58 is recorded, as an operation program, in the second memory 52 in the RF-ID unit 47 of the image capturing device 1. When the image capturing device 1 is moved into proximity of the RF-ID reader/writer 46 of the TV 45, the image capturing device 1 provides the authentication program to the TV 45. The authentication program includes not only the MAC address but also a cryptography key for authentication (hereinafter, "authentication cryptography key") and an authentication command. When the TV 45 recognizes that the information provided from the RF-ID unit 47 includes the authentication command, the TV 45 performs authentication processing. The communication unit 171 in the RF-ID unit 47 cannot communicate with the TV 45, until the image capturing device 1 is physically located in proximity of the RF-ID reader/writer 46. Therefore, it is extremely difficult to intercept the communication between the image capturing device 1 and the TV 45 which is performed in a house. In addition, since the image capturing device 1 is moved into proximity of the TV 45 to exchange data, it is possible to prevent that the image capturing device 1 authenticates a wrong device (apparatus), such as the TV 6503 in a neighbor or a DVD recorder 6504 in the user's house.

Figure 29:
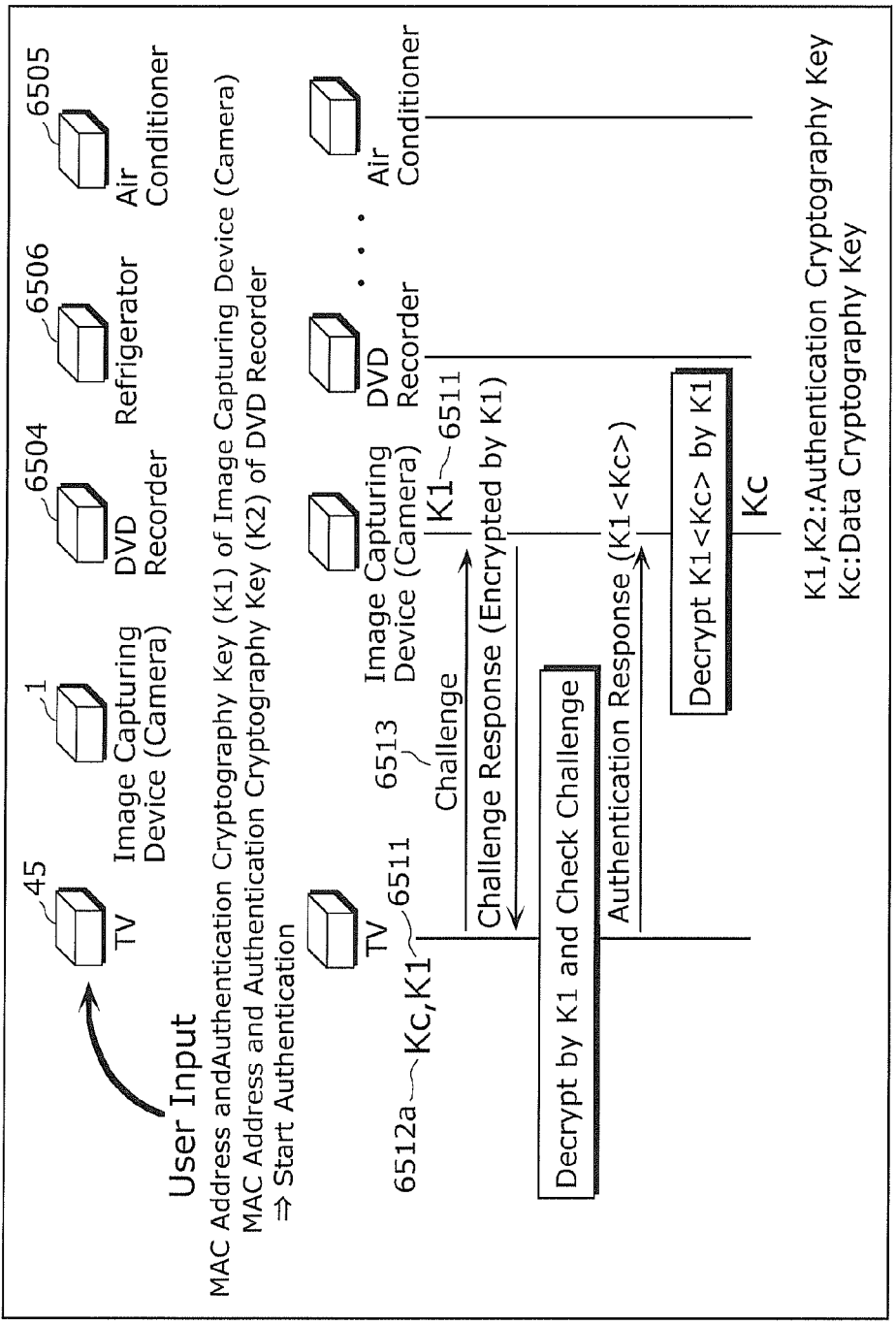
FIG. 29 presents an example of an authentication method without using RF-ID unit.

FIG. 29 presents an example of an authentication method without using RF-ID unit.

The following is an example of an authentication method without using RF-ID with reference to FIG. 29. A user inputs, to the TV 45, (a) MAC addresses of terminals to be authenticated, such as the camera (the image capturing device 1) and the DVD recorder 6504, which the user intends to authenticate for communication, and (b) authentication cryptography keys 6511 for the terminals. The TV 45 receiving the inputs transmits an appropriate message called a challenge 6513, to a target terminal having the MAC address. When the image capturing device 1 receives the challenge 6513, the image capturing device 1 encrypts the challenge 6513 using the authentication cryptography key 6511, and returns the encrypted challenge 6513 to the TV 45 that is a terminal from which the challenge 6513 has been provided. In receiving the encrypted challenge 6513, the TV 45 decrypts the encrypted challenge 6513 using the authentication cryptography key 6511. Thereby, the TV 45 can authenticate the authentication cryptography key 6511 to prevent user's error and intervention of other malicious users. Next, the TV 45 encrypts a cryptography key 6512*a* for data (hereinafter, a "data cryptography key 6512*a*") using the authentication cryptography key 6511. Then, the TV 45 transmits the encrypted data cryptography key 6512*a* to the image capturing device 1. Thereby, it is possible to perform the encrypted data communication between the TV 45 and the image capturing device 1. The TV 45 performs the above-described processing also with the DVD recorder 6504 and other apparatuses (terminals) 6505 and 6506 in order to share the data cryptography key 6512*a* among them. Thereby, the TV 45 can perform encrypted communication with all terminals (devices, apparatuses, or the like) connected in the home network.

Figure 30:
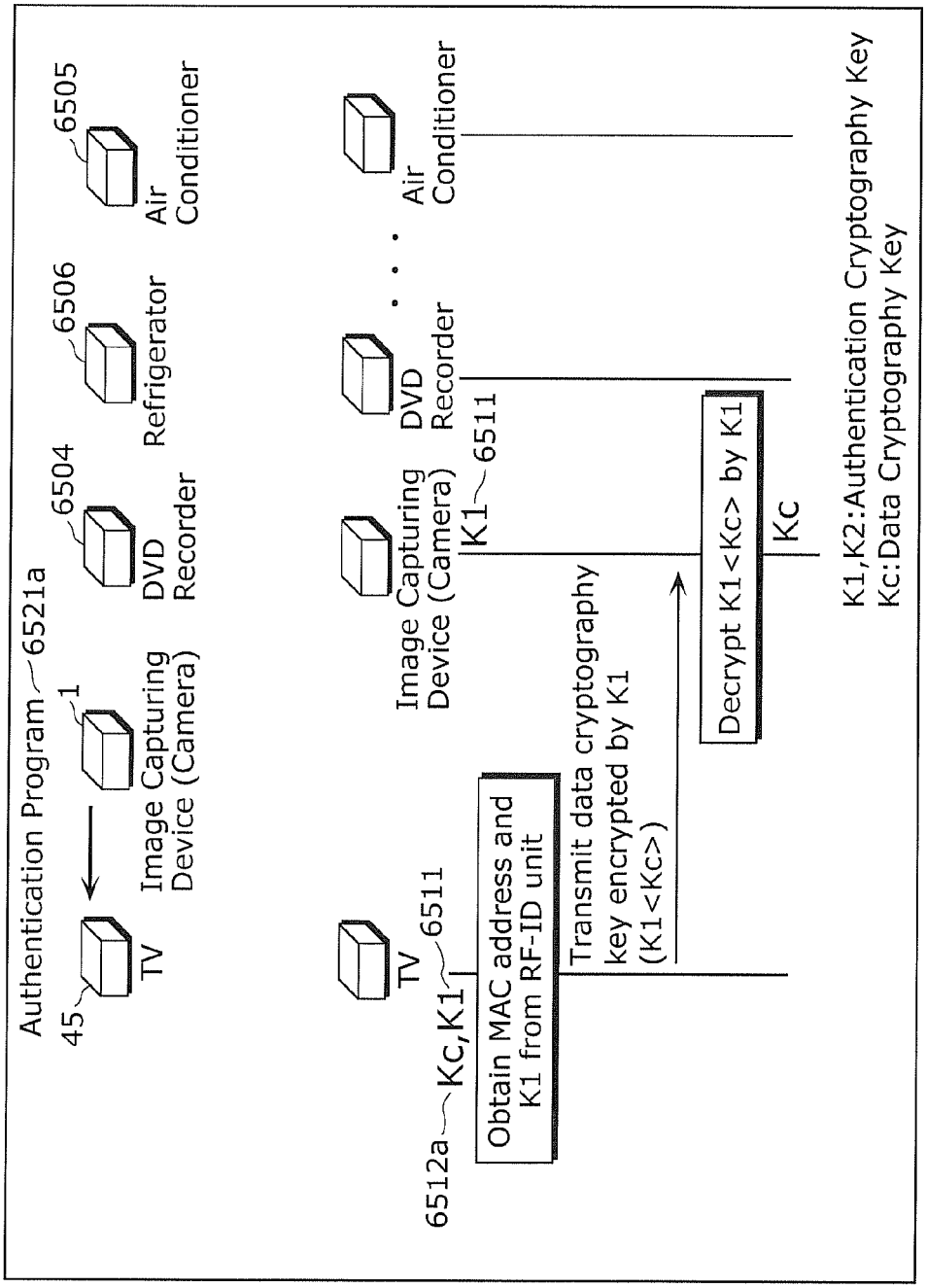
FIG. 30 presents an example of an authentication method using RF-ID unit.

FIG. 30 presents an example of an authentication method using RF-ID unit.

FIG. 30 illustrates an authentication method using RF-ID. In the authentication method using RF-ID, the image capturing device 1 (camera) generates an authentication program 6521*a*. The camera provides the generated authentication program 6521*a* from the RF-ID unit 47 in the camera to a RF-ID unit 46 in the TV 45. The authentication program 6521*a* includes an authentication command, a MAC address of the camera, and an authentication cryptography key 6511 for the camera. When the TV 45 receives the authentication program 6521*a* with the authentication command, the TV 45 retrieves the MAC address and the authentication cryptography key 6511 from the RF-ID unit 46. The TV 45 encrypts a data cryptography key 6512*a* using the retrieved authentication cryptography key 6511 and transmits the encrypted data cryptography key 6512*a* to the retrieved MAC address. The transmission is performed by a wireless-LAN device (terminal). In the authentication method using RF-ID, the authentication is performed automatically without any user's input. Therefore, there is no problem caused by user's input errors. In addition, since the image capturing device 1 (camera) needs to be moved into proximity of the TV 45, it is possible to prevent intervention of other malicious users. This authentication method using RF-ID can eliminate pre-processing such as the above-described challenge. Moreover, the action of physically moving the image capturing device 1 (camera) into proximity of the TV 45 enables the user to easily recognize which terminals the camera has authenticated. Furthermore, if the authentication cryptography key 6511 is not included in the authentication program, the authentication may be performed by a technique of general public key authentication. In addition, the communication device (medium) is not limited to a wireless LAN, but may be any medium, such as PLC or Ethernet™ included in the home network. Moreover, the MAC address may be any identification information for uniquely identifying a communication terminal in the home network.

Figure 31:
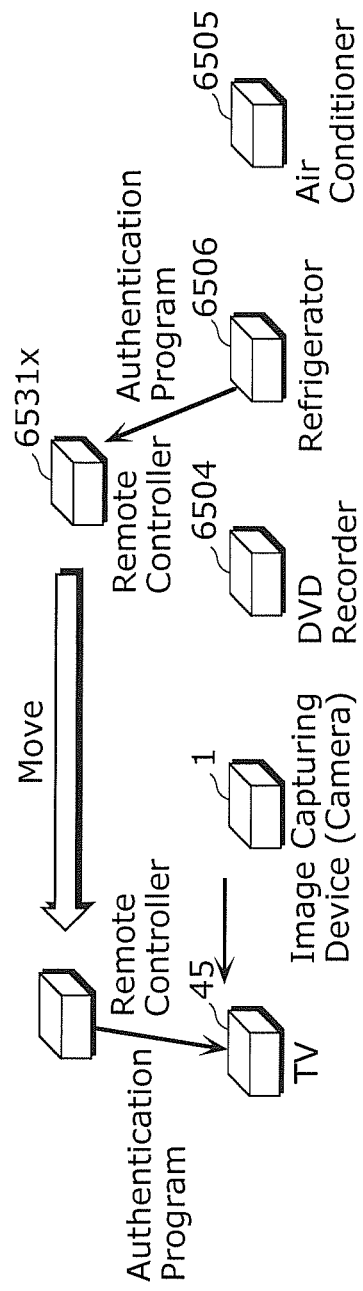
FIG. 31 presents an example of an authentication method used when it is difficult to move a terminal into proximity of another terminal.

FIG. 31 presents an example of an authentication method used when it is difficult to move a terminal into proximity of another terminal.

FIG. 31 illustrates an authentication method using RF-ID when it is difficult to move a terminal into proximity of another terminal. For example, when the terminals are a refrigerator and a TV which are difficult to move, it is almost impossible to directly exchange an authentication program between the terminals using RF-ID. In such a situation, Embodiment A1 of the present invention can be implemented by relaying the authentication program between the terminals using a device (such as a remote controller (mobile remote controller) 6531x) that is an accessory of the terminal. In more detail, a RF-ID reader/writer embedded in the remote controller 6531x reads the authentication program from a RF-ID unit in the refrigerator. Thereby, the authentication program is stored in a memory in the remote controller 6531x. A user moves the remote controller 6531x that is mobile. When the remote controller 6531x is moved into proximity of the TV 45, the remote controller 6531x transfers the authentication program from the memory of the remote controller 6531x, to the RF-ID unit of the TV 45. It should be noted that the transfer from the remote controller 6531x to the TV 45 is not limited to use RF-ID technology. Other communication means, such as infrared ray or ZigBee, that is previously set in the remote controller 6531x can be used. Any medium for which security in communication has already been established may be used.

Figure 32:
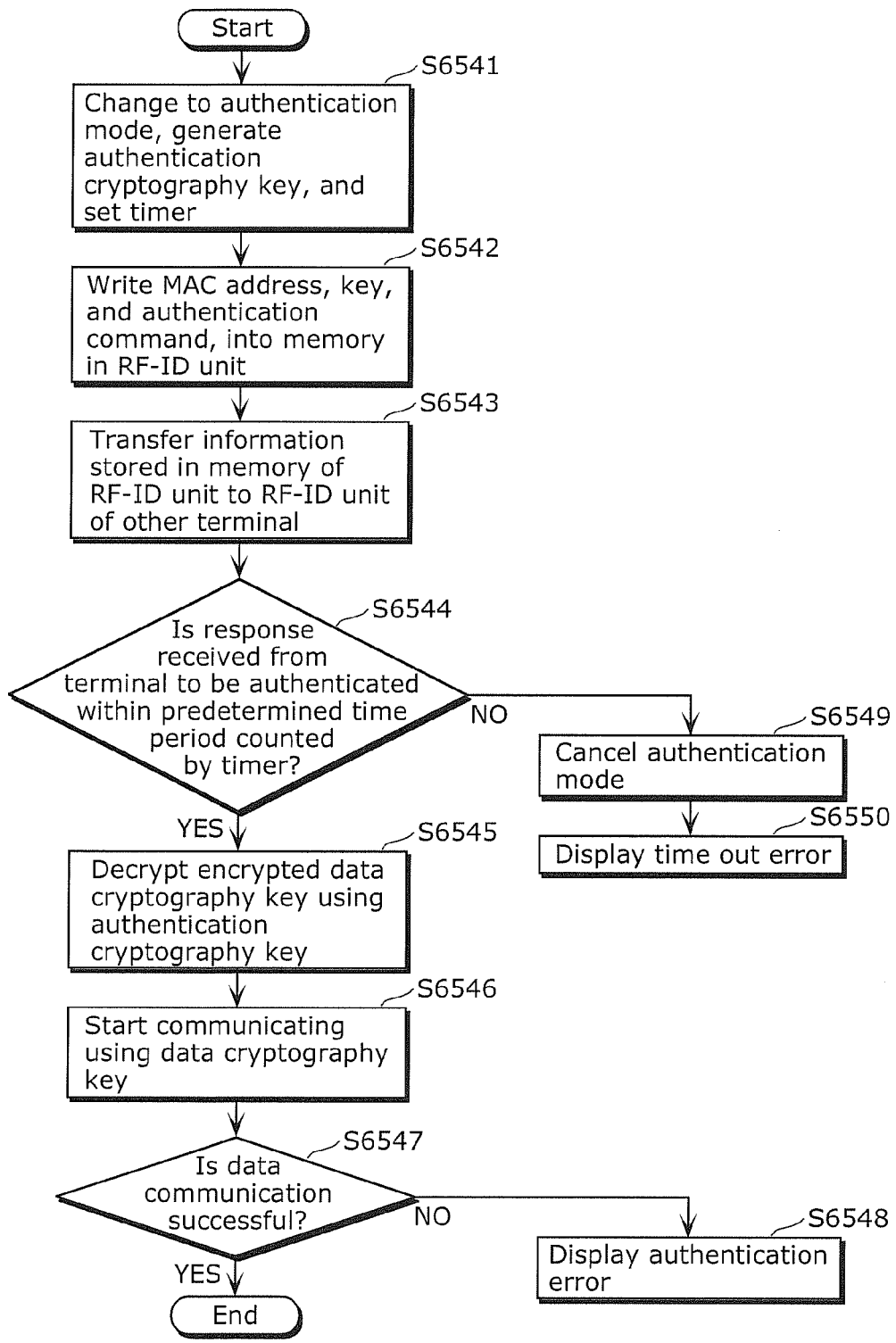
FIG. 32 is a flowchart of an example of processing performed by a camera.

FIG. 32 is a flowchart of an example of processing performed by a camera.

FIG. 32 is a flowchart of authentication performed by the camera (image capturing device 1) side. In an authentication mode, the camera generates an authentication cryptography key and sets a timer (S6541). The camera writes a MAC address of the camera, the generated authentication cryptography key, and an authentication command, into a memory in the RF-ID unit (S6542). When the user moves the camera to bring the RF-ID unit of the camera into proximity of the RF-ID unit of the TV, the camera transfers the information stored in the memory of the RF-ID unit of the camera to the RF-ID unit of the TV (S6543). The camera determines whether or not a response of the transfer is received from the TV within a predetermined time period counted by the timer (S6544). If the response is received within the predetermined time period, then the camera decrypts, by using the authentication cryptography key, encrypted data cryptography key included in the response (S6545). The camera starts communicating with the other device (apparatus) using the data cryptography key (S6546). The camera determines whether or not data communication with the TV is successful (S6547). If the data communication is successful, then the authentication is completed. On the other hand, if data cannot be correctly decrypted (in other words, data communication is not successful), then a notification of authentication error is displayed and the authentication is terminated (S548). Referring back to Step S6544, if there is no response within the predetermined time period, then the camera cancels the authentication mode (S6549) and then displays a notification of time out error (S6550).

Figure 33:
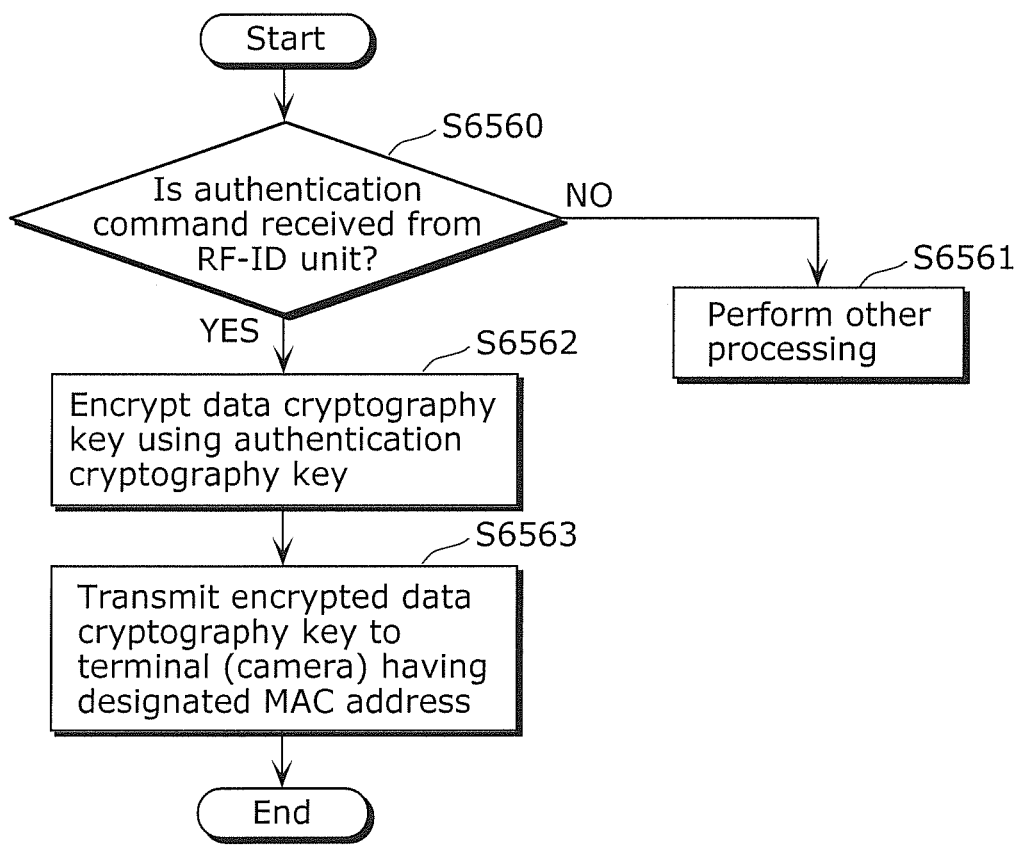
FIG. 33 is a flowchart of an example of processing performed by the TV.

FIG. 33 is a flowchart of an example of processing performed by the TV.

FIG. 33 is a flowchart of authentication performed by the TV 45 side. The TV 45 determines whether or not received information, which is provided from the RF-ID unit of the camera to the RF-ID unit of the TV 45, includes an authentication command (S6560). If the received information does not include the authentication command, then the TV 45 performs other processing according to the received information (S6561). On the other hand, if the received information includes the authentication command, the TV 45 determines that the information received from the RF-ID unit of the camera is an authentication program, and therefore encrypts a data cryptography key in the TV 45 using an authentication cryptography key in the authentication program (S6562). Then, the TV 45 transmits the encrypted data cryptography key to the terminal (the camera) having the MAC address designated in the authentication program (S6563).

Next, the following situation is described in detail with reference to figures. Here, the image capturing device 1 described with reference to FIG. 3 generates or updates a program executable by the TV 45. Then, the image capturing device 1 transmits the program to the TV 45 via the data transmission unit 173. Thereby, the TV 45 executes the program.

Figure 34:
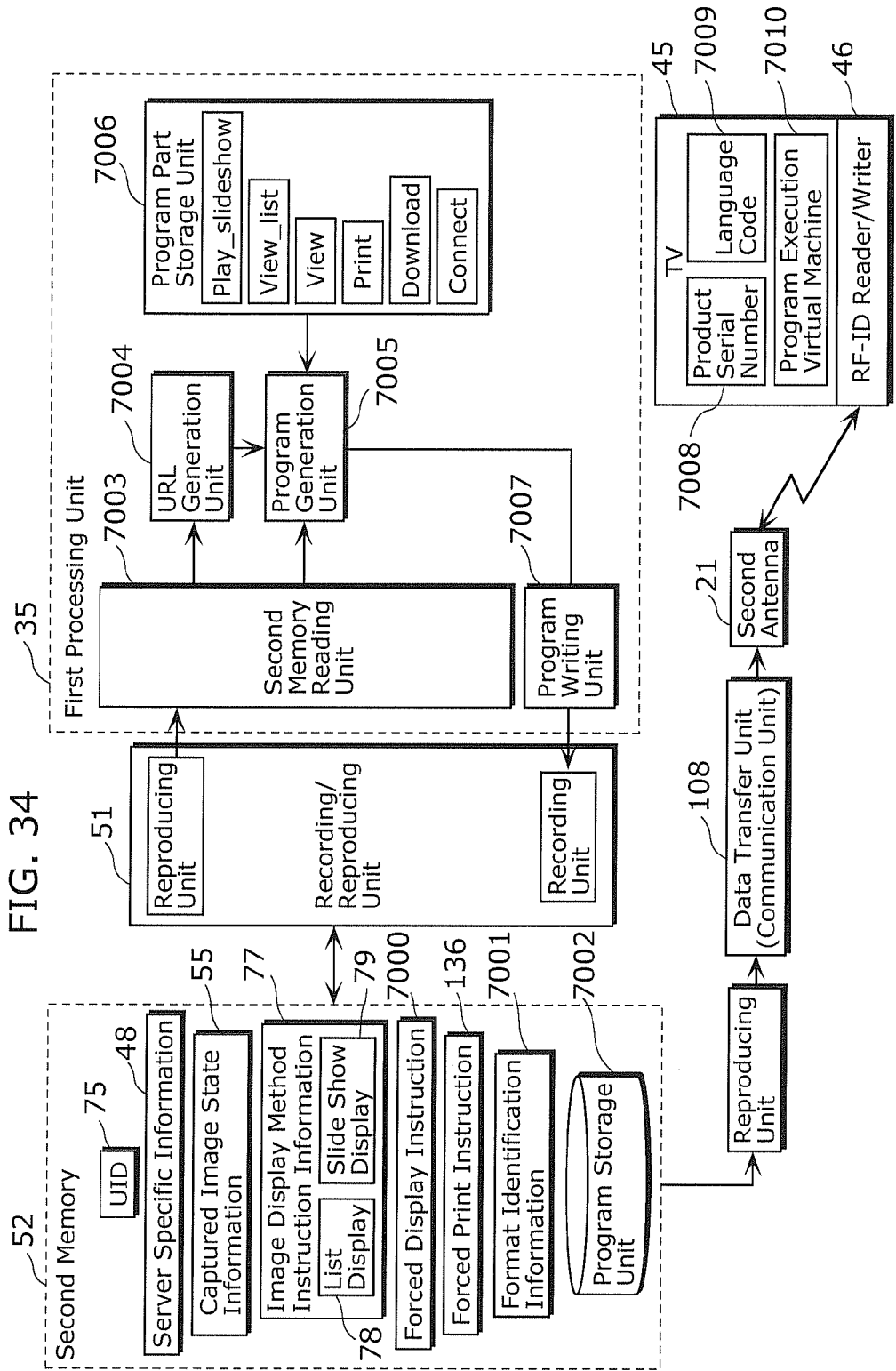
FIG. 34 is a block diagram of (a) a first processing unit generating the operation program in the image capturing device to be executed by the TV, and (b) a second memory unit.

FIG. 34 is a block diagram of the first processing unit 35 and the second memory 52 of the image capturing device 1 according to Embodiment A1.

The first processing unit 35 includes a second memory reading unit 7003, a URL generation unit 7004, a program generation unit 7005, a program part storage unit 7006, and a program writing unit 7007.

The second memory reading unit 7003 reads information from the second memory 52 via the recording/reproducing unit 51.

The URL generation unit 7004 reads the UID 75, the server specific information 48, the captured image state information 55, and the image display method instruction information 77 from the second memory 52 via the second memory reading unit 7003. From the above pieces of information, the URL generation unit 7004 generates a URL that is an address of the server 42 to which images have been uploaded from the image capturing device 1.

The UID 75 is identification information for identifying the image capturing device 1. The UID 75 is unique to each image capturing device 1. The URL generated by the URL generation unit 7004 includes UID. For instance, the image server 42, to which images are uploaded, has an image file in a directory unique to each UID. Thereby, a URL address can be generated for each image capturing device 1.

The server specific information 48 is a server name for identifying the server to which the images are uploaded. Via a Domain Name Server (DNS), an IP address of the server 42 is determined to connect the image capturing device 1 to the server 42. Therefore, the server specific information 48 is included in the generated URL.

The image display method instruction information 77 is information for enabling the user to optionally select the list display 78, the slide show display 79, or the like. The URL generation unit 7004 generates the URL based on the image display method instruction information 77. In other words, since the generated URL includes information indicating the list display 78 or the slide show display 79, the image server (the server 42) can determine based on the URL whether the images are to be displayed as the list display or the slide show display.

As described above, based on the UID 75, the server specific information 48, the captured image state information 55, the image display method instruction information 77, and the like which are stored in the second memory 52, the URL generation unit 7004 generates a URL of the image server in which images to be watched are stored. Then, the URL generation unit 7004 provides the generated URL to the program generation unit 7005.

The program generation unit 7005 generates a program executable by the TV 45, based on (a) the URI generated by the URL generation unit 7004, and (b) forced display instruction 7000, forced print instruction 136, and format identification information 7001 stored in the second memory 52. It should be noted that the program generation unit 7005 can generate a new operation program based on the above-described information, which is a method of generating a new operation program. The program generation unit 7005 can also generate such a new operation program by updating an operation program that has been already generated.

The program generated by the program generation unit 7005 is executable by the TV 45. The program should be compiled into a machine language used in a system controller (not shown) of the TV 45, so that the system controller can execute the program. In this case, the program generation unit 7005 has a compiler to convert the generated program to a program in an executable format.

However, the above-described compiler is not necessary if the program in a text format (script) (for example, a general Java™ script) is executed by a browser in the TV 45.

The URL provided to the program generation unit 7005 is used to connect the TV 45 to the image server (server 42) in which images are stored. By using the URL, the program generation unit 7005 generates or updates a connection program (hereinafter, referred to also as a "server connection program" or "connection program") for connecting the TV 45 to the image server.

The forced display instruction 7000 is optional and used in the following situation. For example, there is the situation where, while the user watches on the TV 45 a TV program provided by general broadcast waves, the RF-ID reader/writer 46 of the TV 45 becomes communicable with the image capturing device 1 via the second antenna 21. In the situation, the forced display instruction 7000 is used to automatically set the TV 45 into a browser watching mode so that image data provided from the image server is displayed on the TV 45. If this option is selected, the program generation unit 7005 generates a program for forcing the TV 45 to display image data.

The forced print instruction 136 is optional and used in the following situation. For example, there is the situation where, while the user watches on the TV 45 a TV program provided by general broadcast waves, the RF-ID reader/writer 46 of the TV 45 becomes communicable with the image capturing device 1 via the second antenna 21. In the situation, the forced print instruction 136 is used to automatically print image data stored in the image server by a printer (not shown) connected to the TV 45. If this option is selected, the program generation unit 7005 generates a program for forcing the TV 45 to print image data by the printer.

The format identification information 7001 is information of a format by which image data is to be displayed. When an option of language code optimization selection in the format identification information 7001 is selected, the program generation unit 7005 generates a program for selecting a URL to be connected, based on the language code set in the TV 45. The following is an example in the situation where the option of language code optimization selection in the format identification information 7001 is selected. If the language code of the TV 45 indicates Japanese language, the program generation unit 7005 selects a Japanese site as the URL to be connected. On the other hand, if the language code of the TV 45 does not indicate Japanese language, the program generation unit 7005 selects an English site as the URL to be connected. Or, the URL generation unit 7004 may generate two URLs for the Japanese site and the English site, and provide the two URLs to the program generation unit 7005.

The program part storage unit 7006 holds program command information used by the program generation unit 7005 to generate a program. A program part stored in the program part storage unit 7006 may be a general library or an Application Programming Interface (API). In order to generate a connection command for connecting the TV 45 to the server, the program generation unit 7005 combines a server connection command "Connect" in the program part storage unit 7006 with the URL generated by the URL generation unit 7004. Thereby, the program generation unit 7005 generates or updates a connection program for connecting the TV 45 to the server indicated by the URL.

The program writing unit 7007 is an interface used to write the program generated by the program generation unit 7005 to the second memory 52.

The program provided from the program writing unit 7007 is stored into a program storage unit 7002 in the second memory 52 via the recording/reproducing unit 51.

When the image capturing device 1 is moved to bring the RF-ID unit of the image capturing device 1 into proximity of the RF-ID reader/writer 46 connected to the TV 45, the reproducing unit reads out the program from the program storage unit 7002 in the second memory 52. Then, transmission signals indicating the program are transmitted to the RF-ID reader/writer 46 via the data transfer unit 108 and the second antenna 21. The TV 45 receives the transmission signals via the RF-ID reader/writer 46. The TV 45 executes the received program.

The TV 45 has the product serial number 7008, the language code 7009, and a program execution virtual machine 7010.

The product serial number 7008 is a product serial number of the TV 45. From the product serial number 7008, it is possible to learn a manufacture date/time, a manufacture location, a manufacturing line, and a manufacturer of the TV 45.

The language code 7009 is predetermined in the TV 45 to be used in displaying a menu, for example. The language code 7009 is not limited to be predetermined, but can be switched to another by the user.

The program execution virtual machine 7010 is a virtual machine that executes a received program. The program execution virtual machine 7010 may be implemented as hardware or software. For example, the program execution virtual machine 7010 may be a Java™ virtual machine. The Java™ virtual machine is a stack or interpreter virtual machine that executes defined instruction sets. If the image capturing device 1 has the virtual machine, the program generated by the program generation unit 7005 in the image capturing device 1 is compliant to any execution platforms. As a result, the program generation unit 7005 can generate a program executable in any platforms.

Figure 35:
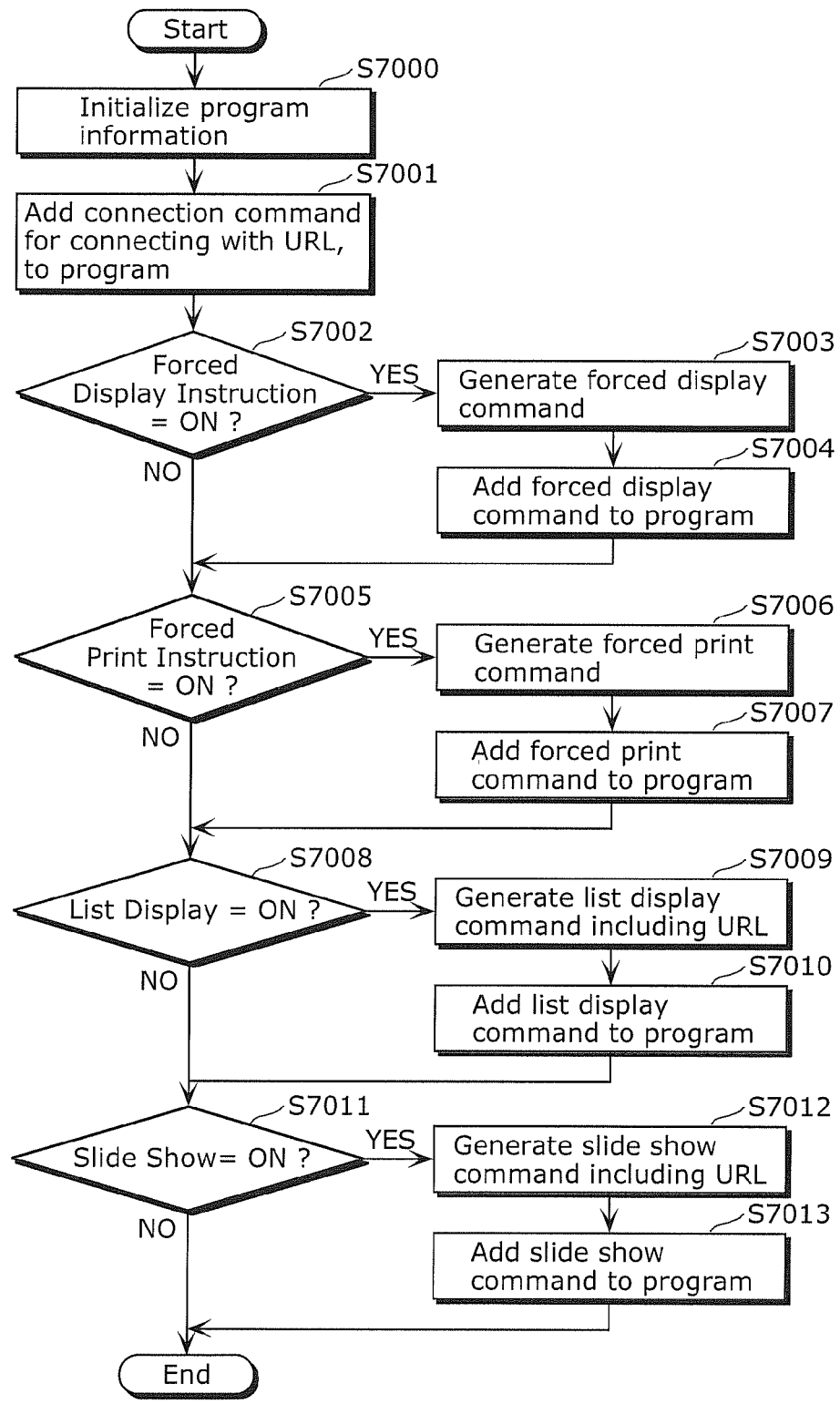
FIG. 35 is a flowchart of processing performed by a program generation unit in the first processing unit.

FIG. 35 is a flowchart of processing performed by the program generation unit 7005 of the image capturing device 1.

First, the program generation unit 7005 initializes information used to generate a program (S7000).

Next, based on the server specific information 48 stored in the second memory 52, the program generation unit 7005 generates a connection command for connecting the TV 45 to the server 42, by using the URL generated by the URL generation unit 7004. In order to generate the connection command, the program generation unit 7005 selects an instruction set (for example, "Connect" in FIG. 25) for a server connection command from the program part storage unit 7006, and combines the selected instruction set with the URL. Thereby, a server connection program (for example, "Connect (URL)") is generated.

Then, the program generation unit 7005 examines the forced display instruction 7000 in the second memory 52 so as to determine whether or not the forced display instruction 7000 is selected (S7001). If the forced display instruction 7000 is selected, then the program generation unit 7005 calls an instruction set for a forced display program from the program part storage unit 7006, and thereby generates a forced display command (S7002). The generated forced display command is added to the program (S7004).

On the other hand, if the forced display instruction 7000 is not selected, then the program generation unit 7005 does not generate the forced display command, but proceeds to S7005.

Next, the program generation unit 7005 makes a determination as to whether the forced print instruction in the second memory 52 is selected (S7005). If the forced print instruction is selected, then the program generation unit 7005 generates a forced print command for forcing the TV 45 to print, by a printer, an image file stored in the server 42 (S7006). The generated print command is added to the program (S7007).

Then, the program generation unit 7005 examines the image display method instruction information 77 in the second memory 52 so as to determine whether or not the list display 78 is selected (S7008). If the list display 78 is selected, then the program generation unit 7005 generates a list display command for causing the TV 45 to display a list of the image file stored in the server 42 (S7009). The generated list display command is added to the program (S7010).

After that, the program generation unit 7005 examines the image display method instruction information 77 in the second memory 52 so as to determine whether or not the slide show 79 is selected (S7011). If the slide show 79 is selected, then the program generation unit 7005 generates a slide show command for causing the TV 45 to display a slide show of the image file stored in the server 42 (S7012). The generated slide show command is added to the program (S7013).

As described above, based on the information set in the second memory 52, the program generation unit 7005 in the image capturing device 1 generates a program used to display images on the TV 45, by using an instruction command set that is stored in the program part storage unit 7006 to generate the program.

It should be noted that, in Embodiment A1, there are commands for the forced display instruction, the forced print instruction, the list display, and the slide show display. However, the commands (programs) are not limited to the above. For example, if a command for the forced display instruction is to be generated as a program, the program generation unit 7005 can also generate a determination command for determining whether or not the apparatus (device) executing the program has a display device or display function, and add the generated determination command to the program. Thereby, the command for the forced display instruction is executed only if the apparatus executing the program has a display device or display function. As a result, the determination command can prevent confusion in the apparatus executing the program. The same goes for a command for the forced print instruction. The program generation unit 7005 may also generate a determination command for determining whether or not the apparatus executing the program has or is connected to a printing function, and add the generated determination command to the program. Thereby, the command for the forced print instruction is executed only if the apparatus executing the program has or is connected to a printing function.

The following describes execution of the program generated or updated by the program generation unit 7005 in the image capturing device 1.

Figure 36:
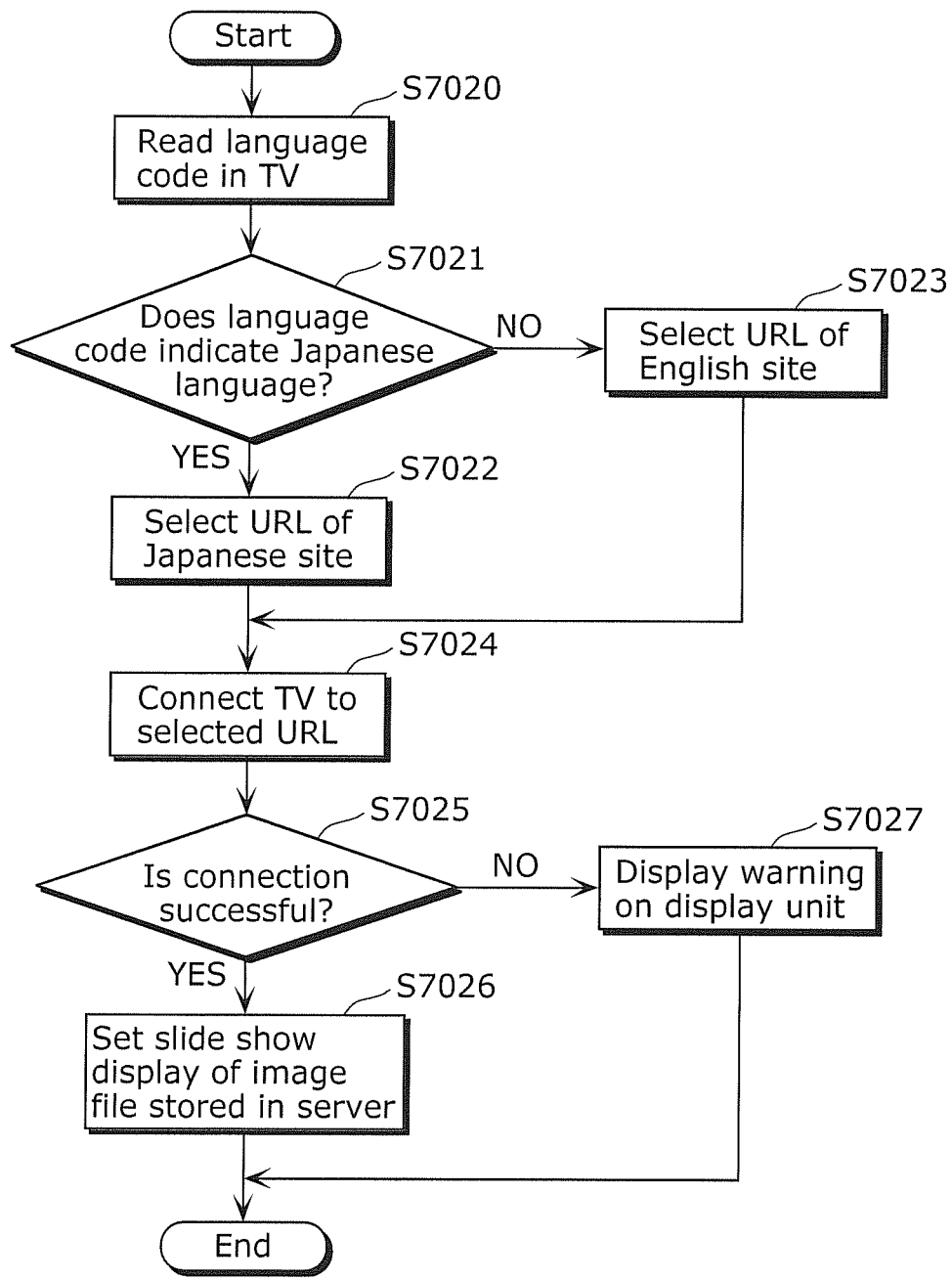
FIG. 36 is a flowchart of an example of a program generated by the program generation unit.

FIG. 36 is a flowchart of execution of the program generated or updated by the program generation unit 7005.

The program is transmitted from the image capturing device 1 to a device (apparatus) different from the image capturing device 1 via the second antenna 21 of the image capturing device 1. Then, the program is executed by the different device. In Embodiment A1, the different device is the TV 45. The TV 45 receives the program via the RF-ID reader/writer 46 and executes the received program by a controller or virtual machine (not shown) in the TV 45.

First, the program is executed to read the language code set in the TV 45, as unique information of the TV 45 (S7020). The language code is predetermined by the user to be used in displaying a menu and the like on the TV 45.

Next, the program is executed to determine a language indicated in the language code. First, a determination is made as to whether or not the language code indicates Japanese language (S7021). If the determination is made that the language code indicates Japanese language, then a connection command for a Japanese site is selected from the connection commands in the program (S7022). On the other hand, if the determination is made that the language code does not indicate Japanese language, then a connection command for an English site is selected from the connection commands in the program (S7023). It should be noted that it has been described in Embodiment A1 that a determination is made as to whether or not the language code indicates Japanese language, and thereby a connection command is selected from the connection command for connecting to a Japanese site and the connection command for connecting to an English site. However, it is also possible that the program includes a plurality of connection programs compliant to various language codes. Thereby, the program can be compliant to two or more language codes. As a result, usability is improved. Next, according to the selected connection command, the program is executed to connect the TV 45 to the URL indicted in the connection command (S7024).

Then, a determination is made as to whether or not the connection to the URL indicted in the connection command is successful (S7025). If the connection is failed, then the display unit of the TV 45 displays warning indicating the connection failure (S7027). On the other hand, if the connection is successful, then a command for displaying a slide show of an image file stored in the server is executed to display the slide show (S7026).

It should be noted that the above is the situation where the operation program is for displaying images as a slide show. However, the operation program is not limited to the above. The program may be used for performing list display, forced display, or forced printing. If the operation program is for forced display, a step (command) of automatically changing setting of the TV 45 to setting of displaying an image file stored in the server is added to the program. Thereby, the user does not need to change the setting of the TV 45 by manual in order to display images provided from the image server. In the case of the forced printing, a command for automatically changing setting of the TV 45 to a printable mode is added to the program. Moreover, in the case of each of the forced printing and forced display, a determination command for determining whether or not the TV 45 has a printing function or a displaying function is added to the program. Thereby, the forced print command is not executed in an apparatus (device) without a printing function. Furthermore, the operation program in Embodiment A1 of the present invention may be a connection program for leading other programs. For example, the operation program may be a loader program, such as a boot-loader for loading other programs to be executed.

As described above, Embodiment A1 of the present invention is characterized in that the program generation unit 7005 is included in the first processing unit 35 of the image capturing device 1 that is a device having RF-ID communication means (such as the data transfer unit 108 and the second antenna 21). It is also characterized in that the program generated or updated by the program generation unit 7005 is executed by a different device (apparatus) except the image capturing device 1 according to Embodiment A1 of the present invention that is a communication device having RF-ID.

Conventionally, a device having RF-ID needs to transfer ID information (tag information), which the device has, from a RF-ID communication unit to another device (for example, the TV 45 according to Embodiment A1 of the present invention). The device (apparatus) receiving the ID information should previously hold operation programs each unique to a corresponding device having RF-ID. Therefore, if new products having RF-ID technology appear, the receiving device needs to install an operation program corresponding to the new products and execute the program. Otherwise, the receiving device is excluded as not being compliant to the new products. The installation of operation programs requires technical knowledge. Not everyone can perform the installation. Therefore, if various new devices having RF-ID are produced, other devices such as the TV 45 of Embodiment A1 of the present invention become obsolete. As a result, property values of user's devices are damaged.

According to the disclosure of Embodiment A1 of the present invention, the device having RF-ID technology has the program generation unit 7005 and sends not ID information (tag information) but a program to another device (apparatus) such as the TV 45. The apparatus such as the TV 45 receives and executes the program. Therefore, the receiving apparatus does not need to previously have operation programs for various devices having RF-ID. Even if a new device having RF-ID technology appears, the receiving apparatus does not need to install a new program for the device. Therefore, usability is significantly improved.

Therefore, the terminal such as a TV does not need to previously have application programs for respective items, kinds, or application systems of various objects having RF-ID. Thereby, the terminal such as a TV does not need to previously have a storage device, either, for holding various application programs. In addition, maintenance such as version-up of the programs in the terminal is not necessary.

The program generated by the program generation unit 7005 is useful if it is executable in any execution platforms such as a Java™ language. Therefore, if the device (apparatus) such as the TV 45 executing programs has a Java™ virtual machine, programs generated by any devices (apparatuses) can be executed.

It should be noted that the program generation unit 7005 according to Embodiment A1 of the present invention may have a function of updating the program previously stored in the program storage unit 7002 of the second memory 52. The situation of updating a program produces the same advantages as that in the situation of generating a program. The generating or updating performed by the program generation unit 7005 may be generating or updating data used in executing a program by the TV 45. In general, the program includes additional initialization setting data. The additional data is used to switch an execution mode or to set a flag. Therefore, generating or updating of the additional data is equivalent to generating or updating of the program, without deviating from the inventive concepts of the present invention. This is because, for execution of a program, it is merely a matter of design whether a parameter for mode switching or the like is to be held and read as data, or is to be included in the program to be executed. Therefore, when the program generation unit 7005 according to Embodiment A1 of the present invention generates or updates a program, the program generation unit 7005 can also generate data such a parameter sequence used by the program. The parameter is generated based on the forced display instruction 7000, the forced print instruction 136, the image display method instruction information 77, the format identification information 7001, or the like stored in the second memory 52.

The following describes characteristic structures and processing of the second memory 52 and the first processing unit 35 in the image capturing device 1 that is a communication device having RF-ID according to Embodiment A1 of the present invention. In Embodiment A1 of the present invention, the image capturing device 1 that is a communication device having RF-ID has a use status detection unit in the first processing unit 35. The use status detection unit detects a trouble related to operation, a power consumption status, or the like. The image capturing device 1 generates a program for displaying the result of the detection (use status) on the TV 45 that is a device (apparatus) different from the image capturing device 1.

Figure 37:
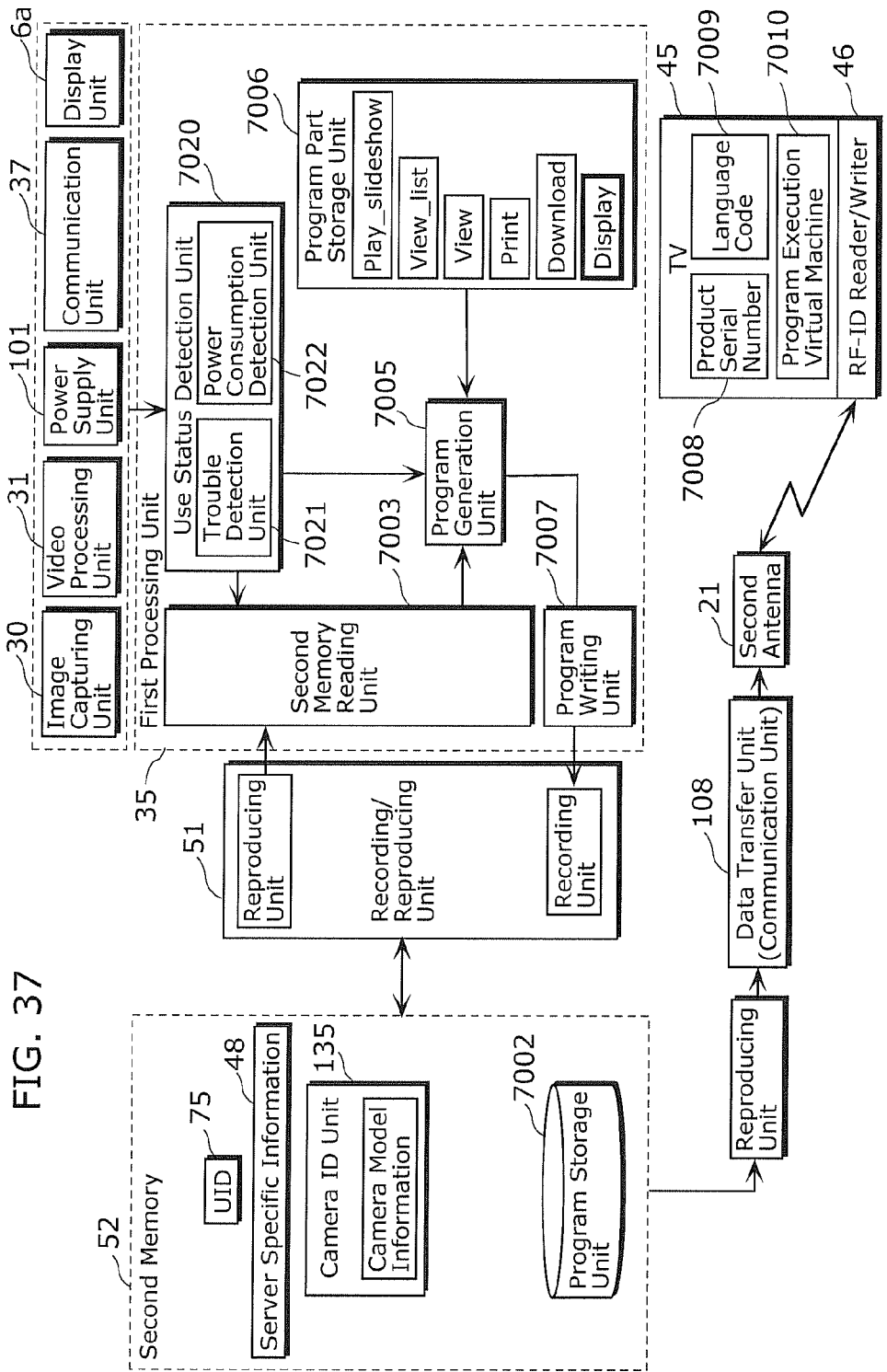
FIG. 37 is a block diagram of (a) the first processing unit generating the operation program in the image capturing device to display a use status of the image capturing device, and (b) the second memory unit.

FIG. 37 is a block diagram of characteristic structures of the second memory 52 and the first processing unit 35 in the image capturing device 1 according to Embodiment A1 of the present invention.

The second memory 52 includes the UID 75, the server specific information 48, the camera ID 135, and the program storage unit 7002.

The UID 75 is a serial number unique to the image capturing device 1, and used to identify the single image capturing device 1.

The server specific information 48 is information for identifying the server 42 to which image data captured by the image capturing device 1 is transmitted by the communication unit 37. The server specific information 48 includes a sever address, a storing directory, a login account, a login passwords, and the like.

The camera ID 135 includes a product serial number, a manufacturing year/month/date, a manufacturer, a manufacturing line, a manufactured location, and the like of the image capturing device 1. The camera ID 135 also includes camera model information for identifying a model of the image capturing device 1.

The first processing unit 35 includes the second memory reading unit 7003, a use status detection unit 7020, the program generation unit 7005, the program part storage unit 7006, and the program writing unit 7007.

The second memory reading unit reads information from the second memory 52 via the recording/reproducing unit 51. In Embodiment A1 of the present invention, the second memory reading unit 7003 reads the UID 75, the server specific information 48, and the camera ID 135 from the second memory 52, and provides the pieces of information to the program generation unit 7005. Reading of the pieces of information from the second memory 52 is performed when a readout signal is provided from the use status detection unit 7020 that is described later.

The use status detection unit 7020 detects a use status of each unit included in the image capturing device 1. The use status detection unit 7020 includes sensors each detecting a trouble in operation of a corresponding unit included in the image capturing device 1. Results of the detection of the sensors in respective units are provided to the use status detection unit 7020. The sensors for the respective units provide the use status detection unit 7020 with trouble information, battery duration, a power consumption amount, and the like. For example, the image capturing unit 30 provides the use status detection unit 7020 with information indicating whether or not an image capturing operation of the image capturing unit 30 has any trouble (whether or not the image capturing unit 30 functions correctly, and whether or not the image capturing unit 30 responds to a call from the use status detection unit 7020). The video processing unit 31 provides the use status detection unit 7020 with information indicating whether or not data processing for image data captured by the image capturing unit 30 has any trouble (whether or not the video processing unit 31 functions correctly, and whether or not the video processing unit 31 responds to a call from the use status detection unit 7020). The power supply unit 101 provides the use status detection unit 7020 with a voltage level of the battery and a total power consumption amount. The communication unit 37 provides the use status detection unit 7020 with information indicating whether or not the communication unit 37 is successfully connected to the server or the Internet (whether or not the communication unit 37 functions correctly, and whether or not the communication unit 37 responds to a call from the use status detection unit 7020). The display unit 6a provides the use status detection unit 7020 with information indicating whether or not display processing has any trouble, whether or not the display unit 6a correctly responds to a call from the use status detection unit 7020, and the display unit 6a functions correctly. Based on the above pieces of status information provided regarding the respective units, the internal trouble detection unit 7021 in the use status detection unit 7020 determines whether or not each of the units has any trouble in its functional operation. If there is a trouble, then the use status detection unit 7020 provides the program generation unit 7005 with information for specifying the trouble. The use status detection unit 7020 has a power consumption detection unit 7022. The power consumption detection unit 7022 generates power consumption information based on the total power consumption information provided form the power supply unit, and then provides the power consumption information to the program generation unit 7005.

The program generation unit 7005 generates a program for displaying, on the TV 45, the information for specifying a trouble or the power consumption information which is provided from the use state detection unit 7020. For generation of a program, instruction sets to be included in the program are previously stored in the program part storage unit 7006. Therefore, the program generation unit 7005 generates (a) a display command ("display" in FIG. 37) for displaying a trouble or a power consumption amount, and (b) a program for displaying information for specifying a location of the trouble and information for specifying the trouble in detail. It should be noted that the power consumption amount may be converted to a carbon dioxide emission amount, and therefore a program may be generated to display the carbon dioxide emission amount.

The program generated by the program generation unit 7005 is stored in the program storage unit 7002 in the second memory 52 via the program writing unit 7007.

The program stored in the program storage unit 7002 in the second memory 52 is transmitted to the RF-ID reader/writer 46 of the TV 45 via the data transfer unit 108 and then the second antenna 21.

The TV 45 executes the received program by the program execution virtual machine 7010.

With the above-described structure, the program generation unit 7005 in the first processing unit 35 generates a program for displaying, on the TV 45, trouble information or use status information detected by the use status detection unit 7020 regarding use of the image capturing device 1. The program is transmitted to the TV 45 that displays the trouble information or the use status information of the image capturing device 1. Thereby, the TV 45 can present the trouble information or the use status information to the user, without installing a plurality of programs compliant to various devices including the image capturing device 1.

In conventional systems, each of devices such as an image capturing device, a camcorder, an electric toothbrush, and a weight scale is provided with a simple display function such as a liquid crystal device, so as to display the trouble information or the use status information on the corresponding display function. Therefore, the display function has a low display capability for merely displaying the trouble information as a symbol sequence or an error code. When the trouble information is presented, the user needs to read instruction manual to check what kind of trouble it is. Some users have lost instruction manual and therefore obtain more information from a website on the Internet.

In the system according to Embodiment A1 of the present invention, however, a program for displaying trouble information can be executed by the TV 45 not by the image capturing device 1. The TV 45, which displays the trouble information detected by each device such as the image capturing device 1, has a display capability higher than that of the conventional systems. Therefore, the system according to Embodiment A1 of the present invention can solve the above conventional problem.

The following describes, in detail with reference to figures, the situation where a program generated by the image capturing device 1 described with reference to FIG. 3 is executed by a plurality of apparatuses (devices) including the TV 45.

Figure 38:
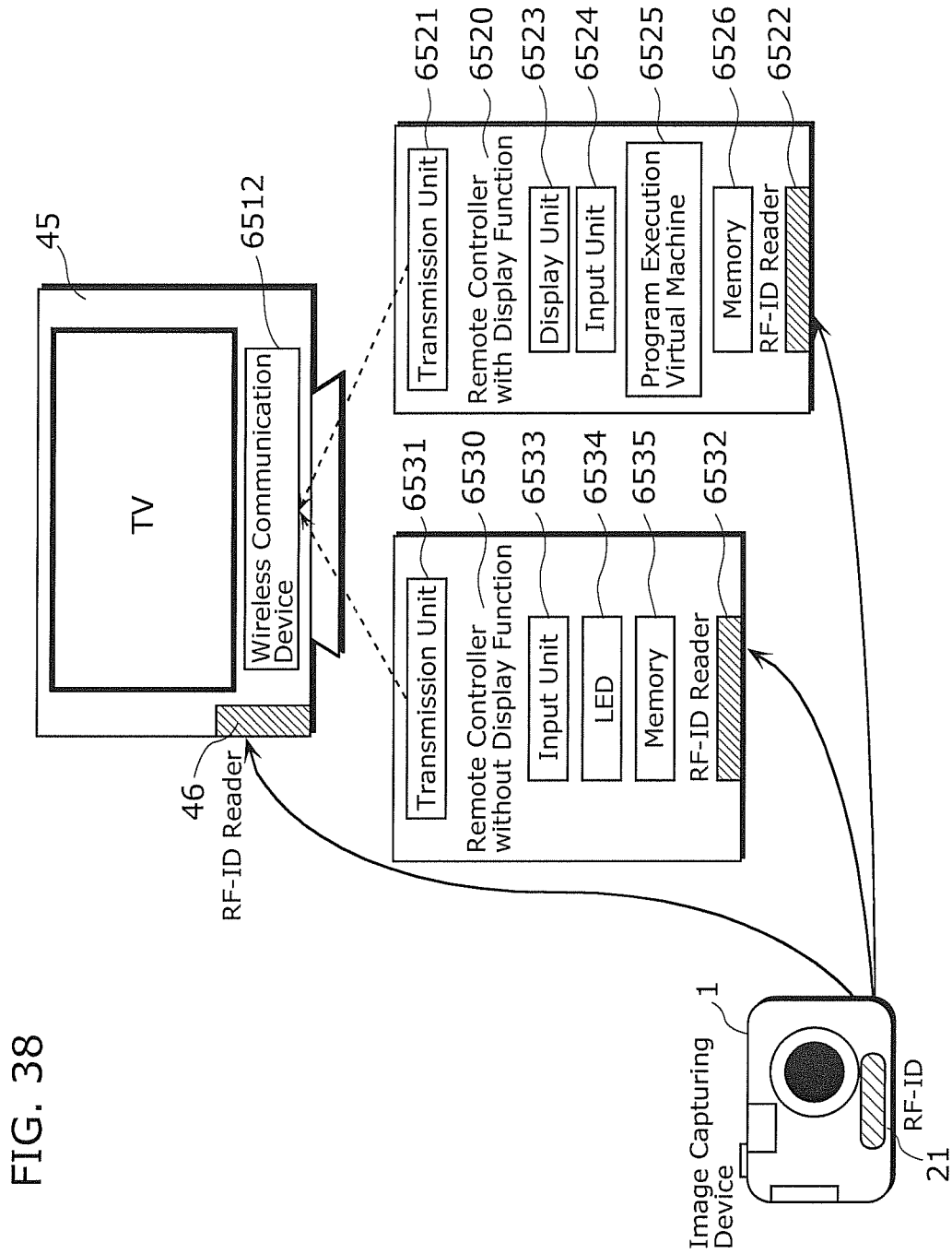
FIG. 38 illustrates a use example where the program generated by the image capturing device is executed by an external device (apparatus).

FIG. 38 illustrates a system in which a program generated by the image capturing device 1 is executed by a plurality of apparatuses.

The system includes the image capturing device 1, the TV 45, a remote controller (with display function) 6520, and a remote controller (without display function) 6530.

The TV 45 includes the RF-ID reader/writer 46 and a wireless communication device 6512. The wireless communication device 6512 is, for example, a general infrared communication device currently used as many remote controllers of home appliances, or a short-range wireless communication device used for home appliances using radio waves, such as Bluetooth and ZigBee.

The remote controller (with display function) 6520 includes a transmission unit 6521, a display unit 6523, an input unit 6524, a RF-ID reader 6522, a memory 6526, and a program execution virtual machine 6525. The transmission unit 6521 transmits signals to the wireless communication device 6512 of the TV 45. The display unit 6523 displays video. The input unit 6524 receives key inputs from a user. The RF-ID reader 6522 communicates with the RF-ID unit 47. The memory 6526 stores a program received by the RF-ID reader 6522. The program execution virtual machine 6525 is a virtual machine that executes the program received by the RF-ID reader 6522. For instance, recent mobile phones are example of the remote controller (with display function) 6520, having an infrared communication function, Bluetooth, a RF-ID reader, a liquid crystal display, a key input unit, a Java™ virtual machine, and the like. The display unit 6523 and the input unit 6524 may be a liquid crystal display and a plurality of character input buttons, or may be integrated into a liquid-crystal touch panel, for example.

The remote controller (without display function) 6530 includes a transmission unit 6531, an input unit 6533, a RF-ID reader 6532, and a memory 6535. The transmission unit 6531 transmits signals to the wireless communication device 6512 of the TV 45. The input unit 6533 such as buttons receives key inputs from a user. The RF-ID reader 6532 communicates with the RF-ID unit 47. The memory 6535 temporarily stores data received by the RF-ID reader 6532.

The remote controller (without display function) 6530 is, for example, a general remote controller having a RF-ID reader. Remote controllers are common accessory devices of TVs.

In Embodiment A1 of the present invention, there are the following four possible situations from which the user selects a preferred one. In the first situation, the program generated by the image capturing device 1 is transmitted directly to the TV 45 via the RF-ID reader/writer 46 of the TV 45, and executed by the TV 45. In the second situation, the program generated by the image capturing device 1 is transmitted indirectly to the TV 45 via the remote controller (without display function) 6530, and executed by the TV 45. In the third situation, the program generated by the image capturing device 1 is transmitted indirectly to the TV 45 via the remote controller (with display function) 6520, and executed by the TV 45. In the fourth situation, the program generated by the image capturing device 1 is transmitted to the remote controller (with display function) 6520, and executed by the remote controller (with display function) 6520.

The first situation has been already described above in Embodiment A1. Therefore, the first situation is not described in detail again below.

The following describes the above second to fourth situations.

In the second situation, a program generated by the image capturing device 1 is executed by the TV 45, via the remote controller (without display function) 6530, such as general TV remote controllers, that does not have a graphical display device such as a liquid crystal panel.

When the user moves the image capturing device 1 to bring the RF-ID unit 47 to the RF-ID reader 6532, the RF-ID reader 6532 reads the program generated by the image capturing device 1 to store the program in the memory 6535.

Then, when the user presses the input unit 6533, the program held in the memory 6535 is transmitted from the transmission unit 6531 to the wireless communication device 6512 of the TV 45. The program execution virtual machine 7010 in the TV 45 executes the program. If the wireless communication device 6512 is a directional infrared communication device, the user presses the input unit 6533, facing the remote controller (without display function) 6530 to the TV 45. If the wireless communication device 6512 is a non-directional short-range wireless communication device, such as devices using Bluetooth or ZigBee, the program is transmitted to the TV 45 that is previously paired with the remote controller (without display function) 6530. In the case of the short-range wireless communication device, it is also possible that the program is automatically transmitted to the paired TV 45 when the RF-ID reader 6532 reads the program from the RF-ID unit 47, without user's pressing of the input unit 6533.

The remote controller (without display function) 6530 may have a display unit, such as a LED 6534, for notifying the user of that data read by the RF-ID reader 6532 is stored in the memory 6535. The LED 6534 is lit up to encourage the user to press the input unit 6533, when the program is read by the RF-ID reader 6532 and stored in the memory 6535. The LED 6534 is lit out when the transmission of the program to the TV 45 is completed. Thereby, it is possible to clearly notify the user of that the remote controller (without display function) holds the program. The LED 6534 may be an independent LED or integrated into the input unit 6533.

In the second situation, even if the user is far from the TV 45, the program can be executed by the TV 45 by using the remote controller (without display function) 6530 in the user's hand.

In the third and fourth situations, if the remote controller (with display function) 6520 has a program execution virtual machine as high-function mobile phones called smart phones do, the user can select whether the program generated by the image capturing device 1 is executed on the remote controller (with display function) 6520 or the program is transmitted to the TV 45 to be executed on the TV 45.

When the user moves the image capturing device 1 to bring the RF-ID unit 47 to the RF-ID reader 6522, the RF-ID reader 6522 reads the program generated by the image capturing device 1 to store the program in the memory 6535.

Figure 39:
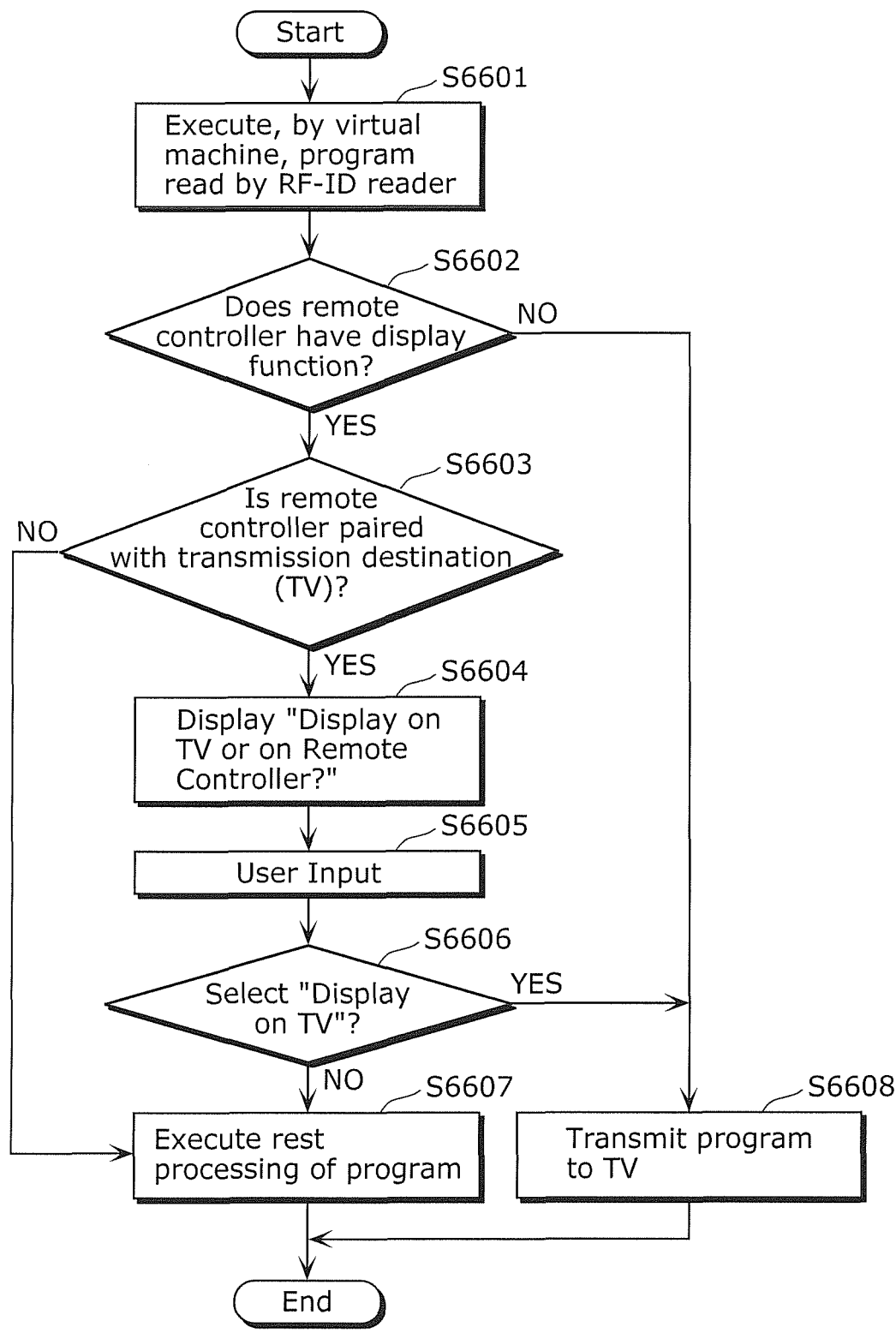
FIG. 39 is a sequence where the program generated by the image capturing device is executed by a remote controller with display function.

FIG. 39 is a sequence where the program generated by the image capturing device is executed by a remote controller with display function.

The following describes the processing performed by the remote controller (with display function) 6520 in more detail with reference to a flowchart of FIG. 39.

First, a program read by the RF-ID reader 6522 is transmitted to the program execution virtual machine 6525 and executed by the program execution virtual machine 6525 (S6601).

Next, a determination is made as to whether or not the remote controller 6520 has a display function (S6602). If the remote controller 6520 does not have any display function (N at S6602), then the program is transmitted to the TV 45 via the transmission unit 6521 and then the processing is completed. In this situation, the program is executed by the TV 45.

If the remote controller 6520 has a display function (Y at S6602), then a further determination is made as to whether or not the remote controller 6520 is paired with the TV 45 that is a transmission destination (S6603). If the remote controller 6520 is not paired with the TV 45 (N at S6603), then a rest processing of the program is executed by the display unit 6523 of the remote controller 6520. On the other hand, if the remote controller 6520 is paired with the TV 45 (Y at S6603), then the display unit 6523 displays a dialog message "Display on TV or on Remote Controller?" to encourage the user to select one of the options (S6604).

Then, the remote controller 6520 receives user's entry by the input unit 6524 (S6605). A determination is made as to whether or the user selects to display data on the TV 45 (S6606). If the user selects the TV 45 to display data (Y at S6606), then the program is transmitted to the TV 45 via the transmission unit 6521 and thereby the processing is completed. In this situation, the program is executed by the TV 45. On the other hand, if the user selects the remote controller to display data (N at S6606), then a rest processing of the program is executed by the remote controller 6520 using the display unit 6523 (S6607).

It should be noted that the "rest processing of the program" refers to displaying of a status of a battery, a trouble status, or an instruction manual regarding the image capturing device 1, but, of course, not limited to those described in Embodiment A1.

With the above structure, a program generated by the image capturing device 1 is transmitted to the remote controller with display function, then a capability of the remote controller with display function is examined, and a determination is made by the remote controller as to which apparatus (device) is to execute rest processing of the program. Thereby, the remote controller does not need to previously install various programs compliant to a plurality of apparatuses. The user can execute the program in his/her preferred manner.

It should be noted that it has been described in Embodiment A1 that the determination is made based on whether or not the remote controller has a display function and based on a pairing status of the remote controller. However, it is not limited to the above. A program may execute any determination based on a capability of the apparatus, such as a communication capability, an audio-video reproduction capability, a capability of an input unit, a capability of an output device, and the like.

As described above, the storage region of the RF-ID unit holds not only information but also a program describing operations of an apparatus (device). This considerably simplify changing or updating of a program, which has been necessary for conventional techniques to change operations of apparatuses. In addition, it is possible to deal with addition of various new functions and an increase of cooperative apparatuses. Moreover, proximity communication using RF-ID technology is a simple operation achieved by simply bringing a device into proximity of an apparatus, which the user can easily understand. Therefore, conventional bothersome device operations by using buttons and a menu are simplified. As a result, the complicated device operations are changed to be convenient.

Embodiment A2

Embodiment A2 of the present invention is described below. In Embodiment A2, actual operations of the communication system are described. In the communication system, images captured by a camera are uploaded to a server, and then downloaded by a simple operation to a TV to be displayed. The whole configuration of the communication system according to Embodiment A2 is the same as that of the communication system according to Embodiment A1.

FIG. 40 (FIGS. 40A, 40B, and 40C) is a flowchart of uploading steps in a camera according to Embodiment A2.

As noted above, the whole drawing including FIGS. 40A to 40C is simply referred to as "FIG. 40" when necessary.

The same applies to FIG. 42 and the like.

FIG. 40 is a flowchart of processing performed by a camera (the image capturing device 1) to upload photographs (images). First, the camera captures images (Step S5101). Then, the captured images are stored into the third memory (Step S5102). Then, the camera updates information stored in the second memory (Step S5103). The second memory updating process will be described later. Next, the camera determines whether or not the communication unit is connectable to the Internet (Step S5104). If connectable, then the camera generates a URL (Step S5105). The URL generation process will be described in more detail later. After generating the URL, the camera uploads the captured images (Step S5106). In completing the uploading process, the camera disconnects the communication unit from the Internet (Step S5107). As a result, the processing is completed. The uploading process will be described in more detail later.

The second memory updating process of Step S5103 enables the server 42 and the camera to share identification information for distinguishing photographs that have already been uploaded to the server 42 from photographs that have not yet been uploaded to the server 42. Examples of the uploading process at Step S5106 are given as following cases 1 to 4.

In case 1, the final capturing time (final capturing date/time) 68 is previously stored in the second memory, and then updated after the captured images are stored into the third memory (Step S5111).

Comparison of a time of uploading the captured images to the final capturing time 68 of the camera allows the server 42 and the camera to share identification information of the uploaded photographs.

In case 2, the above advantages can be produced also by generating existence identifiers 64 of images not yet uploaded to the server 42, with reference to images uploaded to the server 42 among the captured images, and storing the generated existence identifiers 64 into the second memory (Step S5121).

In case 3, it is also possible that the not-yet-uploaded image information hashed information 67 is stored in the second memory (Step S5131). Thereby, an amount of the information stored in the second memory is reduced, thereby saving a capacity of the second memory.

In case 4, it is further possible that image serial numbers are chronologically generated for captured images, and thereby the final image serial number 69 in the second memory is updated (Step S5141). Thereby, even if a time counted by the camera is not correct, it is possible to synchronize information of uploaded photographs between the server 42 and the camera.

Figure 41:
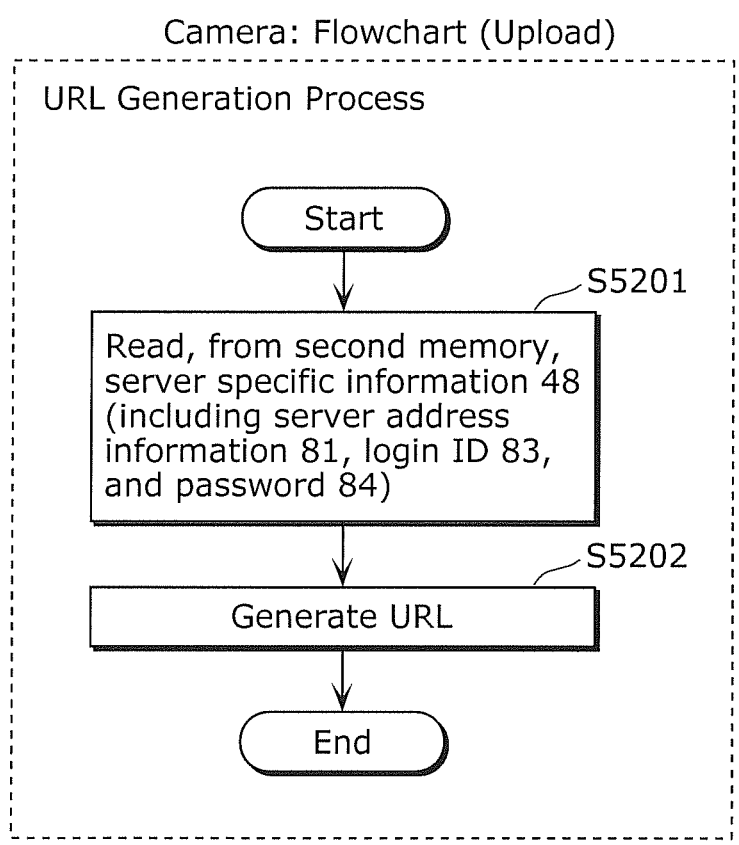
FIG. 41 is a flowchart of uploading steps in the camera according to Embodiment A2.
Figure 42A:
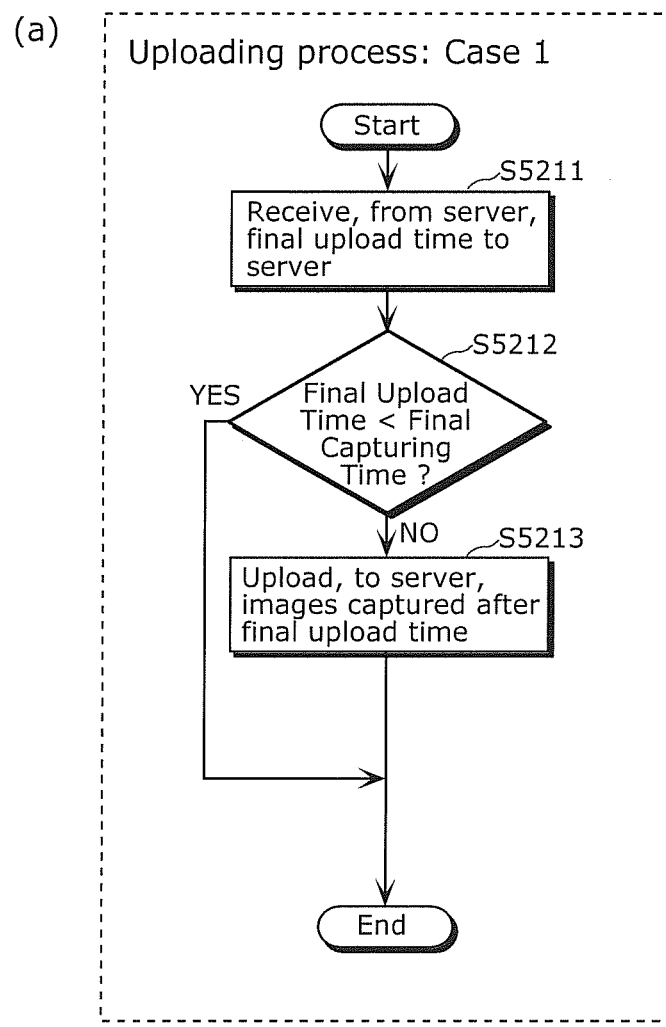
FIG. 42A is a flowchart of uploading steps in the camera according to Embodiment A1.
Figure 42B:
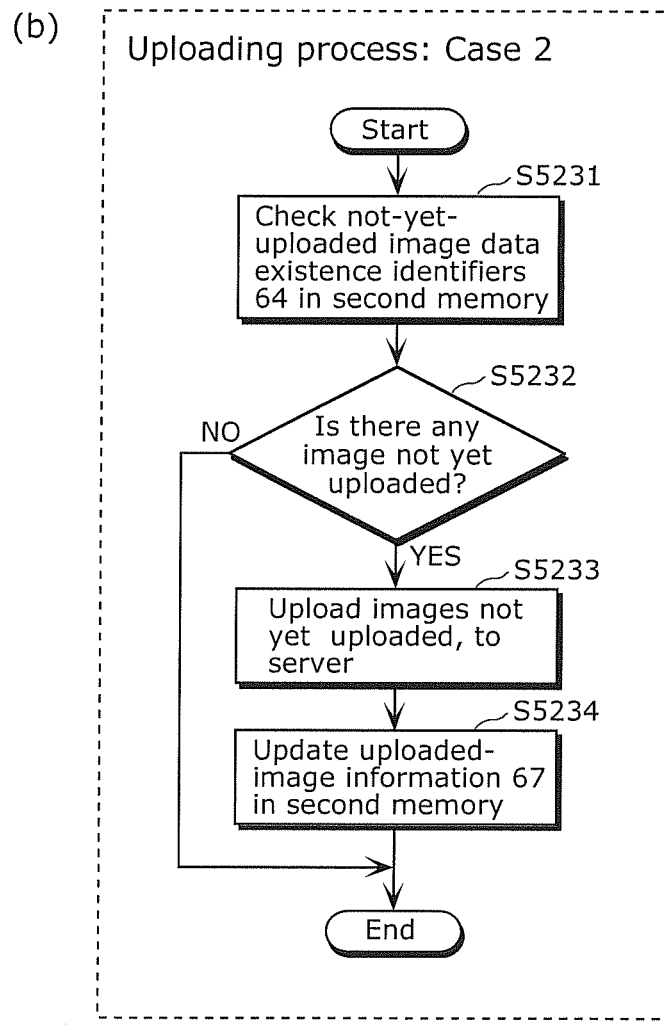
FIG. 42B is a flowchart of uploading steps in the camera according to Embodiment A1.
Figure 42C:
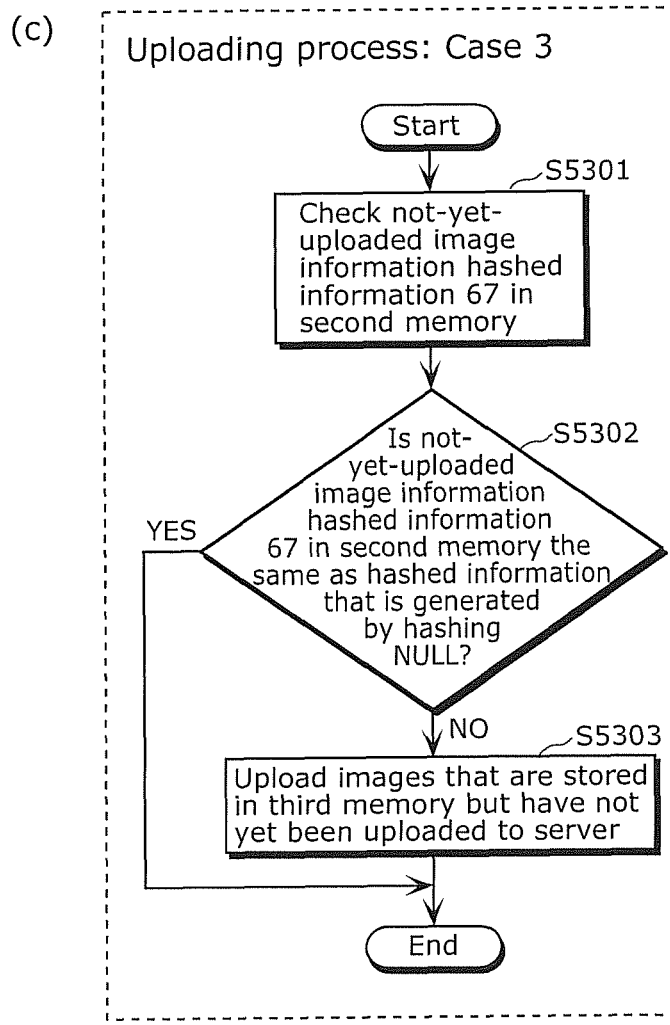
FIG. 42C is a flowchart of uploading steps in the camera according to Embodiment A1.
Figure 42D:
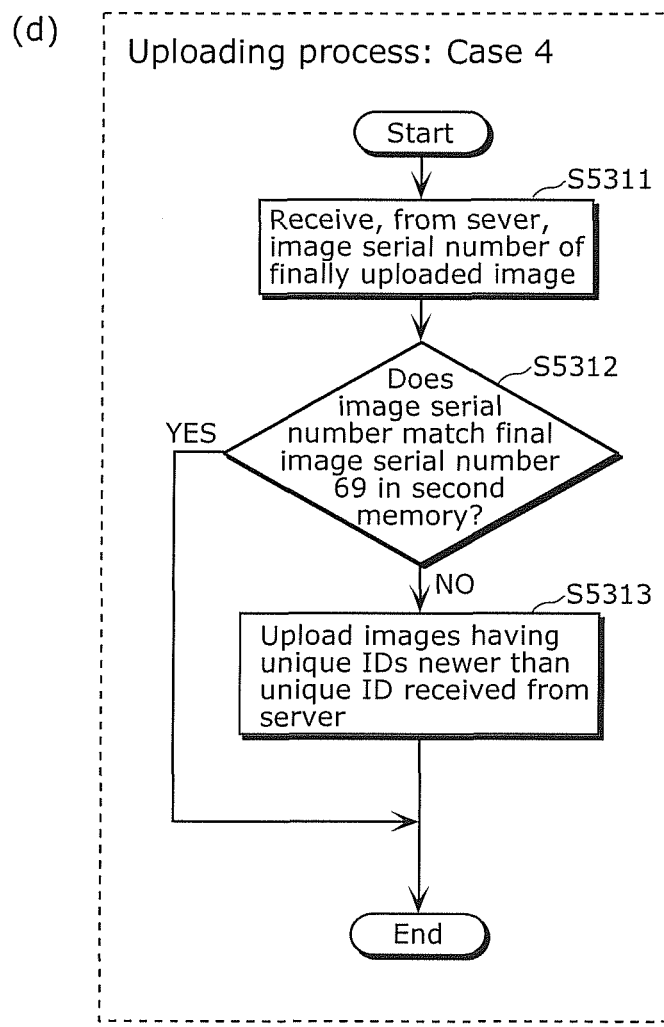
FIG. 42D is a flowchart of uploading steps in the camera according to Embodiment A1.

FIG. 41 depicts details of the URL generation process at Step S5105.

The camera reads, from the second memory, the server specific information 48 including the server address information 81, the login ID 83, and the password 84 (Step S5201). Based on the server specific information 48, the camera generates a URL (Step S5202).

FIG. 42 (FIGS. 42A to 42D) depicts details of the uploading process at Step S5106.

As noted above, the whole drawing including FIGS. 42A to 42D is simply referred to as "FIG. 42" when necessary.

The cases 1 to 4 in FIGS. 42A to 42D correspond to the above-described cases 1 to 4 of the second memory updating process in FIG. 40, respectively.

In case 1, the camera receives, from the server 42, a final upload time (final upload date/time) that is a time of finally uploading to the server 42 (Step S5211). Then, the camera compares the final upload time to the final capturing time (Step S5212). If the final capturing time is later than the final upload time (in other words, if there is any image captured after final uploading), then the camera uploads, to the server 42, any images captured after the final upload time (Step S5213).

In case 2, the camera checks not-yet-uploaded image data existence identifiers 64 in the second memory (Step S5231). Thereby, the camera determines whether or not there is any image not yet uploaded (Step S5232). If there is any image not yet uploaded, then the camera uploads images not yet uploaded, to the server 42 (Step S5233). Then, the camera updates the uploaded-image information 61 in the second memory (Step S5234).

In case 3, the camera checks the not-yet-uploaded image information hashed information 67 in the second memory (Step S5301). Thereby, the camera determines whether or not the not-yet-uploaded image information hashed information 67 in the second memory is the same as hashed information that is generated by hashing NULL (Step S5302). If the not-yet-uploaded image information hashed information 67 is not the same as the hashed information regarding NULL, then the camera determines that there is an image not yet uploaded to the server 42 and therefore uploads, to the server 42, any images that are stored in the third memory but have not yet been uploaded to the server 42 (Step S5303).

In case 4, the camera receives, from the server 42, an image serial number of a finally uploaded image (Step S5311).

Then, the camera determines whether or not the image serial number matches the final image serial number 69 in the second memory (Step S5312). If the image serial number does not match the final image serial number 69, then the camera uploads any images having UIDs that are newer than UID of the final image serial number 69 that is received from the server 42 (Step S5313).

FIG. 43 is a flowchart of RF-ID proximity communication between the image capturing device 1 and the TV 45.

First, the second antenna 21 embedded in the image capturing device 1 receives weak radio power from polling of the RF-ID reader/writer 46 of the TV 45, and thereby activates the RF-ID unit 47 operated under the second power supply unit 91 (S5401).

The RF-ID unit 47 of the image capturing device 1, which is activated by receiving weak power at Step S5401, responds to the polling of the RF-ID reader/writer 46 of the TV 45 (Step S5402).

After responding to the polling at Step S5402, mutual authentication is performed to determine whether or not the RF-ID unit 47 of the image capturing device 1 and the RF-ID reader/writer 46 of the TV 45 are legitimate devices, and also to share a cryptography key used for secure information communication between the image capturing device 1 and the TV 45 (Step S5403). The mutual authentication employs a public key cryptography algorism such as elliptic curve cryptography. In general, the employed method for the mutual authentication is the same as that of mutual authentication used in communication via High Definition Multimedia Interface (HDMI) or IEEE1394.

As described earlier, at Step S5403, the mutual authentication is performed between the RF-ID unit 47 of the image capturing device 1 and the RF-ID reader/writer 46 of the TV 45 to generate a common cryptography key. After that, the server URL generation information 80 is read from the server specific information 58 stored in the second memory 52 readable from the RF-ID unit 47. The server URL generation information 80 is transmitted to the RF-ID reader/writer 46 of the TV 45 via the second antenna 21 (Step S5404). The server URL generation information 80 includes: the server address information 81 indicating address information of the server 42; the user identification information 82 that is the login ID 83 to the server 42; and the password 84 that is a login password to the server 42. The password 84 is important information for preventing unauthorized acts of a malicious third person. Therefore, the password 84 is sometimes encrypted beforehand as the encrypted password 85 to be stored, and then transmitted to the TV 45.

After the server URL generation information 80 is transmitted to the RF-ID reader/writer 46 of the TV 45 at Step S5404, the captured image state information 55 stored in the second memory 52 is also transmitted to the RF-ID reader/writer 46 of the TV 45 via the second antenna 21 (Step S5405). The captured image state information 55 is: the final capturing time 68 (case 1); the existence identifiers 64 which are existence identification information regarding images not yet uploaded and each of which is assigned to a corresponding one of the captured images so that it is possible to determine whether the image has not yet been uploaded (case 2); the not-yet-uploaded image information hashed information 67 (case 3); or the final image serial number 69 from among image serial numbers chronologically assigned to captured images (case 4). The captured image state information 55 is important for examining synchronization between captured images in the image capturing device 1 and captured images in the server 42.

In case 1, the final capturing time 68 is used as the captured image state information 55. Therefore, the TV 45 compares the final capturing time 68 to the final upload time. If the final capturing time 68 is temporally later than the final upload time that is a time of finally uploading to the server 42, then it is determined that the image data in the image capturing device 1 is not in synchronization with the image data in the server 42. Therefore, warning information regarding the synchronization failure is displayed on the display unit of the TV 45.

In case 2, the captured image state information 55 is the existence identifiers 64 each of which is assigned to a corresponding one of the captured images so that it is possible to determine whether the image has not yet been uploaded. Therefore, the TV 45 examines the existence identifiers 64 to determine whether or not there is any image not yet uploaded. If there is any image not yet uploaded, then it is determined that the image data in the image capturing device 1 is not in synchronization with the image data in the server 42. Therefore, warning information regarding the synchronization failure is displayed on the display unit of the TV 45.

In case 3, the not-yet-uploaded image information hashed information 67 is employed as the captured image state information 55. Therefore, the TV 45 examines the not-yet-uploaded image information hashed information 67 to determine whether or not there is any image not yet uploaded. If there is any image not yet uploaded, then it is determined that the image data in the image capturing device 1 is not in synchronization with the image data in the server 42. Therefore, warning information regarding the synchronization failure is displayed on the display unit of the TV 45.

In case 4, the captured image state information 55 is the final image serial number 69 from among image serial numbers chronologically assigned to the captured images. Therefore, the TV 45 compares (a) the final image serial number 69 from among image serial numbers chronologically assigned to the captured images to (b) an image serial number of an image finally uploaded to the server 42. Here, the final image serial number 69 is provided from the image capturing device 1, while the image serial number is provided from the server 42. Based on the comparison, the TV 45 can determine whether or not there is any image not yet uploaded. If there is any image not yet uploaded, then it is determined that the image data in the image capturing device 1 is not in synchronization with the image data in the server 42. Therefore, warning information regarding the synchronization failure is displayed on the display unit of the TV 45.

After transmitting the captured image state information 55 from the second antenna 21 of the image capturing device 1 to the RF-ID reader/writer 46 of the TV 45 at Step S5405, the image display method instruction information 77 is also transmitted from the second memory 52 of the image capturing device 1 to the RF-ID reader/writer 46 of the TV 45 via the second antenna 21 (Step S5406). The image display method instruction information 77 is identification information indicating how the display unit of the TV 45 is to display the images downloaded from the server 42. The image display method instruction information 77 includes the list display (indicator) 78 indicating that the images are to be displayed in a list, and the slide show (indicator) 79 indicating that the images are to be displayed as a slide show.

As described above, at Steps S5401 to S5406, the image capturing device 1 transmits the server URL generation information 80, the captured image state information 55, and the image display method instruction information 77, which are stored in the second memory 52 of the image capturing device 1, from the second antenna 21 of the image capturing device 1 to the RF-ID reader/writer 46 of the TV 45. Here, it is desirable to encrypt all of the above pieces of information to be transmitted, by using the cryptography key information shared between the image capturing device 1 and the TV 45 at the mutual authentication. The encryption achieves secure information communication between the image capturing device 1 and the TV 45. As a result, intervention of a malicious third person can be prevented.

Since the server URL generation information 80 is transmitted to the TV 45, the server 42 (and directory) to which the first antenna 20 of the image capturing device 1 transmits data is the same as the server (and directory) from which the TV 45 downloads the data. Therefore, the TV 45 can display the images that have been captured by the image capturing device 1 and then uploaded to the server 42.

In addition, the transmission of the captured image state information 55 to the TV 45 makes it possible to examine synchronization between the captured images stored in the third memory 33 of the image capturing device 1 and the images uploaded from the first antenna 20 to the server 42. Therefore, the TV 45 can detect a failure of the synchronization. The display of the warning information indicating the synchronization failure on the TV 45 can prevent unnecessary confusion of the user.

Moreover, the transmission of the image display method instruction information 77 to the TV 45 enables the user to view images by a set image viewing method without designating the image viewing method on the TV 45. The user merely needs to move the image capturing device 1 into proximity of the TV 45. The complicated operations using a remote controller or the like of the TV 45 are not necessary. The images can be automatically displayed by the set viewing method.

FIG. 44 is a block diagram of characteristic functions of a TV system according to Embodiment A2 of the present invention.

The TV 45 according to Embodiment A2 includes the RF-ID reader/writer 46, the decryption unit 5504, a URL generation unit 5505, a communication unit 5506, a transmission unit 5507, a communication interface 5508, a receiving unit 5509, a data processing unit 5510, a memory unit 5511, a display unit 5512, and a CPU 5513.

The RF-ID reader/writer 46 communicates with the RF-ID unit 47 of the image capturing device 1 via the second antenna 21. The RF-ID reader/writer 46 includes a wireless antenna 5501, a receiving unit 5503, and a communicable device search unit (polling unit) 5502.

The wireless antenna 5501 performs proximity wireless communication with the second antenna 21 of the image capturing device 1. The wireless antenna 5501 has the same structure as that of wireless antennas of general-purpose RF-ID reader/writers.

The communicable device search unit (polling unit) 5502 performs polling to check a RF-ID unit of each of plural cameras in order to examine whether to have any transmission request (or processing request). If the communicable device search unit 5502 receives a response of the polling from the RF-ID unit 47 of the image capturing device 1 (the corresponding camera), then the mutual authentication is performed to share a common cryptography key between the TV 45 and the image capturing device 1.

When the mutual authentication is completed after receiving the polling response, the receiving unit 5503 receives the server URL generation information 80, the captured image state information 55, and the image display method instruction information 77 from the second memory 52 via the second antenna 21 of the image capturing device 1.

The decryption unit 5504 decrypts the server URL generation information 80, the captured image state information 55, and the image display method instruction information 77 which are received by the receiving unit 5503. The decryption of the server URL generation information 80, the captured image state information 55, and the image display method instruction information 77 which have been encrypted is performed using the cryptography key shared between the image capturing device 1 and the TV 45 after the mutual authentication by the communicable device search unit (polling unit) 5502.

The URL generation unit 5505 generates, based on the server URL generation information 80, a URL to access the server 42, and then transmits the generated URL to the communication unit. The URL includes not only the server specific information, but also the login ID 83 and the password 85 used to login to the server.

The communication unit 5506 communicates with the server 42 via a general-purpose network using the communication interface 5508.

The transmission unit 5507 transmits the URL generated by the URL generation unit 5505 via the communication interface 5508 in order to connect the TV 45 to the server 42.

The communication interface 5508 is a communication interface for connecting the TV 45 to the server 42 via a general-purpose network. The communication interface 5508 is, for example, a wired/wireless LAN interface.

The receiving unit 5509 receives (downloads) image data and an image display cascading style sheet (CSS) from the serer 42 connected by the communication interface 5508.

The data processing unit 5510 performs data processing for the image data downloaded by the receiving unit 5509. If the image data to be downloaded is compressed data, the data processing unit 5510 de-compresses the image data. If the image data is encrypted, the data processing unit 5510 decrypts the image data. In addition, the data processing unit 5510 can arrange the downloaded image data by an image display style based on the image display CSS. If it is determined, based on the captured image state information 55 obtained, if necessary, by decryption of the decryption unit, that the image data in the image capturing device 1 is not in synchronization with the image data in the server 42, then the data processing unit 5510 causes the display unit 5512 to display warning information regarding the synchronization failure. Thereby, unnecessary confusion of the user can be prevented. Moreover, the data processing unit 5510 sets a mode of displaying the downloaded image data, according to the image display method instruction information 77 provided from the decryption unit 5504. For example, if the list display (flag) 78 in the image display method instruction information 77 is ON, then the data processing unit 5510 generates a list of the downloaded images and provides the list to the memory unit 5511. If the slide show (flag) 79 in the image display method instruction information 77 is ON, then the data processing unit 5510 generates a slide show of the downloaded images and provides the slide show to the memory unit 5511.

The memory unit 5511 is a memory that temporarily holds the image data processed by the data processing unit 5510.

The display unit 5512 displays the image data stored in the memory unit 5511. The image data has been downloaded from the server 42 and applied with data processing by the data processing unit 5510 as described earlier.

As descried above, based on the server URL generation information 80, the captured image state information 55, and the image display method instruction information 77 which are received from the RF-ID unit 47 of the image capturing device 1, the TV 45 according to Embodiment A2 of the present invention can be connected to the server 42, then download the uploaded image data from the server 42, and display the downloaded image data on the display unit 5512. Thereby, the user does not need to do complicated processes of removing the third memory 33 such as a Secure Digital (SD) card or a flash memory from the image capturing device 1 and equipping the third memory 33 to a card reader of the TV 45 in order to view captured images. In Embodiment A2 of the present invention, the user can display and view captured image data, by simple operations of simply presenting the RF-ID unit 47 of the image capturing device 1 to the RF-ID reader/writer 46 of the TV 45 for proximity communication. Embodiment A2 of the present invention can provide a captured image viewing system by which even users who are not familiar with operations of digital devices can easily view image data.

Figure 45:
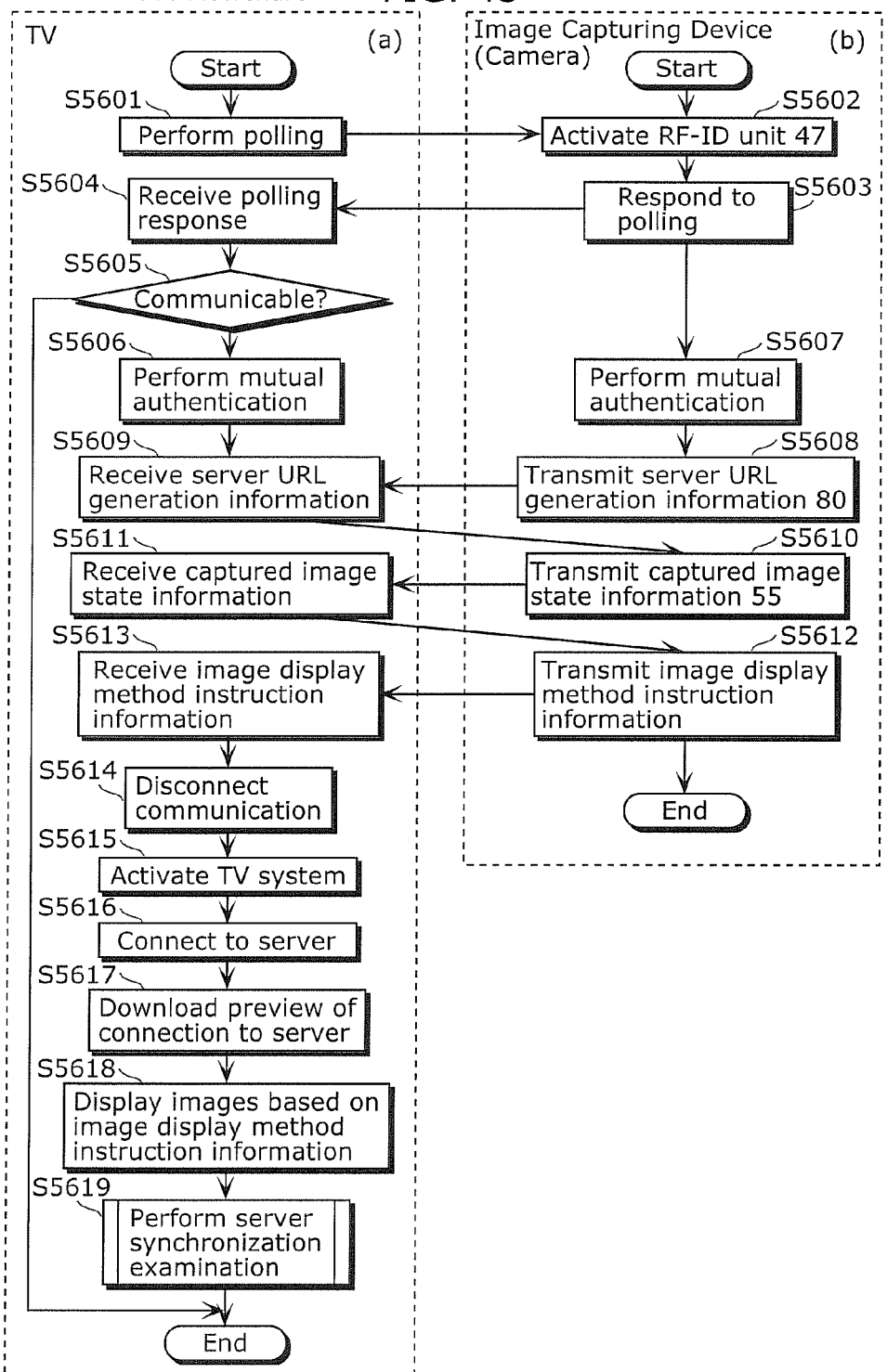
FIG. 45 is a flowchart of RF-ID communication between the camera and the TV, according to Embodiment A2.

FIG. 45 is a flowchart of RF-ID wireless proximity communication between the image capturing device 1 and the TV 45.

First; the communicable device search unit 5502 in the RF-ID reader/writer 46 of the TV 45 transmits a polling signal to search for the RF-ID unit 47 of the communicable image capturing device 1 (Step S5601).

When the image capturing device 1 receives the polling signal from the communicable device search unit 5502 in the RF-ID reader/writer 46 of the TV 45, the second power supply unit 91 is supplied with power to activate (operate) the RF-ID unit 47 (Step S5602). Here, at least the RF-ID unit 47, which can be operated under the second power supply unit 91, is activated. It is not necessary to activate all functions in the image capturing device 1.

When the activation of the RF-ID unit 47 of the image capturing device 1 is completed at Step S5602, the image capturing device 1 transmits a polling response for the polling to the RF-ID reader/writer 46 of the TV 45 via the second antenna 21 (Step S5603).

After the image capturing device 1 responds to the polling at Step S5603, the TV 45 receives the polling response by the wireless antenna 5501 of the RF-ID reader/writer 46 (Step S5604).

After receiving the polling response at Step S5604, the TV 45 determines whether or not the image capturing device 1 transmitting the polling response is a device mutually communicable with the TV 45 (Step S5605). If the determination is made that the image capturing device 1 cannot mutually communicate with the TV 45, then the processing is completed. On the other hand, if the determination is made that the image capturing device 1 is mutually communicable with the TV 45, then the processing proceeds to Step S5606.

If the determination is made that the image capturing device 1 is mutually communicable with the TV 45 at Step S6505, then the TV 45 performs mutual authentication to determine whether or not the image capturing device 1 and the TV 45 are legitimate devices for communication (Step S5606). The mutual authentication is the same as general mutual authentication using HDMI or IEEE1394. In the mutual authentication, issuing of challenge data and checking of response data are performed plural times between the TV 45 and the image capturing device 1 to eventually generate a common cryptography key. If one of the TV 45 and the image capturing device 1 is not legitimate, the common cryptography key is not generated, thereby disabling future mutual communication.

The image capturing device 1 also performs the same mutual authentication in the RF-ID unit 47. Generation and transmission of challenge data and receiving and checking of response data are performed plural times between the TV 45 and the image capturing device 1 to eventually generate a cryptography key identical to the cryptography key generated by the TV 45 (Step S5607).

When the mutual authentication is completed at Step S5607, the image capturing device 1 reads the server URL generation information 80 as the server specific information 58 from the second memory 52, then encrypts the server URL generation information 80, using the common cryptography key generated at the mutual authentication, and transmits the encrypted server URL generation information 80 to the RF-ID reader/writer 46 of the TV 45 (Step S5608).

The TV 45 receives the encrypted server URL generation information 80 transmitted at Step S5608, by the receiving unit 5503 in the RF-ID reader/writer 46. Then, the decryption unit 5504 decrypts the encrypted server URL generation information 80 using the common cryptography key. Based on the server URL generation information 80, the URL generation unit 5505 generates a URL to access the server 42. Then, the TV 45 transmits, to the image capturing device 1, a notification of completion of receiving the server URL generation information 80 (Step S5609).

After the notification of the receiving completion is transmitted at Step S5609, the image capturing device 1 receives the notification by the second antenna 21. Then, the image capturing device 1 reads the captured image state information 55 from the second memory 52 to transmit the captured image state information 55 to the TV 45 (Step S5610). The captured image state information 55 is: the final capturing time 68 (case 1); the existence identifiers 64 which are existence identification information regarding images not yet uploaded and each of which is assigned to a corresponding one of the captured images so that it is possible to determine whether the image has not yet been uploaded (case 2); the not-yet-uploaded image information hashed information 67 (case 3); or the final image serial number 69 from among image serial numbers chronologically assigned to captured images (case 4). The captured image state information 55 is important for examining synchronization between captured images in the image capturing device 1 and captured images in the server 42.

After the image capturing device 1 transmits the captured image state information 55 at Step S5610, the TV 45 receives the captured image state information 55 by the RF-ID reader/writer 46 and then transmits, to the image capturing device 1, a notification of completion of receiving the captured image state information 55 (Step S5611). Here, the CPU 5513 in the TV 45 performs the following processing depending on kinds of the received captured image state information 55.

In case 1, the final capturing time 68 is used as the captured image state information 55. Therefore, the TV 45 compares the final capturing time 68 to the final upload time that is a time of finally uploading to the server 42. If the final capturing time 68 is temporally later than the final upload time, then it is determined that the image data in the image capturing device 1 is not in synchronization with the image data in the server 42. Therefore, warning information regarding the synchronization failure is displayed on the display unit of the TV 45.

In case 2, the captured image state information 55 is the existence identifiers 64 each of which is assigned to a corresponding one of the captured images so that it is possible to determine whether the image has not yet been uploaded. Therefore, the TV 45 examines the existence identifiers 64 to determine whether or not there is any image not yet uploaded. If there is any image not yet uploaded, then it is determined that the image data in the image capturing device 1 is not in synchronization with the image data in the server 42. Therefore, warning information regarding the synchronization failure is displayed on the display unit of the TV 45.

In case 3, the not-yet-uploaded image information hashed information 67 is employed as the captured image state information 55. Therefore, the TV 45 examines the not-yet-uploaded image information hashed information 67 to determine whether or not there is any image not yet uploaded. If there is any image not yet uploaded, then it is determined that the image data in the image capturing device 1 is not in synchronization with the image data in the server 42. Therefore, warning information regarding the synchronization failure is displayed on the display unit of the TV 45.

In case 4, the captured image state information 55 is the final image serial number 69 from among image serial numbers chronologically assigned to the captured images. Therefore, the TV 45 compares (a) the final image serial number 69 from among image serial numbers chronologically assigned to the captured images to (b) an image serial number of an image finally uploaded to the server 42. Here, the final image serial number 69 is provided from the image capturing device 1, while the image serial number is provided from the server 42. Based on the comparison, the TV 45 can determine whether or not there is any image not yet uploaded. If there is any image not yet uploaded, then it is determined that the image data in the image capturing device 1 is not in synchronization with the image data in the server 42. Therefore, warning information regarding the synchronization failure is displayed on the display unit of the TV 45.

After the TV 45 completes receiving of the captured image state information 55 and transmits the notification of the receipt to the image capturing device 1 at Step S5611, the image capturing device 1 reads the image display method instruction information 77 from the second memory 52 and transmits the image display method instruction information 77 to the TV 45 (Step S5612). The image display method instruction information 77 includes the list display (flag) 78 and the slide show display (flag) 79.

After the image display method instruction information 77 is transmitted at Step S5612, the TV 45 receives the image display method instruction information 77 by the RF-ID reader/writer 46 of the TV 45 and transmits a notification of completion of receiving the image display method instruction information 77 to the image capturing device 1 (Step S5613). The data processing unit 5510 of the TV 45 generates a mode of displaying images downloaded from the server 42, based on the received image display method instruction information 77. For example, if the list display flag in the image display method instruction information 77 is ON, the data processing unit 5510 generates a list of the downloaded images and stores the generated list in the memory unit 5511 and causes the display unit 5512 to display the list. On the other hand, if the slide show flag in the image display method instruction information 77 is ON, the data processing unit 5510 generates a slide show of the downloaded images and stores the generated slide show in the memory unit 5511 and causes the display unit 5512 to display the slide show.

After receiving the image display method instruction information 77 at Step S5613, the TV 45 disconnects communication from the RF-ID unit 47 of the image capturing device 1 (Step S5614).

Next, the TV 45 activates a TV system (Step S5615). The activation of the TV system refers to turning the main power of the TV 450N to display the downloaded image data on the display unit 5512. Prior to the activation of the TV system at Step S5615, at least the RF-ID reader/writer 46 of the TV 45 is activated and the display unit 5512 may be turned OFF.

Then, the communication unit 5506 is activated to connect the TV 45 to the server 42 based on the URL generated by the URL generation unit 5505 (Step S5616).

After connecting to the server 42 at Step S5616, the TV 45 downloads uploaded image data from the server 42 (Step S5617).

The data processing unit 5510 generates to-be-displayed image data from the images downloaded at the Step S5617, based on the image display method instruction information 77 obtained from the camera (the image capturing device 1), then stores the generated image data into the memory unit 5511, and displays the image data on the display unit 5512 (Step S5618). The data processing unit 5510 of the TV 45 generates a mode of displaying the images (image data) downloaded from the server 42, based on the received image display method instruction information 77. For example, if the list display flag 78 in the image display method instruction information 77 is ON, the data processing unit 5510 generates a list of the downloaded images and stores the generated list in the memory unit 5511 and causes the display unit 5512 to display the list. On the other hand, if the slide show display flag 79 in the image display method instruction information 77 is ON, the data processing unit 5510 generates a slide show of the downloaded images and stores the generated slide show in the memory unit 5511 and causes the display unit 5512 to display the slide show.

After displaying of the images downloaded from the server 42 is completed at Step S5617, the TV 45 performs synchronization examination to determine whether or not the captured images recorded in the third memory 33 of the image capturing device 1 are in synchronization with the images downloaded from the server 42 (Step S5619). The synchronization examination is performed based on the captured image state information provided at Step S5611 from the image capturing device 1. The captured image state information 55 is: the final capturing time 68 (case 1); the existence identifiers 64 which are existence identification information regarding images not yet uploaded and each of which is assigned to a corresponding one of the captured images so that it is possible to determine whether the image has not yet been uploaded (case 2); the not-yet-uploaded image information hashed information 67 (case 3); or the final image serial number 69 from among image serial numbers chronologically assigned to captured images (case 4). The captured image state information 55 is important for examining synchronization between captured images in the image capturing device 1 and captured images in the server 42.

Figure 46A:
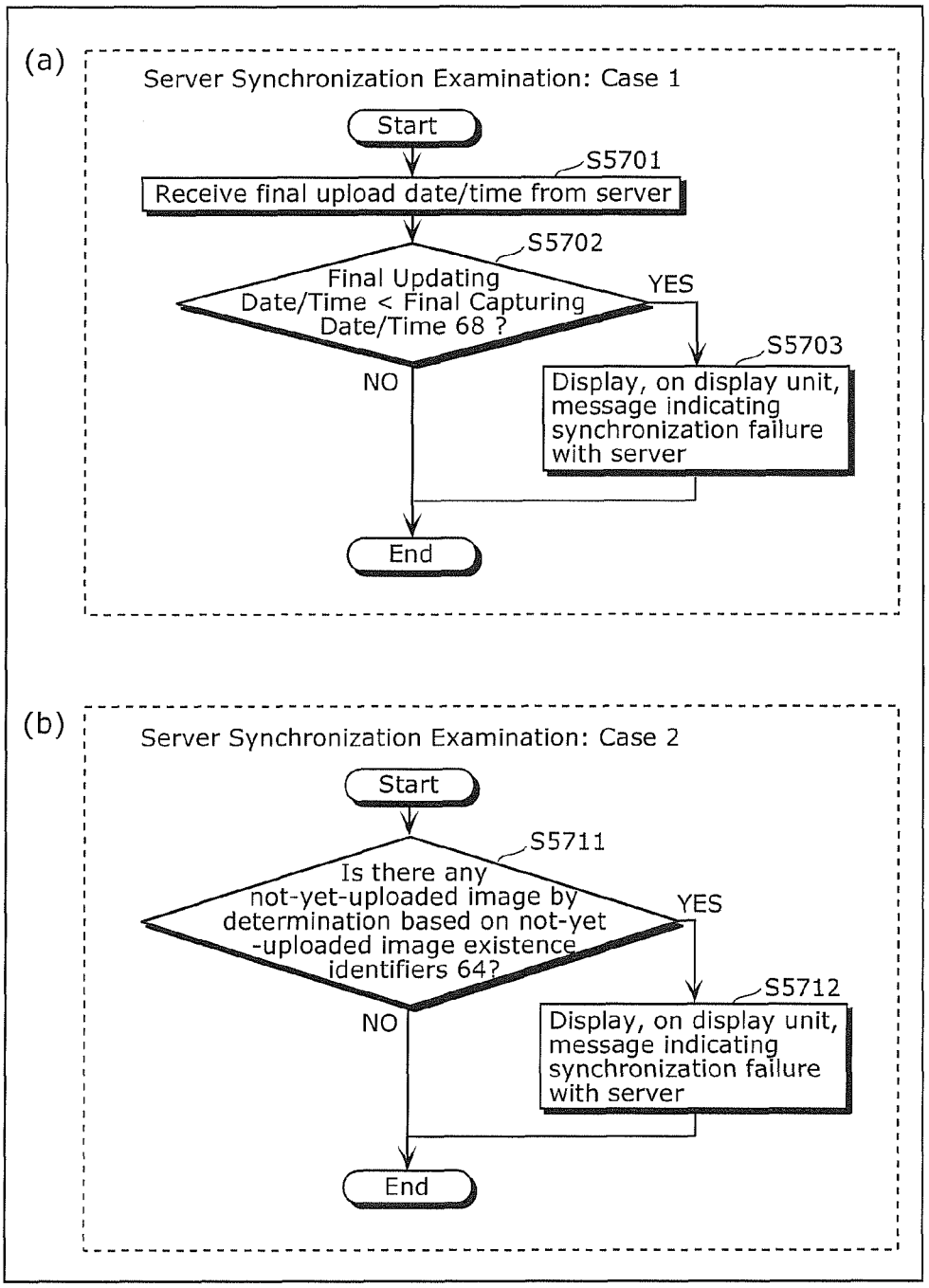
FIG. 46A is a flowchart presenting details of FIG. 45.
Figure 46B:
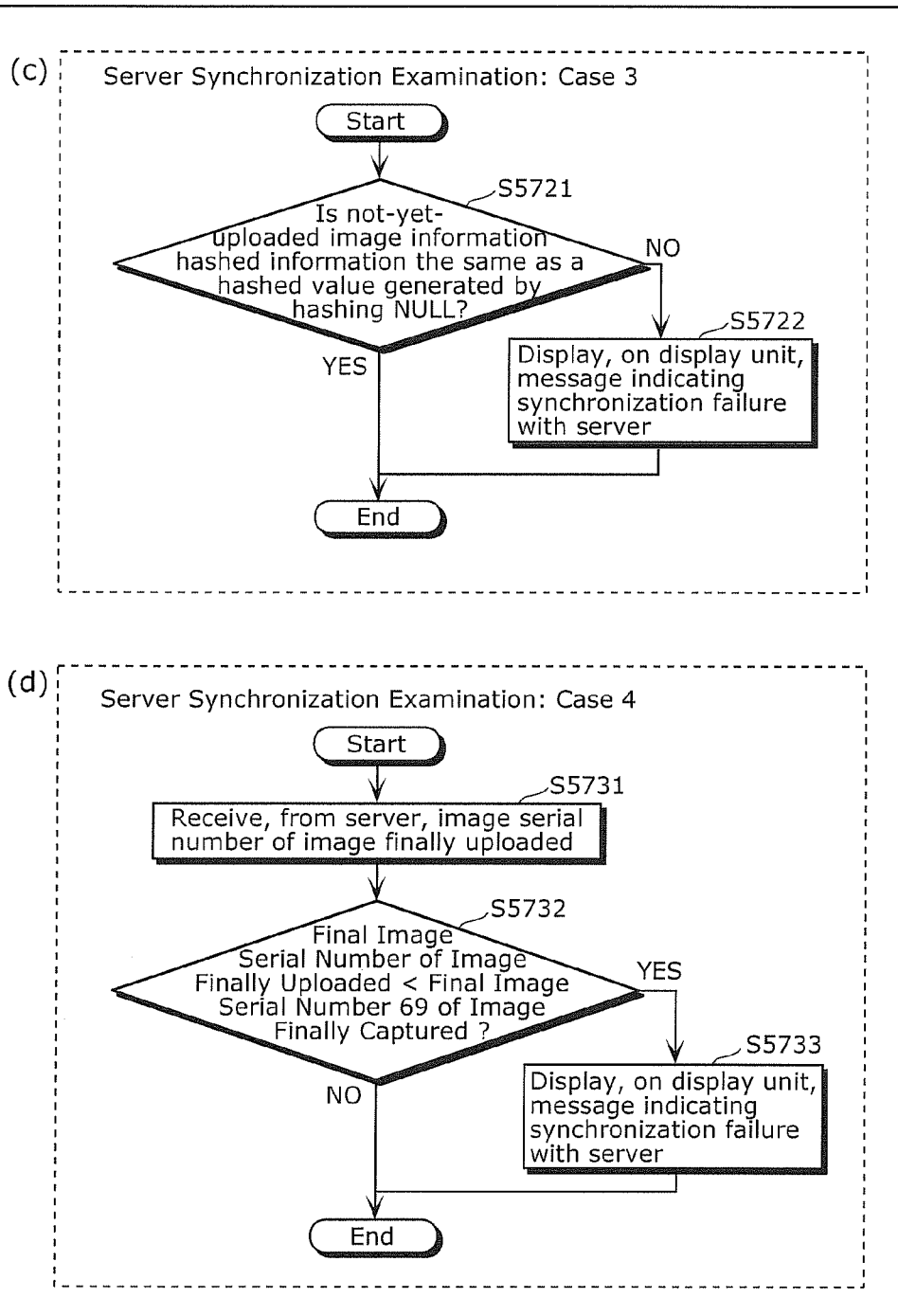
FIG. 46B is a flowchart presenting details of FIG. 45.

FIG. 46 (FIGS. 46A and 46B) is a flowchart of details of the server synchronization examination (Step S5619) of FIG. 45 when the captured image state information 55 are cases 1 to 4.

As noted above, the whole drawing including FIGS. 46A and 46B is simply referred to as "FIG. 46" when necessary.

Case 1 relates to a flowchart when the captured image state information 55 is the final capturing time 68.

First, the communication unit 5506 of the 45 receives, from the server 42, date/time of finally uploading to the server 42 (hereinafter, referred to also as a "final upload date/time" that may be date/time of capturing a final image among uploaded images to produce the same advantages) (Step S5701).

Next, the TV 45 compares the final upload date/time to a final capturing date/time 68 (Step S5702). The final capturing date/time 68, which is date/time of final capturing of the image capturing device 1, is indicated in the captured image state information 55 provided from the image capturing device 1 to the RF-ID reader/writer 46. If the final upload date/time is prior to the final capturing date/time 68, it is determined that there is an image captured after the final upload and not yet uploaded to the server 42. Therefore, a determination is made that the images in the image capturing device 1 are not in synchronization with the images in the server 42. Then, warning information is displayed at Step S5703. On the other hand, if the final upload date/time is equal to the final capturing date/time 68, it is determined that the images in the image capturing device 1 are in synchronization with the images in the server 42. Then, the synchronization examination is completed without displaying warning information.

If it is determined at Step S5702 that the images in the image capturing device 1 are not in synchronization with the images in the server 42, the display unit 5512 displays warning information indicating the synchronization failure. Here, if time information is generated by comparing the final upload date/time to the final capturing date/time 68 in order to indicate from when captured images are not uploaded, and the generated time information is presented as a message together with the warning information, the warning information is convenient for the user.

Case 2 relates to a flowchart when the captured image state information 55 is the existence identifiers 64 each of which is assigned to a corresponding one of the captured images so that it is possible to determine whether the image has not yet been uploaded.

First, it is determined, based on the existence identifiers of the not-yet-uploaded image existence identification information, whether or not there is any image not yet uploaded to the server 42 from among the captured images stored in the third memory 33 of the image capturing device 1 (Step S5711). Here, the existence identifiers are indicated in the captured image state information 55 provided from the image capturing device 1 to the RF-ID reader/writer 46. If it is determined that there is an image not yet uploaded to the server 42 at Step S5711, then the processing proceed to Step S5712 to display warning information. On the other hand, if there is not image not yet uploaded, it is determined that the images in the image capturing device 1 are in synchronization with the images in the server 42. Then, the synchronization examination is completed without displaying warning information.

If it is determined that the images in the image capturing device 1 are not in synchronization with the images in the server 42, the display unit 5512 displays warning information indicating the synchronization failure at Step S5712.

Case 3 relates to a flowchart when the captured image state information 55 is the not-yet-uploaded image information hashed information 67.

First, it is determined, based on the not-yet-uploaded image information hashed information 67, whether or not there is any image not yet uploaded to the server 42 from among the captured images stored in the third memory 33 of the image capturing device 1 (Step S5721). Here, the not-yet-uploaded image information hashed information 67 is indicated in the captured image state information 55 provided from the image capturing device 1 to the RF-ID reader/writer 46. The determination of Step S5721 is performed by comparing the not-yet-uploaded image information hashed information 67 to a hashed value generated by hashing NULL generated in the TV 45. If it is determined that there is an image not yet uploaded at Step S5721, then the processing proceed to Step S5722 to display warning information. On the other hand, if there is no image not yet uploaded, it is determined that the images in the image capturing device 1 are in synchronization with the images in the server 42. Then, the synchronization examination is completed without displaying warning information.

If it is determined that the images in the image capturing device 1 are not in synchronization with the images in the server 42, the display unit 5512 displays warning information indicating the synchronization failure at Step S5722.

Case 4 relates to a flowchart when the captured image state information 55 is a final image serial number from among image serial numbers assigned to captured images.

First, the communication unit 5506 of the TV 45 receives, from the server 42, an image serial number of an image finally uploaded to the server 42 (Step S5731).

Next, the TV 45 compares (a) the image serial number 69 of the image finally uploaded which is provided form the server 42 to (b) a final image serial number 69 of an image finally captured which is indicated in the captured image state information 55 provided from the image capturing device 1 by the RF-ID reader/writer 46 (Step S5732). If the mage serial number 69 of the image finally uploaded is smaller than the mage serial number 69 of the image finally captured, it is determined that there is an image captured after the final upload and not yet uploaded to the server 42. Therefore, a determination is made that the images in the image capturing device 1 are not in synchronization with the images in the server 42. Then, the processing proceeds to Step S5733 to display warning information. On the other hand, if the mage serial number 69 of the image finally uploaded is identical to the mage serial number 69 of the image finally captured, it is determined that the images in the image capturing device 1 are in synchronization with the images in the server 42. Then, the synchronization examination is completed without displaying warning information.

If it is determined at Step S5732 that the images in the image capturing device 1 are not in synchronization with the images in the server 42, the display unit 5512 displays warning information indicating the synchronization failure.

When all of images captured by the image capturing device 1 are not uploaded to the serve 42 (in other words, when images captured by the image capturing device 1 are not in synchronization with images uploaded to the server 42), any of above cases 1 to 4 makes it possible to detect the synchronization failure. Thereby, although all of the captured images cannot be displayed on the display unit 5512, a convenient message can be displayed to the user to inform the synchronization failure. As a result, unnecessary confusion of the user can be prevented.

FIG. 47 shows (1) a data format used in uploading captured images from the image capturing device 1 to the server 42, and (2) a data format used in RF-ID communication between the image capturing device 1 and the TV 45.

First, (1) a data format 5940 in uploading captured images from the image capturing device 1 to the server 42 is described. The data format 5940 includes camera ID 5901, a sever address 5902, a server login ID 5903, a server login password 5904, an image directory 5905, and an uploading-image number 5906.

The camera ID 5901 is camera UID uniquely assigned to each camera (image capturing device 1). The camera ID 5901 is ID information recorded in the camera ID 76 in the second memory 52 of the image capturing device 1. Use of the camera ID 5901 as login ID to the server 42 can provide a server address unique to each image capturing device 1 so that the image capturing device 1 can access the server 42 without user's entry of login ID. In addition, the camera ID 5901 enables the server 42 to manage captured images for each capturing camera.

The sever address 5902 is included in the server address information 81 in the server specific information 58 stored in the second memory 52 of the image capturing device 1. The sever address 5902 enables the TV 45 to identify the server to which target image data is uploaded.

The server login ID 5903 is included in the login ID 83 in the user identification information 82 in the server specific information 58 stored in the second memory 52 of the image capturing device 1. The server login ID 5903 allows the TV 45 to login, by using the same account, to the server to which the image capturing device 1 uploads image data.

The server login password 5904 is included in the password 84 in the server specific information 58 stored in the second memory 52 of the image capturing device 1. The server login password 5904 allows the TV 45 to login, by using the same account, to the server to which the image capturing device 1 uploads image data.

The uploading-image number 5906 is the number of images to be uploaded to the server. The uploading-image number 5906 is equal to the number of images which is stored as the not-yet-uploaded-image number 65 in the second memory 52 of the image capturing device 1. After capturing images, the number of images not yet uploaded is indicated in the uploading-image number 5906.

After transmitting the data format 5940, the image capturing device 1 uploads, to the server 42, the images that are stored in the third memory 33 of the image capturing device 1 but have not yet been uploaded to the server 42.

Next, (2) a data format 5950 used in RF-ID communication between the image capturing device 1 and the TV 45 is described. The data format 5950 includes camera ID 5911, a sever address 5912, a server login ID 5913, a server login password 5914, a final capturing date/time (final capturing time) 5915, and not-yet-uploaded image data existence identifiers 5916, not-yet-uploaded image information hashed information 5917, a final image serial number 5918, and image display method instruction information 5919.

The camera ID 5911 is a camera UID uniquely assigned to each camera (image capturing device 1). The camera ID 5911 is ID information recorded in the camera ID 76 in the second memory 52 of the image capturing device 1. Use of the camera ID 5911 as login ID to the server 42 from the TV 45 can provide a server address unique to each image capturing device 1 so that the TV 45 can access the server 42 without user's entry of login ID. The camera ID 5901 may be used in the mutual authentication between the RF-ID unit 47 of the image capturing device 1 and the RF-ID reader/writer 46 of the TV 45.

The sever address 5912 is included in the server address information 81 in the server specific information 58 stored in the second memory 52 of the image capturing device 1. The sever address 5912 enables the TV 45 to identify the server to which target image data is uploaded.

The server login ID 5913 is included in the login ID 83 in the user identification information 82 in the server specific information 58 stored in the second memory 52 of the image capturing device 1. The server login ID 5913 allows the TV 45 to login, by using the same account, to the server to which the image capturing device 1 uploads image data.

The server login password 5914 is included in the password 84 in the server specific information 58 stored in the second memory 52 of the image capturing device 1. The server login password 5914 allows the TV 45 to login, by using the same account, to the server to which the image capturing device 1 uploads image data.

The final capturing date/time 5915 corresponds to the final capturing time 68 in the captured image state information 55 stored in the second memory 52 of the image capturing device 1. The TV 45 uses the final capturing date/time 5915 for the synchronization examination between captured images in the image capturing device 1 and captured images in the server 42.

The not-yet-uploaded image data existence identifiers 5916 correspond to the not-yet-uploaded image data existence identification information in the captured image state information 55 stored in the second memory 52 of the image capturing device 1. TV 45 uses the not-yet-uploaded image data existence identifiers 5916 for the synchronization examination between captured images in the image capturing device 1 and captured images in the server 42. In order to implement each of the not-yet-uploaded image data existence identifiers 5916, each image ID 5928 for identifying a corresponding one of captured images is assigned with an upload flag 5926 indicating whether or not the corresponding image has been uploaded to the server 42. Thereby, it is possible to determine whether or not each of the captured images has been uploaded to the server 42.

The not-yet-uploaded image information hashed information 5917 corresponds to the not-yet-uploaded image information hashed information 67 in the captured image state information 55 stored in the second memory 52 of the image capturing device 1. The TV 45 uses the not-yet-uploaded image information hashed information 5917 for the synchronization examination between captured images in the image capturing device 1 and captured images in the server 42.

The final image serial number 5918 corresponds to the final image serial number 69 in the captured image state information 55 stored in the second memory 52 of the image capturing device 1. The TV 45 uses the final image serial number 5918 for the synchronization examination between captured images in the image capturing device 1 and captured images in the server 42.

The image display method instruction information 5919 corresponds to the image display method instruction information 77 in the captured image state information 55 stored in the second memory 52 of the image capturing device 1. The image display method instruction information 5919 includes identification information by which the TV 45 designates a method of viewing images downloaded from the server 42.

For each image ID 5927, the image display method instruction information 5919 includes a list display flag 5920, a slide show flag 5921, a print flag 5922, a video reproduction flag 5923, a download flag 5924, and a security password 5925.

The image ID 5927 is information unique to a captured image. The pieces of image ID 5927 are chronologically assigned to captured images by the image capturing device 1 in capturing the images.

The list display flag 5920 corresponds to the list display (flag) 78 stored in the second memory 52 of the image capturing device 1. The TV 45 uses the list display flag 5920 to determine whether or not image data downloaded from the server 42 is to be displayed in a list format. If the list display flag 5920 indicates "yes", the data processing unit 5510 of the TV 45 generates a list of the downloaded images, stores the list to the memory unit 5511, and then displays the list on the display unit 5512.

The slide show flag 5921 corresponds to the slide show (flag) 79 stored in the second memory 52 of the image capturing device 1. The TV 45 uses the slide show flag 5921 to determine whether or not image data downloaded from the server 42 is to be displayed as a slide show. If the slide show flag 5921 indicates "automatic", the data processing unit 5510 of the TV 45 generates a slide show of the downloaded images, stores the slide show to the memory unit 5511, and then displays the slide show on the display unit 5512. If the slide show flag 5921 indicates "manual", the TV 45 permits execution of the slide show according to instructions from the user. If the slide show flag 5921 indicates "disable", the TV 45 inhibits display of the slide show.

The print flag 5922 indicates whether or not images to be downloaded to the TV 45 and then displayed on the display unit 5512 are permitted to be printed by a printer (not shown) connected to the TV 45. The print flag 5922 is not shown in the image display method instruction information 77 stored in the second memory 52 of the image capturing device 1. However, if the print flag 5922 is added, it is possible to set whether or not image data is printable. As a result, usability related to use of images can be improved.

The video reproduction flag 5923 indicates whether or not video data captured by the image capturing device 1 and then uploaded to the server 42 is permitted to be downloaded by the TV 45 and then viewed. If the image capturing device 1 has a video capturing function, addition of the video reproduction flag 5923 to the image display method instruction information 77 stored in the second memory 52 can add setting of whether or not video reproduction is permitted. As a result, the video reproduction can be managed without complicated operations by the user.

The download flag 5924 is an identifier indicating whether or not image or video uploaded to the server 42 is permitted to be downloaded (copied) to a memory in the TV 45. The download flag 5924 can prevent that the image or video is copied by the third person to which image capturing is not permitted. Thereby, copy-right protection is also achieved.

The security password 5925 is password information that permits only the authorized user to perform the above-described image viewing, printing, and downloading processes. In Embodiment A2, the same password is set for each of the above-described image viewing, printing, and downloading processes. It is preferable, however, to set a different password to each of image viewing, printing, and downloading processes, so that a level of security can be set independently.

As described above, in the system according to Embodiment A2 of the present invention, the image capturing device 1 uploads captured images, to the server connected to the image capturing device 1 via the first antenna. When the image capturing device 1 is prevented to the RF-ID reader/writer 46 of the TV 45, the image capturing device 1 transmits the server URL generation information 80, the captured image state information 55, and the image display method instruction information 77 from the RF-ID unit 47 to the TV 45 by the RF-ID communication. Then, the TV 45 connects to the server to which the image capturing device 1 has uploaded the captured images, then downloads the captured images from the server, and displays the captured images. Here, it is determined whether or not the captured images in the server 42 are in synchronization with the captured images in the image capturing device 1. If the synchronization is failure, the TV 45 displays notification of the synchronization failure on the display unit 5512. Thereby, the user can display the captured images only by presenting the image capturing device 1 to the TV 45, although the user conventionally has to remove a recording memory from the camera (the image capturing device 1) to be equipped to the TV 45 in order to view the images. Thereby, even the user who is not familiar with operations of digital devices can easily display the images on the TV 45.

Embodiment A3

Embodiment A3 of the present invention is described below.

First, Embodiment A3 is explained in summary.

Figure 48:
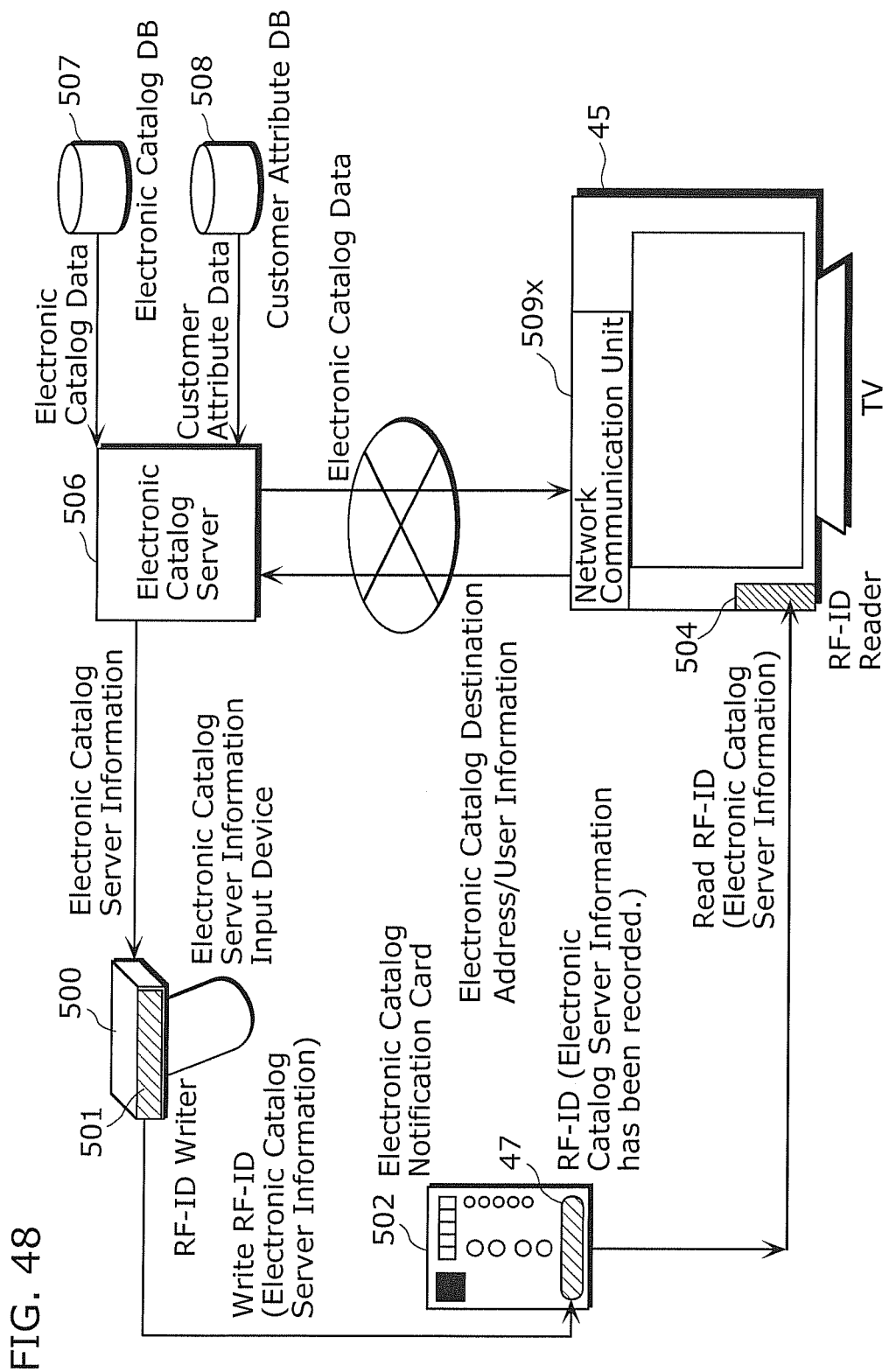
FIG. 48 is a schematic diagram of an electronic catalog display system.

FIG. 48 is a schematic block diagram of an electronic catalog display system according to Embodiment A3.

The electronic catalog display system according to Embodiment A3 includes an electronic catalog server information input device 500, an electronic catalog notification card 502, the TV 45, and an electronic catalog server 506. The electronic catalog server information input device 500 includes a RF-ID writer 501. The electronic catalog notification card 502 includes a RF-ID unit 47. The TV 45 includes a RF-ID reader 504 and a network communication unit 509$x$. The electronic catalog server 506 includes an electronic catalog database 507 and a customer attribute database 508.

The electronic catalog server information input device 500 writes electronic catalog server information from the RF-ID writer 501 to the RF-ID unit 47 attached to the electronic catalog notification card 502. The electronic catalog server information is provided from a user who provides services of an electronic catalog (hereinafter, referred to as a "provider user"). When a user who receives the services of the electronic catalog (hereinafter, referred to as a "customer user") brings the electronic catalog notification card 502, in which the electronic catalog server information is written, into proximity of the TV 45, the RF-ID reader 504 in the TV 45 reads the electronic catalog server information from the RF-ID unit 47. In addition, the TV 45 transmits, based on the readout electronic catalog server information, a request for obtaining an electronic catalog to the electronic catalog server 506 set on a network via the network communication unit (communication unit) 509$x$. Furthermore, when transmitting the request to the electronic catalog server, the TV 45 transmits also user information, which is previously inputted in the TV 45, to the electronic catalog server 505. The electronic catalog server 505 receives the request for the electronic catalog and the user information from the TV 45. First, the electronic catalog server 505 obtains customer attribute data from the customer attribute database 508 based on the user information. Next, from the electronic catalog database 507, the electronic catalog server 506 obtains electronic catalog data associated with the customer attribute data. Then, the electronic catalog server 505 transmits the obtained electronic catalog data to the TV 45 from which the request for the electronic catalog has been transmitted. The TV 45 displays the electronic catalog data received from the electronic catalog server 505, and thereby receives purchase operations from the customer user to purchase products in the electronic catalog data.

The following describes the electronic catalog display system according to Embodiment A3 in more detail.

Figure 49:
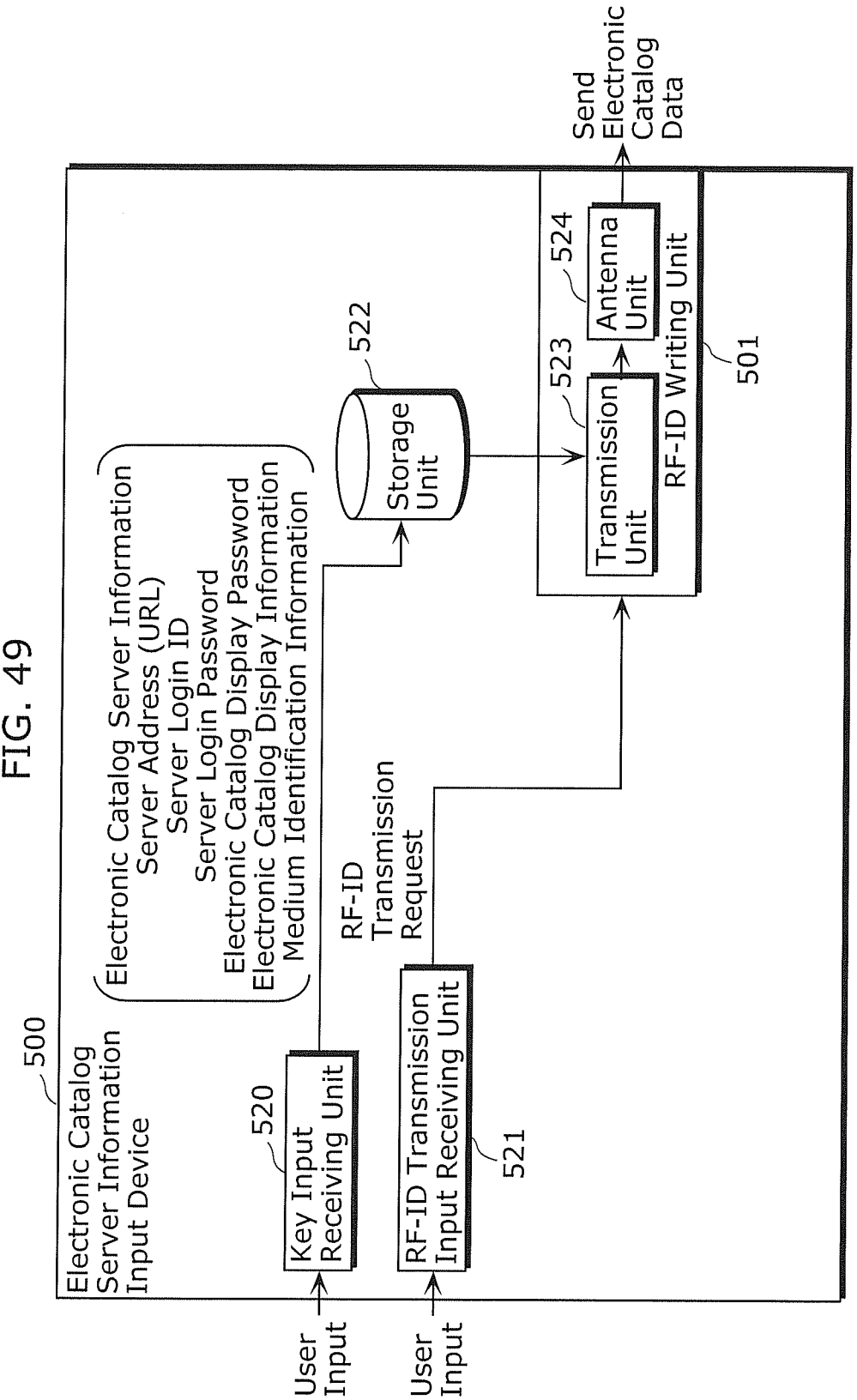
FIG. 49 is a block diagram of an electronic catalog server information input device.

FIG. 49 is a functional block diagram illustrating a structure of the electronic catalog server information input device according to Embodiment A3.

First, a key input receiving unit 520 receives an input by input keys operated by the provider user, in order to obtain the electronic catalog server information. The electronic catalog server information obtained by the key input receiving unit 520 includes: a sever address such as a URL; server login ID; a server login password; an electronic catalog display password; electronic catalog display information; and a medium identification information. The electronic catalog display information indicates whether images of products/services in the electronic catalog are to be displayed in a list (as thumbnails) or sequentially (as a slide show). The medium identification information is used for identifying a medium such as a card or a postcard to which RF-ID is attached. The electronic catalog server information obtained by the key input receiving unit 520 is stored into a storage unit 522. Next, when a RF-ID transmission key and the like are received after receiving of the electronic catalog server information, a RF-ID transmission input receiving unit 521 notifies a transmission unit 523 of a transmission request. Then, the transmission unit 523 reads the electronic catalog server information from the storage unit 522. An antenna unit 524 transmits the electronic catalog server information.

Figure 50:
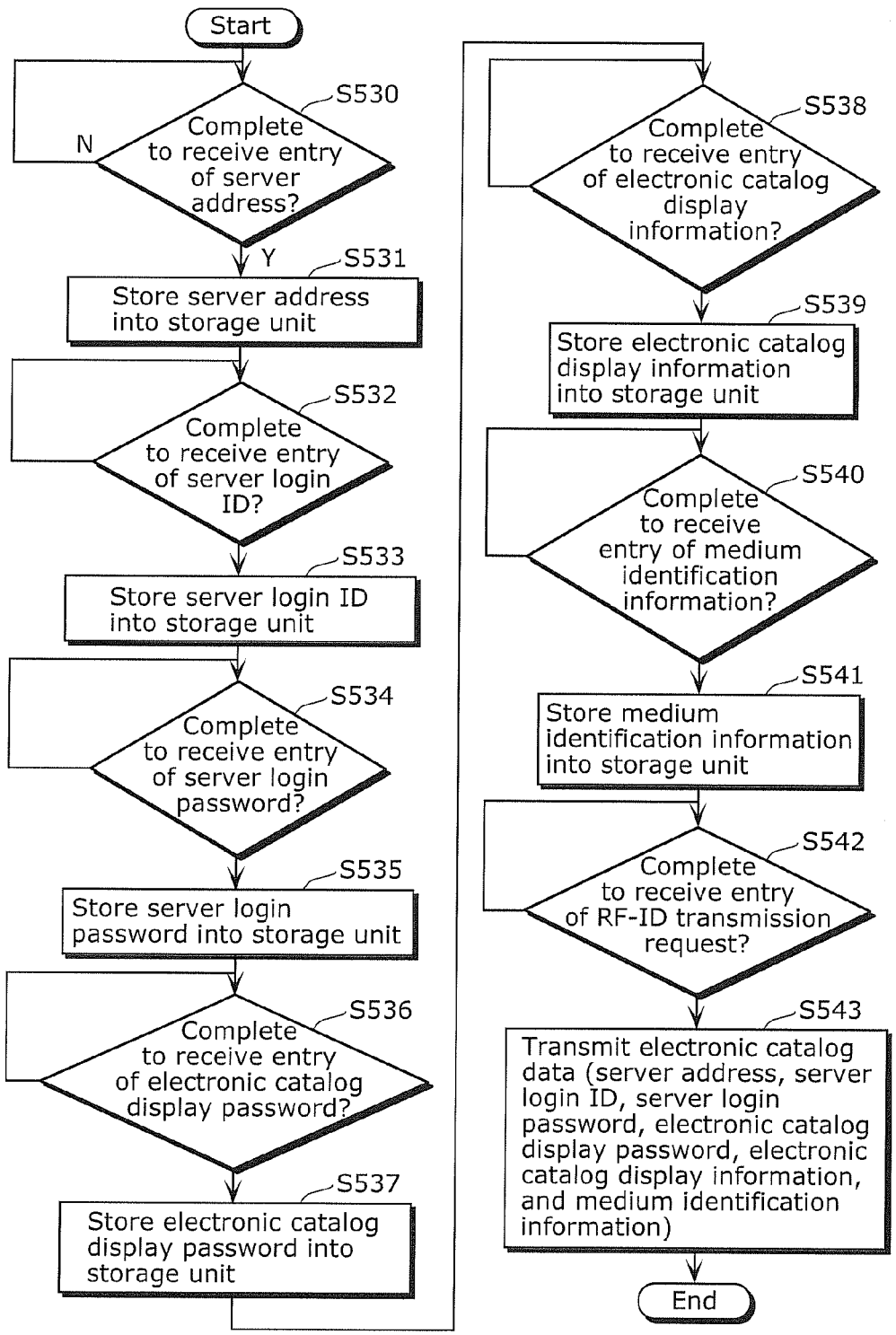
FIG. 50 is a flowchart of steps of processing performed by the electronic catalog server information input device.

FIG. 50 is a flowchart of steps of processing performed by the electronic catalog server information input device.

The processing performed by the electronic catalog server information input device is presented in more detail with reference to a flowchart of FIG. 50.

Figure 51:
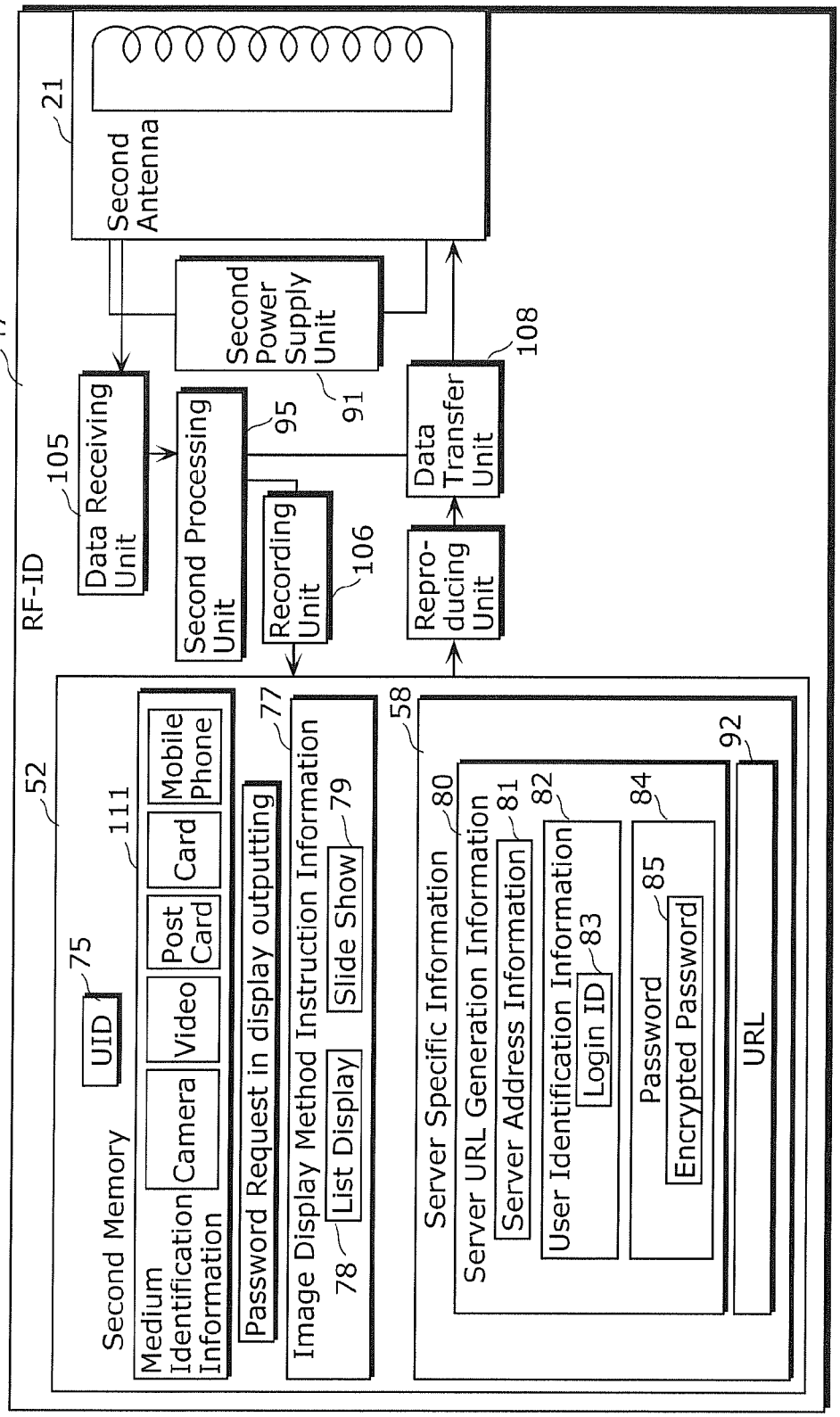
FIG. 51 is a block diagram of a RF-ID unit of an electronic catalog notification card.

FIG. 51 is a block diagram of a structure of the RF-ID unit 47 included in the electronic catalog notification card 502.

A structure and processing of the RF-ID unit 47 are the same as those described in Embodiments A1 and A2. The second power supply unit 91 obtains current from signals received by the second antenna 21, and provides power to each unit in the electronic catalog notification card 502. Received information is recorded into the second memory 52 via the data receiving unit 105, the second processing unit 95, and the recording unit 106.

Figure 52:
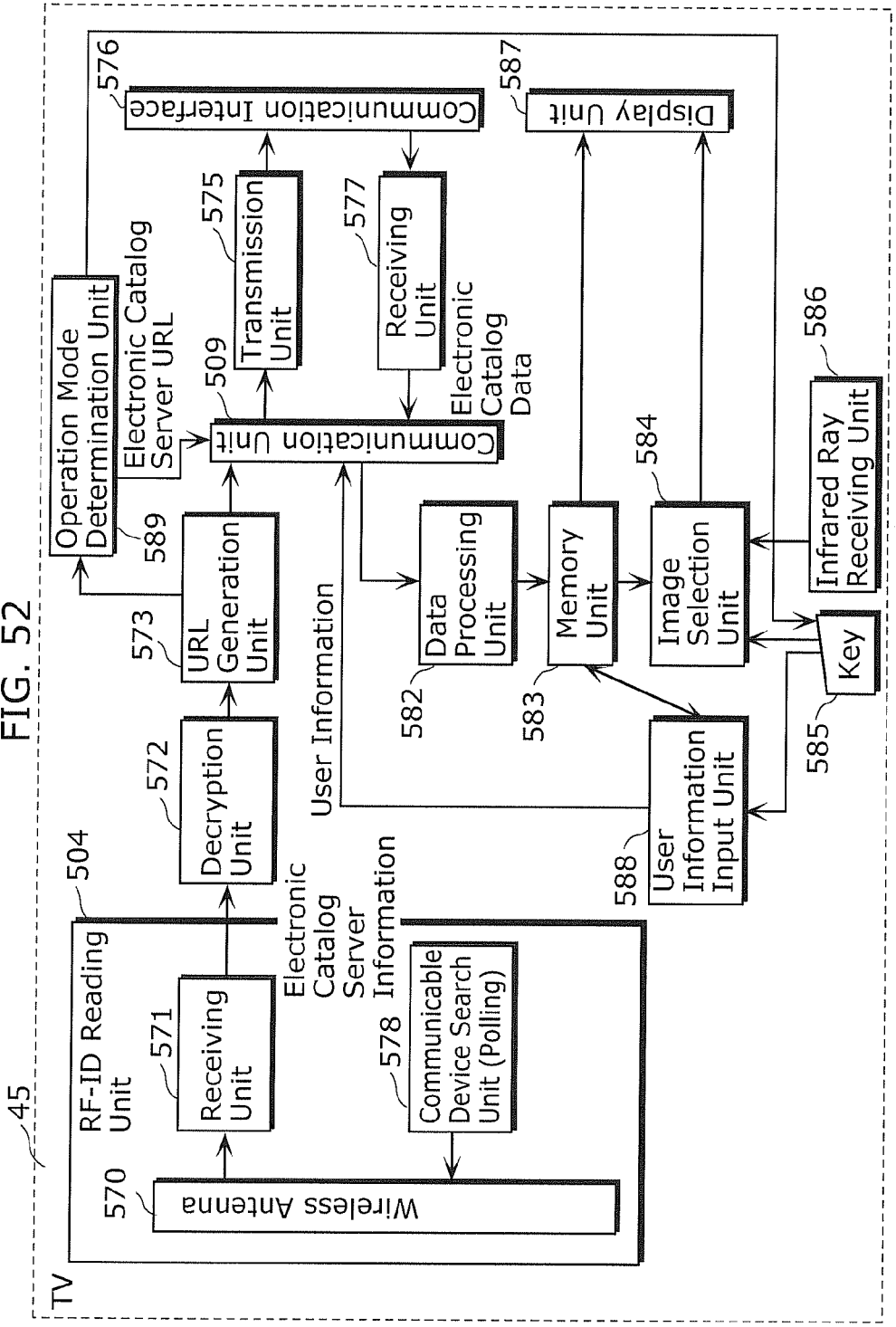
FIG. 52 is a block diagram of a TV displaying an electronic catalog.

FIG. 52 is a functional block diagram of a structure of the TV 45.

The structure of the TV 45 according to Embodiment A3 differs from the structure of the TV 45 according to Embodiment A2 in that a user information input unit 588 is added. The user information input unit 588 receives the user information and stores the user information into a memory unit 583 temporarily. The user information is an attribute of the customer user and previously inputted by the customer user himself/herself. The user information is preferably gender or age information of the customer user. The user information may be other information, such as a residence or a family structure, which is private information for selecting product/service data in the electronic catalog. The user information is transmitted to the electronic catalog server via the communication unit 509, together with the URL of the electronic catalog server generated by the URL generation unit. In the same manner as described in Embodiment A1, in Embodiment A3, when the customer user moves the electronic catalog notification card 502 into proximity of a RF-ID reader 504 of the TV 45, the TV 45 receives the electronic catalog server information and thereby generates a URL of the server to connect to the server. The details of this processing are the same as those described in Embodiment A1 with reference to FIGS. 7 to 20.

Figure 53:
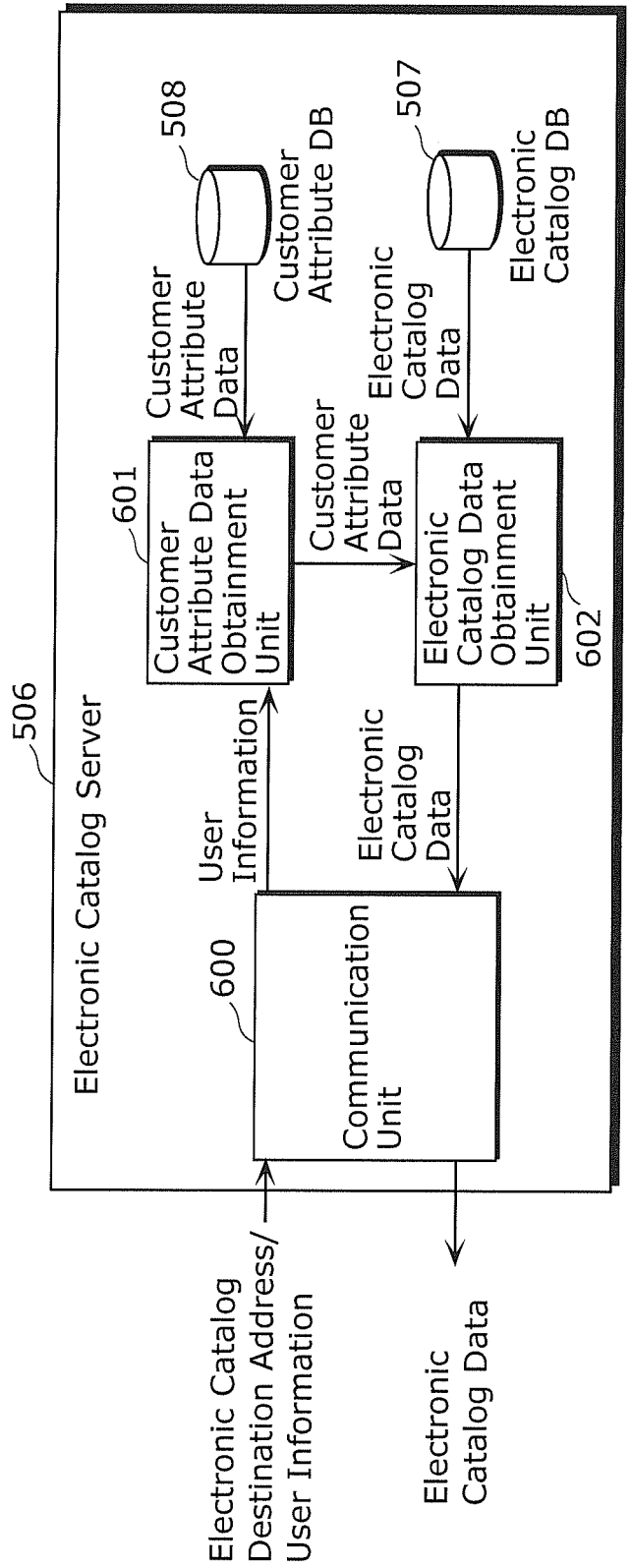
FIG. 53 is a block diagram of an electronic catalog server.

FIG. 53 is a functional block diagram of a structure of the electronic catalog server 506.

Figure 54:
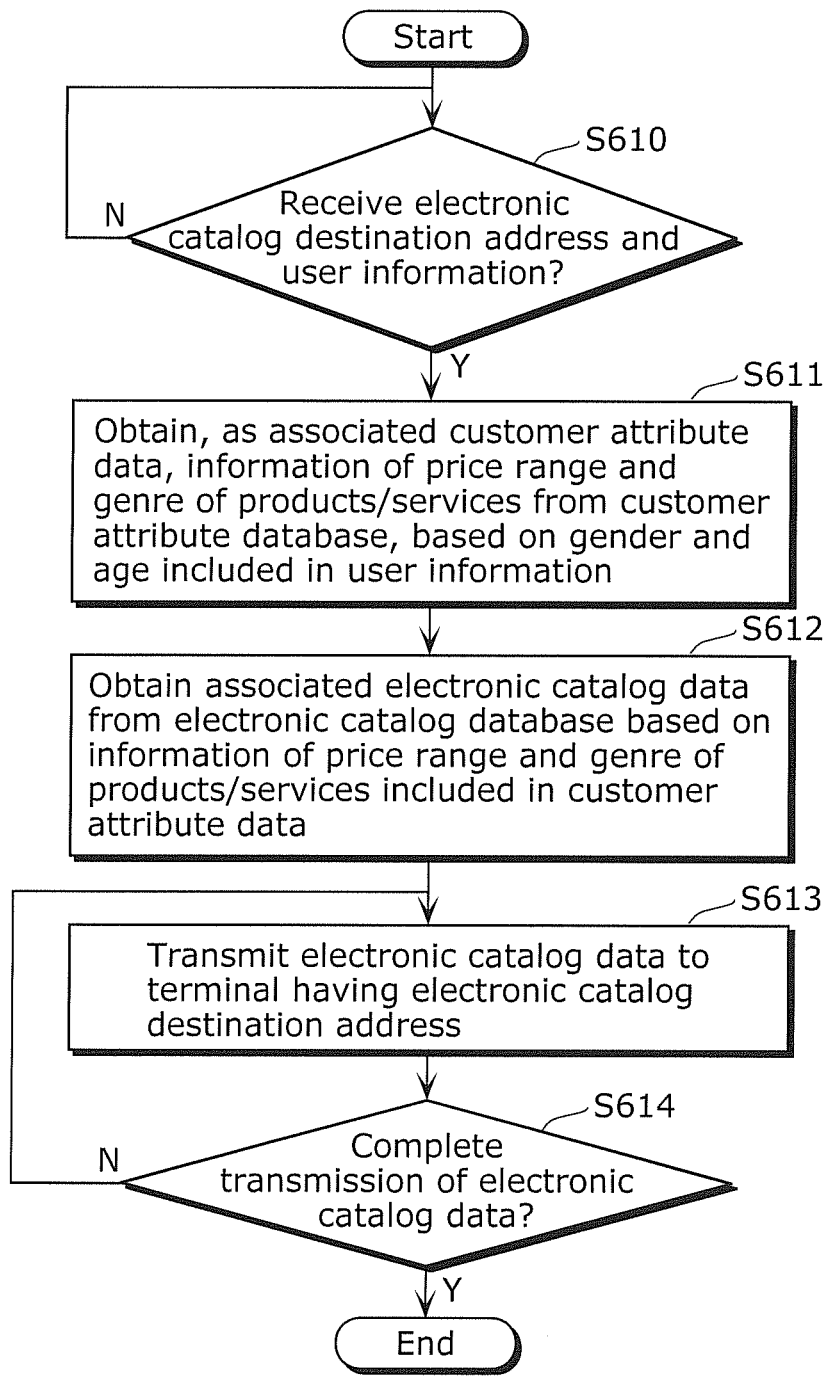
FIG. 54 is a flowchart of steps of processing performed by the electronic catalog server.

FIG. 54 is a flowchart of steps of processing performed by the electronic catalog server.

FIG. 57 is a table of a data structure of a customer attribute database.

FIG. 58 is a table of a data structure of an electronic catalog database.

The electronic catalog server 506 receives an electronic catalog destination address and the user information from the TV 45 via a communication unit 600. The electronic catalog destination address is a network address of the TV 45 on a network to which the TV 45 and the electronic catalog server 506 belong. Next, based on the user information received by the customer attribute data obtainment unit, the electronic catalog server 506 obtains customer attribute data from the customer attribute database 508. For instance, if the user information includes a gender and an age of the customer user using the TV 45, the electronic catalog server 506 obtains, as the customer attribute data, information of a product/service genre and a product/service price range which are in association with the age and gender of the customer user, based on the customer attribute database 508 having a data structure illustrated in FIG. 57. Then, the electronic catalog data obtainment unit 602 obtains the electronic catalog data from the electronic catalog database 507 based on customer attribute data. For example, if the customer attribute data includes product/service genres and product/service price ranges, the electronic catalog server 506 obtains, as the electronic catalog data, all of product/service data corresponding to the product/service genres and the product/service price ranges, from the electronic catalog database 507 having a data structure illustrated in FIG. 58. The electronic catalog server 506 transmits the electronic catalog data obtained by the electronic catalog data obtainment unit 602 to the TV 45 having the electronic catalog destination address, via a communication unit 600. The processing performed by the electronic catalog server 506 is presented in more detail in a flowchart of FIG. 54.

Figure 55:
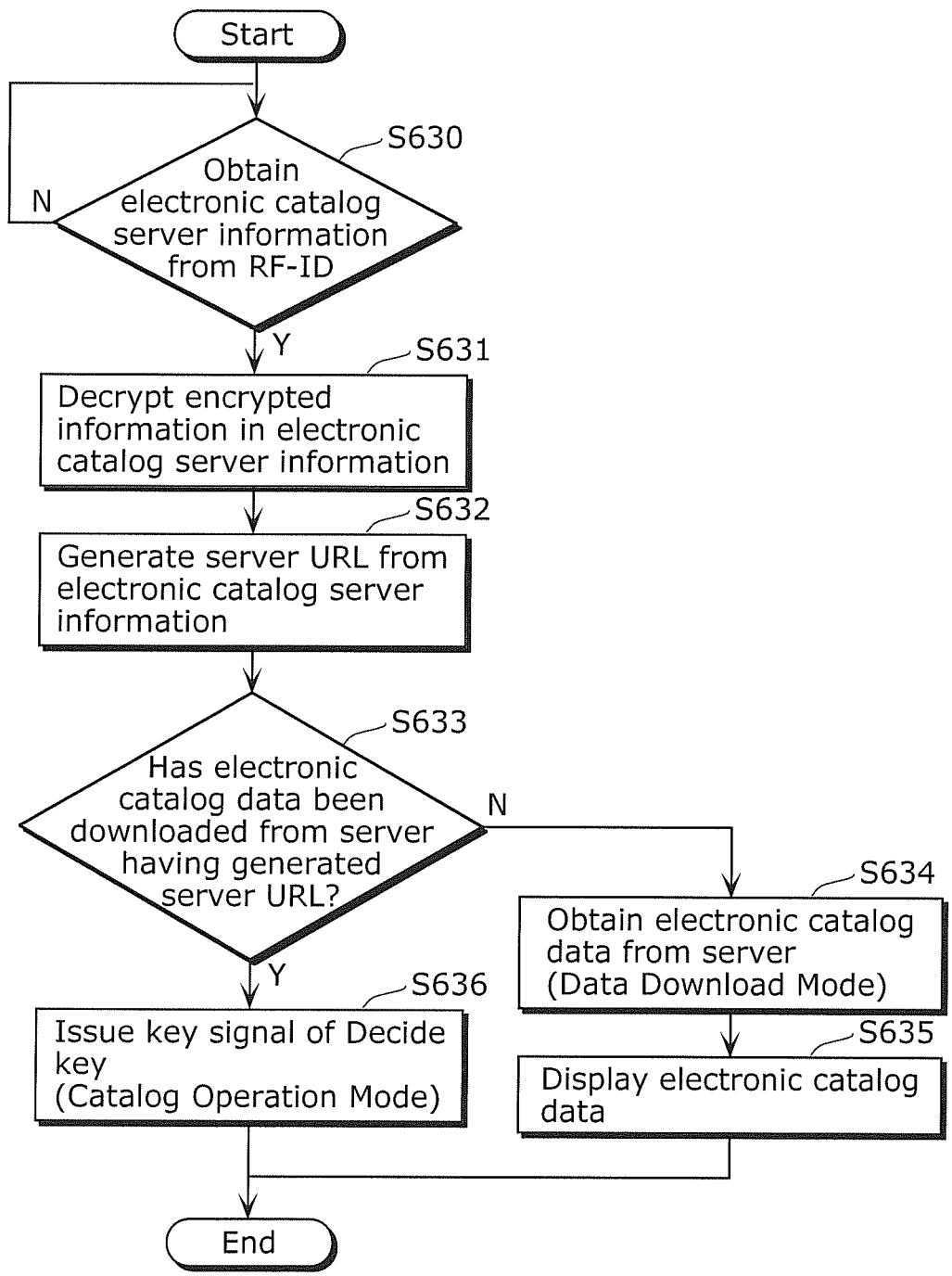
FIG. 55 is a flowchart of steps of processing performed by a TV displaying the electronic catalog.

FIG. 55 is a flowchart of steps of processing performed by a TV displaying the electronic catalog.

The following describes processing of the TV 45 after downloading the electronic catalog data, with reference to a flowchart of FIG. 55. The processing regarding obtaining of the electronic catalog server information from the RF-ID unit at Steps S630 to S632 is the same whichever the electronic catalog data is downloaded or not. At S633, it is determined whether or not the electronic catalog data associated with the electronic catalog server information received from the RF-ID unit has already been downloaded and displayed. If the electronic catalog data has not yet been downloaded, then the TV 45 downloads the electronic catalog data from the server at S634 and displays the electronic catalog data at S635. The download processing is the same as the download processing described in Embodiment A1.

Figure 56:
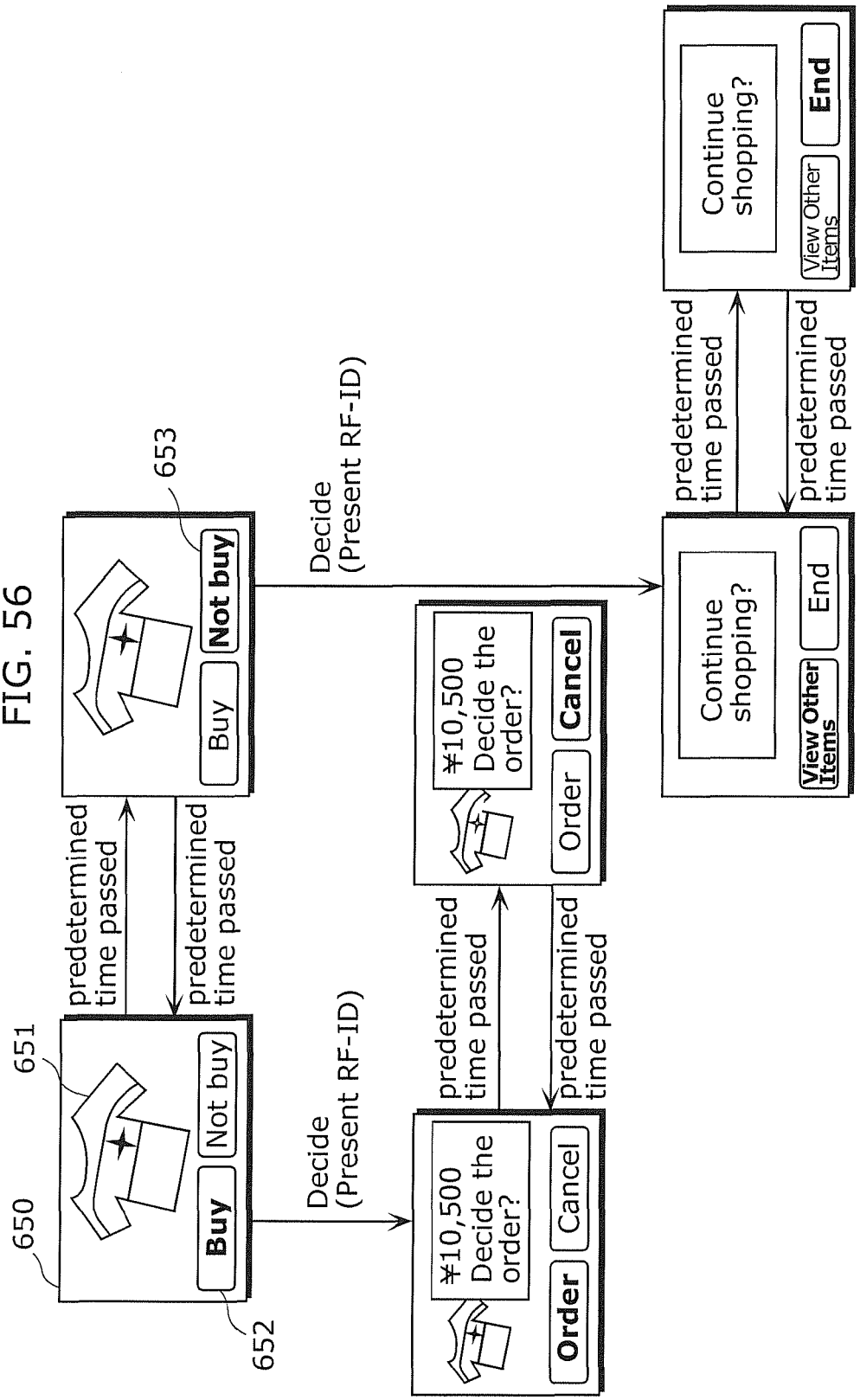
FIG. 56 is a diagram illustrating screen display of the electronic catalog.

FIG. 56 is a diagram illustrating screen display of the electronic catalog.

If it is determined at S633 that the electronic catalog data has already been downloaded, then the TV 45 issues a signal of a predetermined key (for example, a signal of a Decide key) to execute operations for the displayed electronic catalog data. Here, as illustrated in an example of a screen display of the electronic catalog data in FIG. 56, a screen presents the customer user with a few of options for a next operation to be executed by the customer user for the displayed electronic catalog data. Then, a focus circulates among the options on the screen (as illustrated as options 652 and 653 in FIG. 56) to indicate one of them as a selection candidate every time a predetermined time period passes. This allows the customer user to execute an operation for selecting or purchasing each product in the electronic catalog data, for example, only by presenting the electronic catalog notification card 502 having the RF-ID unit 47 to the TV 45, when the focus indicates a desired option of the customer user.

The second memory 52 according to Embodiment A3, which is embedded in the RF-ID unit 47 on the electronic catalog notification card 502, may be a Read Only Memory (ROM). In this aspect, the electronic catalog server information input device 500 serves as a RF-ID memory data input unit in manufacturing the RF-ID unit, or a RF-ID memory data input means in a RF-ID manufacturing system. In general, a RF-ID unit having a ROM unit is inexpensive more than a RF-ID unit having a rewritable memory. Therefore, the RF-ID unit having a ROM allows the provider user sending a great number of electronic catalog notification cards to reduce a cost.

It should be noted that it has been described in Embodiment A3 that a focus circulates among the options on the screen of the TV 45 (as illustrated as options 652 and 653 in FIG. 56) to indicate one of them as a selection candidate every time a predetermined time period passes. However, the method of operating the electronic catalog data displayed on the screen by using the electronic catalog notification card 502 having the RF-ID unit 47 is not limited to the above. For example, it is also possible that the receiving unit 571 of the TV 45 sequentially receive pieces of information from the RF-ID unit and counts the sequential receiving processes, then thereby calculates a time period (RF-ID proximity time period) during which the RF-ID unit is in proximity of the TV 45, and eventually moves a focus indicating a selection candidate displayed on the screen based on the RF-ID proximity time period. With the above structure, the following operation for the electronic catalog is possible. Only when the RF-ID unit is in proximity of the TV, the focus displayed on the screen is circulated to change the selection candidate. If the RF-ID unit is away from the TV, the focus is stopped. After a predetermined time period after stopping of the focus, the selection candidate on which the focus is stopped is decided as selection. In this operation for the electronic catalog, the customer user can actively operate the electronic catalog by using the RF-ID unit, without waiting for the focus, which automatically circulates among options every predetermined time period, to arrive at a user's desired option.

It should also be noted that it has been described in Embodiment A3 that the electronic catalog server information input device 500 has the key input receiving unit 520 which receives inputs by the input keys operated by the provider user in order to obtain the electronic catalog server information. However, the following configuration is also possible. That is, the electronic catalog server information input device 500 has a communication interface to communicate with the image server. The image server holds the server information to be transmitted to the electronic catalog server information input device 500. The electronic catalog server information input device 500 receives the server information from the image server, in order to obtain the server information. This configuration in which the server information is stored in the image server allows the electronic catalog server information input device 500 to eliminate inputting to the image server. Especially, when a plurality of the electronic catalog server information input devices 500 are operated for a single image server, this configuration is highly convenient.

The conventional techniques have a program that users who are not familiar with operations of digital devices such as personal computers should learn operations of the devices to do online shopping. However, the system according to Embodiment A3 enables users using electronic catalogs to do online shopping and the like, simply by bringing received cards or post cards into proximity of TVs. Therefore, even users who are not familiar with online terminals such as personal computers and mobile phones can easily enjoy shopping on TV screens.

Embodiment A4

Embodiment A4 of the present invention is described below.

Figure 59:
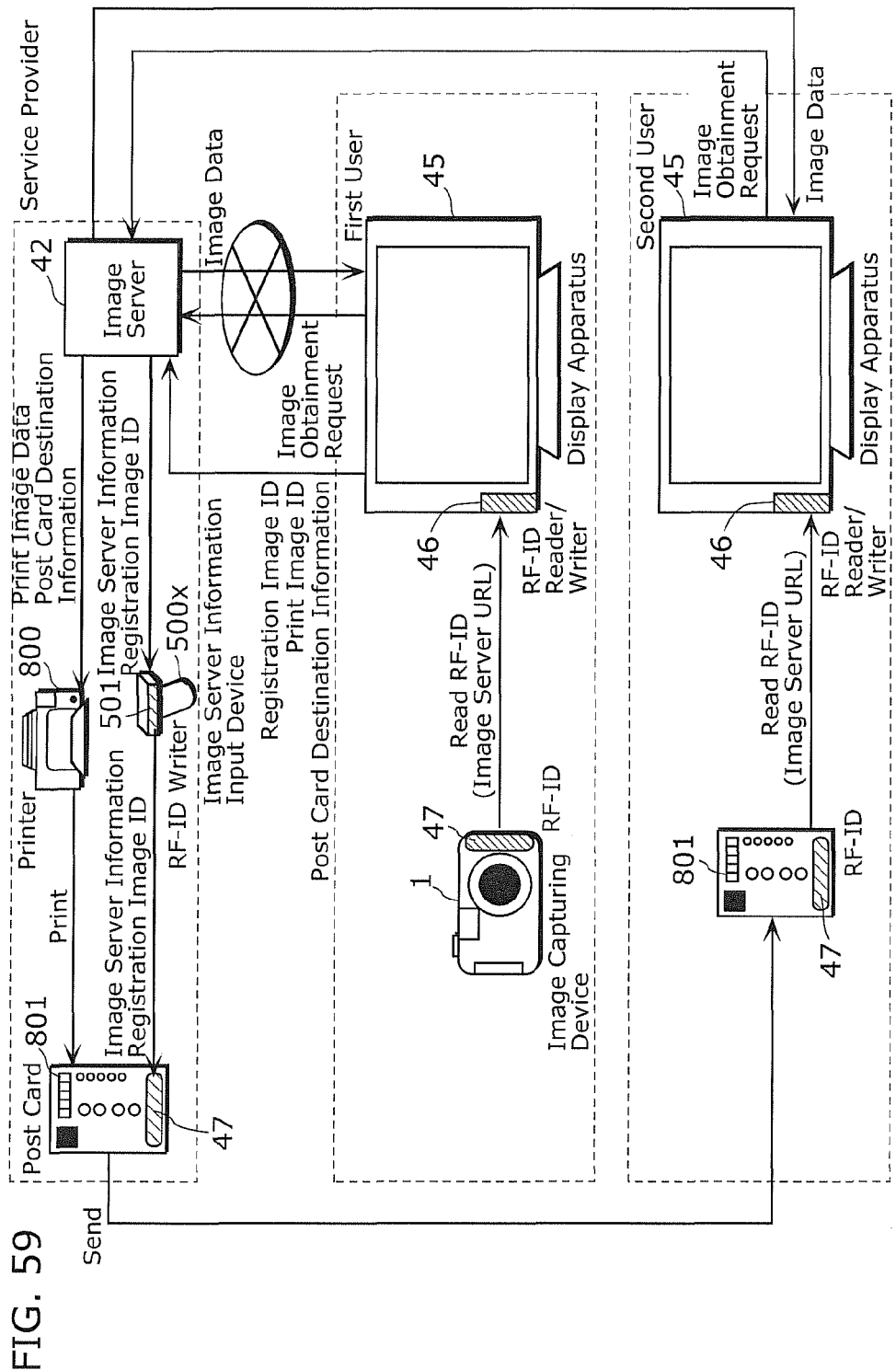
FIG. 59 is a schematic diagram of a RF-ID-attached post card mailing system.

FIG. 59 is a schematic diagram of Embodiment A4.

In Embodiment A4, it is described a method of sending, to a remote location, a post card attached with RF-ID used to access an image server. First, a first user, who is a sender of a post card, brings the image capturing device 1 having the RF-ID unit 47 into proximity of the RF-ID reader/writer 46 of the TV 45. Thereby, the TV 45 generates a server URL used to connect the TV 45 to the image server 42, thereby obtains image data from the image server 42, and eventually displays the image data on a screen. This processing is the same as described in Embodiment A1. Next, by using an input means such as a remote controller of the TV 45, the first user selects an image(s) to be printed on a post card and images to be registered in association with the post card (in other words, images to be shown to a second user living in a remote location), from among the image data displayed by the TV 45. In addition, the first user inputs address information such as a destination address of the post card by using the remote controller or the like. The TV 45 transmits, to the image server 42, ID of the image selected by the first user to be printed on the post card (hereinafter, referred to as "print image ID"), ID of the images to be registered for the post card (hereinafter, referred to as "registration image ID"), and the destination information of the post card (hereinafter, referred to as "post card destination information"). The image server 42 retrieves the image data identified by the print image ID and then transmits the image data and the post card destination information to a printer 800. The printer 800 prints the image data and the post card destination information on the post card. In addition, to the image server information input unit 500x, the image server 42 transmits the registration image ID received from the TV 45, together with image server information. The image server information includes: a sever address such as a URL; server login ID; a server login password; an image display password, image display information indicating whether the image data (images) is to be displayed in a list (as thumbnails) or sequentially (as a slide show); and medium identification information indicating a medium, such as a card or post card, to which RF-ID is to be attached. An image server information input device 500x writes the image server information and the registration image ID to the RF-ID unit 47 of the post card on which the image and the destination information are printed by the printer 800. The post card 801 applied with printing and RF-ID writing is mailed to the printed destination. Thereby, the second user, who is designated by the first user as being the destination, receives the post card 801. When the second user brings the mailed post card 801 into proximity of a RF-ID reader/writer 46 of a TV 45 of the second user, the TV 45 of the second user obtains the image server information and the registration image ID from the RF-ID unit 47, downloads the images identified by the registration image ID, and displays the downloaded images.

The structure and processing of the image capturing device 1 according to Embodiment A4 are the same as described in Embodiment A1.

Figure 60:
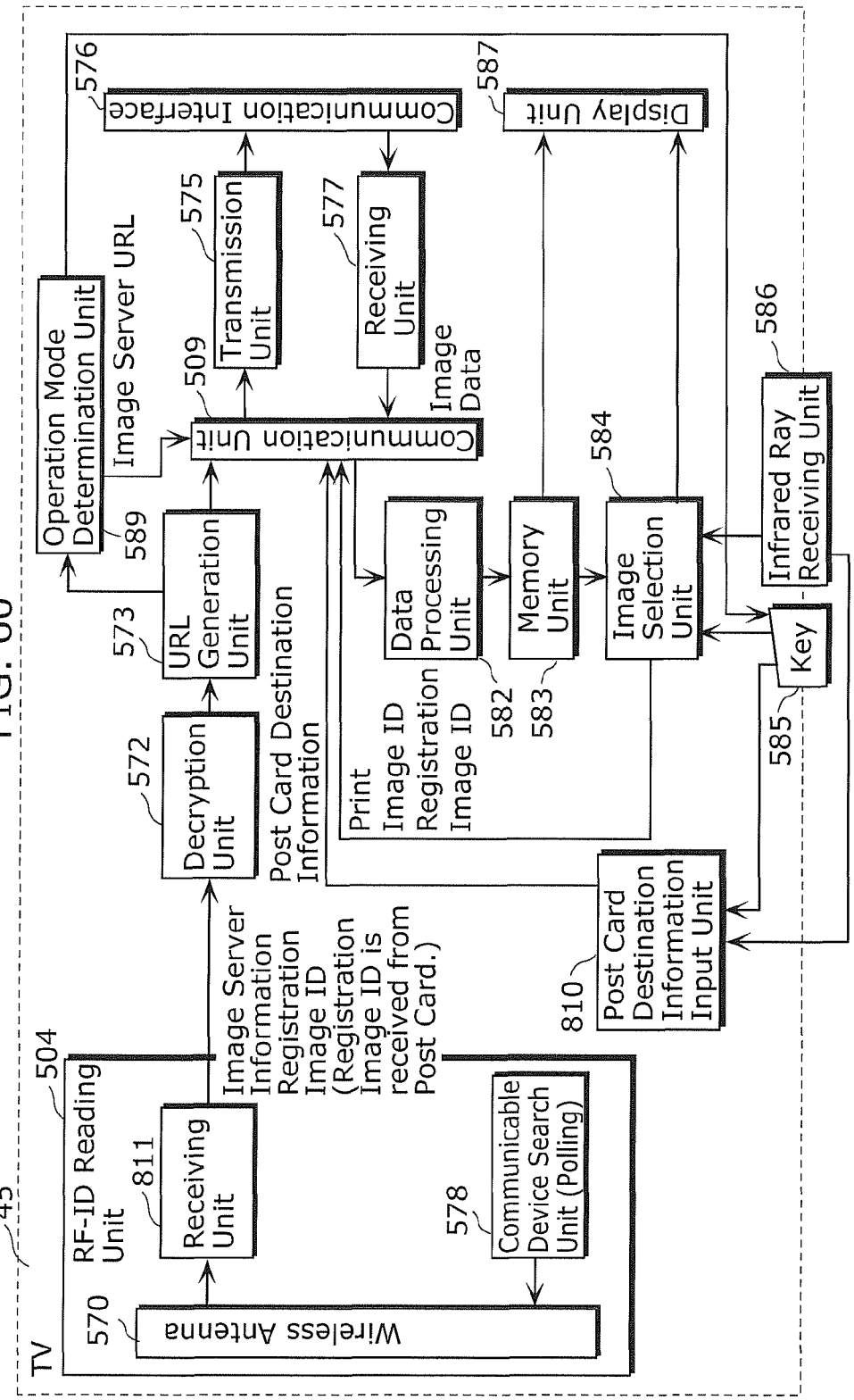
FIG. 60 is a block diagram of a TV in the RF-ID-attached post card mailing system.

FIG. 60 is a block diagram of a structure of the TV 45 according to Embodiment A4.

A receiving unit 811 receives the image server information from the RF-ID unit 47 of the image capturing device 1 or the post card 801 via a wireless antenna 570. If the RF-ID unit 47 of the post card 801 holds the registration image ID, the receiving unit 811 receives also the registration image ID. An image selection unit 584 receives an image selection operation from the user via a key unit 585 and an infrared ray receiving unit 586, and thereby obtains ID of an image which the first user has selected to be printed on the post card (namely, the print image ID) and ID of images which the first user has selected to be registered for the post card (namely, the registration image ID). Then, the image selection unit 584 provides the obtained IDs to the communication unit 509.

Figure 61:
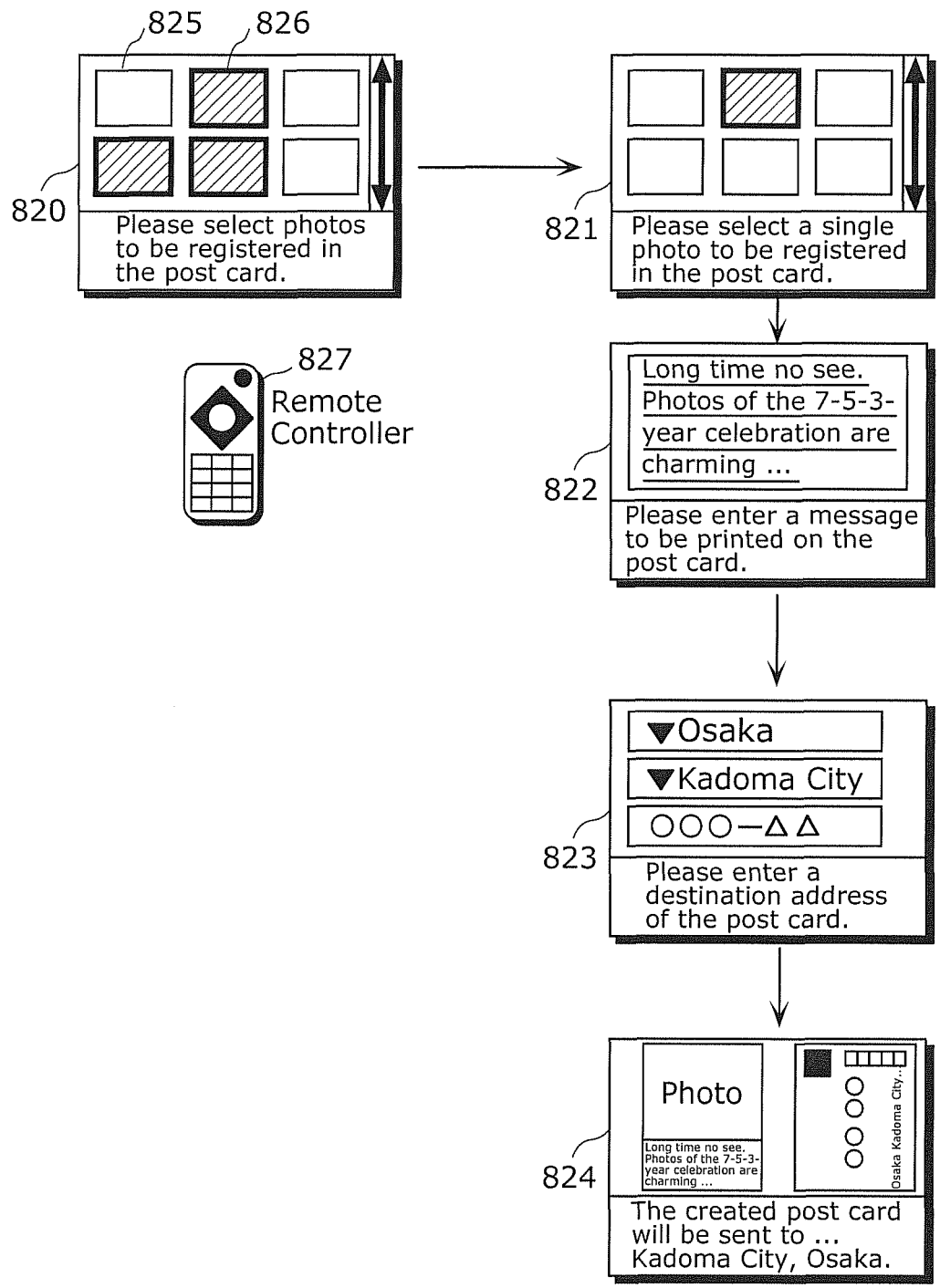
FIG. 61 is a diagram illustrating screen display in image selection operation by the RF-ID-attached post card mailing system.

FIG. 61 is a diagram illustrating screen display in image selection operation by the RF-ID-attached post card mailing system.

FIG. 61 illustrates an example of a screen display on the TV 45 in the image selection operation. In FIG. 61, 821 is a screen display from which the first user selects an image to be printed on the post card. 820 in FIG. 61 is a screen display from which the first user selects images to be registered for the post card. A post card destination information input unit 810 receives a character input operation of the first user via the key unit 585 and the infrared ray receiving unit 586. Thereby, the post card destination information input unit 810 obtains the post card destination information including an address and a name of the destination of the post card. Then, the post card destination information input unit 810 provides the post card destination information to the communication unit 509. 823 in FIG. 61 is an example of a screen display on which the post card destination information is inputted. The communication unit 509 transmits the post card destination information, the print image ID, and the registration ID to the image server via a transmission unit 575 and a communication interface 576.

Figure 62:
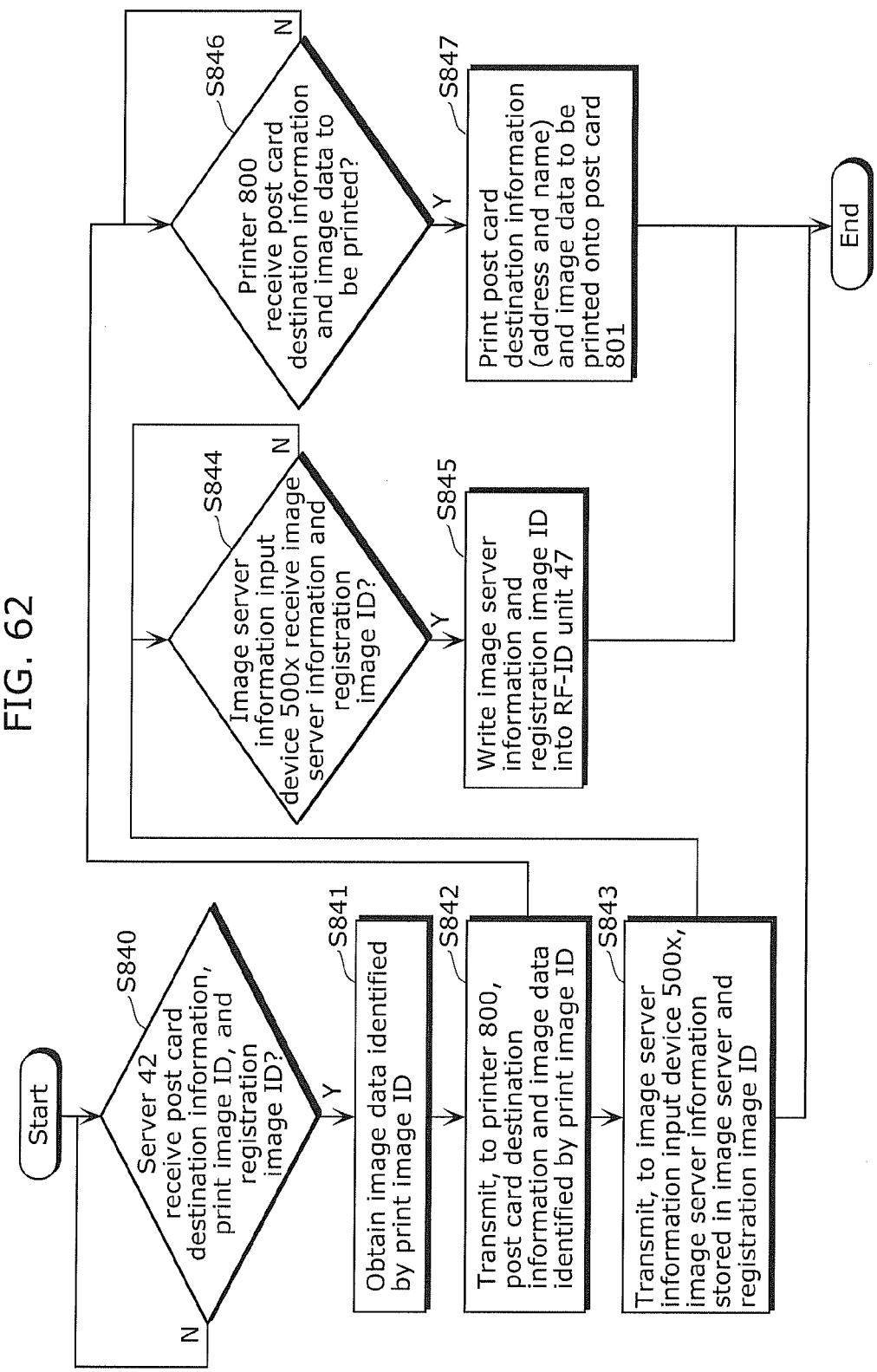
FIG. 62 is a flowchart of steps of processing performed by an image server in the RF-ID-attached post card mailing system.

FIG. 62 is a flowchart of processing performed prior to mailing of the post card 801, by the image server 42, the printer 800, and the image server information input device 500x.

When the post card 801 is applied with printing and RF-ID writing, the post card 801 is mailed to the printed destination. The second user, who is designated by the first user as being the destination, receives the post card 801. When the second user presents the received post card 801 to the TV 45, the receiving unit 811 receives the image server information and the registration image ID from the RF-ID unit 47 via the wireless antenna 570. A decryption unit 572 decrypts encrypted information in the image server information and the registration image ID. Next, the URL generation unit 573 generates a URL from which only images identified by the registration image ID from among images stored in the image server 42 are downloaded to the TV 45. More specifically, the URL generation unit 573 may designate an internal directory of the server in the generated URL or may use a method of embedding the registration image ID to the URL as a URL option. By using the URL generated by the URL generation unit 573 to designate the server, the TV 45 accesses the image server to obtain the images, which is the same as described in more detail in Embodiment A1.

It should be noted that it has been described in Embodiment A4 that the user inputs the destination information to the TV 45, but the user may input not only the destination information such as an address and a name but also a message to be printed with an image on a post card. The TV 45 receives the input message together with the destination information and provides them to the image server 42. The printer 800 prints them on the post card. 822 in FIG. 61 illustrates an example of a screen of the TV 45 on which a message to be printed is inputted. If the user can select an image to be printed on the post card and also input an message added to the image, a flexibility in generating a post card with RF-ID is increased.

It should also be noted that the TV 45 according to Embodiment A4 may allow the user to perform operations for images displayed on the TV 45 by using the post card with RF-ID, in the same manner as described in Embodiment A3 for the processing in which the user operates an electronic catalog displayed on a screen by using RF-ID.

As described above, the system according to Embodiment A4 enables the user to mail a post card with RF-ID to a person living in a distant location, without creating a post card attached with RF-ID by the user himself/herself. In addition, when the user wishes to print the image(s) stored in the image server onto the post card to be mailed, the system allows the user to perform operation on a TV screen to select an image(s) to be printed. As a result, high usability is achieved.

Conventionally, if the user intends to show images, on a large screen display device, to a different user living in a remote location, the user in the remote location needs to learn operations of the device (apparatus), an operation acquirer has to go to the remote location to operate the device, or the display device in the remote location should be remotely controlled. The system according to Embodiment A4, however, enables such a user in a remote location to easily view images by a simple operation, for example, by bringing a physical medium such as a post card with RF-ID into proximity of a display device.

Embodiment A5

Figure 63:
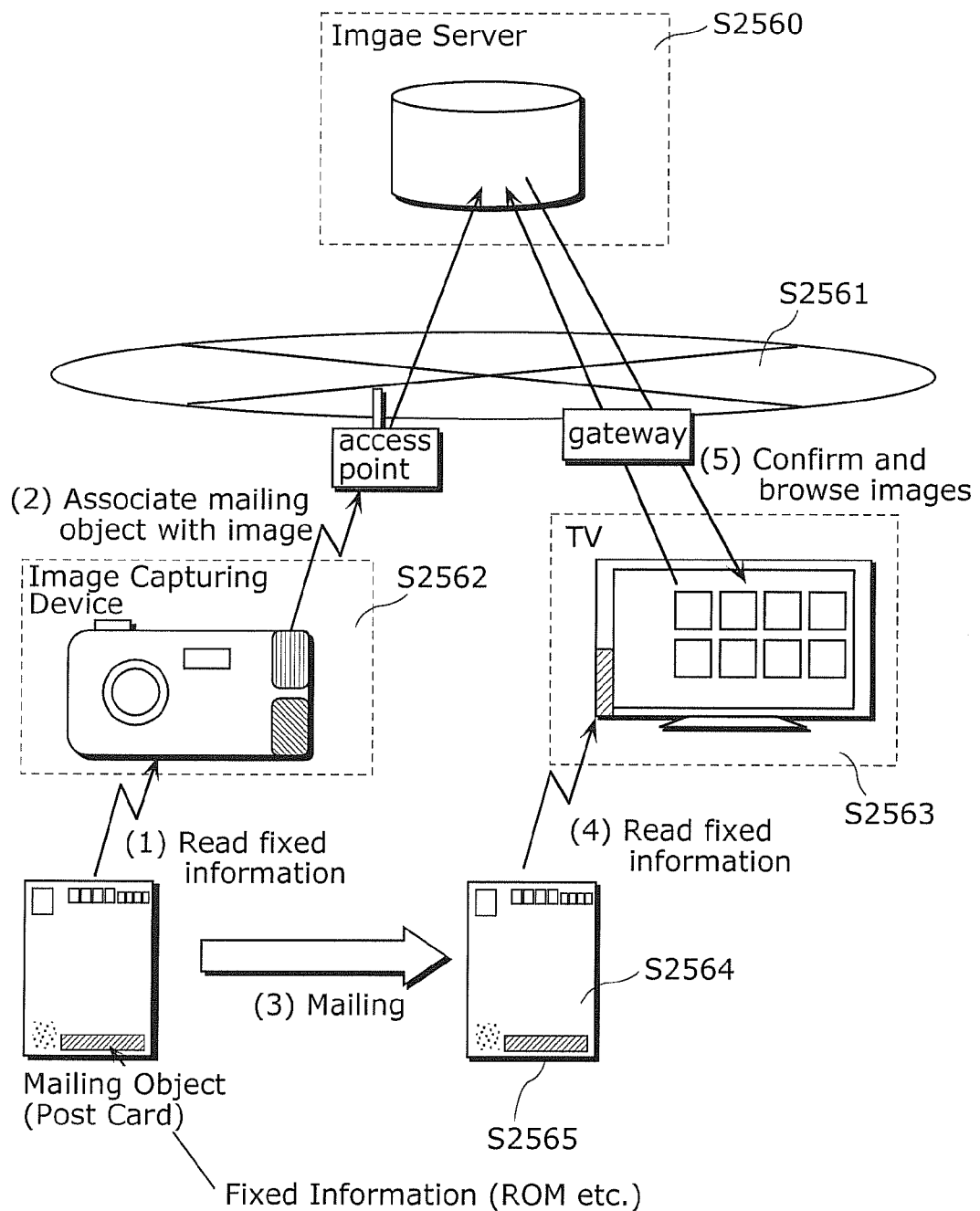
FIG. 63 is a block diagram of a system according to Embodiment A5.

FIG. 63 is a block diagram of a system according to Embodiment A5.

Embodiment A5 of the present invention has the following configuration. A mailing object such as a post card is written with fixed information. The image capturing device associates the fixed information with an image or a group of images (image data) stored in the server. A reproduction side reads the fixed information from the RF-ID attached to the post card or the like in order to display the image data associated with the fixed information. The configuration is illustrated in FIG. 63. Referring to FIG. 63, first, the image capturing device reads the fixed information from the mailing object, then associates the fixed information with an image(s), and registers information of the association (hereinafter, referred to as "association information) into the server. When the user receives the mailing object for which the registration is completed, the user brings the mailing object into proximity of a RF-ID reader of a TV to read the fixed information from the mailing object. The TV queries the server using the fixed information, and thereby displays the image(s) associated with the mailing object.

Embodiment A5 is characterized in that the RF-ID information in the mailing object is not rewritable (ROM) or in non-rewritable environments so that image data in the server is associated with the mailing object without rewriting the fixed information in the mailing object.

<Image Uploading and Mailing Object Associating by Image Capturing Device>

The images captured by the image capturing device are uploaded to the server using the method described in the prior embodiments. Here, an identifier is assigned to an uploaded image or image group. The identifier makes it possible to identify the image or an group of images stored in the server.

Figure 64:
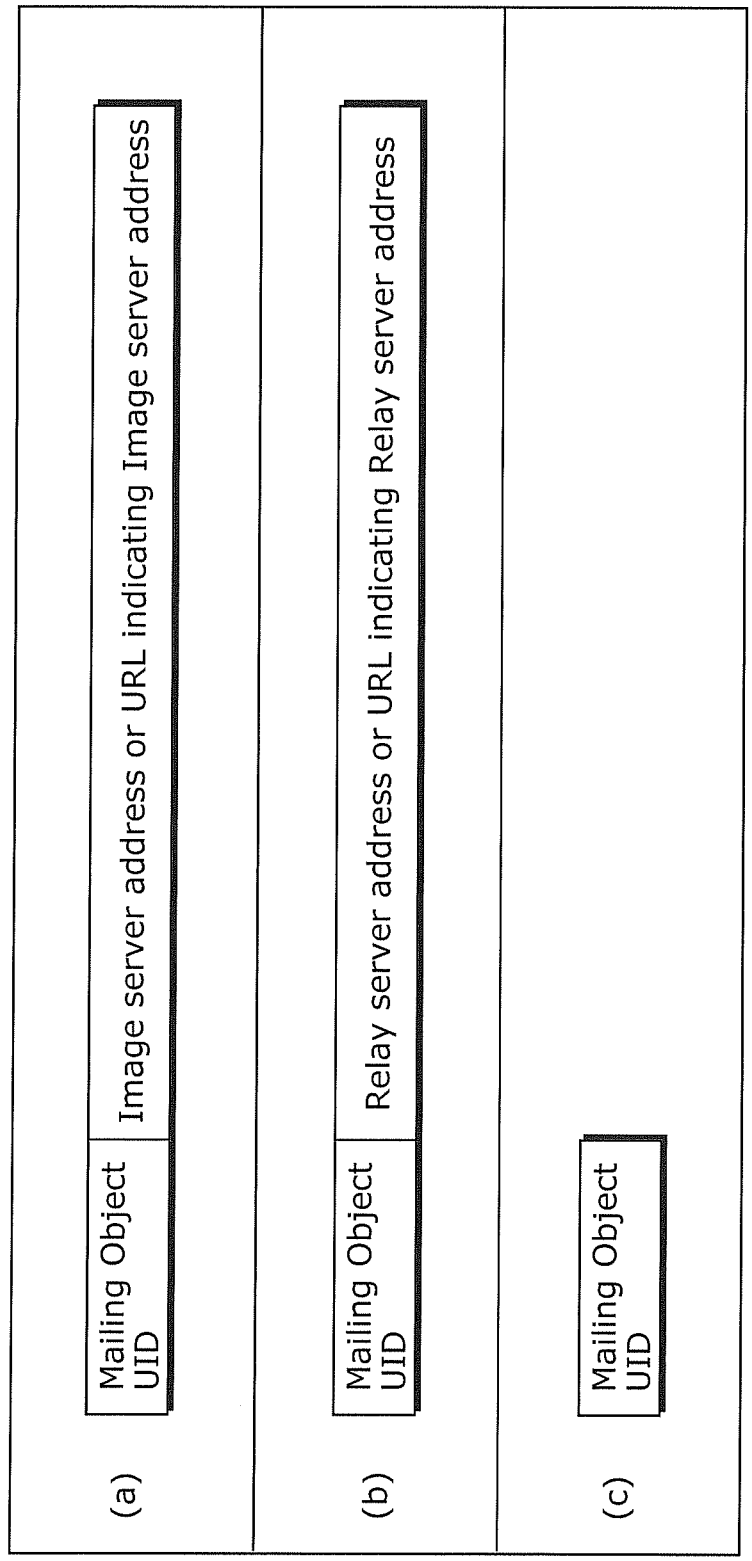
FIG. 64 is a diagram illustrating an example of fixed information of a mailing object according to Embodiment A5.

FIG. 64 is a diagram illustrating an example of fixed information of a mailing object according to Embodiment A5.

The following describes a method of associating (i) an image or image group which is captured and uploaded to the server by the image capturing device with (ii) fixed information recorded in a RF-ID tag of a mailing object. FIG. 64 illustrates examples of the fixed information recorded in the RF-ID tag of the mailing object. (a) in FIG. 64 illustrates fixed information including: mailing object UID unique to the mailing object; and information such as an address for accessing the image server. (b) in FIG. 64 illustrates fixed information including: the mailing object UID; and information such as an address for accessing a relay server. (c) in FIG. 64 illustrates fixed information including the mailing object UID only. The fixed information may also include a login ID, password information, and the like for accessing the server. It is assumed in Embodiment A5 that such information necessary to access the server is included in a URL including the address information.

Figure 65:
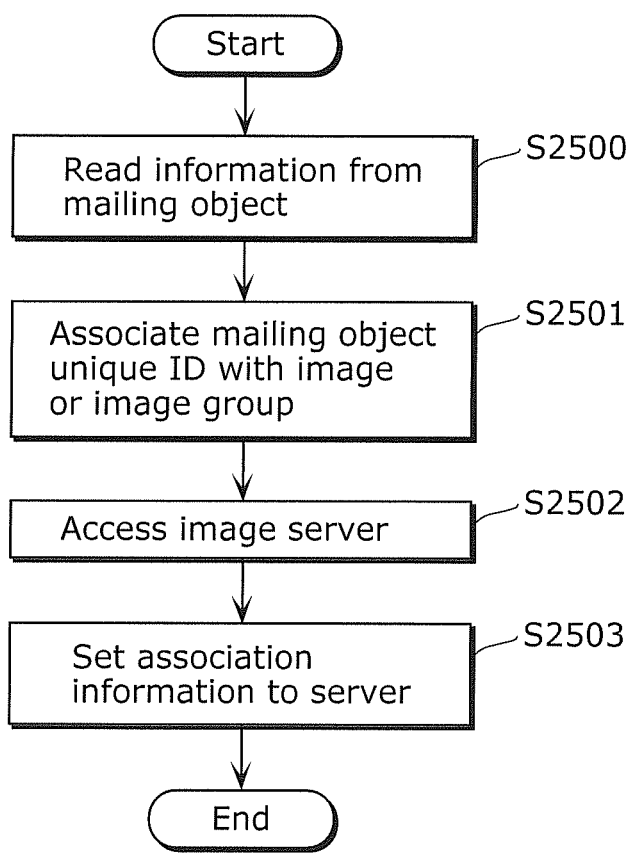
FIG. 65 is a flowchart of processing for associating an image capturing device with an image server, according to Embodiment A5.

FIG. 65 is a flowchart of processing performed by the image capturing device to associate the RF-ID with image data stored in the server, when the image capturing device has a RF-ID reader function.

First, the image capturing device reads information from the RF-ID of the mailing object by using the RF-ID reader (S2500). In more detail, the second antenna 21 illustrated in FIG. 3 communicates with the RF-ID of the mailing object, and thereby the data receiving unit 105 receives the fixed information from mailing object. Then, the second processing unit 95 performs processing to provide the fixed information of the mailing object to the first processing unit 35 via the recording unit 106, the second memory 52, and the recording/reproducing unit 51. The first processing unit 35 associates the mailing object UID read from the mailing object with an image or image group, according to designation from the user (S2501). Then, the image capturing device accesses the server 42 via the first antenna 20 (S2502). Thereby, the image capturing device registers, to the server 42, the association information regarding the association between the mailing object UID and the image data stored in the server 42 (S2503).

Figure 66:
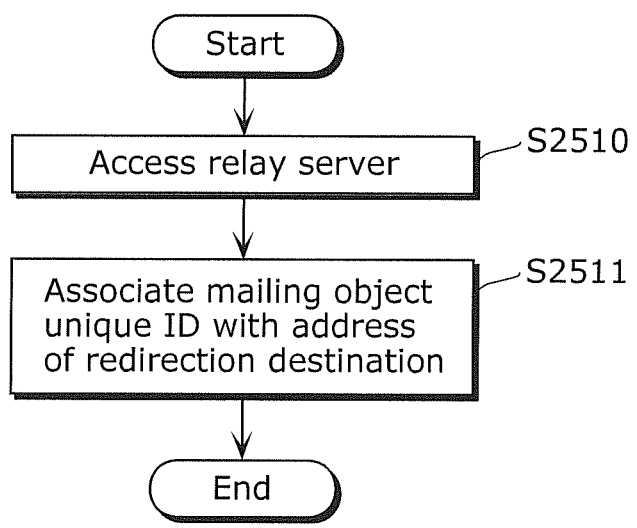
FIG. 66 is a flowchart of processing for registering the image capturing device with a relay server, according to Embodiment A5.

FIG. 66 is a flowchart of processing for registering the image capturing device with a relay server, according to Embodiment A5.

If the fixed information read from the mailing object includes an address of the image server or a URL including the address, then the processing is completed. On the other hand, if the fixed information read from the mailing object does not include an address of the image server or a URL including the address, the image capturing device sets a relay server (FIG. 66).

In order to set a relay server, the image capturing device accesses the relay server (S2510). In more detail, if the fixed information read from the mailing object includes an address of a relay server or a URL including the address, then the image capturing device accesses the relay server. Otherwise, the image capturing device accesses a relay server that is previously set for the image capturing device.

After accessing the relay server, the image capturing device sets, in a database of the relay server, association information regarding association between the mailing object UID and the server that is a redirection destination (transfer destination) (S2511). Thereby, association between the mailing object UID and an address of the transfer destination is registered in the database of the relay server.

If the image capturing device does not have a RF-ID reader function and the mailing object is printed with a two-dimensional code or the like indicating information of the RF-ID reader, the image capturing device captures an image of the two-dimensional code using an image capturing unit to read information from the code so that the image capturing device can obtain the same information as the fixed information recorded in the RF-ID unit of the mailing object. The two-dimensional code may be a QR Code™, a PDF417, Veri Code, Maxi Code, or the like. Any other code can be used if the image capturing device can read information from the code by capturing an image of the code. In addition, the same advantages as described in Embodiment A5 can be produced by using a bar-code in a one-dimensional direction only, although a printing area is increased.

Figure 67:
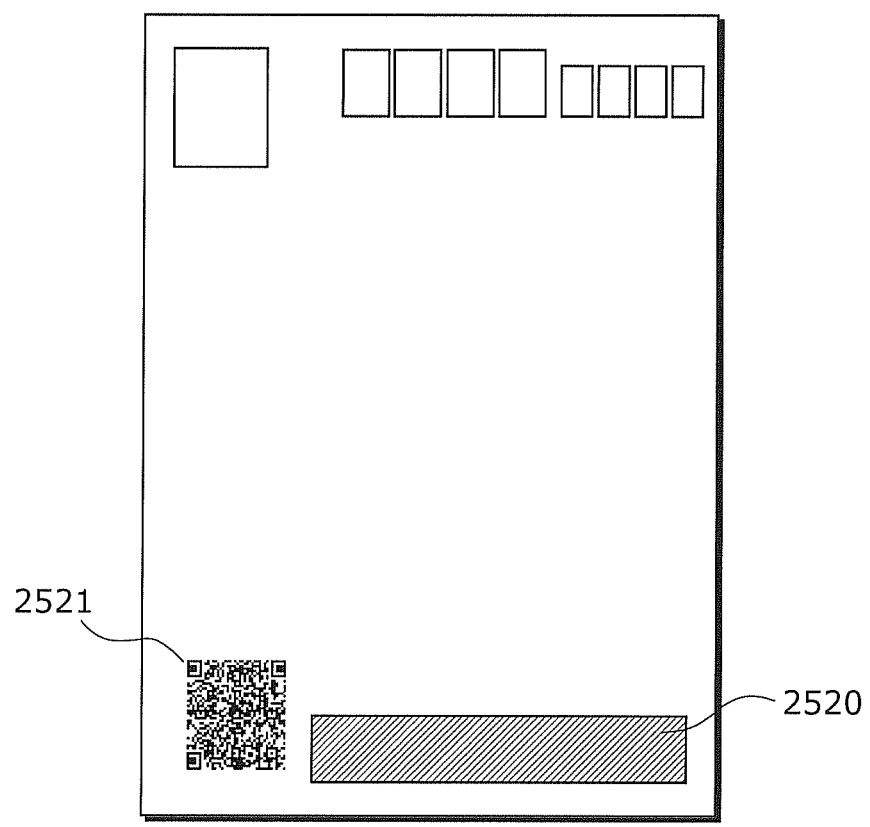
FIG. 67 is a diagram illustrating an example of a mailing object attached with a 2-dimensional code.

FIG. 67 is an example of the mailing object attached with a RF-ID unit 2520 and printed with a two-dimensional code 2521 indicating the same information as that recorded on the RF-ID unit 2520.

A flow of processing data when the two-dimensional code is read by the image capturing device is described with reference to the block diagram of FIG. 3. The two-dimensional code printed on the mailing object is captured by the image capturing unit 30, then converted into an imaged by the video processing unit 31, and provided to the first processing unit 35 via the recording/reproducing unit 32. The first processing unit 35 analyzes the captured two-dimensional code and retrieves the information from the two-dimensional code. The information indicated by the two-dimensional code is basically the same as the information recorded in the RF-ID unit. The information indicated by the two-dimensional code includes at least the mailing object UID.

Figure 68:
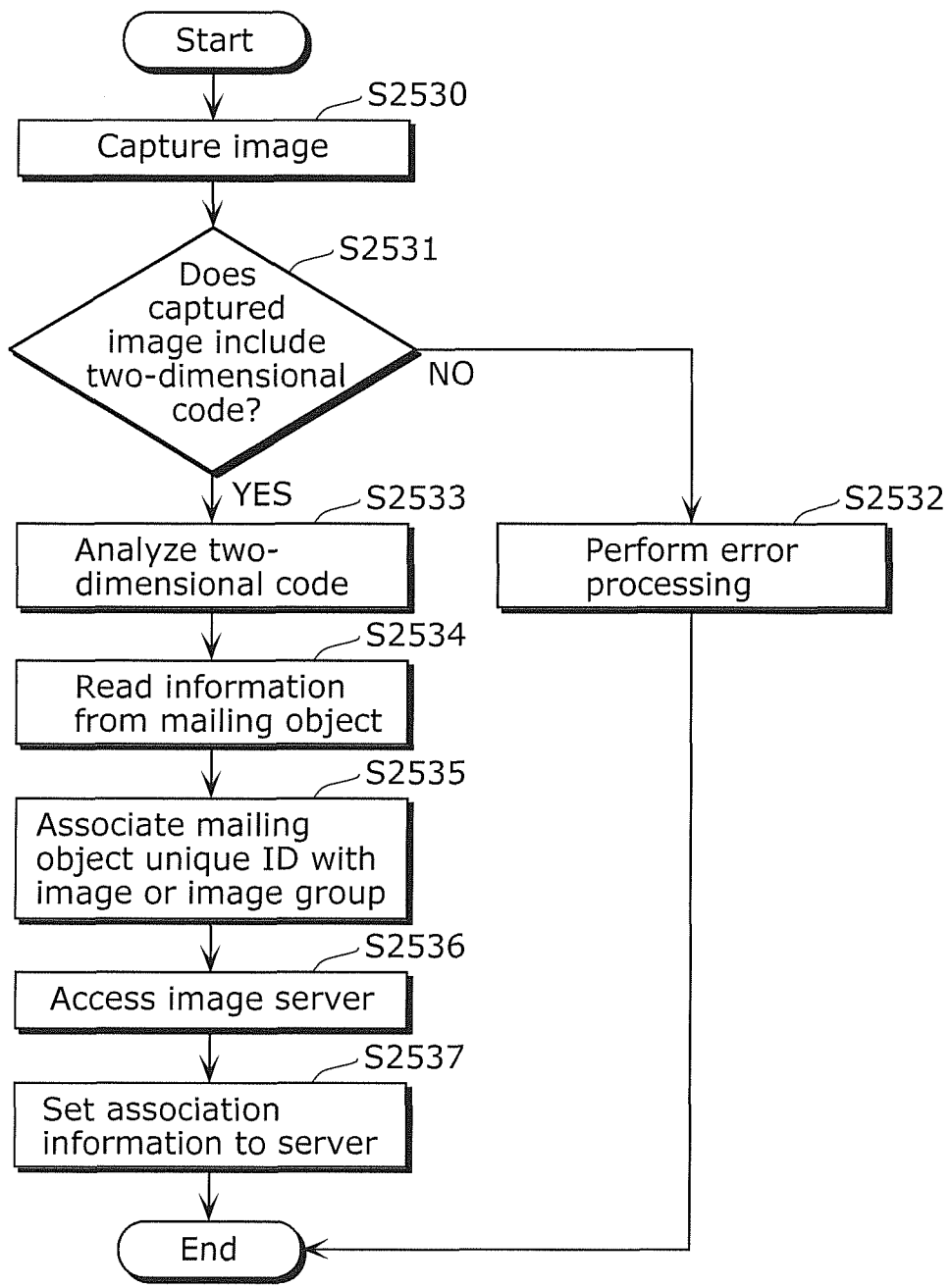
FIG. 68 is a flowchart of processing using a 2-dimensional bar-code of the image capturing device according to Embodiment A5.

FIG. 68 is a flowchart of processing using a 2-dimensional bar-code of the image capturing device according to Embodiment A5.

The following describes a flow of the processing from reading the information of the two-dimensional code to associating the information with an image or image group in the server with reference to FIG. 68.

Firstly, the image capturing unit captures an image of the two-dimensional code (S2530). Then, it is determined whether or not the captured image is a two-dimensional code (S2531). If the captured image is not a two-dimensional code, then error processing is performed (S2532). Or, normal image capturing processing may be performed. On the other hand, if the captured image is a two-dimensional code, then the two-dimensional code is analyzed (S2533). Thereby, information is read from the mailing object based on the result of the analysis (S2534). After reading the fixed information from the mailing object, the image capturing device associates the mailing object UID with image data stored in the server (S2535). Then, the image capturing device accesses the server (S2536). Then, the image capturing device sets the association information to the server (S2537). The Steps S2535 to S2537 are the same as the Steps S2501 to S2503 in FIG. 65. Here, if the readout information does not include an address of the image server or a URL including the address, then the image capturing device performs transfer setting to a relay server. The transfer setting to the relay server has been previously described with reference to FIG. 66.

As described above, by reading information from the two-dimensional bar-code printed on the mailing object, it is possible to complete to associate the information recorded on the RF-ID unit with image data stored in the server.

If the image capturing device does not have a RF-ID reader function and the mailing object is not printed with a code such as a two-dimensional code, the image capturing device can read information from the mailing object if the user manually inputs, to the image capturing device, the mailing object UID and the URL such as a sever address which are printed on the mailing object. The user inputs the information using buttons 7 to 15 illustrated in FIG. 2. In this aspect, the URL and the mailing object UID may be printed directly as a plane text or coded to be a code which the user easily inputs.

As described above, even if the image capturing device does not have a RF-ID reader function and the mailing object is not printed with a two-dimensional code, it is possible to associate the mailing object with image data stored in the server.

<Image Reproducing and Viewing by Using RF-ID on Mailing Object>

Next, the steps for viewing images stored in the server on the TV using the mailing object for which association is completed.

Figure 69:
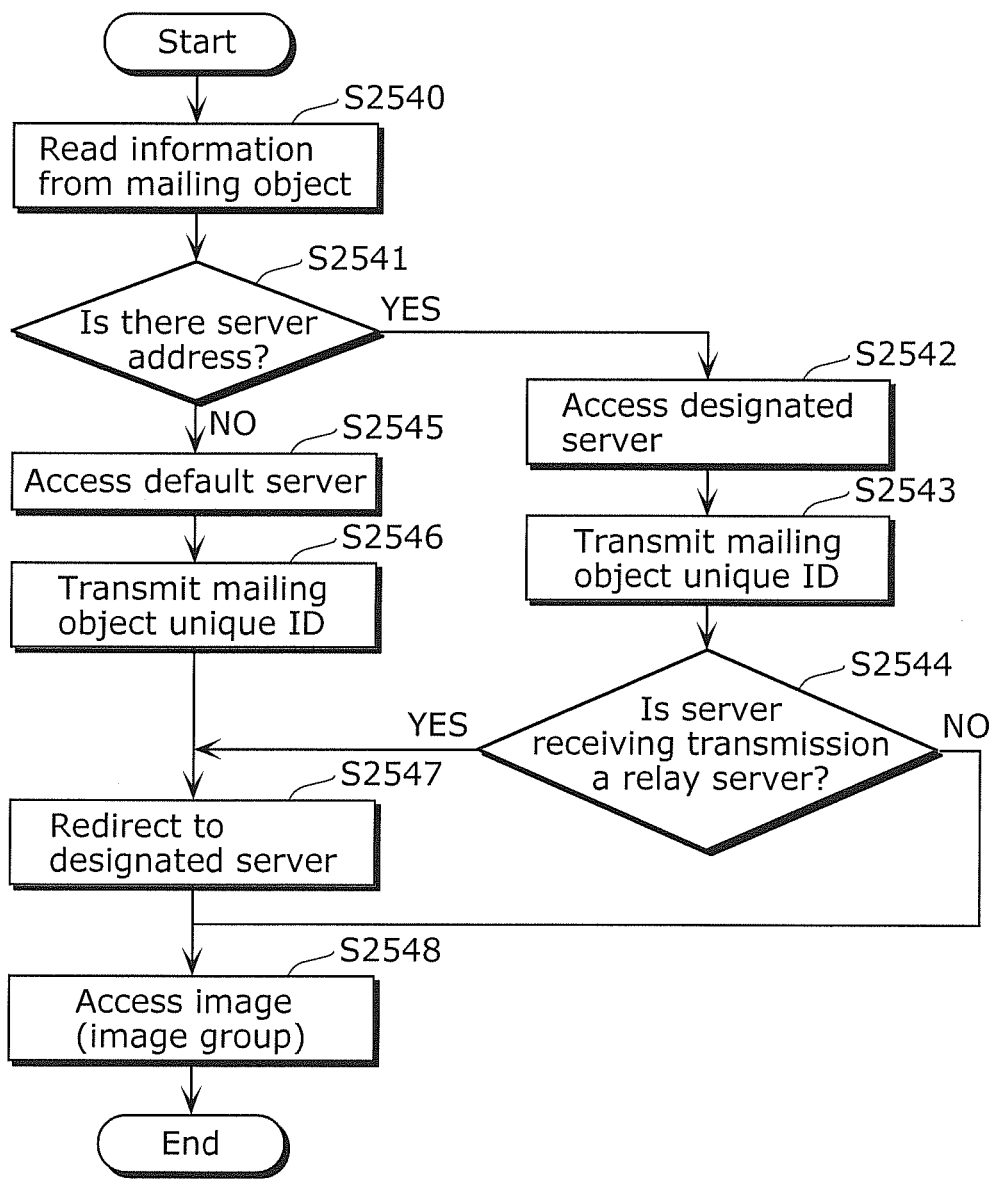
FIG. 69 is a flowchart of processing performed by a TV according to Embodiment A5.

FIG. 69 is a flowchart of processing performed by the TV to read RF-ID from the mailing object and eventually access the image server.

When the user brings the mailing object into proximity of the RF-ID reader of the TV, the TV reads information of the RF-ID on the mailing object (S2540). Then, a determination is made as to whether or not the readout information includes a sever address or a URL including the server address (S2541). If the readout information includes a sever address or a URL including the sever address, then the TV accesses the designated server (S2542). Then, the TV transmits the mailing object UID (S2543). Then, a determination is made as to whether or not the server receiving the transmission is a relay server (S2544). If the server is a relay server, then the relay server redirects to a server (the image sever) designated in the relay server (S2547). Thereby, the TV accesses an image or image group in the image server (S2548). On the other hand, if it is determined at S2544 that the server receiving the transmission is the image server, then redirecting is not performed and access to the image server is performed (S2548). Moreover, if it is determined at S2541 that the read-out information does not include a sever address, then the TV accesses a server set by a predetermined default (S2545). Then, the TV transmits the mailing object UID to the default server (S2546). The default server redirects to a server (the image server) designated in the default server (S2547) to access the image server.

Here, if association between the mailing object UID and the designated server as a destination of the relay is not registered in a database of the relay or default server, the relay or default server redirects to an error page.

Figure 70:
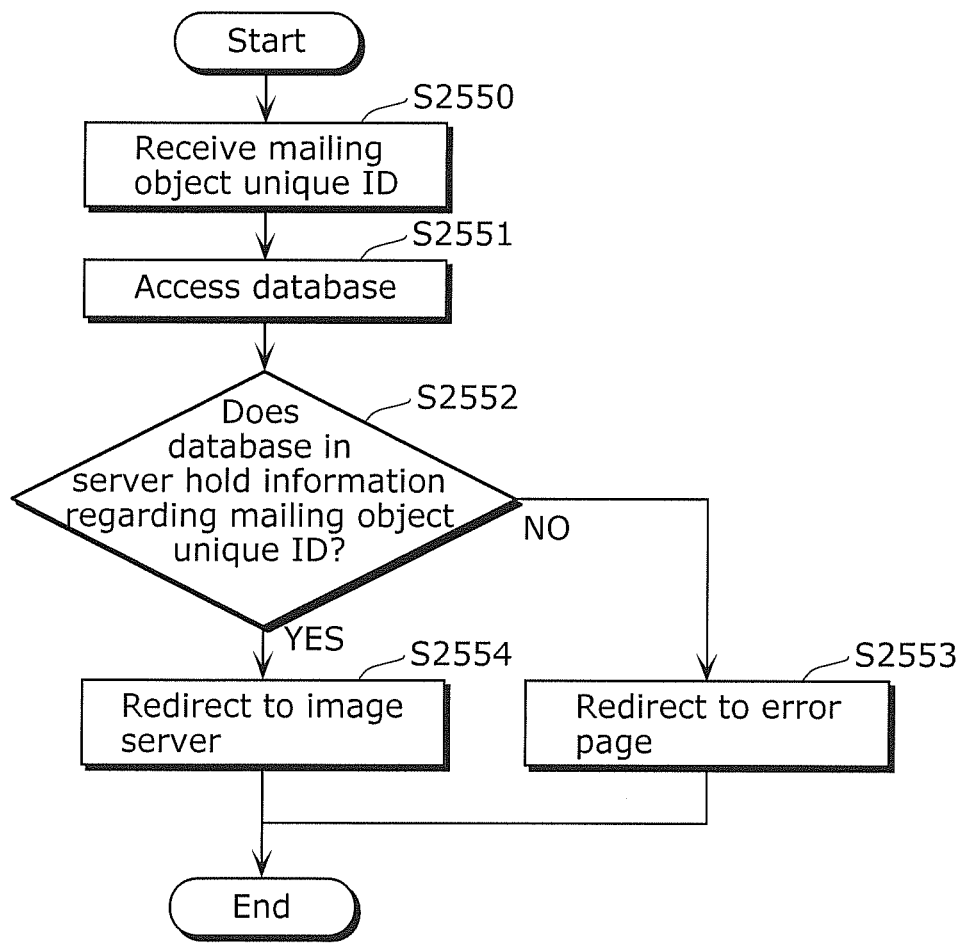
FIG. 70 is a flowchart of processing performed by the relay server according to Embodiment A5.

FIG. 70 is a flowchart of processing performed by the relay or default server after receiving the mailing object UID.

When the relay or default server receives the mailing object UID (S2550), the server searches its database for information regarding the mailing object UID (S2551). Then, the relay or default server determines whether or not the database holds information regarding the mailing object UID (S2552). If the database holds the information, then the relay or default server redirects to a server associated with the mailing object UID in the database (S2554). On the other hand, if the database does not hold the information (in other words, if there is no association), then the relay or default server redirects to an error page (S2553).

As described above, the mailing object having fixed information in the RF-ID is previously associated with image data stored in the image server. Thereby, when the mailing object with the association is presented to the TV, the user can view an image or image group in the server which is associated with the mailing object UID, without rewriting of the RF-ID of the mailing object. Therefore, even if the user is away from home and cannot rewrite the RF-ID of the mailing object, or even if the RF-ID of the mailing object is not rewritable, the user can associate images in the server with the mailing object. As a result, the user allows a person receiving the mailing object to view the images associated with the mailing object.

It should be noted that it has been described in Embodiment A5 that the mailing object UID is transmitted after accessing the server. However, it is also possible to generate a URL from the mailing object UID and the sever address recorded on the mailing object in order to access the server. In this aspect, it is possible to perform the access to the server and the transmission of the mailing object UID at the same time.

According to Embodiment A5, even in an environment where the RF-ID cannot be rewritten, such as in a sight-seeing location, for example, the user can associate captured images with a post card and send the post card to a friend. Thereby, the friend receiving the post card presents the post card to a TV to view the images the user captured in the sight-seeing location. As explained above, even in an environment where the RF-ID cannot be rewritten, the user can create a mailing object associated with images in the server and then send the mailing object to a person to which the user desires to show the images.

If the image capturing device has a RF-ID writer function to rewrite the RF-ID of the mailing object, the processing is the same as processing performed by the TV for associating the mailing object with image data in the server, which will be described below in Embodiment A6. Therefore, the processing is not described in Embodiment A5.

Embodiment A6

In Embodiment A6, the following configuration is described. The image capturing device captures images and uploads the images to the image server. Then, a user transmitting the images (hereinafter, referred to as a "sending user") selects an image group from the images in the server. Information for accessing the selected image group is recorded in the RF-ID on the mailing object. The mailing object is mailed to a user receiving the images (hereinafter, referred to as a "receiving user"). The receiving user accesses the image group in the image server by using the RF-ID on the mailing object.

Figure 71:
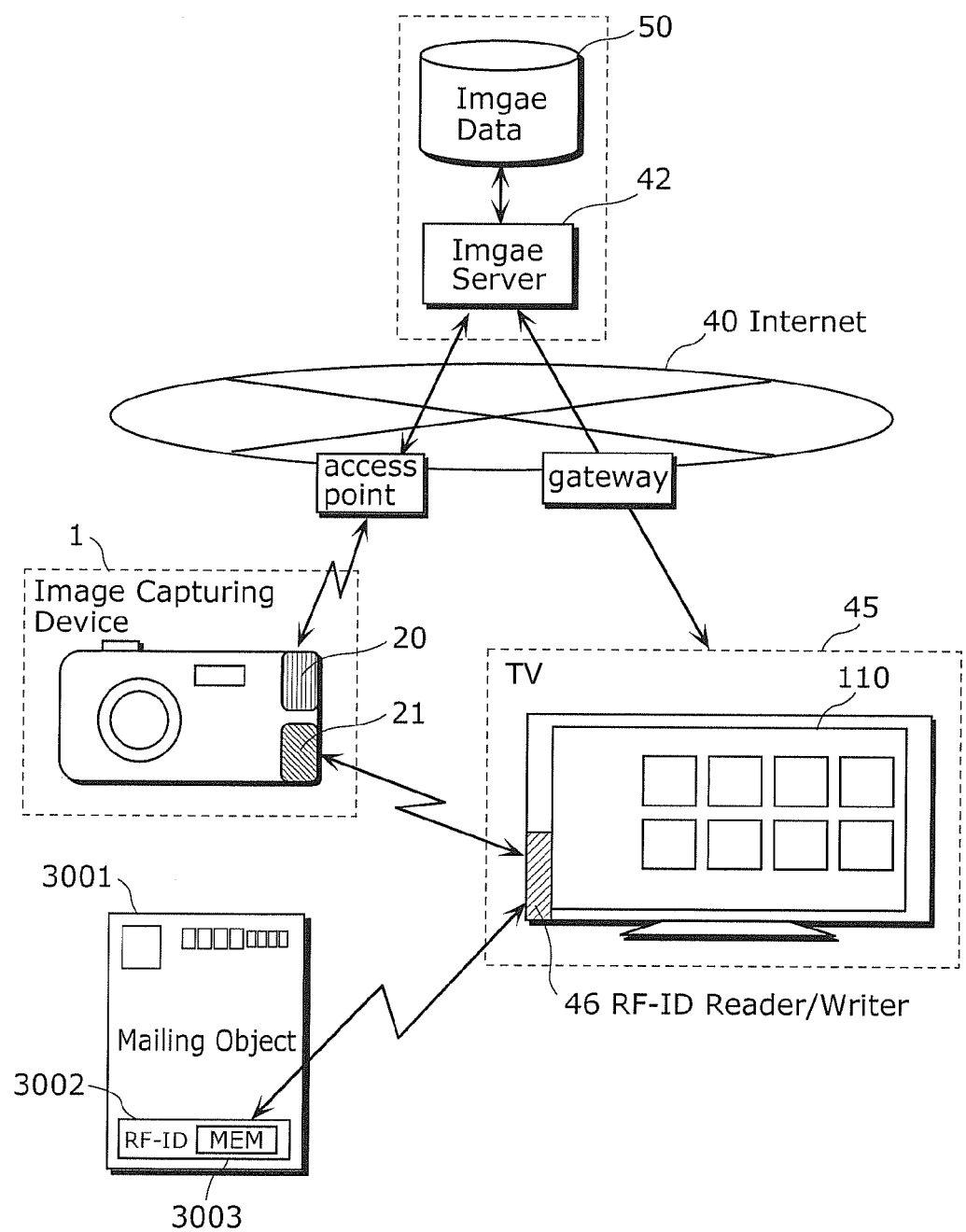
FIG. 71 is a schematic diagram of an image transmitting side according to Embodiment A6.

FIG. 71 is a schematic diagram of a configuration of an image transmission side according to Embodiment A6 of the present invention.

Figure 72:
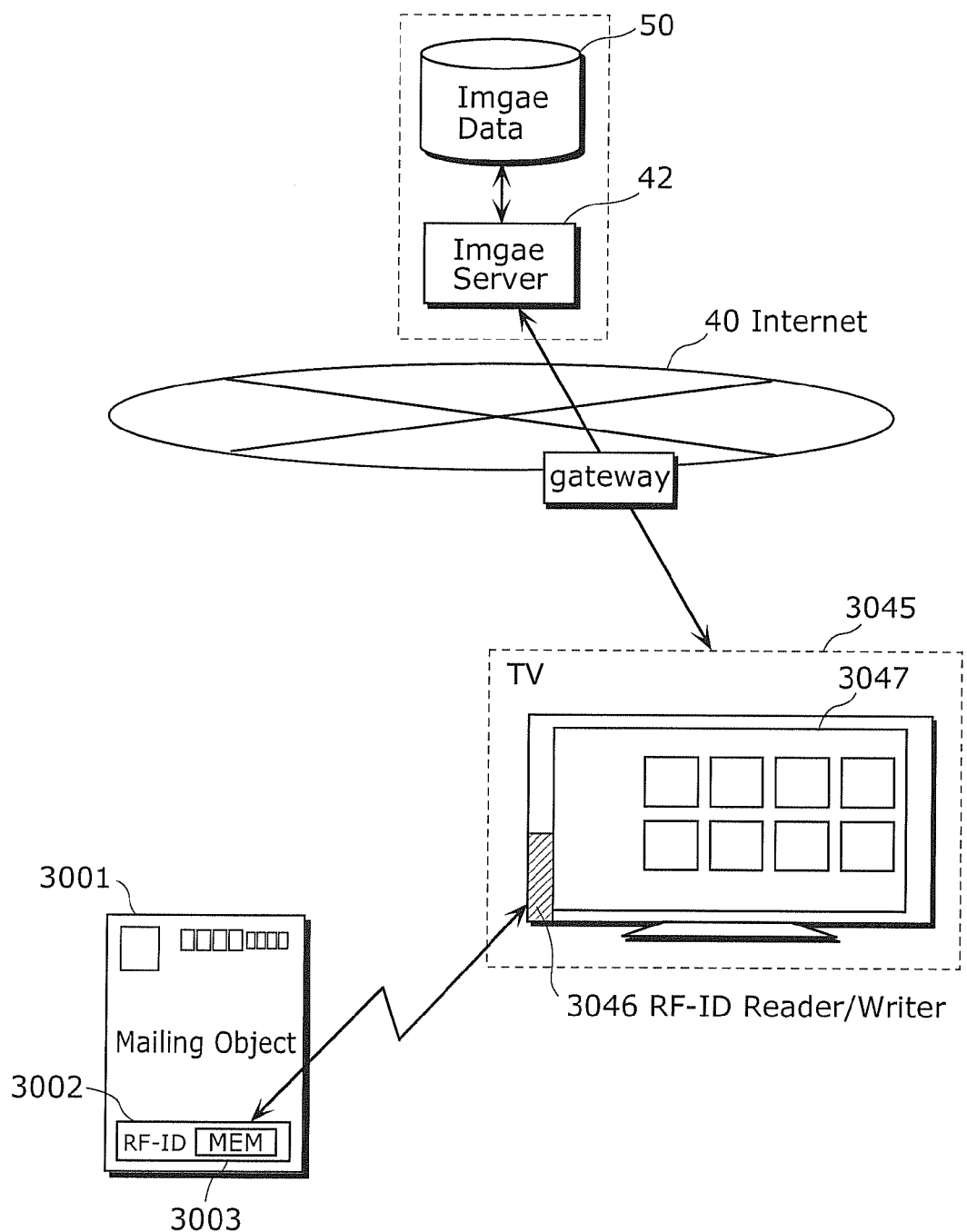
FIG. 72 is a schematic diagram of an image receiving side according to Embodiment A6.

FIG. 72 is a schematic diagram of a configuration of an image receiving side according to Embodiment A6 of the present invention.

Here, the same reference numerals of FIGS. 1 and 3 are assigned to the identical elements of FIGS. 71 and 72, so that the identical elements are not explained again below.

In FIGS. 71 and 72, a mailing object 3001 is a post card, envelope, or letter paper which is mailed from the image transmission side to the image receiving side. A RF-ID unit 3002 is a rewritable RF-ID. At least part of the RF-ID unit 302 is a rewritable memory unit 3003. The RF-ID unit 3002 is attached to or incorporated into the mailing object 3001 in order to be sent to the image receiving side together with the mailing object.

As described in the prior embodiments, the memory unit 3003 in the RF-ID unit 3002 holds the medium identification information for identifying that the medium having the RF-ID unit 3002 is a mailing object.

Referring to FIG. 72, a TV 3045 is a TV display device provided in the image receiving side. The TV 3045 has the same function as that of the TV 45 in FIG. 71 described in the prior embodiments. Like the TV 45 in FIG. 71, the TV 3045 includes a RF-ID reader/writer 3046 (corresponding to the RF-ID reader/writer 46 in FIG. 71) and a display unit 3047 (corresponding to the display unit 110 in FIG. 71). The TV 3045 is connected to the Internet 40 via a network connection means not shown.

Next, the processing performed by the above configuration is described.

<Image Group Selecting and Mailing Object Writing by Image Transmission Side>

In the image transmission side in FIG. 71, images captured by the image capturing device 1 are transmitted to a wireless access point via the first antenna 20 in the image capturing device 1 used for wireless communication, such as a wireless LAN or WiMAX. The images are recorded as the image data 50 onto the image server 42 via the internet 40. Then, the image capturing device 1 is moved into proximity of the RF-ID reader/writer 46 of the TV 45 in order to establish connection with the TV 45 by wireless communication via the second antenna 21 of the image capturing device 1 used for RF-ID. The TV 45 obtains, from the image capturing device 1, information for accessing the image data 50 in the image server 42. Then, the TV 45 downloads the images of the image data 50 to be displayed on the display unit 110. The above processing is the same as described in the prior embodiments. The above is just a summary.

Next, the sending user checks the images displayed on the display unit 110 of the TV 45 in order to set transmission image selection information indicating whether or not each of the images is to be transmitted to the receiving user (in other words, whether or not each of the images is to be permitted to be viewed by the receiving user). The sending user can set also restriction on display for the receiving user, utility form information such as a slide show and printing, which is described in the prior embodiments. The transmission image selection information and the utility form information are transmitted to and recorded onto the image server. The image server manages, as an image group, a set of images selected as transmission images in the transmission image selection information.

Figure 73:
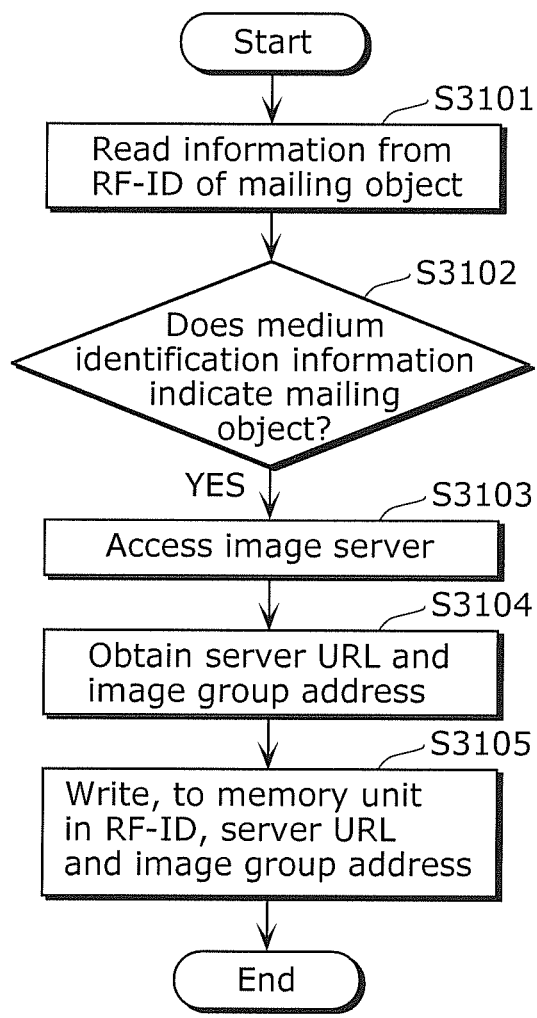
FIG. 73 is a flowchart of processing performed by a TV transmitting image according to Embodiment A6.

FIG. 73 is a flowchart of processing performed by a TV transmitting image according to Embodiment A6.

The following describes steps performed by the TV 45 for recording, onto the mailing object 3001, information regarding the image group selected by the sending use, with reference to a flowchart of FIG. 73.

It is assumed that transmission images have been selected and an image group set with the utility form information has been generated. Under the assumption, the sending user brings the mailing object 3001 having the RF-ID unit 3002 into proximity of the RF-ID reader/writer 46 of the TV 45 in order to establish wireless communication between the RF-ID unit 3002 and the RF-ID reader/writer 46.

When the TV 45 becomes able to communicate with the RF-ID unit 3002 on the mailing object 3001 via the RF-ID reader/writer 46, the TV 45 reads information from the memory unit 3003 (S3101). Then, the TV 45 determines whether or not the medium identification information indicates that the current communication partner is a mailing object (S3102). If the current communication partner is a mailing object, then the TV 45 proceeds to steps for writing to the mailing object. Here, if it is determined at Step S3102 that the current communication partner is not a mailing object, then the subsequent steps are not described here but the TV 45 proceeds to steps depending on a medium indicated by the medium identification information.

In order to write to the mailing object 3001, first, the TV accesses the image server 42 via the internet 40 (S3103). Thereby, the TV 45 obtains, from the image server 42, image group designation information, such as a server URL and an image group address, for allowing the image receiving side to access the image group in the image server 42 (S3104).

The TV 45 transmits the obtained image group designation information to the RF-ID unit 3002 on the mailing object 3001 via the RF-ID reader/writer 46 of the TV 45 in order to write the image group designation information to the memory unit 3003 in the mailing object 3001, and the RF-ID unit 3002 on the mailing object 3001 records the image group designation information to a rewritable region of the memory unit 3003 (S3105).

As described above, the mailing object 3001 on which the image group designation information is recorded is mailed by the sending user to a user of the image receiving side.

<Image Reproducing and Viewing by Image Receiving Side>

Figure 74:
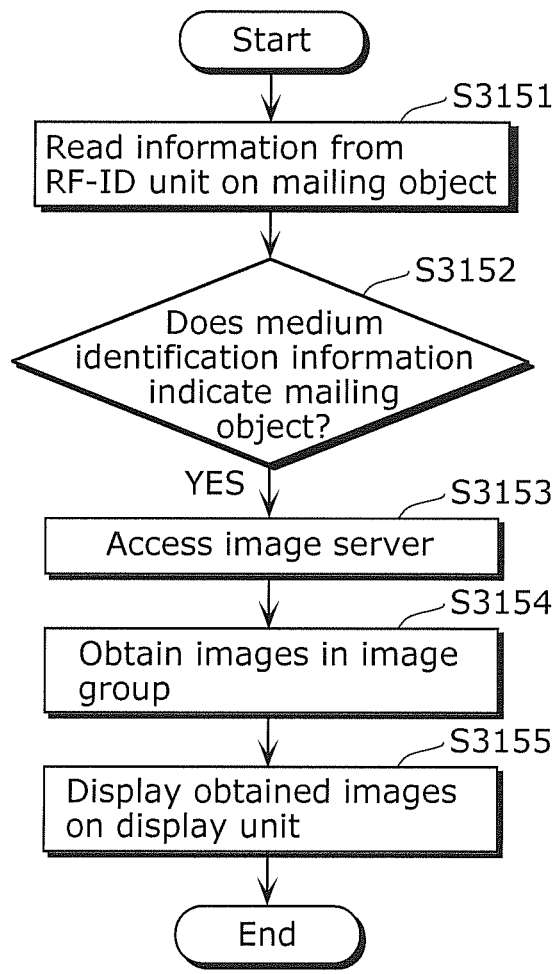
FIG. 74 is a flowchart of processing performed by a TV receiving image according to Embodiment A6.

FIG. 74 is a flowchart of processing performed by a TV receiving image according to Embodiment A6.

Next, the image receiving side is described with reference to FIG. 72 illustrating the schematic block diagram of the image receiving side and FIG. 74 illustrating a flowchart of processing performed by the TV in the image receiving side.

Referring to FIG. 72, the receiving user receives the mailing object 3001 from the sending user. Then, the receiving user checks the RF-ID unit 3002 or characters or design indicated on the mailing object 3001 to determine whether the mailing object is incorporated with a means for accessing images. Here, the receiving user needs only to understand that the receiving user can access to the images by using the mailing object 3001. The receiving user does not need to care about the image group designation information and the like in the RF-ID unit 3002.

In order to reproduce and view the images, the receiving user brings the mailing object 3001 into proximity of the RF-ID reader/writer 3046 of the TV 3045 in the image receiving side so as to start viewing of the images.

If the RF-ID unit 3002 on the mailing object 3001 is in enough proximity of the RF-ID reader/writer 3046 of the TV 3045, the RF-ID reader/writer 3046 supplies power to the RF-ID unit 3002 of the mailing object 3001 via antennas (not shown) of both the RF-ID reader/writer 3046 and the RF-ID unit 3002 in order to activate the RF-ID unit 3002. Thereby, wireless communication between the TV 3045 and the RF-ID unit 3002 of the mailing object 3001 starts. When the wireless communication starts, the TV 3045 reads information from the memory unit 3003 of the RF-ID unit 3002 (S3151).

A determination is made as to whether or not the medium identification information in the readout information indicates that the current communication partner is a mailing object (S3152). If the current communication partner is a mailing object, then the TV 3045 proceeds to processing of reading the image group designated by the sending user from the image server 42.

The access to the image server 42 makes it possible to generate an URL for accessing the image group in the image server 42 by using the image group designation information in the information read by the RF-ID unit 3002 at Step S3151, such as an image group address, and thereby to access the image server 42 via the internet 40 (S3153).

The TV 3045 connected to the image server 42 at the above step obtains the images (the image group) which are permitted to be displayed, from among the image data 50 in the image server 42, based on the transmission image selection information indicating the image group managed by the image server 42 (S3154). Then, the TV 3045 displays the images on the display unit 110 (S3155).

Furthermore, according to the transmission image selection information indicating the image group managed by the image server 42 and the utility form information, the receiving user can use functions of, for example, reproducing the images as a slide show, printing the images, and downloading the images to a recording medium (not shown) attached to the TV 3045 or connected to the outside.

In addition, for image printing, the user can print the images by the printer on a LAN (not shown), and also ask, via the Internet 40, a photograph print service provider to print the images.

As described above, with the above configuration according to Embodiment A6 of the present invention, the image group designation information is provided from the RF-ID unit 3002 on the mailing object 3001 to the TV 3045 in the image receiving side. Therefore, the receiving user does not need to input characters of a network access destination to obtain images, for example. In other words, the intuitive and simple operation of simply bringing the mailing object 3001 into proximity of the TV 3045 enables the receiving user to access the image data 50 stored in the image server 42. As a result, the receiving user can obtain images from the image server, without knowledge of complicated operations such as menu selection and character inputs.

It should be noted that it has been described in Embodiment A6 that the mailing object 3001 is previously attached or incorporated with the RF-ID unit 3002. However, the mailing object may be a general post card or letter paper attached with an independent RF-ID unit 3002 that is provided separately. In this aspect, the above effect can be produced by later attaching the RF-ID unit to the mailing object. This produces further advantages that the sending user can use Embodiment A6 for any desired mailing object.

It should also be noted that, if the access to the image server 42 requires a login operation, a server login ID and a server login password may also be written at Step S3105 into the rewritable region of the memory unit 3003 in the RF-ID unit 3002 on the mailing object 3001. Here, it is desirable that the login ID and the login password are not plane texts but are written in an encrypted format for security.

It should also be noted that it has been described in Embodiment A6 that the TV 45 in the image transmission side performs selection of transmission images, setting of the utility form information, and writing of the image group designation information to the RF-ID unit 3002 on the mailing object 3001. However, it is also possible that the image capturing device 1 having a RF-ID reader/writer function performs setting of the transmission image selection information and the utility form information and writing of the image group designation information, in order to produce the same effect as described above for obtaining images by the simple operation of the receiving user.

Variation of Sixth Embodiment

Figure 75:
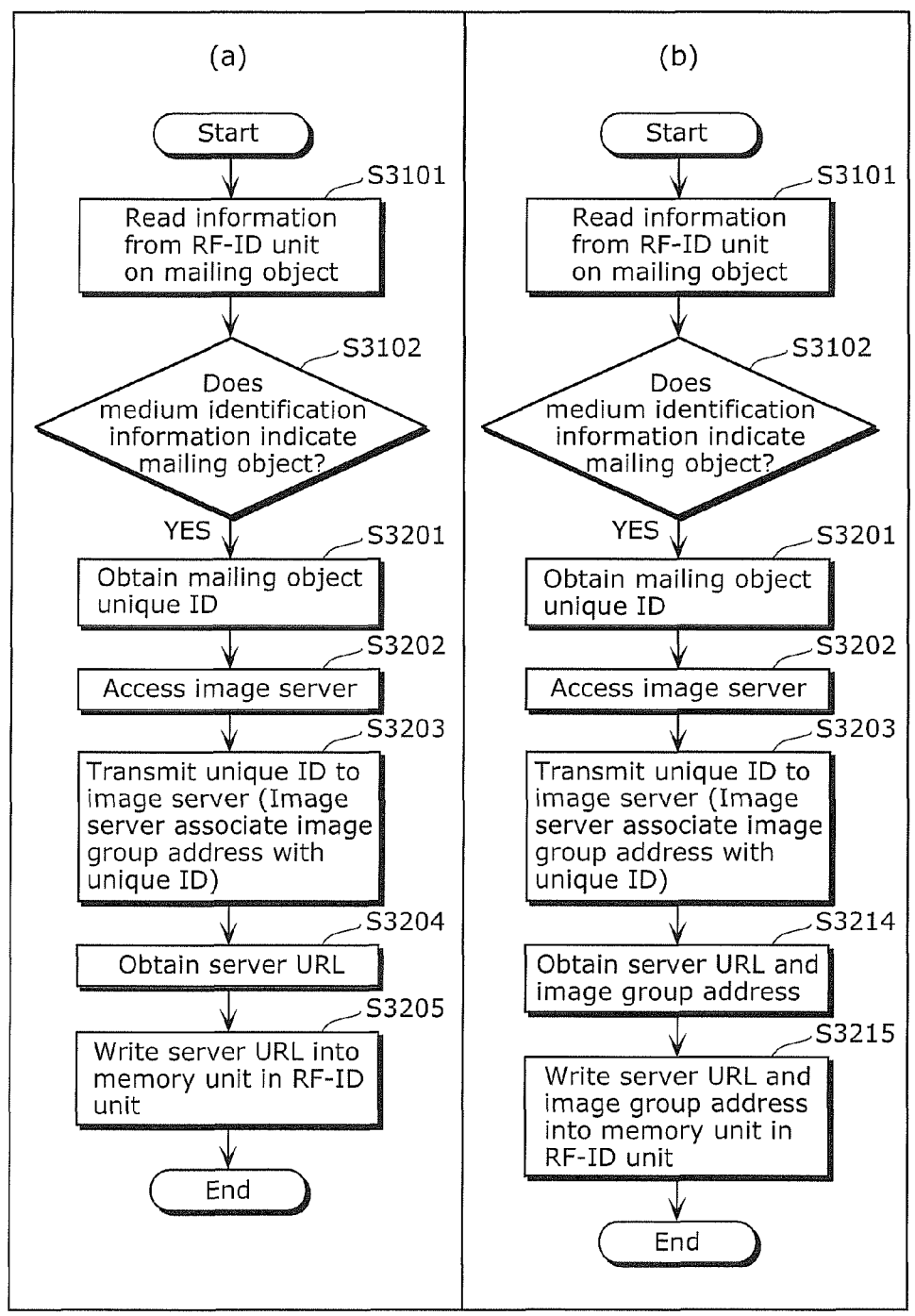
FIG. 75 is a flowchart of another example of processing performed by the TV transmitting image according to Embodiment A6.

FIG. 75 is a flowchart of processing performed by the TV 45 in the image transmission side according to a variation of Embodiment A6 of the present invention.

Here, the same step numerals of FIG. 73 are assigned to the identical steps of FIG. 75, so that the identical steps are not explained again below.

According to the variation of Embodiment A6, the mailing object UID is previously recorded on the memory unit 3003 of the RF-ID unit 3002 on the mailing object 3001. Here, it is desirable to record the mailing object UID on a ROM region of the memory unit 3003 in order to reduce risks of data damages or data manipulation caused by accidental operations.

Figure 76:
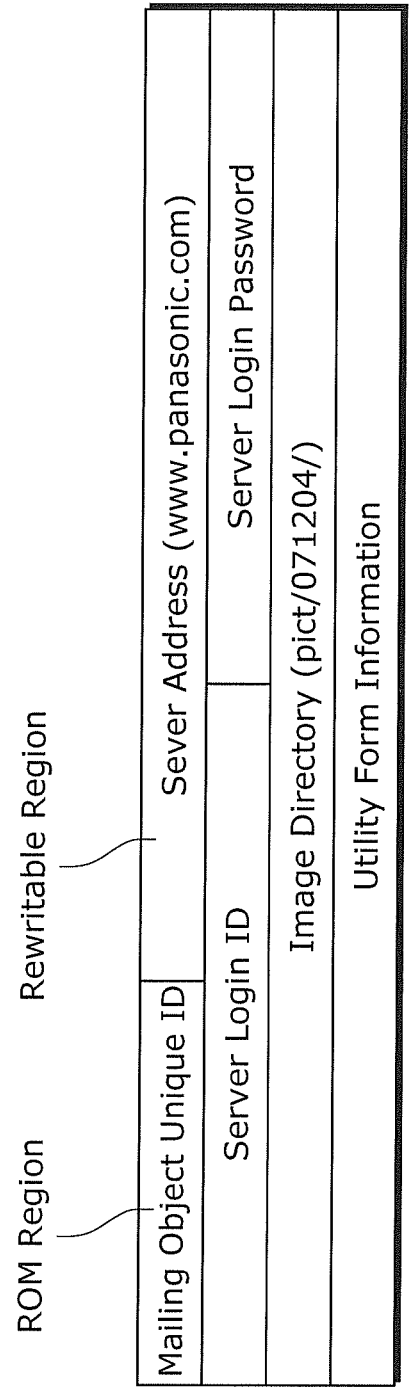
FIG. 76 is a table of an example of information recorded in a mailing object memory unit according to Embodiment A6.

FIG. 76 is a table of an example of information recorded in a mailing object memory unit according to Embodiment A6.

FIG. 76 illustrates a diagram of an example of a data structure of the memory unit 3003.

The TV 45 in the image transmission side sets the transmission image selection information and the utility form information into the above-described RF-ID unit in order to designate an image group in the image serve 42. In this situation, the TV 45 performs processing according to the flowchart of (a) in FIG. 75.

The TV 45 reads information from the RF-ID unit 3002 on the mailing object 3001 (S3101) and determines based on the medium identification information that the communication partner is a mailing object (S3102). After that, the TV 45 obtains the mailing object UID. The mailing object UID may be the information read at Step S3101 or be newly obtained from the RF-ID unit 3002. Next, the TV 45 accesses the image server 42 via the Internet 40 (S3202). The TV 45 transmits the mailing object UID to the image server 42, and thereby the image server 42 associates with the transmitted mailing object UID with an address of the image group and then stores the manages information of the association (association information) (S3203).

The TV 45 obtains, from the image server 42, the server URL enabling the image receiving side to access the image server 42 (S3204). The obtained server URL is written into the rewritable region of the memory unit 3003 in the RF-ID unit 3002 on the mailing object 3001 via the RF-ID reader/writer 46 (S3205).

As described above, if the image server associates the image group with the mailing object UID and then stores and manages the association information, the utility form information can be managed separately for each mailing object UID. Therefore, in the situation where there are a plurality of the mailing objects 3001, it is possible to change an operation for receiving images for each mailing object, namely, for each different receiving user.

If, in the configuration described in Embodiment A6, the image receiving side designates an image group for each mailing object, generates a different image group address for each designated image group, and writes the image group address into a corresponding RF-ID unit, the image transmission side needs complicated operations for designating image groups separately although the same advantages as those of Embodiment A6 can be obtained.

Therefore, when the sending user selects the same transmission image group for a plurality of mailing objects, it is preferable that the sending user records and manages different utility form information for each mailing object by using the mailing object UID as described earlier. Thereby, it is possible to reduce operations of the sending user, and to reduce a memory capacity of the image server because it is not necessary to hold pieces of the transmission image selection information separately, thereby producing further advantages.

The processing of (b) in FIG. 75 differs from the processing of (a) in FIG. 75 in that Steps S3204 and S3205 are replaced by Steps S3214 and 3215. At Step 3214, the TV 45 obtains an image group address in addition to the server URL. At Step S3215, the TV 45 writes the image group address together with the server URL into the memory unit 3003 of the RF-ID unit 3002.

Thereby, when the image receiving side is to receive images, the image receiving side accesses the designated image group in the image server 42. Here, the access is permitted only when the mailing object UID of the image group stored and managed in the image server matches the mailing object UID used by the receiving server requesting the access. Thereby, security is increased.

Conventionally, if the user intends to show images, on a large screen display device (apparatus), to a different user living in a remote location, the user in the remote location needs to learn operations of the device, an operation acquirer has to go to the remote location to operate the device, or the display device in the remote location should be remotely controlled. However, like Embodiment A4, the system according to Embodiment A6 enables such a user in a remote location to easily view images by a simple operation, for example, by bringing a physical medium such as a post card with RF-ID into proximity of a display device. In Embodiment A4, generation of the post card with RF-ID and writing of data into the RF-ID is not performed by the user (who captures and sends images or who views the images), but by a service provider. In Embodiment A6, however, the sending user in the image transmission side performs generation of the post card with RF-ID and writing of data into the RF-ID.

Embodiment A7

In Embodiment A7 of the present invention, a method of changing setting for a device (apparatus) by using a RF-ID card according to Embodiment A7 of the present invention is described.

Figure 77:
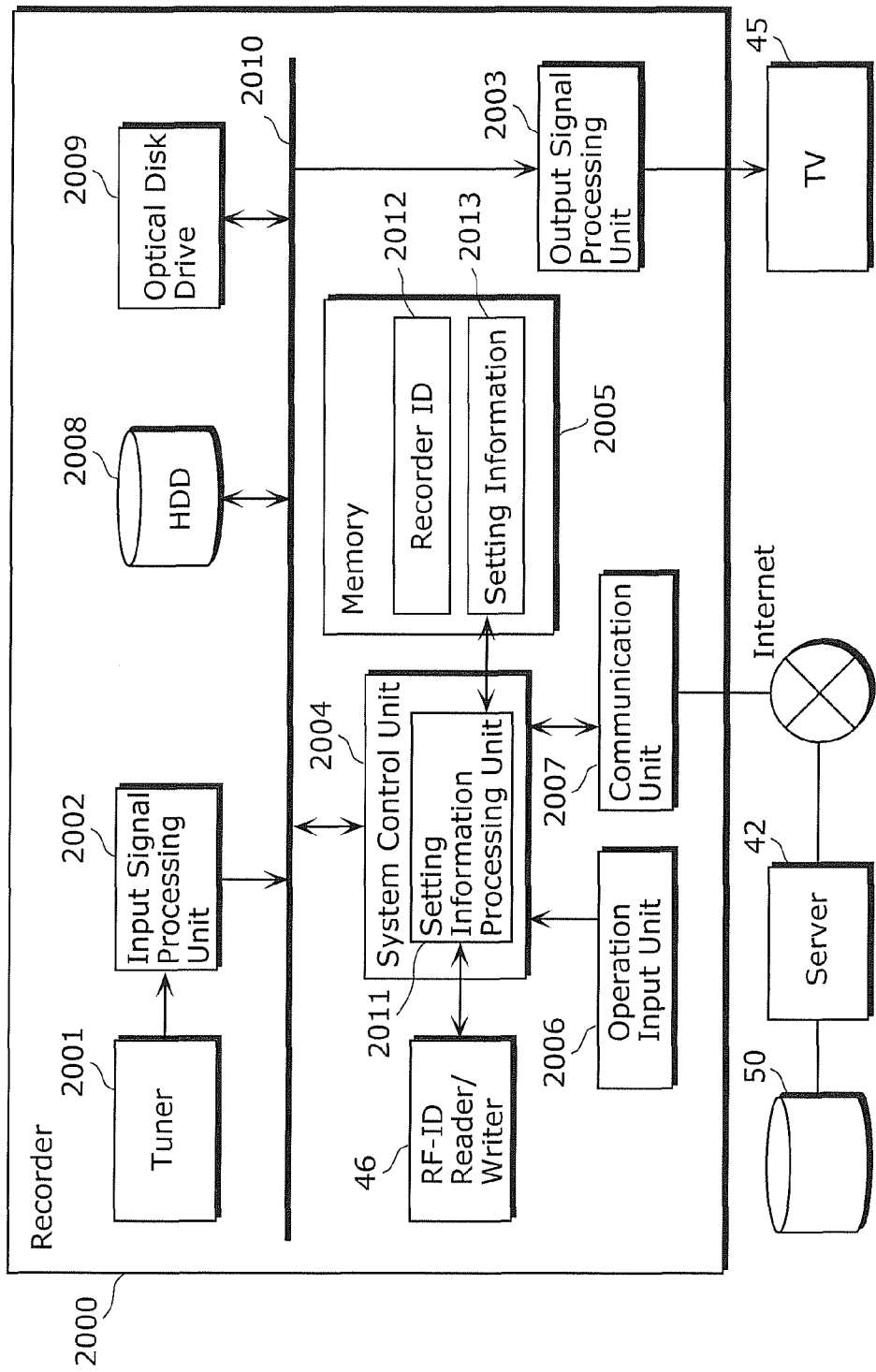
FIG. 77 is a block diagram of a recorder.
Figure 78:
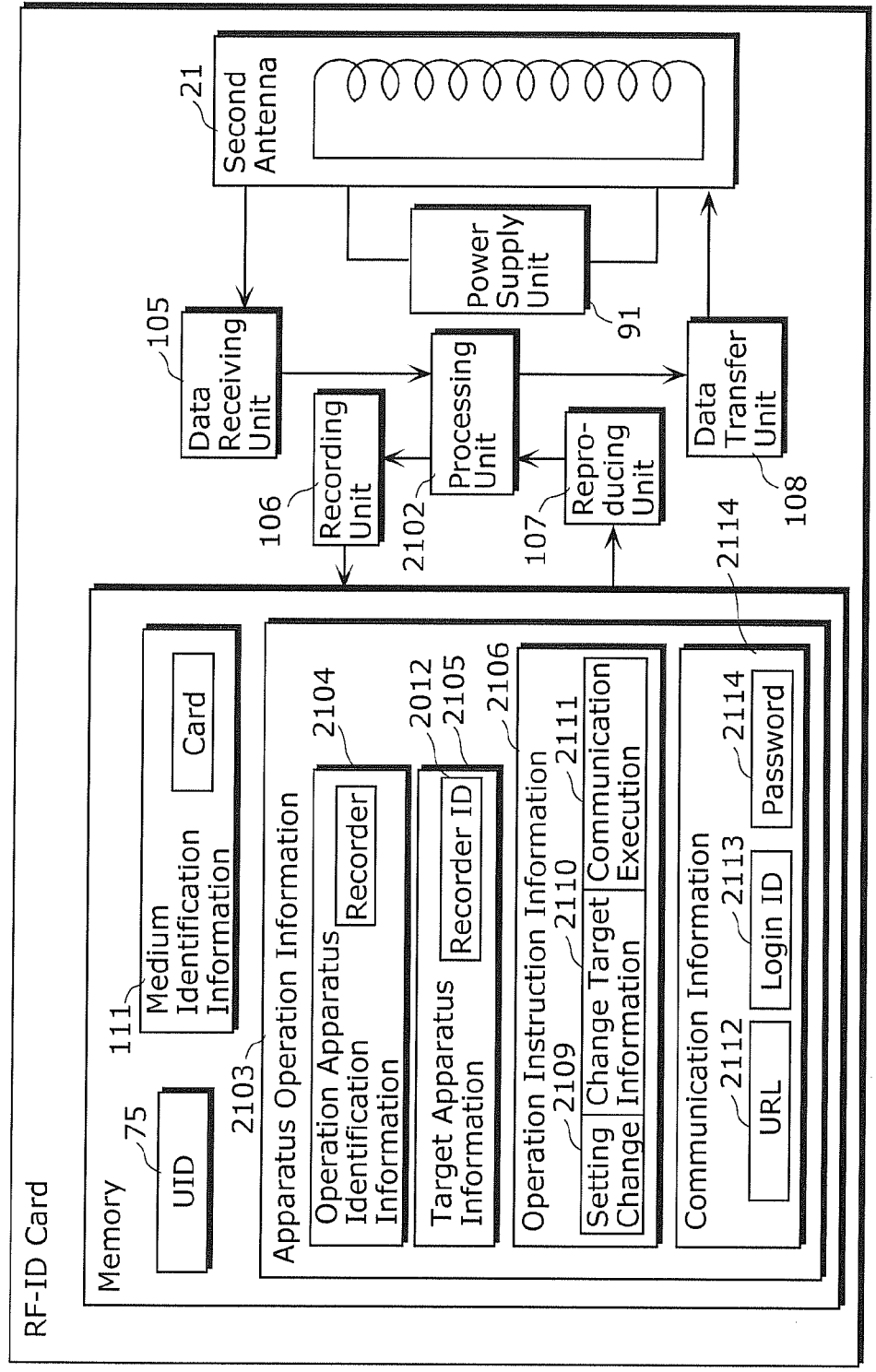
FIG. 78 is a block diagram of a RF-ID card.

The following describes a method of changing setting for a recorder by using a RF-ID card with reference to FIGS. 77 and 78.

FIG. 77 is a block diagram of a structure of a recorder according to Embodiment A7.

A recorder 2000 records broadcast contents obtained by a tuner 2001, onto a Hard Disk Drive (HDD) 2008 or an optical disk drive 2009. In addition, the recorder 200 reproduces, on the TV 45, the recorded contents or video/audio contents read by the optical disk drive 2009.

An input signal processing unit 2002 includes an Analog/Digital (A/D) converter, a decoder, and an encoder, in order to convert input video/audio signals into data in a predetermined video/audio format. The A/D converter converts analog signals obtained by the tuner 2001 into digital signals. The decoder decodes scrambled contents. The encoder converts data into data in a video format according to MPEG-2, for example.

An output signal processing unit 2003 includes a Digital/Analog (D/A) converter and a decoder in order to provide video and audio to the TV 45. The D/A converter converts digital signals to analog signals. The decoder decodes data in a data format according to MPEG-2, for example.

A system control unit 2004 controls operations of the recorder 2000. The system control unit 2004 includes a setting information processing unit 2011 that switches setting for the recorder 2000. The setting information processing unit 2011 will be described in detail later.

A memory 2005 holds recorder ID 2012 for identifying the recorder 2000, and setting information 2013 for the recorder 2000.

An operation input unit 2006 receives inputs from a user using buttons of a remote controller, a front panel, or the like (not shown).

A communication unit 2007 connects the recorder 2000 to the server 42 via the Internet or a LAN.

The HDD 2008 has an area in which recorded contents and content lists provided from the input signal processing unit 2002 are stored.

The optical disk drive 2009 is a disk drive that performs recording or reproducing for an optical disk such as a Digital Versatile Disc (DVD) or a Blue-ray Disc. The optical disk drive 2009 records recorded contents and content lists provided from the input signal processing unit 2002 onto the optical disc, and reproduces video/audio contents in the optical disk.

The input signal processing unit 2002, the output signal processing unit 2003, the system control unit 2004, the HDD 2008, and the optical disk drive 2009 of the recorder 2000 are connected one another via a bus 2010.

Here, the setting information processing unit 2011 is described in more detail below.

According to the setting information 2013 stored in the memory 2005, the setting information processing unit 2011 sets displaying of a menu screen, a recording/reproducing mode, chapters of recorded contents, TV program recommendation based on user's preference, and the like regarding the recorder 2000. In more detail, the setting information processing unit 2011 reads an identifier indicating, for example, "menu screen background color: Black" from the setting information 2013, and thereby issues a request for menu screen display to the output signal processing unit 2003 together with an instruction for displaying a background of a menu screen in black.

Here, the setting information 2013 may be stored in an external storage unit such as a SD card not shown. Especially, it is efficient to store, in the HDD 2008, the setting information regarding chapters of recorded contents stored in the HDD 2008, information having a large size, and the like.

Conventionally, the setting information 2013 has been set prior to purchase of the recorder 2000, or set by operations of the user using the operation input unit 2006. In Embodiment A7 of the present invention, however, the setting information 2013 can be changed based on information obtained from the RF-ID reader/writer 46.

FIG. 78 is a block diagram of a structure of the RF-ID card from which information is read by the RF-ID reader/writer 46 of the recorder 2000 to be used to change the settings of the recorder 2000.

The RF-ID card 2100 includes a memory 2101, the antenna 21, the power supply unit (second power supply unit) 91, the data receiving unit 105, the data transfer unit 108, a processing unit 2102, the recording unit 106, and the reproducing unit 107.

When the RF-ID card 2100 is moved to bring the antenna 21 into proximity of the RF-ID reader/writer 46 of the recorder 2000, the RF-ID reader/writer 46 supplies power to the power supply unit 91 via the antenna 21 in order to provide power to the respective units in the RF-ID card 2100.

Information regarding data recording/reproducing is read from the RF-ID card 2100 to the recorder 2000 via the RF-ID reader/writer 46. In the recorder 2000, the information is received by the data receiving unit 105 and then provided to the processing unit 2102.

In the RF-ID card 2100, the processing unit 2102 causes the recording unit 106 to record information onto the memory 2101, and causes the reproducing unit 107 to reproduce the information stored in the memory 2101.

The data transfer unit 108 transmits the information provided from the processing unit 2102 to the RF-ID reader/writer 46 of the recorder 2000 via the antenna 21.

The memory 2101 in the RF-ID card 2100 stores the UID 75, the medium identification information 111, and apparatus operation information 2103.

The UID 75 and the medium identification information 111 are used to identify the RF-ID card 2100.

The UID 75 is identification unique to the RF-ID card 2100.

The medium identification information 111 holds an identifier indicating that the RF-ID card 2100 is a card.

The apparatus operation information 2103 holds pieces of information regarding an apparatus (device) to perform an operation using the RF-ID card 2100 and regarding the operation. The following describes the pieces of information included in the apparatus operation information 2103.

Operation apparatus identification information 2104 indicates a type of the apparatus (device) to perform the operation using the RF-ID card 2100. The operation apparatus identification information 2104 indicates the type by an identifier in the similar manner as described for the medium identification information 111. In FIG. 78, the operation apparatus identification information 2104 holds an identifier indicating that a type of the apparatus to perform the operation is a recorder.

Target apparatus information 2105 holds information so that only a specific apparatus (device) can perform the operation using the RF-ID card 2100. In the example of FIG. 78, the target apparatus information 2105 holds recorder ID 2012 for identifying the recorder 2000. It should be noted that, if an apparatus that can use the RF-ID card 2100 according to Embodiment A7 of the present invention is limited, for instance, if only recorders can use the RF-ID card 2100, the operation apparatus identification information 2104 and the target apparatus information 2105 may not be included in the apparatus operation information 2103. In addition, if the setting information processing unit 2011 in the recorder 2000 has a structure to change settings of the recorder 2000 by using the information in cards, the medium identification information 111 may not be included in the memory 2101.

Operation instruction information 2106 indicates details of the operation to be performed by the apparatus designated in the apparatus operation information 2103. In the example of FIG. 78, the operation instruction information 2106 includes information 2109 indicating that setting is to be changed (setting change), information 2110 indicating a target for which the setting change is to be performed (change target information), and information 2111 indicating that communication is to be executed in obtaining the setting information (communication execution).

It should be noted that the operation instruction information 2106 is not limited for a single operation, but may include plural pieces of information for plural operations, or may be a program in which the plural operations are combined.

Communication information 2107 is information regarding a server or the like. When the recorder 2000 is instructed based on the operation instruction information 2106 to access the server or the like to obtain data, the recorder 2000 accesses the server or the like using the communication information 2107. In the example of FIG. 78, the communication information 2107 includes a URL 2112, login ID 2113, and a password 2114 of the server or the like. The URL 2112 may be replaced by an IP address. If the recorder 2000 is to access a different apparatus (device) via an office or home network, the URL 2112 may be information for identifying the apparatus, such as a MAC address.

Figure 79:
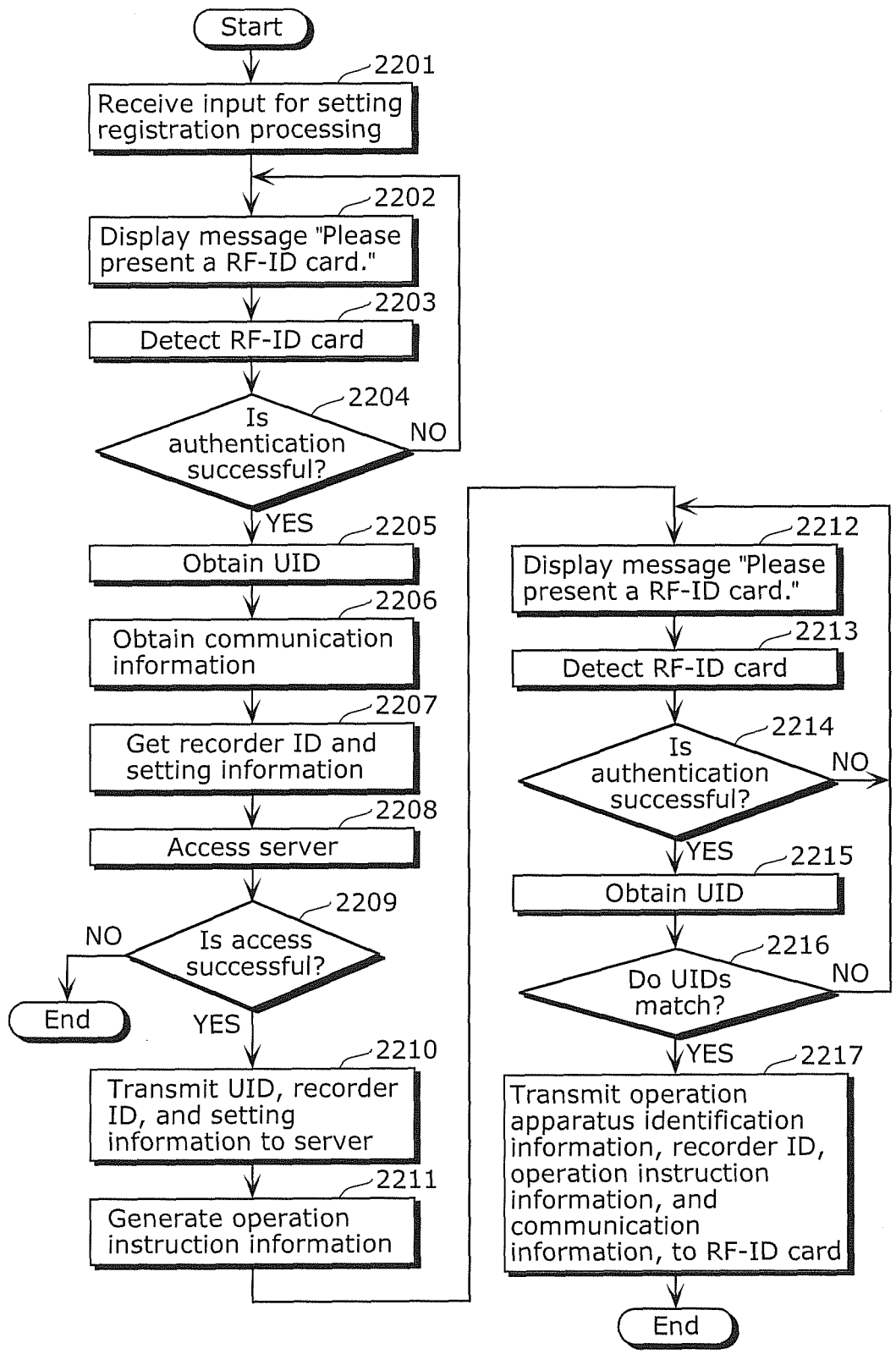
FIG. 79 is a flowchart of steps of registering setting information to a server.

FIG. 79 is a flowchart of steps of registering setting information to a server.

The following describes processing by which the recorder 2000 registers the setting information from the recorder 2000 to a server by using the RF-ID card 2100 with reference to FIG. 79.

At Step 2201, when the recorder 2000 receives an input from the user using the operation input unit 2006, the setting information processing unit 2011 causes the output signal processing unit 2003 to issue, to the TV 45, a request for message display. In response to the request, the TV 45 displays a message "Please present a RF-ID card" on its screen at Step 2202. The message may be displayed on a console (not shown) of the recorder 2000. It is also possible that the recorder 2000 requests the user for authentication such as a password or biometric authentication when the user performs the input operation, and after the authentication, proceeds to the setting registration processing. It is further possible that the recorder 2000 does not request the TV 45 for the message display, but the user needs to present the RF-ID card 2100 to the RF-ID reader/writer 46 when using the recorder 2000 in order to perform steps of and after 2203. It is still further possible that an enquiry message is displayed to enquire where the setting information 2013 is to be registered, and the setting information 2013 is registered into the location the user designates. For example, the setting information 2013 may be registered into the RF-ID card 2200, or into a sever different from the server 42.

At Step 2203, the recorder 2000 detects the RF-ID card. After that, mutual authentication between the recorder 2000 and the RF-ID card 2100 is performed at Step 2204.

If the mutual authentication at Step 2204 is successful, then the processing proceeds to Step 2205. Otherwise, the processing returns to Step 2202 to repeat the detection of the RF-ID card.

At Step 2205, the recorder 2000 obtains the UID 75 from the memory 2101 in the RF-ID card 2100.

At Step 2206, the recorder 2000 obtains the communication information 2107 from the memory 2101 in the RF-ID card 2100. If the memory 2101 in the RF-ID card 2100 does not hold the communication information, the recorder 2000 may issue, to the user, a request for providing the communication information. Moreover, if the user instructs at Step 2201 the recorder 2000 to register the setting information 2013 into a location that is not designated in the RF-ID card 2100, Step 2206 is not performed. If plural pieces of the communication information 2107 are stored in the RF-ID card 2100, it is possible to display a list of the plural pieces of the communication information 2107 from which the user can select a desired one.

At Step 2207, the recorder 2000 gets the recorder ID 2012 and the setting information 2013 from the memory 2005. The setting information 2013 is not limited to information currently stored, but may be information inputted by the user in the setting registration processing.

At Step 2208, in the recorder 2000, the setting information processing unit 2011 issues, to the communication unit 2007, a request for access to a server or the like having the URL 2112 included in the obtained communication information 2107. The communication unit 2007 accesses the server using the login ID 2113 and the password 2114.

At Step 2209, it is determined whether or not the access to the server 42 is successful. If the access is successful, then the processing proceeds to Step 2210. Otherwise, the setting registration processing is terminated.

At Step 2210, the recorder 2000 transmits, to the server 42, the UID 75, and the recorder ID 2012 and the setting information 2013 which are obtained from the memory 2005, thereby registering the setting information 2013 into the server 42.

At Step 2211, the recorder 2000 generates the operation instruction information 2106, using (a) the operation designated at Step 2201 or a storage location of the setting information 2013 selected at Step 2201, (b) the setting information 2013 obtained at Step 2207, and (c) the communication information 2107 obtained at Step 2206.

At Step 2212, the recorder 2000 performs the same step as Step 2202 to cause the TV 45 to displays a message "Please present a RF-ID card" on its screen.

At Step 2213, the recorder 2000 detects the RF-ID card. After that, mutual authentication between the recorder 2000 and the RF-ID card 2100 is performed at Step 2214.

If the mutual authentication at Step 2214 is successful, then the processing proceeds to Step 2215. Otherwise, the processing returns to Step 2212 to repeat the detection of the RF-ID card 2100.

At Step 2215, the recorder 2000 obtains the UID from the memory 2101 in the RF-ID card 2100.

At Step 2216, it is determined whether or not the UID 75 obtained at Step 2205 matches the UID obtained at Step 2215. If the UIDs match, then the processing proceeds to Step 2217. Otherwise, the processing returns to Step 2211 to repeat the detection of the RF-ID card 2100.

At Step 2217, the recorder 2000 transmits, to the RF-ID card 2100, the operation apparatus identification information 2104 (not shown in FIG. 77) stored in the memory 2005, the recorder ID 2012, the operation instruction information 2106 generated at Step 2211, and the communication information 2107, in order to record (register) these pieces of information onto the memory 2101 of the RF-ID card 2100. As a result, the setting registration processing is completed.

FIG. 80 is a diagram illustrating a structure of pieces of setting information registered in the server.

Referring to FIG. 80, the setting information registered into the server 42 by the above-described processing of FIG. 79 is described.

Each of the setting information registered in the server 42 is hereinafter referred to as setting information 2250. Each setting information 2250 is registered in association with a corresponding one of the UID 75 and a corresponding one of the target apparatus information 2105. In more detail, the setting information 2250 holds an identifier indicating, for example, "menu screen background color: Black". In the example of FIG. 80, a letter "A" or "B" at the end of pieces of the setting information 2250 indicates that the setting is different from another.

It is also possible that plural pieces of setting information are registered for a single UID such as UID0001 in FIG. 80. It is further possible that a single piece of the target apparatus information 2105, such as REC-0001, is registered for plural pieces of setting information associated with different UID. Here, the setting information may include the change target information 2110.

Figure 81:
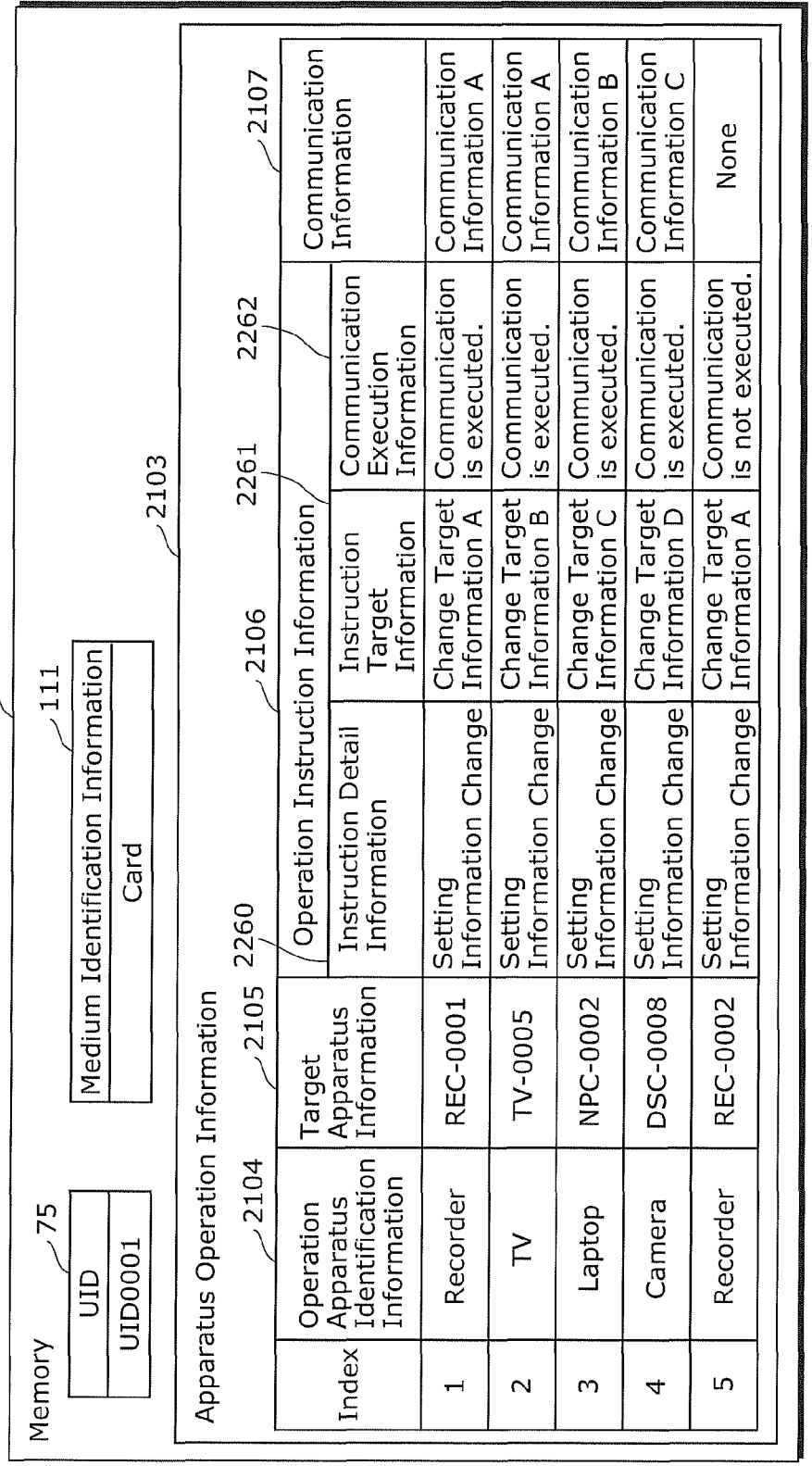
FIG. 81 is a diagram illustrating a structure of pieces of apparatus operation information registered in the RF-ID card.

FIG. 81 is a diagram illustrating a structure of pieces of apparatus operation information registered in the RF-ID card.

Next, referring to FIG. 81, the apparatus operation information 2103 registered in the memory 2101 of the RF-ID card 2100 by the above-described processing of FIG. 79 is described.

It is assumed in the example of FIG. 81 that the UID 75 designates "UID0001" and the medium identification information 111 designates a "card".

The apparatus operation information 2103 includes sets each including the operation apparatus identification information 2104, the target apparatus information 2105, the operation instruction information 2106, and the communication information 2107. Here, it is possible that the communication information 2107 is not registered as being information not related to the other pieces of information. For instance, it is possible that only a piece of the communication information 2107 is registered to always access the same server in using the RF-ID card 2100.

The operation instruction information 2106 includes instruction detail information 2260, instruction target information 2261, and communication execution information 2262. The instruction detail information 2260 holds an identifier indicating an operation to be performed by the device designated by the target apparatus information 2105. The instruction target information 2261 holds an identifier indicating a setting, such as a menu screen mode or recording mode, of the apparatus to perform the operation, such as REC-0001. The communication execution information 2262 holds an identifier indicating whether or not communication is to be executed in performing the operation indicated in the instruction detail information 2260. It should be noted that the apparatus operation information 2103 may include only the communication information 2107 if the operating to be performed using the RF-ID card 2100 is limited to changing of setting.

The communication information 2107 holds a URL, login ID, a password, and the like for accessing a server that is a partner of communication, if the communication execution information 2262 indicates that the communication is to be executed.

Figure 82:
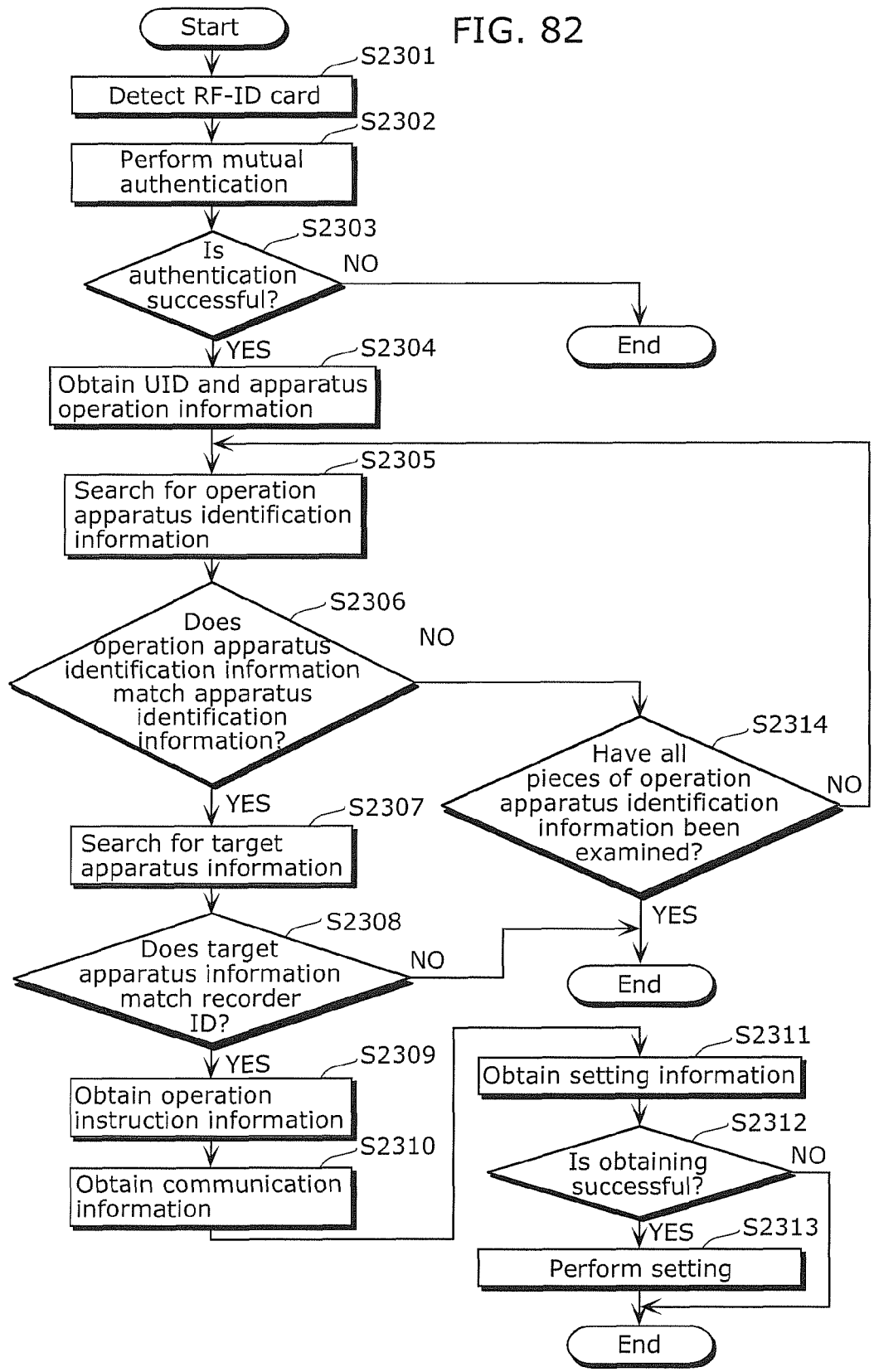
FIG. 82 is a flowchart of steps of updating setting information of a recorder by the RF-ID card.

FIG. 82 is a flowchart of steps of updating setting information of a recorder by the RF-ID card.

Next, the description is given for processing of changing the setting of the recorder 2000 by using the RF-ID card 2100 with reference to FIG. 82. FIG. 82 is a flowchart of processing by which the setting information processing unit 2011 in the recorder 2000 updates the setting information 2013 by using the RF-ID card 2100.

First, at Step 2301, the recorder 2000 detects the RF-ID card 2100. After that, at Step 2302, the recorder 2000 performs mutual authentication with the RF-ID card 2100.

At Step 2303, the recorder 2000 determines whether or not the mutual authentication is successful. If the mutual authentication is successful, then the processing proceeds to Step 2304. Otherwise, the setting update processing is terminated.

At Step 2304, the recorder 2000 obtains the UID 75 and the apparatus operation information 2103 from the memory 2101 of the RF-ID card 2100.

At Step 2305, the recorder 2000 searches the apparatus operation information 2103 for the operation apparatus identification information 2104. At Step 2306, the recorder 2000 compares the searched-out operation apparatus identification information 2104 to apparatus identification information (not shown) in the memory 2005 of the recorder 2000.

If it is determined at Step 2306 that the operation device identification information 2104 matches the device identification information, then the processing proceeds to Step 2307. Otherwise, the processing proceeds to Step 2314.

At Step 2314, the recorder 2000 determines whether or not all pieces of the operation apparatus identification information 2104 in the apparatus operation information 2103 have been examined. If all pieces of the operation apparatus identification information 2104 have been examined, then the setting update processing is terminated.

At Step 2307, the recorder 2000 searches the device operation information 2103 for the target apparatus information 2105. At Step 2308, the recorder 2000 compares the searched-out target apparatus information 2105 to the recorder ID 2012 in the memory 2005 of the recorder 2000.

If it is determined at Step 2308 that the target device information 2105 matches the recorder ID 2012, then the processing proceeds to Step 2309. Otherwise, the setting update processing is terminated.

At Step 2309, the recorder 2000 obtains the operation instruction information 2106 associated with the target device information 2105 from the apparatus operation information 2103.

At Step 2310, the recorder 2000 obtains the operation instruction information 2107 associated with the target apparatus information 2105 from the apparatus operation information 2103.

At Step 2311, the recorder 2000 determines, based on the instruction detail information 2260 in the operation instruction information 2106 in the device operation information 2103, that an operation to be performed is updating of setting, and thereby accesses the server 42 to obtain the setting information 2250 from the server 42. The step will be described in more detail with reference to FIG. 83.

At Step 2312, the recorder 2000 determines whether or not the obtainment of the setting information 2250 is successful. If the obtainment of the setting information 2250 is successful, then the processing proceeds to Step 2313. At Step 2313, the setting information processing unit 2011 in the recorder 2000 updates the setting information 2013 in the memory 2005 of the recorder 2000 by the setting information 2250. On the other hand, if the obtainment of the setting information 2250 fails, then the setting update processing is terminated.

Figure 83:
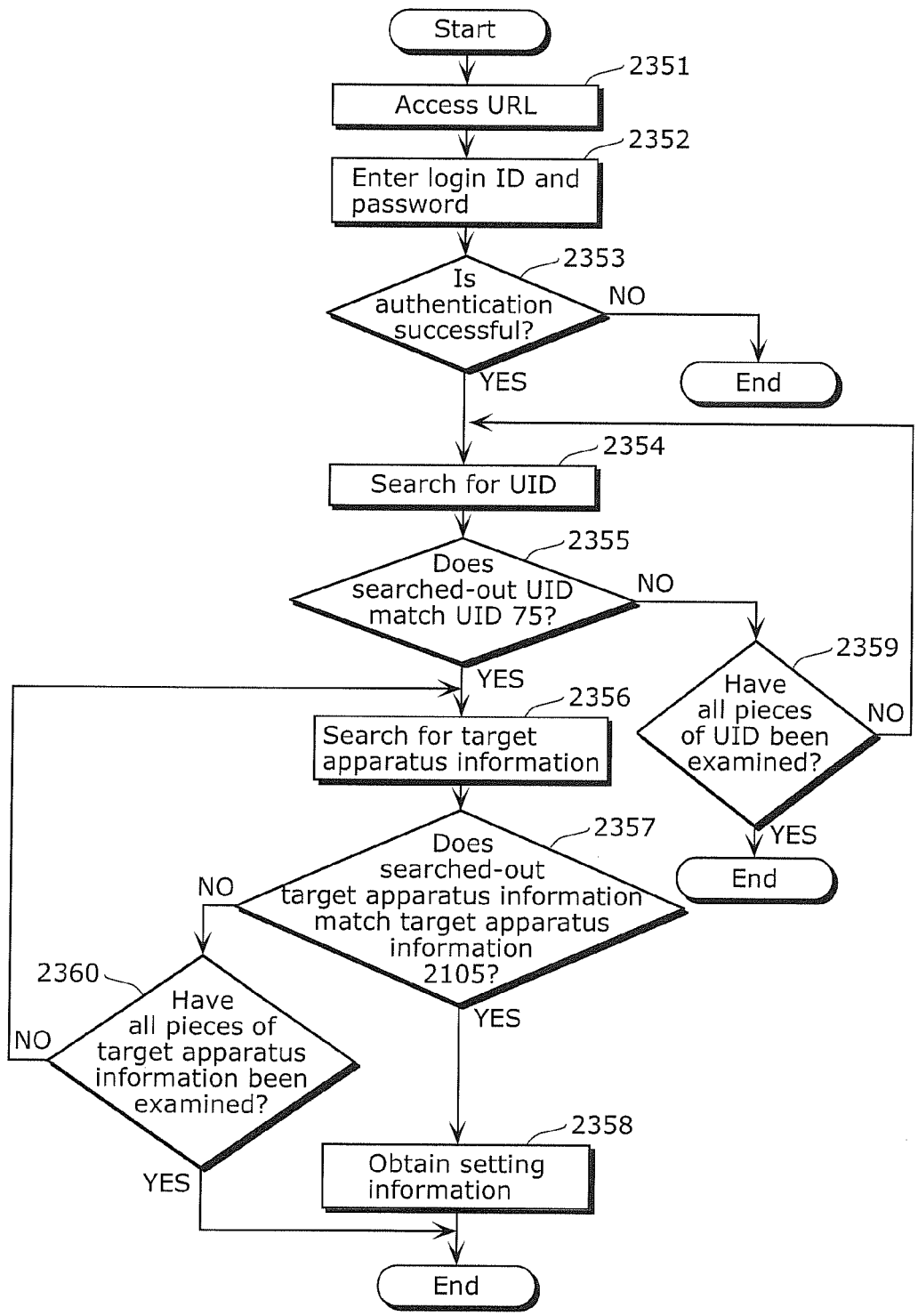
FIG. 83 is a flowchart of steps of obtaining the setting information from the server.

FIG. 83 is a flowchart of steps of obtaining the setting information from the server.

The following describes Step 2311 in FIG. 82 in more detail with reference to FIG. 83. FIG. 82 is a flowchart of processing by which the setting information processing unit

2011 in the recorder 2000 accesses the server 42 to obtain the setting information 2250 from the server 42.

At Step 2351, the communication unit 2007 in the recorder 2000 accesses the server 42 having the URL 2112 included in the communication information 2107.

At Step 2352, the setting information processing unit 2011 provides the communication unit 2007 with the login ID 2113 and the password 2114 which are included in the communication information 2107, and thereby the communication unit 2007 logins to the server 42.

At Step 2353, it is determined whether or not authentication (namely, the login) is successful. If the authentication is successful, then the processing proceeds to Step 2354. Otherwise, the processing is terminated as being failure of obtaining the setting information 2250.

At Step 2354, the recorder 2000 searches the server 42 for UID. At Step 2355, the recorder 2000 determines whether or not the searched-out UID matches the UID 75 obtained at Step 2304 in FIG. 82. If the searched-out UID matches the UID 75, then the processing proceeds to Step 2356. Otherwise, the processing returns to Step 2354 to repeat the search for UID until it is determined at Step 2359 that all pieces of UID in the server 42 have been examined. If it is determined at Step 2359 that all pieces of UID in the server 42 have been examined, then the processing is terminated as being failure of obtaining the setting information 2250.

At Step 2356, the recorder 2000 searches the server 42 for the target apparatus information associated with the UID 75. At Step 2357, the recorder 2000 determines whether or not the searched-out target apparatus information matches the target apparatus information 2105 obtained at Step 2305 in FIG. 82. If the searched-out target apparatus information matches the target apparatus information 2105, then the processing proceeds to Step 2358. On the other hand, if the searched-out target apparatus information does not match the target apparatus information 2105, then the processing proceeds to Step 2358, then the processing returns to Step 2354 to repeat the search for the target apparatus information until it is determined at Step 2360 that all pieces of the target apparatus information in the server 42 have been examined. If it is determined at Step 2360 that all pieces of the target apparatus information have been examined, then the processing is terminated as being failure of obtaining the setting information 2250.

At Step 2258, the recorder 2000 obtains, from the server 42, the setting information 2250 associated with the UID 75 and the target apparatus information 2105.

As described above, the use of the RF-ID card 2100 enables the user to perform setting of the recorder 2000 without complicated operations. Even if the user is not familiar with operations of apparatuses (devices) the user can easily change the setting of the recorder 2000 by using the RF-ID card 2100. Moreover, the operation executable for the recorder 2000 by using the RF-ID card 2100 is not limited to the setting change. For example, the instruction detail information can designate an operation of obtaining a list of recorded contents in the recorder. In this case, the list is registered in the RF-ID card or the server. Thereby, the user can check the list on a different apparatus (device) other than the recorder by using the RF-ID card.

FIG. 84 is a diagram illustrating a structure of apparatus operation information registered in the RF-ID card used in the recorder.

In addition, the RF-ID card holding information illustrated in the FIG. 84 allows the user to perform timer recording in the recorder simply by presenting the RF-ID card to the recorder. In more detail, if the change target information associated with Index 1 in FIG. 84 is applied, the recorder can perform timer recording according to setting of "TV program ID" and "recording mode" designated in the instruction target information, simply by presenting the RF-ID card to the recorder. Thereby, the timer recording can be performed without accessing the server. In addition, if the change target information associated with Index 2 in FIG. 84 is applied, the recorder can perform timer recording according to "TV program code" designated in the instruction target information, simply by presenting the RF-ID card to the recorder. Here, the recorder can obtain, from the server, (a) program ID or a start time and end time, and (b) channel information. As a result, the time recording can be performed according to the setting of the "recording mode". Furthermore, it is also possible that "recommended TV program" is designated in the instruction target information in the RF-ID card. After presenting the RF-ID card to the recorder, the recorder obtains ID of the recommended TV program from the server. Thereby, the recorder can obtain a content of the recommended TV program from the server and performs timer recording of the content. The above functions may be used as service for providing the RF-ID card as being a supplement of a TV program guide magazine, for example. This RF-ID card can reduce user's bothersome procedures for timer recording. For another service, it is also possible in the RF-ID card that the instruction detail information designates a download operation, the instruction target information designates video or software in a version where a function is restricted, and the communication information designates a URL of a download website. Such RF-ID cards are provided for free to users. The users can use the video or software as trial, and purchase it if the user likes it.

It should be noted that the description in Embodiment A7 has been given for the recorder, but the present invention is not limited to the recorder.

For example, Embodiment A7 of the present invention may be implemented as a TV having a reader/writer for the RF-ID card and the setting information processing unit. The TV can register, as the change target information, (a) setting of an initial display channel or initial sound volume immediately after power-on, (b) setting of child lock for excluding adult broadcasts and violence scenes, (c) setting of zapping for favorite channels, (d) setting of contrast and brightness of a screen, (e) setting of a language, (f) setting of a continuous use time, and the like, simply by presenting the RF-ID card to the TV. Thereby, the TV can perform settings according to usability. Furthermore, Embodiment A7 may be implemented also as a vehicle navigation system having a reader/writer for the RF-ID card and the setting information processing unit. In this aspect, the instruction detail information designates "highlighted display" and the instruction target information designates "landmark information". Thereby, by using the RF-ID card, the vehicle navigation system can display the designated landmark as being highlighted, by changing a character font, character size, or color. The landmark information may be obtained from a server.

FIG. 85 is a diagram illustrating a structure of apparatus operation information registered in the RF-ID card used in a vehicle navigation device.

In this case, the RF-ID cards, on which the apparatus operation information illustrated in FIG. 85 is recorded, are offered to users at rest areas or interchanges on expressways, sightseeing spots, and the like. Thereby, the RF-ID cards allow vehicle navigation systems of the users to display a recommended landmark, where an even is currently held for example, as highlighted display. In addition, Embodiment A7 may be implemented as a laptop having a reader/writer for the RF-ID card and the setting information processing unit. The laptop can designate (a) setting of a resolution of a screen, (b) setting of a position of an icon or the like on a display, (c) setting of a wallpaper, (d) setting of a screen saver, (e) setting of start-up of resident software, (f) setting of employed peripheral devices, (g) setting of a dominant hand for a mouse or the like, and the like, by simply by presenting the RF-ID card to the laptop. Therefore, if the user brings the RF-ID card in a business trip, the user can operate a different personal computer at the business trip location, with the same settings as those the user usually uses. Embodiment A7 may be implemented further as a game machine having a reader/writer for the RF-ID card and the setting information processing unit. The user visiting a friend's house uses a RF-ID card in which the instruction detail information designates setting change. By presenting the RF-ID card to the game machine at the friend's house, the user can change (a) setting of positions of keys on a remote controller and (b) setting of a structure of a menu screen. In addition, the user can save data in the game machine by using the RF-ID card. Moreover, the following service using the RF-ID card is also possible. The RF-ID card holds the instruction detail information designating a download operation. Such RF-ID cards are offered to users as supplements of magazines or the like. The users can use the RF-ID cards to download an additional scenario, a rare item, or the like.

The RF-ID card according to Embodiment A7 of the present invention can be also applied to home appliances connected to one another via a network. In this aspect, the RF-ID card previously holds (a) setting of a temperature of an air conditioner, (b) setting for a temperature of hot water in a bus tab, and the like, depending of the user's preference. Thereby, the user presents the RF-ID card to RF-ID reader/writers in the user's house so as to manage settings of the home appliances at once. In addition, the RF-ID card may designate an operation for checking foods stored in a refrigerator. Here, information of the foods which is registered in the refrigerator is obtained by using RF-ID tags previously attached to the foods. Or, video of the inside of the refrigerator is captured by using camcorder. Thereby, the user can check a list of the foods on a TV by using a RF-ID reader/writer to obtain information from the RF-ID card. As described above, the RF-ID card according to Embodiment A7 of the present invention can be applied for various usages. It is also possible to combine (a) RF-ID cards for designating apparatuses (such as four different cards indicating "heating appliance", "cooling appliance", "stove", and "fan", respectively) and (b) RF-ID cards for designating setting of the apparatuses (such as three different cards indicating "weak", "medium", and "strong", respectively). It is further possible that such RF-ID cards having the apparatus-designating and setting-designating functions are integrated into a single RF-ID card. And, the settings of the apparatuses can be customized.

Although only some exemplary embodiments of the present invention have been described in detail above, those skilled in the art will be readily appreciate that many modifications are possible in the exemplary embodiments without materially departing from the novel teachings and advantages of the present invention. Accordingly, all such modifications are intended to be included within the scope of the present invention.

For example, if two users (hereinafter, referred to as a user A and a user B) exchanges photographs between them, the user B can view photographs taken by the user A by the following method. The user B has a TV having an apparatus ID and a relay server having a URL. The apparatus ID and the URL are previously stored in a RF-ID (hereinafter, referred to as a RF tag B). The user B generates information (hereinafter, referred to as device generation information B) from the information in the RF tag B and stores the generated device generation information B into the RF tag B. The user B transmits the device generation information B to the user A via e-mail or the like. The user A stores a URL of a server holding the photographs into the relay server, in association with the received device generation information B. Thereby, the user B simply presents the RF tab B to a RF-ID reader/writer of the TV in order to view the photographs taken by the user A. Here, it is assumed that the RF tag B previously holds an e-mail address of the user A. When the user B simply presents the RF tag B to the RF-ID reader/writer of the TV, the device generation information B may be automatically written into the TV and a notification of the device generation information B may be automatically transmitted to the e-mail address of the user A. Thereby, even if the user B is not familiar with operations of the devices, the user B can exchange photographs with the user A. Furthermore, it is also possible that the user A encrypts at least one of a URL, login ID, and a password by using the device generation information B and sends, to the user B, a post card with RF-ID on which the encrypted information is recorded. This makes it possible to restrict an apparatus permitted to display the photographs, only to the TV of the user B. It is further possible that the user A sends, to the user B, a post card with two RF-IDs that are a RF-ID for sending and a RF-ID for returning. In this aspect, the user A records, onto the RF-ID for returning, device generation information A that is previously generated by a TV or the like of the user A. This can restrict an apparatus permitted to display photographs stored by the user B. More specifically, when the user B receives the post card with the two RF-IDs and returns the post card to the user A, the user B encrypts, by using the device generation information A, a URL, a login ID, or a password of a server storing the photographs of the user B, and then records the encrypted data onto the RF-ID for returning. Or, when the user B stores the photographs, the user B associates the photographs with the device generation information A. Therefore, an apparatus permitted to display photographs stored by the user B can be restricted.

Moreover, the mailing object UID of the RF-ID on the mailing object may be a combination of (a) a group ID that is common among a plurality of mailing objects and (b) a UID unique that is unique to each mailing object. Thereby, image data in the server is associated not with every mailing object UID but with the group ID. Therefore, when post cards with RF-ID on which the image data is associated with a plurality of targets are mailed, it is possible to eliminate user's bothersome procedures for performing registration for each of the UIDs. It is also possible that the image data stored in the server in association with the group ID is switched to be permitted or inhibited to be viewed for each of the UID. Thereby, if, for example, a printer prints destination addresses on the mailing objects, the printer having a RF-ID reader/writer reads the UIDs on the mailing objects and thereby associates the UIDs with addresses in an address list, respectively. Thereby, the address list can be used to manage the permission/inhibition of viewing the images stored in the server.

It is also possible that a post card or card is provided with a plurality of RF-ID tags having various different functions. In this aspect, the single post card or card can switch the functions by disconnecting communication of a part of the RF-ID tags which are not currently used. For example, a post card has (a) an upper portion on which a RF-ID tag having a function of displaying a slide show of photographs is attached and (b) a lower portion on which a RF-ID tag having a function of reproducing video. A user can switch the display function or the reproduction function, by selecting the upper portion or the lower portion to be brought into proximity of a RF-ID reader/writer. The RF-ID tags having different functions can be provided to a front side and a back side of the post card. It is also possible that covers made of a material blocking communications are applied on the RF-ID tags so that the user can select a RF-ID tag to be used by opening the cover on it.

It is further possible that photographs are stored in a plurality of servers, and a RF-ID tag holds URLs of the servers. Thereby, a user can access the servers to obtain the photographs to display them in a list.

Moreover, the RF-ID reader/writer may be provided not only to an apparatus (device) such as the TV or the recorder but also to the input means such as a remote controller for operating the apparatus. For instance, if a plurality of apparatuses are connected to one another via a network, an input means for collectively operating the apparatuses may be provided with a RF-ID reader/writer to operate the respective apparatuses. Furthermore, an input means such as a remote controller may be provided with an individual authentication means for biometric authentication such as fingerprint authentication or face authentication, password, or the like. In this aspect, the input means having a RF-ID reader/writer exchanges data with a RF-ID tag, only when the individual authentication is successful. It is also possible that the individual authentication information is previously stored in the RF-ID tag, and individual authentication is performed by the apparatus or the remote controller using the RF-ID tag.

It should be noted that the definition of the term "RF-ID" frequently used in the description of the present invention is not limited to narrow meaning. In general, the term "RF-ID" narrowly refers to a "tag having a nonvolatile memory on which identification information is recorded". RF-ID having a dual interface function or a security function seems commonly called as a "IC card" or the like. However, in the embodiments of the present invention, the "RF-ID" widely refers to an "electronic circuit which has a nonvolatile memory on which individual identification information is recorded and which can transmit the individual identification information to the outside via an antenna".

Conventionally, if a user who is not familiar with operations of an apparatus (device) wishes to perform complicated settings for the apparatus, it is necessary that a seller, repairer, or serviceperson of the apparatus visits a location of the apparatus to perform the settings or controls the apparatus remotely. Even in remotely controlling the apparatus, the seller, repairer, or serviceperson has to visit the location for setting of the remote control. In Embodiment A7 of the present invention, however, the RF-ID card 2100 enables the user to perform the settings of the apparatus (the recorder 2000) without complicated operations. Therefore, even the user not familiar with operations of the recorder can easily change the settings of the recorder.

The present invention can be implemented also as an image presentation method of presenting image related to a communication device on an apparatus (device) having a display screen, in a communication system having (a) the apparatus having the display screen, (b) a reader device connected to the apparatus via a communication path, and (c) the communication device performing proximity wireless communication with the reader device. The present invention can be implemented further as a program stored in the communication device with identification information of the communication device, the program being described by codes executed by a virtual machine included in a device performing proximity wireless communication with the communication device, and being for executing: accessing a server connected via a communication network; downloading, form the server, image associated with the identification information from among image stored in the accessed server; and displaying the downloaded image. In addition, the present invention can be implemented as a computer-readable recording medium such as a CD-ROM on which the above program is recorded.

The communication device according to the present invention may be used, of course, as various devices having a RF-ID unit in which identification information and a virtual machine program are stored. For example, the communication device may be electronic devices such as a camera, home appliances such as a rice cooker and a refrigerator, and daily commodities such as a toothbrush.

Figure 86:
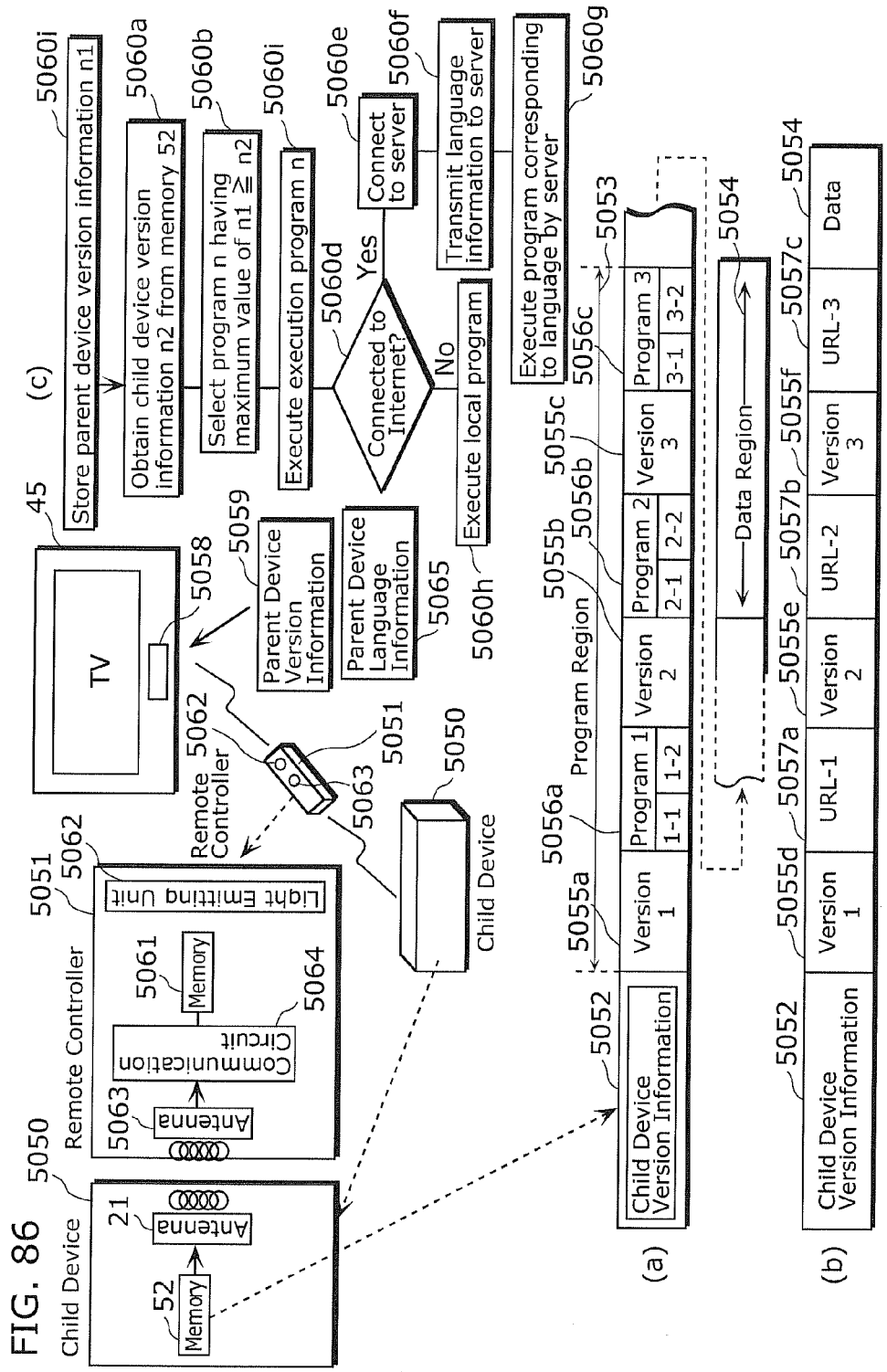
FIG. 86 is a block diagram of a configuration where a remote controller of a TV or the like has a RF-ID reader, according to an embodiment of the present invention.

FIG. 86 is a block diagram of a configuration where a remote controller of a TV or the like has a RF-ID reader, according to an embodiment of the present invention.

Figure 87:
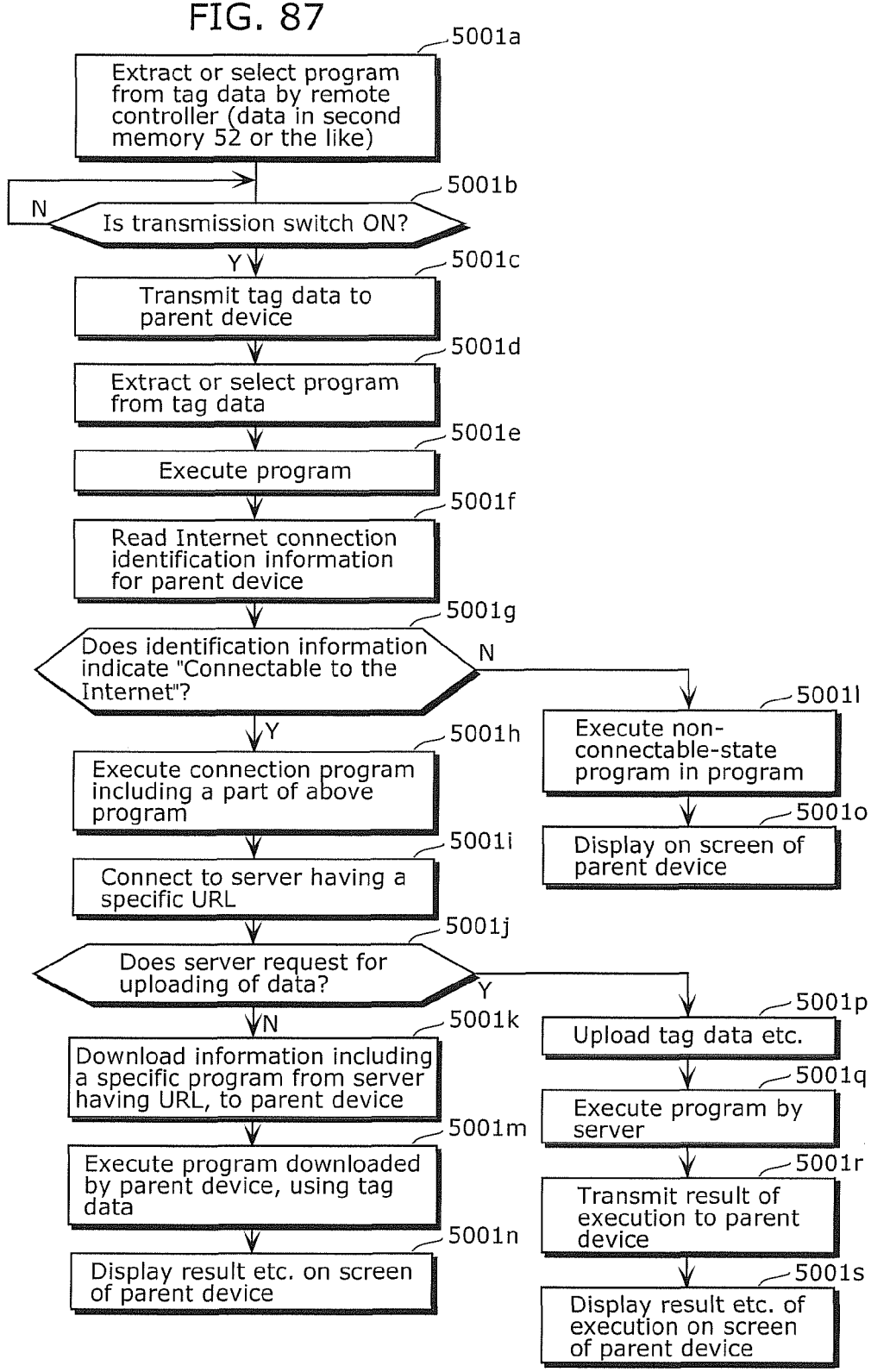
FIG. 87 is a flowchart of processing performed by the above configuration according to the above embodiment.

FIG. 87 is a flowchart of processing performed by the above configuration according to the above embodiment.

Here, an embodiment in which a RF-ID reader is provided to a remote controller of a TV or the like is described with reference to diagrams (a) and (b) in FIG. 86, a flowchart (c) in FIG. 86, and a flowchart of FIG. 87.

First, as described earlier, a child device (or child communicator) 5050 such as a camera has the memory (second memory) 52 and the antenna 21. When an antenna 5063a of a remote controller 5051 is moved into proximity of the antenna 21, the antenna 5063a supplies power to the antenna 21. Thereby, data in the memory 52 is transmitted from the antenna 21 to the antenna 5063a. The remote controller 5051 converts the received data into digital data by a communication circuit 5064, and then stores the digital data into a memory 5061 (Step 5001a in FIG. 87). Then, a transmission unit of the remote controller 5051 is faced to the TV 45 and a transmission switch 5063 on the remote controller 5051 is pressed (Step 5001b). Thereby, the data in the memory 5061 is transmitted as light to a light receiving unit 5058 of the parent device (apparatus) 45 (the TV 45) via a light emitting unit 5062 (Step 5001c). The communication may be not light but wireless.

Referring back to a flowchart (c) in FIG. 86, the embodiment of the present invention used in social systems should be applicable even in twenty or thirty years. An example of the program described in a virtual machine language or the like is known Java™. However, such programs are expected to be extended or replaced by totally different programs described in more efficient languages. In order to address the above situation, in the embodiment of the present invention, the parent device 45 such as the TV holds parent device version information 5059 (or parent device version information $n_1$) that indicates a language type or version of a virtual machine language or the like (Step 5060i in (c) of FIG. 86). In the beginning of the memory 52 of the child (communication) device 5050, child device version information 5052 (or child device version information $n_2$) indicating a version of a program language or the like for the child device is recorded ((a) in FIG. 86). Following to the child device version information 5052, a program region 5053 is recorded in the memory 52. The program region 5053 stores a program 5056a in a version 5055a, a program 5056b in a version 5055b, and a program 5056c in a version 5055c. Following to the program region 5053, a data region 5054 is recorded in the memory 52.

At Step 5060i in the flowchart of FIG. 86, the parent device 45 stores the parent device version information $n_1$ of the parent device 45 is stored. Then, the parent device 45 obtains the child device version information $n_2$ from the memory of the child device (Step 5060$a$). Then, the parent device 45 selects an execution program n having a maximum value of $n_1 \geq n_2$ (Step 5060$b$). The parent device 45 executes the selected execution program (Step 5060$c$). Then, it is determined whether or not the parent device 45 is connected to the Internet (Step 5060$d$). If the parent device 45 is connected to the Internet, then the parent device 45 is connected to the server via the Internet (Step 5060$e$). The parent device 45 thereby transmits language information 5065, which is set in the parent device 45, to the server (Step 5060$f$). The server provides the parent device 45 with a program in the language indicated in the transmitted language information 5065, for example in French, and causes the parent device 45 to execute the program. Alternatively, the server may execute the program on the server itself.

On the other hand, if it is determined at Step 5060$d$ that the parent device 45 is not connected to the Internet, then the processing proceeds to Step 5060$h$. At Step 5060$h$, the parent device 45 executes a local program in order to display, on a screen of the parent device 45, attribute information of the child device 5050. The attribute information is, for example, information for notifying a trouble or information regarding the number of stored photographs. As described above, the memory 52 in the child device 5050 holds the child device version information 5052. The memory 52 stores a program, procedure, URL, or the like of each generation. The program, procedure, URL, or the like will be developed every 10 years. Such data format on which information is recorded for each generation can be kept being used even in twenty or thirty years in order to operate the parent device 45. (a) of FIG. 86 illustrates an example of information on which versions or generations of a program are recorded. However, the same advantages are also offered in another example illustrated in (b) of FIG. 86. In (b) of FIG. 86, addresses of data stored in the server are recorded in associated with respective different versions. In this example, a URL 5057$a$ in a version 5055$d$, a URL 5057$b$ in a version 5055$e$, and a URL 5057$c$ in a version 5055$f$ are recorded. The above can achieve backward compatibility for many years. For example, it is assumed that a user purchases a product (the parent device 45) in version 1 this year and the product has RF-ID. Under the assumption, it is expected that, in twenty or thirty years, programs described in virtual machine languages or the like such as Java™, which are compliant to versions 1, 2, and 3, will be installed into the parent device 45. In the situation, the child device 5050 can provide the parent device 45 with the child device version information 5052. Based on the child device version information 5052, the parent device 45 can select a program to be compliant to an appropriate version. It is also expected that, in thirty years, the child device will hold information of programs in all versions 1, 2, and 3. Therefore, a different parent device 45 in version 3 employs the best function of a version among them. On the other hand, the former parent device 45 in version 1 employs a rather limited function of a version older than the version employed by the parent device 45 in version 3. As a result, perfect compatibility can be achieved.

The flowchart of FIG. 87 is explained below. At Step 5001$a$, pressing a read switch 5063 on the remote controller 5051, a user brings the remote controller 5051 into proximity of the antenna 21 of the child device 5050. Thereby, data in the memory 52 of the child device 5050 is transmitted to the memory 5061 of the remote controller 5051. Next, at Step 5001$b$, facing the remote controller 5051 to the parent device 45 such as a TV, the user presses a transmission switch 5063 (Step 5001$b$). Thereby, the data in the memory 5061 is transmitted as light to the parent device 45 (Step 5001$c$). In the embodiment of the present invention, the data is referred to as "tag data" for convenience. The parent device 45 extracts or selects an execution program from the tag data (Step 5001$d$). The parent device 45 executes the extracted or selected execution program by a virtual machine language set in the parent device 45 (Step 5001$e$). The parent device 45 reads Internet connection identification information for the parent device 45 (Step 5001$f$). At Step 5001$g$, it is determined whether or not the identification information does not indicate "Connectable to the Internet" (in other words, it is determined based on the identification information whether or not the parent device 45 is connectable to the Internet. If the identification information does not indicate "Connectable to the Internet" until Step 5001, then the parent device 45 executes a non-connectable-state program in the execution program (Step 5001$t$). The non-connectable-state program is to be executed when the parent device 45 is not connectable to the Internet. Then, the parent device 45 displays a result of the execution on its screen (Step 5001$u$). In the embodiment of the present invention, the memory 52 stores not only the information regarding connection to the Internet, but also the non-connectable-state program to be executed when the parent device 45 is not connectable to the Internet. Therefore, the parent device 45 can display a result of a minimum required operation when the parent device 45 is not connectable to the Internet.

On the other hand, if it is determined at Step 5001$g$ that the identification information indicates "Connectable to the Internet", then the parent device 45 executes a connection program (Step 5001$h$). The connection program includes a part of the above execution program.

The connection program may be generated by adding, into the execution program in the tag data, data such as a URL of the server, user ID, and a password. More specifically, the added such as a URL of the server, user ID, and a password are added in the data region 5054 illustrated in (a) of FIG. 86. Such connection program can extend the execution program in the tag data, and also reduce a capacity of the nonvolatile memory in the memory 52. In this case, it is also possible that the connection program in the memory 52 is recorded onto a memory such as a non-rewritable ROM in the program region 5053, while the URL of the server and the like are recorded onto the data region 5054 that is rewritable. As a result, a tip area and a cost can be reduced.

At Step 5001$i$, the parent device 45 connects to a server having a specific URL. At Step 5001$j$, it is determined whether or not the server requests the parent device 45 to upload data to the server. If the server requests for uploading of data, then at Step 5001$p$, the parent device 45 uploads data and/or a program to the server. The server executes a program using the data (Step 5001$q$). The server provides a result of the execution to the parent device 45 (Step 5001$r$). The parent device 45 displays the result and the like of the execution on its screen (Step 5001$s$).

On the other hand, if it is determined at Step 5001$j$ that the server does not request for uploading of data, then, the parent device 45 downloads information including a specific program from the server having the URL (Step 5001$k$). The parent device 45 executes the downloaded program (Step 5001$m$). Then, the parent device 45 displays the result of the execution on its screen.

The memory in the RF-ID unit or the child device has a limited capacity due to restriction on power consumption, a volume, or a cost. Therefore, a common program cannot be stored in the memory. However, the use of the connection program and the server as described in the embodiment of the present invention allows an infinitely large program to be executed.

A huge program may be executed on the server. Or, such a program may be downloaded from the server to be executed. These aspects are in the scope of the present invention.

The embodiment described with reference to FIG. 86 has been described to use a remote controller of a TV. In this example, the remote controller has a battery, buttons for switching TV channels, an antenna for reading RF-ID, a communication circuit, and an infrared light emitting unit. The remote controller can be replaced by a mobile phone to produce the same effects as described above. Since mobile phones generally have an infrared light emitting unit, they are easily used instead of remote controllers. In addition, mobile phones have a communication line. Therefore, mobile phones can offer the same capability of that of remote controller, being directly connected to the server. However, a communication cost of a mobile phone is burden of a user. A display screen of a mobile phone is significantly smaller than that of a TV. Therefore, a mobile phone may have the transmission switch 5063 as illustrated in FIG. 86. Thereby, if there is a TV near the mobile phone, the user faces the light emitting unit of the mobile phone to the TV to transmit tag data in the memory 52 of the mobile phone directly to the TV. As a result, the user can view data on a large screen of the TV having a high resolution. The above method does not incur a cost, which is greatly advantageous for the user. The communication using the readout tag data via the mobile phone line is stopped in cooperation with the transmission switch.

In this case, in the same manner as described for as the remote controller with reference to FIG. 86, the mobile phone has at least a reader for RF-ID or a Near Field Communication (NFC) unit. In the future, mobile phones are expected to have a reader function for reading RF-ID or the like. If RF-ID readers are provided to mobile phones, the present invention can be implemented with a much lower additional cost, which is greatly advantageous for the user. Moreover, the present invention can be easily implemented not only as a remote controller or a mobile phone, but also as a Personal Digital Assistance (PDA) terminal, a laptop, or a mobile media player.

Embodiment A8

Figure 88:
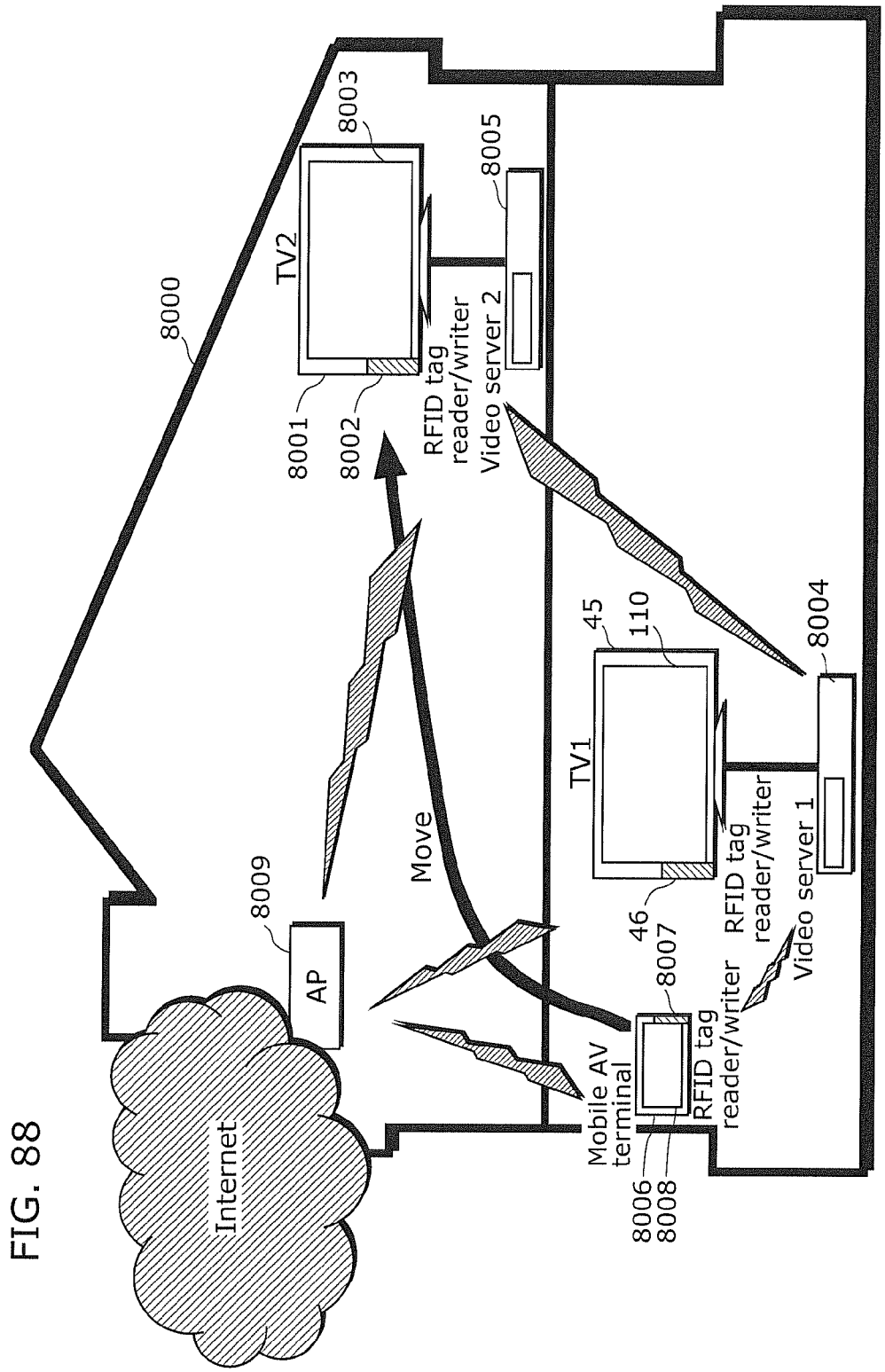
FIG. 88 is a diagram of a network environment.

FIG. 88 is a diagram of a network environment.

FIG. 88 illustrates a home network environment assumed in this embodiment. It is assumed that two TVs 45 and 8001 are present in one house, where the TVs 45 and 8001 respectively have RFID tag reader/writers and screen display units 110 and 8003. The TVs 45 and 8001 are respectively connected with video servers 8004 and 8005, enabling video data to be transmitted from the video server to the TV wiredly or wirelessly and displayed by the TV. The video server mentioned here is a storage device such as a NAS unit, or a recording device such as a BD recorder. The TVs 45 and 8001 can also access a video server outside the house via the Internet. It is further assumed that the user of the home network has a mobile AV terminal 8006 that is portable and capable of displaying video. Like the TVs, the mobile AV terminal 8006 has a RFID tag 8007 and a video display unit 8008, and can access a video server wirelessly.

In this embodiment, consider a situation where, under the above-mentioned environment, the user who is watching video on the TV 1 (45) wants to watch it on the TV 2 (8001) upstairs. In the case of moving to another place to watch the video, it is desirable that the user can watch the video seamlessly from the point up to which the user has already watched. However, in order to seamlessly move the video while maintaining security, user authentication and timing synchronization are necessary, and the user is required to perform complex operations.

To solve the above problem, processing such as user authentication and timing synchronization is performed by extremely simple information exchange through the use of RFID, in this embodiment of the present invention. In detail, the RFID tag 8007 of the mobile AV terminal 8006 is brought into proximity of the RFID tag 46 of the TV 1, to exchange information for authentication and timing synchronization through the RFID tag.

In this embodiment of the present invention, according to the above structure, video passing can be performed by an extremely simple operation of causing the mobile AV terminal and the TV touch each other, thereby significantly improving user-friendliness.

Figure 89:
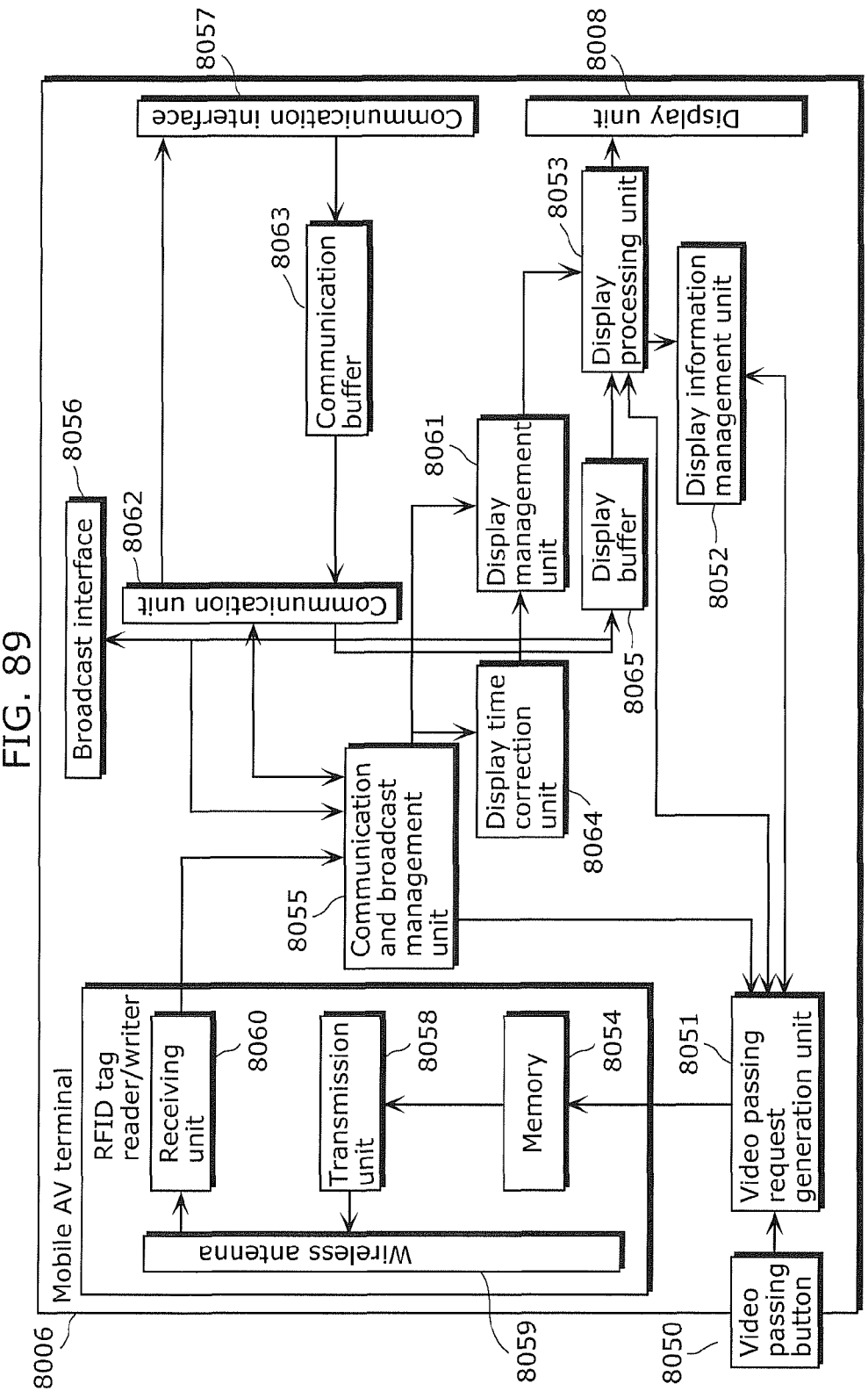
FIG. 89 is a functional block diagram of a mobile AV terminal.

FIG. 89 is a functional block diagram of each function executed by the mobile AV terminal 8006.

To perform video passing, the user presses a video passing button 8050. When the video passing button 8050 is pressed, a video passing request generation unit 8051 obtains video information currently displayed by the video display unit 8008 from a display information management unit 8052, generates a video passing request, and writes the video passing request in a memory 8054 of the RFID unit. In the case where no video is being displayed, the video passing request generation unit 8051 enters a video get mode, and generates the video passing request including a video get command. In the case where video is being displayed, the video passing request generation unit 8051 enters a video give mode, and generates the video passing request including a video give command and video information. The video information mentioned here includes video display time information managed in the display information management unit 8052 and connection destination information managed in a communication and broadcast management unit 8055. When receiving video via a broadcast interface 8056, the communication and broadcast management unit 8055 manages channel information. When receiving video via a communication interface 8057, the communication and broadcast management unit 8055 manages an identifier of a video server and an identifier of video. The identifier of the video server and the identifier of the video may be any identifiers uniquely identifying the video server and the video, such as an IP address and a URL. Note that the video passing button may be provided separately as a video get button and a video give button. Moreover, selection of whether to get or give video may be displayed on the screen when the video passing button is pressed. When another RFID tag is brought into proximity, information stored in the memory 8054 in the RFID unit is transmitted from a transmission unit 8058 via a wireless antenna 8059. In the case where no transmission is made within a predetermined time after the generation of the video passing command, the video passing mode is cancelled, and the information in the memory is discarded. A receiving unit 8060 in the RFID unit receives a video passing response. The video passing response is a response indicating whether or not the video get command or the video give command is accepted. In the case where the video passing response indicates that the video get command is accepted, the video passing response includes video information. The video passing response is outputted to the communication and broadcast management unit 8055, and the communication and broadcast management unit 8055 performs processing according to the video passing response. In the case where the video passing response indicates that the video get command is accepted, the communication and broadcast management unit 8055 performs video get processing. In the case where the video information included in the video passing response is channel information, the communication and broadcast management unit 8055 notifies the broadcast interface 8056 of the channel information, to receive data of a channel designated by the channel information. The communication and broadcast management unit 8055 also instructs a display management unit 8061 to display the data of the channel. In the case where the channel information designates a channel (a channel of BS, CS, or cable TV) that is not receivable by the broadcast interface 8056 of the mobile AV terminal 8006, the communication and broadcast management unit 8055 requests a communication unit 8062 to search for a terminal that is capable of receiving data of the channel and transferring it to the communication interface 8057. Note that the search for the terminal that serves to transfer the data of the channel may be performed beforehand. Even when the data of the channel is received by the communication interface 8057, the data of the channel is displayed by the video display unit 8008 in the same way as in the normal case. In the case where the video information included in the video passing response is connection destination information, the communication and broadcast management unit 8055 notifies the communication unit 8062 of the connection destination information, to transmit a video transmission request to a connection destination. The video transmission request includes a video display time, and data transmission is requested according to this time. Note that, unlike video reception by the broadcast interface 8056, video reception by the communication interface 8057 may take some time. This depends on preprocessing for receiving video data by the communication interface 8057 and a time period during which video data is temporarily stored in a communication buffer 8063. In the method of this embodiment, unnecessary data transmission and a waiting time associated with it may be reduced by predicting such a time beforehand and issuing the video transmission request from the communication unit 8062 on the basis of the predicted time. In this case, a display time correction unit 8064 performs correction so that video can be displayed seamlessly. This is possible because data of digital video is typically stored in a display buffer 8065 and displayed by the video display unit 8008 while being processed by a display processing unit 8053. On the other hand, in the case where the video passing response indicates that the video give command is accepted, screen display is cleared. Note that the screen display may be automatically cleared, or whether or not to clear the screen display may be selected by the user. Alternatively, the screen display may be cleared upon receiving a screen display clearing instruction from the terminal to which video is passed. Moreover, a timer may be provided so that the screen display is cleared after a predetermined time has elapsed.

Figure 90:
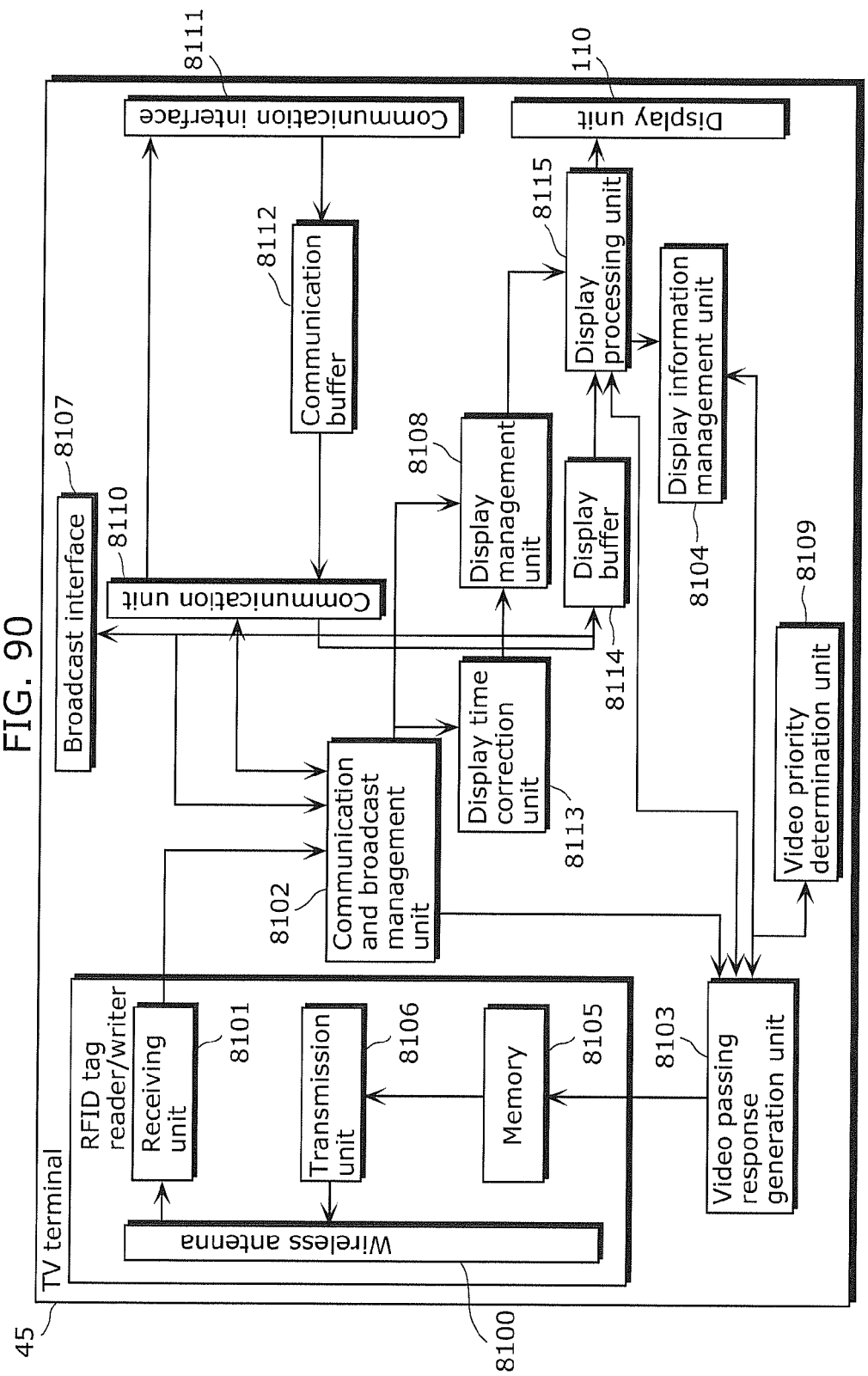
FIG. 90 is a functional block diagram of a TV.

FIG. 90 is a functional block diagram of each function executed by the TV.

A receiving unit 8101, upon receiving a video passing request from an antenna 8100 of a RFID tag, outputs the video passing request to a communication and broadcast management unit 8102. In the case where the received video passing request is a video get command, the communication and broadcast management unit 8102 outputs managed connection destination information of displayed video, to a video passing response generation unit 8103. Upon receiving the connection destination information, the video passing response generation unit 8103 obtains display time information from a display information management unit 8104, generates a video passing response, and writes the video passing response in a memory 8105 in the RFID unit. Here, when the video passing response generation unit 8103 cannot obtain desired information, the video passing response generation unit 8103 generates the video passing response indicating that the video passing request is rejected. A transmission unit 8106 transmits the written video passing response to the RFID unit of the mobile AV terminal 8006. Video display termination processing after transmission is the same as in the mobile AV terminal 8006. In the case where the received video passing request is a video give command, on the other hand, the communication and broadcast management unit 8102 performs processing according to information included in the video passing request. In the case where channel information is included in the video passing request, the communication and broadcast management unit 8102 notifies a broadcast interface 8107 of the channel information, to receive data of a desired channel designated by the channel information. The communication and broadcast management unit 8102 then notifies a display management unit 8108 of the data of the channel, thereby changing the display. In the case where the video giving command is received while video is being displayed, determination of which video is to be prioritized may be made by a video priority determination unit 8109, or a selection command may be displayed. In the case where connection destination information is included in the video passing request, the communication and broadcast management unit 8102 notifies a communication unit 8110 of the connection destination information, to transmit a video transmission request. Subsequent processing is the same as in the mobile AV terminal. Moreover, the functions of the other units are the same as those in the mobile AV terminal.

Figure 91:
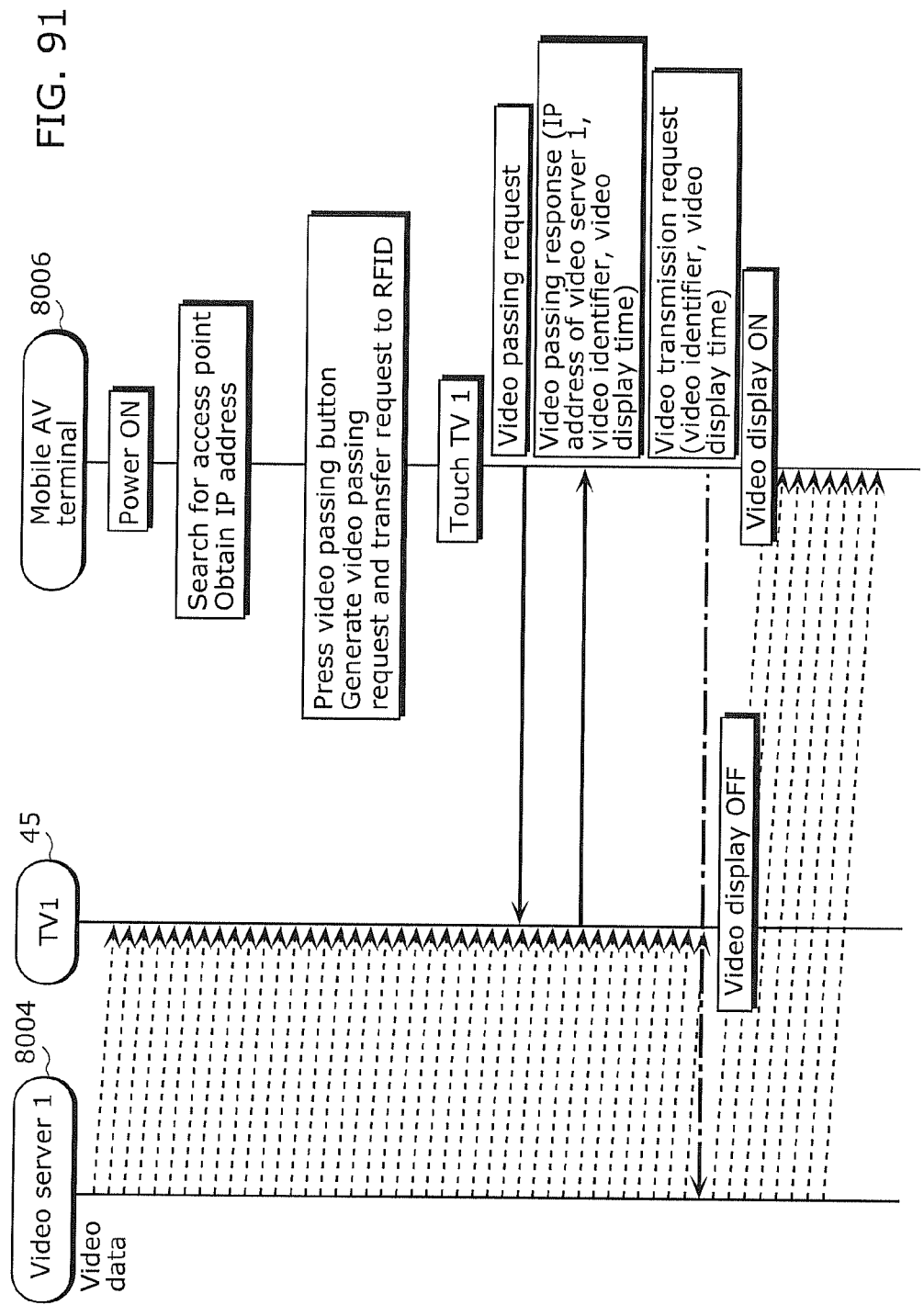
FIG. 91 is a sequence diagram in the case where the mobile AV terminal gets video (first half, control performed by get side).

FIG. 91 is a sequence diagram in the case where, when the TV 1 (45) is receiving video from the video server 1 (8004), the video is passed to the mobile AV terminal 8006.

To perform video passing, the user powers on the mobile AV terminal 8006. The mobile AV terminal 8006 searches for an access point 8009 of the wireless LAN, and establishes wireless connection. The mobile AV terminal 8006 also obtains an IP address by DHCP or the like, and establishes IP connection. In the case where the mobile AV terminal 8006 is a DLNA terminal, DLNA terminal search processing such as M-SEARCH may be performed. The user presses the video passing button, to generate a video passing request in the memory in the RFID unit. The user further brings the RFID tag 8007 of the mobile AV terminal 8006 into proximity of the RFID tag reader/writer 46 of the TV 1, to transmit the video passing request to the TV 1. Upon receiving the video passing request, the TV 1 generates a video passing response (including an IP address of the video server 1, a video identifier, and a video display time), and returns the video passing response to the mobile AV terminal 8006. It is assumed here that the TV 1 obtains the IP address of the video server 1 beforehand, even when the video receiving means of the TV 1 has no IP connection such as a HDMI cable. In the case where the video is in encrypted form, necessary security-related information (such as a key) is exchanged at the same time. Upon receiving the video passing response, the mobile AV terminal 8006 transmits a video transmission request (including the video identifier and the video display time) to the IP address of the video server 1 included in the video passing response. Upon receiving the video transmission request, the video server 1 (8004) switches a video transmission destination to the mobile AV terminal 8006. Having no longer received the video data, the TV 1 (45) turns video display OFF.

Figure 92:
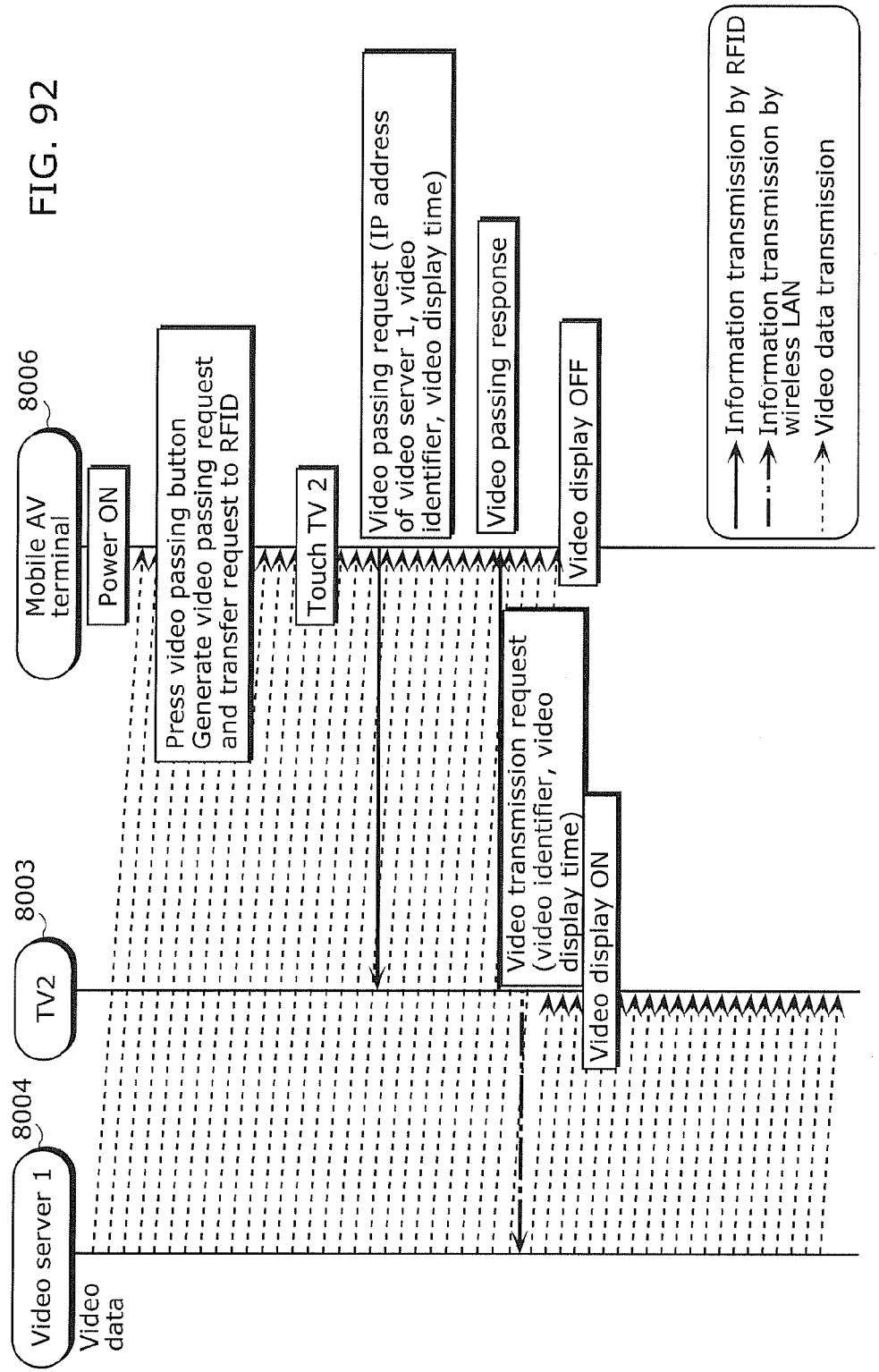
FIG. 92 is a sequence diagram in the case where the mobile AV terminal gives video (second half, control performed by get side).

FIG. 92 is a sequence diagram in the case where, when the mobile AV terminal 8006 is receiving the video from the video server 1 (8004), the video is passed to the TV 2 (8003).

The user presses the video passing button of the mobile AV terminal 8006, to generate a video passing request (including the IP address of the video server 1, the video identifier, and the video display time). The user further brings the RFID tag 8007 of the mobile AV terminal 8006 into proximity of a RFID tag reader/writer 8002 of the TV 2, to transmit the video passing request to the TV 2. The TV 2 (8003) generates a video passing response indicating that the video passing request is accepted, and returns the video passing response to the mobile AV terminal 8006. The TV 2 (8003) transmits a video transmission request to the video server 1 (8004). Subsequent processing is the same as in FIG. 91.

Figure 93:
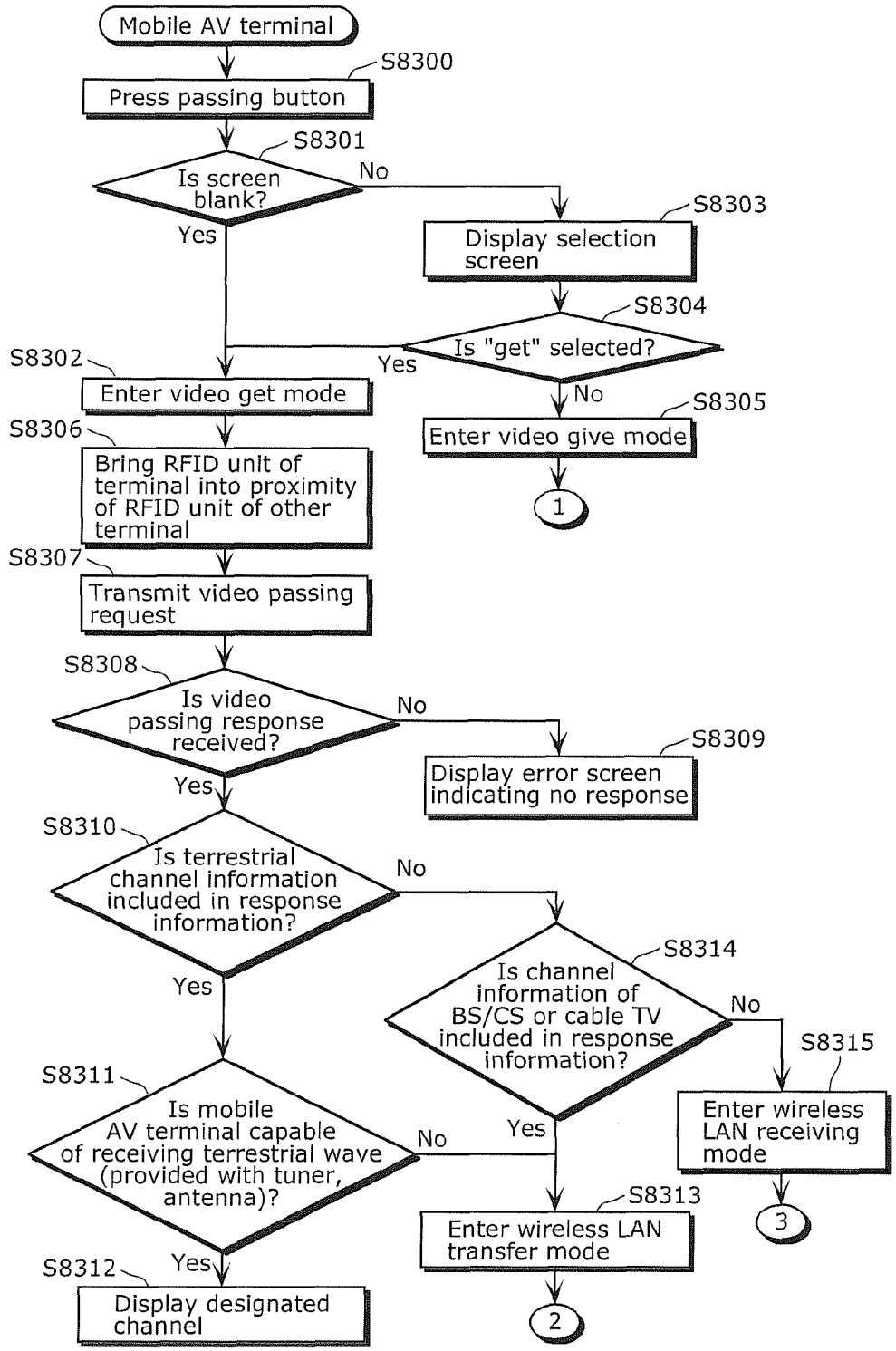
FIG. 93 is a basic flowchart of the mobile AV terminal.

FIG. 93 is a flowchart of processing of the mobile AV terminal 8006.

When the user presses the video passing button (S8300), the mobile AV terminal 8006 enters a video get mode (S8302) in the case where the screen is blank (or has no video display) (S8301). In the case where the screen is not blank, a selection screen is displayed (S8303). When the user selects "get" (S8304), the mobile AV terminal 8006 equally enters the video get mode. When the user selects "give", the mobile AV terminal 8006 enters a video give mode (S8305). In the video get mode, the mobile AV terminal 8006 stores a video passing request including a video get command in the memory 8105 in the RFID unit. The user brings the RFID unit of the mobile AV terminal 8006 into proximity of the RFID unit of the other terminal (S8306), to transmit the video passing request to the other terminal (S8307). Upon receiving a video passing response from the other terminal (S8308), the mobile AV terminal 8006 performs processing according to information included in the video passing response. In the case where no response is obtained, the mobile AV terminal 8006 displays an error screen indicating no response, and ends processing (S8309). In the case where terrestrial channel information is included in the video passing response, the mobile AV terminal 8006 determines whether or not the mobile AV terminal 8006 is capable of receiving the corresponding channel (that is, whether nor not the mobile AV terminal 8006 has a tuner and an antenna and is in a terrestrial wave receivable range). In the case where the mobile AV terminal 8006 is capable of receiving the channel (S8311), the mobile AV terminal 8006 displays data of the designated channel. In the case where the mobile AV terminal 8006 is not capable of receiving the channel, the mobile AV terminal 8006 enters a wireless LAN transfer mode (S8313). Likewise, in the case where channel information of BS or the like, which is basically not receivable by the mobile AV terminal 8006, is included in the video passing response (S8314), the mobile AV terminal 8006 enters the wireless LAN transfer mode. On the other hand, in the case where no channel information is included in the video passing response, the mobile AV terminal 8006 enters a wireless. LAN receiving mode (S8315).

Figure 94:
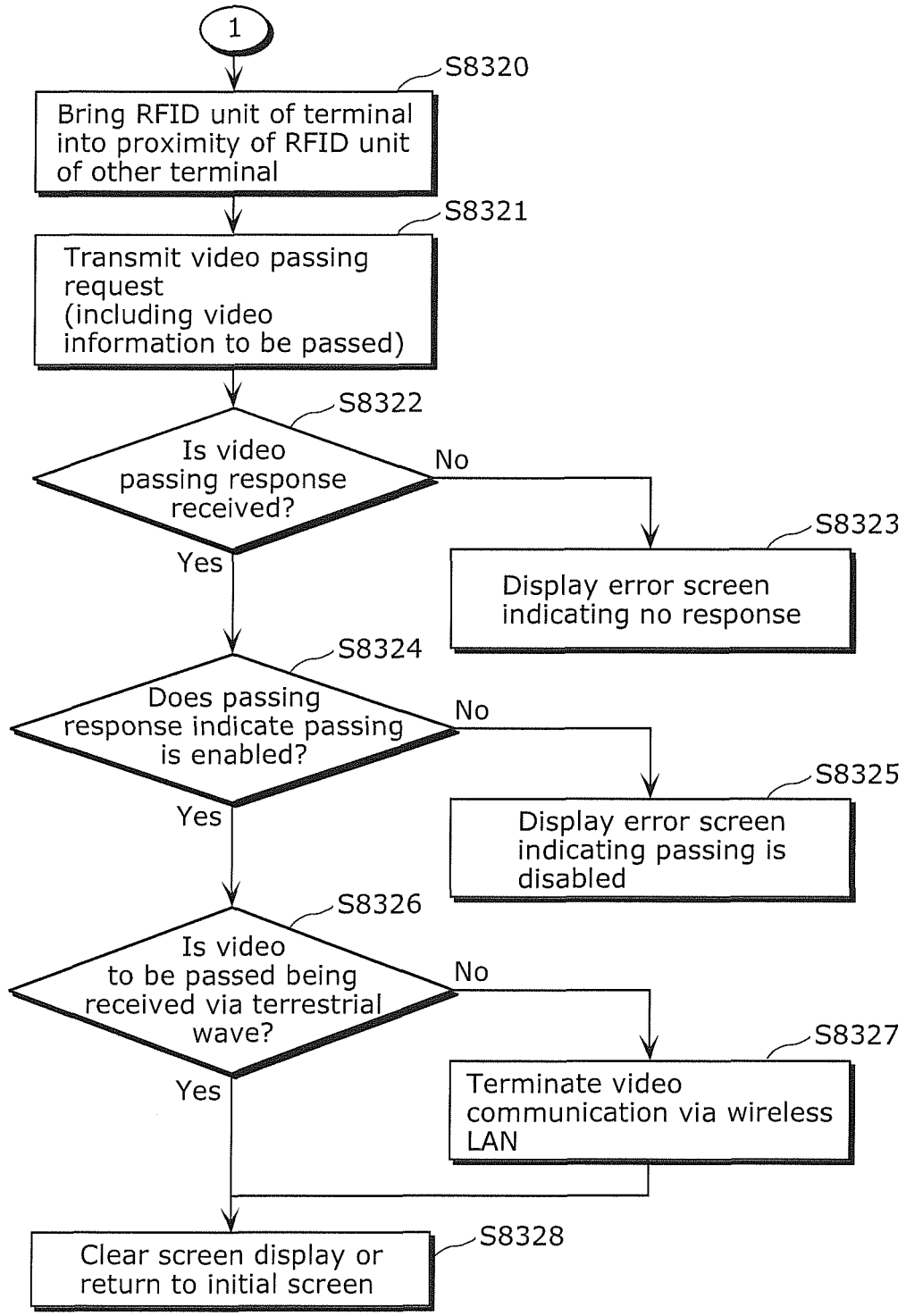
FIG. 94 is a flowchart of a give mode of the mobile AV terminal.

FIG. 94 is a flowchart of processing of the mobile AV terminal 8006 in the video give mode.

In the video give mode, the mobile AV terminal 8006 stores a video passing request including a video give command and information of video to be given, in the memory 8054 in the RFID unit. The user brings the RFID unit of the mobile AV terminal 8006 into proximity of the RFID unit of the other terminal (S8320), to transmit the video passing request to the other terminal (S8321). Upon receiving a video passing response from the other terminal (S8322), the mobile AV terminal 8006 performs processing according to information included in the video passing response. In the case where no response is obtained, the mobile AV terminal 8006 displays an error screen indicating no response, and ends processing (S8323). In the case where the video passing response indicates that video passing is disabled (S8324), the mobile AV terminal 8006 displays an error screen indicating that video passing is disabled, and ends processing (S8325). In the case where video passing is enabled and video to be passed is being received via terrestrial wave (S8326), the mobile AV terminal 8006 stops screen display of terrestrial broadcasting. Otherwise, the mobile AV terminal 8006 performs termination processing of video that is being received via wireless LAN, according to a type of corresponding receiving system (S8327). The mobile AV terminal 8006 thereby stops screen display. Note that the screen display may be stopped according to an instruction from the terminal on the video give side, or the screen display may be switched to another screen such as an initial screen (S8328).

Figure 95:
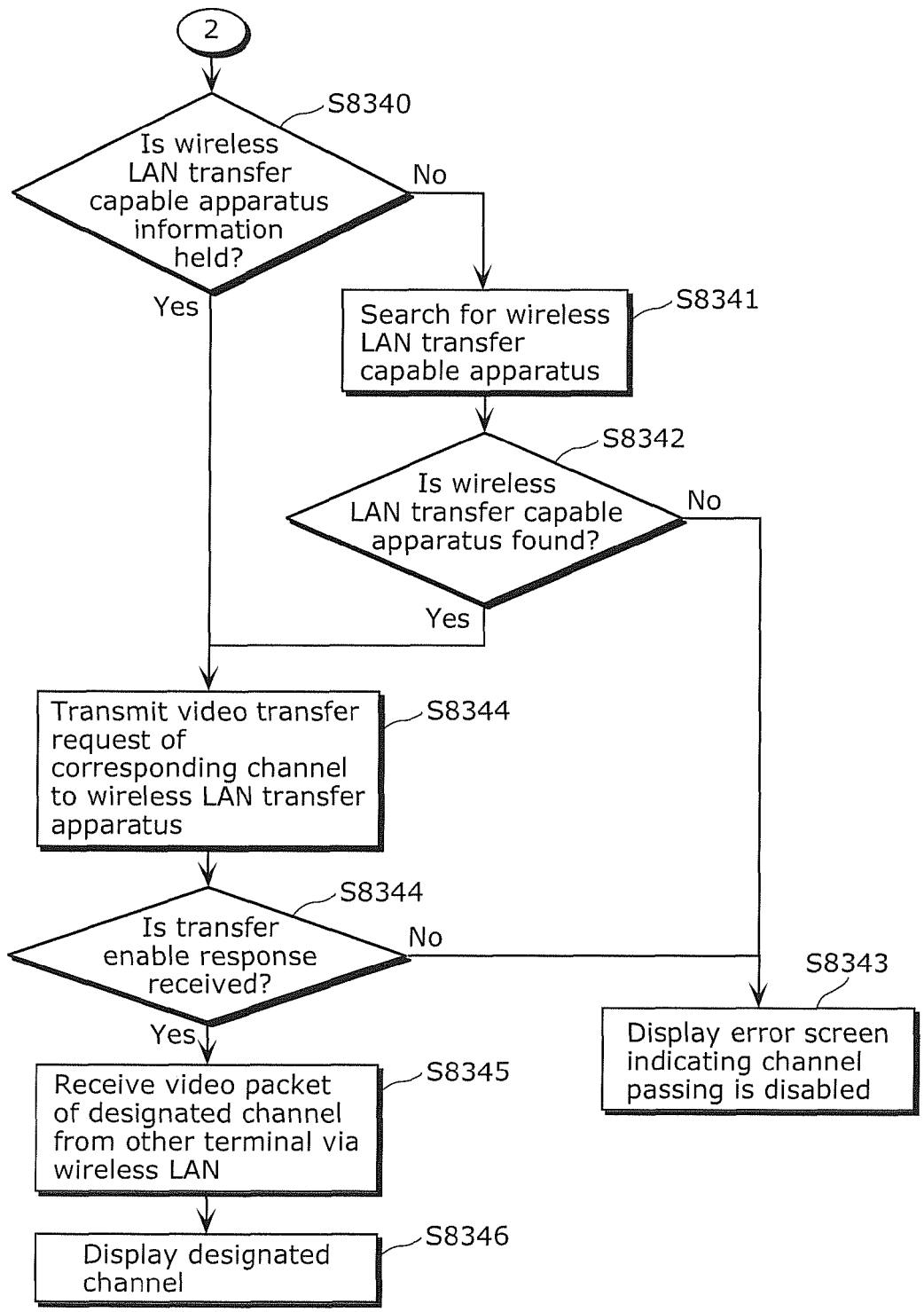
FIG. 95 is a flowchart of a get mode of the mobile AV terminal.

FIG. 95 is a flowchart of processing of the mobile AV terminal 8006 in the wireless LAN transfer mode.

The mobile AV terminal 8006 is assumed to be a terminal that is capable of receiving terrestrial wave but is not capable of receiving satellite broadcasting and cable TV broadcasting. To receive such broadcast wave, the broadcast wave needs to be received by another terminal capable of receiving the broadcast wave, and transferred to the mobile AV terminal 8006 via wireless LAN. In the wireless LAN transfer mode, the mobile AV terminal 8006 calls information of a wireless LAN transfer capable apparatus. In the case where the information of the wireless LAN transfer capable apparatus is not held in the mobile AV terminal 8006 (S8340), the mobile AV terminal 8006 searches for the wireless LAN transfer capable apparatus (S8341). In the case where the wireless LAN transfer capable apparatus cannot be found in the house, the mobile AV terminal 8006 displays an error screen indicating that channel passing is disabled (S8342). In the case where the wireless LAN transfer capable apparatus is found or the information of the capable apparatus is held in the mobile AV terminal 8006, the mobile AV terminal 8006 transmits a video transfer request for the channel, to the wireless LAN transfer capable apparatus (S8344). In the case where a video transfer enable response is returned from the wireless LAN transfer capable apparatus, the mobile AV terminal 8006 receives video packets of the designated channel via wireless LAN (S8345), and displays the video of the designated channel (S8346).

Figure 96:
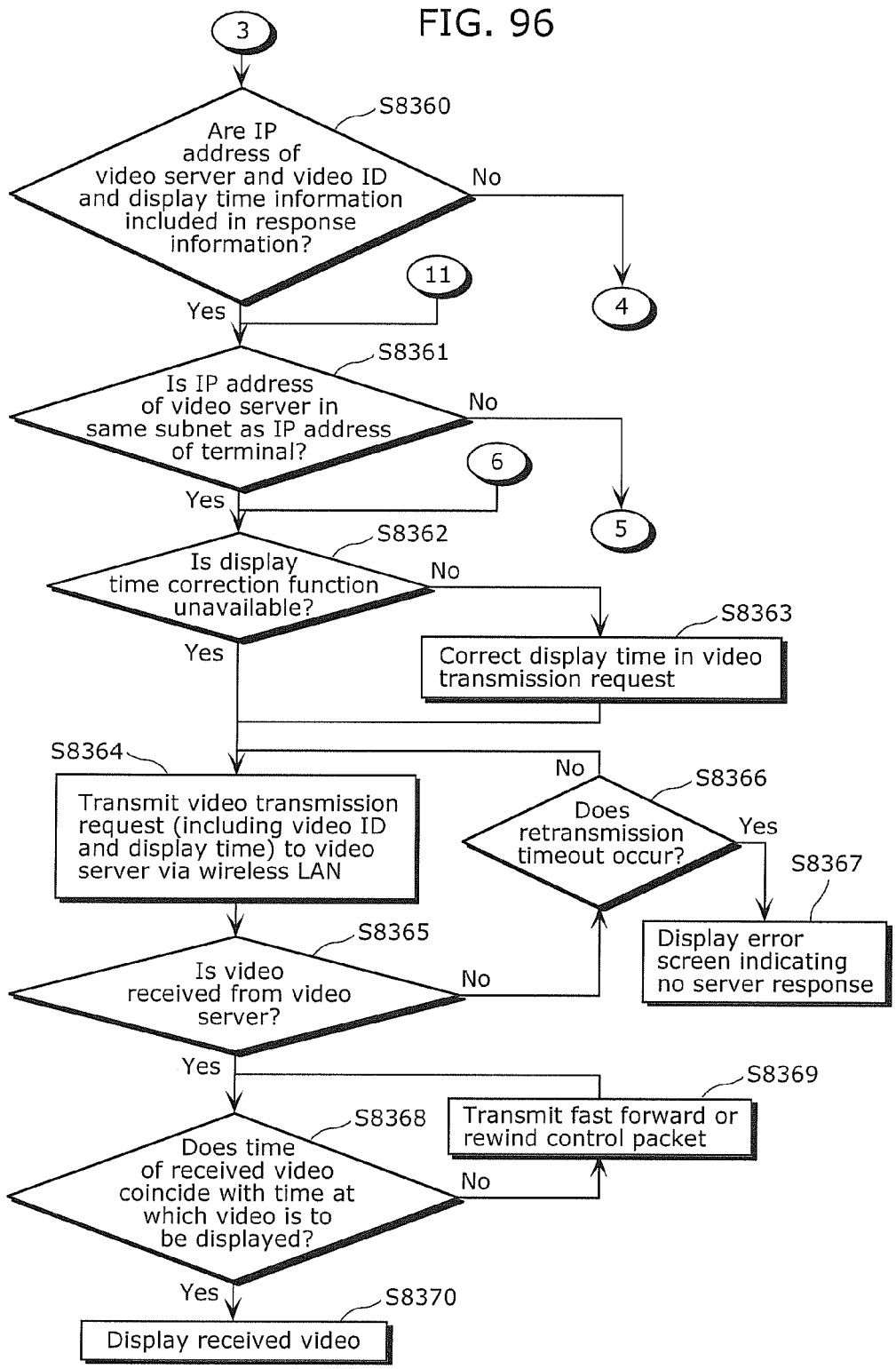
FIG. 96 is a flowchart of a wireless get mode of the mobile AV terminal.

FIG. 96 is a flowchart of processing of the mobile AV terminal 8006 in the wireless LAN receiving mode.

In the wireless LAN receiving mode, in the case where the video passing response includes an IP address of a video server and an ID and display time information of video (S8360), the mobile AV terminal 8006 accesses the video server. First, the mobile AV terminal 8006 determines whether or not the IP address of the video server is in the same subnet as the IP address of the mobile AV terminal 8006 (S8361). In the case where the IP address of the video server is in the same subnet as the IP address of the mobile AV terminal 8006, the mobile AV terminal 8006 transmits a video transmission request including the video ID and display time, to the video server (S8364). Note that, in the case where a delay time correction function is available (S8362), the mobile AV terminal 8006 corrects the display time information in the video transmission request (S8363). Here, the display time correction function denotes a correction function that is executed to perform efficient video transfer in consideration of various delay in processing. In the case where video cannot be received from the video server (S8365), the mobile AV terminal 8006 may retransmit the video transmission request. In the case where there is no response even after a predetermined retransmission timeout occurs (S8366), the mobile AV terminal 8006 displays an error screen indicating no server response (S8367). In the case where the time of the received video data does not coincide with the time of display (S8368), the mobile AV terminal 8006 adjusts the time to the time of display using a control packet for fast-forward or rewind (S8369). The mobile AV terminal 8006 then displays video.

Figure 97:
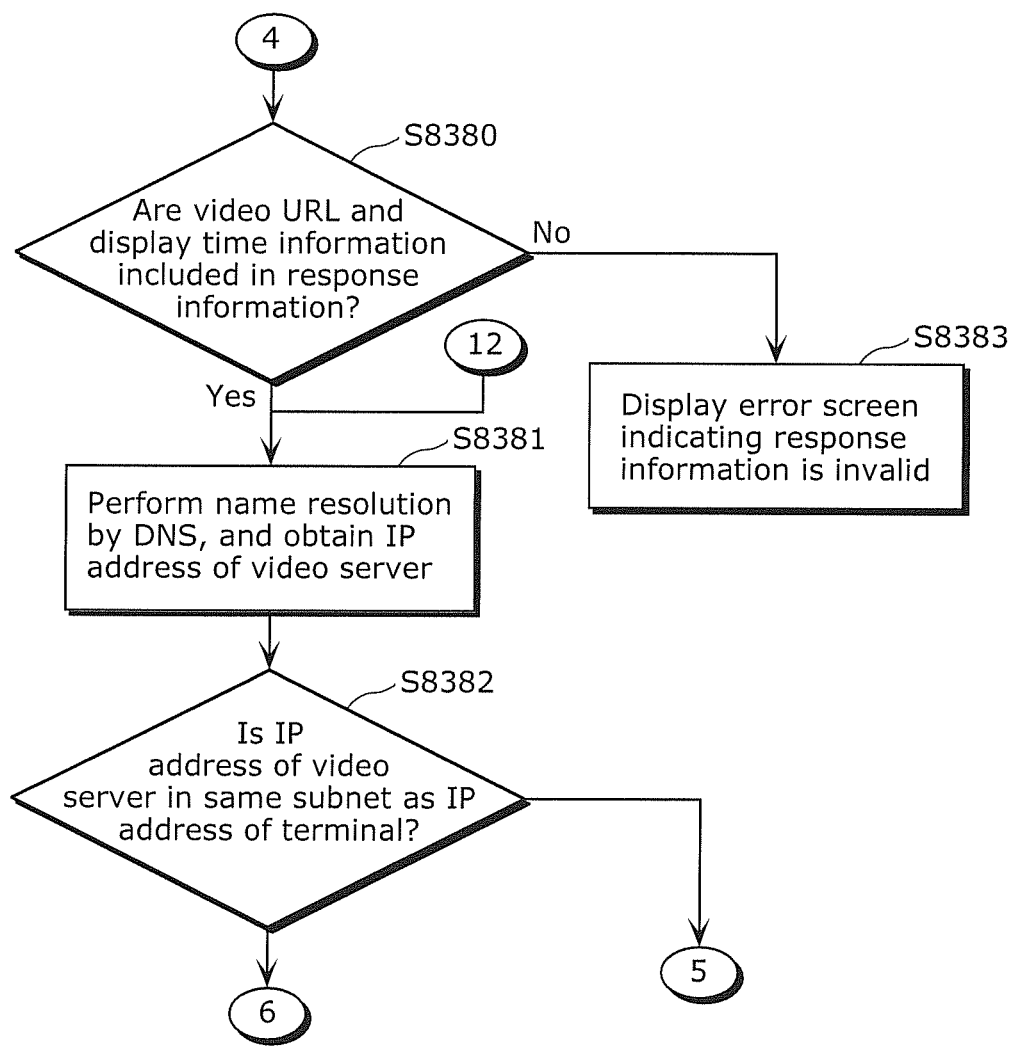
FIG. 97 is a flowchart of a URL get mode of the mobile AV terminal.

FIG. 97 is a flowchart of processing in the case where a URL is included in the video passing response.

In the case where the URL is included (S8380), the mobile AV terminal 8006 performs name resolution by DNS, to obtain the IP address of the video server (S8381). Note that the URL for video may be any name assigned for video service. The name resolution also includes conversion from a service identifier to a terminal identifier other than DNS. In the case where the obtained IP address of the video server is the same as the IP address of the mobile AV terminal 8006, the mobile AV terminal 8006 returns to the processing described in FIG. 96. In the case where the IP address of the video server is not in the same subnet as the IP address of the mobile AV terminal 8006, the mobile AV terminal 8006 proceeds to connection processing to a server outside the subnet. In the case where the desired information is not included in the video passing response, the mobile AV terminal 8006 displays an error screen indicating that the video passing response is invalid.

Figure 98:
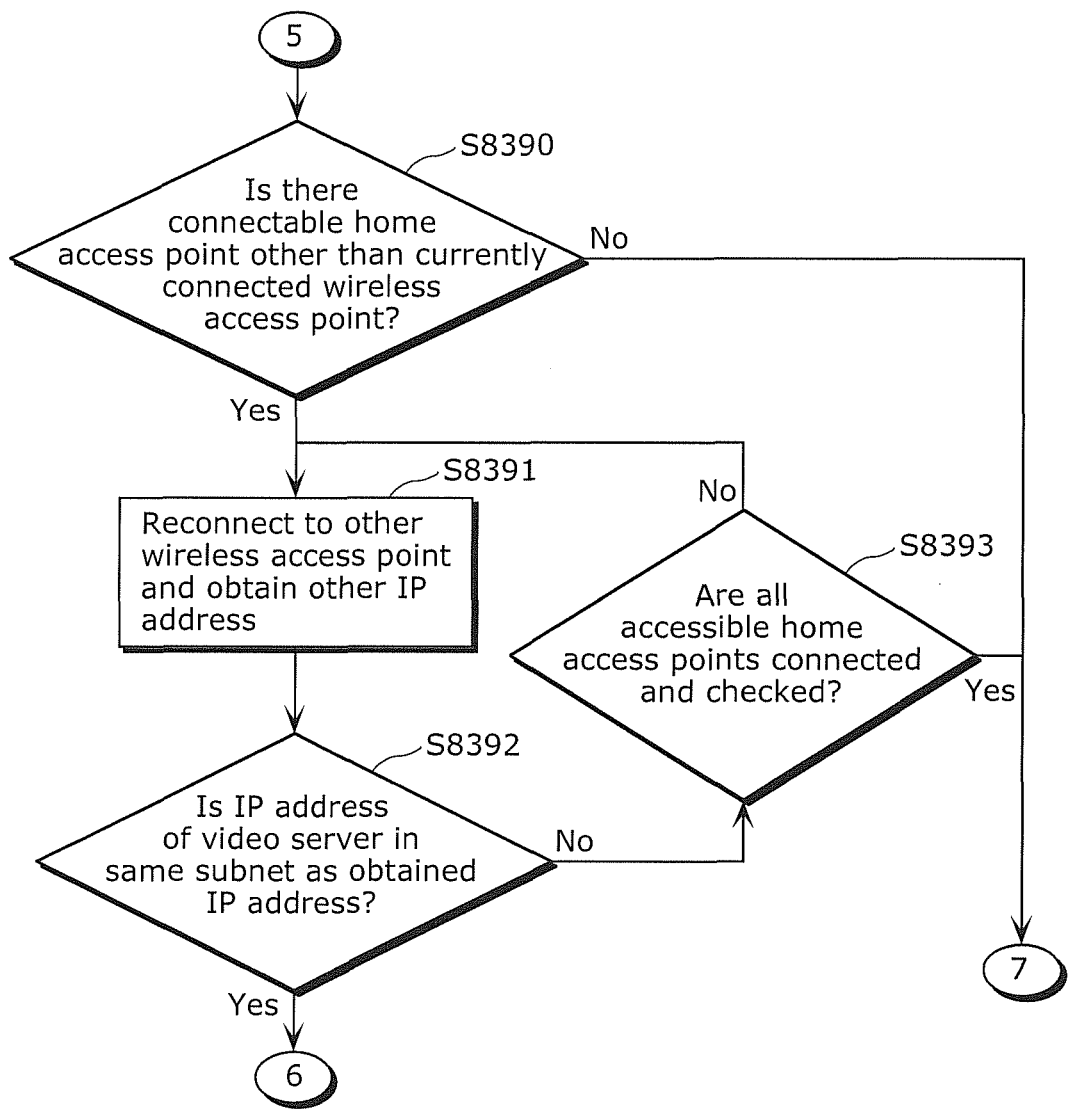
FIG. 98 is a flowchart of server position search by the mobile AV terminal.

FIG. 98 is a flowchart of processing in the case where the IP address of the video server is not in the same subnet as the IP address of the mobile AV terminal 8006.

In the case where the IP address of the video server is in a different subnet, the mobile AV terminal 8006 searches for another wireless access point. In the case where there is no other access point in the house, the mobile AV terminal 8006 determines that the video server is an external server, and proceeds to external server connection processing. In the case where there is another access point (S8390), the mobile AV terminal 8006 performs reconnection to the access point, and obtains another IP address of a subnet (S8391). In the case where the subnet of the video server is the same as the subnet of the obtained IP address (S8392), the mobile AV terminal 8006 proceeds to home server processing. In the case where the subnet of the video server is not the same as the subnet of the IP address obtained by connecting to the accessible access point in the house (S8393), the mobile AV terminal 8006 proceeds to external server access processing. Note that the mobile AV terminal 8006 may perform IP address obtainment processing for all access points beforehand and manage the processing result therein.

Figure 99:
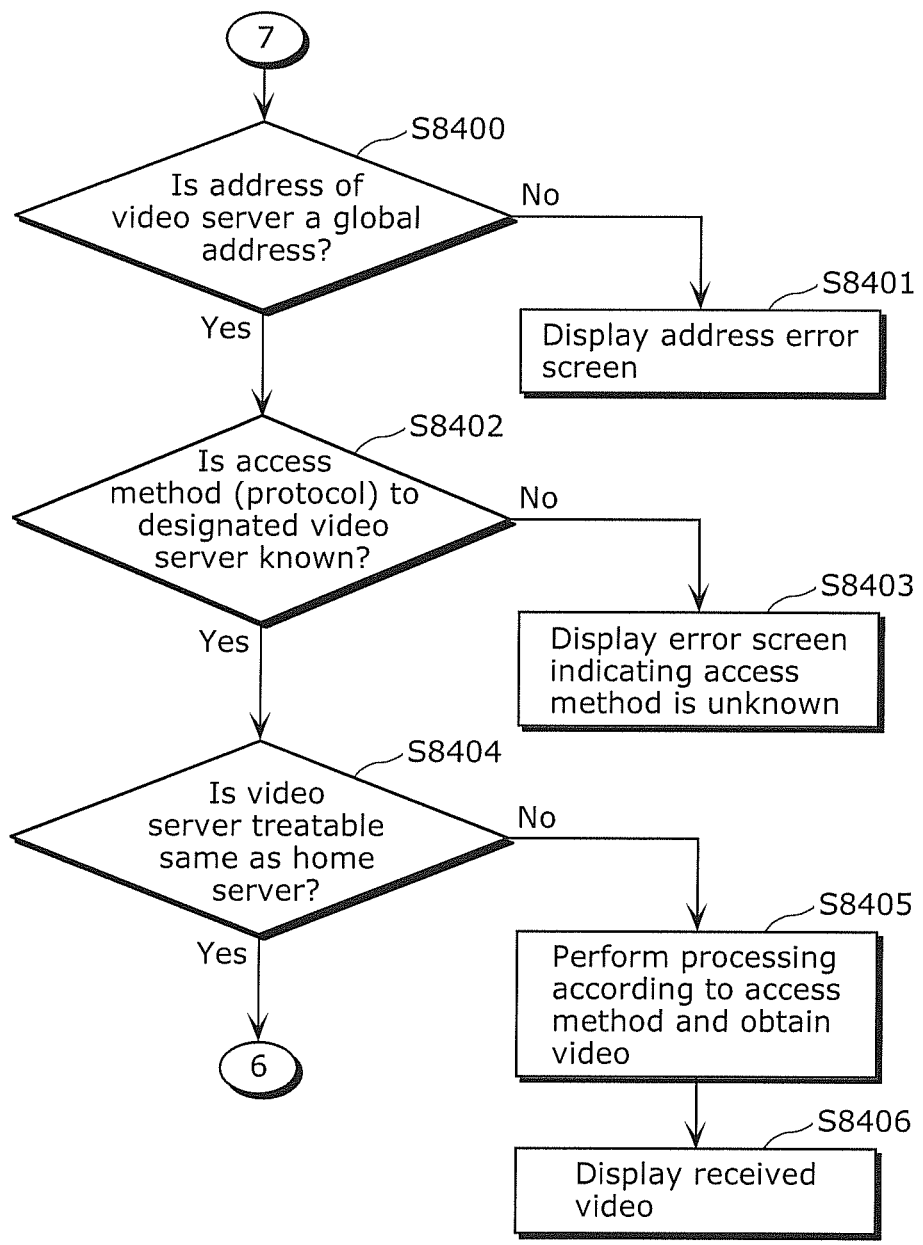
FIG. 99 is a flowchart of a mode in which the mobile AV terminal gets video from an external server.

FIG. 99 is a flowchart of processing in the case of accessing to an external server.

In the case where the address of the video server is not a global address (S8400), the mobile AV terminal 8006 displays an error screen indicating an address error (S8401). In the case where an access method to the designated video server is unknown (S8402), the mobile AV terminal 8006 displays an error screen indicating that the access method is unknown (S8403). Note that a home video server and a home video appliance are assumed to be compliant with DLNA. In the case where the access method is known and also the video server has the same function as a home server, the mobile AV terminal 8006 performs the same processing as in the case of a home server (S8404). Otherwise, the mobile AV terminal 8006 performs processing according to the access method to obtain video (S8405), and displays the received video (S8406).

Figure 100:
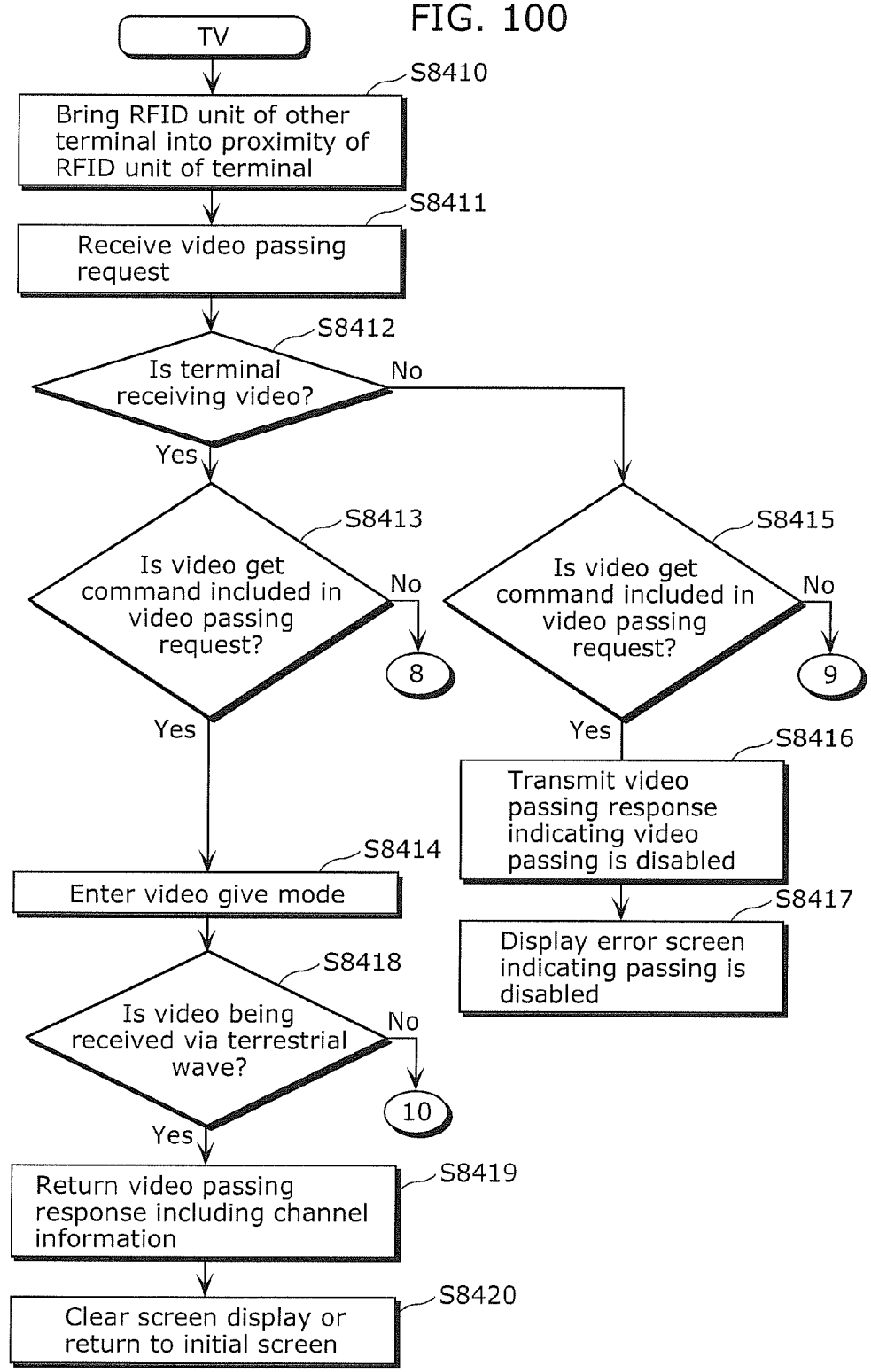
FIG. 100 is a basic flowchart of the TV.

FIG. 100 is a flowchart of processing of the TV.

When the RFID unit of the other terminal is brought into proximity of the RFID unit of the TV (S8410), the TV receives a video passing request (S8411). In the case where the TV is receiving video (S8412) and also a video get command is included in the video passing request (S8413), the TV enters a video give mode (S8414). In the case where the TV is not receiving video but the video get command is included in the video passing request (S8415), the TV returns a video passing response indicating that video passing is disabled (S8416), and displays an error screen indicating that video passing is disabled (S8417). In the case where the video is being received via terrestrial wave (S8418), the TV returns the video passing response including channel information (S8419). The TV then clears screen display (S8420).

Figure 101:
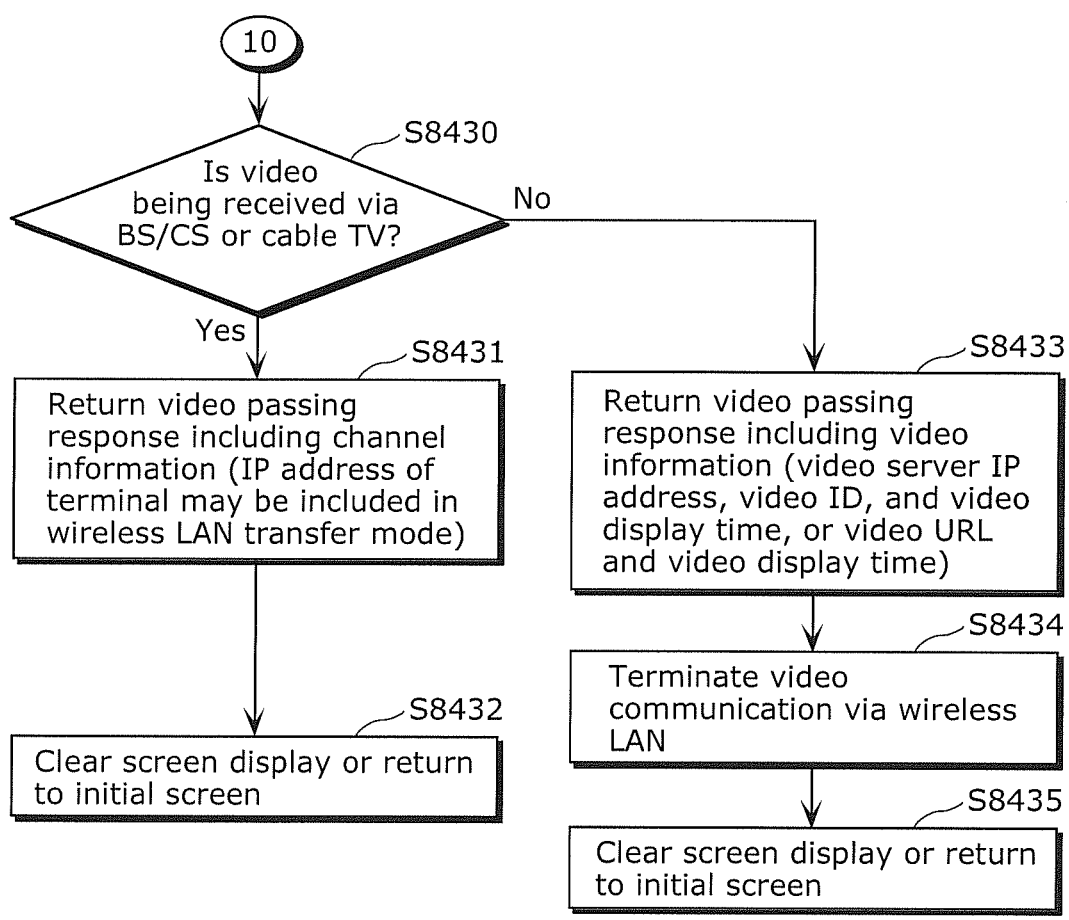
FIG. 101 is a flowchart of a give mode of the TV.

FIG. 101 is a flowchart of processing in the case where the video is being received not via terrestrial wave.

In the case where the video being received is broadcast video other than terrestrial wave (S8430), the TV returns the video passing response including channel information. In the case of a wireless LAN transfer mode, the TV may include the IP address of the TV in the video passing response (S8431). After returning the response, the TV clears screen display (S8432). In the case of other video, the TV returns the video passing response including an IP address of a video server, a video ID, and a video display time, or including a video URL and a video display time (S8433). After this, the TV performs termination processing of video communication via wireless LAN (S8434), and clears screen display.

FIG. 102 is a flowchart of processing in the case where a video give command is included in the video passing response.

When the TV receives the video give command while displaying video, the TV enters a video get mode (S8441) in the case where a double screen display function is available (S8440). In the case where the double screen display function is not available, the TV displays a selection screen of whether or not to get video (S8442). When the user selects to get video (S8443), the TV enters the video get mode. When the user selects not to get video, the TV returns a video passing response indicating that video passing is disabled (S8444). In the case where channel information is included in the video passing request (S8445), the TV displays data of a designated channel (S8446). In the case where an IP address of a video server or a URL is included in the video passing request (S8447, S8448), the TV performs the same processing as in the video get mode of the mobile AV terminal. In the case where such information is not included in the video passing request, the TV displays an information error screen (S8449).

Embodiment A9

FIG. 103 is a sequence diagram in the case where, when the TV 1 (45) is receiving video from the video server 1 (8004), the TV 1 (45) transmits a video transmission request so that the mobile AV terminal 8006 gets the video.

As in FIG. 91, the user powers on the mobile AV terminal 8006 to pass the video. The mobile AV terminal 8006 searches for the access point 8009 of wireless LAN, and establishes wireless connection. The mobile AV terminal 8006 also obtains an IP address by DHCP or the like, and establishes IP connection. The user presses the video passing button, to generate a video passing request in the memory in the RFID unit. Here, the video passing request includes the IP address of the mobile AV terminal 8006. The user further brings the RFID tag 8007 of the mobile AV terminal 8006 into proximity of the RFID tag reader/writer 46 of the TV 1, to transmit the video passing request to the TV 1 (45). The TV 1 returns a video passing response including the IP address of the video server, to the mobile AV terminal 8006. This step is intended to enhance security (to prevent arbitrary access from an irrelevant terminal), and may be omitted. As in FIG. 91, in the case where video is in encrypted form, necessary security-related information (such as a key) is exchanged at the same time. Upon receiving the video passing request, the TV 1 (45) transmits a video transmission request including the IP address of the mobile AV terminal 8006, to the video server 1 (8004). Upon receiving the video transmission request, the video server 1 (8004) switches a video transmission destination to the mobile AV terminal 8006. Subsequent processing is the same as in FIG. 91.

FIG. 104 is a sequence diagram in the case where, in the same situation as in FIG. 92, the IP address of the video server 1 (8004) is included in a video passing request.

This may be omitted as in FIG. 102. Upon receiving the video passing request, the TV 2 (8003) returns a video passing response including the IP address of the TV 2. Upon receiving the video passing response, the mobile AV terminal 8006 transmits a video transmission request including the IP address of the TV 2, to the video server 1 (8004). Upon receiving the video transmission request, the video server 1 (8004) changes the video transmission destination to the TV 2 (8003). Subsequent processing is the same as in FIG. 91.

Embodiment A10

FIG. 105 is a sequence diagram in the case where a remote controller 8200 having a RFID unit is used instead of the mobile AV terminal 8006.

Here, the remote controller is assumed to be a terminal that does not have a display unit but has a transmission and reception unit and a memory of a RFID unit. The user presses a video passing button, to generate a video passing request in the memory in the RFID unit. The user further brings the RFID unit of the remote controller 8200 into proximity of the RFID unit 46 of the TV 1, to transmit the video passing request to the TV 1. Upon receiving the video passing request, the TV 1 generates a video passing response (including the IP address of the video server 1, a video identifier, and a video display time), and returns the video passing response to the remote controller 8200. Moreover, upon receiving the video passing request from the remote controller 8200, the TV 1 (45) transmits a video stop request to the video server 1 (8004). After going upstairs, the user brings the RFID unit of the remote controller 8200 into proximity of the RFID unit of the TV 2, to transmit a video passing response (including the IP address of the video server 1, the video identifier, and the video display time). Upon receiving the video passing request, the TV 2 (8003) returns a video passing response, and transmits a video transmission request (including the video identifier and the video display time) to the video server 1. The video server 1 (8004) starts transmitting the designated video from the designated time.

Embodiment A11

FIG. 106 is a sequence diagram in the case where the video server 1 is capable of synchronous transmission.

After conducting predetermined communication with the TV 1, the mobile AV terminal transmits a video transmission request to the video server 1. Upon receiving the video transmission request, the video server 1 (8004) temporarily transmits video data to both the TV 1 (45) and the mobile AV terminal (8006). This processing is intended to achieve complete seamlessness. The mobile AV terminal and the TV 1 may both display the video temporarily, or some kind of synchronization processing may be performed to achieve complete seamlessness. The video server 1 (8006) stops video data transfer to the TV 1, on the basis of a video stop request from the mobile AV terminal (8006). Note that the TV 1 (45) may transmit the stop request, or the video server 1 (8006) may automatically stop video data transfer.

Embodiment A12

This embodiment relates to a best mode of a method for ensuring traceability in a distribution form from factory shipment to use environment of an apparatus (device) provided with a RFID tag as described in Embodiments A1 to A10.

Recently, given a need to improve distribution efficiency and also an increase in number of accidents caused by aging of home electrical products, there has been debate for ensuring traceability, namely, an ability to trace from manufacture and distribution through to a use environment by a consumer.

As an example, an attempt has been made to enable management from manufacture to distribution to a retailer, by adding a passive RFID tag that uses a communication frequency in a band of 860 to 900 MHz, to a package, a returnable container, or the like. The band of 860 to 900 MHz is also called a UHF (UltraHigh Frequency) band. The RFID tag in the UHF band can exhibit a largest communication distance in the passive type (i.e., the type of tag to which power is supplied from outside), and is capable of communication of 2 to 3 m though depending on output magnitude. Accordingly, by simultaneously passing a plurality of products through a RFID reader gate during transportation, RFID information of the plurality of products can be instantly read with efficiency. Hence, the RFID tag is particularly expected to be used in the field of distribution.

However, such a RFID tag of the UHF band has the following problem. Though the RFID tag certainly has an advantage of long-distance communication, the apparatus cannot be traced once it has been delivered to the consumer because the RFID tag is added to the package or the returnable container. Besides, the long-distance feature is not particularly effective in an entity interface, an object interface, or an intuitive interface described in Embodiments A1 to A10 where apparatuses are brought into proximity of each other to trigger an action.

Meanwhile, the RFID tag (47) described in Embodiments A1 to A10 is assumed to be a HF-RFID tag in a band of 13.56 MHz (though this is not a limit for the present invention). HF-RFID has a feature of short-distance communication (within about several ten cm though depending on output). For instance, the HF-RFID tag is widely used in applications that intuitively trigger an action by bringing two terminals close to each other, such as electronic money and ticket gate systems. This being so, for example when the user wants to display photographs captured by a digital camera on a TV, the user brings the digital camera 1 close to the RFID reader/writer 46 of the TV, thereby realizing an entity interface where an entity (camera) and an entity (TV) operate in conjunction with each other or an intuitive interface where digital camera photographs are displayed on the TV.

In this embodiment, the HF-RFID tag is added to the apparatus (device) as in Embodiments A1 to A10, and also the UHF-RFID tag is added to the package or the returnable container of the apparatus, to ensure product traceability even after the product is reached the use environment of the consumer.

Figure 107:
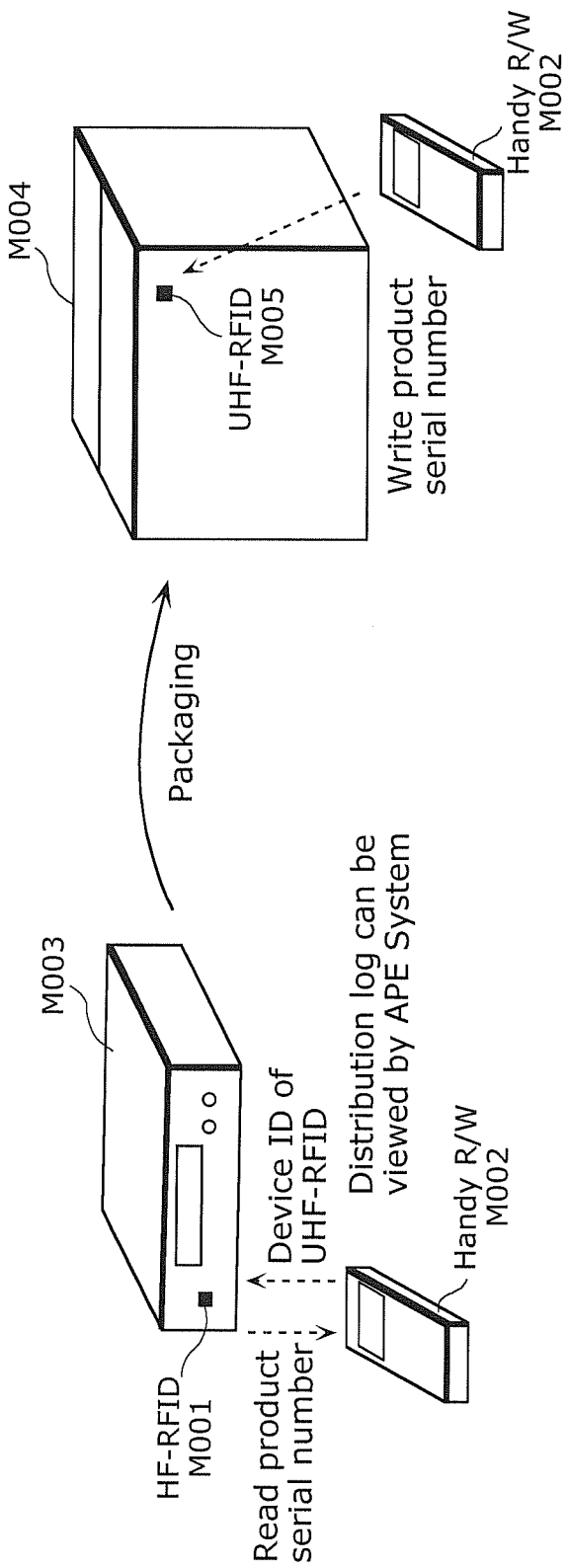
FIG. 107 is a schematic diagram illustrating processing of HF-RFID and UHF-RFID upon apparatus factory shipment.

FIG. 107 is a schematic diagram illustrating processing of HF-RFID and UHF-RFID upon apparatus factory shipment.

Though this embodiment describes the case where the apparatus is a recorder, the apparatus is not limited to such and may be any of a digital home appliance, a food, and the like.

An apparatus M003 assembled in a manufacturing line is provided with a HF-RFID tag M001. The HF-RFID tag M001 has a memory, which has a structure of a dual interface that is accessible from both the apparatus M003 and a communication unit of the RFID tag M001. A product serial number of the apparatus and a program (command) for copying the product serial number of the apparatus to the UHF-RFID tag are stored in the memory of the HF-RFID tag M001, in an assembly stage.

After the assembly of the apparatus M003 is completed, prior to packaging, a handy reader/writer M002 reads the product serial number from the memory of HF-RFID, and also records a device ID of UHF-RFID (UHF-RFID unique information) indicating that the UHF-RFID tag is added to the package or the like.

Next, having packaged the apparatus M003, a UHF-RFID tag M005 is added to a package M004. The UHF-RFID tag M005 may be directly added to the package, or may be added to a management table or the like. After adding the UHF-RFID tag M005, the handy reader/writer M002 records the product serial number and the like read from the HF-RFID tag M001 of the apparatus M003, to the UHF-RFID tag M005. In this embodiment, the handy reader/writer M002 is capable of accessing both HF-RFID and UHF-RFID.

Thus, the product serial number of the apparatus M003 is recorded on the HF-RFID tag M001, and the same information is also recorded on the UHF-RFID tag M005 of the package M004. Therefore, in distribution after packaging, there is no need to read the product serial number and the like from the HF-RFID tag that is capable of only short-distance access. By simultaneously passing a plurality of products through the gate, the information can be directly read from the UHF-RFID tag. This contributes to more efficient distribution.

Moreover, after the apparatus M003 reaches the use environment of the consumer, the HF-RFID tag can be read by a remote controller of a TV and the like. Hence, not only the distribution but also the apparatus reaching the consumer can be traced. As a result, overall traceability that contributes to improved distribution efficiency and prevents accidents caused by aged deterioration during apparatus use can be achieved.

FIG. 108 is a schematic diagram illustrating a recording format of a memory accessible from the UHF-RFID tag M005.

The memory of the UHF-RFID tag M005 stores a UHF device ID 1070, HF existence identification information 1071, an apparatus product serial number and actual article number 1072, a date 1073, a manufacturer 1074, a model number, lot number, and product name 1075, and a status 1076.

The UHF device ID 1070 is stored in a non-rewritable area of the memory, and is identification information for uniquely identifying the UHF-RFID tag. The UHF device ID 1070 is read by the handy reader/writer before the apparatus M003 is packaged, and recorded in the HF-RFID tag M001. Hence, even when the correspondence relation between the package and the apparatus is wrong, the correspondence relation can be checked beforehand and appropriate processing can be performed.

The HF existence identification information 1071 is identification information for determining whether or not the HF-RFID tag M001 is added to the apparatus M003. In the case where the HF-RFID tag M001 is added to the apparatus M003, when recording the product serial number and the like read from the HF-RFID tag M001 to the UHF-RFID tag M005 upon apparatus packaging, the HF-RFID existence identification information is changed to information indicating "exist". This makes it possible to determine whether or not to check the correspondence relation between UHF-RFID and HF-RFID, by referencing only the HF existence identification information 1071.

The apparatus product serial number and actual article number 1072 is at least one of the product serial number read from the HF-RFID tag M001 and an actual article number associated with the product serial number. The actual article number is a number of the apparatus used in the distribution process. It is possible to uniquely associate the actual article number with the product serial number, by equally managing the product serial number and the actual article number. Accordingly, in this embodiment, the product serial number and the actual article number are not clearly distinguished from each other but are described as the same information.

The date 1073 corresponds to a manufacturing year/month/date, and information of a date and time of manufacture of the apparatus M003 is recorded as the date 1073. This information may be recorded by the handy reader/writer M002 at the time of recording the product serial number to the UHF-RFID tag M005, or manufacturing year/month/date information stored in the HF-RFID tag M001 may be read and recorded to the UHF-RFID tag M005.

The manufacturer 1074 is identification information of a manufacturer of the apparatus M003. This information may be recorded by the handy reader/writer M002 at the time of recording the product serial number to the UHF-RFID tag M005, or manufacturer information stored in the HF-RFID tag M001 may be read and recorded to the UHF-RFID tag M005.

The model number, lot number, and product name 1075 may be recorded by the handy reader/writer M002, or the corresponding information may be read from the HF-RFID tag M001 and recorded, in the same way as the date 1073 and the manufacturer 1074. Regarding the lot number, in the case where lot management from manufacture to distribution can be conducted in a unified fashion, the information may be written by any of the two methods. However, in the case where unified management is not conducted and manufacturing line information is unclear upon packaging, reading the lot number from the HF-RFID tag M001 and recording it to the UHF-RFID tag M005 is more advantageous because stricter management can be achieved.

The status 1076 is status information in the distribution form. That is, status information necessary for tracing the apparatus, such as factory storage, factory shipment, distribution center reception, distribution center shipment, and retailer reception, is recorded as the status 1076. The status 1076 is rewritable in each distribution process.

Moreover, the UHF-RFID tag M005 stores management server specific information 1077. The management server specific information 1077 is the same information as the server specific information 48 in the second memory 52 of the HF-RFID tag M001. When packaging the apparatus M003, the server specific information is read from the HF-RFID tag M001 and copied to the UHF-RFID tag M005. This enables unified management to be performed by the same management server for both of the management in the distribution stage using UHF-RFID and the management after the apparatus is delivered to the consumer.

Therefore, after the apparatus M003 is delivered to the consumer, by reading the management server address information from the HF-RFID tag M001, accessing the management server, and making an inquiry by the apparatus product serial number 1072, trace information from manufacture to distribution managed by the management server can be visualized to the consumer. This enhances consumer assurance and safety.

Figure 109:
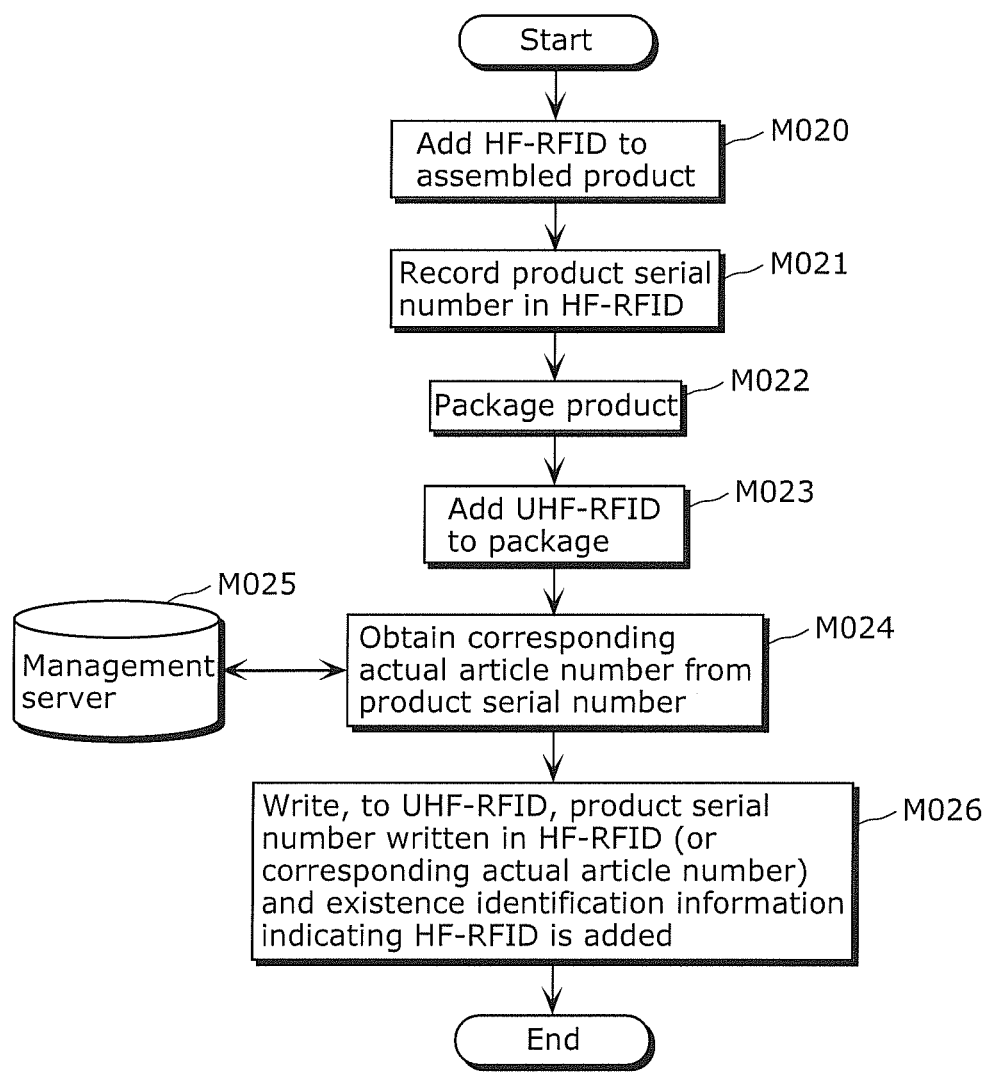
FIG. 109 is a flowchart of a flow of processing of copying a product serial number and the like from HF-RFID to UHF-RFID upon factory shipment of an apparatus M003.

FIG. 109 is a flowchart illustrating a flow of processing of copying the product serial number and the like to the UHF-RFID tag M005 from the HF-RFID tag M001 upon factory shipment of the apparatus M003.

First, the HF-RFID tag M001 is added to the assembled product (the apparatus M003) (1080). This flowchart shows an example where the HF-RFID tag is added after the assembly of the apparatus M003. However, in the case of a structure of a dual interface where the apparatus and the HF-RFID tag can both access a shared memory, the HF-RFID tag M001 is added to the apparatus M003 during assembly of the apparatus M003.

Next, the product serial number of the apparatus M0031 is recorded on the HF-RFID tag 1081 (1081). This is a step of recording the product serial number on the HF-RFID tag M001 in the assembly process through the handy reader/writer M002. The product serial number is obtained from a management server of the manufacturing line using the handy reader/writer or the like, and recorded on the HF-RFID tag M001 by proximity wireless communication.

After the product serial number is recorded on the HF-RFID tag M001, the apparatus M003 is packaged (1082). The packaging mentioned here denotes packaging for distribution with a cushioning material and the like, or containment into a returnable container and the like.

After completing the packaging, the UHF-RFID tag M005 is added to the package (including a returnable container surface, a management label, and so on) (1083).

Following this, the handy reader/writer M002 communicates with a management server 1085, thereby reading the actual article number associated with the product serial number read from the HF-RFID tag M001 (1084). The actual article number is a management number used in product distribution, and is issued by the management server. The actual article number is in a one-to-one correspondence with the product serial number.

After the actual article number is read from the management server 1085, the product serial number or the actual article number, and the existence identification information indicating that the HF-RFID tag M001 is added to the apparatus M003, are recorded on the UHF-RFID tag M005 (1086).

As a result of the above processing, the product serial number recorded on the HF-RFID tag M001 which is added to the apparatus M003 is copied to the UHF-RFID tag M005 after apparatus packaging. Typically, the communicable distance of the HF-RFID tag is short, and so it is difficult to access the HF-RFID tag after packaging. In this embodiment, however, the product serial number or the actual article number is recorded on the UHF-RFID tag that has a longer communicable distance than the HF-RFID tag and is added to the package. This allows for apparatus distribution management after packaging.

Moreover, even if the package or the like is discarded after the apparatus is delivered to the consumer, the product serial number and the like can be read by accessing the HF-RFID tag added to the apparatus. Thus, unified management from distribution to consumer use can be achieved, which contributes to traceability over a wide range.

FIG. 110 is a flowchart illustrating a flow of processing in the distribution process of the apparatus M003.

First, upon factory shipment of the apparatus M003, the product serial number or the actual article number is read from the UHF-RFID tag M005 by using a handy reader/writer or passing the product through a UHF-RFID reader gate. Shipment completion is registered in the management server 1085 that can communicate with the handy reader/writer or the UHF-RFID reader gate, and also the UHF-RFID tag M005 is accessed from the handy reader/writer or the UHF-RFID reader gate to rewrite the status (1076) in the memory of the UHF-RFID tag M005 to indicate shipment completion (1090).

After factory shipment, the product is retained in the distribution center or the like. Upon subsequent shipment from the distribution center, the product serial number or the actual article number is read from the UHF-RFID tag M005 by a handy reader/writer or a UHF-RFID reader gate, and distribution center shipment completion is registered in the management server 1085 and also the status (1076) in the UHF-RFID tag M005 is rewritten to indicate distribution center shipment completion (1092).

Likewise, upon retailer shipment, retailer shipment completion is registered in the management server 1085, and the status 1076 in the UHF-RFID tag M005 is rewritten to indicate retailer shipment completion (1094).

Lastly, when the apparatus M003 reaches the consumer, the product serial number is read from the HF-RFID tag M001 by the reading unit of the RF-ID reader/writer 46 of the TV remote controller or the like, and registered in the management server 1085 in association with TV identification information (1096). Accordingly, in this embodiment too, the server specific information 48 is recorded in the second memory 52 of HF-RFID beforehand. The server specific information 48 in this embodiment indicates the management server 1085, and includes a URL for connecting to the management server 1085. Hence, by reading the HF-RFID tag M001 of the apparatus M003 using the TV remote controller or the like having the RF reader/writer, management information from manufacture to distribution can be obtained from the management server 1085. In addition, by managing the product serial number in association with the TV identification information in the management server 1085, it is possible to store a list of apparatuses possessed by the user in the management server in association with the user's TV, without managing personal information of the user.

When the user's apparatus has a problem, a message warning the user is adequately displayed on the TV, with it being possible to prevent a serious accident.

As described above, according to this embodiment, in the manufacturing stage the apparatus and the package are respectively provided with the HF-RFID tag and the UHF-RFID tag, which each carry existence identification information of the other tag. Moreover, the product serial number and the management server specific information stored in the HF-RFID tag are copied to the UHF-RFID tag. As a result, it is possible to provide a system in which management can be performed even after the apparatus reaches the consumer while maintaining distribution management convenience, unlike a conventional system where traceability is attained only during distribution.

Though this embodiment describes management from manufacture to delivery to the user, the present invention has the same advantageous effects even when the user discards or recycles the apparatus. A procedure in this case can be realized in the same way as in this embodiment.

For example, in FIG. 107, upon factory shipment, the product serial number and the like recorded on the HF-RFID tag M001 added to the apparatus M003 are copied to the UHF- RFID tag M005 added to the package M004 after packaging. The same applies to shipment to a disposal facility or shipment to a recycling center, other than factory shipment. In the case of shipment to a disposal facility, after disposal completion, disposal completion is registered in the management server. This enables unified management to be performed while the product is manufactured, used by the consumer, and put into disposal. Recently, there is a problem of illegal disposal due to disposal cost. However, referencing HF-RFID or UHF-RFID of an illegally disposed apparatus makes it instantly clear in which part of the distribution stage the illegal disposal has been conducted. Thus, the problem of illegal disposal can be alleviated according to this embodiment.

In the case of shipment to a recycling center, since use status information, a problem detection status, a total use time, and the like detected by the use status detection unit 7020 are recorded in an area accessible from the HF-RFID tag, such information can be used for determination of whether or not the apparatus is recyclable, price determination, and so on. When the apparatus is determined as recyclable, information such as TV identification information or personal information managed in the management server 1085 in association with the product serial number may be updated and put to use.

Embodiment A13

FIG. 111 is a diagram of an overall system structure.

A semi-transmissive mirror transmission plate is attached to a mirror unit in a bathroom. A display, a power antenna, and a RF antenna unit are arranged on a back surface of the mirror transmission plate. The user has a mobile terminal with a RF antenna, and displays some kind of video information on the mobile terminal. A procedure of moving this video to the display of the mirror is described below.

FIG. 112 is a flowchart (first half) of a procedure of moving video to the display of the mirror.

FIG. 112 is a flowchart of the procedure. First, an image output button of the mobile terminal is pressed. Whether or not information or data obtained via a network or a TV channel is being displayed on the terminal is determined. When such information or data is being displayed, a URL or an IP address of a server transmitting the video or data, a stream ID of the video being displayed, stream reproduction time information, and TV channel information are obtained. After this, power transmission/reception is started from the antenna of the mobile terminal. When the antenna of the mobile terminal is brought into proximity of the antenna on the apparatus (device) side, power or a signal is transmitted from the terminal antenna to the apparatus antenna. The mobile terminal then reads attribute information on the apparatus side (video display capability, audio capability, maximum (average) communication speed of Internet inside and outside the house, whether TV channel connection is available, Internet and communication line type), via the apparatus antenna.

In the case where a video source is a TV and the apparatus is connected to a TV antenna, TV channel information and a TV image reproduction display time are transmitted to the apparatus via the antenna. The apparatus displays video of the TV channel on the screen. The image is not horizontally flipped in the case of TV.

Upon receiving a power supply enable flag from the terminal, the apparatus supplies power to the terminal.

Referring back to the previous step, in the case where the apparatus is connected to the Internet, a video rate and resolution are set according to the attribute information of the apparatus, and a server address optimal for the settings, a server ID on a DLNA network, a stream ID in a server, and stream reproduction display time information are transmitted to the apparatus via the RF antenna.

FIG. 113 is a flowchart (second half) of the procedure of moving video to the display of the mirror.

Referring to a flowchart of FIG. 113, the apparatus displays the stream so as to be synchronous with the display time of the video stream being displayed on the terminal, on the basis of the server IP address, the stream ID, and the stream reproduction display time. Once the synchronization has been established, the apparatus switches from the previous display to the next display, that is, the video on the terminal is seamlessly passed to the apparatus.

In the case where simultaneous display of the video on the terminal and the apparatus is prohibited for copyright protection, when the video display on the apparatus starts seamlessly, the video display on the terminal is stopped by means such as transmitting a video stop instruction from the apparatus to the terminal.

Moreover, when the apparatus receives, from the terminal, a "mirror flip identifier" for horizontally flipping the video on the mirror display, the apparatus horizontally flips the video in the next step. Meanwhile, horizontal flip of characters is not performed.

According to the above method, first, the terminal supplies power to the apparatus, and activates the apparatus when the apparatus is not in operation. This benefits power saving. After this, once the apparatus has started operation, then the apparatus supplies power to the terminal. In the case where the terminal receives video data from a server or the like and distributes the video to the apparatus via a network, the terminal needs to transmit the video for a long time via an access point by wireless LAN. When transmitting a large amount of data by wireless LAN, power consumption is high, and there is a possibility that the battery level of the terminal becomes 0. However, this embodiment provides an advantageous effect of preventing battery drain by supplying power from the apparatus to the terminal. Moreover, the mirror shows a reversed image of a human figure. For example, as in the case of a video instruction for toothbrushing, leaning effectiveness decreases because right and left are reversed. However, this embodiment facilitates leaning by horizontal flipping the image.

Embodiment B

The following describes Embodiment B (B1 to B7).

A communication device according to Embodiment B of the present invention is described in detail below, with reference to drawings.

For example, the following communication device is described below.

The communication device is a communication device (e.g. the communication device (mobile phone terminal) Y02 in FIG. 127, a mobile phone M1014 in FIG. 114, a mobile device N20 in FIG. 135, see the mobile communication device 98*b* in FIG. 167) that reads terminal device information (e.g. information Y015D in FIG. 127, information Y01U in FIG. 137, see the appliance information 98*n*1 in FIG. 167) from a terminal device (e.g. the terminal device Y01 in FIG. 127, a refrigerator M1013 or a microwave M1012 in FIG. 114, an air conditioner N10J in FIG. 134 (see FIG. 167, the appliance 98*a* in FIG. 167)) by proximity wireless communication (communication by an IC tag or the like, communication within a distance of several centimeters, see the proximity wireless communication 98*c*1 in FIG. 167), and transmits the read terminal device information to a server (the server Y04 in FIG. 127, a registration server M1005 in FIG. 114, see the server 98c in FIG. 167) via a general-purpose network (e.g. a network Y02N in FIG. 127, the Internet M1004 in FIG. 114), the communication device including: a terminal device information obtainment unit (an antenna Y021 in FIG. 127, see the appliance information obtainment unit 98n in FIG. 167) that obtains the terminal device information (the information Y015D, the information Y01U) from the terminal device by the proximity wireless communication, the terminal device information including at least terminal device identification information (e.g. a product serial number Y015N in FIG. 127, a product serial number Y01Un in FIG. 137) for identifying manufacturing information of the terminal device; a communication device information storage unit (a memory Y024, see a memory 98i in FIG. 166) that stores communication device information (information Y025D) including at least communication device identification information (e.g. a product serial number Y025N in FIG. 127) for identifying manufacturing information of the communication device; an information adding unit (the information adding unit Y035, see the transmission unit 98o in FIG. 167) that adds the stored communication device information (the information Y025D) to the obtained terminal device information (the information Y015D, the information Y01U), to generate transmission information (information Y036D in FIG. 127, see the transmission information 98o1 in FIG. 167) to be transmitted to the server; and a communication unit (the communication unit Y036 in FIG. 127, see the transmission unit 98o) that transmits the generated transmission information (the information Y036D) to the server via the general-purpose network, wherein the communication unit specifies the server based on the terminal device information (e.g. an address Y01Ua of the server Y04 (FIG. 137)) obtained from the terminal device, and communicates with the specified server.

According to this structure, even in the case where the device (apparatus, appliance) Y01 is the microwave M1012 or the like, the information (the product serial number Y025N of the communication terminal Y02 of the user) of the user who purchased the device Y01 can be easily transmitted to the server Y04.

Moreover, even in the case where the device Y01 is the microwave M1012 or the like, the device Y01 stores the address Y01Ua or the like for specifying the server Y04 and transmits the stored address Y01Ua or the like. The address Y01Ua or the like is obtained from such a device Y01, and transmitted to the appropriate server Y04 specified by the obtained address Y01Ua or the like. This ensures that the information is transmitted to the appropriate server Y04.

Besides, the input of the address Y01Ua via a keyboard is unnecessary, so that the information can be easily transmitted to the server Y04.

Embodiment B1

The following describes Embodiment B1 of the present invention.

FIG. 114 illustrates environments of home networks assumed in Embodiment B1.

A home network is established in each of houses M1001, M1002, and M1003 (see the home 99 in FIGS. 165 and 167). Each of the home networks is connected to a registration server M1005 via the Internet M1004. That is, each of the home networks is formed in the house (the house M1001, M1002, M1003) corresponding to the home network.

If services provided via a home network are limited within a corresponding house, the registration server M1005 may exist in the house. It is also possible that a home network is divided into various places such as a vacation house and an office, and that a plurality of home networks are used in a single house such as a dormitory or a room-sharing house.

It is assumed that, in a house, there are home appliances which are always connected to the Internet M1004 (hereinafter, referred to as "always-connected home appliances") and home appliances which are not always connected to the Internet M1004 (hereinafter, referred to as "non-always-connected home appliances"). The always-connected home appliances, such as TVs M1008 and M1009, a DVD recorder M1010, and the like, are connected to the Internet M1004 via a router M1006 or a wireless Access Point (AP) M1007 (see the access point 99c in FIG. 165). The non-always-connected home appliances, such as a digital camera M1011, a microwave M1012, and a refrigerator M1013, are indirectly connected to the Internet M1004 as needed.

For example, there may also be appliances (always-connected home appliances) connected to a device (such as the access point M1007) other than a mobile phone M1014, and appliances (non-always-connected home appliances) not connected to the other device.

In Embodiment B1, a mobile terminal such as the mobile phone M1014 is also a terminal included in the home network.

The devices in Embodiment B1 can perform simple data communication with each other by using a proximity wireless communication device. Each of the devices obtains information of other device using the proximity wireless communication device, and registers the obtained information into the registration server M1005 using a home network device.

Figure 115:
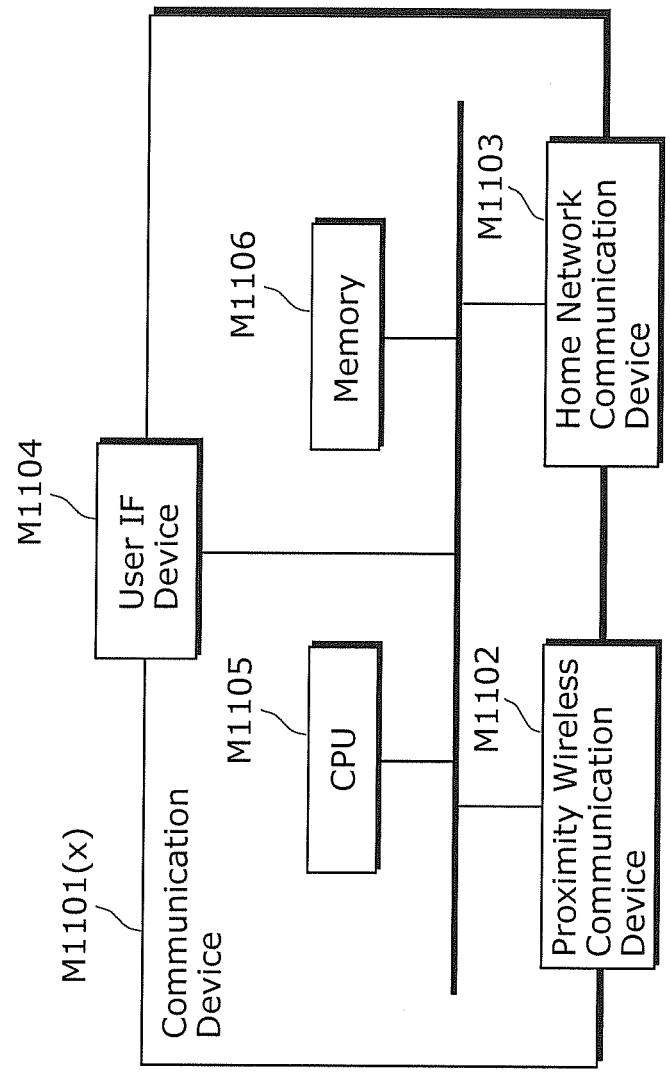

FIG. 115 is a hardware diagram of a terminal according to Embodiment B1 of the present invention.

A communication device M1101 according to Embodiment B1 of the present invention is assumed to have two devices for communication.

One communication device is a proximity wireless communication device M1102, which is typically a device of Near Field Communication (NFC) or RF tag (see, for example, a RF-ID reader/writer 98g in FIG. 166).

The other communication device is a home network communication device M1103. Examples of the home network communication device M1103 are: a wireless communication device using wireless Local Area Network (LAN) or ZigBee, which is used in connecting home appliances to each other; a wired communication device using Ethernet™ or Power Line Communication (PLC); and a communication device using WiMAX or Third Generation Partnership Project (3GPP), which is used in mobile devices (see, for example, a relay device 98k in FIG. 166).

The communication device M1101 also includes a user interface (IF) device M1104. The user IF device is, for example, an input device such as buttons, a display, and an output device using a Light Emitting Diode (LED) or the like. For devices such as TVs and air conditioners, data input/output is generally performed by using a remote controller that is physically separated from the device. For convenience of the description, such a remote controller is also considered as the user IF device M1104 in Embodiment B1 of the present invention.

FIG. 116 is a functional block diagram for explaining a function of a CPU M1105 (FIG. 115).

A device UID obtainment unit M1202 in the communication device M1101 obtains information including device UID (see the product serial number 98a1 in FIG. 167) for identifying a registration device M1201 (that is a device to be registered) (see the appliance 98a in FIG. 167).

Here, the registration device M1201 transmits a registration command and registration information including device UID of the registration device M1201 to the communication device M1101, by using the proximity wireless communication device M1102 (FIG. 115).

A registration information generation unit M1204 obtains the registration information including the device UID from the device UID obtainment unit M1202 (FIG. 116), and obtains home ID from a home ID management unit M1205. Then, the registration information generation unit M1204 adds the home ID to the registration information obtained from the registration device M1201, to generate registration information.

If position information is to be added to the registration information, the registration information generation unit M1204 obtains the position information from a position information obtainment unit M1206 (see the position information obtainment unit 98j in FIG. 167).

Examples of the position information are address information based on a post code inputted to a TV, geographical position information generated by a Global Positioning System (GPS) of a mobile phone, and the like. For instance, the position information may be information (see the position information 98j1 in FIG. 167) of such accuracy that at least indicates a position of one home out of positions (positions 99P and 991P) of a plurality of homes (e.g. homes 99 and 991 in FIG. 167). If position information of the registration device M1201 is registered, the registered position information can be used to easily provide services to improve home appliance traceability or the like. A registration information transmitting/receiving unit M1207 (see the transmission unit 98o in FIG. 167) performs transmission/reception of the registration information (see the transmission information 98o1 in FIG. 167).

The home ID management unit M1205 manages home ID (see FIG. 170) that is different from communication device ID used by the communication device included in the above-described home network.

In conventional home networks, a master device of each communication device manages information such as IDs for the communication device. The management method is different depending on a type of the corresponding communication device. Therefore, it is not possible to manage information on home-by-home basis. Although there is a situation where ID is inputted by a user for each service, this results in quite low usability. In Embodiment B1, introduction of new different ID that is home ID makes it possible to manage pieces of information of devices included in a home network without using a communication device or services.

When the home ID management unit M1205 registers information of a device to the server at the first time, the home ID management unit generates home ID.

The home ID may be generated based on position information or UID of the communication device. It is also possible to generate home ID based on a random number to check whether or not the generated home ID does not overlap with any other ID in the registration server. It is further possible that a user sets the home ID.

When the registration information transmitting/receiving unit M1207 (see the transmission unit 98o in FIG. 166) in the communication device M1101 receives registration information from the registration information generation unit M1204, the registration information transmitting/receiving unit M1207 transmits the received registration information to the registration server M1005 (FIGS. 114 and 116, see the server 98c in FIG. 167) using the home network communication device M1103 (FIG. 115).

The registration server M1005 compares the received registration information to pieces of information stored in the registration database M1208 to determine whether or not the received registration information can be registered. Then, the registration server M1005 sends a registration response back to the communication device M1101.

In receiving the registration response, the registration information transmitting/receiving unit M1207 notifies the user of a result of the determination by using the user IF device M1104 (FIG. 115).

If the registration server M1005 determines that the received registration information cannot be registered, the registration information transmitting/receiving unit 1207 notifies the determination to the registration information generation unit M1204 (FIG. 116) in order to request change of the registration information. Thereby, it is possible to collectively manage devices in a home network including white goods that do not have user IF devices for communication.

Figure 117:
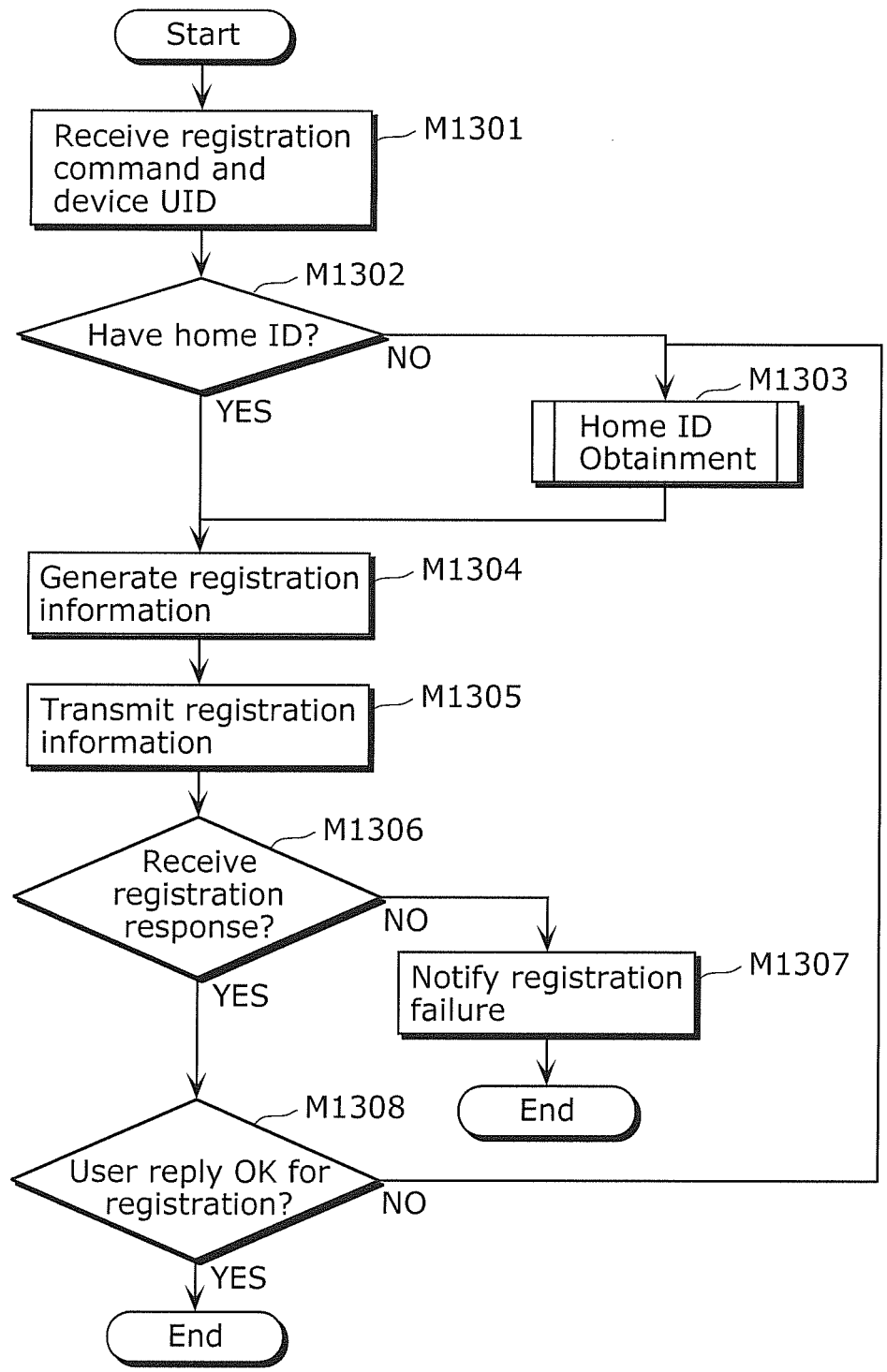

FIG. 117 is a flowchart of registering information of the communication device.

The communication device M1101 receives the registration command and the device UID (M1301), and determines whether or not the communication device M1101 has home ID (M1302).

If the communication device M1101 does not have the home ID (NO at M1302), then the communication device M1101 obtains home ID (the processing is referred to as "home ID obtainment") (M1303).

On the other hand, if the communication device M1101 has the home ID (YES at M1302), the communication device M1101 generates information of the communication device to be registered into the communication device M1101 itself (hereinafter, referred to as "registration information" or "home ID") (M1304).

Next, the communication device M1101 transmits the registration information to the registration server M1005 (M1305).

The communication device M1101 determines whether or not the communication device M1101 receives a response (registration response) to the transmitted registration information from the registration server M1005 (M1306). If the response is not received (NO at M1306), then the communication device M1101 presents a user with a registration failure notification for notifying a failure of the registration processing (M1307) and terminates the registration processing.

On the other hand, if the communication device M1101 receives the response (YES at M1306), then the communication device M1101 presents the user with an inquiry asking whether or not to register the generated information into the communication device M1101 (M1308). If the user replies OK (YES at M1308), then the communication device M1101 completes the registration processing. If the user replies NO (NO at M1308), the communication device M1101 returns to the home ID obtainment. When it is difficult to obtain home ID, the registration processing is terminated as a failure.

Figure 118:
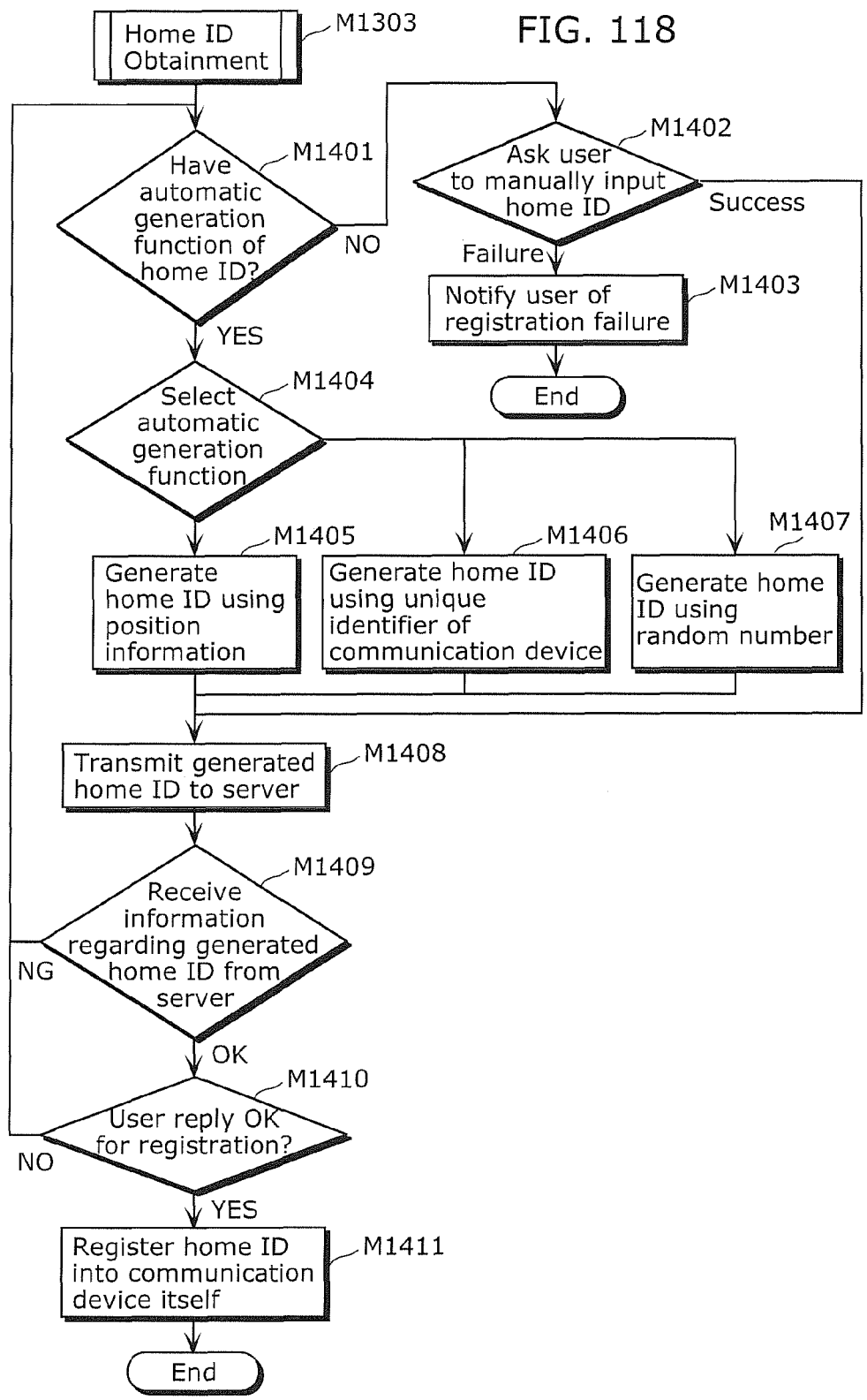

FIG. 118 is a flowchart of the home ID obtainment.

The communication device M1101 determines whether or not the communication device M1101 has a function of automatically generating home ID (hereinafter, referred to also as an "automatic generation function") (M1401). If the communication device M1101 has the function (YES at M1401), then the communication device M1101 automatically generates the home ID. On the other hand, if the communication device M1101 does not have the function (NO at M1401), the communication device M1101 asks the user to manually input the home ID.

If there is no method for manually inputting home ID or the user refuses to the manual input (failure at M1402), then the communication device M1101 notifies the user of a failure of the registration processing (M1403) to persuade the user to obtain the home ID by any different method.

When the communication device M1101 automatically generates home ID (YES at M1401), the communication device M1101 selects an appropriate automatic generation function (M1404).

If the communication device M1101 can obtain geographical 10, position information by a GPS or the communication device M1101 is a terminal such as a TV for which an address as position information has been generally registered, the communication device. M1101 generates the home ID using the position information (M1405).

If the communication device M1101 is a terminal generally set in a house, the communication device M1101 generates the home ID using a unique identifier of the communication device M1101 (M1406).

Especially if it is difficult to generate effective home ID, the communication device M1101 generates the home ID using a random number (M1407).

After generating the home ID, the communication device M1101 transmits the home ID to the server (M1408). Then, the communication device M1101 receives information regarding the generated home ID from the server, and thereby determines whether or not the home ID can be used (M1409). If it is determined that the home ID cannot be used (NG at M1409), then the communication device M1101 returns to the processing of generating the home ID.

On the other hand, if the home ID can be used (OK at M1409), then the communication device M1101 asks the user whether to not to register the generated home ID into the communication device M1101 itself (M1410). If the user replies OK (YES at M1410), then the communication device M1101 registers the home ID into the communication device M1101 itself (M1411). Otherwise (NO at M1410), the communication device M1101 returns to the processing of generating the home ID.

Figure 119:
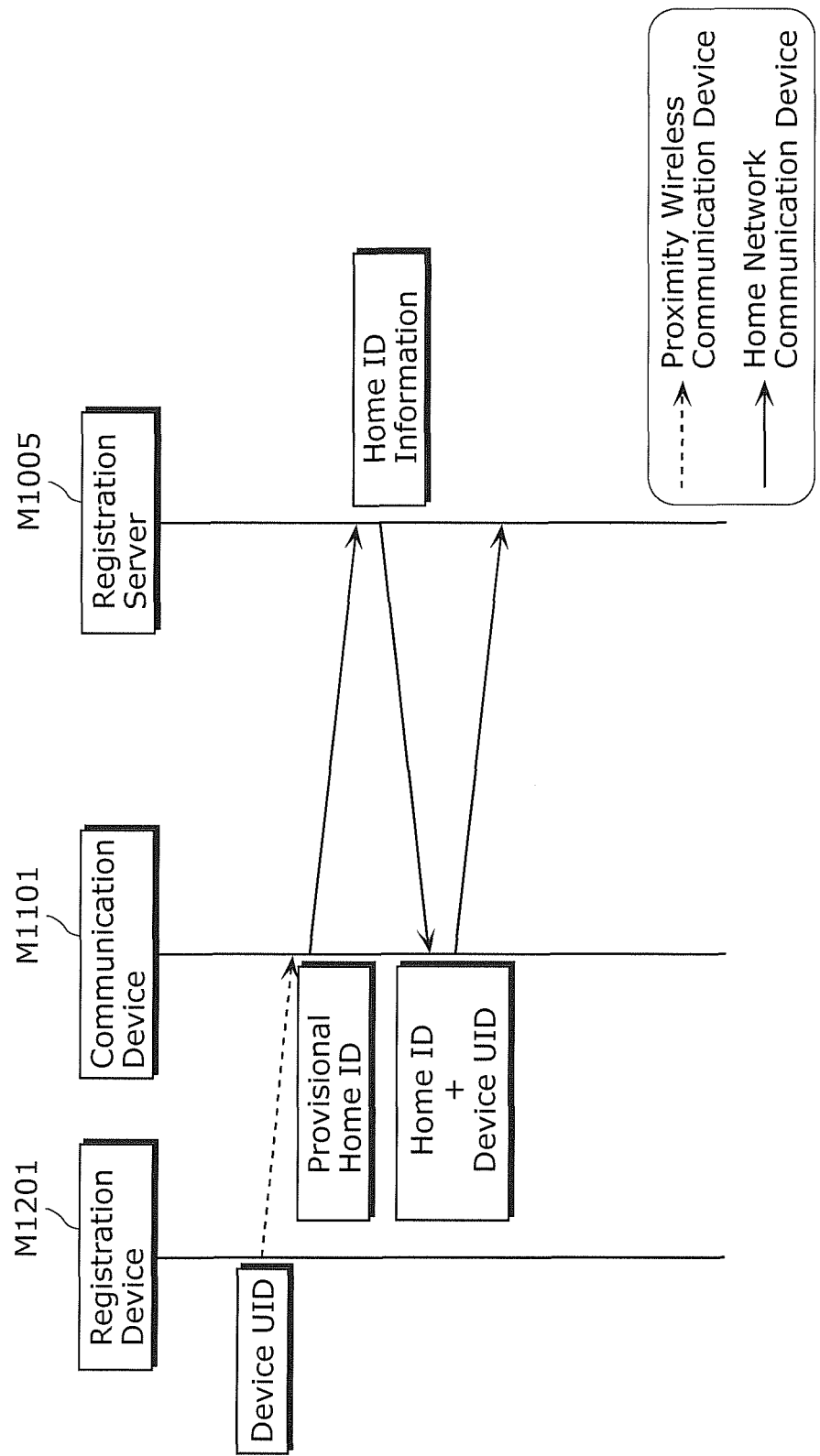

FIG. 119 is a flowchart of registering information of the registration device.

The registration device M1201 transfers a registration command and information including device UID for identifying the registration device M1201, to the communication device M1101 via the proximity wireless communication device.

If the communication device M1101 does not have home ID, the communication device M1101 generates provisional home ID and transmits the generated provisional home ID to the registration server M1005 via the home network communication device.

The registration server M1005 sends a response with information regarding the provisional home ID to the communication device M1101. On the other hand, if the communication device M1101 has home ID or if the communication device M1101 receives, from the registration server M1005, home ID that is allowed by the registration server M1005 to be used, the communication device M1101 transmits the home ID and the registration information including the device UID to the registration server M1005, thereby completing the registration of information of the registration device M1201.

Embodiment B2

In Embodiment B2 of the present invention, a configuration in which the home ID is shared among communication terminals (communication devices) is described.

Figure 120:
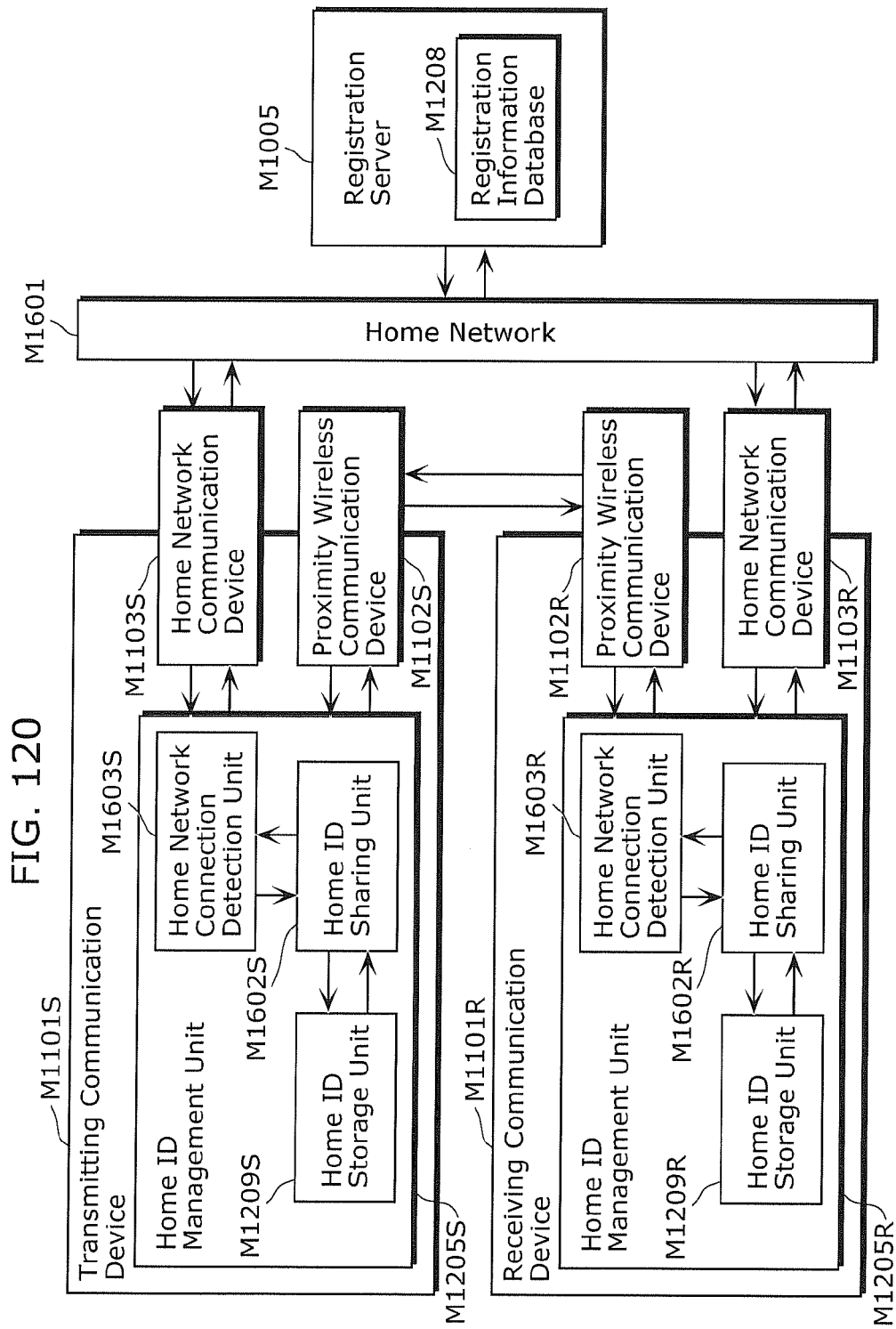

FIG. 120 is a functional block diagram illustrating a function of sharing home ID between communication devices.

Communication devices M1101S and M1101R (see the mobile communication device 98b in FIG. 167) included in a home network share the same home ID using a home network M1601 and the home network communication devices M1103 (M1103S, M1103R). The communication devices M1101S and M1101R may share the home ID using the proximity wireless communication devices M1102.

Note that, as in the above example of "M1103 (M1103S, M1103R)", the term "xxxx" is used as a collective term for "xxxxS" and "xxxxR".

The communication device according to Embodiment B2 (hereinafter, referred to as a "transmitting communication device M1101S") can share the home ID with another communication device (hereinafter, referred to as a "receiving communication device M1101R") in the same house, by transferring a sharing command and home ID to the receiving communication device via the proximity wireless communication devices M1102 (see FIG. 115).

In the transmitting communication device M1101S, a home ID sharing unit M1602S in a home ID management unit M1205S provides the sharing command and the home ID that is held in a home ID storage unit M1209S, to a proximity wireless communication device M1102S.

For example, when the proximity wireless communication device M1102S of the transmitting communication device M1101S is moved into proximity of a proximity wireless communication device M1102R of the receiving communication device M1101R, information is transferred between them. Thereby, the home ID in the transmitting communication device M1101S is stored into the proximity wireless communication device M1102R of the receiving communication device M1101R.

If a home ID storage unit M1209R in the receiving communication device M1101R does not hold any home ID, a home ID sharing unit M1602R in the receiving communication device M1101R stores the received home ID into the receiving communication device M1101R itself.

Thereby, it is possible to quite easily share the home ID between the communication devices.

On the other hand, if the home ID storage unit M1209R already holds home ID, the receiving communication device M1101R transmits both the held home ID and the received home ID to the registration server M1005. In receiving both home IDs, the registration server M1005 manages both home IDs virtually as a single home ID.

The registration server M1005 may notify both communication devices of one of the home IDs to unify them. Even in this case, the registration server M1005 manages both home IDs virtually as a single home ID since there are non-always-connected devices in the home network.

It is possible that ID of a non-always-connected device is updated every time of being connected to the home network and the virtual management by the registration server M1005 ends when updating of all of the registration devices (namely, devices to be registered which are included in the home network) are completed. Thereby, it is possible to unify originally plural home networks into a single network.

The home ID sharing can be performed by using the home network.

When a communication device is to be connected to the home network M1601 and a home network connection detection unit M1603S (FIG. 120) of the communication device detects that the communication device does not hold home ID, the communication device broadcasts a request for home ID sharing to terminals connected to the home network M1601.

Terminals holding home ID among the terminals connected to the home network M1601 transmit the home ID to the communication device.

Thereby, the home ID sharing is completed prior to start of communication.

Here, if a master terminal to respond to requests for home ID sharing is previously selected from among terminals holding the home ID, it is possible to prevent that a device requesting home ID sharing receives responses from a plurality of terminals thereby overburdening the home network. If there is no response, the communication device terminal requesting home ID sharing may obtain home ID by itself.

Figure 121:
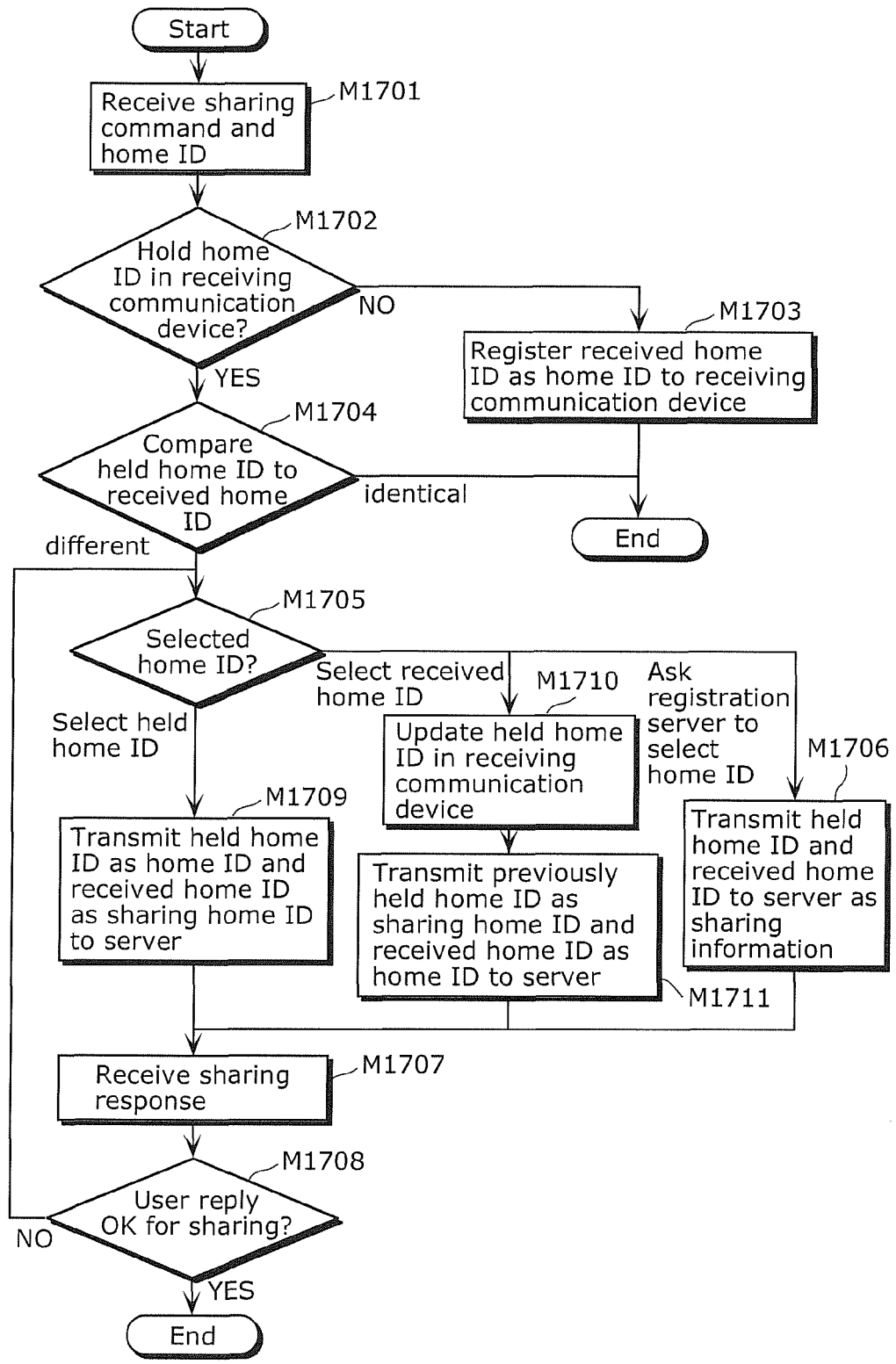

FIG. 121 is a flowchart of processing performed by the receiving communication device M1101R when home ID is shared using the proximity wireless communication device M1102.

When the receiving communication device M1101R receives a sharing command and home ID (M1701), the receiving communication device M1101R determines whether or not the receiving communication device M1101R holds home ID (M1702).

If the receiving communication device M1101R does not hold home ID (NO at M1702), then the receiving communication device M1101R registers the received home ID, as home ID, into the receiving communication device M1101R itself (M1703).

On the other hand, if the receiving communication device M1101R holds home ID (YES at M1702), the receiving communication device M1101R compares the held home ID to the received home ID.

If the held home ID is identical to the received home ID (identical at M1704), the receiving communication device M1101R terminates the processing without any further processes.

On the other hand, if the held home ID is not identical to the received home ID (different at M1704), the receiving communication device M1101R selects home ID (M1705).

The selection of home ID may be performed by the receiving communication device M1101R or the registration server.

In the situation where the receiving communication device M1101R asks the registration server to perform the selection, the receiving communication device M1101R transmits the held home ID and the received home ID to the registration server as sharing information (M1706). Thereby, the receiving communication device M1101R receives, from the registration server, a sharing response including home ID selected by the registration server (M1707). Then, the communication device M1101R inquiries the user whether or not to share (register) the selected ID into the communication device M1101R (M1708). If the user replies OK (YES at M1708), the registration processing is completed. It the user replies NO (NO at M1708), the received ID receiving communication device M1101R returns to the processing for selecting home ID.

In the case where the receiving communication device M1101R itself selects the held home ID, the receiving communication device M1101R transmits the held home ID as home ID and the received home ID as sharing home ID to the registration server (M1709).

The registration server notifies updating of the home ID to other communication devices already sharing home ID.

In the situation where the receiving communication device M1101R selects the received home ID, then the receiving communication device M1101R updates the held home ID by the received home ID (M1710). In addition, the receiving communication device M1101R transmits the previously held home ID as sharing home ID and the received home ID as home ID to the registration server (M1711). The registration server notifies updating of the home ID to other communication devices already sharing home ID.

Figure 122:
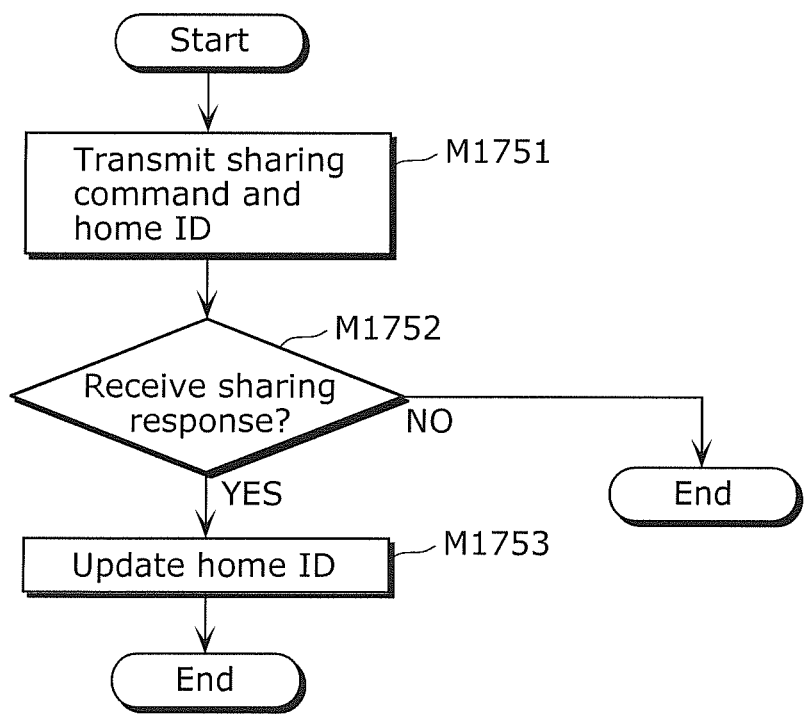

FIG. 122 is a flowchart of processing performed by the transmitting communication device M1101S when home ID is shared using the proximity wireless communication device M1102.

After transmitting a sharing command and home ID to the registration server, the transmitting communication device M1101S determines whether or not a response to the home ID sharing is received from the registration server (M1752). If there is no response (NO at M1752), the transmitting communication device M1101S terminates the processing. On the other hand, if the response including a notification of updating home ID is received (YES at M1752), the transmitting communication device M1101S updates the home ID by the notified home ID (M1753) and completes the processing.

Figure 123:
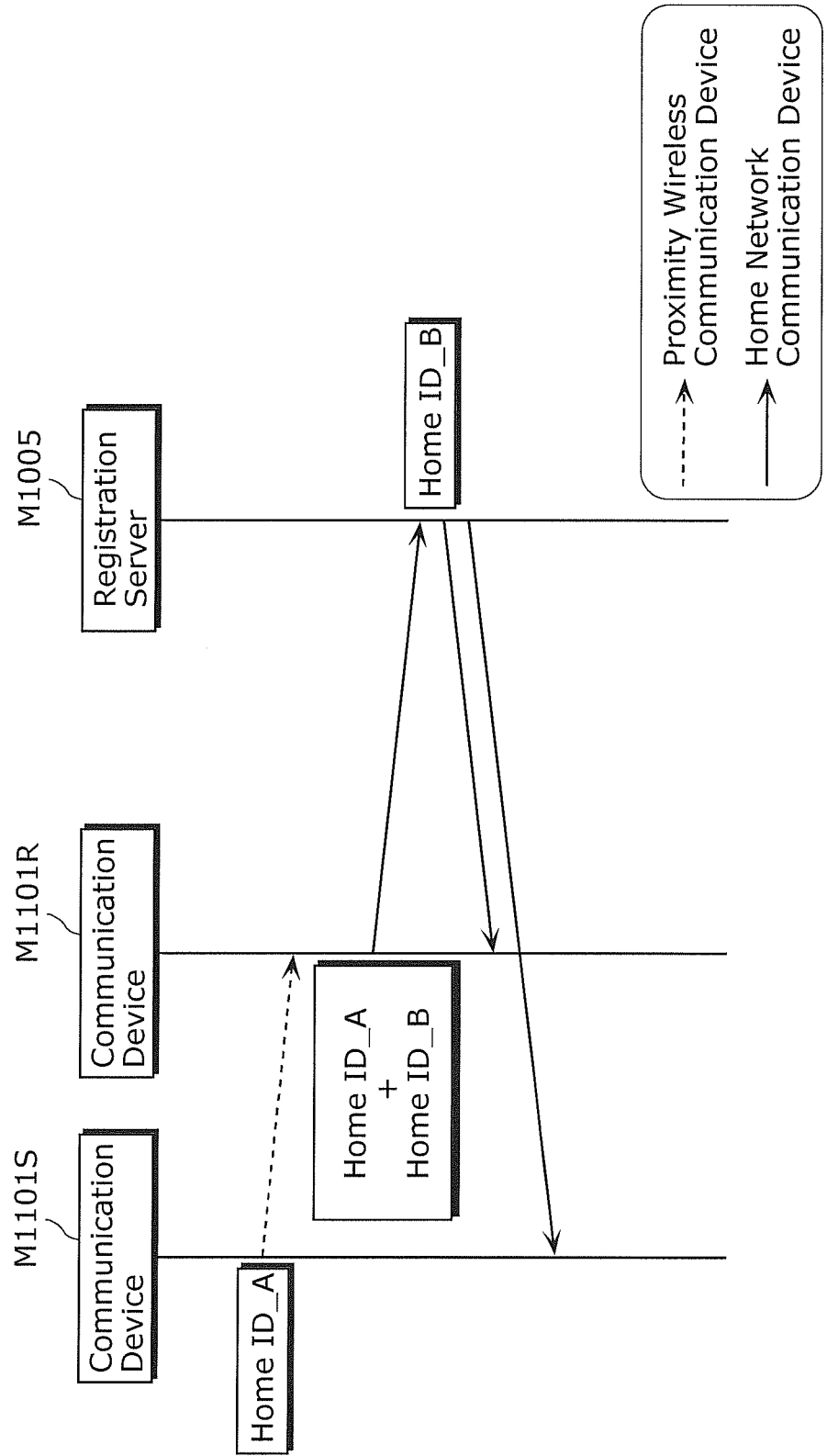

FIG. 123 is a sequence diagram of the situation where the registration server selects home ID.

The transmitting communication device M1101S transmits home ID_A to the receiving communication device M1101R by using the proximity wireless communication device. The receiving communication device M1101R transmits home ID_B that is held in the receiving communication device M1101R itself and the received home ID_A to the registration server M1005. The registration server selects the home ID_B from the received home IDs, and notifies the home ID_B to a communication device holding the home ID_A and the receiving communication device M1101R to cause the devices to register the home ID_B.

Figure 124:
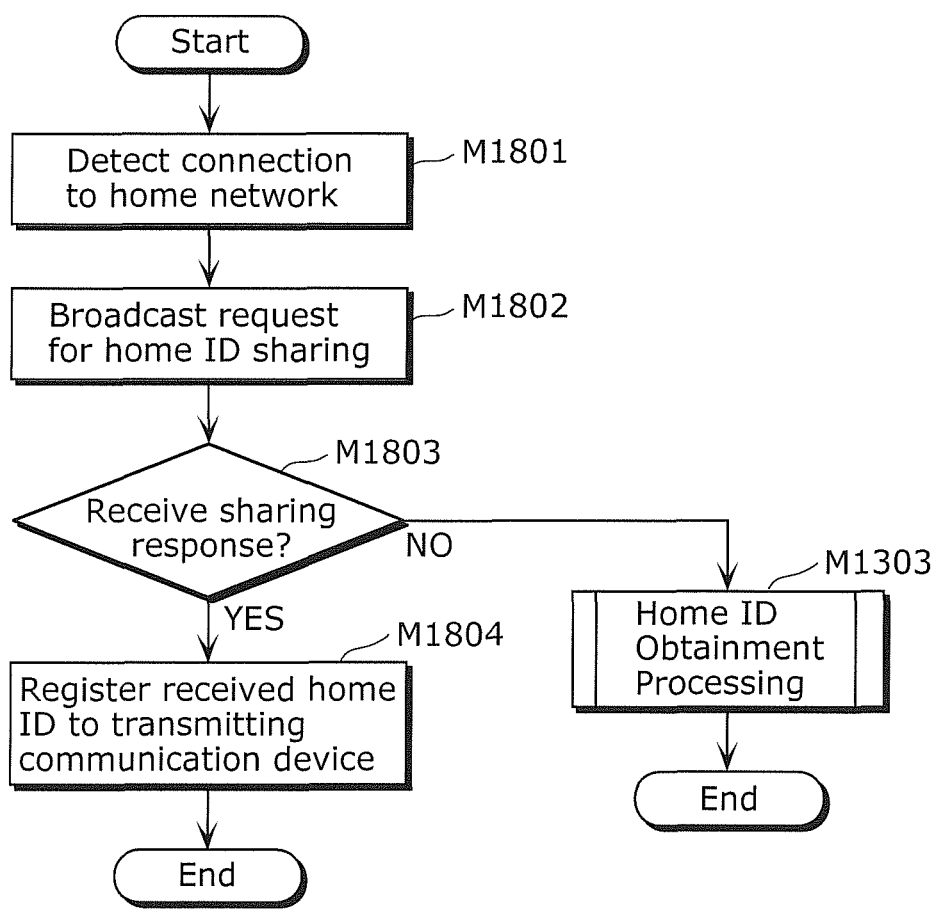

FIG. 124 is a flowchart of processing performed by the transmitting communication device M1101S when home ID is shared using the home network communication device M1103.

The transmitting communication device M1101S detects connection to the home network (M1801), and broadcasts a request for home ID sharing to terminals in the home network (M1802). If a response to the request for home ID sharing is received (YES at M1803), the transmitting communication device M1101S registers home ID received with the response into the transmitting communication device M1101S itself (M1804). On the other hand, if the response is not received (NO at M1803), the transmitting communication device M1101S performs the home ID obtainment (M1303).

Figure 125:
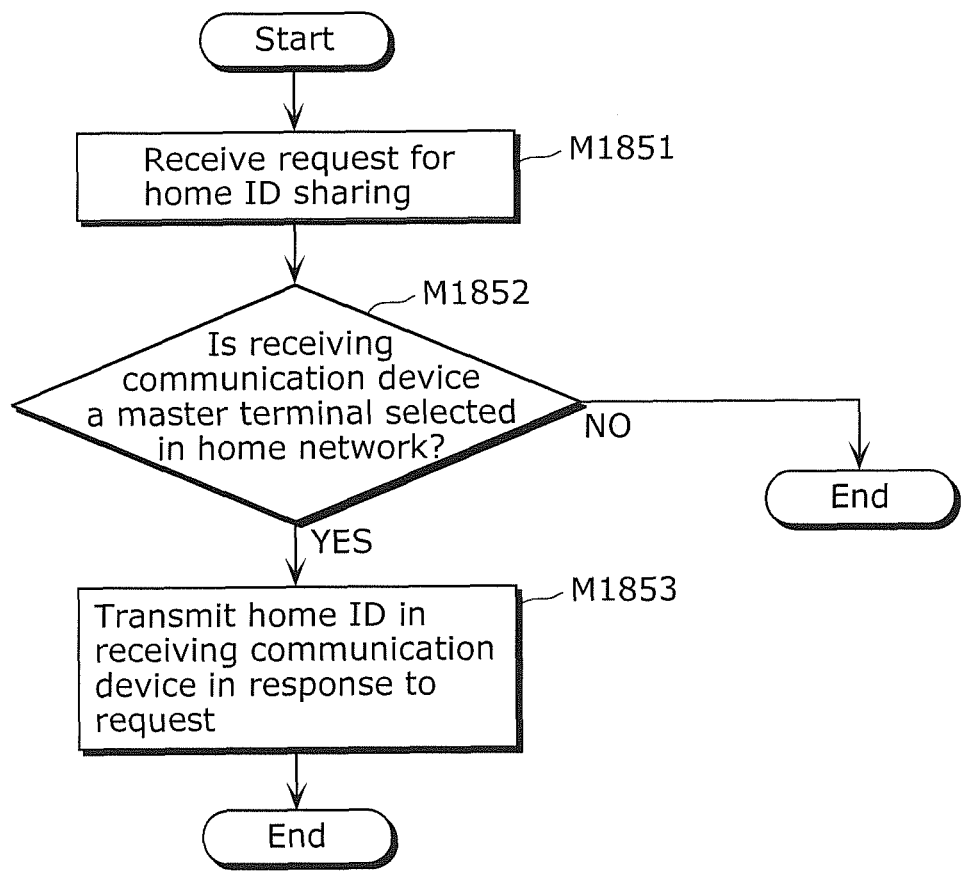

FIG. 125 is a flowchart of processing performed by the receiving communication device M1101R when home ID is shared using the home network communication device M1103.

After receiving the request for home ID sharing (M1851), the receiving communication device M1101R determines whether or not the receiving communication device M1101R itself is a master terminal selected in the home network (M1852). If the receiving communication device M1101R is the master terminal (YES at M1852), then the receiving communication device M1101R transmits home ID held in the receiving communication device M1101R itself in response to the request (M1853). On the other hand, if the receiving communication device M1101R is not the master terminal (NO at M1852), then the receiving communication device M1101R does not perform any processes. Here, if a master terminal is not selected from terminals holding home ID, the receiving communication device M1101R responds to all requests for home ID sharing from any terminals without the determination regarding the master terminal.

FIG. 126 is a sequence diagram of the situation where the home ID is shared using the home network communication device M1103.

When a communication device detects connection to a home network, the communication device broadcasts a request for home ID sharing to terminals in the home network. Only a communication device M1854 selected as the master terminal from among communication devices receiving the request responds to the request. The communication device receiving the response registers home ID received with the response, into the communication device itself.

Embodiment B3

A communication device according to Embodiment B3 of the present invention is described in detail with reference to the drawings. The communication device according to Embodiment B3 of the present invention reads terminal device information regarding a terminal device from the terminal device by using a NFC function, and transfers the terminal device information to a server via a general-purpose network.

FIG. 127 illustrates a system according to Embodiment B3. The system according to Embodiment B3 includes the terminal device Y01, the communication device Y02, and the server Y04.

The subject of Embodiment B3 is the communication device Y02.

The terminal device Y01 (see the appliance 98*a* in FIG. 167) is a device having a NFC function (RF-ID unit, IC tag, or NFC tag emulation). The terminal device Y01 is, for example, an electronic terminal device such as a refrigerator, a microwave, a washing machine, a TV, or a recording device (see, for example, FIG. 114). The terminal device Y01 has an internal memory for holding, as terminal device information (see the information Y015D), a product serial number (see the product serial number Y015N) that is ID for identifying the terminal device Y01, use history information of the terminal device Y01, error information, and the like.

The communication device Y02 (see the mobile communication device 98*b* in FIG. 167) has a NFC function for communicating with the NFC function of the terminal device Y01 by proximity wireless communication. The communication device Y02 includes a reader/writer function of reading the terminal device information from the terminal device Y01. The communication device Y02 is, for example, a portable device such as a mobile phone or a remote controller terminal of a TV.

The server Y04 (see the server 98*c* in FIG. 167) is a server connected to the communication device Y02 in order to communicate with the communication device Y02, via a general-purpose network such as the Internet (see the Internet M1004 in FIG. 114). The server Y04 includes a database (DB) for accumulating the terminal device information that is read from the terminal device Y01 to the communication device Y02.

The terminal device Y01 includes a CPU Y011, a failure sensor unit Y012, a use history logging unit Y013, a memory Y014, a modulation unit Y017, and an antenna Y018.

The CPU Y011 is a unit that controls a system of the terminal device Y01. The CPU Y011 controls the failure sensor unit Y012, the use history logging unit Y013, the memory Y014, and the modulation unit Y017 which are units included in the terminal device.

The failure sensor unit Y012 is a unit that detects a location and detail of a failure occurred in each unit included in the terminal device Y01. A piece of failure information detected by the failure sensor unit Y012 is accumulated in a RAM in the memory Y014. The detected failure information is represented by an error code that is uniquely defined depending on a location and condition of the failure.

The use history logging unit Y013 is a unit that performs logging for each piece of use history information every time the terminal device Y01 is operated by the user. The use history information applied with logging is accumulated into the RAM Y016 in the memory Y014. In general, when use history information is used to examine how a failure has occurred, several pieces of use history information up to occurrence of the failure have high priorities of being examined. Therefore, it is desirable that the use history logging unit Y013 according to Embodiment B3 uses the RAM Y016 as First In First Out (FIFO) to chronologically accumulate new pieces of use history information into the RAM Y016. Moreover, when use history information is used to examine how a failure has occurred, it is desirable that several pieces of use history information up to a timing detected by the failure sensor unit Y012 are stored as priorities into the RAM. Therefore, if when five minor failures are detected in using the terminal device Y01, several pieces of operation (use) history information up to the five failures are stored as priorities.

The memory Y014 includes a ROM Y015 and the RAM Y016.

The ROM Y015 previously stores at least the product serial number Y015N for uniquely identifying the terminal device Y01 when the terminal device Y01 has been shipped. The user of the terminal device Y01 cannot update the information previously held in the ROM Y05.

The product serial number is desirably information by which a manufacturer, a manufacturing lot number, and a manufacturing date of the terminal device Y01 can be determined.

It is also desirable that the ROM Y015 is embedded in a semiconductor chip of the CPU Y011. This structure prevents information during memory access to be easily inspected. Therefore, secret key information for authentication and encrypted communication in proximity wireless communication with the communication device can be recorded on the ROM Y015 when shipping.

The RAM Y016 is a rewritable memory in which the failure information detected by the failure sensor unit Y012 and the use history information applied with logging of the use history logging unit Y013 are accumulated.

The modulation unit Y017 is a unit that modulates communication data for proximity wireless communication with the communication device Y02. The modulation method varies depending on employed NFC standard. For example, Amplitude Shift Keying (ASK), Frequency Shift Keying (FSK), Phase Shift Keying (PSK), and the like are used.

The antenna Y018 generates electromagnetic induction from radio waves emitted from an antenna of the communication device Y02. The antenna Y018 performs at least processing of providing power to the modulation unit Y017 and the memory Y014 to be operated. In addition, the antenna Y018 overlaps reflected waves of the radio waves emitted from the communication device Y02 with signals modulated by the modulation unit Y017 to transmit the terminal device information that is stored in the memory Y014 to the communication device Y02.

As described above, the terminal device according to Embodiment B3 detects failures occurred in each unit included in the terminal device. Then, the terminal device performs logging for use histories to accumulate the use histories into the memory. Then, if the terminal device is moved into proximity of the communication device Y02 to be capable of performing proximity wireless communication with the communication device Y02, the terminal device can transmit the terminal device information (the information Y015D) stored in the memory into the communication device Y02.

Next, the communication device Y02 according to Embodiment B3 is described. It should be noted that the subject of Embodiment B3 is the communication device Y02.

The communication device Y02 includes an antenna Y021, a CPU Y022, a demodulation unit Y023, a memory Y024, a position information determination unit Y027 (see the position information obtainment unit 98$j$ in FIG. 167), a GPS antenna Y031, a communication memory Y032, an information adding unit Y035, and a communication unit Y036.

The antenna Y021 performs polling for calling any terminal devices in order to search for a terminal device communicable with the communication device Y02 by proximity wireless communication.

In receiving a response to the polling, the antenna Y021 establishes proximity wireless communication with the responding terminal device Y01 to receive modulated terminal device information (the information Y015D) from the terminal device Y01, and provides the modulated terminal device information to the demodulation unit Y023.

In general, the polling processing is always necessary even if there is no terminal device communicable with the communication device Y02 by proximity wireless communication. This consumes power. Therefore, the communication device Y02 is provided with a switch (not shown) for controlling a timing of start of polling, so that polling processing is performed when the switch is turned ON. This structure can significantly shorten a time period of the polling. As a result, the power consumption amount can be considerably reduced. This is especially efficient when the communication device Y02 operates by a limited power source such as a battery.

The CPU Y022 is a unit that controls a system of the communication device Y02. The CPU Y022 controls operations of each unit included in the communication device Y02.

The modulation unit Y023 is a unit that demodulates data modulated by the modulation unit Y017 of the terminal device Y01. The demodulated terminal device information is temporarily stored into the memory Y024.

The memory Y024 includes a ROM Y025 and a RAM Y026.

The ROM Y025 is a memory that cannot be rewritten by the outside. The ROM Y025 previously holds a product serial number (the product serial number Y025N) for uniquely identifying the communication device Y02 when the communication device Y02 has been shipped.

The product serial number is desirably information by which a manufacturer, a manufacturing lot number, and a manufacturing date of the communication device Y02 can be determined.

It is also desirable that the ROM Y025 is embedded in a semiconductor chip of the CPU Y022. This structure prevents information during memory access from being easily inspected. Therefore, secret key information for authentication and encrypted communication in proximity wireless communication with the terminal device Y01 can be recorded on the ROM Y025 when shipping.

The RAM Y026 holds the terminal device information of the terminal device Y01 which is received by the antenna Y021 and demodulated by the demodulation unit Y023. As described earlier, the terminal device information includes the product serial number for uniquely identifying the terminal device Y01, the use history information of the terminal device Y01, and failure codes.

The position information determination unit Y027 is a group of sensors for determining a location of the communication device Y02. The position information determination unit Y027 includes a latitude/longitude positioning unit (GPS) Y028, an altitude positioning unit Y029, and a position correction unit Y030.

The position information determination unit Y027 does not need to always determine a location of the communication device Y02 (location information) if the location information is generated at a timing where the communication device Y02 becomes communicable with the terminal device Y01 using the antenna Y021. As a result, power consumption of the communication device Y02 can be reduced.

The latitude/longitude positioning unit Y028 is a general Global Positioning System (GPS) that receives radio waves from satellites to perform 3-dimensional positioning of the earth (see a GPS device 98$j$1$x$ in FIG. 168).

The altitude positioning unit Y029 is a general altimeter. The altitude positioning unit Y029 may be any various altimeters, such as an altimeter receiving radio waves to extract an altitude, an altimeter detecting an air pressure to measure an altitude, and the like. The altitude positioning unit Y029 is provide to the communication device Y02 so that an altitude can be detected even in a building where GPS cannot receive radio waves.

The position correction unit Y030 is a unit that corrects a value measured by the GPS to generate more accurate position information. In general, when radio waves from satellites cannot be received in a room or the like, the GPS cannot generate correct position information. Therefore, the position correction unit Y030 includes an electronic compass and a 6-axis acceleration sensor. The electronic compass is used to detect a direction in which the communication device Y02 moves and the acceleration sensor is used to detect a speed of the movement. Thereby, it is possible to correct position information generated by the GPS in a location where the GPS is difficult (see the acceleration sensor 98$j$2$x$ in FIG. 175).

Regarding the information adding unit Y035, when the terminal device information that has been provided from the terminal device Y01 and stored into the memory Y024 is to be transmitted to the server Y04, the information adding unit Y035 adds (a) the product serial number of the communication device Y02 that is stored in the ROM Y025 in the memory Y024 and (b) the position information (information Y027D) measured by the position information determination unit Y027, to the terminal device information.

This enables the server Y04 to determine which communication device transmits the terminal device information, where the transmitting terminal device is located, for example, and then manage the results of the determination.

For example, if a manufacturer of the terminal device finds that the terminal device has a possibility of causing serious accidents (troubles), the information in the database of the server Y04 allows the manufacturer to determine where the terminal device is. Thereby, the possibility of causing serious accidents can be reduced. As a result, it is possible to increase sense of safety and security of the user using the terminal device.

Furthermore, when the communication device Y02 has a display function as mobile phone terminals have, the above-described terminal device information generated by the information adding unit Y035 makes it possible to determine with which communication device the terminal device having a possibility of accidents can perform proximity wireless communication, and thereby display a notification of the possibility of accidents (troubles) in the terminal device on the communication device Y02. Thereby, even if such a terminal device generally does not have any display function and is not connected to a general-purpose network, it is possible to transmit a notification of the accident possibility of the terminal device to the communication device Y02 in order to warn the user using the terminal device. As a result, it is also possible to provide a terminal device that can increase sense of safety and security of the user using the terminal device.

The communication unit Y036 is a unit that communicates with the server Y04 via the Internet by using general LAN, wireless LAN, or mobile phone network. Thereby, the communication unit Y036 transmits, to the server Y04, the terminal device information added with the product serial number and the position information of the communication device Y02 as the communication device information. Here, the added terminal device information is further added with a MAC address and an IP address to be transmitted to the server Y04.

The server Y04 is connected to the communication device Y02 via a general-purpose network such as the Internet. The server Y04 includes a device management database (DB) for managing the terminal device information.

The device management DB Y041 stores the terminal device information (information Y052d) in association with the communication device information (see information Y051 in FIG. 129). In the device management DB Y041 according to Embodiment B3, the communication device information is managed as parent device information, and the terminal device information is managed as child device information in association with the parent device information. The child device information is added with the position information generated by the communication device in order to manage further information indicating where the terminal device is (the position of the terminal device Y01).

As described above, in the system according to Embodiment B3, the terminal device information (the information Y015D) is read from the terminal device (the terminal device Y01) by the communication device (the communication device Y02) using proximity wireless communication. The communication device is touched to the terminal device to communicate with the terminal device to obtain the terminal device information. The communication device adds the product serial number Y025N and position information (information Y027D) of the communication device at the time when the proximity wireless communication is enabled, to the obtained terminal device information, and transmits the generated information to the server. Thereby, the server can manage the communication device information as parent device information in association with the terminal device information as child device information (see FIG. 129).

Therefore, if a manufacturer of the terminal device finds that the terminal device would cause serious accidents, the manufacture can easily recall the terminal device (the terminal device Y01) or display a notification of a possibility of the serious accident on a display unit of the communication device (the communication device Y02). As a result, it is possible to achieve traceability of the products (the terminal device Y01) and to provide the users of the products with safety and security.

FIG. 128 is a sequence diagram of processing performed by the units included in the system described with reference to FIG. 127.

First, the communication device Y02 performs polling to the terminal device Y01 to establish proximity wireless communication (SY01).

In terms of power consumption amount of the communication device, it is desirable as described earlier that a switch operated by a user is provided so that the polling is performed while the switch is being pressed or the polling starts when the switch is pressed (SY01).

Next, the terminal device Y01 sends a response to the polling to the communication device Y02 in order to establish proximity wireless communication with the communication device Y02 (SY02).

At this timing, the position information determination unit Y027 of the communication device Y02 generates position information of a current position to be used as position information of the terminal device Y01.

The generation of the position information is not limited to be performed only in completion of the polling. The position information may be generated any time while the proximity wireless communication is established after the response to the polling. It is important to determine the position of the terminal device Y01 at a high accuracy, by generating position information of the position where proximity wireless communication, which can be performed when a distance between communicating devices is only several centimeters, is established.

After the establishment of the proximity wireless communication at SY02, mutual authentication between the terminal device Y01 and the communication device Y02 is performed using general public key cryptography, and also key sharing is temporarily performed to share cryptography keys generated by the terminal device Y01 and the communication device Y02 between the devices (SY03). After that, while the proximity wireless communication is established, data on the communication path is encrypted using the cryptography keys to communicate between the devices. As a result, tapping of the data can be prevented.

After completing the key sharing, the terminal device Y01 transmits the terminal device information recorded on the memory Y014 of the terminal device Y01, to the communication device Y02 (SY04).

When the communication device Y02 receives the terminal device information from the terminal device Y01, the communication device Y02 stores the received terminal device information into the memory Y024 of the communication device Y02 (SY05).

When the communication device Y02 completes receiving of the terminal device information from the terminal device Y01, the communication device Y02 issues a connection request to the server Y04 (SY06).

The server Y04 responds to the connection request of SY06 to establish communication with the communication device Y02 (SY07).

After establishing communication between the communication device Y02 and the server Y04, the communication device Y02 adds the communication device information of the communication device Y02 to the terminal device information of the terminal device Y01 to be transmitted to the server Y04 (SY08).

Here, the communication device information includes, for example, a product serial number of the communication device Y02, position information of the communication device Y02 when proximity wireless communication with the terminal device Y01 is established, an e-mail address of the user registered in the communication device Y02 (if any), a connection account to the server Y04 registered in the communication device Y02 (if any), and the like.

The communication device Y02 may obtain, from the terminal device Y01, information (see, for example, the address Y01Ua in FIG. 137) for specifying the server Y04 from among a plurality of computers (servers), such as an address of the server Y04, and communicate with the server Y04 specified by the obtained information.

After adding the communication device information to the terminal device information at SY08, then the communication device Y02 transmits the terminal device information added with the communication device information (see the information Y036D in FIG. 127) to the server Y04 (SY09).

The server Y04 registers the terminal device information added with the communication device information received from the communication device Y02, into the device management DB Y041. Thereby, the processing is completed.

Thereby, the server Y04 can manage pieces of information regarding devices for each house, by managing information of each terminal device Y01, which establishes proximity wireless communication with the communication device Y02 touching the terminal device Y01, in association with identification information (product serial number or the like) of the communication device Y02.

In addition, for the position information registered as information of a position at which the terminal device is equipped, position information indicating a position where proximity wireless communication is established between the communication device Y02 and the terminal device Y01 is used. Since the proximity wireless communication according to Embodiment B3 is performed at common High Frequency (HF) of 13.56 MHz, the communication is possible when a distance between communicating devices is within several centimeters. Therefore, if the position information detected in establishing proximity wireless communication is set to be position information of the terminal device, a maximum error is several centimeters which results in assuring an enough accuracy to achieve traceability of the products.

FIG. 129 is a schematic diagram illustrating a group of pieces of information of terminal devices managed in association with information of the communication device Y02 in the device management DB Y041 of the server Y04.

For example, a data structure of the device management DB Y041 may correspond to the structure illustrated in FIG. 129. See also FIG. 170 according to need.

When the user intends to perform user registration or the like for a terminal device using the communication device Y02 in purchasing the terminal device, the following processing is performed. The user equips the terminal device and touches the terminal device by the communication device Y02. Thereby, terminal device information of the terminal information is provided to the communication device Y02 using proximity wireless communication. The communication device Y02 adds the communication device information of the communication device Y02 to the terminal device information in order to be transmitted to the server Y04.

In receiving the terminal device information added with the communication device information, the server Y04 manages the terminal device information as child device information and the communication device information as parent device information in association with each other in the device management DB.

For example, in the device management DB, terminal device information of a terminal device 1 (for example, a microwave Y052), terminal device information of a terminal device 2 (for example, a washing machine Y053), and terminal device information of a terminal device 3 (for example, a TV Y054), all of which are touched by a communication device Y051, are managed in association with a product serial number of the communication device Y051. Each of the terminal device information includes whereabout information (longitude, latitude, altitude, and the like) and use status information (use histories, error codes, use time periods, and the like).

Thereby, the server Y04 can manage pieces of information of devices for each house, because the communication device Y051 touches these terminal devices. As a result, traceability of the terminal devices can be achieved.

Furthermore, the communication device generates position information when proximity wireless communication with the terminal device is established and uses the generated position information as position information of the terminal device. Therefore, it is possible to register a position of the terminal device with an error of several centimeters which is a distance capable for proximity wireless communication between devices. Since the GPS in the communication device is used to generate the position information of the terminal device, each terminal device does not have a GPS, thereby reducing a cost.

FIG. 130 is a schematic diagram illustrating display screens of the display unit of the communication device Y02 when the communication device Y02 touches the terminal device Y01.

Here, the communication device Y02 may include a display unit Y02$x$ in FIG. 127, where each display screen Y02$x$S (FIG. 130) is displayed by the display unit Y02$x$.

First, the description is given for the situation where the communication device Y02 touches the terminal device Y01 to register information of the terminal device Y01 into the server Y04.

When the user operates the communication device Y02 to start up a reader/writer application of the communication device Y02, the communication device Y02 displays, on a display screen, a message persuading the user to touch the terminal device Y01 for proximity wireless communication (Y060).

When the communication device Y02 touches the terminal device Y01, proximity wireless communication is established between the devices. The communication device Y02 reads terminal device information of the terminal device Y01 from the terminal device Y01, generates position information of a current position, and provides the pieces of information to the memory in which the pieces of information are temporarily stored. Then, the communication device Y02 establishes communication with the server Y04 and transmits the terminal device information added with communication device information of the communication device Y02 to the server Y04.

The server Y04 determines whether or not the terminal device information has already been registered in the device management DB. If it is determined that the terminal device information has not yet been registered in the device management DB, then the server Y04 causes the communication device Y02 to display, on the display unit of the communication device Y02, a message asking the user whether or not to register information of the terminal device Y01 (Y061).

Next, when the user selects to register the information of the terminal device Y01, the server Y04 causes the communication device Y02 to display a message asking the user whether or not to register position information of the terminal device. When the user selects to register the position information, the server Y04 registers the position information associated with the terminal device information transmitted from the communication device Y02 to the server Y04, into the device management DB of the server Y04 as position information of the terminal device Y01 (Y062).

Next, the description is given for the situation where the position information of the terminal device Y01 is different from the position information registered in the device management DB of the server Y04.

When the user operates the communication device Y02 to start up a reader/writer application of the communication device Y02, the communication device Y02 displays, on the display screen, a message persuading the user to touch the terminal device Y01 by the communication device Y02 to perform proximity wireless communication (Y063).

When the communication device Y02 touches the terminal device Y01, proximity wireless communication is established between the devices. The communication device Y02 reads terminal device information of the terminal device Y01 from the terminal device Y01, generates position information, and transmits the terminal device information added with communication device information of the communication device Y02 to the server Y04.

The server Y04 compares (a) a product serial number of the terminal device which is included in the received terminal device information to (b) a product serial number registered in the device management DB, in order to examine whether or not information of the touched terminal device is already registered in the server Y04. In addition, the server Y04 extracts the position information from the received communication device information, and examines whether or not the extracted position information is identical to the position information registered in the device management DB. Since the position information has an error, of course, the determination is made to compare the position information to a threshold value that has the order of several centimeters (in other words, the threshold value is a value corresponding to a distance between devices capable for proximity wireless communication). If it is determined that the extracted position information is different from the registered position information, the server Y04 causes the communication device Y02 to display, on the display unit, a message notifying the user of the result of the determination (Y064).

Then, the communication device Y02 displays, on the display unit, a message asking the user whether or not to update the position information of the terminal device Y01 to information of a current position of the terminal device Y01 (Y065).

If the user selects to update the position information, the communication device Y02 registers the position information generated by touching the terminal device Y01 by the communication device Y02, into the device management DB of the server Y04 as new position information of the terminal device Y01.

Therefore, according to Embodiment B3, even if the position information that has been registered is changed because the terminal device Y01 is moved and equipped at a different location, it is possible to update the position information to new position information that is generated by touching the terminal device Y01 by the communication device Y02. Thereby, an accuracy of traceability of the terminal device Y01 can be improved.

Embodiment B4

It is comparatively preferable to understand, for example, Embodiment B4 first among Embodiments A (A1 to A13) and B (B1 to B7), as noted earlier.

In Embodiment B4, FIGS. 131 to 148 are referenced as noted earlier.

FIG. 131 is a functional block diagram of the RF-ID unit N10 according to Embodiment B4 of the present invention.

Referring to FIG. 131, the RF-ID unit N10 (see, for example, a RF-ID tag 98f in FIG. 166) includes an antenna N11, a power supply unit N12, a memory N13, a reproducing unit N14, and a data transfer unit N15. The antenna N11 is used for proximity wireless communication. The power supply unit N12 is supplied with power via the antenna N11. The memory N13 is a nonvolatile memory in which pieces of individual identification information are stored. The reproducing unit N14 reproduces data registered in the memory N13. The data transfer unit N15 transmits the data registered in the memory N13 into the outside via the antenna N11.

The memory N13 stores UID N13A, a part number N13B, server specific information N13, and an operation program N13D. The UID N13A is used to identify a product having the RF-ID unit N10. The part number N13B is used to identify a part number of the product having the RF-ID unit N10. The server specific information N13C is used to specify the registration server N40. The operation program N13D is to be executed by the mobile device N20.

FIG. 132 is a functional block diagram of the mobile device N20 according to Embodiment B4 of the present invention.

Referring to FIG. 132, the mobile device N20 (see the mobile communication device 98b in FIG. 167) includes a RF-ID reader/writer N21, a RF-ID storage unit N22, a program execution unit N23, a data processing unit N24, a memory unit N25, a display unit N26, a communication I/F unit N27, a transmission unit N28, a receiving unit N29, a communication unit N30, a GPS N31 (see the GPS device 98j1x in FIG. 168), a 6-axis sensor N32 (see the acceleration sensor 98j2x in FIG. 175), a position information storage unit N33, and a CPU N34. The RF-ID reader/writer N21 receives data from the RF-ID unit N10. The RF-ID storage unit N22 holds the data provided from the RF-ID reader/writer N21. The program execution unit N23 executes a program included in the data. The data processing unit N24 performs data processing for image data included in the data. The memory unit N25 holds the image data processed by the data processing unit N24. The display unit N26 displays the image temporarily stored in the memory unit N25. The communication I/F unit N27 connects the mobile device N20 to other device via a general-purpose network. The transmission unit N28 transmits data to the outside via the communication I/F unit N27. The receiving unit N29 receives data from the outside via the communication I/F unit N27. The communication unit N30 communicates with other device via a general-purpose network by using the communication I/F unit N27. The GPS N31 measures a position of the mobile device N20 to generate absolute position information of the mobile device N20. The 6-axis sensor N32 measures a position of the mobile device N20 to generate relative position information of the mobile device N20. The position information storage unit N33 holds results of the measurement of the GPS N31 and the 6-axis sensor N32. The CPU N 34 analyzes the position information stored in the position information storage unit N33.

FIG. 133 is a functional block diagram of the registration server N40 according to Embodiment B4 of the present invention.

Referring to FIG. 133, the registration server N40 (see, for example, the server 98c in FIG. 167) includes a communication I/F unit N41, a transmission unit N42, a receiving unit N43, a communication unit N44, a product information management unit N45, an image data storage unit N46, a program storage unit N47, a position information generation unit N48, and a product control unit N49. The communication I/F unit N41 connects the registration server N40 to other device via a general-purpose network. The transmission unit N42 transmits data to the outside via the communication I/F unit N41. The receiving unit N43 receives data from the outside via the communication I/F unit N41. The communication unit N44 communicates with other device via a general-purpose network by using the communication I/F unit N41. The product information management unit N45 manages product information received from the communication I/F unit N41. The image data storage unit N46 holds image data to be transmitted to the mobile device N20. The program storage unit N47 holds a program to be transmitted to the mobile device N20. The position information generation unit N48 generates a map indicating position relationships among the products having the RF-ID unit N10, by combining the pieces of product information stored in the product information management unit N45. The product control unit N49 controls the products having the RF-ID units N10 by using the pieces of product information stored in the product information management unit N45 and information of a current position of the mobile device N20.

Embodiment B4 differs from the other embodiments in that the products in the house are controlled based on a product map generated from (a) the position information of the mobile device N20 and (b) pieces of position information of the products having the RF-ID units N10.

FIG. 134 is a diagram illustrating an example of an arrangement of the networked products according to Embodiment B4 of the present invention.

Referring to the arrangement diagram of FIG. 134, in the house, there are: a TV N10A, a BD recorder N10B, an air conditioner N10C, and a FF heater N10K in a living room on the first floor; an air conditioner N10D and a fire alarm N10E in an European-style room on the first floor; an air conditioner N10F and a fire alarm N10G in a Japanese-style room on the first floor; a TV N10I and an air conditioner N10J on the second floor; and a solar panel N10H on a roof (see also FIG. 165 and the like).

FIG. 135 is a diagram illustrating an example of the system according to Embodiment B4 of the present invention.

FIG. 135 is a configuration of the system formed by the home appliances in the arrangement of FIG. 134.

This system includes: products from the TV N10A to the FF heater N10K; the mobile device N20 illustrated in FIG. 132; the registration server N40 illustrated in FIG. 133; a home network N100; and an external network N101. Each of the products N10A to N10K has the RF-ID unit N10 illustrated in FIG. 131 and a communication I/F unit N18 to communicate with other products and devices via a general-purpose network. The home network N100 connects the products N10A to N10K and the mobile device N20 to one another. The external network N101 connects the home network N100 to the registration server N40.

The following describes an example of a method of registering information regarding a product having the RF-ID unit N10 into the registration server N40 with reference to FIGS. 136 to 141.

FIG. 136 is a sequence diagram for registering information of the TV N10A into the registration server N40.

First, when a user moves the mobile device N20 to bring the RF-ID reader/writer N21 of the mobile device N20 to proximity of an antenna N11 of the TV N10A (see the touching movement 98b1 in FIG. 167), the RF-ID reader/writer N21 supplies power to a power supply unit N12 of the TV N10A via the antenna N11 to provide power to each unit in the RF-ID unit N10 ((1) in FIG. 136).

The reproducing unit N14 (FIG. 131) in the RF-ID unit N10 generates product information. The product information includes the UID N13A, the part number ID N13B, the server specific information N13C, and the operation program N13D stored in the memory N13.

FIG. 137 is a table illustrating an example of a structure of product information and server registration information according to Embodiment B4 of the present invention.

(a) in FIG. 137 illustrates an example of a structure of product information.

The product information illustrated in (a) in FIG. 137 includes: part number ID that is a part number of the TV N10A (including color information); UID that is a product serial number of the TV N10A; server specific information including an address, a login ID, and a password regarding the registration server N40; and an operation program to be executed by the program execution unit N23 in the mobile device N20.

The data transfer unit N15 in the RF-ID unit N10 modulates the product information (signal) and transmits the modulated product information to the RF-ID reader/writer N21 of the mobile device N20 via the antenna N11 ((2) in FIG. 136).

The RF-ID reader/writer N21 in the mobile device N20 receives the product information and stores the received product information into the RF-ID storage unit N22.

The program execution unit N23 (see, for example, FIG. 132) executes the operation program included in the product information stored in the RF-ID storage unit N22.

Here, the program execution unit N23 executes the operation program to "generate server registration information to be transmitted to the address of the registration server N40 which is designated in the product information".

(b) in FIG. 137 is a table illustrating an example of a structure of server registration information.

The server registration information illustrated in (b) in FIG. 137 includes: part number ID that is a part number of the TV N10A (including color information); UID that is a product serial number of the TV N10A; server specific information including a login ID and a password regarding the registration server N40; and position information of the mobile device N20.

Next, the position information (see the position information 98j1A in FIG. 168) of the mobile device N20 is explained.

The GPS N31 in the mobile device N20 constantly operates while the mobile device N20 is active. Detected results of the GPS N31 are stored in the position information storage unit N33.

The 6-axis sensor N32 operates when the mobile device N20 is outside an area in which the GPS N31 can perform positioning. The 6-axis sensor N32 stores detected results into the position information storage unit N33.

The program execution unit N23 generates position information to be included in the server registration information, from the results detected by the GPS N31 and the 6-axis sensor N32 which are stored in the position information storage unit N33.

From the generated position information and information stored in the RF-ID storage unit N22, the program execution unit N23 generates the server registration information as illustrated in (b) in FIG. 137.

Next, the communication unit N30 designates an address of the registration server N40 which is recorded on the RF-ID storage unit N22, to be a destination address of the server registration information.

The transmission unit N28 transmits the generated server registration information via the communication I/F unit N27 ((3) in FIG. 136).

The receiving unit N43 of the registration server N40 receives the server registration information via the communication I/F unit N41.

The communication unit N44 confirms the login ID and the password in the server registration information.

If the login ID and the password are correct, the registration server N40 stores, into the product information management unit N45, the part number ID, the UID, and the position information included in the server registration information.

FIG. 138 is a table illustrating an example of a structure of product information stored in a product information management unit N45 according to Embodiment B4 of the present invention.

(a) in FIG. 138 is a table illustrating an example of a structure of product information regarding the TV N10A which is registered on the product information management unit N45.

The product information includes the part number ID, the UID, and the position information. The position information includes latitude, longitude, and altitude.

Next, when the registration of the product information of the TV N10A is completed, the registration server N40 generates a server registration completion notification. The server registration completion notification includes (a) image data that is previously stored in the image data storage unit N46 and (b) the operation program stored in the program storage unit N47. Then, the communication unit N44 in the registration server N40 designates an address of the mobile device N20 to be a destination of the server registration completion notification.

The transmission unit N42 transmits the generated server registration completion notification via the communication I/F unit N41 ((4) in FIG. 136).

The receiving unit N29 of the registration server N20 receives the server registration completion notification via the communication I/F unit N27.

The communication unit N30 in the mobile device N20 confirms the destination address of the server registration completion notification, and provides the received server registration completion notification to the program execution unit N23.

The program execution unit N23 executes the operation program included in the server registration completion notification.

Here, the program execution unit N23 executes the operation program to "display image data on the display unit N26."

In more detail, the program execution unit N23 instructs the data processing unit N24 to perform processing for the image data.

The data processing unit N24 thereby performs data processing for the image data. For example, if downloaded image data is compressed, the data processing unit N24 decompresses the image data. If the image data is encrypted, the data processing unit N24 decrypts the image data. The data processing unit N24 may also arrange the downloaded image data in an image display style based on an image display style sheet.

In completing the data processing, the data processing unit N24 provides the processed image data to the memory unit N25 in which the processed image data is temporarily stored.

The display unit N26 displays the image data stored in the memory unit N25.

In this example, the image data accumulated in the memory unit N25 is used to notify a user of that registration of information of a corresponding product is completed without any problem.

(b) in FIG. 138 is a table illustrating an example of pieces of product information managed in the product information management unit N45 of the registration server N40, after pieces of information regarding the other products from the BD recorder N10B to the FF heater N10K are registered in the registration server N40 in the same manner as described for the TV N10A.

Pieces of product information for which registration processing is performed in the house of FIG. 134 are managed in the same table. In this example, products registered using the same mobile device N20 are determined as products for which registration processing is performed in the same house.

FIG. 139 is a flowchart of an example of processing performed by the RF-ID unit N10 to perform product registration.

First, the RF-ID unit N10 of a target product waits for power supply from the mobile device N20 (N001).

If the RF-ID unit N10 receives power from the mobile device N20 (Y at N001), then the processing proceeds to N002. Otherwise (N at N001), the processing returns to N001.

At N002, the RF-ID unit N10 generates product information including information stored in the memory N13. Then, at N003, the RF-ID unit N10 transmits the product information from the antenna N11 to the mobile device N20. Thereby, the processing is completed.

FIG. 140 is a flowchart of an example of processing performed by the mobile device N20 to perform product registration.

First, at N001, the RF-ID reader/writer N21 of the mobile device N20 supplies power to the RF-ID unit N10 of the target product.

Next, the mobile device N20 waits for product information from the RF-ID unit N10 of the target product (N005).

If the mobile device N20 receives product information from the RF-ID unit N10 (Y at N005), then the processing proceeds to N006. Otherwise (N at N005), the processing returns to N004 to supply power to the RF-ID unit N10 again.

At N006, the mobile device N20 analyzes the received product information and thereby executes an operation program included in the product information.

At N007, the mobile device N20 determines a position of the mobile device N20 itself (see the position information obtainment unit 98$j$ in FIG. 167).

At N008, the mobile device N20 generates server registration information including information of the determined position.

At N009, the mobile device N20 transmits the generated server registration information to the registration server N40 via the communication I/F unit N27 (see the transmission unit 98$o$ in FIG. 167).

Next, the mobile device N20 waits for a server registration completion notification from the registration server N40 (N010).

If the mobile device N20 receives the server registration completion notification from the registration server N40 (Y at N010), then the processing proceeds to N011.

At N011, the mobile device N20 analyzes the server registration completion notification. Then, at N012, the mobile device N20 displays, on the display unit N26, image data included in the server registration completion notification. Thereby, the processing is completed.

FIG. 141 is a flowchart of an example of processing performed by the registration server N40 to perform product registration.

First, the registration server N40 waits for server registration information from the mobile device N20 (N013).

If the registration server N40 receives the server registration information from the mobile device N20 (received at N013), then the processing proceeds to N014. Otherwise (not received at N013), the processing returns to N013.

At N014, the registration server N40 analyzes the received server registration information to determine whether or not a login name and a password included in the server registration information are correct. If the login name and the password are correct, then, at N015, the registration server N40 stores the product information into the product information management unit N45.

At N016, the registration server N40 generates a server registration completion notification that includes an operation program and image data. At N017, the registration server N40 transmits the generated server registration completion notification from the communication I/F unit N41 to the mobile device N20. Thereby, the processing is completed.

Next, the following describes an example of a method of controlling a product having the RF-ID unit N10 by using the position information of the mobile device N20, with reference to FIGS. 142 and 143.

FIG. 142 is a sequence diagram illustrating an example of controlling power for the air conditioner N10J and the TV N10A, when the mobile device N20 is moved from the first floor to the second floor.

The CPU N34 in the mobile device N20 monitors the position information stored in the position information storage unit N33 to determine whether or not predetermined conditions are satisfied. If the predetermined conditions are satisfied, then the CPU N34 generates positional information including position information that is information of a current position of the mobile device N20 (hereinafter, referred to as "current position information").

FIG. 143 is a table illustrating an example of a structure of positional information and product control information according to Embodiment B4 of the present invention.

(a) in FIG. 143 is a table illustrating an example of a structure of the positional information.

The positional information includes (a) second server login ID and a second server login password which are regarding the registration server N40 and (b) current position information. The second server login ID and the second server login password are previously obtained in purchasing the product and stored in a memory (not shown). The current position information is obtained from the position information storage unit N33.

The communication unit N30 designates, as a destination of the positional information, an address of the registration server N40 in which information of the product is registered.

The transmission unit N28 transmits the positional information to the registration server N40 via the communication I/F unit N27 ((1) in FIG. 142).

The receiving unit N43 in the registration server N40 receives the positional information via the communication I/F unit N41.

The communication unit N44 in the registration server N40 confirms the second server login ID and the second server login password in the received positional information.

If the second server login ID and the second server login password are correct, then the communication unit N44 provides the positional information to the product control unit N49.

The product control unit N49 provides the second server login ID to the position information generation unit N48.

According to instructions from the product control unit N49, the position information generation unit N48 obtains pieces of product information as illustrated in (b) in FIG. 138 from the product information management unit N45 based on the second server login ID. Then, the position information generation unit N48 generates a product map from pieces of position information of the respective products. The product map shows positions of the products in the house illustrated in FIG. 134. The position information generation unit N48 provides the generated product map to the product control unit N49.

FIG. 144 illustrates an example of the product map generated by the position information generation unit N48.

The product map is a 3D map (or 3D product map) in which illustrations of the products are arranged at positions based on the respective pieces of position information.

The product control unit N49 controls the products from the TV N10A to the FF heater N10K, by using (a) the current position information of the mobile device N20 included in the positional information and (b) the product map (or home appliance map) generated by the position information generation unit N48.

In this example, the product control unit N49 turns ON a product at a position closest to the current position information received from the mobile device N20 (without turning ON products at other positions). See, for example, FIG. 173 described later, according to need. Here, the product control unit N49 generates product control information including an instruction for turning ON the air conditioner N10J.

(b) in FIG. 143 is a table illustrating an example of a structure of first product control information.

The first product control information includes: part number ID of the air conditioner N10J; UID of the air conditioner N10J; and a product control command for turning ON the air conditioner N10J.

The communication unit N44 designates an address of the mobile device N20 to be a designation of the first product control information.

The transmission unit N42 transmits the first product control information to the mobile device N20 via the communication I/F unit N41 ((2) in FIG. 142).

After receiving the first product control information, the mobile device N20 transfers the first product control information to the air conditioner N10J based on the part number ID and the UID in the first product control information ((2)' in FIG. 142).

When the air conditioner N10J receives the first product control information from the communication I/F unit N18, the air conditioner N10J turns ON a power source of the air conditioner N10J if the power source is OFF.

Next, the product control unit N49 turns OFF a product located the farthest from the current position information received from the mobile device N20. Here, the product control unit N49 generates product control information including an instruction for turning OFF the TV N10A.

(c) in FIG. 143 is a table illustrating an example of a structure of second product control information.

The second product control information includes: part number ID of the TV N10A; UID of the TV N10A; and a product control command for turning OFF the TV N10A.

The communication unit N44 designates an address of the mobile device N20 to be a designation of the second product control information.

The transmission unit N42 transmits the second product control information to the mobile device N20 via the communication I/F unit N41 ((2) in FIG. 142).

After receiving the second product control information, the mobile device N20 transfers the second product control information to the TV N10A based on the part number ID and the UID in the second product control information ((3)' in FIG. 142).

When the TV N10A receives the second product control information from the communication I/F unit N18, the TV N10A turns OFF a power source of the TV N10A if the power source is ON.

As described above, according to Embodiment B4 of the present invention, proximity wireless communication of RF-ID technology and position information are used to manage, in the registration server N40, positions of products each having the RF-ID unit N10. Thereby, it is possible to automatically control the products according to a current position of the mobile device N20.

Regarding the position information, information detected by the 6-axis sensor N32 (motion sensor) that measures relative position information is used as position information. Therefore, it is possible to update the position information by using the detected results of the 6-axis sensor N32 when the mobile device N20 is outside an area in which the GPS N31 can perform positioning. As a result, correct position information can be obtained even outside the area.

It should be noted that the mobile device N20 according to Embodiment B4 has been described to have the GPS N31 and the 6-axis sensor N32, but the mobile device N20 is not limited to the above-described structure. For example, the mobile device N20 may have only the 6-axis sensor N32.

FIG. 145 is a table illustrating an example of a structure of product information stored in the product information management unit N45.

In this aspect, the product information management unit N45 in the registration server N40 stores pieces of relative position information of products which are relative to a reference point (position information) of the TV N10A which is first registered as illustrated in FIG. 145.

FIG. 146 is a diagram illustrating a product map generated by the position information generation unit N48.

Here, a product map generated by the position information generation unit N48 has axes of an x-coordinate, a y-coordinate, and a z-coordinate as illustrated in FIG. 146.

It should also be noted that it has been described in Embodiment B4 that (a) part number ID and UID of a target product which are stored in the RF-ID unit N10 of the target product and (b) position information of the mobile device N20 are registered to the registration server N40, but the present invention is not limited to the above. For example, if the registration server N40 receives again server registration information regarding a product for which registration has already been completed, the registration server N40 may perform processing as illustrated in FIG. 147.

FIG. 147 is a table illustrating examples of an accuracy identifier according to Embodiment B4 of the present invention.

The following describes FIG. 147.

Referring to FIG. 147, the table includes: (a) accuracy identifiers for identifying an accuracy of position information; (b) part number ID in association with each accuracy identifier; and (c) processing to be performed when position information in re-received server registration information is different from position information registered in the product information management unit N45.

If the registration server N40 determines, based on the part number ID and the UID included in the re-received server registration information, that the position information has already been registered in the product information management unit N45, then the registration server N40 checks the part number ID. If the part number ID indicates a TV, a BD recorder, or an FF heater, the registration server N40 updates the position information in the product information management unit N45 to the position information in the re-received server registration information.

If the part number ID indicates an air conditioner, a solar panel, or a fire alarm, then the registration server N40 notifies the mobile device N20 of the position information stored in the product information management unit N45. The mobile device N20 thereby corrects current position information of the mobile device N20 based on the position information received from the registration server N40.

It should also be noted that FIG. 147 shows the two kinds of accuracy identifiers, but the accuracy identifiers are not limited to the two kinds. It is possible to set more than two kinds of accuracy identifiers for respective different processing.

It should also be noted that the product control unit N49 in Embodiment B4 is included in the registration server N40, but the present invention is not limited to the structure. For example, the product control unit N49 may be included in the mobile device N20 so that the product control unit N49 obtains a product map from the registration server N40 to control products. Besides in the mobile device N20, the product control unit N49 may also be included in a home server (not illustrated) that is connected to the home network N100. In this aspect, the mobile device N20 transmits position information to the home server and obtains a product map from the home server.

FIG. 148 is a diagram illustrating an example of a system according to Embodiment B4.

It should be noted that the mobile device N20 according to Embodiment B4 is connected to the registration server N40 via the home network N100 and the external network N101 by using the communication I/F unit (general-purpose I/F unit) N27, but the present invention is not limited to the above. For example, the mobile device N20 may have a function of serving as a mobile phone so that the mobile device N20 can be connected to the registration server N40 via at least a mobile phone network (for example, Long Term Evolution (LTE)) by using an interface connectable to the mobile phone network, in stead of the communication I/F unit N27 (see FIG. 148). Furthermore, the mobile device N20 may have an interface connectable to a circuit network such as WiMAX so as to be connected to the registration server N40 via at least the WiMAX network. Any other networks can be used to connect the mobile device N20 to the registration server N40.

It should also be noted that, in Embodiment B4, the product map generated by the position information generation unit N48 is used to determine how to control products, but the present invention is not limited to the structure. For example, image data of the product map generated by the position information generation unit N48 is transmitted to the mobile device N20 that displays the image data on the display unit N26.

It should also be noted that, in Embodiment B4, the position information generation unit N48 generates the product map based on the information illustrated in (b) in FIG. 121, but the present invention is not limited to the above. For example, pieces product information of products located near the position information of the mobile device N20 in the same house are detected from the product information management unit N45, and then used to generate a product map regarding nearby products in the house. In this aspect, the product control unit N49 performs product control by combining the product map of FIG. 144 and the product map of nearby products. For instance, it is assumed in Embodiment B4 that the TV N10A, which is the farthest from the mobile device N20, is turned OFF but there is a solar panel near the mobile device N20 in the house. Under the assumption, the product control unit N49 controls the TV N10A to be turned ON, for example.

It should also be noted that, in Embodiment B4, the product information management unit N45 in the registration server N40 stores part number ID, UID, and position information of each product, but the present invention is not limited to the above. For example, it is also possible that a power state (ON or OFF) is obtained in real time from each product via the communication I/F unit N18 of the product, and then managed in the product information management unit N45. The product control unit N49 thereby controls power of the TV N10A located the farthest from the mobile device N20 to be kept ON when the predetermined number of products are powered OFF, although it has been described n the above description that the product control unit N49 turns OFF the TV N10A.

It should also be noted that, in Embodiment B4, the product control unit N49 turns OFF a product located the farthest from the mobile device N20 and turns ON a product closest to the mobile device N20. However, the present invention is not limited to the above.

The product control unit N49 may control power to be turned ON or OFF for a plurality of products based on the position information of the mobile device N20.

It should also be noted that, in Embodiment B4, the product control unit N49 turns OFF a product located the farthest from the mobile device N20 and turns ON a product closest to the mobile device N20. However, the present invention is not limited to the above. For example, it is also possible that the CPU N34 in the mobile device N20 stores position information as a movement history into a memory (not illustrated), and regularly provides the movement history to the registration server N40. In this aspect, the registration server N40 estimates, from the movement histories of the mobile device N20, which product is located in which room or which floor, and manages results of the estimation. It is further possible that the product control unit N49 controls power to be turned ON or OFF for each product in the same house based on the estimation results. For example, if it is estimated from the movement histories that the TV N10A and the air conditioner N10C are located in the same room, the product control unit N49 turns OFF the air conditioner N10C when the TV N10A is turned OFF.

In addition to the moving histories, it is also possible to obtain a time of switching ON or OFF each product, thereby estimating which product is in the same room or the same floor.

It should also be noted that, in Embodiment B4, the product information management unit N45 manages the product information illustrated in FIG. 138 or 145, and the position information generation unit N48 generates the product map illustrated in FIG. 144 or 146. However, the present invention is not limited to the above. For example, it is also possible that image data of a room arrangement created by the user is transmitted from the mobile device N20 to the registration server N40, and therefore managed by the product information management unit N45. In this aspect, the position information generation unit N48 generates a product map as illustrated in FIG. 134, by combining (a) product information illustrated in FIG. 138 or 145 and (b) the image data of the room arrangement.

Here, private information such as the image data (see, for example, an image generated by an image generation unit described later) of room arrangement may be applied with encryption different from encryption employed for the product information, and then transmitted from the mobile device N20 to the registration server N40.

It is also possible that private information such as the image data of room arrangement is transmitted to a server different from the server receiving the product information, and a product map is generated with reference to the different server when the registration server N40 generates the product map.

It should also be noted that Embodiment B4 may be combined with any other embodiments. For example, it is possible that the function of the terminal device Y01 according to Embodiment B3 is provided to the RF-ID unit N10 according to Embodiment B4 and the function of the communication device Y02 according to Embodiment B3 is provided to the mobile device N20 according to Embodiment B4. Thereby, the series of processes including the polling, the mutual authentication, and the key sharing illustrated in FIG. 128 can be performed prior to the product registration processing of FIG. 136. Any combination of the embodiments is within a scope of the present invention.

Embodiment B5

FIG. 149 is a diagram illustrating an example of an entire system according to Embodiment B5 of the present invention.

Referring to FIG. 149, the system according to Embodiment B5 includes a RF-ID device O50 (see the RF-ID tag 98f in FIG. 166), a mobile device O60 (see the mobile communication device 98b), a first server O101, and a second server O103.

The RF-ID device O50 is a device having a NFC function. The RF-ID device O50 is included in electronic products such as refrigerators, microwaves, washing machines, TVs, and recording devices. The RF-ID device O50 stores, as product information of a corresponding product, (a) a product serial number that is ID for identifying the product, (b) use history information of the product, (d) error information, and the like into a memory of the product.

The mobile device O060 has a NFC function communicable with the NFC function of the RF-ID unit O50 by proximity wireless communication. The mobile device O60 also has a reader/writer function of reading product information from the RF-ID O50. In addition, the mobile device O60 is a portable device such as a mobile phone terminal and a remote controller terminal for TV.

The first server O101 is a server connected to the mobile device O60 via a general-purpose network such as the Internet in order to communicate with the mobile device O60. The first server O101 has an internal database (DB) in which pieces of RF-ID information read from the RF-ID devices O50 to the mobile device O60 are accumulated.

The second server O103 is a server connected to the first server O101 via a general-purpose network such as the Internet in order to communicate with the first server O101. The second server O103 has an internal database (DB) in which pieces of building information regarding the RF-ID devices O50 are accumulated. Each of the building information is coordinates of a building in which the corresponding RF-ID device O50 is located.

The RF-ID device O50 includes product ID O50, a first server URL O52, service ID O53, and an accuracy identifier O54.

The product ID O51 is ID for identifying a product having the RF-ID device O50. For example, the product ID O51 is a part number (including color information) or a product serial number of the product.

The first server URL O52 is address information of the first server O101.

The service ID O53 is ID for identifying a product classification such as a TV, an air conditioner, or a refrigerator.

The accuracy identifier O54 is information indicating reliability of position information provided from a product with the RF-ID device 10 which has the product ID.

As described above, if the RF-ID device O50 according to Embodiment B5 is moved into proximity of the mobile device O60 to be able to perform proximity wireless communication, the RF-ID device O50 can transmit, to the mobile device O60, the product serial number, the first server URL, the service ID, and the accuracy identifier which are stored in the memory.

Next, the mobile device O60 according to Embodiment B5 is described.

The mobile device O60 includes an antenna O61, a RF-ID reader/writer O62, a coordinate accuracy identification information O63, a CPU O64, a program execution unit O65, a data processing unit O66, a memory unit O67, a display unit O68d, a communication antenna O68, a transmission unit O70, a receiving unit O71, a communication unit O72, a position information storage unit O73, a RF-ID storage unit O74, a RF-ID detection unit O75, a URL unit O76, a reproducing unit O77, a relative position calculation unit O78, a coordinate information sending unit O79, a recording unit O80, a building coordinate information output unit O81, a registered-coordinate unit O82, a determination unit O83, a reference coordinate unit O84, a position information output unit O85, a position information unit O86, a direction information unit O87, a magnetic compass O88, a direction information unit O89, a satellite antenna O90, a position information calculation unit O91, position information O92, position information correction unit O93, a direction information correction unit O94, an angular velocity sensor O95, an angular velocity sensor O96, an angular velocity sensor O97, an acceleration sensor O98, an acceleration sensor O99, an acceleration sensor O100, an integrator O105, an integrator O106, and an absolute coordinate calculation unit O107.

The antenna O61 supplies power towards any RF-ID devices so as to search for a RF-ID device with which the mobile device O60 can perform proximity wireless communication. In receiving a response, the antenna O61 establishes proximity wireless communication with the responding RF-ID device O50 to receive modulated information from the RF-ID device O50.

The RF-ID reader/writer O62 demodulates the received modulated information.

The coordinate accuracy identification information O63 extracts an accuracy identifier from the received information.

The CPU O64 controls a system of the mobile device O60. The CPU O64 controls operations of each unit included in the mobile device O60.

The program execution unit O65 executes a program based on the service ID included in the received information.

The data processing unit O66 performs data processing for information transmitted from the first server O101.

The memory unit O67 temporarily stores the information processed by the data processing unit O66.

The display unit O68d displays the information stored in the memory unit O67.

The communication antenna O68 is connected to a general-purpose network such as the Internet.

The transmission unit O70 modulates information to be transmitted to the general-purpose network such as the Internet.

The receiving unit O71 demodulates information received via the general-purpose network such as the Internet.

The communication unit O72 generates and analyzes information to be exchanged (transmitted and received) in communication with other devices via the general-purpose network such as the Internet.

The position information storage unit O73 stores position information generated by the mobile device O60.

The RF-ID storage unit O74 holds product ID and service ID which are obtained from the RF-ID device O50.

The RF-ID detection unit O75 detects a response from the RF-ID device O10.

The URL O76 extracts the first server URL from the information received from the RF-ID device O50.

The reproducing unit O77 reproduces the position information stored in the position information storage unit O73.

The relative position calculation unit O78 calculates relative position information from (a) the position information which is obtained from the position information storage unit O73 and then reproduced and (b) position information of a current position (current position information) of the mobile device O60.

The coordinate information sending unit O79 provides other units with the position information of the mobile device O60 which is generated at a timing of receiving a trigger from the RF-ID detection unit O75.

The recording unit O80 writes the position information provided from the coordinate information sending unit O79, into the position information storage unit O73.

The building coordinate information output unit O81 extracts building coordinate information from the information received by the communication antenna O68.

The registered-coordinate unit O82 extracts registered coordinate information from the information received by the communication antenna O68.

The determination unit O83 examines (determines) an accuracy of the registered coordinate information extracted by the registered-coordinate unit O82.

If the determination unit O83 determines that the registered coordinate information is reliable, then the reference coordinate unit O84 sets the registered coordinate information to be reference coordinate information and provides the reference coordinate information to the position information correction unit O93.

The position information output unit O85 generates position information using direction information provided from the direction information unit O87 and position information provided from the position information unit O86, and provides the generated position information to another unit.

The position information provided from the position information unit O86 and the direction information provided from the direction information unit O87 are position information of the mobile device O60 which is provided form the absolute coordinate calculation unit O107 that includes the position information correction unit O93 and the direction information correction unit O94.

The magnetic compass O88 determines a direction.

The direction information unit O89 generates direction information from information detected by the magnetic compass O88.

The satellite antenna O90 communicates with satellites (see the GPS device 98j1x in FIG. 168).

The position information calculation unit O91 calculates position information of the mobile device O60 from a result of the communication with the satellites. For example, the position information calculation unit O91 calculates longitude, latitude, and altitude of the position of the mobile device O60.

The position information unit O92 generates position information from the position information generated by the position information calculation unit O91.

The position information correction unit O93 corrects a result of position information obtained from the integrators O105 and O106, by using pieces of information provided from the position information O92, the reference coordinate unit O84, and the building coordinate information output unit O81.

The direction information correction unit O94 corrects a result of direction information obtained from the integrators O105 and O106, by using the information provided from the direction information unit O89.

The angular velocity sensor O95 measures an angular velocity in the x-axis direction of the mobile device O60.

The angular velocity sensor O96 measures an angular velocity in the y-axis direction of the mobile device O60.

The angular velocity sensor O97 measures an angular velocity in the z-axis direction of the mobile device O60.

The acceleration sensor O98 measures an acceleration in the x-axis direction of the mobile device O60.

The acceleration sensor O99 measures an acceleration in the y-axis direction of the mobile device O60.

The acceleration sensor O100 measures an acceleration in the z-axis direction of the mobile device O60.

The integrator O105 integrates results of the measurement of the angular velocity sensors O95, O96, and O97.

The integrator O106 integrates results of the measurement of the acceleration sensors O98, O99, and O100.

The absolute coordinate calculation unit O107 includes the position information correction unit O93 and the direction information correction unit O94, in order to calculate absolute coordinates of the mobile device O60.

As described above, the mobile device O60 according to Embodiment B5 can determine a position of the mobile device O60 when the mobile device O60 receives the product information from the RF-ID device O50, thereby generating position information of the mobile device O60. Thereby, the mobile device O60 transmits, to the first server O10, the position information and the product information of the product having the RF-ID device O50 in association with each other.

In addition, (a) the reference coordinates and the building coordinate information which are generated from the registered coordinates received from the RF-ID device O50, (b) the position information generated by the position information unit O92, and (c) the information generated by the direction information unit O89 allow the current position information of the mobile device O60 to be corrected.

In addition, combination of the registered coordinate information in the first server O101 and the building coordinate information in the second server O103 makes it possible to generate a 3D product map of a building in which a product having the RF-ID device 10 registered by using the mobile device O60 is located. It is also possible to display the generated 3D product map on the display unit O68d.

Next, the first server O101 according to Embodiment B5 is described.

The first server O101 is a server connected to the mobile device O60 via a general-purpose network such as the Internet. The first server O101 includes a registered-coordinate information unit O102 in which pieces of information regarding products having the RF-ID devices O50 are managed.

The registered-coordinate information unit O102 receives the information of the RF-ID device O10 and the information of the mobile device O60 which are in association with each other. The registered-coordinate information unit O102 manages the information of the mobile device O60 as parent device information and the RF-ID device O50 as child device information in association with each other. The child device information is added with the position information generated by the mobile device O60 so as to manage also information indicating whether the terminal device (product having the RF-ID device O50) exists. In addition, combination of the building coordinate information received from the second server O103 and the information in the registered-coordinate information unit O102 makes it possible to generate a 3D product map of products including the mobile device O60 arranged in the corresponding building.

Next, the second server O103 according to Embodiment B5 is described.

The second server O103 is a server connected to the first server O101 via the general-purpose network such as the Internet. The second server O103 includes a building coordinate database O104 in which a room arrangement and coordinates of each existing building (for example, longitude, latitude, and altitude) are managed in association with each other.

The room arrangement and coordinates of each existing building stored in the building coordinate database O104 can be combined with the registered coordinate information registered in the first server O103 in order to generate a 3D product map of products including the mobile device O60 arranged in the corresponding building. The building coordinate database O104 may be managed as private information in a server having security higher than that of the first server O101 (for example, a server having setting of preventing the server from directly communicating with the mobile device O60). In this aspect, it is possible reduce leakage of the private information.

As described above, in the system according to Embodiment B5, the product information of the product having the RF-ID device O50 is read by the mobile device O60 using proximity wireless communication. Then, the mobile device O60 transmits, to the first server O103, (a) the product information received from the RF-ID device O50 and (b) the position information generated by touching the RF-ID device O50 by the mobile device O60 to perform proximity wireless communication, which are in association with each other. The first server O103 can manage the information of the mobile device O60 as parent device information and the information of the product having the RF-ID device O50 as child device information, in association with each other. In addition, if relative positions of such products having the RF-ID devices O50 are calculated using pieces of the position information of the products, the relative positions can be used to generate a 3D map of the products.

In addition, the system includes the second server O103 having a database in which a room arrangement and coordinates of each building are managed. The room arrangement and coordinates are combined with pieces of position information of products which are managed in the first server O101. Thereby, it is possible to generate a 3D map (3D product map) of the products having the RF-ID devices O50 arranged in each building.

Moreover, the mobile device O60 can correct the current position information of the mobile device O60 by using (a) the reference coordinates and the building coordinate information which are generated from the registered coordinates received from the RF-ID device O50, (b) the position information generated by the position information unit O92, and (c) the information generated by the direction information unit O89.

The following describes processing of registering the product information of the product having the RF-ID device O50 into the first server O101.

If the mobile device O60 touches the RF-ID device O50 to be able to perform proximity wireless communication with the RF-ID device O50, the mobile device O60 supplies power to the RF-ID device O50 that thereby starts operating.

With the power supply, the RF-ID device O50 modulates the product ID O51, the first server URL O52, the service ID O53, and the accuracy identifier O54. The RF-ID device O50 then transmits the modulated pieces of information to the mobile device O60.

In receiving the product ID O51, the first server URL O52, the service ID O53, and the accuracy identifier O54 by the antenna O61, the mobile device O60 demodulates the received pieces of information in the RF-ID device O62.

The URL unit O76 extracts the first server URL O52 and provides the extracted first server URL O52 to the communication unit O72.

The RF-ID storage unit O74 stores the product ID O51 and the service ID O53.

The coordinate accuracy identification information O63 extracts the accuracy identifier O54 and provides the extracted accuracy identifier O54 to the determination unit O83.

The RF-ID detection unit O75 provides the coordinate information sending unit O79 and the reference coordinate unit O84 with a trigger for notifying of the receipt of the pieces of information from the RF-ID device O50.

In receiving the trigger, the coordinate information sending unit O79 provides the communication unit O72 with the position information of the mobile device N60 which is received from the position information output unit O85.

Here, the description is given for the position information of the mobile device O60 outputted by the position information output unit O85

First, the absolute coordinate calculation unit O107 receives (a) a result of integrating, by the integrator O105, results detected by the angular velocity sensors O95 to O97 and (b) a result of integrating, by the integrator O106, results detected by the acceleration sensors O98 to O100.

In the absolute coordinate calculation unit O107, the position information correction unit O93 and the direction information correction unit O94 correct the results of the integrators O105 and O106 by using the information stored in the position information unit O92 and the information stored in the direction information O89. The information stored in the position information unit O92 is a calculation result of the position information calculation unit O91 using the satellite antenna O90. The information stored in the direction information O89 is a direction indicated by the magnetic compass O88

Next, the absolute coordinate calculation unit O107 provides the corrected direction information in the direction information unit O87 and the corrected position information in the position information unit O86.

The position information output unit O85 generates position information from the corrected direction information in the direction information unit O87 and the corrected position information in the position information unit O86.

By the above-described processing, the mobile device O60 eventually generates position information (current position information) of the mobile device O60.

Then, the program execution unit O65 provides the product ID and the service ID, which are stored in the RF-ID storage unit O74, to the communication unit O72.

The communication unit O72 generates data (information) including (a) the position information provided from the coordinate information sending unit O79 and (b) the product ID and the service ID provided from the program execution unit O65. The communication unit O72 designates the first server URL notified from the URL unit O76 to be a destination address of the data, and provides the data and the address to the transmission unit O70. The transmission unit O70 modulates the data and transmits the modulated data to the first server O101 via the communication antenna O68.

In receiving the data from the mobile device O60, the first server O101 demodulates the modulated data.

The registered-coordinate information unit O102 stores the information of the mobile device O60 as parent device information and the information of the RF-ID device O50 as child device information in association with each other. In more detail, the product ID O51 and the service ID O53 which are information of the product having the RF-ID device O50 (child device) are managed in association with the position information of a position at which the mobile device O60 (parent device) receives the product ID O51 and the service ID O53 from the RF-ID device O50.

The following describes processing performed by the mobile device O60 to generate a 3D map of products (a 3D product map). Each of the products has the RF-ID device 10 and has been registered by the mobile device O60 onto the first server O101.

FIG. 150 is a diagram illustrating an example of an arrangement of the products having the RF-ID units O50 according to Embodiment B5 of the present invention.

In a living room on the first floor, a TV O50A, a BD recorder O50B, and an air conditioner O50C are arranged. In a Japanese room on the first floor, an air conditioner O50D is arranged. On the second floor, a TV O50E and an air conditioner O50F are arranged. Each of the above products is embedded with the RF-ID device O50.

It is assumed that coordinates of a position of each product have already been registered to the registered-coordinate information unit O102 connected to the first server O101, by using the mobile device O60 employing the above-described processing for registering product information stored in the RF-ID device O50.

First, the communication unit O72 in the mobile device O60 generates product information request data to be used to request the first server O101 to provide the product information registered by using the mobile device O60.

The transmission unit O70 modulates the product information request data and transmits the modulated data to the first server O101 via the communication antenna O68.

In receiving the product information request data, the first server O101 generates product information response data and transmits the generated data to the mobile device O60. The product information response data includes the child product information that managed in association with the mobile device O60 as its parent device.

In this example, the product information response data includes the product ID O51, the service ID, and the position information regarding each of the TV O50A, the BD recorder O50B, the air conditioner O50C, the air conditioner O50D, the TV O50E, and the air conditioner O50F.

Next, the first server O101 transmits the same product information response data to the second server O103.

Based on the position information of each product included in the product information response data, the second server O103 extracts, from the building coordinate database O104, image data including position (coordinate) information of a building (hereinafter, "building coordinate information") located at the same position as that of each product.

FIG. 151 illustrates the building coordinate information extracted from the building coordinate database O104.

The building coordinate information includes an image of a room arrangement and position information of a building.

The second server O103 transmits the extracted building coordinate information to the mobile device O60.

The receiving unit O71 in the mobile device O60 receives the product information response data via the communication antenna O68, then modulates the received information, and provides the modulated information to the communication unit O72.

The communication unit O72 provides the modulated information to the program execution unit O65.

FIG. 152 is a diagram illustrating an example of image data of a 3D map of products which is generated by the program execution unit O65.

The program execution unit O65 generates image data of a 3D map of products as illustrated in FIG. 152, using the position information of each of the products which is information included in the product information response data. In the 3D map, the products are mapped as different icons on respective coordinates based on the corresponding position information, so that the user can learn the arrangement of the products at a glance.

The program execution unit O65 provides the generated image data to the data processing unit O66.

The data processing unit O66 provides the image data to the memory unit O67 in which the image data is temporarily stored.

The display unit O68d displays image data of the 3D map of products illustrated in FIG. 151 which is stored in the memory unit O67.

Next, in receiving the building coordinate information from the second server O103 via the communication antenna O68, the receiving unit O71 in the mobile device O60 demodulates the received building coordinate information, and provides the demodulated information to the building coordinate information output unit O81.

The building coordinate information output unit O81 analyzes the building coordinate information and provides the building coordinate information to the display unit O68d.

FIG. 153 is a diagram illustrating an example of a 3D product map.

The display unit O68d displays image data of a 3D product map as illustrated in FIG. 153. The displayed image data is a combination of the image data of FIG. 151 and the already-displayed image data of FIG. 152.

As described above, it is possible to generate a 3D product map which the user having the mobile device O60 can see an arrangement of products at a glance.

Next, the description is given for the processing performed by to the mobile device O60 to correct the position information of the mobile device O60 by using the building coordinate information.

It is assumed in this example that product information of the air conditioner O50D in FIG. 150 is to be registered to the first server O101.

Here, the processing until when the first server O101 receives data including product ID and service ID from the mobile device O60 is the same as the processing described previously, and therefore is not explained again below.

In receiving the product information of the air conditioner O50D, the first server O101 transmits the position information of the air conditioner O50D to the second server O103.

The second server O103 extracts, from the building coordinate database O104, the building coordinate information of FIG. 151 corresponding to the position information of the air conditioner O50D. Then, the second server O103 transmits the extracted building coordinate information to the first server O101.

If the product to be registered is a product usually fixed to a wall or somewhere, such as an air conditioner, the first server O101 compares (a) the position information of the air conditioner that is indicated in the building coordinate information to (b) the position information of the air conditioner that is generated by the mobile device O60. If the position information of the air conditioner that is generated by the mobile device O60 is not close to a wall, the first server O101 transmits, to the mobile device O60, the position information (hereinafter, referred to also as "building coordinate information) of the air conditioner that is indicated in the building coordinate information.

In receiving the building coordinate information, the receiving unit O71 in the mobile device O60 demodulates the building coordinate information and provides the demodulated information to the building coordinate information output unit O81. The building coordinate information output unit O81 determines, based on the building coordinate information and the position information of the air conditioner, that the current position information of the mobile device O60 is to be corrected. Then, the building coordinate information output unit O81 provides the building coordinate information to the position information correction unit O93.

The position information correction unit O93 corrects the current position information of the mobile device O60 based on the building coordinate information provided from the building coordinate information output unit O81.

Next, the mobile device O60 registers information of the air conditioner O50D into the first server O101 in association with the corrected current position information of the mobile device O60.

As described above, (a) the position information of the air conditioner that is indicated in the building coordinate information is compared to (b) the position information of the air conditioner that is generated by the mobile device O60. Thereby, it is possible to determine whether or not (b) the position information of the air conditioner that is generated by the mobile device O60 is deviated from a correct position. As a result, the position information of the mobile device O60 can be corrected.

It should be noted that it has been described that the first server O101 receives the building coordinate information from the second server O103 for the determination. However, the present invention is not limited to the above. For example, it is also possible that the mobile device O60 obtains the building coordinate information from the second server O103 before transmitting information to be registered to the first server O101 and that the mobile device O60 compares the building coordinate information to the position information of the air conditioner O50D to determine whether or not the position information of the mobile device O60 is to be corrected.

Next, the description is given for the processing performed by the mobile device O60 to correct the position information of the mobile device O60 by using the accuracy identifier.

It is assumed that the product information of the air conditioner O50C in FIG. 150 has already been registered to the first server O101 and the mobile device O60 touches the air conditioner O50C.

When the mobile device O60 receives, via the antenna O61, the product ID O51, the first server URL O52, the service ID O53, and the accuracy identifier O54 from the RF-ID device O50 of the air conditioner O50C, the RF-ID unit O62 in the mobile device O60 demodulates these pieces of information.

At this stage, the mobile device O60 does not know whether the product information of the air conditioner O50C has already been registered in the first server O101. Therefore, the mobile device O60 transmits, to the first server O101, data including the position information of the mobile device O60, the product ID, and the service ID by the product registration processing as described previously.

In receiving the data from the mobile device O60, the first server O101 demodulates the received data.

If the registered-coordinate information unit O102 determines that the product information of the air conditioner O50C has already been registered, then the first server O101 generates data including the position information of the air conditioner O50C that is registered in the registered-coordinate information unit O102, and then transmits the generated data to the mobile device O60.

When the receiving unit O71 in the mobile device O60 receives the position information of the air conditioner O50C via the communication antenna O68, the receiving unit O71 demodulates the received position information and provides the demodulated information to the registered-coordinate unit O82.

The registered-coordinate unit O82 extracts the position information from the data including the position information of the air conditioner O50C, and provides the extracted position information to the determination unit O83.

The determination unit O83 determines whether or not the position information received from the registered-coordinate unit O82 is to be reference coordinates, based on the accuracy identifier O54 of the RF-ID device O50 received from the coordinate accuracy identification information O63.

FIG. 154 illustrates processing performed by the determination unit O83 based on each accuracy identifier.

Regarding the accuracy identifier O54, the RF-ID device O50 is previously assigned with an accuracy identifier for identifying each different product as illustrated in FIG. 154.

Here, the air conditioner O50C is assigned with the accuracy identifier O54 representing a "high" accuracy.

If the determination unit O83 determines that the position information of the mobile device O60 is to be corrected, then the determination unit O83 provides the position information received from the registered-coordinate unit O82 to the reference coordinate unit O84.

Here, if the accuracy identifier O54 represents a "low" accuracy, then the mobile device O60 determines that it is not necessary to correct the position information of the mobile device O60. Then, the mobile device O60 notifies the determination result to the first server O101. The first server stores the new position information of the air conditioner O50C into the registered-coordinate information unit. Thereby, the processing is completed.

If there is a trigger from the RF-ID detection unit O75, the reference coordinate unit O84 provides the position information received from the registered-coordinate unit O82 to the position information correction unit O93.

The position information correction unit O93 corrects the current position information of the mobile device O60 based on the position information received from the reference coordinate unit O84.

Next, the mobile device O60 notifies the first server O101 of that the position information is completed. Thereby, the processing is completed.

As described above, (a) the position information indicated in the building coordinate information is compared to (b) the position information generated by the mobile device O60. Thereby, it is possible to determine whether or not (b) the position information generated by the mobile device O60 is deviated from a correct position. As a result, the position information of the mobile device O60 can be corrected, thereby preventing unnecessary updating of the position information.

Furthermore, products which are usually not moved from an initial equipped location are designated in a group of products having a high accuracy of the position coordinates. Thereby, reliability of the accuracy can be improved.

If even position information of a product in the group having a high accuracy is deviated from a correct position more than predetermined times, it is possible not to correct the position information newly generated by the mobile device O60, but to correct the position information registered in the registered-coordinate information unit O102.

It should be noted that it has been described that the mobile device O60 determines, based on the accuracy identifier, whether or not the position information is to be corrected. However, the accuracy identifier may be transmitted to the first server O101 so that the first server O101 determines the necessity of the correction.

Next, the description is given for processing performed by the mobile device O60 to manage relative positions of the products.

Here, product registration is first performed for the TV O50A. Then, with reference to the position information of the TV O50A as a reference point, relative position information is generated for the BD recorder O50B that is registered next.

When the mobile device O60 receives, via the antenna O61, the product ID O51, the first server URL O52, the service ID O53, and the accuracy identifier O54 from the RF-ID device O50 of the TV O50A, the RF-ID unit O62 in the mobile device O60 demodulates these pieces of information. The coordinate information sending unit O79 in the mobile device O60 provides the recording unit O80 with the position information determined in detecting the RF-ID device O50.

In receiving the position information, the recording unit O80 records the received position information onto the position information storage unit O73.

After that, in the same product registration processing as described earlier, the mobile device O60 registers the product information of the TV O50A into the first server O101.

Next, the mobile device O60 registers product information of the BD recorder O50B.

When the mobile device O60 receives, via the antenna O61, the product ID O51, the first server URL O52, the service ID O53, and the accuracy identifier O54 from the RF-ID device O50 of the BD recorder O50B, the RF-ID unit O62 in the mobile device O60 demodulates these pieces of information.

The coordinate information sending unit O79 in the mobile device O60 provides the recording unit O80 with the position information determined in detecting the RF-ID device O50 of the BD recorder O50B.

The recording unit O80 does not record the position information of the BD recorder O50B onto the position information storage unit O73, because the position information of the TV O50A has already been recorded.

In receiving the position information from the coordinate information sending unit O79, the relative position calculation unit O78 obtains the position information of the TV O50A from the position information storage unit O73 via the reproducing unit O77.

Next, the relative position calculation unit O78 calculates relative position information of the BD recorder O50B which is relative to a reference position (or a reference point) that is the position information of the TV O50A obtained via the reproducing unit O77. Then, the relative position calculation unit O78 stores the calculation result into the position information recording unit.

By the above-described processing, it is possible to generate relative position information of a product with reference to a position of a different certain product.

It should be noted that it has been described that relative position information is stored in the mobile device O60. However, the present invention is not limited to the above. It is also possible that the mobile device O60 transmits relative position information to the first server O101 that manages the received relative position information in the registered-coordinate information unit O102.

It should also be noted that it has been described that the position information of the TV O50A for which product registration is performed at the first time is set to be the reference position. However, the present invention is not limited to the above.

For example, a position predetermined by the user may be set to be the reference point (reference position). For instance, the reference point may be a position of an entrance of a building. If the mobile device O60 is a remote controller terminal of a TV, a position of the TV may be the reference point.

FIGS. 155 and 156 illustrate examples of processing of a 3D map according to Embodiment B5 of the present invention.

FIG. 155 is a flowchart illustrating an example of processing (first half) for the 3D map (S421 to S428).

FIG. 156 is a flowchart illustrating an example of processing (second half) for the 3D map (S431 to S434).

In Embodiment B5, the position information storage unit O73 in the mobile device O60 holds relative position information. However, the present invention in not limited to the above. For example, the following aspect is also possible. The coordinate information sending unit O79 in the mobile device O60 provides position information generated by the mobile device O60 to the recording unit O80 every time the position information is generated. The recording unit O80 thereby records the position information onto the position information storage unit O73. The position information storage unit O73 accumulates the position information generated by the mobile device O60. In this aspect, the program execution unit O65 generates trajectory information of the mobile device O60 from pieces of the position information accumulated in the position information storage unit O73. Thereby, a travel of the mobile device O60 can be estimated form the trajectory information.

It should be noted that it has been described in Embodiment B5 that the processing of the determination unit O83 is performed based on the two kinds of accuracy identifiers in FIG. 154. However, the present invention is not limited to the above. For example, the following is also possible. Two or more kinds of product classification are set. A threshold value is defined for each kind of the classification to represent a different size of deviation from the position information. Based on the threshold value, the determination unit O83 determines whether or not to correct the position information of the mobile device O60.

It should also be noted that Embodiment B5 may be combined with any other embodiments of the present invention. For example, it is also possible that the function of the communication device M1101S according to Embodiment B2 is provided to a product having the RF-ID device O50, and the 3D map (3D product map) as well as home ID are shared among products within the same house. In this aspect, each product obtains the 3D map beforehand from the mobile device O60 using the NFC function.

It should also be noted that it has been described in Embodiment B5 that the RF-ID device O50 is provided to TVs, BD recorders, air conditioners, and the like, but the present invention is not limited to this.

FIG. 157 illustrates a system including products O50G to O50N each having the RF-ID device O50.

Each of the products O50G to O50N also includes a specific small power wireless communication device (for example, ZigBee), which enables the products to directly communicate with each other within a range in which radio waves can be received. It is assumed that each of the products O50G to O50N has already obtained a 3D map from the mobile device O60 via the RF-ID device O50. The 3D map shows an arrangement of the products O50G to O50N. Or, for another method, each of the products O50G to O50N may have the communication antenna O68 in order to obtain, via the Internet, the 3D map showing the product arrangement.

The following describes the situation where a product O50H transmits data to a product O50K by using the specific small power wireless communication device. The specific small power wireless communication device usually operates at a sleep mode in terms of power saving. At the sleep mode, a power source of the specific small power wireless communication device is switched ON or OFF at regular intervals. Here, timings of switching ON or OFF for the products are in synchronization with each other.

When the product O50H needs to transmit data, the specific small power wireless communication device in the product O50H is switched to an awake mode. At the awake mode, the power source of the specific small power wireless communication device is always ON.

The product O50H examines the 3D map showing the arrangement of the products O50G to O50N, which has previously been obtained. From the 3D map of the product arrangement, the product O50H determines products located between the product O50H and the product O50K. In this example, a product O50J is determined from the 3D map to be a relay product to relay data.

The product O50H instructs the product O50J to switch to the awake mode.

The product O50H transmits, to the product O50J, data addressed to the product O50H.

When the product O50J receives the data addressed to the product O50H, the product O50J transfers the data to the O50H. Then, the product O50J is switched to the sleep mode.

As described above, using the 3D map, the product O50H determines a relay product in order to transmit data, and causes only the determined relay product (product O50J) to be switched to the awake mode. Thereby, other products, which do not need to be at the awake mode, do not need to be switched to the awake mode. Without the 3D map, in order to establish a path to the product O50K, the product O50H needs to cause all products to be switched to search for the path.

It should also be noted that the embodiment of the present invention employs the 3D map that is a wireframe image of a house. However, such house data is private information, and 3D data is not generated for old buildings. Therefore, until such 3D data becomes available for each general house, it is necessary to obtain a room arrangement of a house without using 3D data of the house.

When there is no 3D data of a house, an illustration is provided. In the illustration, several air conditioners are arranged in a space that corresponds to the house. Without 3D data, a room arrangement of a room having each of the air conditioners is not known.

Here, each of the air conditioners, which has a RF-ID unit compliant to APE, is provided with a detection unit (such as an ultrasonic sensor or an infrared sensor) for detecting a distance or a position. Thereby, it is possible to determine a relative position of the air conditioner which is relative to walls and pieces of furniture in the room. Here, a mobile phone which has the 3D mapping function as described in the embodiment of the present invention is brought into proximity of the RF-ID unit in the air conditioner. At this moment, the mobile device reads a product name, a product serial number, a MAC address, and an authentication key from the RF-ID unit. Then, in transmitting these pieces of information to a server, the mobile device also transmits, to the air conditioner or the server, 3D absolute coordinate information indicating the position of the mobile device. As a result of calibration using the previously-described coordinate information of the relative position of the room and the absolute coordinate information, it is possible to generate a 3D or 2D arrangement illustration of absolute coordinates of the air conditioner and the room. Combination of pieces of 3D coordinate information of the several air conditioners can result in coordinate information showing a 3D or 2D arrangement of the rooms having the air conditioners in the house, in other words, the wireframe image.

Since pieces of authentication data, such as the MAC address and the authentication key, which are used to be connected with other devices, are also obtained, it is possible to automatically perform connection authentication with the other devices, such as TVs, a DVD recorder, and a refrigerator, in the house via a network. This terminal is not necessary to be the air conditioner, but also to be any electric and electronic devices in the house. Air purification device may be provided with a distance measuring sensor to server as the terminal. However, the terminal is desirably a device, such as an air conditioner, which is equipped at a fixed location in a house, because position coordinate information of such a device is not changed. In this example, 3D coordinate information of only the rooms having the air conditioners can be generated. However, since a user of the mobile device moves around in the house, 3D trajectory information can be generated. The 3D trajectory information regarding position coordinates is analyzed and calculated by a server to estimate positions of entrances of the respective rooms, positions of corridors, and other positions. Thereby, the 3D data showing the arrangement of the house is further developed. The above method can generate the 3D wireframe image of the house, without 3D coordinate information of the house. Furthermore, in the method by which the RF-ID unit of the mobile device touches the RF-ID reader at a front door of the house so as to unlock the key of the entrance, if the position of the RF-ID reader which is recorded onto the server or the RF-ID reader has a high accuracy, this means that an accuracy identifier of the position coordinates is high. The mobile device detects high accuracy by checking this. Therefore, touching the RF-ID unit, the mobile device can calibrate absolute coordinates of the position of the mobile device. Thereby, single touching can result in (a) locking/unlocking of the key and (b) calibration of coordinates.

Note that the correction is performed based on the information in the direction information unit O89, as mentioned above. The direction information unit O89 may be information, or a functional block for processing the information. The same applies to the other reference signs, according to need.

Embodiment B6

The following describes Embodiment B6 of the present invention.

FIG. 158 is a diagram illustrating a home network environment assumed in this embodiment.

A wireless home network is established in each of houses M2002, M2003, M2004, and M2005. Each home network is connected to a registration server M2001 via the Internet M2006.

In the case where services provided in the home network are limited within the corresponding house, the registration server M2001 may be located in the house (see the server (home server) 99a in FIG. 165).

In the assumed environment, a radio wave range of each wireless AP (M2007, M2008, M2014, M2015, M2016) covers other homes, and a TV (M2009, M2010, M2017, M2018), a DVD recorder (M2011, M2019), and a digital camera M2012 in each home that connect to the Internet are physically connectable to a plurality of wireless APs.

Moreover, in this embodiment, a mobile terminal such as a mobile phone M2013 is also a terminal included in the home network.

Each appliance (device, apparatus) in this embodiment is capable of simple data communication with each other via a proximity wireless communication device, and obtains information of another appliance via the proximity wireless communication device and registers the information in the registration server M2001 via a home network device.

FIG. 159 is a diagram showing a hardware structure of a terminal according to Embodiment B6 the present invention.

A communication device M2101 (see the mobile communication device 98b in FIG. 167) in this embodiment has two communication devices.

One communication device is a proximity wireless communication device M2102, which is typically a device of Near Field Communication (NFC) or RF tag.

The other communication device is an Internet communication device M2103. Examples of the Internet communication device M2103 include a wireless communication device of a wireless Local Area Network (LAN), ZigBee, or the like used for connecting home appliances with each other, a wired communication device of Ethernet™, Power Line Communication (PLC), or the like, and a communication device of WiMAX, Third Generation Partnership Project (3GPP), or the like used in mobile devices.

The communication device M2101 also includes a user interface (IF) device M2104.

The user IF device mentioned here is an input device such as buttons, a display, and an output device of a LED or the like.

A remote controller is typically used for input/output of an appliance such as a TV or an air conditioner. Though physically separated from the device, the remote controller is also regarded as a user IF device in this embodiment, for simplicity's sake.

The communication device M2101 further includes a position information obtainment device of GPS or the like capable of obtaining geographical position information of the terminal itself. Note that the advantageous effects of the present invention can further be enhanced by obtaining accurate position information through the use of a motion sensor and the like.

FIG. 160 is a functional block diagram illustrating functions executed by a CPU M2106.

A wireless connection request obtainment unit M2202 in the communication device M2101 obtains a wireless connection request from a registration device (appliance) M2201, at the same timing as obtainment of information including a device UID in Embodiment B1. This, however, does not apply in the case where wireless connection is not performed at the time of registration and later a request to connect to a wireless AP is made.

The registration device M2201 transmits wireless connection request information including the wireless connection request and the device UID, from a wireless connection request transmission unit M2203.

A wireless AP information request generation unit M2204 obtains the wireless connection request information including the device UID and the wireless connection request from the wireless connection request obtainment unit M2202, obtains a home ID from a home ID management unit M2205, obtains position information from a position information obtainment unit M2206, and generates a wireless AP information request.

The position information mentioned here is geographical position information that can be obtained by a GPS function of a mobile phone. Since the communication device M2101 is very near the registration device M2201 immediately after proximity wireless communication, position information of the communication device M2101 and position information of the registration device M2201 can be regarded as substantially same position information.

This saves cost for equipping the registration device M2201 with a position information obtainment device of GPS or the like.

A wireless AP information communication unit M2207 receives the wireless AP information request from the wireless AP information request generation unit M2204, and transmits the wireless AP information request to the registration server M2001.

Having received the wireless AP information request, the registration server M2001 transmits information of a wireless AP assumed to be nearest a position according to the position information included in the wireless AP information request, and an authentication key for accessing the wireless AP.

Here, information (e.g. a MAC address, position information) of a wireless AP used in each home and a corresponding authentication key are already registered in a wireless AP information database M2208.

The registration may be performed by the wireless AP itself, or by another device connected to the wireless AP.

For example, the information of the wireless AP is a MAC address of the wireless AP, and the authentication key is a WEP key in a wireless LAN.

The use of the home ID is intended to prevent a response indicating a wireless AP that is close in position but belongs to a different home. Meanwhile, the use of the position information is intended to prevent a response indicating a wireless AP that corresponds to the home ID but is positionally hard to connect.

The wireless AP information communication unit M2207 receives the information from the registration server M2001, and transfers the received information to a setting program generation unit M2210.

The setting program generation unit M2210 generates a program for causing the registration device M2201 to automatically set access to the wireless AP, based on the received information.

The program mentioned here is not merely information, but an element that, when received, operates to automatically set access to the wireless AP.

This allows the user to complete the setting to the wireless AP, without operating the registration terminal. Besides, a manufacturer of the registration device does not need to equip the registration device with a user interface which requires a complex operation.

The communication device M2101 transmits the program to the registration device M2201 using the proximity wireless communication device M2102.

In this way, even in the case where the registration device M2201 is not yet set to connect to the Internet or the home network, the program can be transferred securely.

A setting program execution unit M2211 in the registration device M2201 receives the program, and transmits a packet necessary for the setting, to the wireless AP (M2212). The setting program execution unit M2211 thus completes the setting.

FIG. 161 is a sequence diagram illustrating processing for the wireless connection request.

The user who wants to wirelessly connect the registration device M2201 such as the digital camera M2012 transmits, by proximity wireless communication, a device UID of the registration device M2201 and the wireless connection request, to the communication device M2101 that includes a device such as a GPS device capable of obtaining position information and is communicable with the registration server M2001.

The user adds his/her home ID and position information to the device UID in the communication device M2101, and transmits the resulting request to the registration server M2001.

Here, the home ID may be inputted via the user IF device M2104 in the communication device M2101, or may be registered in the communication device M2101 beforehand. Moreover, an ID unique to the communication device M2101 may be used as the home ID.

The registration server M2001 returns information of an optimal wireless AP to be accessed by the registration device M2201 and an authentication key necessary for the access, based on the received information.

It is preferable that these information are transferred reliably and securely by, for example, a 3G Internet communication device in a mobile phone.

The communication device M2101 adds a setting command for automatically completing setting of the registration device M2201 to connect to the wireless AP, to the received information. The communication device M2101 transfers the resulting information to the registration device M2201 using the proximity wireless communication device.

The registration device M2201 automatically completes setting of a home network wireless communication device, using the received authentication key.

The home network wireless communication device mentioned here is a device that is connectable from a plurality of devices in a specific range as in a wireless LAN, ZigBee, and the like, and that requires authentication processing for connection. By receiving the authentication key from the registration server M2001 through a secure, reliable path, the user can securely complete setting the connection to the wireless AP, without performing a complex operation such as inputting the authentication key.

FIG. 162 is a flowchart illustrating processing in the communication device M2101 for the wireless connection request.

Upon receiving a registration request, the communication device M2101 determines whether or not the wireless connection request is included in the registration request (M2301).

In the case where the wireless connection request is not included (M2301: NO), the processing specific to this embodiment ends, and the same processing as in Embodiment B1 is performed.

Note that this embodiment is also applicable in the case of receiving only the wireless connection request of an already registered device.

In the case where the wireless connection request is included (M2301: YES), the communication device M2101 generates the wireless connection request including the registration request and the position information (M2302).

The communication device M2101 transmits the generated wireless connection information to the registration server M2001 (M2303), and waits for a response.

In the case where the communication device M2101 is unable to receive the response (M2304: NO), the communication device M2101 notifies the user of a request failure (M2305), and ends the processing.

In the case where the communication device M2101 is able to receive the response (M2304: YES), the communication device M2101 determines whether or not information of a wireless AP is included in the response (M2306). In the case where the information of the wireless AP is not included (M2306: NO), the communication device M2101 notifies the user that there is no accessible wireless AP (M2307), and ends the processing.

Here, a determination condition may be set in the wireless connection request. Moreover, information of a plurality of wireless APs may be returned. This makes it possible to obtain a desired response for the user, instead of merely receiving information of a near wireless AP. In the case where the information of the wireless AP is included (M2306: YES), the communication device M2101 generates a wireless AP setting program (M2308), and transmits the wireless AP setting program by proximity wireless communication (M2309).

Embodiment B7

Embodiment B7 of the present invention describes a method of efficiently setting a channel of a wireless communication device. A wireless communication device for an existing home network autonomously performs channel setting, so that the channel setting is carried out based on only local information obtained on the spot. In a situation where wireless communication is performed at all hours in many homes due to the emergence of a HEMS and the like, such a setting method is inefficient. It is preferable to perform channel setting based on channel setting statuses of neighboring homes.

FIG. 163 is a diagram illustrating a network environment in channel setting.

The registration server holds channel information and a cell radius, in addition to information (a MAC address, a home ID, position information, an authentication key) of each wireless AP (see the processor 96a in FIG. 172, the access point 99c in FIG. 165).

The position information may be position information of the wireless AP, or information of a center point of home appliances in a home unit.

The cell radius is information indicating a range in which the home appliances as a whole interfere with their surroundings.

Through the use of these information, each wireless device can select an optimal channel.

FIG. 164 is a functional block diagram in channel setting.

In FIG. 164, an interference information transmission unit M2250 and an interference information database M2251 are added to the functions in Embodiment B6. The interference information transmission unit M2250 transmits channel interference information of the surroundings of the terminal. This enables estimation of the existence of a device or a wireless AP not registered in the registration server M2001. By transmitting this information to the server, it is possible to avoid a situation where channel setting using the server is less efficient than autonomous channel setting. A sequence for a channel setting request is the same as that for the wireless connection request. Based on the received information, the registration server M2001 selects a channel that has a lowest possibility of being the same channel as a neighboring home, and transmits information of the channel. An algorithm of channel selection may be an algorithm that estimates future channel arrangement, or an algorithm that selects only from current information.

As mentioned earlier, the terminal device Y01 in FIG. 127 is an electronic terminal device (see, for example, the appliance 98a in FIG. 167) such as a refrigerator (e.g. the refrigerator M1013 in FIG. 114), a microwave (e.g. the microwave M1012), or a washing machine.

The terminal device Y01 may be a type of terminal device (e.g. the refrigerator M1013, the microwave M1012) that is typically not connected to the general-purpose network Y02N (FIG. 127, the Internet M1004 in FIG. 114), unlike a TV (e.g. the TV M1008 in FIG. 114) or the like connected to the Internet.

In the case where the manufacturer of the terminal device Y01 determines that the terminal device Y01 has a possibility of an occurrence of a trouble, the device management DB Y041 (FIGS. 127, 129) in the server Y04 (FIG. 127) is referenced, as mentioned earlier. As a result, the manufacturer can learn where the terminal device (appliance) Y01 is (the position of the terminal device Y01, a product serial number of a mobile phone terminal of the user using the terminal device Y01), which reduces a product recall time (a time required for recalling the terminal device Y01) and prevents the occurrence of the trouble. This leads to safe and secure product use.

For example, "where the terminal device Y01 is" means in which of a plurality of homes (see the houses M1001 to M1003 in FIG. 114) the terminal device Y01 is located, or at which of a plurality of positions (see, for example, FIG. 134) in the home the terminal device Y01 is located (see first position information and second position information described later).

There is also an instance where the communication device Y02 (see the mobile communication device 98b in FIG. 167) has a display function as in a mobile phone terminal (e.g. the mobile phone M1014 in FIG. 114) and the like. In such a case, the following processing can be performed by detecting with which communication device (appliance) Y02 out of a plurality of communication devices Y02 of a plurality of users the terminal device Y01 having a possibility of a trouble can perform proximity wireless communication. That is, the server Y04 or the like causes the corresponding communication device Y02 that can perform proximity wireless communication, to display trouble information of the terminal device Y01. Thus, by transmitting the trouble information of the terminal device Y01 (e.g. the refrigerator M1013, the microwave M1012) which typically has no display function and is not connected to the general-purpose network, to the communication device Y02 corresponding to the terminal device Y01, the user of the terminal device Y01 can be warned of the trouble. Hence, the user of the terminal device Y01 can be provided with an appliance of enhanced safety and security (i.e. the terminal device Y01).

Therefore, when the manufacturer determines that the terminal device Y01 has a possibility of a trouble, the manufacturer can easily recall the terminal device Y01, or display the possibility of the trouble (trouble information) on the display unit (e.g. the display unit Y02x in FIG. 127) of the corresponding communication device Y02. This contributes to higher traceability of the product (the terminal device Y01), and provides the user with a safe, secure appliance (the terminal device Y01).

In other words, the following processing may be performed in this system. Here, the following processing may be performed only in a certain situation. Note that the following processing is merely an example.

Devices (home appliances, white goods) such as the refrigerator M1013 and the microwave M1012 are situated in a home (see FIG. 134, the house M1001 in FIG. 114, the home 99 in FIG. 167).

For example, the device Y01 (see the terminal device Y01 in FIG. 127, the appliance 98a in FIG. 167) is one of these devices including the refrigerator M1013 and the like.

The home (the house M1001) in which the device Y01 is situated is the home of the user who purchased the device Y01, among a plurality of homes. That is, the user of the device Y01 is a person in the home in which the device Y01 is situated, among a plurality of persons in a plurality of homes.

This being so, there is an instance where the manufacturer of the device Y01 or the like uses information (see the transmission information 98o1 in FIG. 167) of the person who purchased the device Y01, i.e. the user of the device Y01, among information (e.g. a name, an address) of the plurality of persons.

In detail, in the case where the device Y01 is determined to have a possibility of a failure, the manufacturer takes an action such as recalling the device Y01 or notifying the user of failure information, according to the determination of the failure possibility of the device Y01

In this action, the information (e.g. an address) of the user may be used.

Conventionally, a phone number, an address, a name, and the like of the user are used as such user information.

For example, such user information is stored in the server Y04 (see FIG. 127, the registration server M1005 in FIG. 114) of the manufacturer.

In view of this, when transmitting the user information to the server Y04 of the manufacturer or the like, it is desirable that the user information can be easily transmitted without requiring a complex operation by the user.

In many occasions, the user information may simply be the product serial number (see the product serial number Y025N in FIG. 127) of the communication device Y02 (FIG. 127) such as the mobile phone terminal (e.g. the mobile phone M1014 in FIG. 114) of the user.

Moreover, in recent years, the communication device Y02 (e.g. the mobile phone M1014 in FIG. 114) having a function of proximity wireless communication (e.g. communication using a RFID or IC tag) is often used in the home.

It is assumed that a communication device Y02 of a person (see another home 991 of a person who is other than a person in the home 99 in which the appliance 98a is installed and who has a mobile phone other than a mobile phone of the person in the home 99 in FIG. 167) not purchasing the device Y01 does not touch the device Y01, and so does not establish the proximity wireless communication with the device Y01. Hence, it is assumed that only the communication device Y02 of the user purchasing the device Y01 touches the device Y01 to establish the proximity wireless communication with the device Y01.

This being the case, the communication device Y02 may detect that the proximity wireless communication is established with the device Y01 (the antenna Y021 in FIG. 127, SY01 to SY03 in FIG. 128).

In the case where the establishment of the proximity wireless communication is detected, information such as the product serial number Y025N in the communication device Y02 is transmitted to the server Y04 of the manufacturer of the device Y01, as the user information of the device Y01 with which the proximity wireless communication is established (the communication unit Y36, SY09 in FIG. 128).

On the other hand, in the case where the establishment of the proximity wireless communication is not detected, the transmission of the information is suppressed.

Thus, merely by purchasing the device Y01 and establishing the proximity wireless communication, the user can easily transmit the information of the user purchasing the device Y01 to the server Y04, without a complex operation.

However, since a plurality of devices Y01 are installed in the home, there is an instance where a plurality of servers Y04 are provided by a plurality of manufacturers of the plurality of devices Y01.

This raises a possibility that the information is transmitted not to an appropriate server Y04 but to an inappropriate server Y04 among the plurality of servers Y04.

This can also lead to a situation where the user needs to input information (see the address Y01Ua in FIG. 137) for specifying the appropriate server Y04 via a keyboard or the like.

In view of the above, the following processing may be performed.

In the case where the user purchased the device Y01, for example when the communication device Y02 of the user is brought to touch the device Y01, the distance between the device Y01 and the communication device Y02 of the user falls below a threshed (e.g. several centimeters).

Here, the refrigerator M1013, the microwave M1012, or the like (the device Y01) may have the following function. In detail, the device Y01 stores the information Y015D in FIG. 127 (the address Y01Ua in FIG. 137) for specifying the server Y04 of the manufacturer of the device Y01 from among the plurality of servers Y04 in the network Y02N, even though the device Y01 is the refrigerator M1013 or the like which is not connected to the network Y02n (FIG. 127).

The device Y01 then transmits the stored information Y015D by the proximity wireless communication, when the proximity wireless communication is established.

Meanwhile, the communication device Y02 may perform the following processing, in the case where the distance between the communication device Y02 and the device Y01 is less than the threshold (the antenna Y01 in FIG. 127, SY01 to SY03 in FIG. 128).

In other words, the communication device Y02 may perform the following processing, in the case where the proximity wireless communication is established between the communication device Y02 and the device Y01.

That is, the communication device Y02 may perform the following processing upon detecting the establishment of the proximity wireless communication.

When the establishment of proximity wireless communication is detected, the communication device Y02 obtains the information Y015D (FIG. 127, the address Y01Ua in FIG. 137, described above) for specifying the server Y04 of the manufacturer of the device Y01, from the device Y01 (the refrigerator M1013 or the like) by the proximity wireless communication (SY04 in FIG. 128).

The communication device Y02 then transmits, to the server Y04 specified by the obtained information Y015D from among the plurality of servers Y04, the information (the product serial number Y025N, the information Y036D in FIG. 127, the information Y051 in FIG. 129) held in the communication device Y02 (the memory Y024), as the information of the user of the device (the device Y01) purchased by the user of the communication device Y02 and located (relatively) near the communication device Y02 (the communication unit Y036, SY09 in FIG. 128).

For example, the manufacturer of the device Y01 may use the received transmission information according to need, and communicate (e.g. by phone) with the communication device Y02 having the information (the product serial number Y025N), as mentioned above.

In detail, the transmitted information may be stored in the device management DB Y041 (FIG. 127) in the server Y04 of the manufacturer (see, for example, FIG. 129).

Thus, merely by purchasing the device Y01 and bringing the communication device Y02 within the distance of the threshold from the device Y01, the user can easily transmit the information (the product serial number Y025N (the information Y025D), the information Y036D) of the user purchasing the device Y01, to the server Y04 of the manufacturer of the device Y01.

In addition, the address Y01Ua (FIG. 137) or the like is in transmitted from the device Y01 to the communication device Y02 by the proximity wireless communication. This ensures that the information is transmitted to the appropriate server Y04 specified by the obtained address Y01Ua or the like from among the plurality of servers Y04 of the plurality of manufacturers.

Besides, the information can be easily transmitted to the appropriate server Y04, with there being no need for the user to input the address Y01Ua via a keyboard.

This contributes to higher traceability of the device Y01 for the manufacturer.

Here, the transmission information Y036D (FIG. 127) including the product serial number Y025N of the communication device Y02 may further include other appropriate information such as the product serial number Y015N of the device Y01 located near the communication device Y02, in addition to the product serial number Y025N of the communication device Y02.

In this case, according to the transmission information Y036D, the user of the communication device Y02 having the product serial number Y025N included in the information Y036D may be specified as the user of the communication terminal Y01 having the other product serial number Y015N.

The transmission information Y036D may also include the information Y027D (FIG. 127) indicating the position of the communication device Y02.

The information Y027D may be information detected by a GPS (Global Positioning System) function. In detail, the GPS function may be a function of the position information determination unit Y027 (FIG. 127) included in the communication device Y02.

The position of the communication device Y02 indicated by the information Y036D (the information Y027D) is, for example, near the position of the device Y01 at a distance within the threshold (e.g. within a distance of several centimeters).

In other words, the information Y027D is information for specifying the position of the device Y01 relatively accurately. For example, the position of the device Y01 may be specified more accurately than an address or a phone number of the home (e.g. the house M1001 in FIG. 114) in which the device Y01 is installed. In detail, the information Y027D may specify at which of a plurality of (many) positions (e.g. the position of the air conditioner N10J, the position of the air conditioner N10C in FIG. 134) in the house M1001 the device Y01 is located.

This prevents to wrongly specify (falsely recognize), as the device Y01 (e.g. the air conditioner N10J in FIG. 134), another device (e.g. the air conditioner N10C) located near the device Y01 such as at 3 to 5 meters. Accordingly, the appropriate device (the air conditioner N10J) can be reliably specified as the device Y01.

Hence, there may be provided a communication device (e.g. the communication device (mobile phone terminal) Y02 in FIG. 127, the mobile phone M1014 in FIG. 114, the mobile device N20 in FIG. 135) that reads terminal device information (e.g. the information Y015D in FIG. 127, the information Y01U (the address Y01Ua) in FIG. 137) from a terminal device (e.g. the terminal device Y01 in FIG. 127, the refrigerator M1013 or the microwave M1012 in FIG. 114, the air conditioner N10J in FIG. 134) by proximity wireless communication (communication by an IC tag or the like), and transmits the read terminal device information to a server (the server Y04 in FIG. 127, the registration server M1005 in FIG. 114) via a general-purpose network (e.g. the network Y02N in FIG. 127, the Internet M1004 in FIG. 114), the communication device including: a terminal device information obtainment unit (e.g. the antenna Y021 in FIG. 127) that obtains the terminal device information (the information Y015D, the information Y01U (FIG. 137)) from the terminal device by the proximity wireless communication, the terminal device information including at least terminal device identification information (e.g. the product serial number Y015N in FIG. 127, the product serial number Y01Un in FIG. 137) for identifying manufacturing information of the terminal device; a communication device information storage unit (e.g. the memory Y024) that stores communication device information (the information Y025D) including at least communication device identification information (e.g. the product serial number Y025N in FIG. 127) for identifying manufacturing information of the communication device; an information adding unit (e.g. the information adding unit Y035) that adds the stored communication device information (the information Y025D) to the obtained terminal device information (the information Y015D, the information Y01U), to generate transmission information (e.g. the information Y036D in FIG. 127, information including both the terminal device information (the information Y015D) and the communication device information (the information Y025D) as a result of the addition) to be transmitted to the server; and a communication unit (e.g. the communication unit Y036 in FIG. 127) that transmits the generated transmission information (the information Y036D) to the server via the general-purpose network, wherein the communication unit specifies the server based on the terminal device information (e.g. the address Y01Ua of the server Y04 (FIG. 137), i.e., the information for specifying, from among a plurality of servers Y04, the appropriate server Y04 (the server Y04 of the manufacturer of the terminal device) to which the transmission information (the information Y036D) of the terminal device is to be transmitted, the information being stored in the terminal device and transmitted from the terminal device) obtained from the terminal device, and communicates with the specified server.

According to this structure, the communication device transmits the information Y036D to the server Y04. Therefore, the device Y01 (e.g. the refrigerator M1013 in FIG. 114) can be realized by the above-mentioned simple structure, and may be a refrigerator (the refrigerator M1013, a home appliance, white goods) or the like which is not connected to the network Y02N. The information Y036D of the device Y01 can be reliably transmitted to the server Y04 regardless of the type of the device Y01.

Moreover, the communication device may further include a position information obtainment unit (the position information determination unit Y027 in FIG. 127) that obtains position information (the information Y027D in FIG. 127) of the communication device (i.e. position information for specifying a position (e.g. a position within several centimeters from the air conditioner N10J (the device Y01) in FIG. 134) of the communication device), wherein the position information obtainment unit obtains the position information (the information Y027D) of the communication device at a timing when the proximity wireless communication between the terminal device and the communication device is established in the terminal device information obtainment unit (the antenna Y021), and the communication device information (the added communication device information (the transmission information Y036D or part of the transmission information Y036D)) includes the position information (the information Y027D) of the communication device obtained by the position information obtainment unit (at the above-mentioned timing).

According to this structure, even when the device Y01 (communication terminal) is merely a refrigerator (e.g. the refrigerator M1013) without a GPS function or the like, the position of the device Y01 is specified by the information Y027D included in the information Y025D which is included in the transmitted information Y036D. Thus, the position of the device Y01 can be reliably specified based on the information Y036D transmitted to the server Y04, regardless of the type of the device Y01.

Besides, the position can be accurately specified because the position is detected at a sufficiently close distance such as several centimeters over which the proximity wireless communication is performed (see the air conditioners N10J and N10C in FIG. 134 mentioned above).

Moreover, the added communication device information may include identification information (e.g. the above-mentioned home ID) of a home (e.g. the house M1001) in which the communication device Y02 is installed or a person using the communication device Y02 (the user of the communication device Y02).

There may also be provided a management method of the terminal device (the device Y01) (i.e. information (the product serial number Y025N) of the terminal device) in the server (the server Y04) which is communicable with the communication device (the communication device Y02) via the general-purpose network, the management method including: obtaining the terminal device information (the information Y015D (the information Y036D) after addition) to which the communication device information (the communication device identification information, the information Y025D, the information Y051 in FIG. 129) is added (SY09 in FIG. 128); and searching a device management database (the device management DB Y041 in FIG. 127) of the server for the communication device identification information (the product serial number Y025D) included in the added communication device information (specifying an appropriate part (the product serial number Y025D) from among a plurality of parts in the information), wherein in the case where the communication device identification information obtained in the obtaining is determined to be not managed (stored) in the device management database as a result of the searching, a new record (see the information Y051 in FIG. 129) of the added communication device information (the information Y025D in FIG. 127) is generated and associated with the terminal device information (the information Y015D in FIG. 127, the information Y052d (the information Y052 to Y054) in FIG. 129) obtained in the obtaining, and also the communication device identification information (the product serial number Y025N) (which is added to the information Y036D (the information Y015D)) obtained in the obtaining is determined to be already managed in the device management database (after the new record is generated, the device (e.g. the microwave M1012) of the generated new record is determined to be a device whose communication device identification information is registered), and wherein in the case where the terminal device information (e.g. the information Y052 (FIG. 129) of the microwave M1012 (the device Y01), the product serial number Y015D in FIG. 127) is not managed in the record (see the information Y041D in FIG. 129) including the communication device identification information, the obtained terminal device information (the product serial number Y015, the information Y052, i.e., at least one of parts other than the part corresponding to the added product serial number Y025N of the communication device Y02) is added to the record.

Setting necessary for a home network may be made in the server Y04 (or another device) by transmitting information in the above way. This enables the user to easily perform setting necessary for a home network, without a complex operation.

Regarding mere details, processing of any appropriate embodiment of the above embodiments is applicable. Regarding mere details, other forms such as a form according to a known technique and a form according to improvement invention are also applicable.

Moreover, a plurality of technical matters described in a plurality of different embodiments in different parts of this description may be combined according to need.

There may also be provided a method including a plurality of appropriate steps out of the steps described above, an integrated circuit including a plurality of functions, a computer program causing a computer to execute the plurality of functions, a communication method for communicating the computer program, a data structure of the computer program, and the like.

In summary, there is the following problem. In home network setting, merely transmitting terminal information by proximity wireless communication is insufficient because statuses of surrounding terminals are unknown. Besides, the user is required of a complex operation.

In view of this, the following solution is provided. A terminal capable of obtaining position information by means of GPS or the like performs proximity wireless communication with a terminal which is subject to home network setting, and the position information when proximity wireless communication is performed is used as position information of the terminal subject to home network setting. This allows the home network setting to be performed based on the position information in consideration of statuses of surrounding terminals.

Hence, for example, a communication device that can simplify various settings in a display device such as a TV which provides information about an item (communication device)

is provided. In detail, the image capturing device 1 having the RF-ID unit 47 for performing proximity wireless communication with the RF-ID reader/writer 46 includes: the data receiving unit 105 that receives an input signal; the second memory 52 that stores the UID unit 75 which is identification information for specifying the communication device and the operation program 116 executed by the TV 45 with reference to the UID unit 75; and the data transfer unit 108 that transmits the UID unit 75 and the operation program 116 to the RF-ID reader/writer 46 according to the input signal, wherein the UID unit 75 and the operation program 116 are transferred to the TV 45 via the RF-ID reader/writer 46 (see FIG. 23, etc.).

Other Variations

The following describes other variations mentioned at the beginning of this section "Description of Embodiments".

For instance, the mobile communication device described above may have the following structure.

The position information may be an ID (home ID) of a home (the home 99) of installation among a plurality of IDs (home IDs) of a plurality of homes. This position information specifies the home (the home 99) in which the appliance (the appliance 98a) is installed from among the plurality of homes (e.g. the homes 99 and 991 in FIG. 167), and indicates a position (the position 99P in FIG. 167) of the specified home from among positions (the positions 99P and 991P) of the plurality of homes, as a position (the position 99P) of the mobile communication device when the proximity wireless communication is performed.

That is, the predetermined position at which the appliance is installed may be inside a home, wherein the mobile communication device stores an ID (home ID) of the home, the ID being information specifying the home of a user of the mobile communication device, and the transmission unit transmits, to the server (the server 98c), the transmission information (the transmission information 98o1 in FIG. 170) that associates the position information with the ID of the home, to cause the server to store, in association with the ID (a home ID 98ca2 in FIG. 170) that is included in the transmitted transmission information as the ID of the home in which the appliance is installed, information (see a product serial number 98cb) included in the transmission information other than the ID.

For example, the transmission information may include the position information and the ID that are associated with each other.

Moreover, the predetermined position at which the appliance is installed may be inside a home, wherein the position information obtainment unit obtains the ID from a second server (e.g. the server (home server) 99a in FIG. 165) as the position information, the second server being provided in the home (the home 99) in which the appliance is installed and storing the ID of the home.

Moreover, the position information obtainment unit may obtain the position information (the position information 98j1 in FIG. 167) stored in a storage unit (e.g. the memory 98i in FIG. 166) in the mobile communication device, the position information specifying the mobile communication device (the mobile communication device 98b) from among a plurality of devices to specify, as a position (a position 99P) of the home in which the appliance (the appliance 98a) is installed, a position (the position 99P) of the home (the home 99) of a user of the specified mobile communication device.

Moreover, the transmission unit may: transmit the transmission information to the server, to cause the (first) server (the server 98c in FIG. 167) to store the transmitted transmission information; and when the appliance (the appliance 98a) has been moved from the predetermined position (e.g. in the case of dumping (illegal dumping in a mountain or the like)), cause the server to output the position information (position information 98mb, i.e. position information indicating the installation position of the appliance 98a before dumped) included in the transmission information (transmission information 98mc) in the case where the appliance information (the appliance information 98a1 in FIG. 167) specifying the moved appliance is the same as the appliance information (appliance information 98ma in FIG. 167) that is included in the transmission information (the transmission information 98o1 (98mc)) stored in the server and specifies the installed appliance (the appliance 98a).

According to this structure, the position information of the position before movement is outputted. This contributes to higher traceability.

Moreover, the predetermined position at which the appliance is installed may be inside a home, wherein the transmission unit transmits the transmission information, to cause a predetermined image generation device (e.g. the server 98c, see the position information generation unit N48 in FIG. 144) to generate an image (e.g. the map in FIG. 144, the image in FIG. 152) which shows an internal structure (e.g. room arrangement) of the home and in which a display item representing the appliance (the TV N10A) specified by the obtained appliance information in the transmitted transmission information is superimposed (included) at the position (the position of the TV N10A) at which the appliance is installed.

Data (e.g. the above-mentioned image) for specifying a position of each appliance and information (e.g. a type, a product serial number) of the appliance at the position may be generated in this way.

Moreover, the obtained appliance information (the appliance information 98n1 in FIG. 167) may be a product serial number of the appliance, the product serial number specifying the installed appliance (the appliance 98a) from among the plurality of appliances (see FIG. 167, etc.).

Moreover, the appliance information obtainment unit may obtain at least one of type information (type information 98ma2 in FIG. 171) and function information (function information 98ma3) from the installed appliance by the proximity wireless communication, the type information indicating a type of the appliance, and the function information indicating a function of the appliance, wherein the transmitted transmission information (98o1) includes the obtained at least one of type information and function information.

See also FIGS. 138, 145, and the like according to need.

Regarding mere details in the above description, processing according to the above embodiments (Embodiments A and B) such as Embodiment B (e.g. Embodiment B4) is applicable. Processing according to improvement invention or any other appropriate processing is also applicable.

Details of processing in the above embodiments (Embodiments A and B) may be, for instance, as described in "Other Variations".

For example, the following processing may be performed.

The appliance 98a (see FIGS. 166 and 167, etc.) such as a TV, a BD recorder (see the BD recorder N10B, etc.), a heater (see the heater N10K, etc.), an air conditioner, a solar panel, a fire alarm, and a solar panel is provided in the home 99 (FIG. 165) (see FIG. 134, etc.).

In the case where the appliance 98a is installed, the predetermined transmission information 98o1 (FIG. 167) including information such as a name of the user of the installed appliance 98*a* is transmitted to and stored in the predetermined server 98*c* (see a database 98*m*).

For example, the server 98*c* is a server of a manufacturer of the installed appliance 98*a*.

Here, it is preferable that the user can perform such transmission with a simple operation.

In recent years, in a relatively large number of homes (e.g. the home 99), the user has the mobile communication device 98*b* (e.g. a mobile phone) which is portable, such as a mobile phone or a smartphone.

Moreover, in recent years, the mobile communication device 98*b* (e.g. a mobile phone) is often used to perform the proximity wireless communication 98*c*1 (FIG. 167) such as NFC (mentioned above) or RF-ID communication, in electronic money payment, automatic ticket gates, and so on.

For the proximity wireless communication 98*c*1, the user performs, as an example, an operation of touching the mobile communication device to the other device in communication (e.g. the appliance 98*a* in FIG. 167) (see the touching movement 98*b*1, Y060 and Y063 in FIG. 130, etc.).

The proximity wireless communication 98*c*1 is performed when, as a result of the touching movement 98*b*1 of the mobile communication device 98*b*, the position of the mobile communication device 98*b* is the same position (substantially same position, e.g. within a distance of several centimeters) as the position of the other device in communication (the appliance 98*a*). Meanwhile, the proximity wireless communication 98*c*1 is not performed when the movement 98*b*1 is not made and so the two devices are not at the same position (substantially same position).

FIG. 169 is a flowchart of the mobile communication device 98*b*.

The mobile communication device 98*b* may perform processing illustrated in FIG. 169.

For example, when the appliance 98*a* is installed in the home 99, the mobile communication device 98*b* is brought to touch the installed appliance 98*a* (see the movement 98*b*1), to perform the proximity wireless communication 98*c*1 between the installed appliance 98*a* and the mobile communication device 98*b*.

In the case where the proximity wireless communication 98*c*1 is performed (S971 in FIG. 169: Yes, see the communication detection unit 98*q* in FIG. 177), the transmission information 98*o*1 is transmitted to the server 98*c* (by a transmission device (e.g. the mobile communication device 98*b*)).

In the case where the proximity wireless communication 98*c*1 is not performed (S971 in FIG. 169: No), on the other hand, the transmission information 98*o*1 is not transmitted.

In detail, determination is made as to whether or not the proximity wireless communication 98*c*1 between the installed appliance 98*a* and the mobile communication device 98*b* is performed (e.g. whether or not the proximity wireless communication is currently enabled) (S971 in FIG. 169, see the communication detection unit 98*q* in FIG. 177).

In the case of determining that the proximity wireless communication 98*c*1 is performed (S971: Yes), the transmission information 98*o*1 is transmitted. In the case of determining that the proximity wireless communication 98*c*1 is not performed (S971: No), the transmission information 98*o*1 is not transmitted.

This allows the user to perform the transmission of the transmission information 98*o*1 in the case where the appliance 98*a* is installed, by a simple operation such as an operation of touching the mobile communication device 98*b* to the installed appliance 98*a*.

There is, however, a possibility that the information used by the manufacturer (not shown) of the installed appliance 98*a* or the like after installation is not information available (stored) in the mobile communication device 98*b* such as the phone number of the user of the mobile communication device 98*b* who is also the user of the appliance 98*a*, but information (e.g. the product serial number of the installed appliance 98*a*) not available in the mobile communication device 98*b*.

The information not available in the mobile communication device 98*b* means, for example, information not stored in the mobile communication device 98*b* before the proximity wireless communication 98*c*1 is performed.

There is also a possibility that the use information not available in the mobile communication device 98*b* is the pre-installation known information 98*a*1 specified by the manufacturer or the like upon manufacture of the appliance 98*a* prior to installation, such as the product serial number of the appliance 98*a*.

Accordingly, the installed appliance 98*a* may store the information (pre-installation known information) 98*a*1 such as the product serial number, and transmit the (stored) information 98*a*1 such as the product serial number by the proximity wireless communication 98*c*1 with the mobile communication device 98*b* when the appliance 98*a* is installed.

In this case, the mobile communication device 98*b* obtains the information (pre-installation known information) 98*a*1 such as the product serial number transmitted by the proximity wireless communication 98*c*1.

The mobile communication device 98*b* then transmits the transmission information 98*o*1 including the obtained information (pre-installation known information) 98*a*1 such as the product serial number, to the server 98*c*.

This eliminates the need for the user to input the information (pre-installation known information) 98*a*1 such as the product serial number to the mobile communication device 98*b*, thereby further simplifying the operation.

FIG. 171 is a diagram illustrating appliance information 98*ma*1, type information 98*ma*2, function information 98*ma*3, and so on.

At least a part of the pre-installation known information 98*a*1 may be the appliance information 98*ma*1 (see FIG. 171) for specifying the appliance (the first appliance 98*a*) from among a plurality of appliances (e.g. the first appliance 98*a* and the second appliance 98*r* in FIG. 167), such as the product serial number of the appliance, as mentioned earlier.

At least a part of the pre-installation known information 98*a*1 may also be the type information 98*ma*2 for specifying the type of the appliance such as a TV, a refrigerator, or a microwave.

At least a part of the pre-installation known information 98*a*1 may also be the function information 98*ma*3 for specifying a function of the appliance 98*a*.

Examples of the specified function include a display function, a terrestrial digital tuner function, an analog tuner function, and a recording function of a TV and the like.

Examples of the specified function also include a microwave function, a heating function, a cooling function, a function of reading a recording medium recorded according to a predetermined standard (e.g. DVD (Digital Video Disc), Blu-ray), a function of communicating according to a predetermined method (e.g. Bluetooth, ZigBee, Ethernet), and a function of electric power generation (e.g. solar panel electric power generation).

The function information 98*ma*3 may also be component information for specifying a component (e.g. a display unit such as a liquid crystal display, a terrestrial digital tuner) included in the appliance 98*a*, as the function of the appliance 98*a*.

At least a part of the pre-installation known information 98a1 may be attribute information (e.g. the appliance information 98ma1, the type by the type information 98ma2, the function information 98ma3) for indicating an attribute (e.g. the product serial number indicated by the appliance information 98ma1, the type indicated by the type information 98ma2, the function indicated by the function information 98ma3, the component indicated by the component information) of the pre-installation known information 98a1.

In recent years, there is a problem of dumping (illegal dumping) of an appliance (e.g. the appliance 98a).

There is also demand for a more adequate customer service in accordance with where the appliance is installed, such as a cold area, a hot area, a residential area, a corner area, a slope area, or the like.

Hence, there is a possibility that the use information used by the manufacturer or the like is the position information 98j1 (see FIG. 167) indicating the position (e.g. the position of the home of installation) at which the appliance 98a is installed.

Accordingly, the transmission information 98o1 including the position information 98j1 for specifying the installation position may be transmitted to and stored in the server 98c.

This enables the manufacturer or the like to use the position information 98j1, by using the transmission information 98o1 (the position information 98j1) transmitted to the server 98c.

Based on the installation position indicated by the position information 98j1 in the transmitted transmission information 98o1, it is possible to display where the appliance was installed before dumping, or display whether or not the appliance is installed in a slope area.

By such displaying the installation position after the appliance was dumped, the traceability of the appliance can be enhanced.

As described above, the proximity wireless communication 98c1 is performed between the installed appliance 98a and the mobile communication device 98b. When the proximity wireless communication 98c1 is performed, the position of the mobile communication device 98b is the same position (substantially same position, a position near the appliance 98a) as the position of the installed appliance 98a.

In recent years, a mobile phone (e.g. the mobile communication device 98b) is provided with a GPS device to obtain (detect) position information indicating the position of the mobile communication device 98b.

Meanwhile, in order to obtain (detect) position information indicating the installation position in the installed appliance 98a, it is necessary to provide the appliance 98a with a GPS device for obtaining position information, which causes an increase in cost of the appliance 98a.

In view of this, when the proximity wireless communication 98c1 is performed and so the position of the installed appliance 98a is the same position as the position of the mobile communication device 98b, the position information 98j1 indicating the position of the mobile communication device 98b may be obtained (detected) (the position information obtainment unit 98j, S973 in FIG. 169).

In this case, the transmission information 98o1 further including, as the position information indicating the installation position of the appliance 98a, the obtained position information 98j1 of the position of the mobile communication device 98b is transmitted.

Since this can be done merely by obtaining the position information 98j1 in the mobile communication device 98b, a lower cost can be achieved.

Thus, in the case of determining that the proximity wireless communication is performed (S971: Yes), the position information 98j1 of the position (the same position as the installation position of the appliance 98a) of the mobile communication device 98b at this time is obtained and put to use.

FIG. 168 is a diagram illustrating the position information obtainment unit 98j and the like.

The position information 98j1 may be first position information 98j1A (FIG. 168) described below.

The first position information 98j1A is the position information 98j1 that specifies only the position of the home (the first home 99) in which the appliance 98a is installed from among positions of a plurality of homes (e.g. the first home 99, the second home 991 in FIG. 167), and does not specify the installation position (e.g. the position at which the TV N10A is installed as illustrated in FIG. 165) from among a plurality of positions (e.g. the position of the TV N10A, the position of the heater N10K in FIG. 165) in the home in which the appliance 98a is installed.

In other words, the first position information 98j1A specifies the position with relatively low (coarse) accuracy, with a relatively small amount of data.

That is, at least a part of the position information obtainment unit 98j may be the GPS device 98j1x (see the latitude/longitude positioning unit Y028 in FIG. 127, the GPS N31 in FIG. 132, the position information calculation unit 091 in FIG. 149, etc.) that obtains the first position information 98j1A of low accuracy.

For example, the first position information 98j1A of low accuracy is home information (see second position information 98ca2 in FIG. 170) for specifying the home in which the appliance is installed from among the plurality of homes to thereby specify the position of the home.

FIG. 170 is a diagram illustrating the home ID 98ca2 and the like.

In detail, the home information may be the ID (Identifier) 98ca2 (FIG. 170) of the specified home, among different IDs (home IDs) of the different homes.

Examples of the home ID 98ca2 include a number, a character string, and the like assigned to the home (the first home 99 in which the appliance 98a is installed, among the first home 99 and the second home 991).

In association with this home ID 98ca2 (the position information 98j1, the first position information) included in the transmission information 98o1, a part (e.g. the product serial number 98cb of the TV N10A, the product serial number 98cb of the heater N10K) other than the home ID 98ca2 in the transmission information 98o1 for each appliance (e.g. the TV N10A, the heater N10K in FIG. 165) installed in the home (the first home 99) specified by the home ID 98ca2 may be stored in the server 98c.

Such association is designated by the line between the home ID 98ca2 and each of the two product serial numbers 98cb in FIG. 170.

FIG. 175 is a diagram illustrating the position information obtainment unit 98j and the like.

The position information 98j1 may be second position information 98j1B for specifying the installation position (e.g. the position at which the TV N10A is installed as illustrated in FIG. 165) from among the plurality of positions (e.g. the position of the TV N10A, the position of the heater N10K in FIG. 165) in the home (the first home 99) in which the appliance 98a is installed.

In other words, the second position information 98j1B may be the position information 98j1 that specifies the position with relatively high (fine) accuracy, with a relatively large amount of data.

FIG. 172 is a diagram illustrating a first position P 96cP, a second position 96dP, and the like.

The processor 96a may be provided to process the second position information 98j1B (the position information 98j1, position information 98w in FIG. 172) included in the transmitted transmission information 98o1.

For example, the processor 96a is a wireless communication device such as a wireless LAN access point, which is installed in the home (the first home 99) in which the appliance 98a is installed and performs wireless communication with the installed appliance 98a.

The processor 96a may perform the following processing.

FIG. 173 is a flowchart of processing of the transmitted position information 98j1B.

The processor 96a obtains the second position information 98j1B (the position information 98j1, the position information 98w in FIG. 172) included in the transmitted transmission information 98o1 (an information obtainment unit 96a1, S97a in FIG. 173).

The processor 96a determines whether the position (the installation position of the appliance 98a) indicated by the obtained position information 96j1B (the position information 98w) is the first position 96cP (e.g. the position of the heater N10K in FIG. 165) or the second position 96dP (e.g. the position of the TV N10A) (a mode selection unit 96a2, S97b in FIG. 173).

In the case of determining that the position is the first position 96cP (S97b: first position), the processor 96a performs first processing (S97c1) suitable in the case of the first position 96cP. In the case of determining that the position is the second position 96dP (S97b: second position), the processor 96a performs second processing (S97c2) suitable in the case of the second position 96dP (a wireless communication unit 96a3).

For example, the first-mode wireless communication 96f1 (first processing) is suitable as wireless communication with the installed appliance 98a, in the case where the appliance 98a is installed at the first position 96cP (the position of the heater N10K) (i.e. the installed appliance 98a is the first appliance 96c at the first position 96cP).

Meanwhile, the second-mode wireless communication 96f2 (second processing) is suitable as wireless communication with the installed appliance 98a, in the case where the appliance 98a is installed at the second position 96dP (the position of the TV N10A) (i.e. the installed appliance 98a is the second appliance 96d at the second position 96dP).

The wireless communication performed here is wireless communication with a wireless communication device (the processor 96a located, for example, at a position 99c in FIG. 165) such as a wireless LAN (Local Area Network) access point which is installed in the home (the first home 99) in which the appliance 98a is installed.

For instance, the first-mode wireless communication 96f1 is wireless communication with lower power than a threshold, while the second-mode wireless communication 96f2 is wireless communication with higher power than the threshold.

Moreover, for instance, the first position 96cP (the position of the heater N10K) for which the low-power wireless communication 96f1 is suitable is a position within a distance of a threshold Th (FIG. 172) from the position of the access point or the like (the processor 96a), while the second position 96dP (the position of the TV N10A) is a position not within the distance of the threshold Th from the position of the access point or the like.

That is, the wireless communication device (the processor 96a) may perform the following processing.

From the other device in communication (e.g. the first appliance 96c, the second appliance 96d) or the like, the wireless communication device obtains appliance information 98v (e.g. the address of the appliance) for specifying the appliance, and also obtains position information 98s (the position information 98w) included in the transmitted transmission information (transmission information 98p, the transmission information 98o1 in FIG. 167) that includes the same appliance information (address, e.g. the appliance information 98r in FIG. 172) as the obtained appliance information 98v (the information obtainment unit 96a1, S97a).

Based on the obtained position information 98w, the wireless communication device performs the processing described above.

As a result, suitable processing (the first wireless communication 96f1, the second wireless communication 96f2) is performed depending on whether the installation position of the appliance 98a is the first position 96cP (the position of the heater N10K) or the second position 96dP (the position of the TV N10A). This ensures appropriate processing (wireless communication in an appropriate mode (with appropriate power)), regardless of whether the position is the first position 96cP or the second position 96dP.

This can be achieved simply by transmitting the transmission information 98o1 using the mobile communication device 98b such as a mobile phone, with there being no need for the user to install a special device or the like in the home (the first home 99) or perform a complex operation. Hence, appropriate processing can be reliably performed with a simple operation.

Here, the transmission information 98o1 may be transmitted so that suitable processing (the first wireless communication 96f1 or the second wireless communication 96f2) corresponding to the transmitted transmission information 98o1 (the position information) is performed.

In detail, the transmission information 98o1 may be control data for controlling the processor 96a to perform suitable processing (the first wireless communication 96f1 or the second wireless communication 96f2).

The first server 98c (FIG. 172 (FIG. 167)) to which the transmission information 98o1 is transmitted may be a server installed in the home 99, such as a home server (e.g. the server 99a in FIG. 165).

The first server 99a may be connected to the communication line 99b for communicating with outside the home 99 in which the server 99a is situated, as illustrated in FIG. 165.

The first server 98c may also be the above-mentioned wireless communication device (the processor 96a) such as an access point.

Alternatively, the first server 98c to which the transmission information 98o1 is transmitted may be a server of the manufacturer of the appliance 98a outside the home 99, which performs communication via the communication line 99b.

As mentioned earlier, the position information 98j1 (FIG. 167) may be absolute position information for specifying an absolute position on a map such as a latitude and a longitude as in the case where the GPS device 98j1x (FIG. 168) is used.

That is, the position information obtainment unit 98j (see FIG. 167) may include the GPS device 98j1x, where the position information obtainment unit 98j receives a radio wave (e.g. a radio wave from a GPS satellite) and obtains, from the received radio wave, the position information 98j1 which is absolute position information for indicating a position at which the radio wave is received, as the position of the mobile communication device 98b including the position information obtainment unit 98j.

Thus, the position information obtainment unit may be a GPS device (may include a GPS device), or may be a device that receives a radio wave from a mobile phone base station and obtains, from the received radio wave, absolute position information (the position information 98*j*1) for specifying a position at which the radio wave is received.

There is, however, a possibility that the use of absolute position information is inadequate.

For example, there is an instance where it is impossible to obtain absolute position information, i.e., it is impossible to obtain absolute position information of sufficiently high accuracy.

When a radio wave received by a device such as a GPS device that uses the received radio wave is not adequate to obtain position information of sufficiently high accuracy, appropriate absolute position information cannot be obtained.

As an example, there is the case where an inadequate radio wave is transmitted and so absolute position information cannot be obtained, when a manufacturer, manager, or the like of the satellite or the base station transmitting the radio wave is different from the manufacturer or the like of the mobile communication device 98*b*.

Moreover, a GPS device provided in a car navigation device (car navigation) is unable to obtain position information in a tunnel. Thus, there is also the case where absolute position information cannot be obtained because the device is located at a position not suitable for obtaining position information from a radio wave.

In view of this, a position of a base point may be used so that whether the installation position is the first position or the second position is specified based on a difference from the position of the base point to the installation position, such as a distance, a direction (vector), or the like from the base point position (e.g. the base point 98*bx* in FIG. 172, the position of the access point 99*c* in FIG. 165) to the installation position (e.g. the position of the heater N10K, the position of the TV N10A) of the appliance 98*a*.

An example of such a base point position is the position of the access point (e.g. the position of the processor 96*a* in FIG. 172, the position of the access point 99*c* in FIG. 165) described above.

In this case, the obtained position information 98*j*1 may be relative position information for specifying the difference (e.g. a direction, a distance, a vector) from the position of the base point (the base point 98*bx*) to the position of the mobile communication device 98*b* (when the proximity wireless communication 98*c*1 is performed), to thereby specify a position away from the position of the base point (the base point 98*bx*) by the specified difference, as the installation position of the appliance 98*a*.

Such relative position information is information from which alone it is impossible to specify absolute position information such as the latitude and the longitude of the installation position of the appliance 98*a*.

That is, the relative position information may be information that only indicates absolute position information of the installation position of the appliance 98*a*, as absolute position information of the position away from the position of the base point by the difference specified by the relative position information based on a plurality of pieces of information such as the relative position information and the position of the base point.

In recent years, a communication device such as a smartphone is known to be provided with an acceleration sensor for detecting an acceleration of movement of the communication device.

For example, the acceleration sensor is a sensor for displaying, as a screen (e.g. a screen including characters) displayed by the mobile communication device 98*b*, an appropriate screen corresponding to a direction (vertical or horizontal) of the communication device after the movement of the detected acceleration, from among a vertical-direction (character) screen and a horizontal-direction (character) screen.

The acceleration sensor in recent years is capable of detecting an acceleration of (significantly) high accuracy, unlike its preceding acceleration sensor.

The detection accuracy is expected to be further increased in the near future.

In view of this, the position information obtainment unit 98*j* may include the acceleration sensor 98*j*2*x* (see the position correction unit Y030 in FIG. 127, the 6-axis sensor N32 in FIG. 132, the acceleration sensor O98 in FIG. 149) that is provided in the mobile communication device 98*b* to detect an acceleration of movement of the mobile communication device 98*b*, and utilize the detected acceleration.

In detail, when the user operates to move the mobile communication device 98*b* from the base point (e.g. the base point 98*bx* in FIG. 172, the position of the access point 99*c* in FIG. 165) to the installation position of the appliance 98*a* (e.g. the heater N10K, the TV N10A), an acceleration of the movement is detected to thereby obtain (calculate) position information (relative position information) indicating the position (e.g. the position of the heater N10K, the position of the TV N10A) of the mobile communication device 98*b*.

Note that the position prior to this movement is, for example, the position of the base point (the base point 98*bx*) mentioned above.

The transmission information 98*o*1 including the position information 98*j*1 which is the relative position information obtained based on the detected acceleration of the movement in this way is then transmitted to the server 98*c*.

For instance, in the case where the position information 98*j*1 which is the relative position information obtained based on the detected acceleration indicates the movement of the mobile communication device 98*b* (the difference (e.g. distance, direction) from the position of the base point to the position after the movement (e.g. the position of the heater N10K)) from the base point (the base point 98*bx* in FIG. 172, the access point 99*c* in FIG. 165) to the first position 96*c*P (e.g. the position of the heater N10K), the installation position of the appliance 98*a* is determined as the first position 96*c*P (the position of the heater N10K) (S97*b* in FIG. 173: first position).

On the other hand, in the case where the position information 98*j*1 indicates the movement to the second position 96*d*P (the position of the TV N10A), the installation position of the appliance 98*a* is determined as the second position 96*d*P (S97*b*: second position). This ensures that suitable processing is performed even when the received radio wave of GPS or the like is inadequate and so absolute position information (appropriate absolute position information (e.g. absolute position information of appropriate accuracy)) cannot be obtained.

FIG. 174 is a diagram illustrating position information and the like.

As illustrated in FIG. 174, the obtained position information 98*j*1 (FIG. 174) may include both relative position information 96*g*2 indicating a difference (movement of the mobile communication device 98*b*) 98*b*D from a position 98*b*P of the base point 98*bx* (FIG. 174) as obtained using the acceleration sensor 98*j*2*x*, and absolute position information 96*g*1 of the position 98*b*P of the base point 98*bx*.

Here, for example, the first-mode wireless communication (S97*c*1 in FIG. 173) is a mode of indirectly communicating with another device via a relay device such as a wireless LAN access point, whereas the second-mode wireless communication (S97c2 in FIG. 173) is a mode of direct communication without relay, such as ad hoc communication or Wi-Fi (Wireless Fidelity) direct communication.

This being so, the first position 96cP may be a position (e.g. the position of the BD recorder N10B) at a distance relatively near a wireless communication device (e.g. the TV N10A) which is the device in communication with the installed appliance 98a, i.e., a position where direct communication is preferable as higher communication quality than a threshold is attained.

Meanwhile, the second position 96dP may be a position (e.g. the position of the heater N10K, the position of the TV N10I) at a distance relatively far from the wireless communication device (e.g. the TV N10A) which is the device in communication, i.e., a position where relay communication is preferable as direct communication results in low quality.

In detail, the first position 96cP where direct communication is preferable may be a position (the position of the BD recorder N10B) in the same room (the room with the TV N10A) as the position of the wireless communication device which is the device in communication.

As an example, when the wireless communication device (the TV N10A) which is the device in communication is a device (the TV N10A) out of a TV and a blue-ray recorder or the like installed in the same room as the TV, the first position 96cP (the position of the BD recorder N10B) is the position (the position of the BD recorder N10B), in the same room as the device (the TV N10A), of the other installed appliance 98a (the BD recorder N10B).

Meanwhile, the second position 96dP (e.g. the position of the TV N10I) where relay communication is preferable may be a position in a room (the room with the TV N10I) different from the wireless communication device (the TV N10A) which is the device in communication, or a position on a floor (the second floor on which the TV N10I is situated) different from a floor (the first floor) on which the wireless communication device (the TV N10A) is situated.

FIG. 176 is a diagram illustrating a remote controller 98I and the like.

For example, among a plurality of appliances (e.g. a first appliance 98jx and a second appliance 98kx (such as the TV N10A and the heater N10K in FIG. 165)), the user's operation on the remote controller 98I is performed only on an appliance (the first appliance 98jx) at a position (e.g. a position 98jP of the first appliance 98jx (the TV N10A)) in a direction 98I1 of the remote controller 98I, and not on an appliance (the second appliance 98kx) at a position (e.g. a position 98kP of the second appliance 98kx (the heater N10K)) not in the direction 98I1.

However, there is the case where a signal outputted from the remote controller 98I to instruct the operation is a signal by an omnidirectional communication medium, such as a radio signal.

In detail, the remote controller 98I may be the above-mentioned mobile communication device 98b such as a mobile phone.

This can cause a situation where the signal also reaches the appliance (the second appliance 98kx, the heater N10K) not at the position (the position 98jP, the position of the TV N10A) in the direction 98I1, as a result of which the operation of the remote controller 98I is wrongly performed on the appliance (the second appliance 98kx, the heater M10K).

In view of this, determination may be made as to whether the position specified by the position information 98mb (FIG. 171) included in the transmission information 98o1 transmitted for the installed appliance 98a (e.g. the first appliance 98jx, the second appliance 98kx) is the first position (the position jP, the position of the TV N10A) which is a position in the direction 98I1 of the remote controller 98I (S97b in FIG. 173: first position) or the second position (the position 98kP, the position of the heater N10K) which is not the position 98jP in the direction 98I1 (S97b: second position) (a determination unit 98i1 in FIG. 176).

In the case of determining that the position is the first position (S97b: first position), the determined appliance (the first appliance 98jx, the TV N10A) is controlled to perform the operation (e.g. channel switch, power-off) (first processing, S97c1).

In the case of determining that the position is the second position (the position of the heater N10K) (S97b: second position), the determined appliance is not controlled to perform the operation, and second processing (S97c2) which is other processing is performed (an operation control unit 96i2 in FIG. 176).

Note that one or both (a control device 96i) of the determination unit 96i1 and the operation control unit 96i2 may be a functional block included in the above-mentioned home server (e.g. the server 99a in FIG. 165) provided in the home 99.

The first position information of low accuracy (e.g. the home ID 98ca2 in FIG. 170) may be an address or a phone number of the home 99 of installation, a product serial number of a mobile phone (e.g. the mobile communication device 98b) of a resident of the home 99, or a name of the resident.

The server 98c may receive the transmission information 98o1, and specify, from among a plurality of homes (e.g. the first home 99, the second home 991 in FIG. 167), the home (home ID) at the position indicated by the transmission information 98o1, as the home (home ID, e.g. the home ID of the first home 99) in which the appliance 98a is installed.

The same mobile communication device 98b may transmit the first transmission information 98o1 of the first appliance 98a when touching the installed first appliance 98a (e.g. the TV N10A in FIG. 165), and also transmit the transmission information 98o1 of the second appliance 98a when touching the installed second appliance 98a (e.g. the heater N10K).

Alternatively, the second mobile communication device 98b (of a user in the home 99 other than the user of the first mobile communication device 98b) other than the above-mentioned first mobile communication device 98b may transmit the second transmission information 98o1 of the second appliance 98a when touching the installed second appliance 98a.

The second transmission information 98o1 transmitted here may include the same information (e.g. the ID of the home 99) as the first transmission information 98o1.

The second transmission information 98o1 may include the above information included in the first transmission information 98o1, which is obtained by the second mobile communication device 98b from the server such as the home server (e.g. the server 99a in FIG. 165) that stores the information.

The stored information may be information transmitted from the first mobile communication device 98b to the server. As an alternative, the information included in the first transmission information 98o1 may be information which the first mobile communication device 98b receives from the server.

The specific information for specifying the device (e.g. the mobile communication device 98b, the installed appliance 98a) may be the product serial number of the device as mentioned above, or a MAC (Media Access Control) address of the device.

The ID of the home 99 in which the appliance 98a is installed may be information that specifies, by such a product serial number, the home (the home 99) of the resident having the device (e.g. the mobile communication device 98b) of the product serial number, from among a plurality of homes.

The product serial number or the like used as the ID of the home may be a product serial number of an appliance corresponding to first transmission of transmission information among a plurality of appliances (see the appliances in FIG. 165) installed in the home.

Though the present invention has been described in detail by way of the embodiments, the above description is merely an example of the present invention in all respects, and the present invention is not limited to such. Various improvements and modifications may be made on the embodiments without departing from the scope of the present invention.

For example, the present invention may be realized not only as an apparatus or a device (system), but also as a method including steps corresponding to the processing units of the apparatus, a program causing a computer to execute such steps, a computer-readable recording medium such as a CD-ROM on which the program is recorded, or information, data, or a signal indicating the program. Such a program, information, data, or signal may be distributed via a network such as the Internet.

The present invention also includes any other modifications to the embodiments that can be conceived by a person skilled in the art and any combinations of components in the embodiments and variations, without departing from the scope of the present invention.

INDUSTRIAL APPLICABILITY

The present invention allows a receiving device (apparatus) such as a TV to receive data such as images from a server by a simple procedure. Therefore, the present invention is useful in any system for simplifying operations of a display device (apparatus) such as a TV or a PC for obtaining data via the Internet. Moreover, the communication device according to the present invention is applicable to any device that is provided with a RF-ID tag in which identification information and a virtual machine program are stored. For example, the communication device may be applied to electronic appliances such as a camera, home appliances such as a rice cooker and a refrigerator, and daily commodities such as a toothbrush.

With the communication device Y02 described above, even in the case where the device Y01 is the microwave M1012 or the like, the information (the product serial number Y025N of the communication terminal Y02 of the user) of the user who purchased the device Y01 can be easily transmitted to the server Y04.

REFERENCE SIGNS LIST

1 Image capturing device
3 Power switch
6 Lens
6a Display unit
20 first antenna
21 second antenna
22 Antenna cover
30 Image capturing unit
31 Video processing unit
32 Recording/reproducing unit
33 Third memory
34 IC card
35 First processing unit
36 Encryption unit
37 Communication unit
38 Transmission unit
40 Internet
42 Server
45 TV
46 RF-ID reader/writer
47 RF-ID unit
51 Recording/reproducing unit
52 Second memory
90 URL generation unit
91 Second power supply unit
95 Second processing unit
98a Appliance
98b Mobile communication device
98c Server
98c1 Proximity wireless communication
98j Position information obtainment unit
98j1 Position information
98n Appliance information obtainment unit
98n1 Appliance information
98o Transmission unit
98o1 Transmission information
99 Home
100 Battery
101 First power supply unit
102 Third power supply unit
105 Data receiving unit
106 Recording unit
107 Reproducing unit
108 Data transfer unit
110 Display unit (TV)
111 Medium identification information
115 Service detail identification information
116 Operation program
117 Directory information on a server in which operation program is recorded
118 Operation program selection information
119 Operation program existence identifier
120 Directory information on a server in which image display method instruction information is recorded
121 Identifier indicating whether or not image display method instruction information is in a server
122 Display order identifier
123 All-image display identifier
124 Information of partial image of specific directory
125 List display identifier
126 Slide show identifier
127 Image quality prioritization
128 Speed prioritization
129 Directory of display audio
130 Directory of display audio
131 Partial-image display identifier
132 Image of specific user
133 Password of specific user
134 Directory having images
135 Camera model information
136 Forced print instruction
137 Directory of to-be-printed image data
138 Antenna of RF-ID reader/writer of TV
139 Post card
140 Camera icon
141 Post card icon
142 Blank image
143 Actual image
170 Activation unit 171 Communication unit
172 Power detection unit
173 Modulation unit
174 First memory
175 Modulation switch unit
500 Electronic catalog server information input device
502 Electronic catalog notification card
504 RF-ID reader
506 Electronic catalog server
507 Electronic catalog database
508 Customer attribute database
520 Key input receiving unit
521 RF-ID transmission input receiving unit
573 URL generation unit
584 Image selection unit
588 User information input unit
589 Operation mode determination unit
601 Customer attribute data obtainment unit
602 Electronic catalog data obtainment unit
650 Electronic catalog display screen
651 Product/service data
652 Highlighted electronic catalog operation option
800 Printer
801 RF-ID-attached post card
810 Post card destination information input unit
820 Display screen on which post card registration image is selected
821 Display screen on which post card print image is selected
822 Display screen on which post card insertion message is inputted
823 Display screen on which post card destination information is inputted
824 Display screen on which post card destination decision is confirmed
825 Thumbnail image
826 Selecting thumbnail image
827 Remote controller
2000 Recorder
2001 Tuner
2002 Input signal processing unit
2003 Output signal processing unit
2004 System control unit
2005 Memory
2006 Operation input unit
2007 Communication unit
2008 HDD
2009 Optical disk drive
2010 Bus
2011 Setting information processing unit
2012 Recorder ID
2013 Setting information
2100 RF-ID card
2101 Memory
2102 Processing unit
2103 Apparatus operation information
2104 Operation apparatus identification information
2105 Target apparatus information
2106 Operation instruction information
2107 Communication information
2109, 2110, 2111 Operation instruction information data
2112 URL
2113 Login ID
2114 Password
2250 Setting information
2260 Instruction detail information
2261 Instruction target information
2262 Communication execution information
2560 Image server
2561 Internet
2562 Image capturing device
2563 TV
2564 Mailing object
2565 RF-ID unit
3001 Mailing object
3002 RF-ID unit
3003 Memory unit
3045 TV
3046 RF-ID reader/writer
3047 Display unit
5501 Wireless antenna
5503 Receiving unit
5502 Communicable device search unit
5504 Decryption unit
5505 URL generation unit
5506 Communication unit
5507 Transmission unit
5508 Communication interface
5509 Receiving unit
5510 Data processing unit
5511 Memory unit
5512 Display unit
5513 CPU
5940 Data format used when a captured image is uploaded from the image capturing device 1 to the server 42
5950 Data format of RF-ID communication between the image capturing device 1 and the TV 45
6005 TV program execution circumstance
6006 Server connection instruction
6007 Download-completion-time processing set instruction
6008 Download instruction
6009 Download-completion-time instruction
6010 Slide show display instruction
7000 Forced display instruction storage unit
7001 Format identification information storage unit
7002 Program storage unit
7003 Second memory reading unit
7004 URL generation unit
7005 Program generation unit
7006 Program part storage unit
7007 Program writing unit
7008 Product serial number storage unit
7009 Language code storage unit
7010 Program execution virtual machine
7020 Use status detection unit
7021 Trouble detection unit
7022 Power consumption detection unit
6512 Wireless communication device
6520 Remote controller with display function
6521 Wireless communication transmission unit
6522 RF-ID reader
6523 Display unit
6524 Input unit
6525 Program execution virtual machine
6530 Remote controller without display function
6531 Transmission unit
6532 RF-ID reader
6533 Input device
6534 LED
6535 Memory
M1005 Registration server
M1101 Communication device
M1201 Registration device M1202 Device UID obtainment unit
M1203 Device UID transmission unit
M1204 Registration information generation unit
M1205 Home ID management unit
M1206 Position information obtainment unit
M1207 Position information transmitting/receiving unit
M1208 Registration information database
M2202 Wireless connection request obtainment unit
M2203 Wireless connection request transmission unit
M2204 Wireless AP information request generation unit
M2210 Setting program generation unit
M2211 Setting program execution unit
M2250 Interference information transmission unit
M2251 Interference information database

The invention claimed is:

1. A mobile communication device comprising:
an appliance information obtainment unit configured to obtain, from an appliance installed at a predetermined position, appliance information by proximity wireless communication between the installed appliance and said mobile communication device, the appliance information specifying the appliance from among a plurality of appliances;
a position information obtainment unit configured to obtain position information indicating a position of said mobile communication device, the position being at a time when the proximity wireless communication is performed between the installed appliance and said mobile communication device;
an identification information storage unit configured to store identification information that includes at least one of device unique information of said mobile communication device and subscriber information of said mobile communication device; and
a transmission unit configured to transmit registration information to a server, the registration information being information for registering (i) the appliance information obtained by the proximity wireless communication, (ii) the position information indicating the position of said mobile communication device, and (iii) the identification information, in a database in the server in association with each other.

2. The mobile communication device according to claim 1, further comprising
a detection unit configured to detect that the proximity wireless communication is performed between the installed appliance and said mobile communication device, the proximity wireless communication being performed in the case where the appliance is installed,
wherein said transmission unit is configured to transmit the registration information to the server in the case where said detection unit detects that the proximity wireless communication is performed, the registration information being required to be transmitted to the server in the case where the appliance is installed at the predetermined position,
the transmitted registration information includes the appliance information specifying the installed appliance from among the plurality of appliances,
said appliance information obtainment unit is configured to obtain the appliance information from the appliance by the proximity wireless communication,
the transmitted registration information includes position information indicating the position at which the appliance is installed, and
said position information obtainment unit is configured to obtain, as the position information indicating the position of the appliance, the position information indicating the position of said mobile communication device when the proximity wireless communication is performed between the installed appliance and said mobile communication device.

3. The mobile communication device according to claim 1, wherein the obtained position information specifies a movement of said mobile communication device from a base point to the position at which the appliance is installed, to indicate a first position in the case where the specified movement is a first movement to the first position, and a second position in the case where the specified movement is a second movement to the second position, and
the server to which the registration information is transmitted performs control so that wireless communication in a first mode is performed between a predetermined wireless communication device and the installed appliance in the case where the movement specified by the position information in the registration information is the first movement, and wireless communication in a second mode is performed between the predetermined wireless communication device and the installed appliance in the case where the specified movement is the second movement.

4. The mobile communication device according to claim 1, wherein said position information obtainment unit includes an acceleration sensor that detects an acceleration when said mobile communication device moves to the position at which the appliance is installed, and
the obtained position information specifies the movement according to the detected acceleration, to indicate the position of said mobile communication device after the specified movement, as the position at which the appliance is installed.

5. The mobile communication device according to claim 1, wherein the predetermined position at which the appliance is installed is inside a home, and
the proximity wireless communication is communication according to Near Field Communication (NFC) performed when, in the case where the appliance is installed in the home, a user of said mobile communication device in the home in which the appliance is installed performs an operation of touching said mobile communication device to the installed appliance.

6. The mobile communication device according to claim 1, wherein the predetermined position at which the appliance is installed is inside a home,
said mobile communication device stores an ID of the home, the ID being information specifying the home of a user of said mobile communication device, and
said transmission unit is configured to transmit, to the server, the registration information that associates the position information with the ID of the home, to cause the server to store, in association with the ID that is included in the transmitted registration information as the ID of the home in which the appliance is installed, information included in the registration information other than the ID.

7. The mobile communication device according to claim 6, wherein said position information obtainment unit is configured to obtain the ID from a second server as the position information, the second server being provided in the home in which the appliance is installed and storing the ID of the home.

8. The mobile communication device according to claim 6, wherein said transmission unit is configured to transmit the registration information, to cause a predetermined image generation device to generate an image which shows an internal structure of the home and in which a display item representing the appliance specified by the obtained appliance information in the transmitted registration information is superimposed at the position at which the appliance is installed.

9. The mobile communication device according to claim 1, wherein the predetermined position at which the appliance is installed is inside a home, and
said position information obtainment unit is configured to obtain the position information stored in a storage unit in said mobile communication device, the position information specifying said mobile communication device from among a plurality of devices to specify, as a position of the home in which the appliance is installed, a position of the home of a user of said specified mobile communication device.

10. The mobile communication device according to claim 1, wherein said transmission unit is configured to:
transmit the registration information to the server, to cause the server to store the transmitted registration information; and
when the appliance has been moved from the predetermined position, cause the server to output the position information included in the registration information in the case where the appliance information specifying the moved appliance is the same as the appliance information that is included in the registration information stored in the server and specifies the installed appliance.

11. The mobile communication device according to claim 1, wherein the obtained appliance information is a product serial number of the appliance, the product serial number specifying the installed appliance from among the plurality of appliances.

12. The mobile communication device according to claim 1, wherein said appliance information obtainment unit is configured to obtain at least one of type information and function information from the installed appliance by the proximity wireless communication, the type information indicating a type of the appliance, and the function information indicating a function of the appliance, and
the transmitted registration information includes the obtained at least one of type information and function information.

13. The mobile communication device according to claim 1, wherein said position information obtainment unit includes:
an absolute position information obtainment unit configured to obtain absolute position information of said mobile communication device; and
a relative position information detection unit configured to detect a relative position based on a movement of said mobile communication device,
the appliance information includes absolute position information of the appliance, and
said relative position information detection unit is configured to initialize the relative position, based on the absolute position information of the appliance.

14. The mobile communication device according to claim 13, wherein the appliance information further includes accuracy identification information of the absolute position information of the appliance, and
said relative position information detection unit is configured to determine whether or not to initialize the relative position, based on the accuracy identification information.

15. An integrated circuit comprising:
an appliance information obtainment unit configured to obtain, from an appliance installed at a predetermined position, appliance information by proximity wireless communication between the installed appliance and a mobile communication device including said integrated circuit, the appliance information specifying the appliance from among a plurality of appliances;
a position information obtainment unit configured to obtain position information indicating a position of the mobile communication device, the position being at a time when the proximity wireless communication is performed between the installed appliance and the mobile communication device;
an identification information storage unit configured to store identification information that includes at least one of device unique information of the mobile communication device and subscriber information of the mobile communication device; and
a transmission unit configured to transmit registration information to a server, the registration information being information for registering (i) the appliance information obtained by the proximity wireless communication, (ii) the position information indicating the position of the mobile communication device, and (iii) the identification information, in a database in the server in association with each other.

16. A communication method comprising:
obtaining, from an appliance installed at a predetermined position, appliance information by proximity wireless communication between the installed appliance and a mobile communication device executing said communication method, the appliance information specifying the appliance from among a plurality of appliances;
obtaining position information indicating a position of the mobile communication device, the position being at a time when the proximity wireless communication is performed between the installed appliance and the mobile communication device;
storing identification information that includes at least one of device unique information of the mobile communication device and subscriber information of the mobile communication device; and
transmitting registration information to a server, the registration information being information for registering (i) the appliance information obtained by the proximity wireless communication, (ii) the position information indicating the position of the mobile communication device, and (iii) the identification information, in a database in the server in association with each other.

17. A non-transitory computer-readable recording medium having a computer program recorded thereon for causing a computer to execute:
obtaining, from an appliance installed at a predetermined position, appliance information by proximity wireless communication between the installed appliance and a mobile communication device including the computer that executes said computer program, the appliance information specifying the appliance from among a plurality of appliances;

obtaining position information indicating a position of the mobile communication device, the position being at a time when the proximity wireless communication is performed between the installed appliance and the mobile communication device;

storing identification information that includes at least one of device unique information of the mobile communication device and subscriber information of the mobile communication device; and transmitting registration information to a server, the registration information being information for registering (i) the appliance information obtained by the proximity wireless communication, (ii) the position information indicating the position of the mobile communication device, and (iii) the identification information, in a database in the server in association with each other.

* * * * *